US006763341B2

(12) United States Patent
Okude

(10) Patent No.: US 6,763,341 B2
(45) Date of Patent: Jul. 13, 2004

(54) OBJECT-ORIENTED KNOWLEDGE BASE SYSTEM

(76) Inventor: Shin'ichiro Okude, 1001-375, Oaza-Nihongi, Hakusan-cho, Ichishi-gun, Mie-ken 515-2605 (JP)

( * ) Notice: Subject to any disclaimer, the term of this patent is extended or adjusted under 35 U.S.C. 154(b) by 448 days.

(21) Appl. No.: 09/958,322

(22) PCT Filed: Jul. 19, 2001

(86) PCT No.: PCT/JP01/06294

§ 371 (c)(1), (2), (4) Date: Oct. 4, 2001

(87) PCT Pub. No.: WO02/09489

PCT Pub. Date: Feb. 7, 2002

(65) Prior Publication Data

US 2003/0220890 A1 Nov. 27, 2003

(51) Int. Cl.[7] ........................ G06F 17/00

(52) U.S. Cl. ........................ 706/45; 706/47; 706/50

(58) Field of Search ........................ 706/45, 47, 50

(56) References Cited

U.S. PATENT DOCUMENTS 6,654,731 B1 * 11/2003 Mahesh ........................ 706/45

OTHER PUBLICATIONS

S. M. Humphrey, "A Knowledge–Based Expert System for Computer–Assisted Indexing", IEEE Expert, Fall 1989.*

Kim et al, "Automatic Construction of Rule–Based Trees for Conceptual Retrieval" SPIRE, Sep. 2000.*

* cited by examiner

*Primary Examiner*—George B. Davis

(57) ABSTRACT

A useful object-oriented knowledge base system is provided, which comprises an 'object-oriented knowledge base', an inference mechanism, and an ideal dictionary, etc. Sentences used as a 'rule' and/or as a 'fact' in the 'object-oriented knowledge base' are described according to a simple English grammar. Hierarchical structure of nouns-system in an 'ideal thesaurus' is constructed, on the basis of special kind of 'object-oriented-lexical-definition of nouns' recorded in the ideal dictionary. Lexical meaning of a verb whose meaning is specific are derived from that of a verb whose meaning is general and universal, by using 'dichotomy' on the basis of C-language-like way of description of English sentences in the lexicon. The hierarchical structure of verbs-system in an 'ideal classification table' is constructed on the basis of them. The Inference mechanism processes not only mathematically well defined equations but, also simple English sentences, by making full use of the 'ideal thesaurus' and the 'ideal classification table', on the basis of specially contrived 'sentence based object-oriented categorical syllogism'.

47 Claims, 13 Drawing Sheets

THE NAME OF THE FUNCTION USED IN
MEANS FOR DESCRIBING A FUNCTION USED AS A RULE.

THE NAME OF A SUBROUTINE

THE NAME OF A COMPUTER PROGRAM

THE NAME OF AN UNIT OPERATION DESCRIBED IN A MANUAL

FIG. 7

MEANS FOR STORING DATA PROVIDING THE ABILITY OF ASSOCIATION

MEANS FOR STORING DATA PROVIDING THE ABILITY OF ASSOCIATION IN A STRICT WAY

FIG. 8

THE STYLE OF THE REASONING OF THE
MEANAS FOR CARRYING OUT AN INFERENCE.

AN OPPORTUNISTIC REASONING

EACH STEP OF OPPORTUNISTIC REASONING
IS
EITHER
FORWARD REASONING
AND/OR
BACKWARD REASONING

FIG. 9

THE AIM OF EACH STEP OF OPPORTUNISTIC REASONING

TO PROVE A HYPOTHETICAL PROPOSITION THAT IS THE TARGET OF THE PRESENT STEP OF OPPORTUNISTIC REASONING.

FIG. 1 0

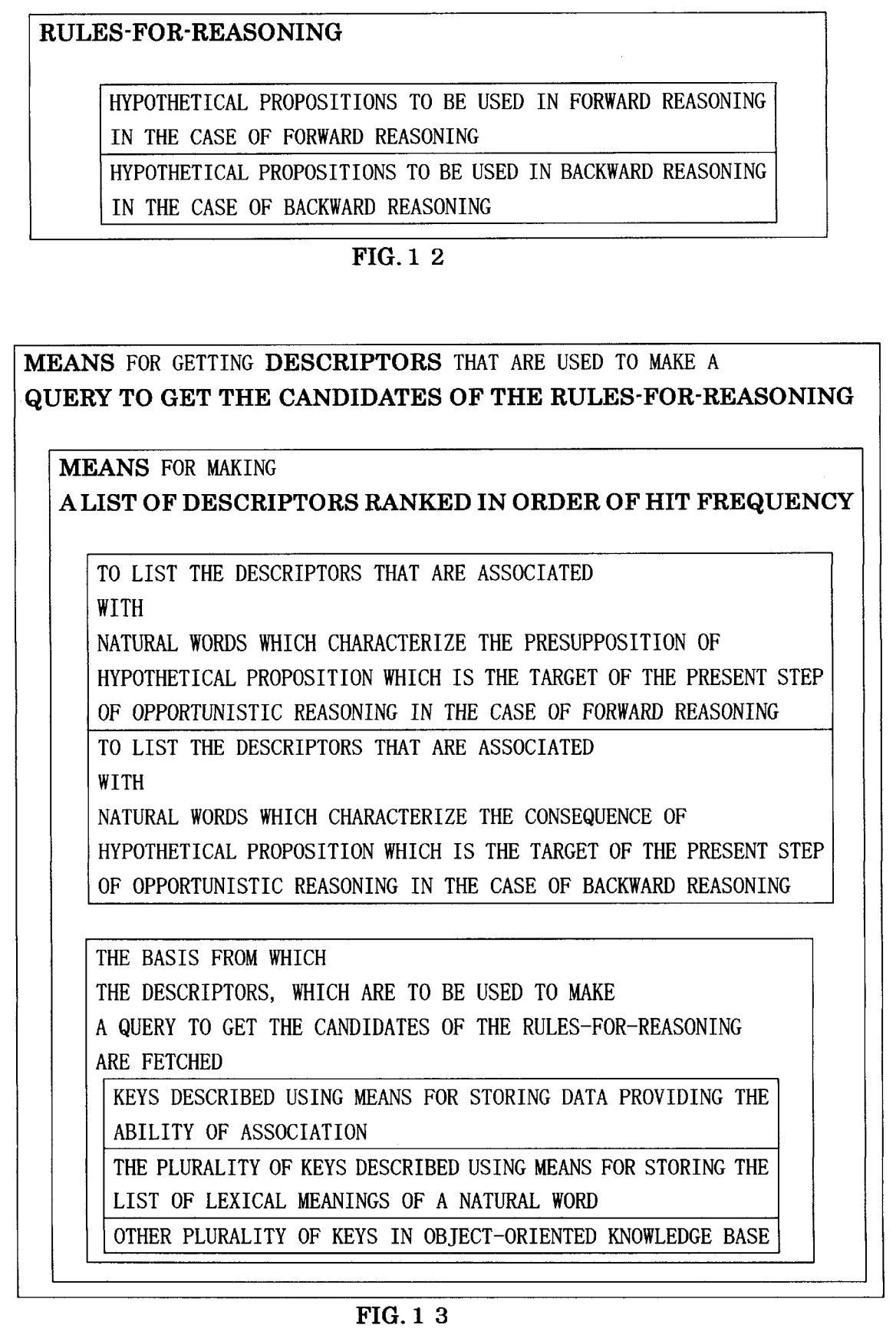

RULES-FOR-REASONING

| |
|---|
| HYPOTHETICAL PROPOSITIONS TO BE USED IN FORWARD REASONING IN THE CASE OF FORWARD REASONING |
| HYPOTHETICAL PROPOSITIONS TO BE USED IN BACKWARD REASONING IN THE CASE OF BACKWARD REASONING |

FIG. 12

MEANS FOR GETTING DESCRIPTORS THAT ARE USED TO MAKE A QUERY TO GET THE CANDIDATES OF THE RULES-FOR-REASONING

MEANS FOR MAKING A LIST OF DESCRIPTORS RANKED IN ORDER OF HIT FREQUENCY

| |
|---|
| TO LIST THE DESCRIPTORS THAT ARE ASSOCIATED WITH NATURAL WORDS WHICH CHARACTERIZE THE PRESUPPOSITION OF HYPOTHETICAL PROPOSITION WHICH IS THE TARGET OF THE PRESENT STEP OF OPPORTUNISTIC REASONING IN THE CASE OF FORWARD REASONING |
| TO LIST THE DESCRIPTORS THAT ARE ASSOCIATED WITH NATURAL WORDS WHICH CHARACTERIZE THE CONSEQUENCE OF HYPOTHETICAL PROPOSITION WHICH IS THE TARGET OF THE PRESENT STEP OF OPPORTUNISTIC REASONING IN THE CASE OF BACKWARD REASONING |

THE BASIS FROM WHICH THE DESCRIPTORS, WHICH ARE TO BE USED TO MAKE A QUERY TO GET THE CANDIDATES OF THE RULES-FOR-REASONING ARE FETCHED

| |
|---|
| KEYS DESCRIBED USING MEANS FOR STORING DATA PROVIDING THE ABILITY OF ASSOCIATION |
| THE PLURALITY OF KEYS DESCRIBED USING MEANS FOR STORING THE LIST OF LEXICAL MEANINGS OF A NATURAL WORD |
| OTHER PLURALITY OF KEYS IN OBJECT-ORIENTED KNOWLEDGE BASE |

FIG. 13

MEANS FOR GETTING
NAMES-OF-CLASSIFICATION-ITEMS THAT ARE USED TO MAKE A
QUERY TO GET THE CANDIDATES OF THE RULES-FOR-REASONING

MEANS FOR MAKING
A LIST OF
NAMES-OF-CLASSIFICATION-ITEMS RANKED IN ORDER OF HIT FREQUENCY

TO LIST THE NAMES-OF-CLASSIFICATION-ITEMS THAT ARE ASSOCATED WITH
NATURAL WORDS WHICH CHARACTERIZE THE PRESUPPOSITION OF
HYPOTHETICAL PROPOSITION WHICH IS THE TARGET OF THE PRESENT STEP
OF OPPORTUNISTIC REASONING IN THE CASE OF FORWARD REASONING

TO LIST THE NAMES-OF-CLASSIFICATION-ITEMS THAT ARE ASSOCATED WITH
NATURAL WORDS WHICH CHARACTERIZE THE CONSEQUENCE OF
HYPOTHETICAL PROPOSITION WHICH IS THE TARGET OF THE PRESENT STEP
OF REASONING IN THE CASE OF BACKWARD REASONING

THE BASIS FROM WHICH
THE NAMES-OF-CLASSIFICATION-ITEMS, THAT ARE TO BE USED TO MAKE
A QUERY TO GET THE CANDIDATES OF THE RULES-FOR-REASONING
ARE FETCHED

KEYS DESCRIBED USING MEANS FOR STORING DATA PROVIDING THE ABILITY OF ASSOCIATION.

KEYS DESCRIBED USING MEANS FOR STORING THE LIST OF LEXICAL MEANINGS OF A NATURAL WORD

OTHER PLURALITY OF KEYS IN OBJECT-ORIENTED KNOWLEDGE BASE

FIG. 14

RETRIEVAL OF THE CANDIDATES OF THE RULES-FOR-REASONING

CANDIDATES OF THE RULES-FOR-REASONING

HYPOTHETICAL PRIPOSITIONS
WHOSE PRESUPPOSITION IS HIT UPON DURING A BOOLEAN SEARCH USING
THE DESCRIPTORS OF FIG. 13
AND
THE NAMES-OF-CLASSIFICATION-ITEMS OF FIG. 14,
IN THE CASE OF FORWARD REASONING

HYPOTHETICAL PRIPOSITIONS
WHOSE CONSEQUENCE IS HIT UPON DURING A BOOLEAN SEARCH USING
THE DESCRIPTORS OF FIG. 13
AND
THE NAMES-OF-CLASSIFICATION-ITEMS OF FIG. 14,
IN THE CASE OF BACKWARD REASONING

THE BASIS FROM WHICH
CANDIDATES OF THE RULES-FOR-REASONING,
ARE RETRIEVED

KEYS DESCRIBED USING MEANS FOR STORING DATA USED AS RULES

KEYS DESCRIBED USING MEANS FOR STORING DATA ABOUT INSTANCES OF SOLVING PROBLEMS

KEYS DESCRIBED USING MEANS FOR DESCRIBING THE FUNCTION OF A VERB

FIG. 15

OBJECT-ORIENTED KNOWLEDGE BASE SYSTEM

TECHNICAL FIELD

This invention relates to object-oriented knowledge base systems.

BACKGROUND ART

Smart explanation and commentary on the technical term 'knowledge base' is given in ◎"Joho Sisutemu Handobukku" (In Japanese). It is summarized as follows:

Roughly speaking, a knowledge base is an integrated items of knowledge (expert knowledge and/or empirical knowledge, etc.) of real world (usually of a restricted domain of the real world) which are usually stored in computer systems and are described in a form readily used for the purpose of, say, inference.

Items of knowledge in a knowledge base can be roughly classified into 'facts' and 'rules'. For example, the knowledge that "A crow is a bird" is an example of a 'fact', and the knowledge that "Any bird flies in the air" (i.e. the knowledge that "No matter what a creature may be, the creature flies in the air if the creature is a bird.") is an example of a 'rule'. If an 'inference' is carried out on the bases of these two items of knowledge, the answer to the question, for example "Dose a crow fly?" can be answered, if a perfect knowledge base system whose ability matches human ability of thought would exist and are used. A portion carrying out such inferences like this is usually called 'inference mechanism'.

Usually, the main purpose to construct a knowledge base is to give solutions to varieties of problems by using the knowledge base in combination with an inference mechanism. If a very universal inference mechanism exists, then, procedures for solving problems have not necessarily be explicitly described as computer programs; That is, if a knowledge base system has a very universal inference mechanism, then a user of the knowledge base system can solve problems only by representing the necessary items of knowledge according to the style of representation of the knowledge base. Therefore, if so, the user may not necessarily be skillful at coding computer programs.

An important issue to be discussed when a knowledge base is constructed, is the way of 'knowledge representation'. As ideal merits that a good 'knowledge representations' should have, for examples, 1) Having high power of expression and being able to describe varieties of things and matters in a systematic manner.
2) Having high readability and being easily understood by human.
3) Having high degree of modularity and being highly flexible to the renewal of items of knowledge stored in the knowledge base.
4) With which, being able to implement (=embody) high performance processing systems.

Four types of methods for knowledge representation are broadly known:

1) Predicate logic.
2) Production rule.
3) Semantic network.
4) Frame.

The 'semantic network' model is originally introduced to describe human memory and ability of association in the field of cognitive psychology (see for example ◎"Gurafikku Ninchi shinrigaku" p.86), but is frequently used also in the field of artificial intelligence: (see for example, ◎"The CLASSIC Knowledge Representation System or, KL-ONE").

The KL-ONE is one of the most famous knowledge representation systems. The KL-ONE's root is in 'semantic network', but KL-ONE is influenced in part by 'Frame'. The CLASSIC Knowledge Representation system is a new generation of KL-ONE-like systems (◎"The CLASSIC Knowledge Representation System or, KL-ONE"). The KL-ONE and its descendants are one of the most long-lived knowledge representation systems, and its research has lasted over two decades at least up to today. For more details, see for example, recent US Patents ◎"U.S. Pat. No. 5,974,405 Oct. 26, 1999 Knowledge base management system with enhanced explanation of derived information and error objects", and, ◎"U.S. Pat. No. 5,659,724 Aug. 19, 1997 Interactive data analysis apparatus employing a knowledge base".

As the fifth type of method for knowledge representation,

5)'Object-oriented knowledge base' is known.

The original idea 'Object' was first introduced when a computer language 'Simula67' was designed. The Simula67 got extremely high reputation as a computer simulation system (Chapter 2 of ◎"MODELLING the WORLD with OBJECTS"). Thus, the original idea, 'Object' was born primary as a concept of programming language (i.e. Simula67) rather than as a method only for knowledge representation (◎"Chishiki no hyo-gen to kousoku suiron", p.11).

The term 'object-oriented programming language' is a general and somewhat vaguely used term, and in many cases represents a programming language supporting the way to implement (=embody) an 'object', which is usually represented in a source code of a computer program as an integrated unit composed of algorithms and data (◎"Joho Sisutemu Handobukku" p.4–202). The SIMULA67 is of course an object-oriented programming language. Smalltalk and C++ are also object-oriented programming languages. Usually, each of "graphical objects" in a GUI (Graphical User Interfaces) of computers, such as icons, windows, dialog boxes, Mouse cursors etc. are usually implemented by using object oriented languages. In such cases, above mentioned type of an integrated unit composed of algorithms and data defined in the source code of the object oriented software supporting the GUI, is usually used to embody a "graphical object".

Some persons believe in that object-oriented representation is just suitable to be used not only as a method to implement "graphical objects" in a GUI, but also as a method of knowledge representations in a knowledge base system (◎"MODELLING the WORLD with OBJECTS" Chapter 12). It is highly desirable today to propose varieties of types of object-oriented knowledge base systems of practical use until the ultimate and perfect solution is got.

As a matter of fact, some pioneering and challenging work to construct object-oriented knowledge base systems have been done, including, O-logic, (◎"A Logic for Object-Oriented Logic Programming (Maier's O-Logic: Revisited)", and, Transaction Logic (◎"Transaction Logic Programming (or, a Logic of Procedural and Declarative Knowledge"), and, Quixote(◎"Specific Features of a Deductive Object-Oriented Database Language Quixote"). Knowledge representations used in these knowledge base systems are very precise and are extremely mathematical.

However, these object-oriented knowledge base system is not so popular when compared with other software systems, say, '©MS-DOS', '©Windows 95', '©Office' (presented by Microsoft). It is highly desirable to give object-oriented knowledge base systems with facts and rules having high readability and being easily understood by human to present a knowledge base system of very wide and popular use. One of the final purposes to be attained in developing an ultimate object-oriented knowledge base system is to give a knowledge base system in which a flexible, systematic, exact, exhaustive, and user-friendly way of 'knowledge representation' which covers not only what can be described mathematically but also covers what can be described linguistically, and, a mighty 'inference mechanism' for inference widely applicable to wide varieties of sentences in the 'knowledge representation', coexist.

DISCLOSURE OF INVENTION

1. SUMMARY

A useful object-oriented knowledge base system is provided, which comprises an 'object-oriented knowledge base', an inference mechanism, and an 'object-oriented knowledge base management system'. In the knowledge base, simple English sentences are used as a rule and/or as a fact. An 'ideal dictionary' exists in the 'object-oriented knowledge base management system', wherein an object-oriented-lexical-definition of nouns is given, and dichotomy in combination with c-language-like way of description of English sentences is used to give a lexical definition of a verb. The 'ideal dictionary' is used as a basis on which an 'ideal thesaurus' and an ideal 'classification table', in the 'object-oriented knowledge base', are constructed. The inference mechanism, which is based on a specially contrived 'object-oriented categorical syllogism', processes not only mathematical equations but also simple English sentences, by making full use of a thesaurus and a classification table.

2. OBJECTS AND ADVANTAGES

Accordingly, several objects and advantages of my invention are:

(a) My invention provides a way to describe facts and rules using a sentence having high readability and flexibility and being easily understood by human, because such a sentence is usually described in a linguistic style on the basis of simple grammar.

(b) My invention provides a way to construct a hierarchical structure of nouns-system in a 'thesaurus', on the basis of special kind of 'object-oriented-lexical-definition of nouns' recorded in an 'ideal dictionary' of the knowledge base. Lexical definition of a verb is also given in an 'ideal dictionary' of the knowledge base. Lexical definition of a verb whose meaning is specific is derived from that of a verb whose meaning is general and universal, by specialization of the meaning by using 'dichotomy' and/or by using C-language-like way of linguistic description of sentences in the lexicon. A hierarchical structure of verbs-system is constructed in a 'classification table' on the basis of this lexical definition of verbs.

(c) My invention provides exact and systematic 'knowledge representation' if only the nouns and the verbs that are explicitly defined in an 'ideal dictionary' and are registered in a thesaurus and/or in a classification table are used in the sentences used for 'knowledge representation'.

(e) My invention provides exhaustive power of description of the target to be modeled, on the basis of the present 'knowledge representation', because the power of description not only covers a mathematically well-defined equation, a law of Physics, and a subroutine of a computer program, but also covers a sentences that are described linguistically as a special kind of 'function'. In the description of the target to be modeled is essentially linguistic, in which many varieties of verbs and nouns as well as mathematical symbols including '=', '×', '÷', etc. are flexibly used in a systematic manner.

(f) My invention provides an versatile inference mechanism, which can deal with not only mathematically well defined equations, laws of Physics, mathematical lemma, and subroutines of computer programs, but also varieties of linguistic sentences using many varieties of verbs by making full use of a 'thesaurus' and a 'classification table', on the basis of specially contrived 'object-oriented categorical syllogism'. My invention provides precise inference mechanism on the basis of linguistics, if 'subject-word (S)', 'verb (V)', 'complement-word (C)', 'object-word (O)', 'indirect-object-word (I.O)', and/or 'direct-object-word (D.O)', are precisely and explicitly indicated in a sentence used as a 'rule' and/or as a 'fact' in the present object-oriented knowledge base system.

Other objects and advantages are that my invention provides a means for storing data providing the ability of association, which are used as the main basis on which "means for making a list of 'descriptors' ranked in order of hit frequency" and/or "means for making a list of 'names-of-classification-items' ranked in order of hit frequency"

are carried out. These means help a user of the object-oriented database system to find descriptors and/or to find names-of-classification-items to be used to make a query.

Other objects and advantages are that my invention provides a means to prevent a combinatorial explosion during carrying out said means for carrying out a inference, by using not only 'means for narrowing down the target 'descriptors" and 'means for narrowing down the target 'names-of-classification-items", for making a precise retrieval, but also 'means for fusing propositions', in which many numbers of propositions are summarized into a sentence by making use of hierarchical structures of nouns and verbs, making some sacrifice of strictness for preventing the puncture of the processing capacity of the computer system.

Other objects and advantages are that my invention provides a means for making more exhaustive retrieval, by using 'means for broadening out the target 'descriptors" and/or by using 'means for means for broadening out the target 'names-of-classification-items".

Further objects and advantages of my invention will become apparent from a consideration of the drawings and ensuing description.

BRIEF DESCRIPTION OF THE DRAWINGS

FIG. 7 shows some examples what are used as the name of the function in 'means for describing a function used as a rule'.

FIG. 8 shows a recommended constitution of means for storing data providing the ability of association.

FIG. 9 shows a recommended style of reasoning as a 'means for carrying out an inference'.

FIG. 10 shows the aim of each step of opportunistic reasoning.

FIG. 11 shows a recommended constitution of each step of opportunistic reasoning.

FIG. 12 shows a recommended constitution of the rules-for-reasoning used in a step of an opportunistic reasoning.

FIG. 13 shows a recommended constitution of "means for getting 'descriptors' that are used to make a query to get the "candidates of the 'rules-for-reasoning".

FIG. 14 shows a recommended constitution of the "means for getting 'names-of-classification-items' that are used to a make query to get the "candidates of the 'rules-for-reasoning".

FIG. 15 shows a recommended constitution of the procedure of 'retrieval of the candidates of the rules-for-reasoning'.

FIG. 21 shows some examples of 'means for storing knowledge base system'.

FIG. 22 shows examples of a 'digital computing systems' in its strict meaning. But in the present invention, I regard a 'digital computing system' as a kind of a computer.

3. DETAILED DESCRIPTION OF A PREFERRED EMBODIMENT

Figure 1:
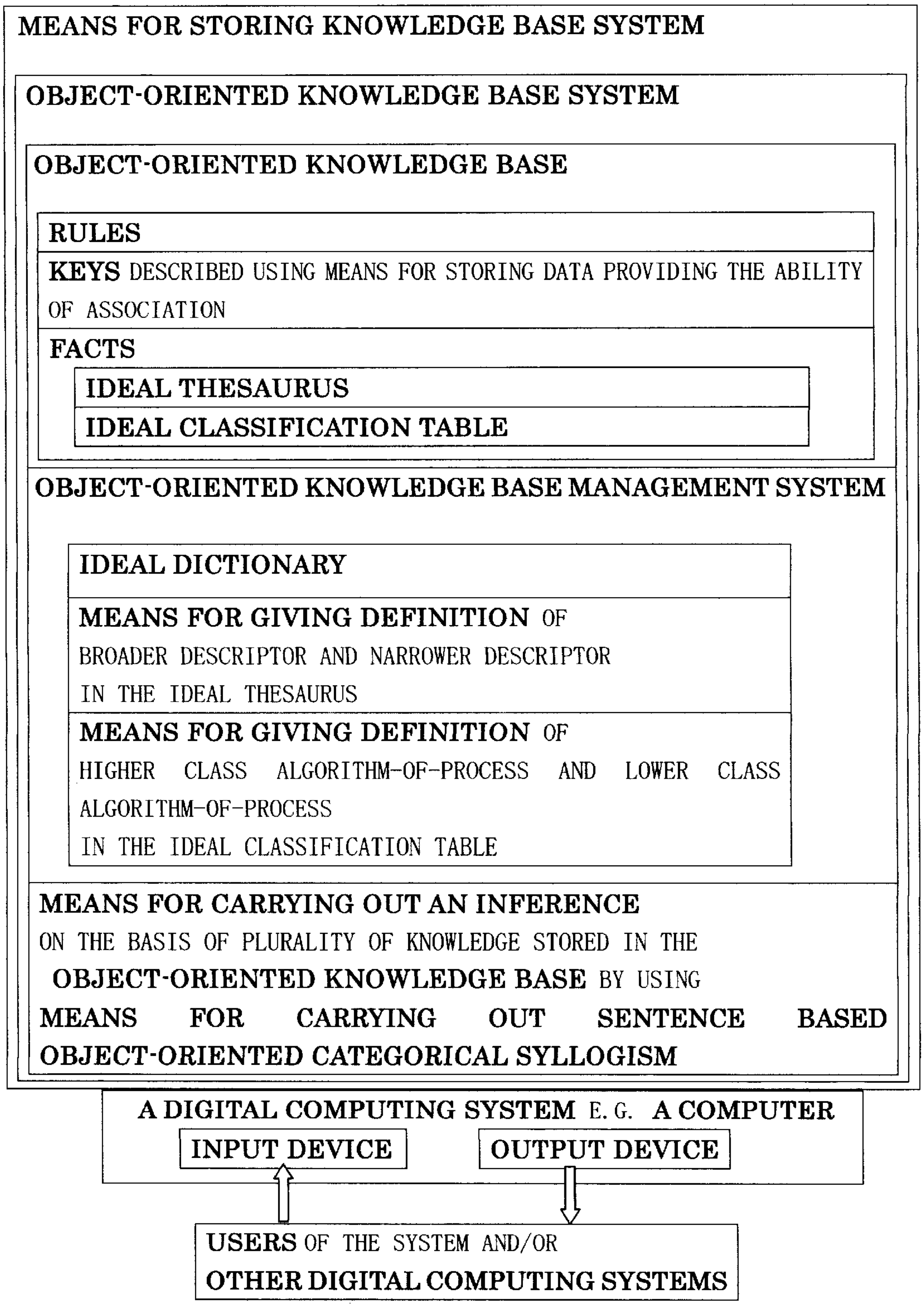
FIG. 1 shows a recommended constitution of an object-oriented knowledge base system whose body of information is stored on a 'means for storing knowledge base system'.

An object-oriented knowledge base systems presented in the present invention has an 'object-oriented knowledge base', which comprises 'rules', data mainly used to providing the ability of association, an 'ideal thesaurus', and an 'ideal classification table' (See FIG. 1). And an object-oriented knowledge base systems presented in the present invention has a tool to construct a hierarchical system of verbs in an 'ideal classification table', on the basis of an 'ideal dictionary', and tool to construct a hierarchical system of nouns in an 'ideal thesaurus', on the basis of an 'ideal dictionary'. And an object-oriented knowledge base systems presented in the present invention has an inference mechanism. The body of information embodying an object-oriented knowledge base systems presented in the present invention, such as computer programs and/or contents of knowledge, are stored in a 'means for storing knowledge base system' (See FIG. 1).

Lexical Definition of 'means for storing knowledge base system'

A solid thing to be used to store the body of information of an object-oriented knowledge base system is a 'means for storing knowledge base system'. For example, a storing media, a memory, and/or an ASIC (Application Specific Integrated Circuit) is a 'means for storing knowledge base system'. The body of information of an object-oriented knowledge base system may be stored in one 'means for storing knowledge base system'. And/or the body of information of an object-oriented knowledge base system may be separated into many different parts, and these parts may be distributed and recorded in plurality of 'means for storing knowledge base system'.

This lexical definition is schematically shown in FIG. 21.

Lexical Definition of a storage media

An article and/or a substance and/or material in which and/or on which information can be stored as a form of them and/or as a state of them, is a storage media. For example, a Hard disk, a Floppy disk, a CD (Compact Disk), a MO (Magnetic Optical Disk), a CDR (CD Recordable), a CDRW (CD Rewritable), and/or a DVD (Digital Versatile Disk), and a memory card is a storage media.

This lexical definition is schematically shown in FIG. 21.

Lexical Definition of memory

If and when a device such as a computer has a part used to store information, then, the part is a memory. For example, a ROM (Read Only Memory), and/or a RAM (Random Access memory), is a memory.

Lexical Definition of record

A user and/or a maker of a database treats and/or processes information uses a record, as a unit of data in a database and/or in a knowledge base.

Lexical Definition of key

One and/or more than two items of words, clauses, and/or sentences etc. which can be suitably used to distinguish and/or to discriminate and/or to characterize a record of a data in a database, is a key.

Forms of knowledge representations (i.e. data structures) used in this knowledge base include, "sentence pattern of association", "sentence pattern of definition of object", "sentence pattern of 'ideal thesaurus'", "sentence pattern of a list of the names of the lexical meanings of a natural word", "sentence pattern of implementation of names of algorithms-of-processes", "sentence pattern of classification", "sentence pattern of physical and/or mathematical rules", "sentence pattern of function", and "sentence pattern of instances of solving problems".

Detailed explanations and lexical definitions of these forms of knowledge representations will be given step by step, afterwards.

Inference mechanisms used in the object-oriented knowledge base systems disclosed in the present invention comprises, @[algorithm of sentence based object-oriented categorical syllogism], @[algorithm of sentence based object-oriented hypothetical syllogism], @[algorithm of making a list of 'descriptors' ranked in order of hit frequency], @[algorithm of making a list of 'names-of-classification-items' ranked in order of hit frequency], @[algorithm of narrowing down the target 'descriptors' and/or target 'names-of-classification-items'] and/or @[algorithm of fusing propositions], and, @[algorithm of broadening out the target 'descriptors' and/or target 'names-of-classification-items'].

Detailed explanations and lexical definitions of these algorithms will be given step by step afterwards.

Here I only mention that these knowledge representations and these inference mechanisms forms a knowledge base system based on a close relation among thesauruses, categories, concepts and dichotomy.

3.1. Measures to Deal with the Problem of Polysemous Words

3.1.1. Problem of Polysemous Words in Object-Oriented Knowledge Base Systems Generally speaking, object-oriented knowledge base systems share many technical issues to be solved with database systems. For example, when a useful database system and/or a useful knowledge base system is to be designed, the 'problem of polysemous words' must be took into consideration; A man has an ability to express one idea in various words. This ability brings about a rich humane ability of speech, but on the other hand, causes omission in the uniformity of the way of expression. Unevenness in usage in words by users of a database system may cause the users to fail in retrieving all the necessary information out of a database system. In other words, if a maker of contents of a database system and a user of the database system express one idea in different words, then, the idea will not be retrieved during the retrieval carried out by the user.

3.1.2. Short Comment on Thesauruses Used in the Present Object-Oriented Knowledge Base System In many database systems, the principal reason why a thesaurus is constructed is to prevent such imperfect retrieval, by storing well-defined key words on the thesaurus in a systematic way. As the result, the description with which one idea is expressed is unified. Roughly speaking, thesaurus used in the present object-oriented knowledge base system is a text in which key words are put into groups with other key words that have similar meanings. In many cases, a key word is defined to represent this 'similar meanings'. This hierarchical structure of key words in a thesaurus helps the user of the present object-oriented knowledge base system to find just the appropriate key word in a systematic way.

Let us assume an example of a thesaurus that contains groups denoted by the key words, 'physics', 'biology', 'chemistry', etc. Then, it is reasonable to use a key word 'science' as the name of the group of the key words. I describe this situation that "'physics', 'biology', 'chemistry', etc. are a narrower key word of 'science'". In other words, 'science' is the broader key word of 'physics', 'biology', 'chemistry', etc. I describe this situation as, "'physics' is a kind of 'science'", and/or "'biology' is a kind of 'science'", and/or "'chemistry' is a kind of 'science'", etc.

Of course, it is also reasonable to registered in the thesaurus several additional key words as narrower key words of each of 'physics', 'biology', 'chemistry', etc. For example, key words such as 'mechanics' and/or 'dynamics' may be regarded as a narrower key word of 'physics'. In other words, key words such as 'mechanics' and/or 'dynamics' may be regarded as a member of the group whose name is 'physics'. Furthermore, in the similar way, key words such as 'Newtonian mechanics' and/or 'quantum mechanics' may be registered in the thesaurus as a narrower descriptor of 'mechanics'. And 'Botany' and/or 'zoology' may be registered in the thesaurus as a narrower descriptor of 'biology'.

This situation is described in a schematic way as,

| | | | |
|---|---|---|---|
| 'science' | 'physics', | 'mechanics' | 'Newtonian mechanics' |
| | | | 'quantum mechanics' |
| | | 'dynamics' | |
| | 'biology', | 'botany' | |
| | | 'zoology' | |
| | 'chemistry' | | |

As is shown in this example, in a thesaurus used in the present object-oriented knowledge base system, a hierarchical structure is given explicitly to the set of key words, on the basis of relations between a broader key word and a narrower key word. In the present invention, lexical definition of these terms 'broader' and 'narrower' will be given later in a formal way on the basis of what I call "sentence pattern of definition of object" (See the "§3.2.1.5. Mathematical foundations for Definition of 'Thesaurus'" of the present invention). And in the present invention, I will give a precise lexical definition of 'idea thesaurus' later in the present invention. I just claim here that a group of nouns in a thesaurus used in an object-oriented knowledge base system disclosed in the present invention is just an example of what I call a 'category' of nouns.

3.1.2.1. 'Ideal Nouns'

Lexical Definition of 'ideal noun'

In most cases, a noun used in a natural language (i.e. a 'natural-noun') is a polysemous noun, and has several lexical meanings. I regard a noun phrase a kind of noun in the present invention. If one uses a noun in an object-oriented knowledge base system disclosed in the present invention, then, it is recommended that he should give a lexical definition of the noun in a dictionary of the system. When a natural polysemous noun is defined in a dictionary of the present object-oriented knowledge base system, it is recommended to give a name to each of its lexical meanings. I call such a name an 'ideal noun', in the sense that the name is ideal from the standpoint of logic. By this lexical definition, of course, an 'ideal noun' has only one lexical meaning.

For example, I will show below a case in which I regard a natural noun 'abuse' as an example of a polysemous noun.

One of the lexical meanings of the polysemous noun 'abuse' is "the use of something in a way that it should not be used" (See LONGMN dictionary of contemporary English). I name this lexical meaning 'abuse [usage]'. That is, 'abuse [usage]'="the use of something in a way that it should not be used". By my definition given just above, 'abuse [usage]' is what I call an 'ideal noun'.

Another lexical meaning of the polysemous noun 'abuse' is "rude or offensive things that someone says to someone else". And I name this lexical definition 'abuse [word]'. That is, 'abuse [word]'="rude or offensive things that someone says to someone else".

By my definition given just above, 'abuse [word]' is another example of what I call an 'ideal noun'.

Still another lexical meaning of the polysemous noun 'abuse' is "cruel or violent treatment, often sexually, especially someone that you should look after". And I name this lexical definition 'abuse [treatment]'. That is, 'abuse [treatment]'="cruel or violent treatment, often sexually, especially someone that you should look after".

By my definition given just above, 'abuse [treatment]' is still another example of what I call an 'ideal noun'.

Here, the word 'ideal' means 'strict from the view point of logic'.

I claim that in ideal cases, one lexical meaning of a polysemous noun equals to 'one set of the particular qualities characterizing a category which is used to represent linguistically an idea; Here, the word idea means 'the idea of image of an 'object''. The detailed explanation of what I call an 'object' will be given in the "§3.2.1.1. Details of My Interpretation of the Meaning of 'Object'" of the present invention. In a word, in ideal cases, an 'ideal noun' is the strict name of an object.

3.1.2.2. 'Ideal Nouns' Used as 'Descriptors'

Lexical Definition of 'descriptor'

A key word listed in an 'thesaurus' of an object-oriented knowledge base system disclosed in the present invention is a 'descriptor'. In most cases, a thesaurus of an object-oriented knowledge base system disclosed in the present invention is used to classify 'ideal nouns' used as key words for the object-oriented knowledge base system disclosed in the present invention. It is recommended that as a 'descriptor', an 'ideal noun' should be used. But an 'ideal noun' is not necessarily a 'descriptor'. That is an 'ideal noun' is judged not to be a 'descriptor' if the 'ideal noun' is not listed in a thesaurus of an object-oriented knowledge base system disclosed in the present invention.

For example, if a sentence like,

'abuse [usage]' is a kind of 'usage', is used in an 'thesaurus' of an object-oriented knowledge base system disclosed in the present invention, to show that 'abuse [usage]' is a narrower key word of 'usage', then both an 'ideal noun', 'abuse [usage]' and an 'ideal noun', 'usage' are regarded as a 'descriptor' in the object-oriented knowledge base system.

Else if an 'ideal noun' 'abuse [usage]' and/or an 'ideal noun', 'usage' is not used in a thesaurus of an object-oriented knowledge base system disclosed in the present invention, then the 'ideal noun', 'abuse [usage]' and/or the 'ideal noun', 'usage' is judged not to be a 'descriptor' in the object-oriented knowledge base system.

3.1.2.3. "Lexical Definitions of 'Ideal Nouns'" Given in 'Ideal Dictionaries'

Before giving the lexical definition of an 'ideal dictionary', let me show here an example of a way in which how a natural polysemous noun, 'abuse', is defined in an 'ideal dictionary'. As I mentioned before, a natural polysemous noun, 'abuse' has three lexical meanings. I give a name to each of these three lexical meanings of the natural polysemous noun'abuse'. These names are 'abuse [word]', 'abuse [usage]', and, 'abuse [treatment]'.

In other words, as I mentioned before, in the present example, these three names are used as an 'ideal noun' denoting a lexical meaning of the natural polysemous noun 'abuse'. In an 'ideal dictionary', first, it is recommended that these three 'ideal nouns' should be listed in a sentence described in what I call a "sentence pattern of a list of the names of the lexical meanings of a natural word". The lexical definition of "sentence pattern of a list of the names of the lexical meanings of a natural word" will be given later in the present invention. But here, I just only show, as an example, a sentence described in "sentence pattern of a list of the names of the lexical meanings of a natural word" for the natural polysemous noun 'abuse' in a simplified form:

__ListOfLexicalMeaningsOf__abuse__—>__ —<<Noun_KW>>_=__ __(abuse [usage])__,__(abuse [word])__,__(abuse [treatment])__.

The complete form of a sentence described in "sentence pattern of a list of the names of the lexical meanings of a natural word" for the natural polysemous word 'abuse' will be shown later in the present invention. According to a lexical definition given later in the present invention, I call a sentence written in "sentence pattern of a list of the names of the lexical meanings of a natural word", a 'means for storing the list of lexical meanings of a natural word'. For detail, see the lexical definition of "sentence that store the list of lexical meanings of a natural word" and the lexical definition of 'means for storing the list of lexical meanings of a natural word', which will be given later in the present invention. In a word, "a key described using 'means for storing the list of lexical meanings of a natural word.'" is one of the components of an 'ideal dictionary' whose constitution is a recommended constitution (See FIG. 6).

It is recommended that an 'ideal dictionary' should have another component. That is, it is recommended that an 'ideal dictionary' should comprise not only "a key described using 'means for storing the list of lexical meanings of a natural word'" but also what I call "keys giving lexical definition of a lexical meaning". (See FIG. 6)

Lexical Definition of a "Key Giving Lexical Definition of a Lexical Meaning"

Figure 6:
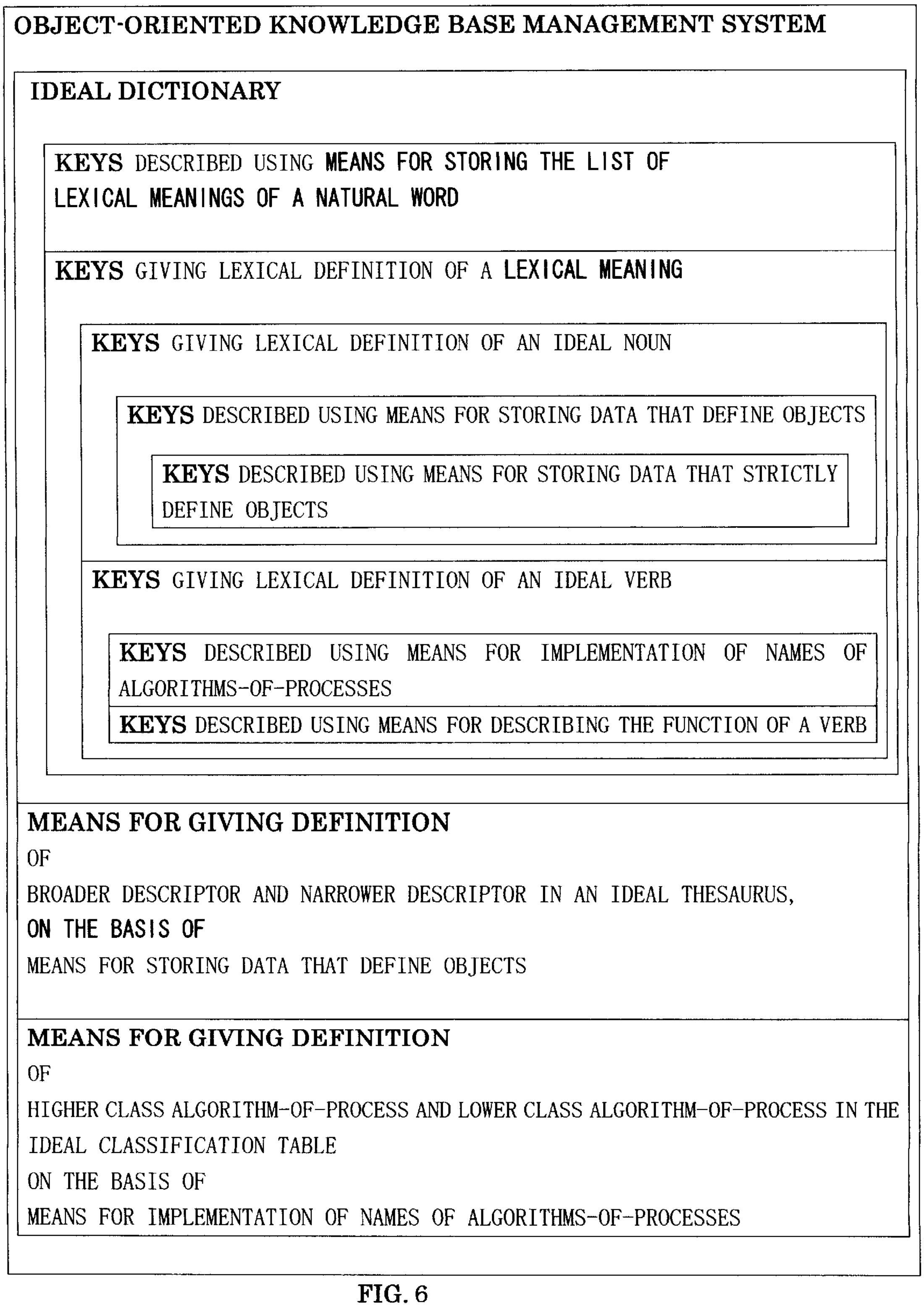
FIG. 6 shows a recommended constitution of an 'object-oriented knowledge base management system'.
Figure 1:
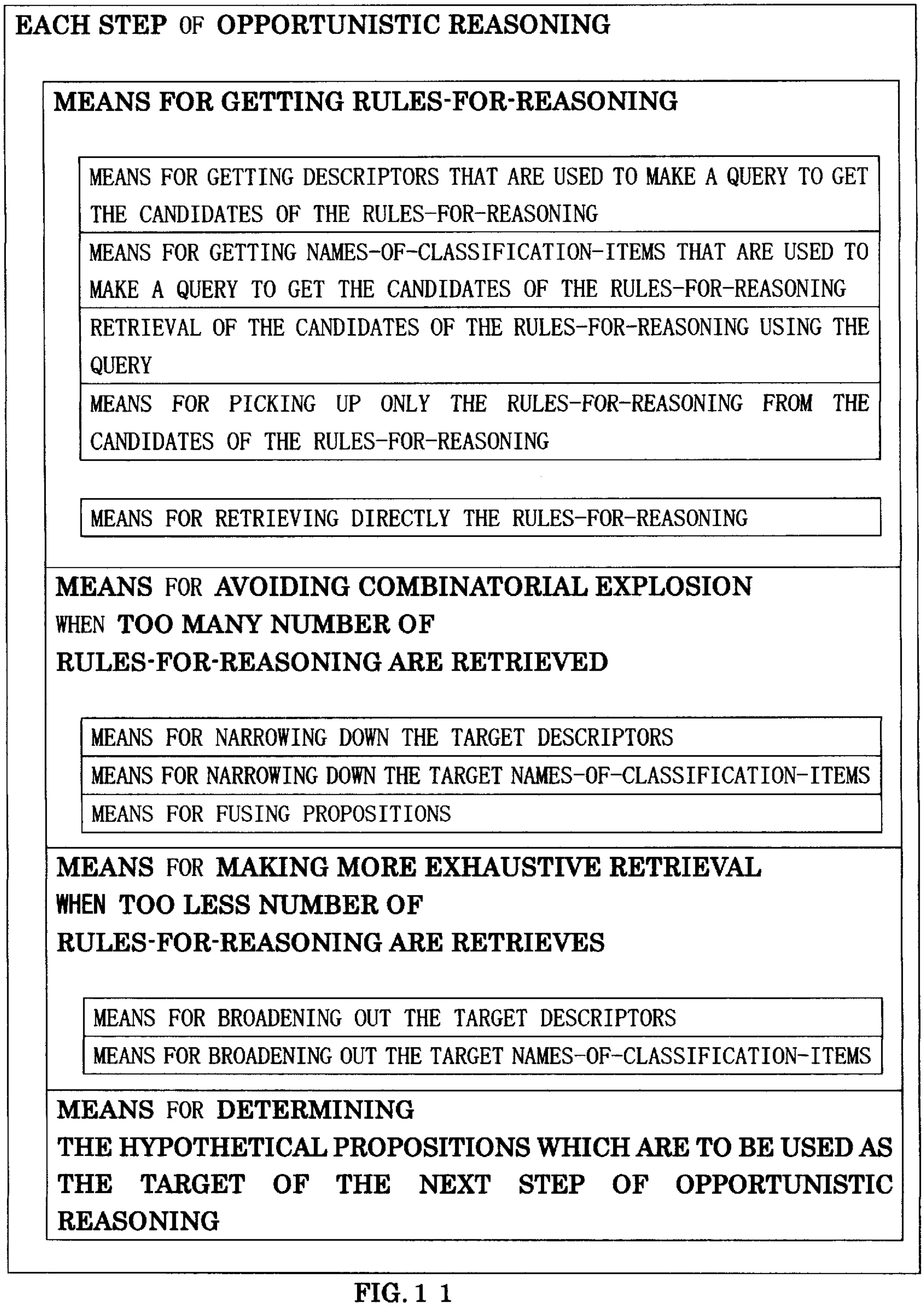

A "key giving lexical definition of an 'ideal noun'" and/or a "key giving lexical definition of an 'ideal verb'" is a "key giving lexical definition of a lexical meaning". This lexical definition is schematically shown in FIG. 6.

The lexical definition of a "key giving lexical definition of an 'ideal noun'" and the lexical definition of a "key giving lexical definition of an 'ideal verb'" will be given later in the present invention. Here, now, first, I will give an example in which the way the lexical definition of the 'ideal noun', 'abuse' is given.

As the lexical meaning of an 'ideal noun', for example, 'abuse ⟦word⟧', in some dictionaries such as ⊙"Longman Dictionary of Contemporary English", sentence like "Abuse ⟦word⟧ is an offensive word, which often upsets people", is used. In the present invention, I analyze this lexical meaning into three sentences, 1) 'Abuse ⟦word⟧' is a kind of word.

2) Ethical nature of 'abuse ⟦word⟧' is judged to be and/or is felt to be vicious.

3) 'Abuse ⟦word⟧' makes people upset.

What I call here 'ethics' exclusively means a rule to get out of the dilemma between public benefit and individual benefit. Definition of the special meaning of 'ethics' used here is given mathematically on the basis of the game theory. See for example, ⊙"PRISONER'S DILEMMA"(§ of "prisoner's dilemma which appear in literatures").

By my definition that will be given later in the present invention, "sentence 1)" is an example of a "sentence that stores data of ideal thesaurus". It is recommended that in an 'ideal dictionary', the "sentence 1)" should be formalized by paraphrasing the "sentence 1)" into a sentence described in what I call "sentence pattern of 'ideal thesaurus'". The lexical definition of "sentence pattern of 'ideal thesaurus'" will be given later in the present invention. Here, I just only show, as an example, a sentence described in "sentence pattern of 'ideal thesaurus'" for "sentence 1)" in a simplified way:

__NT___(abuse ⟦word⟧)___is_a_kind_of_BT___(word)_.

The complete form of a sentence described in "sentence pattern of 'ideal thesaurus'" for "sentence 1)" will be shown later in the present invention. According to my lexical definition given later in the present invention, a "sentence that stores data of ideal thesaurus" is called a 'means for storing data of ideal thesaurus'. In an object-oriented knowledge base system, however, 'means for storing data of ideal thesaurus' is not necessarily an indispensable component of an 'ideal dictionary', because, an 'ideal thesaurus' almost always contains 'means for storing data of ideal thesaurus'. Therefore, in the 'ideal thesaurus' schematically shown in FIG. 6, the component, "keys described using 'means for storing data of ideal thesaurus', is omitted.

I regard the "sentence 2)" and the "sentence 3)" as sentences which describes the definition of the 'ideal noun', 'abuse ⟦word⟧', in an object-oriented style. Details of my interpretation of the meaning of 'object' will be shown later in Section "§3.2.1.1. Details of My Interpretation of the Meaning of 'Object'". By my definition given later in the present invention, "sentence 2)" and "sentence 3)" is what I call a "sentence that stores data that define object". According to my definition given later in the present invention, a "sentence that stores data that define object" is a 'means for storing data that define objects'. In general, it is recommended that "keys described using 'means for storing data that define objects'" should be used as a "key giving lexical definition of an 'ideal noun'" in an object-oriented knowledgebase system disclosed in the present invention. This is schematically shown in FIG. 6. More specifically, it is recommended in an object-oriented knowledge base system, that "keys described using 'means for storing data that strictly define objects'" should be used as a "key giving lexical definition of an 'ideal noun'". The lexical definition of 'means for storing data that strictly define objects' will be given later in the present invention. This is also schematically shown in FIG. 6. But I will show here now, how these "sentence 2)" and "sentence 3)" are described using a sentence in what I call a "sentence pattern of definition of object":

__OBJECT___(abuse ⟦word⟧)_have_VARIABLES ethical nature which_is judged and/or is felt to be vicious, and __OBJECT___(abuse ⟦word⟧)___have_FUNCTION_to upset people.

About this issue, a detailed discussion will be given later in the present invention. A similar discussion made thus far for 'abuse ⟦word⟧', can also be given to 'abuse ⟦usage⟧', and, 'abuse ⟦treatment⟧'.

Roughly speaking, I claim that a polysemous 'natural-noun' corresponds to what I call a 'concept', and each lexical meaning of the polysemous 'natural-noun' corresponds to a 'category'. Therefore, here, an 'ideal noun' is the name of a 'category'.

I claim that in ideal cases, 'an object' corresponds to 'a category'. Speaking more precisely, in other words, in ideal cases, I regard an 'ideal noun' as the name of an 'object'. From my definition given above, in ideal cases, I regard a 'descriptor' is also the name of an 'object'.

Lexical Definition of a "Key Giving Lexical Definition of an 'Ideal Noun'"

A "key giving lexical definition of an 'ideal noun'" is a sentence which gives lexical definition of an 'ideal noun'. It is recommended that a "key described using 'means for storing data that strictly define objects'" should be used as a "key giving lexical definition of an 'ideal noun'" in an object-oriented knowledge base system disclosed in the present invention.

This lexical definition is schematically shown in FIG. 6.

The lexical definition of 'means for storing data that strictly define objects' will be given later in the present invention.

Lexical Definition of an 'ideal dictionary' (Part 1: about lexical definition of 'ideal nouns')

An 'ideal dictionary' is a kind of dictionary. When the lexical meaning of an 'ideal noun' is given in an 'ideal dictionary', then, it is recommended that a 'means for storing data that define objects' should be used.

An 'ideal dictionary' is usually used in an object-oriented knowledge base system disclosed in the present invention.

It is recommended that in an 'ideal dictionary', 'the content' of 'each of the lexical meanings of a 'natural-noun'' (i.e. 'the content' of 'one set of the particular qualities characterizing a category' which is used to represent linguistically 'an idea of image of some object') should be explained in sentences in what I call a "sentence pattern of definition of object". And/or in some cases, as mentioned just before, sentences in what I call "sentence pattern of 'ideal thesaurus'" may be used as 'the content' of 'each of the lexical meanings of a 'natural-noun'' when the object-oriented knowledge base system disclosed in the present invention is small. About the lexical definition of "sentence pattern of definition of object" will be given later in the present invention. The lexical definition of "sentence pattern of 'ideal thesaurus'" will be given later in the present invention.

Remember that it is recommended that the information about the list of the 'ideal nouns' corresponding to the lexical meanings of a natural polysemous noun, should be described in a sentence. And it is further recommended that the sentence should be described in what I call "sentence pattern of a list of the names of the lexical meanings of a natural word", which is a special pattern of a sentence written according to the English grammar. Such a sentence may be included in an 'ideal dictionary' when the object-oriented knowledge base system is small. When the object-oriented knowledge base system is large, only the pointer to the sentence should be recorded in an 'ideal dictionary', See the discussion given later in the present invention about the lexical definition of "sentence pattern of a list of the names of the lexical meanings of a natural word". Now let me describe the same thing in a more formal way; According to my lexical definition given later in the present invention, a sentence described in "sentence pattern of 'ideal thesaurus'" is called a 'means for storing data of ideal thesaurus in a formal way'. But as mentioned just above, 'means for storing data of ideal thesaurus in a formal way' is not an essential part of an 'ideal dictionary', because the same information is usually stored in an 'ideal thesaurus' (See FIG. 2). It should be noted that the description in an 'ideal dictionary' and an 'ideal thesaurus' should be consistent. One of the best way of keeping such consistency when the system is very large, is to eliminate all the sentences described in "sentence pattern of 'ideal thesaurus'" from an 'ideal dictionary', when the object-oriented knowledge base system disclosed in the present invention is very large. Only the pointers to the sentences described in "sentence pattern of 'ideal thesaurus'" from an 'ideal dictionary' should be recorded in an 'ideal dictionary' when the system is large.

Of course, other media than characters and/or letters in a text, for example, such as pictures, photos, sounds, and/or other multimedia may be used as an accessory of an 'ideal dictionary'.

The way in which the lexical definition of an 'ideal verbs' in an 'ideal dictionary' will be described later in the present invention.

3.1.2.4. 'Ideal Thesaurus'

In most of contemporary thesauruses used for on-line database systems, basically, only descriptors are registered systematically, and a hierarchical structure of descriptors are stored in such a thesaurus. However, in some of the book of thesauruses which are available at a book shop, (e.g. ◎"Roget's International thesaurus fourth edition", ◎"Roget's International thesaurus fifth edition"), on the other hand, not only descriptors, but also natural words are listed (Strictly speaking, no distinction between natural words and descriptors are not made in the two books). From my analytical point of view disclosed in the present invention, I claim that a user of such a book of thesaurus can track the hierarchical structure defined among categories (i.e., among what I call 'descriptors' in the present invention) from top to bottom, and at last, he will find a natural word (i.e., what I call a concept in the present invention). I claim that ◎"Roget's International thesaurus fourth edition" and/or ◎"Roget's International thesaurus fifth edition" can be regarded basically as a book to consult natural words (i.e., concepts) from user's ideas (i.e., categories). As a matter of fact, ◎"Roget's International thesaurus fourth edition" and/or ◎"Roget's International thesaurus fifth edition" stores not only words but also categories.

On the other hand, what I call an 'ideal thesaurus' contains only 'descriptors'. And, natural nouns are usually not an indispensable component of an 'ideal thesaurus'.

Lexical Definition of an 'ideal thesaurus'

An 'ideal thesaurus' is a thesaurus in which 'ideal nouns' are registered. It is recommended that in an 'ideal thesaurus', no polysemous nouns should be registered. In an 'ideal thesaurus', it is recommended that a sentence in which an 'ideal noun' is registered should be described in what I call "sentence pattern of 'ideal thesaurus'".

The lexical definition of "sentence pattern of 'ideal thesaurus'" will be given later in the present invention. I show here just an example:

For an example, if and when a sentence stored in an 'ideal thesaurus' which means that "abuse 【usage】 is the narrow term of use 【usage】", and/or that "abuse 【usage】 is a kind of use 【usage】", is described in a formal way using what I call "sentence pattern of 'ideal thesaurus'", then, the sentence is described as, _NT_ _(abuse 【usage】)_ _is_a_kind_of_ BT_ _(use 【usage】)_.

Lexical Definition of "Sentences that Store Data of Ideal Thesaurus"

A "sentences that store data of ideal thesaurus" is a sentence used in an 'ideal thesaurus'. I call a sentence whose form is, "'*' is the narrow term of ''", where '*' and '****' are 'descriptors', and/or its equivalents a "sentences that store data of ideal thesaurus".

By definition given later in the present invention, a sentence described in "sentence pattern of 'ideal thesaurus'" is a "sentence that stores data of ideal thesaurus".

Lexical Definition of Means for Storing Data of Ideal Thesaurus

"Sentence which stores data of ideal thesaurus" and/or something that stores the information of it, is a means for storing data of ideal thesaurus.

"Sentences that store data of ideal thesaurus" is used to describe a 'fact' used in an 'object-oriented knowledge base' disclosed in the present invention. See FIG. 1 shows schematically the relation between a 'fact' and an 'object-oriented knowledge base'.

Figure 2:
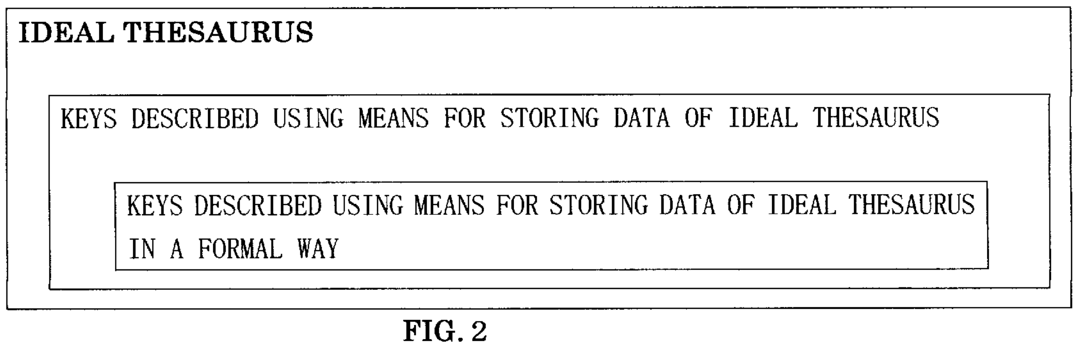
FIG. 2 shows a recommended constitution of an ideal thesaurus.

See FIG. 2 which shows schematically this issue and other issues related to this issue.

Therefore, of course, unlike with the ◎"Roget's international thesaurus fourth edition" and/or ◎"Roget's international thesaurus fifth edition", information about the relation between natural words and 'descriptors' can not be found in my 'ideal thesaurus'. As a result, of course, basically, not only an 'ideal thesaurus' but also a set of data which tells the information about the relation between 'descriptors' and natural words is necessary, for a user of an object-oriented knowledge base system disclosed in the present invention, to transform his concepts (i.e. natural words) into 'descriptors'.

As most of the natural words are polysemous, context comprising more than two natural words instead of a single natural word, are necessary to specify the meaning of the natural word. As a context comprises more than two natural words, more than two descriptors correspond to a context, in many cases. Therefore, in most cases, a data which contains context comprising more than two natural words and more than two descriptors corresponding to the context is necessary to describe the relation between 'descriptors' and natural words. As will be explained later, I regard such data as a kind of data providing the ability of association. For example, a lexical meaning of a polysemous noun ‘bark’ is definite in a context “bark of a dog”, and another lexical meaning of the polysemous noun ‘bark’ is definite in a context of “a bark of a tree”. The lexical definition of “sentences that store data providing the ability of association” will be given later in the present invention. Here I just give an example: The sentence, “The word ‘bark’ in the context “bark of a dog” means_ (bark 【sound】)_, and the word ‘dog’ in the same context means_(dog 【animal】)_.”

is an example of a “sentence that stores data providing the ability of association”.

In the present invention, I recommend that a “sentence which stores data providing the ability of association” should be recorded as a sentences described in what I call “sentence pattern of association”. The lexical definition of “sentence pattern of association” will be given later in the present invention. Basically, as will be described later, in ideal cases, in a sentence described in “sentence pattern of association”, it is recommended that all the ‘descriptors’ that are associated with the context of natural words should be listed. Here I just give a simplified example: The sentence, “Association_‘bark of a dog’_—>___<<Noun_ KW>>_=___(bark 【sound】)_,_(dog【animal】)_” is a sentence described in “sentence pattern of association” in a simplified form. The complete form will be shown later in the present invention.

3.1.3. Short Comment on ‘Classification Table’

In ◎“Roget’s international thesaurus fourth edition” and/or in ◎“Roget’s international thesaurus fifth edition”, not only ‘natural-nouns’ but also ‘natural-verbs’ as well as categories are listed. In an ‘ideal thesaurus’ of an object-oriented knowledge base system disclosed in the present invention, however, basically only ‘ideal nouns’ and/or ‘ideal noun phrases’ are listed as ‘descriptors’. In the present invention, verbs and/or verb phrases are recommended to be listed and classified systematically as an entry of what I call ‘classification table’. Thus, a ‘name-of-classification-item’, which is an entry of a ‘classification table’ used in an ‘object-oriented knowledge base’ disclosed in the present invention, is basically a verb and/or a verb phrase.

The lexical definition of ‘classification table’ will be given later in the present invention. Here I show just an example: An example of such a ‘classification table’ comprising ‘names-of-classification-items’ is shown in Formula. 6. A ‘classification table’ in Formula. 6, is designed to be used as a table of contents for a manual used as a guide of how to use an ideal Japanese word processor. This ‘classification table’ contains verb phrases used as a ‘name-of-classification-item’ such as ‘to input half-sized alphanumeric characters’, ‘to convert half-sized alphanumeric characters to hiragana characters in order to input hiragana characters’, ‘to convert half-sized alphanumeric characters to kanji characters in order to input kanji characters’, ‘to make a specification of the number of characters in a line’, ‘to make a specification of the number of lines in a page’, and, ‘to make a printer print a document on a paper’, etc.

These verb phrases are grouped and/or classified in a systematic way in the ‘classification table’.

Figure 23:
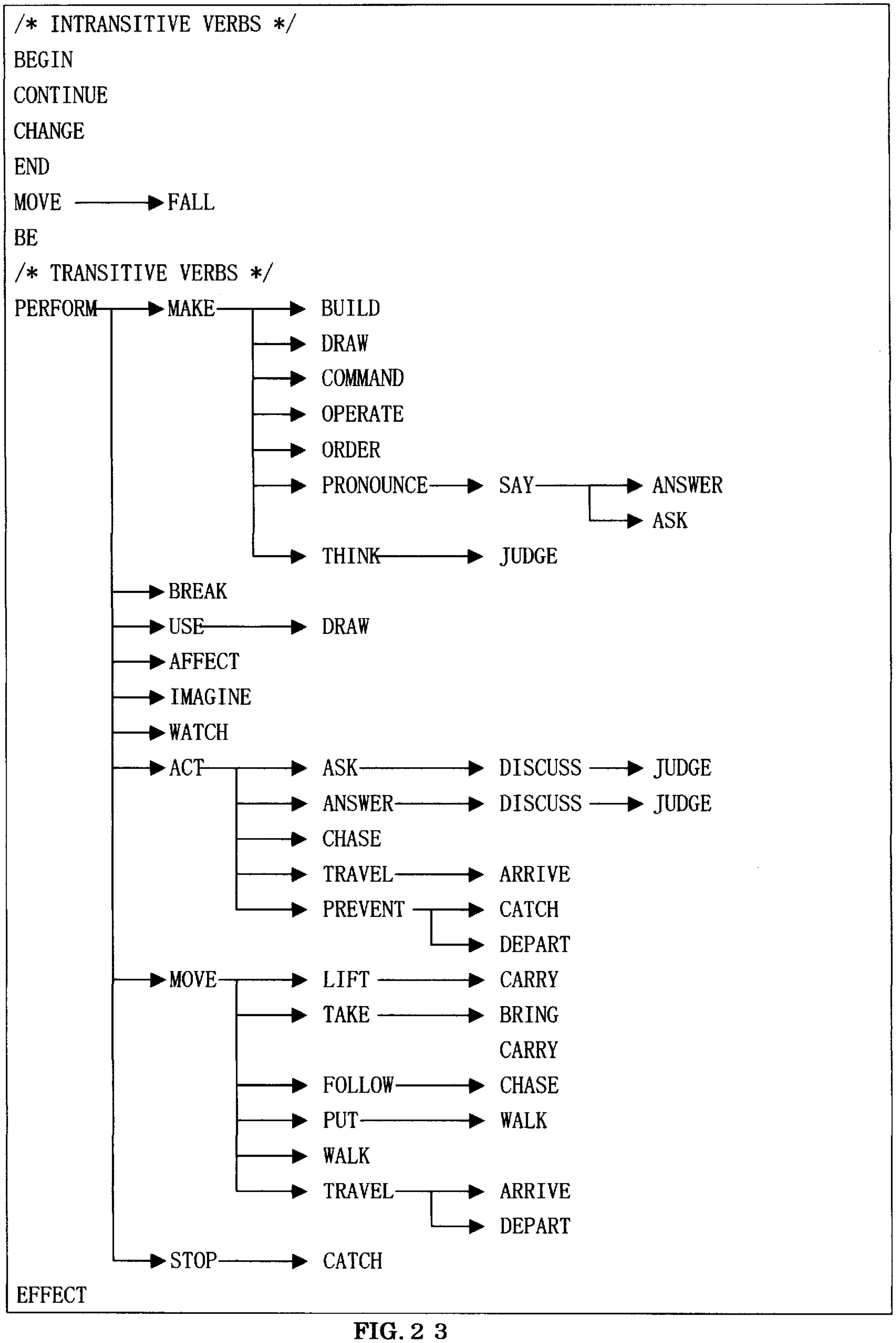
FIG. 23 shows a classification table of some intransitive verbs and some transitive verbs.

Another example of an ‘classification table’ is shown in FIG. 23, in which dozens of verbs are classified in a systematic way. Detailed explanation of FIG. 23 will be given later in the present invention.

3.1.3.1. ‘Ideal verbs’

Lexical Definition of an ‘ideal verb’ and a ‘natural-verb’

In most cases, a verb used in a natural language (i.e. a ‘natural-verb’) is a polysemous verb and has several lexical meanings. I regard a verb phrase and/or a verb phrase a kind of verb in the present invention. If one uses a verb in an object-oriented knowledge base system disclosed in the present invention, then, it is recommended that a lexical definition of the verb should be given in an ‘ideal dictionary’ of the system. If and when a natural polysemous verb is defined in an ‘ideal dictionary’ of the system, then, it is recommended that a name should be given to each of its lexical meanings. I call such a name an ‘ideal verb’. By my definition, of course, an ‘ideal verb’ has only one lexical meaning.

It should be noted that many words used in English, including the word ‘abuse’ is used both as a noun and as a verb. For example, I have given an example in which I regard ‘abuse’ as a ‘natural-noun’ in the present invention, but I will show just below in the present invention, also a case in which I regard ‘abuse’ as a ‘natural-verb’. The ‘natural-verb’, ‘abuse’ is a polysemous verb.

One of the lexical meanings of the polysemous verb ‘abuse’ is “to deliberately use something such as power or authority, for the wrong purpose”. (See LONGMN dictionary of contemporary English) I name this lexical meaning ‘abuse 【use】’. That is, ‘abuse 【use】’=“to deliberately use something such as power or authority, for the wrong purpose”.

By my definition, ‘abuse 【use】’ is what I call an ‘ideal verb’.

Another lexical meaning of the polysemous verb ‘abuse’ is “to say rude or offensive things to someone”. And I name this lexical definition ‘abuse 【say】’. That is, ‘abuse 【say】’=“to say rude or offensive things to someone”.

By my definition, ‘abuse 【say】’ is another example of what I call an ‘ideal verb’.

Here also, the word ‘ideal’ means ‘strict from the view point of logic’.

Lexical Definition of ‘ideal verb phrase’

I call a sentence and/or a phrase including a word used as an ‘ideal verb’, an ‘ideal verb phrase’. I regard an ‘ideal verb phrase’ is a kind of an ‘ideal verb’.

3.1.3.2. ‘Ideal Verbs’ Used as ‘Names-of-Classification-Items’

Lexical Definition of a ‘name-of-classification-item’

The name of an item listed in a ‘classification table’, is a ‘name-of-classification-item’. It is recommended that, a ‘classification table’ disclosed in the present invention should be used to store the information about the classification of ‘ideal verbs’ and/or of ‘ideal verb phrases’ used in an object-oriented knowledge base system disclosed in the present invention. Therefore, in most cases, a 'name-of-classification-item' is an 'ideal verb' and/or an 'ideal verb phrase' used in the system.

5 3.1.3.3. 'Ideal Verbs' Used as the Names of an 'Algorithm-of-Process' and a Sentence Described in "Sentence Pattern of Implementation of Names of Algorithms-of-Processes"

Lexical Definition of 'Process'

A description of a 'process' consists of a set of sentences and conjunctions arranged in a fixed order so that to give a procedure having a function to cause a particular result from a particular initial situation under a particular condition.

A sentence described in a natural language, an equation in mathematics, and/or, a function in computer programming languages may be used as such a sentence.

Sentences in natural languages that may be used as such a sentence is classified as follows:

/*sentences describing situation*/

(1) describes the way in which something and/or someone begins to be in a state, (2) describes the state in which something and/or someone exists, (3) describes the way in which state of something and/or someone ends, (4) describes the way state of something and/or state of mind of someone changes in an event, (4-1) describes the way some conditions affects state of something and/or state of mind of someone, (4-2) describes the way some behavior effects state of something and/or state of mind of someone, and /*sentences describing actions and/or reactions*/

/*(describing the way something and/or someone reacts to a situation and/or

*describes the way something and/or someone acts to change a situation).

*/

(5) describes the way someone imagines an ideal situation in his mind, (6) describes the way something and/or someone watches the situation, (7) describes the way someone makes an aim, (8) describes the way someone discusses with others, (9) describes the way someone thinks of a strategy and/or a procedure, 10) describes the way something and/or someone feels something and/or feels some event which happens,

(11) describes the way some emotion wells up and/or grows up and/or fades inside someone and/or inside something,

(12) describes the way something and/or someone behaves, (12-1) describes the way someone commands, (12-2) describes the way someone orders, (12-3) describes the way someone controls, (12-4) describes the way someone dose it himself, (12-4-1) describes the way something operates according to the procedure, (12-4-2) describes the way someone follows his own mind and/or someone else's mind,

(13) describes the way someone judges whether to continue and/or to abandon,

(14) describes the way someone reconsiders,

(15) describes the way someone has effect,

(16) describes the way someone fails to have effect,

(17) describes the way someone brings the procedure naught,

(18) Ban-zai, Gyoku-sai. (an Honorable death.)

/*sentences describing the way something and/or someone experience a series of events

*and/or various conditions.

*/ etc. etc.

Many other complex and complicated processes can be described by composing sentences using items of the classification listed above.

For example, how a scientific work is done can be described as follows;

First, a scientist 7) tries to intend the aim of his investigation. And then, a scientist 6) watches the state in which something 2) exists and/or 6) the scientist watches the 4-1) the way some conditions affects an event and/or 6) watches 4-2) way his action effects an event after 9) thinking of a strategy and/or a procedure for the action, under a well defined conditions; that is, a scientist experiments. Scientists 14) reconsider whether a knowledge of phenomena is right or wrong, by 6) watching right the result of the experiments, by 8) discussing with others scientists, and/or by 9) think and reasoning right. If the experiment fails, then, the scientist 13) judges right whether he should continues the investigation or not. If continue, the scientist 14) reconsiders right the cause of failure, and plans the next experiment. The aim of the scientists includes to 4) describes the way state of something and/or state of mind of someone changes as an event, and to 2) describes the state in which something and/or someone exists.

Lexical Definition of 'algorithm-of-process'

In the present invention, in ideal cases, an 'algorithm-of-process' is a procedure, which describes the way to give a process to get a particular result from a particular initial situation any time in any condition; that is, the 'algorithm-of-process' provides, at any time in any condition, a 'process' which gives the particular result from the particular initial situation.

In the contents of the 'algorithm-of-process', sentences and special conjunctions, such as 'if', 'while', 'goto', are categorized and arranged in a special manner so that, under the control of a computer and/or of someone, the 'process' is assembled under the control of a previously established rule and a universal grammar, by linking one sentence after another sequentially to form a chain of sentences, in some condition during the control, by choosing a proper group of sentences and link it to the foregoing series of the sentences, according to the state in which a condition is during the control, and/or, by choosing the same group of sentences repeatedly and link them to the foregoing series of the sentences while the state is kept in a specified condition during the control, etc. etc.

By definition, an algorithm is a kind of an 'algorithm-of-process'.

By definition, functions and/or operators used in C language including 'assignment operator', '=', are as it is an 'algorithm-of-process'. And a computer program described in C language composed by combining such functions and/or operators is also an 'algorithm-of-process'.

Lexical Definition of "Sentence Pattern of Implementation of Names of Algorithms-of-Processes"

"Sentence pattern of implementation of names of algorithms-of-processes" is a pattern of a sentence which is to be used to implement the name of an 'algorithms-of-processes'.

In the present invention, it is recommended that a quasi-C code describing the procedure of an 'algorithm-of-process' should be used as the body of the 'algorithms-of-processes' in a sentence described in "sentence pattern of implementation of names of algorithms-of-processes".

In a sentence described in "sentence pattern of implementation of names of algorithms-of-processes", formalism including following descriptions are used;

1) At the top of the sentence in "sentence pattern of implementation of names of algorithms-of-processes", __ALGORITHM__is put.
2) After the __ALGORITHM__, the name of the 'algorithms-of-process' is recommended to be described
3) '{' is used to show the starting point of the body of the 'algorithms-of-processes'.
4) '}' is used to show the ending point of a chain of sentences.
5) ';__' is used to show the end of a sentence.
6) 'if(){}' is used to show a group of sentences, '', is chosen and is linked the foregoing series of the sentences, if the specified condition, '', is satisfied.
7) 'while(*){*}' is used to show a group of sentences, '', which I call a 'loop body', are chosen repeatedly and are linked to the foregoing series of the sentences, while the specific condition, '*' is satisfied.
8) At the end of the sentence described in "sentence pattern of implementation of names of algorithms-of-processes", '}' should be described to show the ending point of the body of the 'algorithms-of-processes'.

For example, when the name of an 'algorithm-of-process', '**' is implemented by linking the name of an sub-'algorithms-of-process', '', and the name of an sub-'algorithms-of-process', '*', sequentially, then, the sentence in the "sentence pattern of implementation of names of algorithms-of-processes" describing '**' is given by a simple quasi-C code, as,

__ALGORITHM__**{;__*;__}, where,  is the name of an 'algorithm-of-process' to be implemented. And, either '' and/or '*' represents the name of an 'algorithm-of-process' used as a subroutine describing each step. The body of the 'algorithm-of-process' is "{;__***;__}".

The process assembled on the basis of this sentence described in "sentence pattern of implementation of names of algorithms-of-processes", is always,

**=;__*;__, regardless of the condition, because either 'if' and/or 'while', etc. is not used in the body of the 'algorithm-of-process' in the sentence in the "sentence pattern of implementation of names of algorithms-of-processes". Note that by my definition, sub-'algorithms-of-process' is a special kind of 'algorithm-of-process'. On the other hand, for example, if the name of an 'algorithm-of-process', '*', is implemented by a sentence described in the "sentence pattern of implementation of names of algorithms-of-processes", __ALGORITHM__*{;__if(today is Tuesday) {*;__}***;__}, then, the process assembled on the basis of this sentence described in "sentence pattern of implementation of names of algorithms-of-processes", is

***=;__*;__***;__, if today is Tuesday, and is

***=;__*****;__, if today is not Tuesday.

For another example, 'Euclidean algorithm' is the name of an 'algorithm-of-process' to obtain the greatest common divisor of two positive integers.

And as still another example, 'water diet' (◎"EARL MINDEL'S Vitamin Bible" p.344) is the name of an 'algorithm-of-process' to lose weight by drinking eight cups of water a day;__ while having all-protein meals;__.

Note that sentence described in "sentence pattern of implementation of names of algorithms-of-processes" for 'water diet' is

```
'water diet'
{
    while('water diet'is continued)
    {
        drinking eight cups of water a day ;__
        having all-protein meals ;__
    }
}.
```

Note that, here,

'water diet' is the name of the 'algorithms-of-processes', and

```
"{
    while('water diet' is continued)
    {
        drinking eight cups of water a day ;__
        having all-protein meals ;__
    }
}"
```

is the body of the 'algorithms-of-processes'.

Lexical Definition of 'Means for Implementation of Names of Algorithms-of-Processes'

Sentence in "sentence pattern of implementation of names of algorithms-of-processes" and/or something that stores the information of it, is a 'means for implementation of names of algorithms-of-processes'.

Thus, the word 'algorithm-of-process' is used in a very wide meaning not only including strictly defined mathematical algorithm but also including widely defined ones in the present invention. I claim in the present invention that most verbs in natural languages are closely correlated to processes; detailed explanation of this issue will be described later in the present invention, but I give just below a simple explanation by using some examples.

According to the ◎"Longman dictionary of contemporary English", a verb is a word and/or group of words that is used to describe an action, experience, and/or state. In a word, many of the verbs describe an action. On the other hand, an action is the process of doing in order to deal with a problem and/or difficult situation. In a word, an action is a kind of process. Therefore, in a word, many verbs and/or verb phrases denote a process.

For example, 'to propose to a girl' is a sub-'algorithm-of-process'; this sub-'algorithm-of-process' is a part of the total-'algorithm-of-process' acted by a guy to get married with a girl. As I regard a sub-'algorithm-of-process' as well as a main-'algorithm-of-process' is a kind of 'algorithm-of-process'.

By the way, it is clear that if a guy wants to 'propose to a girl', then, it is necessary for him 'to make decision';_, and, 'to contact with a girl';_.

What I claim here is that both 'to make decision' and 'to contact with a girl' are a sub-'algorithm-of-process' which are a part of the total-'algorithm-of-process', i.e. 'to propose to a girl'. In other words, strictly speaking, I regard the verb phrase, 'propose to a girl', as the name of the total-'algorithm-of-process' implemented by the two sub-'algorithm-of-processes'. Note that the sentence described in "sentence pattern of implementation of names of algorithms-of-processes" for 'propose to a girl' is,

```
'propose to a girl'
{
    'to make decision' ;_
    'to contact with a girl' ;_
}.
```

Here,

'propose to a girl' is the name of the 'algorithms-of-processes', and

```
"{
    'to make decision' ;_
    'to contact with a girl' ;_
}",
```

is the body of the 'algorithm-of-process'.

It will be shown later in the present invention that it is not always necessary to describe in detail how the guy made a decision, and/or how the guy contacted a girl, to implement a verb phrase 'A guy proposes to a girl'. That is, it is no importance whether a guy used a automobile to meet the girl when he contacted the girl and/or the guy used a bicycle to meet the girl when he contacted her, to judge whether the guy proposed to the girl or not.

At the first place, little guy knows the detailed process by which he is charmed by a girl. The only thing that he knows is that before he is charmed by a girl, he is not attracted by the girl, and after he is charmed by the girl, he is attracted by the girl. He knows only the input and outcome of the process 'being charmed by a girl' when he knows that the girl charms him. In this sense, 'being charmed by a girl' is a black box to the guy. Only the input and the output of the black box are visible to the guy. Love is blind.

In the same sense, 'to make decision' and/or 'to contact with a girl' may remain as a black box when the verb phrase 'to propose to a girl' is to be lexically defined.

As will be shown in the present invention, an object-oriented knowledge base system disclosed in the present invention can reason using a proposition "A guy proposes to a girl", only if the lexical definition of the words used in the proposition are given. The detailed mathematical definition is not necessarily a indispensable element. I regard a proposition a kind of a verb phrase. That is, my object-oriented knowledge base system can reason using a proposition even when a lexical definition of a word used in it remains a black box and the detailed mathematical definition of the word is not given. That a black box may remain in a 'knowledge' is an important point to tell my 'algorithm-of-process' from conventional and mathematical 'algorithm'. The tool disclosed in the present invention to make such reasoning is what I call @[algorithm of sentence based object-oriented categorical syllogism]. The lexical definition of @[algorithm of sentence based object-oriented categorical syllogism] will be given later in the present invention.

3.1.3.3.1. C-Language-Like Way of Description of English Sentence by Using "Sentence Pattern of Implementation of Names of Algorithms-of-Processes"

I claim in this invention that in ideal cases, a verb in a natural language can be regarded as a name of an 'algorithm-of-process'. It is well known that, in most cases, a mathematical algorithm can be described and/or outlined by using a quasi-C code. About the detail of quasi-C code, see §3 of ⓒ"C gengo puroguramingu".

Let me show here now just an example of a quasi-C code; Let us assume that the acceptance borderline of an examination for students of a school is at the score, of 60. The quasi-C code, "If the score of a student is greater than 60, print 'Pass'."

prints the character 'Pass' when the condition "the score of a student is greater than 60" is the truth for a student. When this condition is true, then the printer prints 'Pass'.

If this sentence is translated into a sentence written in C language, which is a kind of computer programming language, one gets

```
if( grade >= 60 )
{
    printf("Pass");
}
```

Lexical Definition of a Quasi-C Code

A quasi-C code is an artificial language written down using a natural language, such as, say, English, Japanese, Chinese, and/or German, etc. Usually, a quasi-C code is used by computer programmers as a tool that helps them to develop a code of a computer program, but the usage of quasi-C code is considerably object-oriented in the present invention. A quasi-C code well written by skillful programmers can be translated just as it is into a code of a programming language, only by simply replace the sentences written in the quasi-C code into a sentence written in the programming language.

A quasi-C code written in English is a C-language-like way of description of English sentence.

In the present invention, I will disclose examples in which an 'algorithm-of-process' giving the contents of the process defying an 'ideal verb', is described and/or implemented using a quasi-C code.

In many cases, such black boxes as 'to make decision' and/or 'to contact with a girl' are used as a function describing one of the instructions in such a quasi-C code. (See later parts of the present invention about the detail).

For example,

```
propose
{
    make decision ;_
    contact ;_
}.
```

In this example, 'propose' is the name of the 'algorithm-of-process' whose body equals to

```
"{
    make decision ;_
    contact ;_
}".
```

I claimed that in ideal cases, one lexical meaning of an 'ideal verb' equals to 'a category of one set of processes'. In a word, I claim that in many ideal cases, an 'ideal verb' is the strict name of an 'algorithm-of-process'.

I give later in the present invention, more precise discussion in order to show what I claim is reasonable and correct by implementing many 'ideal verbs' by a quasi-C code. What I claim here is that it is recommended to use a quasi-C code to give a lexical definition of a verb in an object-oriented knowledge base system disclosed in the present invention. More specifically speaking, I recommend to use a sentence in my "sentence pattern of implementation of names of algorithms-of-processes" as a way to give a lexical definition of a verb in an object-oriented knowledge base system disclosed in the present invention. (See later parts in the present invention for the detail).

It should be noted that in a quasi-C code, sentences such as

A=B;_ are often used. By analogy, I regard sentences describing a state of something and/or someone such as A is B;_ as a kind of 'algorithm-of-process'.

For example, a sentence,

Miss Amelia is beautiful;_ is as a kind of a name of an 'algorithm-o-process'.

<<Lexical Definition of 'simple sentence including a word used as an 'ideal verb''>> I regard a 'simple sentence including a word used as an 'ideal verb'' as a kind of 'ideal verb phrase', For example, sentences like "Miss Amelia is beautiful;_", and/or, "Miss Fumie is beautiful;_"

are regarded as a 'simple sentence including a word used as an 'ideal verb'', 'be'.

It will be shown that, in most cases, it is difficult to give an exact and complete quasi-C code defying an 'ideal verb' without using any 'subject-word (S)', 'object-word (O)', 'complement-word (C)', 'indirect-object-word (I.O)', and/or 'direct-object-word (D.O)' of the 'ideal verb'. In a word, I think it difficult to define a word without using a sentence. For the sake of simplicity, I regard in the present invention, a sentence a kind of a verb phrase.

That is, if a very precise description is necessary, it is recommended to use a 'simple sentence including a word used as an 'ideal verb'' (i.e. to use a set comprising an 'ideal verb', and, a 'subject-word (S)', and, an 'object-word (O)', an 'indirect-object-word (I.O)', a 'direct-object-word (D.O)', and/or a 'complement-word (C)', arranged according to the English grammar).

In the present invention, this 'simple sentence including a word used as an 'ideal verb'' is regarded as a precise 'name' of the 'algorithm of process'. It may seem strange to regard a sentence as a 'name'. A 'name' is of course a noun. But in grammar of German, a sentence and/or a phrase is often compressed into a noun. Remember the German noun 'die Gesellschaftsgrüindung', whose meaning is 'To establish a corporation', for example. A German often expresses a 'sentence' in a compressed form as a noun. In other words, it is recommended that an isolated single 'ideal verb' should be used only as a simplified name of an 'algorithm-of-process'. And it is recommended that as the full name of an 'algorithm-of-process', a 'simple sentence including a word used as the 'ideal verb'' should be used.

For example, the lexical definition of 'carry' is 'to lift and carry something'. That is, 'carry' is implemented as,

```
carry
{
    someone lifts something ;_
    someone takes something ;_
}
```

I regard "someone carries something" as a precise 'full name' of an 'algorithm-of-process',

```
"{
    someone lifts something ;_
    someone takes something ;_
}",
```

and I regard 'carry' as a brief name of an 'algorithm-of-process',

```
"{
    someone lifts something ;_
    someone takes something ;_
}".
```

I regard a bare and isolated 'ideal verb' as the brief name of a function of the 'algorithm-of-process', and I regard its 'subject-word (S)', 'object-word (O)', 'indirect-object-word (I.O)', 'direct-object-word (D.O)', and/or 'complement-word (C)' of the 'ideal verb' as 'arguments' of the function describing the 'algorithm-of-process'.

For example, I regard 'carry' as the name of a 'function' describing the 'algorithm-of-process', and I regard 'someone' and 'something' as the 'arguments' of the function.

Remember that in mathematics, a function is defined in a way, for example, $$f(x,y)=3x+y^2,$$

where, x and y are called an argument of the function 'f( )'. What I say here is that I regard 'carry' as a function in the following way, for example, carry('someone', 'something)="'someone' carries 'something'".

And this function, "carry('someone', 'something)" is implemented (and/or embodied) by a quasi-C code, as,

```
carry('someone', 'something')
{
    lift('someone', 'something') ;__
    take('someone', 'something') ;__
}.
```

In this example,

'algorithm-of-process',

```
"{
    lift('someone','something') ;__
    take('someone','something') ;__
}"
```

is assigned to the function,

"carry('someone', 'something')".

Lexical Definition of Implementation

If and when an 'algorithm-of-process' which is denoted by a function, is embodied by a quasi-C code used as the body of the 'algorithm-of-process', then, I say that the function is implemented. A function is the name of an 'algorithm-of-process'. The lexical definition of 'implementation' is 'to implement' a function used as the name of an 'algorithm-of-process'. It is recommended that a function used as the name of an 'algorithm-of-process' should be implemented by using "sentence pattern of implementation of names of algorithms-of-processes". I regard a verb a kind of function used as the name of an 'algorithm-of-process'.

If a 'simple sentence including a word used as an 'ideal verb" is used to describe a lexical meaning a verb in an 'ideal dictionary', then, it is recommended to use as broader 'descriptors' as possible as the 'arguments' used in the 'simple sentence including a word used as an 'ideal verb". If broader 'descriptors' are used in 'simple sentence including a word used as an 'ideal verb", then the power of expression of the 'simple sentence including a word used as an 'ideal verb" becomes more universal and more general. It is recommended that universal and general explanation of the meaning of a word should be used in an 'ideal dictionary', because it covers very wide range of cases.

For example, a sentence 'someone carries something' has more universal and broader power of expression than 'Mr. Bill carries a case of beers'. Note here that, 'someone' is a broader descriptor of 'Mr. Bill'. And 'something' is a broader descriptor of 'a case of beers'.

If a formal description is desired, then, it is recommended to use what I call "sentence pattern of one of five basic sentence patterns of English grammar". Such a formal sentence is readily used in reasoning by computer, by using my algorithms for reasoning in an object-oriented knowledge base system disclosed in the present invention, which will be disclosed in detail later in the present invention.

Here, I give just an example: For example, if my "sentence pattern of one of five basic sentence patterns of English grammar", which will be defined later in the present invention, is used, the sentence, 'someone carries something' is represented as

SplusVplusO__ __S=__ someone __V=__ carry __O=__ something.

Details will be given later about the lexical definition of "sentence pattern of implementation of names of algorithms-of-processes".

It should be noted that I regard a verb as a function, and a noun is a variable. A function in C language is described in a form, A__Function(a variable, a variable, . . . , a variable);__

In a word, all the variables are described in a bunch between a pair of parentheses, '(' and ')'.

By analogy of this, nouns in a 'simple sentence including a word used as an 'ideal verb" may be described in a bunch between a pair of parentheses, '(' and ')'. In other words, descriptions such like carry('someone', 'something);__ may be used as a 'simple sentence including a word used as an 'ideal verb".

In general, any number of sub-'algorithms-of-processes' may be inserted between '{' and '}' when total-'algorithms-of-processes' is described in a quasi-C code. And symbols used in C language including "'if( ){ }' selection statements", "'for( ){ }' iteration statements", and/or "'while( ){ }' iteration statements" may be inserted between '{' and '}' when total-'algorithms-of-processes' is described in a quasi-C code.

About the detail of quasi-C code, see for example §3 of ⊙"C gengo puroguramingu". Here, I give additional explanation in some detail; 'In line implementation' is allowed in a quasi-C code in the present invention; That is, in a quasi-C code, nest of another quasi-C code may be used; For example, let us assume that if the implementation of an algorithm whose name is PX is given by __ALGORITHM__ PX {px1;__ px2;__ px3;__}, and, in addition, let us assume that the implementation of the algorithm whose name is px2 is given by __ALGORITHM__ px2 {px2__1;__ px2__2;__ px2__3;__}.

I mean here that the latter quasi-C code can be nested into the former quasi-C code, as, __ALGORITHM__ PX {px1;__ px2 {px2__1;__ px2__2;__ px2__3;__};__ px3;__}.

This concept of 'nesting' is very common among the computer programmer using the C++ language, which is one of the most popular object-oriented programming language today. Such concept of 'nesting' is not common among C programmers. But such sentences including 'nesting' can be easily implemented using C++ language, if a computer programmer declare the 'function' px2 as an 'inline function' using the key word 'inline' in a source code written in C++ language.

In the present invention, I sometimes dare to confuse the usage of the term 'algorithm' and the term 'function'. This analogy is reasonable. But strictly speaking, an 'algorithm' is the body of the procedure with which to implement a 'function'. In other words, a 'function' is the name of an 'algorithms-of-processes'.

In the present invention, I use not only a 'function' that is completely implemented by using an 'algorithm' but also a 'function' that is not completely implemented by using an 'algorithm'. I regard a 'function' which is not completely implemented by using an 'algorithm' a kind of black box. A 'function' that has no implementation is exactly a genuine 'black box'.

In the present invention, I make use of a quasi-C code not only in descriptions of natural languages as well as in description of computer programming languages. What I call 'quasi-C code' in the present invention include 'quasi-C++ code'. A'quasi-C code' is a quasi code based on the C language, but the term 'quasi-C code' used in the present invention can be replaced without losing the generality by quasi codes based on other computer programming languages.

As further more concrete example, I express

'someone carries something' in a very formal way as,

__ALGORITHM__ someone carries something {someone lifts something;__ someone takes something;__}.

In this sentence described in "sentence pattern of implementation of names of algorithms, of-processes", a 'simple sentence including an 'ideal verb'', "someone carries something" is implemented by using two 'simple sentences including an 'ideal verb'', "someone lifts something" and "someone takes something" as functions.

A bare and isolated 'ideal verb', 'carry' of course, may be put solely as a function in a quasi-C code in the present invention, as, __ALGORITHM__ carry {lift;__ take;__}, but detailed information is not described by this sentence.

If 'someone carries something' is to be expressed more C language like style, then, it is recommended that a 'simple sentence including the 'ideal verb'' should be described in a quasi-C code's function like style, as, __ALGORITHM__ carries(someone, something) {lifts (someone, some thing);__ takes(someone, something) ;__}, in which I emphasize that I regard a 'simple sentence including the 'ideal verb'' as a kind of 'function'. Here, the style, "'name of a function''('name of an argument, 'name of another argument);__" is used.

This style of sentence is just equivalent to the style with which a 'function' used in C language is defined (i.e. implemented) in a source code of C language. Once, this style is used to give a lexical definition of a verb, 'carry', then, vast varieties of sentences can be directly defined using this style as a prototype, such like __ALGORITHM__ carries(Tom, a case of beer) {lifts (Tom, a case of beer);__ takes(Tom, a case of beer);__}, __ALGORITHM__ carries(Alice, a case of orange juice) {lifts(Alice, a case of orange juice);__ takes(Alice, a case of orange juice);__}, etc. etc.

It should be noted that either Tom and/or Alice is narrower term of 'someone'. And either 'a case of beer' and/or 'a case of orange juice' is narrower term of 'something'. It is recommended that if a lexical definition of a verb (i.e. implementation of a verb) is given in an 'ideal dictionary' using a sentence described in "sentence pattern of implementation of names of algorithms-of-processes", then as broader 'descriptors' as possible should be used, to give a general and universal definition of the verb.

By the way, however, as a sentence, like, carries (Tom, a case of beer), is not necessarily readable for human. Therefore, I recommend that one should use a style, just according to the English grammar to represent exactly the same function, as, (Tom) carries (a case of beer).

And if more formal description is desired, then, it is recommended that the 'simple sentence including the 'ideal verb'' should be described in "sentence pattern of one of five basic sentence patterns of English grammar". The lexical definition of "sentence pattern of one of five basic sentence patterns of English grammar" will be given later in the present invention.

3.1.3.3.2. Detailed Examples of Sentences in "Sentence Pattern of Names of Implementation of Algorithms-of-Processes", and "Sentence Pattern of Function" Used as a Lexical Meaning of an 'Ideal Verb'

Data structure represented as "sentence pattern of implementation of names of algorithms-of-processes" and/or as what I call "sentence pattern of function" to give the lexical meanings of the verbs, 'fall', 'move', 'begin', 'end', 'change', 'draw', 'make', 'use', 'affect', 'effect', 'imagine', 'watch', 'act', 'pronounce', 'answer', 'say', 'ask', 'discuss', 'think', 'command', 'order', 'control', 'operate', 'judge', 'arrive', 'depart', 'continue', 'break', 'bring', 'build', 'lift', 'take', 'carry', 'chase', 'catch', 'walk', will be shown below.

Here, let me discuss in some detail, about the relation between verbs used in English and a function in quasi-C code. To begin with, let me discuss the lexical meaning of the verb, 'fall'. Remember the sentence, 'A ripe apple fell off the tree." In the ⊙"Longman dictionary of contemporary English", the verb 'fall' is defined as "to move downwards from higher position to a lower position".

Let me analyze this sentence: First, it should be noted first that 'position' is a 'quality' of something. In the present analysis, I divide 'position of something' twofold into the 'high position' and the 'low position'. I regard 'something' as an 'object'. It should be noted that, this 'dichotomy of 'quality'' makes the verb 'fall' more analytical and precise than the verb 'move'. In other words, the meaning of the verb 'fall', how the 'motion' occurred is described more analytically and precisely using this dichotomy than the meaning of the verb 'move'.

The verb 'fall' can be implemented (i.e. embodied) by using an 'algorithm-of-processes' in a sentences what I call "sentence pattern of implementation of names of algorithms-of-processes", as, __ALGORITHM__ fall {position is high, at first;__ move;__ position is low, at last;__}.

On the other hand, the way in which the verb 'fall' works as a function, can be described in a sentence described in what I call "sentence pattern of function". The lexical definition of "sentence pattern of function" will be given later in the present invention. Here, I just give an example: If and when an 'ideal verb' is used as a function in a quasi-C code, like in the present example, a sentence in "sentence pattern of function", which will be defined later, is useful to be used as a lexical definition of the verb, as follows:

__FUNCTION__ fall __translate__INPUT__ position is high, at first __into__OUTPUT__ position is low, at last.

Thus, a sentence in "sentence pattern of function" describes the situation before and after the matter described by a verb happens. That is, a sentence in "sentence pattern of function" describes the input and the output of the function.

Here, sentences,

"position is high, at first", and

"position is low, at last"

are an example of sentences that stores the data describing the information about a 'dichotomy of 'quality''.

Lexical Definition of 'dichotomy of 'quality''

A 'dichotomy' with which two completely opposite states of a 'quality' is distinguished is a 'dichotomy of 'quality''.

Lexical Definition of a Means for Making More Specific Meaning of a Verb from that of a Verb Whose Meaning is More General The way in which sentences that stores the data describing the information about a 'dichotomy of 'quality'' is added to the 'algorithms-of-processes' for giving the lexical definition of the verb whose meaning is more general, and/or something that stores the information of it, is a means for making more specific meaning of a verb from that of a verb whose meaning is more general.

Figure 4:
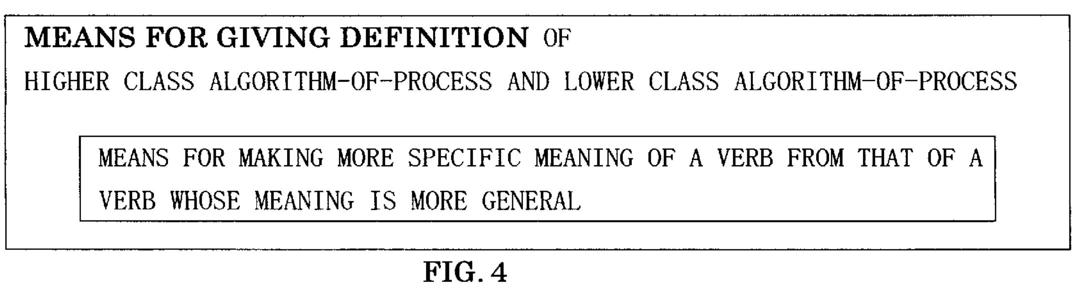
FIG. 4 shows a recommended constitution of a 'means for giving definition of higher class algorithm-of-process and lower class algorithm-of-process'.

According to this definition and by the definition of what I call @[algorithm of giving definition of higher class 'algorithm-of-process' and lower class 'algorithm-of-process'], whose lexical definition will be given later in the present invention, if and when 'algorithm of process' which is used to give a lexical definition of a verb having a specific meaning (for example, "{position is high, at first;__ move;__ position is low, at last;__}")

is obtained by adding a sentences that stores the data describing the information about a 'dichotomy of 'quality'' (for example, "position is high, at first;__" and "position is low, at last;__") to the 'algorithms-of-processes' which is used to give a lexical definition of a verb having a general and universal meaning (for example, "{move;__}"), then, the general 'algorithms-of-processes' should be regarded as the higher class 'algorithm-of-process' of the specific 'algorithms-of-processes'. In other words, I regard the verb 'move' as the higher class verb of 'fall' (See FIG. 23). 'This situation is schematically shown in FIG. 4, which shows that 'means for giving definition of higher class algorithm-of-process and lower class algorithm-of-process' must be used if and when 'means for making more specific meaning of a verb from that of a verb whose meaning is more general' is carried out.

I regard, in the present invention, a storing media on which the shape and/or pattern of characters is made so that information is recorded, as a kind of sentence. For example, if a man composes a sentence on a paper with a pencil, the sentence is recorded as the shape of the lead line deposited on the paper by using the pencil. In this case, I regard the paper on which the lead line having a form of characters, as a storing media on which the shape of characters is made so that information is recorded. By definition, I regard the paper on which the lead line having a form of characters, as a kind of sentence. For example, a sentence recorded on a Hard disk is expressed as the pattern of arrangement of N-S direction of the micro domains of magnets on the Hard disk, which is regarded as a kind of 0-1 characters, recorded on the thin film magnetic media on a hard Aluminum disk and/or on a hard glass disk. Therefore in this case, I regard a magnetic disk that has a magnetic pattern on the surface of it, as a sentence.

Let me show another example. I regard a computer memory whose electric state is made so that information is recorded as a kind of sentence. For example, a sentence recorded in a dynamic random access memory (DRAM) is expressed as the pattern of arrangement of charged and/or uncharged micro condensers embedded and arranged in the integrated circuit of the DRAM. Thus, in this case, I regard a pattern of arrangement of charged and/or uncharged micro condensers embedded in the DRAM as an electric state of a DRAM. In other words, in this case, I regard a DRAM, which has an electric pattern therein, as a sentence.

Various application specific integrated circuit also has micro electric patterns in it, and I regard a specific integrated circuit having micro electric patterns as a sentence.

Thus, I regard in the present invention that a sentence is a kind of an material article as well as a kind of information. Accordingly, I regard the contents of a knowledge base system as a kind of article as well as a kind of information.

If and when precise description is necessary, it is recommended to describe a verb as a function used as the name of an 'algorithm-of-process' of the verb, by using 'simple sentence including a word used as an 'ideal verb'' instead of using a bare and isolated 'ideal verb': For example, in the sentence, which gives a precise description of the mplementation (=embodiment of the detail) of the verb 'fall', __ALGORITHM__ (something) falls {(something) has position which is judge to and/or is felt to be high, at first;__ (something) moves;__ (some thing).has position which is judged and/or is felt to low, at last;__}}, wherein the name of the 'algorithm-of-process' is described as, "(something) falls", which is what I call a function, described as a 'simple sentence including a word used as an 'ideal verb'', and the body of the 'algorithm-of-process' is described as a quasi-C code, "{(something) has position which is judge to and/or is felt to be high, at first;__ (something) moves;__ (something) .has position which is judged and/or is felt to low, at last;__}}".

It is clear in this example that the verb 'move'is used to implement (=to embody the detail of) the verb 'fall'. In this sense, 'move' is a more primitive verb than 'fall'. I describe this situation that "'move' is higher class 'algorithm-of-process' of 'fall'."

I also describe this situation in a more formal way, as,

__ALGORITHM__ (something) moves __is_higher_class_of__ALGORITHM__ (something) falls.

And

"'have' is higher class 'algorithm-of-process' of 'fall'."

__ALGORITHM__ (something) has position that is judge to and/or is felt to be high, at first __is_higher_class_of__ALGORITHM__ (something) falls.

__ALGORITHM__ (something).has position that is judged and/or is felt to low, at last __is_higher_class_of__ALGORITHM__ (something) falls.

The lexical definition of the word "higher class 'algorithm-of-process'" will be given later in the present invention. In the present invention, I regard the verb 'fall' as a function that maps the initial situation into the final situation. Describe this idea explicitly, I give a sentence, __FUNCTION__ (something) falls;__ __translate__INPUT__ (something).has position which is judge to be high, at first;__ __into_OUTPUT__ (something).has position which is judged to be and/or is felt to be high low, at last;__, where, I regard 'something' as an 'object'. And I regard 'position' as what I call an "individual variable' of the 'object'', which is a 'quality' characterizing the 'object'. And I regard 'high' and 'low' as a value of the 'individual variable'. As a matter of fact, for example, the 'simple sentence including a word used as an 'ideal verb'', '(something) has position which is judge to be high, at first' can be translated into a sentence described in what I call a "Sentence pattern of definition of object", as __OBJECT__ (something) have__VARIABLES (position) which__is judged to be and/or felt to be high, at first.

The same sentence can be translated in a sentence using the 'assignment operator', '=', which a C programmer often uses, as something.state=high;__.

(at first)

Here, the general and universal lexical definition of '(something) moves', in which 'move' is regarded as a black box, is given by __FUNCTION__ (something) moves;__ __translate__ INPUT__ (something) has (position) which is judged to be and/or felt to be at some state, at first;__ __into__ OUTPUT__ (something) has (position) which is judged to be and/or felt to be at the other state, at last;__;__

The word, 'high', is an adjective that represents the state.

It should be noted that most of the physicists loves to add quantitative expression to a 'quality'. For example, they tend to say "It is five meters high from the ground" instead simply saying "It is high from the ground".

I show here an example in which 'quantity' is used as a 'value' of an 'quality', which is used an 'individual variable':

"'Position of something' is five feet from the ground, at first,"

where, 'something' is an object, 'position' is a 'quality' of the object, 'five' is a number, 'the ground' is the origin from which the 'quality' is measured, and 'foot' is something to determine the unit of length. Thus, 'five feet from the ground' is the 'quantity' used as the value of the 'quality'.

The verb 'move' recited above is used as an intransitive verb. Let me discuss the lexical meaning of the verb, 'move' which is used as a transitive verb.

It is used in sentences such as, "Can you move your wagon? It is blocking the road" In the ⊙ "Longman dictionary of contemporary English", the verb 'move' is defined as "to make something change its place.".

First, I interpret this definition that, 'position of something' is divided twofold into the 'in initial place', and the 'in final position'. This 'dichotomy of 'quality'' makes the verb 'move' more analytical and precise than the verb 'perform something'. In other words, the meaning of the verb 'move' includes how 'to perform a process' in a form of the 'dichotomy of 'quality''. Note that the two sentences, (something) has position which is judge to and/or is felt to be high, at first;__ and (something).has position that is judged and/or is felt to low, at last;__, are sentences expressing the 'dichotomy of 'quality''.

'Algorithm-of-processes' of the verb 'move' can be described using a quasi-C code. Lexical definition of 'move' is given by using my "sentence pattern of implementation of names of algorithms-of-processes" and "Sentence pattern of function", as follows;

__ALGORITHM__ (someone) moves (something) {(something) has position which is udged to be and/or felt to be 'in initial place', at first;__ (someone) performs a (process);__ (something) has position which is judged to be and/or felt to be 'in final place', at last;__}.

__FUNCTION__ (someone) moves (something);__ __translate__INPUT__ (something) has position which is judged to be and/or felt to be 'in initial place', at first;__ __into__OUTPUT__ (something) has position which is judged to be and/or felt to be 'in final place', at last;__;__, It should be noted that the verb 'perform' is used to implement the lexical meaning of the verb 'move'. Therefore, the verb 'perform' is more fundamental verb than the verb 'move'. And as I noted before, I regard a 'verb' as a name of an 'algorithm-of-process'. By my definition, which will be given later in the present invention, this situation is described as, "'perform' is higher class 'algorithm-of-process' of 'move' (intransitive)."

More precisely describing,

__ALGORITHM__ (someone) performs a (process) __is__ higher__class__of__ALGORITHM__ (someone) moves (something).

And

"'have' is higher class 'algorithm-of-process' of 'move' (intransitive)."

More precisely describing,

__ALGORITHM__ (something) has position which is judged to be and/or felt to be 'in initial place', at first __is__higher__class__of__ALGORITHM__ (someone) moves (something).

__ALGORITHM__ (something) has position that is judged to be and/or felt to be 'in final place', at last __is__higher__class__of__ALGORITHM__ (someone) moves (something).

As another example, let me discuss the lexical meaning of the verb, 'begin'. It is used in sentences such as, "We began to wonder if the train would ever arrive."

In the ⊙ "Longman dictionary of contemporary English", the verb 'begin' is defined as "to start doing (something).". First, I interpret that in this definition, 'state of process', which I regard a kind of 'quality', is divided twofold into the 'in motion', and the 'out of motion'. In this sense, this 'dichotomy of 'quality'' makes the verb 'begin' more analytical and precise than the verb 'do'. In other words, the meaning of the verb 'begin' contains the information of how 'to do a process' in a form of the 'dichotomy of 'quality''.

'Algorithm-of-processes' describing the lexical meaning of the verb 'start' can be described using a quasi-C code. Lexical definition of 'start' is given by using my "sentence pattern of implementation of names of algorithms-of-processes" and "Sentence pattern of function" as follows;

__ALGORITHM__ (someone) begins a (process) {state of (process) is judged to be and/or felt to be 'out of motion', at first;__ while( ){(someone) dose (process) ;__ if(state of (process) is judged to be and/or felt to be 'in motion'){break;__}}}, in which the verb 'do' is used to implement the lexical meaning of the verb 'begin'. And the sentence,

```
while( ){
        (someone) dose (process);__
        if (state of (process) is judged to be and/or felt to be 'in motion')
        { break ;__}
    }
```

means that (someone) continues to do (process) repeatedly, but that if the condition "state of (process) is judged to be and/or felt to be 'in motion'" is satisfied, then, break the continuation, and (someone) stops to do the (process).

__FUNCTION__ (someone) begins a (process);__ —translate__INPUT__ (process) has state which is judged to be and/or felt to be out of motion, at first;__ —into__OUTPUT__ (process) has state which is judged to be and/or felt to be in motion, at last;__;__, It is clear, by my definition, that, "'do' is higher class 'algorithm-of-process' of 'begin'."

In other words,

__ALGORITHM__ (someone) dose (process) __is__higher__class__of__ALGORITHM__ (someone) begins a (process).

And

"if(state of (process) is judged to be and/or felt to be 'in motion')

{break;__}"

is higher class 'algorithm-of-process' of 'begin'.

As another example, let me discuss the lexical meaning of the verb, 'end'. It is used in sentences such as, "The fighting ended at last." In the ⓒ "Longman dictionary of contemporary English", the verb 'end' is defined as "to finish or to stop.".

First, I interpret this definition that, 'state of (process)' is divided twofold into the 'in motion', and the 'out of motion'. In this sense, this 'dichotomy of 'quality" makes the verb 'end' more analytical and precise than the verb 'do'. In other words, the meaning of the verb 'end', contains the information of how 'to do a (process)' is described in a form of the 'dichotomy of 'quality".

'Algorithm-of-processes' of the verb 'end' can be described using a quasi-C code. The lexical definition of 'end' is given by using my "sentence pattern of implementation of names of algorithms-of-processes" and "Sentence pattern of function" as follows;

__ALGORITHM__ (someone) ends (process) {state of (process) is judged to be and/or felt to be 'in motion', at first;__ state of (process) is judged to be and/or felt to be 'out of motion';__}, in which the verb 'do' is used to implement the lexical meaning of the verb 'end'.

__FUNCTION__ (someone) ends (process);__ —translate__INPUT__ (process) has state which is judged to be and/or felt to be in motion, at first;__ __into__OUTPUT__ (process) has state which is judged to be and/or felt to be out of motion, at last;__;__, It is clear, by my definition, that, "'do' is higher class 'algorithm-of-process' of 'end'."

In other words,

__ALGORITHM__ (someone) dose (process) __is__higher__class__of__ALGORITHM__ (someone) ends (process).

And "'be' is higher class 'algorithm-of-process' of 'end'."

In other words,

__ALGORITHM__ state of (process) is judged to be and/or felt to be 'in motion' __is__higher__class__of__ALGORITHM__ (someone) ends (process).

__ALGORITHM__ state of (process) is judged to be and/or felt to be 'out of motion' __is__higher__class__of__ALGORITHM__ (someone) ends (process).

As another example, let me discuss the lexical meaning of the verb, 'change'. First, I divide 'state of something' twofold into the 'initial', and the 'final'. 'Algorithm-of-processes' of the verb can be described using a quasi-C code. The lexical definition of 'change' is given by using my "Sentence pattern of function" can be used as follows;

__FUNCTION__ (someone and/or something) changes;__ —translate__INPUT__ (someone and/or something) has state which is judged to be and/or felt to be initial, at first;_ _into__OUTPUT__ (someone and/or something) has state which is judged to be and/or felt to be in final, at last;__;__, As another example, let me discuss the lexical meaning of the verb, 'make'. 'Algorithm-of-processes' of the verb can be described using a quasi-C code. The lexical definition of 'make' is given by using my "sentence pattern of implementation of names of algorithms-of-processes", as, __FUNCTION__ (someone) makes (something);__ —translate__INPUT__ image of an object has state which is judged and/or is felt to exist in (someone)' mind;_ _into__OUTPUT__ image of the object has state which is judged and/or is felt to exist as shape of material substance;__;__

__ALGORITHM__ (someone) makes (something) {state of (something) is judged to be and/or felt to be exist in (someone)' mind;__ (someone) performs a (process);__ state of (something) is judged to be and/or felt to be exist as shape of material substance;__}.

It is clear, by my definition, that,

"'perform' is higher class 'algorithm-of-process' of 'make'."

In other words,

__ALGORITHM__ (someone) performs a (process) __is__higher__class__of__ALGORITHM__ (someone) makes (something).

And, 'be' is higher class 'algorithm-of-process' of 'make'.

In other words,

__ALGORITHM__ state of (something) is judged to be and/or felt to be exist in (someone)' mind __is__higher__class__of __ALGORITHM__ (someone) makes (something).

__ALGORITHM__ state of (something) is judged to be and/or felt to be exist as shape of material substance __is__higher__class__of__ALGORITHM__ (someone) makes (something).

As another example, let me discuss the lexical meaning of the verb, 'use'. 'Algorithm-of-processes' of the verb can be described using a quasi-C code. The lexical definition of 'use' is given by using my "sentence pattern of implementation of names of algorithms-of-processes", "sentence pattern of function"

__FUNCTION__ (someone) uses (something); __ —translate__INPUT__ ideas of some procedure have state which is judged and/or is felt to exist in (someone)' mind, at first;__ __into__OUTPUT__ ideas and/or images of some procedure have a state which is judged and/or is felt to exist as (someone)'s work helped by (something)'s work with a shape made of material substance;__;__

__ALGORITHM__ (someone) uses (something) {idea of some procedure have state which is judged and/or is felt to exist in (someone)' mind;__ (someone) performs a (process);__ ideas and/or images of some procedure have a state which is judged and/or is felt to exist as (someone)'s work helped by (something)'s work with a shape made of material substance;__}., in which the verb 'perform' is used to implement the lexical meaning of the verb 'use'.

It is clear, by my definition, that,

"'perform' is higher class 'algorithm-of-process' of 'use'."

In other words,

__ALGORITHM__ (someone) performs a (process) __is__ higher__class__of__ALGORITHM__ (someone) uses (something).

As another example, let me discuss the lexical meaning of the verb, 'draw'. It is used in sentences such as, "Can I draw your portrait?". In the ⓒ "Longman dictionary of contemporary English", the verb 'draw' is defined as "to make picture of something with pencil and/or pen".

'Algorithm-of-processes' of the verb can be described using a quasi-C code. The lexical definition of 'draw' is given by using my "sentence pattern of implementation of names of algorithms-of-processes", "sentence pattern of function", and, and "sentence pattern of 'ideal thesaurus'" as,

```
__ALGORITHM__ (someone) draws (picture)
{
    while( ){
        (someone) makes (picture)
        {
            something = pencil and/or pen and/or a brush ;__
            (someone)'s work =
                (someone) makes a form and/or a pattern of deposited
                pigment on a paper
and/or
                on a screen ;__
            (someone) uses (something) ;__
        }
    }
},
```

__FUNCTION__ (someone) draws (picture);__ —translate__INPUT__ image of an object has state which is judged to be and/or felt to be exist in (someone)'s mind, at first;__ __into__OUTPUT__ image of the object has state which is judged to be and/or felt to be exist as dots lines, and/or planes on papers and/or on screens, at last;__;__, It should be noted that if image of object has state that is judged and/or is felt to exist as dots, lines, and/or planes on papers and/or on screens, then, image of object has state that is judged and/or is felt to exist as shape of material substance.

Therefore, the lexical definition of the verb 'make' can be usedas it is in the lexical definition of the verb 'draw'.

__NT__ pencil and/or pen __is__a__kind__of__BT__ something.

__ALGORITHM__ (someone) make (picture) __is__ higher__class__of__ALGORITHM__ (someone) draw (picture).

__ALGORITHM__ (someone) use pencil and/or pen) __is__higher__class__of__ALGORITHM__ (someone) draw (picture).

As another example, let me discuss the lexical meaning of the verb, 'affect'. 'Algorithm-of-processes' of the verb 'affect' can be described using a quasi-C code. The lexical definition of 'affect' is given by using my "sentence pattern of implementation of names of algorithms-of-processes", "sentence pattern of function".

__FUNCTION__ (something) affects (something else);__ —translate__INPUT__ (something else) has state that is judged to be and/or felt to be in initial, at first;__ —into__OUTPUT__ (something else) has state that is judged to be and/or felt to be in final according to (some condition), at last;__;__, __ALGORITHM__ (something) affects (something else) ;__ {(something else) has state which is judged to be and/or felt to be in initial, at first;__ (something) performs a (process);__ (something else) has state which is judged to be and/or felt to be in final according to (some condition);__}.

It is clear, by my definition, that,

"'perform' is higher class 'algorithm-of-process' of 'affect'."

In other words,

__ALGORITHM__ (something) performs a (process) __is__higher__class__of__ALGORITHM__ (something) affects (something else).

And

"'have' is higher class 'algorithm-of-process' of 'affect'."

In other words,

__ALGORITHM__ (something else) has state that is judged to be and/or felt to be in initial, at first __is__ higher__class__of__ALGORITHM__ (something) affects (something else).

__ALGORITHM__ (something else) has state that is judged to be and/or felt to be in final according to (some condition) __is__higher__class__of__ALGORITHM__ (something) affects (something else).

As another example, let me discuss the lexical meaning of the verb, 'effect'. 'Algorithm-of-processes' of the verb can be described using a quasi-C code. The lexical definition of 'effect' is given by using my "Sentence pattern of function" as follows;

__FUNCTION__ (some behavior) effects (something);__ —translate__INPUT__ (something) has state which is judged to be and/or felt to be initial, at first;__ __into__ OUTPUT__ (something) has state which is judged to be and/or felt to be in final according to the (some behavior), at last;__;__, As another example, let me discuss the lexical meaning of the verb, 'imagine'. 'Algorithm-of-processes' of the verb can be described using a quasi-C code. The lexical definition of 'imagine' is given by using my "sentence pattern of function" as, __FUNCTION__ (someone) imagines (picture);__ —translate__INPUT__ (picture) in (someone)'s mind is judged and/or is felt to be nonexistent, at first;__ —into__OUTPUT__ (picture) in (someone)'s mind is judged and/or is felt to be and/or felt to be exist, at last;__;__, __ALGORITHM__ (someone) imagines (picture);__ {(picture) in (someone)'s mind is judged and/or is felt to be nonexistent;__ (someone) performs a (process);__ (picture) in (someone)'s mind is judged and/or is felt to be and/or felt to be exist, at last;__}.

It is clear, by my definition, that,

"'perform' is higher class 'algorithm-of-process' of 'imagine'."

In other words,

__ALGORITHM__ (someone) performs a (process) __is__ higher__class__of__ALGORITHM__ (someone) imagines (picture).

And

"'be' is higher class 'algorithm-of-process' of 'imagine'."

__ALGORITHM__ (picture) in (someone)'s mind is judged and/or is felt to be nonexistent, at first __is__ higher__class__of__ALGORITHM__ (someone) imagines (picture).

__ALGORITHM__ (picture) in (someone)'s mind is judged and/or is felt to be and/or felt to be exist, at last __is__higher__class__of__ALGORITHM__ (someone) imagines (picture).

As another example, let me discuss the lexical meaning of the verb, 'watch'. 'Algorithm-of-processes' of the verb can be described using a quasi-C code. The lexical definition of 'watch' is given by using my "sentence pattern of function" as, __FUNCTION__ (someone) watches (something);__ —translate__INPUT__ some objects have a state which is judged and/or is felt to exist as (something) with a shape made of material substance, at first;__ __into__ OUTPUT__ (ideas and/or images) of some objects have a state which is judged and/or is felt to exist in (someone)' mind, at last;__;__, __ALGORITHM__ (someone) watches (something);__ {some objects have a state which is judged and/or is felt to exist as (something) with a shape made of material substance, at first;__ (someone) performs a (process);__ (ideas and/or images) of some objects have a state which is judged and/or is felt to exist in (someone)' mind, at last;__}.

It is clear, by my definition, that,

"'perform' is higher class 'algorithm-of-process' of 'watch'."

In other words,

__ALGORITHM__ (someone) performs a (process) __is__ higher__class__of__ALGORITHM__ (someone) watches (something).

And

"'have' is higher class 'algorithm-of-process' of 'watch'."

__ALGORITHM__ some objects have a state that is judged and/or is felt to exist as (something) with a shape made of material substance, at first __is__higher__ class__of__ALGORITHM__ (someone) watches (something).

__ALGORITHM__ (ideas and/or images) of some objects have a state which is judged and/or is felt to exist in (someone)' mind, at last __is__higher__class__of__ ALGORITHM__ (someone) watches (something).

As another example, let me discuss the lexical meaning of the verb, 'act'. It is used in sentences such as, "The UN Security Council acted to end the war in Bosnia."

I define the verb 'act' as

"to do something as a measure to realize a situation which in most cases you hope and/or you judge strategically important."

First, I interpret this definition that, 'state of measure' is divided twofold into the 'to have been performed' and the 'not to have been performed'. In this sense, this 'dichotomy of 'quality" makes the verb 'act' more analytical and precise than the verb 'perform'. In other words, the meaning of the verb 'act', contains the information of how the 'process of performance' occurred is described in a form of 'dichotomy of 'quality".

'Algorithm-of-processes' of the verb 'act' can be described using a quasi-C code. The implementation of the verb 'act' is given by using my "sentence pattern of implementation of names of algorithms-of-processes", as,

```
__ALGORITHM__ (someone) acts
{
    if( (someone) acts strategically )
    {
        (someone) intends the (aim) ;__
        (someone else) tries to make the (strategy) ;__
    }
    else if( (someone) is driven by his emotion )
    {
        (someone) feels (emotion) ;__
    }
    while( )
    {
        if( (someone) acts strategically )
        {
            (another one) tries to make (the procedure) according to
            (the strategy) ;__
            if( (ideal situation) is actually realized, and/or
                    strategic necessity ceases to exist )
            {
                break ;__
            }
        }
        else if ((someone) is driven by his emotion)
        {
            if( (someone)'s emotion changes ){ break ;__}
        }
        (still another one) dares to perform (something) ;__
    }
}.
```

__FUNCTION__ (someone) acts;__ __translate__INPUT__ measure has state which is judged to be and/or felt to be not to have been performed, at first;__ __into__ OUTPUT__ measure has state which is judged to be and/or felt to be to have been performed, at last;__;__, It is clear, by my definition, that, "'do' is higher class 'algorithm-of-process' of 'act'."

In other words,

```
__ALGORITHM__ (someone) dares to perform (something) ;__
__is__higher__class__of__ALGORITHM__ (someone) acts ;__;__.
And
"if( (someone) acts strategically )
{
    (someone) intends the (aim) ;__
    (someone else) tries to make the (strategy) ;__
}"
is higher class 'algorithm-of-process' of 'act'.
And
"else if( (someone) is driven by his emotion )
{
    (someone) feels (emotion) ;__
}"
is higher class 'algorithm-of-process' of 'act'.
And
"if( (someone) acts strategically )
    {
        (another one) tries to make (the procedure) according to (the
        strategy) ;__
        if( (ideal situation) is actually realized, and/or
                strategic necessity ceases to exist )
        {
            break ;__
        }
    }
    else if ((someone) is driven by his emotion)
    {
```

-continued

```
        if( (someone)'s emotion changes ){ break ;__}
    }"
is higher class 'algorithm-of-process' of 'act'.
"(still another one) dares to perform (something) ;__"
is higher class 'algorithm-of-process' of 'act'.
```

'Act' is what I call a 'compound verb', whose lexical definition will be given later in the present invention.

As another example, let me discuss the lexical meaning of the verb, 'pronounce'. It is used in sentences such as, "How do you pronounce your name?" In the ⓞ"Longman dictionary of contemporary English", the verb 'pronounce' is defined as "to make the sound of a word".

'Algorithm-of-processes' of the verb can be described using a quasi-C code. The lexical definition of 'pronounce' is given by using my "sentence pattern of implementation of names of algorithms-of-processes", "sentence pattern of function" and "sentence pattern of 'ideal thesaurus'", as, __ALGORITHM__ (someone) pronounces word {word has state which is judged and/or is felt to exist in (someone)'s mind;__ while( ){(someone) makes word sound;__ if(word has state which is judged and/or is felt to exist as a sound in the air){break;__}}} and

__FUNCTION__ (someone) pronounces word;__ —translate__INPUT__ word has state which is judged and/or is felt to exist in (someone)'s mind;__ __into__ OUTPUT__ word has state which is judged and/or is felt to exist as sound in the air;__;__, where, __NT__ word __is__a__kind__of__BT__ image of an object, __NT__ sound in air __is__a__kind__of__BT__ shape of material substance, and __ALGORITHM__ make __is__higher__class__of__ ALGORITHM__ pronounce.

__ALGORITHM__ have __is__higher__class__of__ ALGORITHM__ pronounce.

And

"if(word has state which is judged and/or is felt to exist as a sound in the air){break;__}"

is higher class 'algorithm-of-process' of 'act'.

As another example, let me discuss the lexical meaning of the verb, 'answer'. It is used in sentences such as, "I had to answer lots of questions about my childhood."

In the ⓞ"Longman dictionary of contemporary English", the verb 'answer' is defined as "to say something to someone as a reply when they asked you a question".

First, I interpret this definition that, 'word' is divided twofold into 'answer' and 'question'. In this sense, this 'dichotomy of 'quality'' makes the verb 'answer' more analytical and precise than the verb 'say'. In other words, the meaning of the verb 'answer', how the 'conversation' occurred is described using the 'dichotomy of 'quality''.

'Algorithm-of-processes' of the verb can be described using a quasi-C code. The lexical definition of 'answer' is given by using my "sentence pattern of implementation of names of algorithms-of-processes", "sentence pattern of function" and "sentence pattern of 'ideal thesaurus'", as,

```
__ALGORITHM__ (someone) answers (someone else)'s (question)
{
    another one = someone ;__
    ideal situation = (someone else) gets the necessary information ;__
    still another one = someone ;__
    to perform (something) = to say (something) ;__
    (someone) acts ;__
}.
```

__FUNCTION__ (someone) answers (someone else) a (question);__translate__INPUT__ (someone)'s reply to (someone else)'s (question) has state which is judged and/or is felt to not have been done;__ __into__ OUTPUT__ reply has state which is judged and/or is felt to have been performed;__;__, and the general form of say( ) is given by __ALGORITHM__ (someone) says (something) {(someone) pronounces words;__}, "'=' is higher class 'algorithm-of-process' of 'answer'."

"'act' is higher class 'algorithm-of-process' of 'answer'."

"say' is higher class 'algorithm-of-process' of 'answer'."

"'pronounce' is higher class 'algorithm-of-process' of 'say'."

As another example, let me discuss the lexical meaning of the verb, 'ask'. It is used in sentences such as, "That kids always asking awkward questions."

In the ⓞ"Longman dictionary of contemporary English", the verb 'ask' is defined as "to say something in order to get an answer."

First, I interpret this definition that, 'state of (process) of asking' is divided twofold into 'to have been performed' and the 'not to have been performed'. In this sense, this 'dichotomy of 'quality'' makes the verb 'answer' more analytical and precise than the verb 'say'. In other words, the meaning of the verb 'ask' contains the information of how the 'conversation' occurred in a form of the 'dichotomy of 'quality''.

'Algorithm-of-processes' of the verb can be described using a quasi-C code. The lexical definition of 'ask' is given by using my "sentence pattern of implementation of names of algorithms-of-processes", "sentence pattern of function" and "sentence pattern of 'ideal thesaurus'", as,

```
__ALGORITHM__ (someone) asks (someone else) a (question)
{
    another one = someone ;__
    ideal situation = (someone else) answer (question) ;__
    still another one = someone ;__
    to perform (something) = to say (something)
    (someone) acts ;__
}.
```

__FUNCTION__ (someone) asks (someone else) a (question);__ __translate__INPUT__ query has state which is judged and/or is felt to not have been done, at first;__ __into__OUTPUT__ query has state which is judged and/or is felt to have been performed, at last;__;__

"'=' is higher class 'algorithm-of-process' of 'ask'."

"'act' is higher class 'algorithm-of-process' of 'ask'."

"'say' is higher class 'algorithm-of-process' of 'ask'."

As another example, let me discuss the lexical meaning of the verb, 'discuss'. 'Algorithm-of-processes' of the verb can be described using a quasi-C code. The lexical definition of 'discuss' is given by using my "sentence pattern of implementation of names of algorithms-of-processes", and "sentence pattern of function" as, __ALGORITHM__ (someone) discusses {while( ){(someone) asks;__ (someone) answers;__}}.

__FUNCTION__ (someone) discusses;__ __translate__INPUT__ reply and query have states which are judged to not have been done;__ __into__OUTPUT__ reply and query have state which are judged to have been performed;__;__, It is clear, by my definition, that, "'ask' and 'answer' are a higher class 'algorithm-of-process' of 'discuss'."

In other words,

__ALGORITHM__ (someone) asks __is__higher__class__of__ALGORITHM__ (someone) discusses.

__ALGORITHM__ (someone) answers __is__higher__class__of__ALGORITHM__ (someone) discusses.

As another example, let me discuss the lexical meaning of the verb, 'think'. 'Algorithm-of-processes' of the verb can be described using a quasi-C code. The lexical definition of 'think' is given by using my "sentence pattern of implementation of names of algorithms-of-processes", and "sentence pattern of function" as, __ALGORITHM__ (someone) thinks (procedure) {some objects=knowledge;__ something=procedure;__ (someone) makes images of some objects have a state which is judged and/or is felt to exist as something in (someone)' mind;__}.

__FUNCTION__ (someone) thinks (procedure);__ —translate__INPUT__ knowledge which is judged and/or is felt to exist in (someone)' mind, at first;__ __into__OUTPUT__ images of knowledge have a state which is judged and/or is felt to exist as (procedure) in (someone)' mind, at last;__;__, It is clear, by my definition, that, "'=' is higher class 'algorithm-of-process' of 'think'."

"'make' is higher class 'algorithm-of-process' of 'think'."

In other words,

__ALGORITHM__ (someone) makes (something) __is__higher__class__of__ALGORITHM__ (someone) thinks (something).

As another example, let me discuss the lexical meaning of the verb, 'command'. 'Algorithm-of-processes' of the verb can be described using a quasi-C code. The lexical definition of 'command' is given by using my "sentence pattern of implementation of names of algorithms-of-processes", and "sentence pattern of function" as, __ALGORITHM__ (someone) command {some objects (someone)'s aim;__ something=(someone else)'s idea to attain the (someone)'s aim;__ (someone) makes ideas of some objects have a state which is judged and/or is felt to exist as (something) with a shape made of material substance;__}.

__FUNCTION__ (someone) commands;__ __translate__INPUT__ (someone)'s aim has a state which is judged and/or is felt to exist in (someone)'s mind, at first;__ —into__OUTPUT__ idea of (someone)'s aim have a state which is judged and/or is felt to exist as (someone else)'s idea to attain the (someone)'s aim with a shape of material substance, at last;__;__, It is clear, by my definition, that, "'have' is higher class 'algorithm-of-process' of 'command'."

"'=' is higher class 'algorithm-of-process' of 'command'."

And

"'make' is higher class 'algorithm-of-process' of 'command'."

In other words,

__ALGORITHM__ (someone) makes (something) __is__higher__class__of__ALGORITHM__ (someone) command.

As another example, let me discuss the lexical meaning of the verb, 'order'. 'Algorithm-of-processes' of the verb can be described using a quasi-C code. The lexical definition of 'order' is given by using my "sentence pattern of implementation of names of algorithms-of-processes", and "sentence pattern of function" as, __ALGORITHM__ (someone) order {some objects=(someone)'s hope to get goods;__ something=(someone else)'s idea to sell goods;__ (someone) makes ideas of some objects have a state which is judged and/or is felt to exist as (something) with a shape made of material substance;__}.

__FUNCTION__ (someone) orders __ __translate__INPUT__ (someone)'s hope to get goods has a state which is judged and/or is felt to exist in (someone)'s mind, at first;__ __into__OUTPUT__ idea of (someone)'s hope to get goods have a state which is judged and/or is felt to exist as (someone else)'s idea to sell goods with a shape of material substance, at last;__;__, It is clear, by my definition, that, "'=' is higher class 'algorithm-of-process' of 'order'."

"'make' is higher class 'algorithm-of-process' of 'order'."

In other words,

__ALGORITHM__ (someone) makes (something) __is__higher__class__of__ALGORITHM__ (someone) command.

As another example, let me discuss the lexical meaning of the verb, 'control'. 'Algorithm-of-processes' of the verb can be described using a quasi-C code. The lexical definition of 'control' is given by using my "sentence pattern of implementation of names of algorithms-of-processes", and "sentence pattern of function" as, __ALGORITHM__ (someone) controls (something) {some objects=(someone)'s procedure;__ something=(something)'s idea to operate the (someone)'s procedure;__ (someone) makes idea of some objects which is judged and/or is felt to exist as (something) with a shape of material substance;__}.

__FUNCTION__ (someone) commands;__ __translate__INPUT__ (someone)'s procedure has a state which is judged and/or is felt to exist in (someone)'s mind, at first;_ _into__OUTPUT__ idea of (someone)'s procedure which is judged and/or is felt to exist as (something)'s idea to operate the (someone)'s procedure with a shape of material substance, at last;__;__, It is clear, by my definition, that, "'=' is higher class 'algorithm-of-process' of 'command'."

"'make' is higher class 'algorithm-of-process' of 'command'."

In other words,

__ALGORITHM__ (someone) makes (something) __is__higher__class__of__ALGORITHM__ (someone) command.

As another example, let me discuss the lexical meaning of the verb, 'operate'. 'Algorithm-of-processes' of the verb can be described using a quasi-C code. The lexical definition of 'operate' is given by using my "sentence pattern of implementation of names of algorithms-of-processes", and "sentence pattern of function" as, __ALGORITHM__ (something) operates (procedure) {some object=(someone)'s (procedure);__ something=(something)'s work according to the (someone)'s (procedure);__ (someone) makes idea of some objects which is judged and/or is felt to exist as (something) with a shape of material substance;__}.

__FUNCTION__ (someone) operates (procedure);__ —translate_INPUT__ (someone)'s (procedure) has a state which is judged and/or is felt to exist in (someone)'s mind, at first;__ __into__OUTPUT__ idea of (someone)'s (procedure) which is judged and/or is felt to exist as (something)'s work according to the (someone)'s (procedure) with a shape of material substance, at last;__;__, It is clear, by my definition, that, "'=' is higher class 'algorithm-of-process' of 'operate'."

"'make' is higher class 'algorithm-of-process' of 'operate'."

In other words,

__ALGORITHM__ (someone) makes (something) __is__ higher__class__of__ALGORITHM__ (someone) operates (procedure).

As another example, let me discuss the lexical meaning of the verb, 'judge'. 'Algorithm-of-processes' of the verb can be described using a quasi-C code. The lexical definition of 'judge' is given by using my "sentence pattern of implementation of names of algorithms-of-processes", and "sentence pattern of function" as, __ALGORITHM__ (someone) judges {while( ){(someone) thinks;__ (someone) discusses;__ if((someone) gets the answer){break;__}}

It is clear, by my definition, that,

"'discuss', and 'think' are higher class 'algorithm-of-process' of 'judge'."

And

"if((someone) gets the answer){break;__}" is higher class 'algorithm-of-process' of 'judge'.

As another example, let me discuss the lexical meaning of the verb, 'travel'. 'Algorithm-of-processes' of the verb can be described using a quasi-C code. The lexical definition of 'travel' is given by using my "sentence pattern of implementation of names of algorithms-of-processes", "sentence pattern of function" and "sentence pattern of 'ideal thesaurus'", as,

```
__ALGORITHM__ (someone) travels
{
    another one = someone ;__
    ideal situation = (someone) gets to the destination ;__
    still another one = someone ;__
    to perform (something) = to move ;__
    (someone) acts ;__
}.
```

"'=' is higher class 'algorithm-of-process' of 'travel'."

"'act' is higher class 'algorithm-of-process' of 'travel'."

"'move' is higher class 'algorithm-of-process' of 'travel'."

As another example, let me discuss the lexical meaning of the verb, 'arrive'. It is used in the sentences such as, "Give me a call to let me know you've arrived safely." In the ⊙"Longman dictionary of contemporary English", the verb 'arrive' is defined as "to get to the place you are going to."

According to my opinion, I interpret this definition that, the 'quality', 'your position', is divided twofold into the 'at station' and the 'in transitional pass'. In this sense, this 'dichotomy of 'quality'' makes the verb 'arrive' more analytical and precise than the verb 'get'. In other words, the meaning of the verb 'arrive', contains the information of how the 'journey' occurred in a form of the 'dichotomy of 'quality''.

'Algorithm-of-processes' of the verb can be described using a quasi-C code. The lexical definition of 'arrive' is given by using my "sentence pattern of implementation of names of algorithms-of-processes", and "sentence pattern of function" as, __ALGORITHM__ (someone) arrives {(someone) has (position) which is judged to be and/or felt to be in transitional pass;__ while( ){(someone) travels;__ if((someone) has (position) which is judged to be and/or felt to be at a station){break;__}}}.

__FUNCTION__ (someone) arrives;__ __translate__INPUT__ (someone) has (position) which is in transitional pass, at first;__ __into__OUTPUT__ (someone) has (position) which is judged to be and/or felt to be at a station, at last;__;__.

It is clear, by my definition, that,

"'travel' is higher class 'algorithm-of-process' of 'arrive'."

In other words,

__ALGORITHM__ (someone) travels __is__higher__class__of__ALGORITHM__ (someone) arrives.

And

"'have' is higher class 'algorithm-of-process' of 'arrive'."

And

"if((someone) has (position) which is judged to be and/or felt to be at a station){break;__}" is higher class 'algorithm-of-process' of 'arrive'.

As another example, let me discuss the lexical meaning of the verb, 'depart'. It is used in the sentence such as, "The train for Edinburgh will depart from platform 5."

The verb 'depart' can be defined as

"to get into the way when you are starting a journey."

According to my opinion, I interpret this definition that, the quality, 'your position', is divided twofold into the 'at station' and the 'in transitional pass'. In this sense, this 'dichotomy of 'quality'' makes the verb 'depart' more analytical and precise than the verb 'get'. In other words, the meaning of the verb 'depart', contains the information of how the 'journey' occurred in a form of the 'dichotomy of 'quality''.

'Algorithm-of-processes' of the verb can be described using a quasi-C code. The lexical definition of 'depart' can be given by using my "sentence pattern of implementation of names of algorithms-of-processes", as, __ALGORITHM__ (someone) departs {(someone) has (position) which is judged to be and/or felt to be at a station;__ while( ){(someone) travels;__ if((someone) has (position) which is judged to be and/or felt to be in transitional pass){break;__}}}.

__FUNCTION__ (someone) departs;__ __translate__INPUT__ (someone) has (position) which is judged to be and/or felt to be at a station, at first;__ __into__OUTPUT__ (someone) has (position) which is judged to be and/or felt to be in transitional pass, at last It is clear, by my definition, that, "'travel' is higher class 'algorithm-of-process' of 'depart'."

In other words,

__ALGORITHM__ (someone) travels __is_higher__ class_of__ALGORITHM__ (someone) departs.

And

"'have' is higher class 'algorithm-of-process' of 'depart'."

And

"if((someone) has (position) which is judged to be and/or felt to be in transitional pass){break;__}" is higher class 'algorithm-of-process' of 'depart'."

As another example, let me discuss the lexical meaning of the verb, 'continue'. It is used in sentences such as, "The fighting continued for a week." In the ⓒ "Longman dictionary of contemporary English", the verb 'continue' is defined as "to keep happening."

First, I interpret this definition that, 'state of a (process)' is divided twofold into the 'in motion', and the 'out of motion'. In this sense, this 'dichotomy of 'quality'' makes the verb 'continue' more analytical and precise than the verb 'do'. In other words, the meaning of the verb 'continue', contains the information of how 'to do a (process)' in a form of the 'dichotomy of 'quality''.

'Algorithm-of-processes' of the verb can be described using a quasi-C code. The lexical definition of 'continue' is given by using my "sentence pattern of implementation of names of algorithms-of-processes", as, __ALGORITHM__ (someone) continue (process) {(process) has state which is judged to be and/or felt to be 'in motion';__ while( ){(someone) dose (process);__}.

__FUNCTION__ (someone) continue (process);__ —translate__INPUT__ (process) has state which is judged to be and/or felt to be in motion, at first;__ —into__OUTPUT__ (process) has state which is judged to be and/or felt to be in motion, at last;__;__, It is clear, by my definition, that, "'do' is higher class 'algorithm-of-process' of 'continue'."

And

"'have' is higher class 'algorithm-of-process' of 'continue'."

In other words,

__ALGORITHM__ (someone) dose (process) __is__ higher__class__of__ALGORITHM__ (someone) continue (process).

As another example, let me discuss the lexical meaning of the verb, 'break'. It is used in sentences such as, "The thieves got in by breaking a window."

The verb 'break' can be defined as

"to act so as to (something) separate."

First, I interpret this definition that, 'state of something' is divided twofold into the 'separate', and the 'in unity'. In this sense, this 'dichotomy of 'quality'' makes the verb 'break' more analytical and precise than the verb 'act'. In other words, the meaning of the verb 'break', contains the information how 'to perform' in a form of the 'dichotomy of 'quality''.

'Algorithm-of-processes' of the verb 'break' can be described using a quasi-C code. The lexical definition of 'break' is given by using my "sentence pattern of implementation of names of algorithms-of-processes", as, __ALGORITHM__ (someone) breaks (something) {(something) has state which is judged to be and/or felt to be in unity, at first;__ while( ){(someone) deals something;__ of(something has state which is judged to be and/or felt to be separate){break;__}}}.

__FUNCTION__ (someone) breaks (something);__ —translate__INPUT__ (something) has state which is judged to be and/or felt to be in unity, at first;__ —into__OUTPUT__ (something) has state which is judged to be and/or felt to be separate, at last;__;__, It is clear, by my definition, that, "'deal' is higher class 'algorithm-of-process' of 'break'."

In other words,

__ALGORITHM__ (someone) deals something __is__ higher__class__of__ALGORITHM__ (someone) breaks (something).

And

"'have' is higher class 'algorithm-of-process' of 'break'."

And

"if(something has state which is judged to be and/or felt to be separate){break;__}" is higher class 'algorithm-of-process' of 'break'.

As another example, let me discuss the lexical meaning of the verb, 'bring'. It is used in sentences such as, "Did you bring anything to drink?"

In the ⓒ "Longman dictionary of contemporary English", the verb 'bring' is defined as "to take something to the place you are now".

First, I interpret this definition that, 'position of something' is divided twofold into the 'the place you are now' and the 'the place far from you'. In this sense, this 'dichotomy of 'quality'' makes the verb 'bring' more analytically and precise than the verb 'take'. In other words, the meaning of the verb 'bring', contains the information of how the 'motion of take' occurred is described using the 'dichotomy of 'quality''.

'Algorithm-of-processes' of the verb can be described using a quasi-C code. The lexical definition of 'bring' is given by using my "sentence pattern of implementation of names of algorithms-of-processes", as, __ALGORITHM__ (someone) brings (something) {(something) has (position) which is judged to be and/or felt to be far from you, at first;__ while( ){(someone) takes (something);__ if((something) has (position) which is judged to be and/or felt to be at the place (someone) is now){break;__}}}.

__FUNCTION__ (someone) brings (something);__ —translate__INPUT__ (something) has (position) which is judged to be and/or felt to be far from you, at first;__ —into__OUTPUT__ (something) has (position) which is judged to be and/or felt to be at the place (someone) is now, at last;__;__, It is clear, by my definition, that, "'take' is higher class 'algorithm-of-process' of 'bring'."

In other words,

__ALGORITHM__ (someone) takes (something) __is__ higher__class__of__ALGORITHM__ (someone) brings (something).

And

"'have' is higher class 'algorithm-of-process' of 'bring'."

And

"if((something) has (position) which is judged to be and/or felt to be at the place (someone) is now) {break;__}" is higher class 'algorithm-of-process' of 'bring'.

As another example, let me discuss the lexical meaning of the verb, 'build'. It is used in sentences such as, "Are they going to build on this land?"

In the ⊙"Longman dictionary of contemporary English", the verb 'build' is defined as "to make something large."

First, I interpret this definition that, 'state of something' is divided twofold into the 'large' and the 'small'. In this sense, this 'dichotomy of 'quality'' makes the verb 'build' more analytical and precise than the verb 'make'. In other words, the meaning of the verb 'build', contains the information of how the 'process of making' occurred in a form of the 'dichotomy of 'quality''.

'Algorithm-of-processes' of the verb can be described using a quasi-C code. The lexical definition of 'build' is given by using my "sentence pattern of implementation of names of algorithms-of-processes", as, __ALGORITHM__ (someone) builds (something) {(something) has state which is judged to be and/or felt to be small, at first;__ while( ){(someone) makes (something);__ if((something) has state which has judged to be and/or felt to be large){break;__}}.

__FUNCTION__ (someone) build (something);__ —translate__INPUT__ (something) has state which is judged to be and/or felt to be small, at first;__ __into__ OUTPUT__ (something) has state which is judged to be and/or felt to be large, at last;__;__, It is clear, by my definition, that, "'have' is higher class 'algorithm-of-process' of 'build'."

And

"'make' is higher class 'algorithm-of-process' of 'build'."

In other words,

__ALGORITHM__ (someone) make (something) __is__ higher__class__of__ALGORITHM__ (someone) build (something).

And

"if((something) has state which has judged to be and/or felt to be large){break;__}" is higher class 'algorithm-of-process' of 'build'.

As another example, let me discuss the lexical meaning of the verb, 'lift'. It is used in sentences such as, "He lifted his hands in a gesture of despair." In the ⊙"Longman dictionary of contemporary English", the verb 'lift' is defined as "to move something upwards into the air."

First, I interpret this definition that, 'position of something' is divided twofold into the 'in the air' and the 'on the ground'. In this sense, this 'dichotomy of 'quality'' makes the verb 'lift' more analytically than the verb 'move'. In other words, the meaning of the verb 'lift', contains the information of how the 'process of moving' occurred is described using the 'dichotomy of 'quality''.

'Algorithm-of-processes' of the verb can be described using a quasi-C code. The lexical definition of 'lift' is given by using my "sentence pattern of implementation of names of algorithms-of-processes", as, __ALGORITHM__ (someone) lifts (something) {(something) has (position) which is judged to be and/or felt to be on the ground, at first;__ while( ){(someone) moves (something) if((something) has (position) which is judged to be and/or felt to be in the air){break;__}}}.

__FUNCTION__ (someone) lifts (something);__ —translate__INPUT__ (something) has (position) which is judged to be and/or felt to be on the ground, at first __ __into__OUTPUT__ (something) has (position) which is judged to be and/or felt to be in the air, at last;__, It is clear, by my definition, that, "'have' is higher class 'algorithm-of-process' of 'lift'."

And

"'move' is higher class 'algorithm-of-process' of 'lift'."

In other words,

__ALGORITHM__ (someone) moves (something) __is__ higher__class__of__ALGORITHM__ (someone) lifts (something).

And

"if((something) has (position) which is judged to be and/or felt to be in the air){break;__}" is higher class 'algorithm-of-process' of 'lift'."

As another example, let me discuss the lexical meaning of the verb, 'take'. It is used in sentences such as, "Don't forget to take your bag when you go."

In the ⊙"Longman dictionary of contemporary English", the verb 'take' is defined as "to move something from one place to another."

First, I interpret this definition that, '(position) of (something)' is divided twofold into the 'one place' and the 'another place'. In this sense, this 'dichotomy of 'quality'' makes the verb 'take' more analytical and precise than the verb 'move'. In other words, the meaning of the verb 'take', contains the information of how the 'process of moving' occurred in a form of the 'dichotomy of 'quality''.

'Algorithm-of-processes' of the verb can be described using a quasi-C code. The lexical definition of 'take' is given by using my "sentence pattern of implementation of names of algorithms-of-processes", as, __ALGORITHM__ (someone) takes (something) {(something) has (position) which is judged to be and/or felt to be one place, at first; while( ){(someone) moves (something);__ if((something) has (position) which is judged to be and/or felt to be another place) {break;__}}}.

__FUNCTION__ (someone) takes (something);__ —translate__INPUT__ (something) has (position) which is judged to be and/or felt to be one place, at first;__ —into__OUTPUT__ (something) has (position) which is judged to be and/or felt to be another place, at last;__;__, It is clear, by my definition, that, "'move' is higher class 'algorithm-of-process' of 'take'."

In other words,

__ALGORITHM__ (someone) moves (something) __is__ higher__class__of__ALGORITHM__ (someone) takes (something).

And

"'have' is higher class 'algorithm-of-process' of 'take'."

And

"if((something) has (position) which is judged to be and/or felt to be another place){break;__}" is higher class 'algorithm-of-process' of 'take'.

As another example, let me discuss the lexical meaning of the verb, 'carry'. It is used in sentences such as, "A porter helped me carry my luggage."

In the ⊙"Longman dictionary of contemporary English", the verb 'carry' is defined as "to take something somewhere in your hands."

First, I interpret this definition that means 'lift and take'.

'Algorithm-of-processes' of the verb can be described using a quasi-C code. The lexical definition of 'carry' is given by using my "sentence pattern of implementation of names of algorithms-of-processes", as, __ALGORITHM__ (someone) carries (something) {(someone) lifts (something) (someone) takes (something);__}.

__FUNCTION__ __(someone) carries (something);__ —translate__INPUT__ (something) has (position) which is judged to be and/or felt to be on the ground, at first;__ __into__OUTPUT__ (something) has (position) which is judged to be and/or felt to be at another place, at last;__;__

It should be noted that the function defined in the last sentence in "sentence pattern of function", '(someone) carries (something);__' is regarded as a composite function made by using the output of '(someone) lifts (something);__' as the input of '(someone) takes (something);__'. This is reasonable if we carry out an inference that, if, "something has position which is judged to be and/or felt to be in the air", which is a situation after '(someone) lifts (something);__', then "something has position which is judged to be and/or felt to be in one place", which is a situation before "(someone) takes (something)".

This inference is based on the fact,

__NT__ air __is__a__kind__of__BT__ one place.

In this inference, one arrives at a sentence on the basis of other sentence by using a 'fact' described in a "sentence pattern of 'ideal thesaurus'". I call this type of inference that I introduced in the present invention, @[algorithm of sentence based object-oriented categorical syllogism]. (See later about the detailed definition about this algorithm).

It is clear, by my definition, that,

"'lift' is higher class 'algorithm-of-process' of 'carry'."

In other words,

__ALGORITHM__ (someone) lifts (something) __is__higher__class__of__ALGORITHM__ (someone) carries (something).

And,

"'take' is higher class 'algorithm-of-process' of 'carry'."

In other words,

__ALGORITHM__ (someone) takes (something) __is__higher__class__of__ALGORITHM__ (someone) carries (something).

Lexical Definition of 'compound verb'

A verb which is implemented as the name of an 'algorithm-of-process' by using "sentence pattern of implementation of names of algorithms-of-processes" which contains more than two sub-'algorithms-of-processes' is a 'compound verb'.

According to this definition, 'carry' is a 'compound verb'.

Lexical Definition of 'strategy'

Strategy is a detailed foresight. An ideal strategy tells just the procedure to be used as the measures to deal with any situation at any time.

Lexical Definition of 'procedure'

A procedure is the correct way of doing something.

As another example, let me discuss the lexical meaning of the verb, 'follow'. It is used in sentences such as, "Japanese school boys and girls are usually disciplined by their teacher to walk forming a row in a very good manners following their teacher when they go on a picnic to prevent traffic accidents."

The verb 'follow' is defined as

"to move behind something and/or someone in the same direction."

'Algorithm-of-processes' of the verb can be described using a quasi-C code. The lexical definition of 'follow' is given by using my "sentence pattern of implementation of names of algorithms-of-processes", as,

```
__ALGORITHM__ (someone) follows (something)
{
    while( )
    {
        the direction of motion of someone = the direction of motion of
        something ;__
        (someone) moves behind (something) ;__
    }
}
```

__FUNCTION__ (someone) follows (something);__ —translate__INPUT__ (someone) is behind (something), at first;__ __into__OUTPUT__ (someone) is behind (something), at last;__;__, It is clear, by my definition, that, "'move' is higher class 'algorithm-of-process' of 'follow'."

In other words,

__ALGORITHM__ (someone) moves behind (something) __is__higher__class__of__ALGORITHM__ (someone) follows (something).

And

"'=' is higher class 'algorithm-of-process' of 'follow'."

As another example, let me discuss the lexical meaning of the verb, 'chase'. It is used in sentences such as, "Outside the door, kids were yelling and chasing each other." In the ⓒ"Longman dictionary of contemporary English", the verb 'chase' is defined as "to quickly follow someone and/or something in order to catch them."

First, I interpret this definition that, 'state of (process) of following to catch' is divided twofold into the 'to have been performed' and the 'not to have been performed'. In this sense, this 'dichotomy of 'quality'' makes the verb 'chase' more analytical and precise than the verb 'follow'. In other words, the meaning of the verb 'take', contains the information of how the 'process of following' in a form of the 'dichotomy of 'quality''.

'Algorithm-of-processes' of the verb can be described using a quasi-C code. The lexical definition of 'chase' is given by using my "sentence pattern of implementation of names of algorithms-of-processes", can be described as,

```
__ALGORITHM__ (someone) chases (something)
{
    another one = someone ;__
    ideal situation = (someone) catches (something) ;__
    still another one = someone ;__
    to perform (something) = to follow (something) ;__
    (someone) acts ;__
}.
```

__FUNCTION__ (someone) chases (something);__ —translate__INPUT__ (process) to catch has state which has not been acted, at first;__ __into__OUTPUT__ (process) to catch has state which has been action, at last;__;__, It is clear, by my definition, that, "'follow' is higher class 'algorithm-of-process' of 'chase'".

In other words,

__ALGORITHM__ (someone) follows (something) __is__ higher__class__of__ALGORITHM__ (someone) chases (something).

and

"'act' is higher class 'algorithm-of-process' of 'chase'".

In other words,

__ALGORITHM__ (someone) acts __is__higher__class__of__ALGORITHM__ (someone) chases (something)

And

"'=' is higher class 'algorithm-of-process' of 'chase'".

By my definition, any higher class 'algorithm-of-process' of 'act' and/or of 'follow' is a higher class 'algorithm-of-process' of 'chase'.

And

"'catch' is higher class 'algorithm-of-process' of 'chase'".

In other words,

__ALGORITHM__ (someone) catches (something) __is__ higher__class__of__ALGORITHM__ (someone) chases (something)

'Chase' is another example of a 'compound verb'.

As another example, let me discuss the lexical meaning of the verb, 'prevent'.

'Algorithm-of-processes' of the verb can be described using a quasi-C code. The lexical definition of 'prevent' is given by using my "sentence pattern of implementation of names of algorithms-of-processes", as,

```
__ALGORITHM__ (someone) prevent (something)
{
    ideal situation = (something) can not happen ;__
    to perform (something) = to perform (something) ;__
    (someone) acts ;__
}.
```

__FUNCTION__ (someone) prevent (something);__ —translate__INPUT__ (something) may happen;__ —into__OUTPUT__ (something) can not happen.;__;__, It is clear, by my definition, that, "'act' is higher class 'algorithm-of-process' of 'prevent'".

In other words,

__ALGORITHM__ (someone) acts __is__higher__class__of__ALGORITHM__ (someone) prevents (something).

And

"'perform' is higher class 'algorithm-of-process' of 'prevent'".

By my definition, any higher class 'algorithm-of-process' of 'act' and/or 'perform' is a higher class 'algorithm-of-process' of 'prevent'.

As another example, let me discuss the lexical meaning of the verb, 'stop'. 'Algorithm-of-processes' of the verb can be described using a quasi-C code. The lexical definition of 'stop' is given by using my "sentence pattern of implementation of names of algorithms-of-processes", as,

```
__ALGORITHM__(someone) stops (something)
{
    (something) has state which is judged to be in motion ;__
    (someone) performs a process ;__
```

-continued

```
    (something) has state which is judged to be out of motion ;__
}.
```

__FUNCTION__ (someone) stops (something);__ —translate__INPUT__ (something) has state which is judged to be in motion;__ __into__OUTPUT__ (something) has state which is judged to be out of motion.;__;__, It is clear, by my definition, that, "'perform' is higher class 'algorithm-of-process' of 'stop'".

In other words,

__ALGORITHM__ (someone) performs a (process) __is__ higher__class__of__ALGORITHM__ (someone) stops (something).

And

"'have' is higher class 'algorithm-of-process' of 'stop'".

In other words,

__ALGORITHM__ (something) has state that is judged to be in motion __is__higher__class__of__ALGORITHM__ (someone) stops (something).

__ALGORITHM__ (something) has state that is judged to be out of motion __is__higher__class__of__ALGORITHM__ (someone) stops (something).

By my definition, any higher class 'algorithm-of-process' of 'perform' and/or 'have' is a higher class 'algorithm-of-process' of 'stop'.

As another example, let me discuss the lexical meaning of the verb, 'catch'. It is used in sentences such as, "If the guerrillas catch you, they will kill you, and vv."

In the © "Longman dictionary of contemporary English", the verb 'catch' is defined as "to stop someone after you have been chasing them and prevent them from escaping."

First, I interpret this definition that means 'stop and trap'.

'Algorithm-of-processes' of the verb can be described using a quasi-C code. The lexical definition of 'catch' is given by using my "sentence pattern of implementation of names of algorithms-of-processes", as, __ALGORITHM__ (someone) catches (someone else) {(someone) stops (someone else);__ (someone) prevents (someone else) from escaping;__}.

__FUNCTION__ (someone) catches (someone else);__ —translate__INPUT__ (someone else) has state which is judged to be and/or felt to be free, at first;__ __into__OUTPUT__ (someone else) has state which is judged to be and/or felt to be bound, at last;__;__, It is clear, by my definition, that, "'stop' is higher class 'algorithm-of-process' of 'catch'."

In other words,

__ALGORITHM__ (someone) stops (someone else) __is__ higher__class__of__ALGORITHM__ (someone) catches (someone else).

And

"'prevent them from escaping' is higher class 'algorithm-of-process' of 'catch'."

In other words,

__ALGORITHM__ (someone) prevents (someone else) from escaping __is__higher__class__of__ALGORITHM__ (someone) catches (someone else).

This is another example of a 'compound verb'.

Here just I have shown how the procedure described by a sentence 'someone catches someone else' is implemented (=how the detail procedure described by a sentence 'someone catches someone else' is embodied). The sentence describes an abstract and general situation. Now I will show how the procedure described by a sentence describing more practical situation is implemented. Here, I give an example in which the procedure described by a sentence "A cat catches a rat" is implemented:

__ALGORITHM__a cat catches a rat {someone=a cat;__ someone else=a rat;__ someone stops someone else;__ someone prevents someone else from escaping;__}.

In this sentence described in "sentence pattern of implementation of names of algorithms-of-processes", two sentences, someone=a cat;__, and, someone else=a rat;__, where '=' is the 'assignment operator', are added to the sentence in "sentence pattern of implementation of names of algorithms-of-processes" implementing the procedure denoted by a sentence 'someone catches someone else' is implemented.

A sentence,

__ALGORITHM__ (a cat) catches (a rat) {(a cat) stops (a rat);__ (a cat) prevents (a rat) from escaping;__}.

is equivalent to the sentence,

__ALGORITHM__ a cat catches a rat {someone=a cat;__ someone else=a rat;__ someone stops someone else;__ someone prevents someone else from escaping;__}.

Lexical Definition of "Instance of a Sentence Described in "Sentence Pattern of Implementation of Names of Algorithms-of-Processes""

If some practical and/or specific nouns are assigned to some abstract and general nouns by using the 'assignment operator', and sentences using such 'assignment operator' are added in a sentence in "sentence pattern of implementation of names of algorithms-of-processes", and another sentence in "sentence pattern of implementation of names of algorithms-of-processes" is formed, then, the latter sentence in "sentence pattern of implementation of names of algorithms-of-processes" is an "instance of a sentence in "sentence pattern of implementation of algorithms-of-processes"" of the former sentence in "sentence pattern of implementation of names of algorithms-of-processes". If a sentence is equivalent to an "instance of a sentence in "sentence pattern of implementation of names of algorithms-of-processes"", then the sentence is also regarded as an "instance of a sentence in "sentence pattern of implementation of names of algorithms-of-processes"".

It is recommended that the practical and/or specific nouns should be defined as narrower 'descriptors' of the abstract and general nouns, in an 'ideal thesaurus', by the maker of the contents of a database disclosed in the present invention.

For example, the sentence,

__ALGORITHM__ a cat catches a rat {someone=a cat;__ someone else a rat;__ someone stops someone else;__ someone prevents someone else from escaping;__}.

is an instance of a sentence

__ALGORITHM__ someone catches someone else {someone stops someone else;__ someone prevents someone else from escaping;__}.

And the sentence,

__ALGORITHM__ (a cat) catches (a rat) {(a cat) stops (a rat);__ (a cat) prevents (a rat) from escaping;__}.

is also an instance of a sentence

__ALGORITHM__ someone catches someone else {someone stops someone else;__ someone prevents someone else from escaping;__}.

And it is recommended that the practical and/or specific noun 'cat' and/or 'rat' should have be defined as a narrower 'descriptor' of 'someone' and/or 'someone else', by the maker of a database disclosed in the present invention when he makes an 'ideal thesaurus'.

As another example, let me discuss the lexical meaning of the verb, 'put'. It is used in sentences such as, "Put these carriages on the table."

The verb 'put' is defined as

"to make something still on something else."

'Algorithm-of-processes' of the verb can be described using a quasi-C code. The lexical definition of 'put' is given by using my "sentence pattern of implementation of names of algorithms-of-processes", as, __ALGORITHM__ (someone) puts (something) {
(something) is at somewhere;__
(someone) moves (something);__
(something) is standstill on (something else);__
}.

__FUNCTION__ (someone) puts (something);__ __translate__INPUT__ (something) is at somewhere;__ __into__OUTPUT__ (something) is standstill on (something else);__;__, It is clear, by my definition, that, "'be' is higher class 'algorithm-of-process' of 'put'."

In other words,

__ALGORITHM__ (something) is standstill on (something else) __is__higher__class__of__ ALGORITHM__ (someone) puts (something).

And

"'move' is higher class 'algorithm-of-process' of 'put'."

In other words,

__ALGORITHM__ (someone) moves along __is__higher__ class__of__ALGORITHM__ (someone) puts (something).

As another example, let me discuss the lexical meaning of the verb, 'walk'. It is used in sentences such as, "We must have walked ten miles today." In the ⓞ"Longman dictionary of contemporary English", the verb 'walk' is defined as "to move along putting one foot in front of the other."

'Algorithm-of-process' of the verb can be described using a quasi-C code. The lexical definition of 'walk' is given by using my "sentence pattern of implementation of names of algorithms-of-processes", as, __ALGORITHM__ (someone) walks {while({(someone) puts another foot in front of the other;__ (someone) moves along;__}.}.

__FUNCTION__ (someone) walks;__ __translate__ INPUT__ (someone) has state that is judged to be and/or felt to be out of motion, at first;__ __into__ OUTPUT__ (someone) has state that is judged to be and/or felt to be in motion, at last;__;__, It is clear, by my definition, that, "'put a foot' is higher class 'algorithm-of-process' of 'walk'."

In other words,

__ALGORITHM__ (someone) puts a foot __is__higher__ class__of__ALGORITHM__ (someone) walks.

"'move along' is higher class 'algorithm-of-process' of 'walk'."

In other words,

__ALGORITHM__ (someone) moves along __is__higher__ class__of__ALGORITHM__ (someone) walks.

A classification table of some intransitive verbs and some transitive verbs whose lexical defined are given above is listed in FIG. 23.

From my point of view, the dominant of 'ideal verbs' except for 'be' and/or '=' are usually a 'black box'; Here, a 'black box' is ideally a 'mapping' whose detailed way how the mapping is implemented (=embodied) is unknown; About the information of the implementation of the mapping of such a 'black box', only the abstract definitions of 'ideal verbs' using my "sentence pattern of function", such as shown above, is given.

It is clear from above discussions, that an 'ideal verb' is defined in two steps. In the first step, the geometric space and/or action divided twofold according to a 'dichotomy of 'quality''. In the second step, more abstract verb is shown as a method of to make a thing and/or action change from one of the division to the other in a finite time step. In other words, the dominant of the verbs are a 'black box', which maps the state of a matter and/or situation from one of the division to the other in a finite time step. As will be shown later in the present invention, I will give the lexical definition of @[algorithm of sentence based object-oriented categorical syllogism]. If and when, @[algorithm of sentence based object-oriented categorical syllogism]is used, then, the verbs can be used in propositions for reasoning if object-oriented knowledge base systems disclosed in the present invention, even while the details of the mechanism with which the verb maps are unknown.

A 'compound verb' can be defined using several 'ideal verbs'. This 'lexical definition of an 'ideal verb' according to a 'dichotomy of 'quality'' is very useful, because the two fold division of geometric space can be well defined if a critical boundary is defined mathematically. In an ideal cases, these are defined mathematically.

The 'lexical definition of a compound verb using "sentence pattern of implementation of names of algorithms-of-processes" on the basis of other compound verbs and/or ideal verbs' is also well defined. Both of the 'lexical definition of an ideal verb using "sentence pattern of implementation of names of algorithms-of-processes" on the basis of a 'dichotomy of 'quality'' and using "sentence pattern of classification'" and 'definition of a compound verb using "sentence pattern of implementation of names of algorithms-of-processes" is reasonably readable to human beings.

3.1.3.4. "Lexical Definitions of 'Ideal Verbs'" Given in 'Ideal Dictionaries'

Before giving the lexical definition of an 'ideal dictionary', let me show here an example of a way in which how a natural polysemous verb, 'abuse', is defined in an 'ideal dictionary'. As I mentioned before, a natural polysemous verb, 'abuse' has two lexical meanings. I give a name to each of these two lexical meanings of the natural polysemous noun 'abuse' as 'abuse 【use】', and, 'abuse 【say】'.

In other words, as I mentioned before, in the present example, these two 'ideal verbs' are used as a name denoting a lexical meaning of the natural polysemous verb 'abuse'. In an 'ideal dictionary', first, it is recommended that these two 'ideal verbs', as well as, the three 'ideal nouns', which I have mentioned before in the present invention, should be listed in a sentence described in what I call a "sentence pattern of a list of the names of the lexical meanings of a natural word". The lexical definition of "sentence pattern of a list of the names of the lexical meanings of a natural word" will be given later in the present invention. But here, I just only show, as an example, a sentence described in "sentence pattern of a list of the names of the lexical meanings of a natural word" for the natural polysemous noun 'abuse', this time in a complete form:

__ListOfLexicalMeaningsOf__ abuse __—>__ __<<Noun KW>> __=__ __(abuse 【usage】)__,__(abuse 【word】)__,__ (abuse 【treatment】)__.__『Verb__KW』__=__ __{abuse 【use】}__,__{abuse 【say】}__.

The detailed explanation about this complete form of a sentence described in "sentence pattern of a list of the names of the lexical meanings of a natural word" for the natural polysemous word 'abuse' will be shown later in the present invention. According to a lexical definition given later in the present invention, I call a sentence written in "sentence pattern of a list of the names of the lexical meanings of a natural word", a 'means for storing the list of lexical meanings of a natural word'. For detail, see the lexical definition of "sentence that store the list of lexical meanings of a natural word" and the lexical definition of 'means for storing the list of lexical meanings of a natural word', which will be given later in the present invention. If an 'ideal dictionary' that has a recommended constitution is to be constructed, then, it is recommended that "a key described using 'means for storing the list of lexical meanings of a natural word'" should be used as a components of an 'ideal dictionary', in the case when the lexical definition a verb is given in an 'ideal dictionary' as well as in the case when the lexical definition a noun is given in an 'ideal dictionary'. (See FIG. 6).

As I mentioned before in the present invention, it is recommended that an 'ideal dictionary' should have another component. That is, it is recommended that an 'ideal dictionary' should comprise not only "a key described using 'means for storing the list of lexical meanings of a natural word'" but also what I call "keys giving lexical definition of a lexical meaning" in a case when the lexical definition a verb is given in an 'ideal dictionary'. (See FIG. 6)

As I described before, A "key giving lexical definition of an 'ideal noun'" and/or a "key giving lexical definition of an 'ideal verb'" is a "key giving lexical definition of a lexical meaning". This lexical definition is schematically shown in FIG. 6. I have already given the lexical definition of "key giving lexical definition of an 'ideal noun'". The lexical definition of a "key giving lexical definition of an 'ideal verb'" will be given later in the present invention. Hire, now, first, I will give an example in which the way the lexical definition of the 'ideal verb', 'abuse' is given.

As the lexical meaning of an 'ideal verb', for example, 'abuse 【use】', in some dictionaries, sentences like "to deliberately use something such as power of authority, for wrong purpose", are used as a lexical meaning of the natural verb 'abuse'. In the present invention, I analyze this lexical meaning into, three sentences, 1) 'abuse 【use】' is classified as one style of 'use', 2) during the process when someone abuses 【use】 power of authority, in the first step, wrong purpose is not achieved, and in the second step, someone uses power of authority, and in the last step, wrong purpose is achieved.

"Sentence 1)" is what I call a "sentences that store data of classification table", whose lexical definition will be given later in the present invention. It is recommended in an object-oriented knowledge base system disclosed in the present invention, that a "sentences that store data of classification table" should be formally described in what I call "sentence pattern of classification", which will be defined later in the present invention. Hire, now, I will give an example in which the way how the "the sentence 1)" is formally described in my "sentence pattern of classification" in a simplified way, as follows:

__ALGORITHM__ use __is__higher__class__of__ ALGORITHM__ abuse [use].

How the "the sentence 1)" is formally described in my "sentence pattern of classification" in a complete way will be shown later in the present invention. According to my lexical definition given later in the present invention, a "sentences that store data of classification table" is called a 'means for storing data of ideal classification table'. In an object-oriented knowledge base system, however, 'means for storing data of ideal classification table' is not necessarily an indispensable component of an 'ideal dictionary', because, an 'ideal classification table' almost always contains 'means for storing data of ideal classification table'. Therefore, in the 'ideal thesaurus' schematically shown in FIG. 6, the component, "keys described using 'means for storing data of ideal classification table', is omitted.

By my definition which has already given in the present invention, "sentence 2)" is a sentence described in what I call "sentence pattern of implementation of names of algorithms-of-processes". It is recommended that in an object-oriented knowledge base system in the present invention, a sentence described in "sentence pattern of implementation of names of algorithms-of-processes" should be described in a formal way. For example, in the case of abuse [use], the following formal sentence is recommended to be used:

__ALGORITHM__ __{abuse [use]}__ {wrong purpose is not achieved, at first;__ someone uses power of authority;__ wrong purpose is achieved, at last}, In this example, the verb, '{abuse [use]}__', is implemented as the name of an 'algorithms-of-processes' by using the body of the 'algorithms-of-processes', "{wrong purpose is not achieved, at first;__ someone uses power of authority;__ wrong purpose is achieved, at last}".

This example has somewhat simplified style. An example with complete style will be shown later. According to my definition which has already been given in the present invention, a sentence described in "sentence pattern of implementation of names of algorithms-of-processes" is a 'means for implementation of names of algorithms-of-processes'. In general, it is recommended that "keys described using 'means for implementation of names of algorithms-of-processes'" should be used as a "key giving lexical definition of an 'ideal verb'" in an object-oriented knowledgebase system, disclosed in the present invention. This is schematically shown in FIG. 6.

"Sentence 2)" also shows that 'abuse [use]' has a function to change the present situation from, "wrong purpose is not achieved" to the final situation "wrong purpose is achieved". According to a lexical definition given later in the present invention, This can be described by using a sentence described in "sentence pattern of function" as, __FUNCTION__ {abuse [say]}__ __translate__INPUT__ wrong purpose is not achieved, at first;__ __into__ OUTPUT__ wrong purpose is achieved, at last.

This sentence in "sentence pattern of function" describes how the verb __{abuse [say]}__ works as a function, by explicitly showing the input and the output of the function. According to a lexical definition given later in the present invention, a sentence described in "sentence pattern of function" is a 'means for describing a function used as a rule'. In general, it is recommended that "keys described using 'means for describing a function used as a rule'" should be used as a "key giving lexical definition of an 'ideal verb'" in an object-oriented knowledgebase system disclosed in the present invention. This is schematically shown in FIG. 6.

Roughly speaking, I claim that a polysemous 'natural-verb' corresponds to a concept, and each lexical meaning of the polysemous 'natural-verb' corresponds to a category. I claim that in ideal cases, an 'algorithm-of-process' corresponds to 'a category'. In ideal cases, I regard an 'ideal verb' as the name of an 'algorithm-of-process'. And I regard a 'name-of-classification-item' as the 'ideal verb' registered in an 'ideal classification table'.

Lexical Definition of a "Key Giving Lexical Definition of an 'Ideal Verb'"

A "key giving lexical definition of an 'ideal verb'" is a sentence which gives lexical definition of an 'ideal verb'. It is recommended that a "key described using 'means for implementation of names of algorithms-of-processes'" and a "key described using 'means for describing the function of a verb'" should be used as a "key giving lexical definition of an 'ideal verb'" in an object-oriented knowledge base system disclosed in the present invention.

This lexical definition is schematically shown in FIG. 6.

The lexical definition of 'means for describing the function of a verb' will be given later in the present invention.

Lexical Definition of an 'ideal dictionary' (Part 2 about lexical definition of 'ideal verbs')

An 'ideal dictionary' is a kind of dictionary. When the lexical meaning of an 'ideal verb' is given in an 'ideal dictionary', then, it is recommended that a 'means for implementation of names of algorithms-of-processes' and 'means for describing the function of a verb' should be used.

An 'ideal dictionary' is usually used in an object-oriented knowledge base system disclosed in the present invention. It is recommended, in an 'ideal dictionary', that the information about the list of not only the 'ideal nouns' but also the 'ideal verbs' corresponding to the lexical meanings of a natural polysemous word, should be described in a sentence in "sentence pattern of a list of the names of the lexical meanings of a natural word". See the lexical definition of "sentence pattern of a list of the names of the lexical meanings of a natural word", which has already given in the present invention.

It is also recommended that in an 'ideal dictionary', 'the content' of 'each of the lexical meanings of 'natural-verb'' (i.e. 'the content' of 'one set of the particular qualities characterizing a category which is used to represent linguistically 'the idea of image of a process'') should be explained in sentences in what I call "sentence pattern of implementation of names of algorithms-of-processes" and/or in what I call a sentence in "sentence pattern of function" and/or in some cases in a sentence described in what I call "sentence pattern of classification". The lexical definition of "sentence pattern of classification" and of "sentence pattern of function" will be given later in the present invention.

According to my lexical definition given later in the present invention, a sentence described in "sentence pattern of classification" is called a 'means for storing data of classification table in a formal way'. But 'means for storing data of classification table in a formal way' is not an essential part of an 'ideal dictionary', because the same information is usually stored in an 'ideal classification table' (See FIG. 3). It should be noted that the description in an 'ideal dictionary' and an 'ideal classification table' should be consistent. One of the best way of keeping such consistency is to eliminate all the sentences described in "sentence pattern of classification" from an 'ideal dictionary', when the object-oriented knowledge base system disclosed in the present invention is very large. In this case, it is recommended that only the pointer to the sentences described in "sentence pattern of classification" should be stored in the 'ideal dictionary'.

Of course, other media than characters and/or letters in a text, for example, such as pictures, photos, sounds, and/or other multimedia may be used as an accessory of an 'ideal dictionary'.

3.1.3.5. 'Ideal Classification Table'

Lexical Definition of 'ideal classification table'

Figure 3:
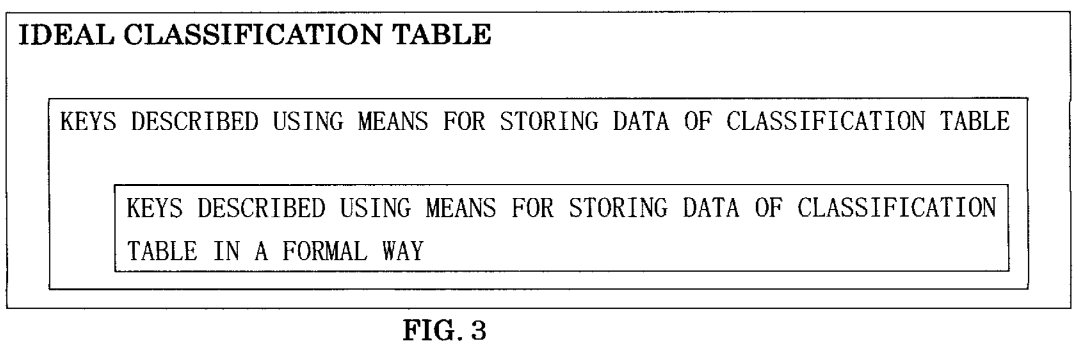
FIG. 3 shows a recommended constitution of an ideal classification table.

'Ideal classification table' is a classification table in which 'ideal verb' is classified. It is recommended, in a 'classification table', sentences used to classify 'ideal verbs' should be described in my "sentence pattern of classification", whose definition will be given later in the present invention. Such a 'classification table', is an 'ideal classification table'. This issue is schematically shown in FIG. 3

3.1.4. 'Ideal Dictionary'

Let me show here an example; the natural word 'abuse' is a polysemous. If one consults the Longman "Dictionary of Contemporary English", then, one finds that the natural word 'abuse' is used both as a noun and as a verb. The 'natural-noun' 'abuse' is a polysemous, and the 'natural-verb''abuse' is also a polysemous.

According to my definition, a lexical meaning of the 'natural-noun' 'abuse' corresponds to an 'ideal noun'. For the sake of simplicity, let us assume here a case in which all these 'ideal nouns' are 'descriptors'. That is, let us assume here a case in which all these 'ideal nouns' are registered in a 'thesaurus'.

According to my definitions and assumptions, a lexical meaning of the 'natural-verb' 'abuse' corresponds to an 'ideal verb'. For the sake of simplicity, let us assume here a case in which all these 'ideal verbs' are 'name-of-classification-item'. That is, let us assume here a case in which all these 'ideal verbs' are registered in a 'classification table'.

At this moment, I do not explicitly shown the way in detail how a verb such as 'abuse' is systematically classified. (See later parts of the present invention about details of how I classify verbs); I just comment at this moment that verbs are classified on the basis of what I call "sentence pattern of implementation of names of algorithms-of-processes", which I disclose in the present invention.

Instead of giving strict description here, I just give here one simple example of a hierarchy existing among verbs; A verb 'abuse' means an instance of a procedure of 'use' under a special situation. In this sense, the verb 'abuse' is classified as lower class of a verb 'use' in the present invention.

From now on, a 'descriptor' is described in parenthesis, using __(and)__. From now on, a 'name-of-classification-item' is described in parenthesis, using __{and }__.

Let us show some detailed example.

Lexical meanings of 'natural-noun' 'abuse' includes,

1)"the use of something in a way that should not be used"; Let me denote this lexical meaning by a 'descriptor', __(abuse 【usage】)__, 2)"rude and/or offensive things that someone says to someone else"; Let me denote this lexical meaning by a 'descriptor', __(abuse 【word】)__, and, 3) "cruel or violent treatment, often sexually, especially someone that you should look after"; Let me denote this lexical meaning by a 'descriptor', __(abuse 【treatment】)__

On the other hand, lexical meanings of 'natural-verb' 'abuse' includes,

1)"to deliberately use something such as power of authority, for wrong purpose"; Let me denote this lexical meaning by a 'names-of-classification-items', __{abuse 【use】}__, and, 2)"to say rude and/or offensive things to someone"; Let me denote this lexical meaning by a 'names-of-classification-items', __{abuse 【say】}__.

Part of the information thus given can be described in a formal way, if "sentence pattern of a list of the names of the lexical meanings of a natural word" disclosed in the present invention, is used; That is, __ListOfLexicalMeaningsOf__ abuse __—>__ —<<NounKW>> __=__ __(abuse 【usage】)__,__(abuse 【word】)__,__(abuse 【treatment】)__.__『VerbKW』 __=__ —{abuse 【use】}__,__{abuse 【say】}__., in which, 'descriptors' associated with the natural word 'abuse' are enumerated below '__—>__ __<<Noun__ KW>> __=__', and are parenthesized in __(and)__. And 'names-of-classification-items' associated with the natural word 'abuse' are enumerated below '.__『VerbKW』__=__' and are parenthesized in __{ and }__, punctuated by ','.

<<Lexical Definition of "sentence pattern of a list of the names of the lexical meanings of a natural word">> General form of "sentence pattern of a list of the names of the lexical meanings of a natural word" is given by, __ListOfLexicalMeaningsOf__ * __—>___<<Noun__ KW>> __=__, . . . , ,__()__,__()__, . . . ,__()__.__『VerbKW』 __=__ *, . . . , *,__ {*}__,__{*}__, . . . ,__*}__., where, the '*' is a natural word listed in a usual dictionary, and a '**' is an 'ideal noun' associated with the natural word. And an 'ideal noun' parenthesized in __(and)__ is a 'descriptor'. And a '*' is an 'ideal verb' associated with the natural word. And an 'ideal verb' parenthesized in __{ and }__ is a 'name-of-classification-item'. That is, a '__()__' and a '' corresponds to one of the lexical meanings of the natural word '*' used as a noun. And, a '__{***}__' and a '*' corresponds to one of the lexical meanings of the natural word '*' used as a verb.

Lexical Definition of "sentences that store the list of lexical meanings of a natural word"

A sentence written in "sentence pattern of a list of the names of the lexical meanings of a natural word" and/or in its equivalent is a "sentence which store the list of lexical meanings of a natural word".

Lexical Definition of 'Means for Storing the List of Lexical Meanings of a Natural Word'

"Sentence which stores the list of lexical meanings of a natural word" and/or something that stores the information of it, is a 'means for storing the list of lexical meanings of a natural word'.

Lexical Definition of an 'ideal dictionary'

An 'ideal dictionary' is a kind of dictionary disclosed in the present invention. It is recommended, in an 'ideal dictionary', that the information about the list of not only the 'ideal nouns' but also the 'ideal verbs' corresponding to the lexical meanings of a natural polysemous word, should be described in a sentence in "sentence pattern of a list of the names of the lexical meanings of a natural word". It is recommended that in an 'ideal dictionary', 'the content' of 'each of the lexical meanings of 'natural-verb'' should be explained in sentences in "sentence pattern of implementation of names of algorithms-of-processes" and/or in a sentence in "sentence pattern of function" and/or when the system is small, in a sentence in "sentence pattern of classification". (See later discussion about the details of "sentence pattern of classification" and "sentence pattern of function"). It is recommended that in what I call an 'ideal dictionary', 'the content' of 'each of the lexical meanings of 'natural-nouns'' is explained in sentences in "sentence pattern of definition of object" and/or when the system is small, in sentences in "sentence pattern of 'ideal thesaurus'". (See the lexical definition of "sentence pattern of definition of object" given elsewhere in the present invention). (See the lexical definition of "sentence pattern of 'ideal thesaurus'" given elsewhere in the present invention). Of course, other media than characters and/or letters, such as pictures, photos, sounds, and/or multimedia may be used as an accessory in an 'ideal dictionary'.

First, in an 'ideal dictionary' of an object-oriented knowledge base system disclosed in the present invention, it is recommended that the lexical definition of an 'ideal noun', '* * * *', should be given, as a lexical meaning of a 'natural-noun', and that the lexical definition of an 'ideal noun', should be given in a formal way using sentences in "sentence pattern of definition of object", and that when the 'ideal noun' is a 'descriptor', the relation between the 'ideal noun' and its broader 'descriptors', should be given, as an additional lexical meanings of the 'ideal noun', in a formal way using sentences in "sentence pattern of 'ideal thesaurus'", when the object-oriented knowledge base system is small, and else if the object-oriented knowledge base system is large, then, the pointer to the sentences in "sentence pattern of 'ideal thesaurus'" should be stored in an 'ideal dictionary', and the body of the sentences in "sentence pattern of 'ideal thesaurus'" should not be stored in an 'ideal dictionary'

Second, in an 'ideal dictionary' of an object-oriented knowledge base system disclosed in the present invention, it is recommended that the lexical definition of an 'ideal verb', '* * * * *', should be given, as a lexical meanings of a 'natural-verb', in a formal way in sentences in "sentence pattern of implementation of names of algorithms-of-processes"

and that when the 'ideal verb' is a 'name-of-classification-item', the relation between the 'name-of-classification-item' and its higher class 'names-of-classification-items' should be given, as additional lexical meanings of the 'ideal verb', in a formal way using sentences in "sentence pattern of classification", if the object-oriented knowledge base system is small, and, else if the object-oriented knowledge base system is large, the pointer to the sentences in "sentence pattern of classification" should be stored in the 'ideal dictionary', and the body of the sentences in "sentence pattern of classification" should be stored in the 'ideal dictionary' should not be stored in an 'ideal dictionary'.

If I summarize above discussion, "If one wants to put verbs whose lexical meaning is defined in an 'ideal dictionary' in order, then, it is recommended that one should use 'classification table'. And if one wants to put 'ideal nouns' whose lexical meaning is defined in an 'ideal dictionary' in order, then it is recommended that one should use 'thesaurus'.

3.1.5. "Sentence pattern of Association"

Let us get back to the issue of descriptors in databases and in knowledge bases. As a matter of fact, for expert makers and/or expert users of a database, it is an easy task to tell appropriate 'descriptors' just expressing the idea, when natural words are given to them. But as different thesauruses are used in different databases. And as thesaurus is revised from time to time, this task is difficult even for experts even in the field of their own specialty.

As a way out of this problem, I disclose in the present invention a way in which makers of contents of a database pile up data in which 'descriptors' and/or 'names-of-classification-items' are correlated with corresponding context of 'natural-nouns' and/or of 'natural-verbs'. In other words, I disclose "sentence pattern of association" here in the present invention with which to formalize such data. Before describing the detail of this method strictly, I give explanation by using exemplifying data in the form of "sentence pattern of association", step by step.

As a matter of fact, in the context of

"'spoiled sheriff's abuse of power in a Western film", the word 'abuse' means (abuse ⟦usage⟧)_.

On the other hand, in the context of

"stream of abuse", the word 'abuse' means (abuse ⟦word⟧)_.

In most cases, as I mentioned here, the context specifies the lexical meaning of a word.

Lexical Definition of "sentences that store data providing the ability of association"

"Sentences that store data providing the ability of association" are sentences in which a context and 'descriptors' and/or 'names-of-classification-items' that are associated with the context comprising natural words are shown.

Lexical Definition of means for storing data providing the ability of association "Sentence which stores data providing the ability of association" and/or something that stores the information of it, is a means for storing data providing the ability of association.

I regard each of the previously shown two examples of contexts, "spoiled sheriff's abuse of power in Western films" and "stream of abuse" as an example of "the least context of natural words necessary to determine the 'descriptors' and/or the 'names-of-classification-items' corresponding uniquely to the polysemous". It is recommended that "sentences that store data providing the ability of association" should be recorded in "sentence pattern of association". The lexical definition of "sentence pattern of association" will be given later in the present invention. As an example of sentences in "sentence pattern of association", we can show the following two sentences, __Association__spoiled sheriff's abuse of power in a Western film __->___<<Noun__KW>>__=___(spoiled sheriff 【man】)__, __(abuse 【usage】)__, __(power 【authority】)__.

and

Association__ stream of abuse __->___<<Noun__KW>>__=___(stream 【continuous series】)__, __(abuse 【word】)__, where a context of natural words is put between'__Association__' and '__>___≪Noun__KW>>__=__'. And the 'descriptors' a associated with the context are enumerated below '__<<Noun__KW>>__=__'.

Let me assume a situation in which these two keys are registered in an object-oriented knowledge base system disclosed in the present invention. And then, let us assume in addition a situation in which only four 'descriptors', __(spoiled sheriff 【man】)__, __(abuse 【usage】)__, __(stream 【continuous series】)__, and __(abuse 【word】)__included in these two keys are obtained, when a user of the present object-oriented knowledge base system makes a retrieval using the word 'abuse'. If the user of the system meant 'abuse' in the sense of 'use', the principle target of the user of the system is only __(abuse 【usage】)__, and all of __(spoiled sheriff 【man】)__, __(stream 【continuous series】)__, and __(abuse【word】)__ are noises. One of the noises, __(abuse【work】)__ is surely a useless noise. But as a matter of fact, the other noises __(spoiled sheriff 【man】)__ is actually a word which some people associates when they hear the word __(abuse 【usage】)__. I claim that this type of association gives in many cases valuable information that make the retrieval omission-free, rich and robust.

Lexical Definition of "sentence pattern of association" (Part 1)

One of the general form of "sentence patterns of association" (i.e. sentence patterns of category-concept correspondence) is defined as follows.

__Association__ 'necessary shortest context of a natural language'__->___≪Noun__KW>>__=___(a 'descriptor')__, __(a 'descriptor')__, . . . ,__(a 'descriptor')__.__『Verb__KW』__=___{a 'name-of-classification-item'}__, . . . , __{a 'name-of-classification-item'}__, as the general form.

Here, 'necessary shortest context of a natural language' means the shortest context of natural words that are necessary to uniquely determine the 'descriptors' associated with the polysemous and/or the 'names-of-classification-items' associated with the polysemous.

As mentioned before, in ideal cases, a 'descriptor' is an 'ideal noun' registered in a 'thesaurus', and a 'name-of-classification-item' is an 'ideal verb' registered in an 'ideal classification table'.

Sentences, clauses, and/or phrases may be used as such a context. And even a single isolate word may also be used as such a 'context'. The context of natural words and the 'descriptors' are divided by '__->__'. The 'descriptors' associated with the 'necessary shortest context of a natural language' are enumerated below '__<<Noun__KW≫__=__', and are parenthesized in '__(' and ')__', punctuated by ', '; It is recommended that as narrower 'descriptors' as possible should be put below '__<<Noun__KW>>__=__'. And it is recommended that when such a 'descriptor' is put below __<<Noun__KW>>__=, broader terms of the 'descriptor' should not be put below '__<<Noun__KW>>__='. The present object-oriented knowledge base system knows which descriptor is a boarder descriptor of which descriptor. If the maker of the contents of the object-oriented knowledge base records such the broader terms of the 'descriptor', scarcely any merit is obtained, but unnecessary redundancy, which causes serious confusion when the system is updated, is caused. The 'names-of-classification-items' associated with 'necessary shortest context of a natural language' are enumerated below '__『Verb__KW』__=__', and are parenthesized in '__{' and '}__', punctuated by ', '; It is recommended that as lower 'names-of-classification-items' as possible should be put below '__『Verb__KW』__=__. And if one dose not want confusion during the update of the contents of the 'object-oriented knowledge base' of the system, then, it is recommended that, when such a 'name-of-classification-item' is put below '__『Verb__KW』__=__', higher class 'names-of-classification-items' of the 'name-of-classification-item' should not be put below the '__『Verb__KW』__=__'.

Lexical Definition of 'Means for Storing Data Providing the Ability of Association in a Strict Way'

Sentence in "sentence pattern of association" and/or something that stores the information of it, is a 'means for storing data providing the ability of association in a strict way'.

'Means for storing data providing the ability of association in a strict way' is a kind of 'means for storing data providing the ability of association' which has a formal style. This is shown schematically in FIG. 8.

Lexical Definition of 'concept'

In the present invention, as I claimed before, I regard, in most cases, a 'descriptor' and/or a 'name-of-classification-item' as 'a name' expressing 'a category'. And in ideal cases, an 'ideal noun' and/or an 'ideal verb' is 'a name' expressing a category. On the other hand, I call, in most cases, a natural word which a man daily uses a name expressing a 'concept'.

A word that a man daily uses (i.e. one concept) usually belongs to more than two categories (i.e. has more than two lexical meanings). In other words, a natural word is usually polysemous. Therefore, in a usual dictionary, in most cases, more than two lexical meanings are given for a natural word. As I mentioned before, 'a category' corresponds one to one to one of the lexical meanings of a natural word in an 'ideal dictionary'. In other words, an 'ideal dictionary' can be defined as a tool to find 'categories' (i.e. to consult the lexical meanings) which is associated to a concept (i.e. to a natural word).

It is recommended that an 'ideal dictionary' disclosed in the present invention should contain a sentence in "sentence pattern of a list of the names of the lexical meanings of a natural word" as an important parts of the information about a natural word. That is, it is recommended that all the 'ideal nouns' and/or all the 'ideal verbs' used as the name of a lexical meaning of the natural word should be listed for a natural word in an 'ideal dictionary'.

It is recommended that a lexical meaning of an 'ideal noun' should be explained in sentences described in "sentence pattern of definition of object" in an ideal dictionary. And if and when the 'ideal noun' is a 'descriptor', then, it is recommended that sentences in "sentence pattern of 'ideal thesaurus'" should also be used to explain the meaning. The body of sentences described in "sentence pattern of 'ideal thesaurus'" may be recorded in an ideal dictionary if and when the object-oriented knowledge base system is small. But if and when the object-oriented knowledge base system is large, then, it is recommended that pointers to the sentences described in "sentence pattern of 'ideal thesaurus'", instead of the body, should be recorded in an 'ideal dictionary'. And it is recommended that the lexical meaning of an 'ideal verb' should be explained in sentences in "sentence pattern of implementation of names of algorithms-of-processes". And if and when the 'ideal verb' is a 'names-of-classification-items', then, it is recommended that sentences described in "sentence pattern of classification" should also be used to explain the meaning. The body of sentences described in "sentence pattern of classification" may be stored in an 7 ideal dictionary'. But if and when the object-oriented knowledge base system is large, then, it is recommended that pointers to the sentences described in "sentence pattern of classification", instead of the body, should be recorded in an 'ideal dictionary'.

In an ideal case, a 'thesaurus' disclosed in the present invention is a system of classified 'ideal nouns' that has a hierarchical structure. On the other hand, in an ideal case, a 'classification table' disclosed in the present invention is a system of classified 'ideal verbs' that has a hierarchical structure. A hierarchical structure in an 'ideal thesaurus' and a hierarchical structure in an 'ideal classification table' are strictly distinguished in the present invention. The detailed explanation of hierarchical structure of 'ideal nouns' disclosed in the present invention and the detailed explanation of hierarchical structure of 'ideal verbs' will be given later in the present invention.

3.1.6. Details of @[Algorithm of Making a List of 'Descriptors' Ranked in Order of Hit Frequency] and @[Algorithm of Making a List of 'Names-of-Classification-Items' Ranked in Order of Hit Frequency]

When an object-oriented knowledge base system disclosed in the present invention is used, it is recommended that the user of the system should first search appropriate 'descriptors' and/or 'names-of-classification-items' to be used in the retrieval to be carried out in the inference. It is often difficult, however, to find a "proper 'descriptors' to be used in a query" representing most properly the idea which the retriever has as a form of a natural word.

In many cases, when a user wants to make such a search, a user usually makes a retrieval using a query that contains natural words representing the user's idea. And the user tries to pick up usable 'descriptors' and/or 'names-of-classification-items' from the keys that are retrieved. In many cases, however, the same 'descriptor' is 'found' repeatedly in a series of searches for 'descriptors' associated with a natural word; that is the case in which a same 'descriptor' is contained in more than two keys retrieved in one search, on the basis of the natural word. In cases when too many keys are retrieved during the search of 'descriptors' and/or 'names-of-classification-items', the user of the system must pick up appropriate 'descriptors' out of these many keys by eliminating 'noise' 'descriptors'. This work, however, is laborsome for a usual man.

This difficulty can be avoided if a tool that picks up and sorts in the order of hit frequency, the 'descriptors' that are retrieved after a query. I call the algorithm used in this tool @[algorithm of making a list of 'descriptors' ranked in order of hit frequency]. If this tool is used, the user of the system can view the list of "'descriptors' that are ranked in the order of hit frequency" that are associated with the natural words the retriever inputted into a computer. In a word, @[algorithm of making a list of 'descriptors' ranked in order of hit frequency] makes a ordered list of the all 'descriptors' that are contained in a key retrieved during the search.

In many cases, the rank in the list is expected to be nearly in the order of their importance as a useful information, because in many cases, more important 'descriptors' are expected to be retrieved with higher frequency. What I say here is that 'descriptors' strongly associated with the natural word is expected, with high probability, to be expressing just exactly the user's idea. Of course, @[algorithm of making a list of 'descriptors' ranked in order of hit frequency] can be used to list up and rank the descriptors associated with not only with a natural word but also associated with a 'descriptor'.

If @[algorithm of making a list of 'descriptors' ranked in order of hit frequency] is used, computers can be used as a tool of artificial intelligence to help human's ability of association; it works as a tool that helps a man to carry out association with higher performance with higher precision, within broader range on the basis of data held and shared by many people systematically and permanently.

Lexical Definition of @[algorithm of making a list of 'descriptors' ranked in order of hit frequency]

In the present invention, such an algorithm (an algorithm in which 'descriptors' which appear in the keys retrieved during a search and/or in some cases in the keys which share records with the hit keys are displayed in the order of hit frequency) is an @[algorithm of making a list of 'descriptors' ranked in order of hit frequency]. Here the word 'retrieve' includes the retrieval using 'descriptors', the retrieval using 'names-of-classification-items', and the retrieval using natural words such as 'next-best-natural-nouns' and/or 'next-best-natural-verbs'. The lexical definition of 'next-best-natural-nouns' and 'next-best-natural-verbs' will be given soon in the present invention.

When @[algorithm of making a list of 'descriptors' ranked in order of hit frequency] is used, user of the system has only to select appropriate 'descriptors' out of the listed 'descriptors', and as a result, even non experts, who do not remember 'descriptors' correctly, easily use the system.

Lexical Definition of "Means for Making a List of 'Descriptors' Ranked in Order of Hit Frequency"

@[Algorithm of making a list of 'descriptors' ranked in order of hit frequency] and/or something that stores the information of it, is a "means for making a list of 'descriptors' ranked in order of hit frequency".

Lexical Definition of 'next-best-natural-noun'

A noun which is useful to be used as a key word in the present query, but is not an 'descriptor' is a 'next-best-natural-noun'. According to my definitions, an 'ideal noun' which is not listed in a 'thesaurus' is regarded as a 'next-best-natural-noun'.

Lexical Definition of 'next-best-natural-verb'

A verb which is useful to be used as a key word in the present query, but is not a 'names-of-classification-items' is a 'next-best-natural-verb'.

According to my definition, an 'ideal verb' which is not listed in a 'classification table', as well as a natural verb, is regarded as a 'next-best-natural-verb'.

A schematic quasi-C code of an example of embodiment of @[algorithm of making a list of 'descriptors' ranked in order of hit frequency] is given in Formula. 7.

It should be noted that some of the useful subroutines to process characters are provided in ⊙ "C-Arugorizumu Zen-Ka".

Lexical Definition of @[Algorithm of Making a List of 'Names-of-Classification-Items' Ranked in Order of Hit Frequency]

In a similar way, in the present invention, An algorithm in which 'names-of-classification-items' which appear in the keys retrieved during a search and/or in some cases in the keys which share records with the hit keys are displayed in the order of hit frequency, is an @[algorithm of making a list of 'names-of-classification-items' ranked in order of hit frequency].

A schematic quasi-C code of an example of embodiment of @[algorithm of making a list of 'names-of-classification-items' ranked in order of hit frequency] is given in Formula. 8A and Formula. 8B.

When @[algorithm of making a list of 'names-of-classification-items' ranked in order of hit frequency] is used, user of the system has only to select appropriate 'names-of-classification-items' out of the listed 'names-of-classification-items', and as a result, even non experts, who do not remember 'names-of-classification-items' correctly, easily use the system.

Lexical Definition of "Means for Making a List of 'Names-of-Classification-Items' Ranked in Order of Hit Frequency"

@[Algorithm of making a list of 'names-of-classification-items' ranked in order of hit frequency] and/or something that stores the information of it, is a "means for making a list of 'names-of-classification-items' ranked in order of hit frequency".

@[Algorithm of making a list of 'names-of-classification-items' ranked in order of hit frequency] is used as a tool to help the ability of a user of an object-oriented knowledge base system disclosed in the present invention to associate 'names-of-classification-items' with natural words and/or with other 'names-of-classification-items'.

When only 'descriptors' and/or 'names-of-classification-items' with high hit frequencies are used in a query, then, high performance retrieval omitting noises can be carried out. On the other hand, when even 'descriptors' and/or 'names-of-classification-items' with low hit frequencies are also used in a retrieval, then, a complete an exhaustive retrieval with little omission can be carried out. Thus the problem of noise can be flexibly coped with if @[algorithm of making a list of 'descriptors' ranked in order of hit frequency] and/or @[algorithm of making a list of 'names-of-classification-items' ranked in order of hit frequency] is used.

It is recommended that the "sentences that store data providing the ability of association" described in "sentence pattern of association" which have minimal context to specify 'descriptors' and/or to specify 'names-of-classification-items', should be used as the basis, on which @[algorithm of making a list of 'descriptors' ranked in order of hit frequency] and/or @[algorithm of making a list of 'names-of-classification-items' ranked in order of hit frequency] is to be carried out, in order to make the noise minimal.

Of course, sentences in keys other than the "sentences that store data providing the ability of association" may be used as the basis of data on which @[algorithm of making a list of 'descriptors' ranked in order of hit frequency] and/or @[algorithm of making a list of 'names-of-classification-items' ranked in order of hit frequency] is carried out. Strictly speaking, a "sentence that stores data providing the ability of association" means a sentence that stores data mainly used to providing the ability of association. Of course, "sentences that store data providing the ability of association" may be used in records of the data as well as may be used in keys of data.

3.2. 'Object-Oriented Natural Language Processing'

Thus far, I have disclosed a set of ideas comprising the idea that "a noun is a name of an object", and the idea that that sentences in "sentence pattern of definition of object" can be used to give a lexical meaning of a noun. I call natural language processing on the basis of such ideas, an 'object-oriented natural language processing'. I will disclose some methods and concepts in 'object-oriented natural language processing' in the present invention.

3.2.1. 'Object-Oriented Universal Grammar'

Lexical Definition of 'object-oriented universal grammar'

As the first discussion about 'object-oriented natural language processing', I will disclose step by step important ideas about object-oriented grammar which is universally applied to natural languages. I call such grammar an 'object-oriented universal grammar'.

3.2.1.1. Details of My Interpretation of the Meaning of 'Object'

Before discussing practical problems, I will formulate in an original way, the relation between what I call 'descriptors' and what I call 'objects' on the basis of a software engineering. In the case of 'object-oriented programming', an object is a set of subroutines (i.e. functions) and of variables. However, most of the functions in an object is not permitted to be used by other objects; That is, most of the functions in an object are concealed from other objects. Only a little numbers of functions in an object is 'visible' form other objects. These functions are often called a 'member function' of the object. An object interacts with other objects and/or with itself via its 'member function'. That is, a 'member function' is used as an 'interface'.

Lexical Definition of 'object'

What whose state is recognizable and in many cases, acts and/or responds and changes and/or keeps the state of its own and/or state of other 'objects', is an 'object'.

Lexical Definition of 'individual function'

Such actions and/or responses and/or reaction of an 'object', is an 'individual function' of the 'object'. An 'individual function' is a new idea originally disclosed in the present invention.

Lexical Definition of 'individual variable'

An 'individual variable' is a parallel concept of the 'individual function' and is a new idea originally disclosed in the present invention. If an object 'Y' is a part of object 'X', then, I regard 'Y' as an 'individual variable' of 'X', if 'Y' is visible from other objects. And, if 'Z' is a 'quality' which characterizes 'X', then, I regard 'Z' as an 'individual variable' of 'X', if 'Z' is visible from other objects. If and when the 'value' of an 'individual variable' is given, then, I judge that the state of the 'object' is described.

For example, I regard an 'elephant' as an 'object'. And I regard a 'nose' also as an object. A'nose' is a part of an 'elephant'. And 'nose' is visible for a man. Therefore, by my definition, I regard the 'nose' as an 'individual variable' of the 'elephant'.

A famous sentence,

"An elephant has a long nose", means that 'nose' is 'long'. As I regard 'nose' as an 'individual variable' of an 'elephant', and I regard an 'individual variable' a kind of a variable, it is reasonable that I regard 'long' as the 'value' of the 'individual variable'.

For another example, let me show a sentence,

"The position of the sun in the sky was high at that time."

I regard 'the sun' as an object. I regard 'position' of the sun as a visible 'quantity' of the 'sun', and, therefore, I regard 'position' as an 'individual variable' of the 'sun'. And I regard 'high' as the 'value' of the 'individual variable'.

As are shown in these two examples, adjectives can be used as the 'value' of an 'individual variable'.

Lexical Definition of 'quality'

Something such as size, color, feeling, and/or weight that makes one thing different from other thing is an 'quality'.

For example, I regard position and/or time as an 'quality' of something in the present invention.

For another example, let me show a sentence,

"The weight of an elephant was 1500 Kg."

I regard the 'elephant' an 'object', and I regard 'weight' as an 'quality' of the 'object'. Therefore, 'weight' is an 'individual variable' of the 'elephant'. The '1500 Kg' is a quantity. I regard '1500 Kg' as the 'value' of the 'individual variable'. The '1500' is a number, and 'Kg' shows what is used as the unit of the measurement of the 'weight'.

Lexical Definition of 'quantity'

A set composed of a 'number measured from an origin' and a 'name of something used as the unit of the measurement', is a 'quantity'. In many cases, the 'origin' is explicitly described as a part of 'quantity'.

For example, 'five feet from the ground' is a 'quantity', wherein, 'five' is a number, 'the ground' is the origin from which the 'quality' is measured, and 'foot' is something to determine the unit of length.

As mentioned before, 'weight' is a 'quality'. If the 'quantity' of this 'quality' is known, then, it is possible to judge, in a scientific way, whether the 'quality' is heavy or light using a 'critical value' is determined. For example, if a proposition, "The critical value of weight with which an elephant is judged to be heavy or light is 1000 Kg", is accepted, then an elephant who weights 1500 Kg, is judged to be a heavy elephant, because 1500 Kg is heavier than the critical value, 1000 Kg. Of course, fuzzy theory may be used in such a judgment.

Of course, whether an elephant is heavy or light, can be judged by a man using his feelings and/or his emotions. As a matter of fact, most of people uses the words 'heavy' and/or 'light' even when they do not make a scientific measurement using weighting scales.

Lexical Definition of 'adjective'

A word and/or word phrase which describes the result of outcome of a judgment of the 'quality' of an object and/or the outcome of a feeling to the 'quality' of the object, is an 'adjective'.

If and when an 'object' is defined lexically in an 'ideal dictionary', then, it is recommended that lexical meaning of the 'object' should be described using sentences in "sentence pattern of definition of object", and/or in some cases, in "sentence pattern of 'ideal thesaurus'", etc. In the sentence in "sentence pattern of definition of object", 'individual variables' of the 'object' to be defined and 'individual functions' of the 'object' to be defined are listed.

In many cases, such an 'individual variable' itself is also an 'object'. Such an 'individual variable' is a variable which characterize the state of the 'object' to be defined.

An 'individual function' is a function with which values of 'individual variables' of its own 'object' and/or of other 'objects' are changed and/or are kept as they are. And lexical meaning of 'individual functions' of the identified 'object' can be described using sentences in "sentence pattern of implementation of names of algorithms-of-processes", and/or in "sentence pattern of classification", etc.

EXAMPLE OF 'OBJECTS'

Generally speaking, a cat has fur. A cat catches a rat. A cat licks its own fur. Here, I regard a 'cat' an 'object'. I regard 'fur' an 'individual variable' of the 'cat'. And I regard 'catch' and 'lick' as an 'individual functions' of the 'cat'. Thus, I give here a set of terminologies as follows;

'Object A'≡cat',

'individual variable A1'≡'fur',

'individual function A1'≡'catch',

'individual function A2'≡'lick', and,

'individual function A3'≡'run'.

On the other hand, generally speaking, a rat has a life. A rat runs.

Here, I regard a 'rat' an 'object'. I regard 'life' an 'individual variable' of the 'rat'. I regard 'run' an 'individual function' of the 'rat'. Thus, I give here a set of terminologies as follows;

'Object B'≡'rat',

'individual variable B1'≡'life', and

'individual function B1'≡'run'.

I regard 'alive' and/or 'dead' as a value of the 'individual variable B1' (i.e. 'life' of a 'rat'). Thus, the action of a cat, 'catch' (i.e. 'individual function A1') changes the values of 'individual variable B1' from 'alive' to 'dead'. This is an example in which an 'individual function' of an object changes (i.e. maps) the value of an 'individual variable' of other object.

(Rest of this Example of 'objects' will be shown soon later in the present invention.)

3.2.1.2. 'Ideal Transitive Verb' and 'Ideal Intransitive Verb'

Lexical Definition of 'Ideal Transitive Verb' and 'Ideal Intransitive Verb'

I classify 'individual functions' into three types;

The first type is a group of 'individual functions' during whose mapping, values of 'individual variables' of other 'objects' are changed and/or are kept as they are.

The second type is a group of 'individual functions' during whose mapping, values of 'individual variables' of their own 'object' (except 'individual variables' describing the place and time at which there own 'object' exists) are changed and/or are kept as they are.

And the third type is a group of 'individual functions' during whose mapping the value of 'individual variables' of their own 'object' describing the place and time at which their own object exists are changed and/or are kept as they are.

I call either of the first type of 'individual functions' and/or the second type of 'individual functions' an 'ideal transitive verb', by analogy with English grammar, when the 'individual functions' are an 'ideal verb'.

I call the third type of 'individual functions' an 'ideal intransitive verb' by analogy with English grammar when the 'individual functions' are an 'ideal verb'.

We have already given a lexical definition of the term 'ideal verb' thus far in the present invention. I regard a verb as the name of a function of an object, i.e. as the name of an 'individual function'.

EXAMPLE OF 'OBJECTS'

(Continued)

The 'individual function A1' of the 'cat', i.e. 'catch', maps the 'individual variable B1', i.e. 'life', of 'rat', from its value 'alive' to its value 'dead'.

Therefore, according to my definition given just above, the 'individual function A1' of a 'cat' (=one 'object') is judged to be an 'ideal transitive verb' because it changes the value of 'individual variable B1' of 'rat' (=other 'object').

The 'individual function A2' of 'cat', i.e. 'lick', maps the 'individual variable A1', (i.e. 'fur' of 'cat'), from its value 'dirty' to its value 'clean'.

According to my definition, 'individual function A2' of 'cat' is judged to be an 'ideal transitive verb' because 'individual function A2' changes the value of its own 'individual variable A1', while 'individual variable A1' describing neither the place nor time at which the 'cat' exists.

(Rest of this Example of 'objects' will be shown soon later in the present invention.)

Lexical Definition of 'space variables' and 'time variables'

An 'individual variable' characterizing the information of space at which its 'object' exists, is a 'space variable'. An 'individual variable' characterizing the information of time at which its 'object' exists is a 'time variables'.

According this terminology, 'ideal intransitive verb' is an 'individual function' which maps only 'space variables' of its own 'object' and/or only 'time variables' of its own 'object'. It should be noted that 'individual function' which maps 'space variables' of other 'objects' and/or 'time variables' of other 'objects' are called 'ideal transitive verb'.

EXAMPLE OF 'OBJECTS'

(Continued)

For example, the 'individual function A3' of 'cat' (i.e. 'run') maps only its own 'space variable' and its own 'time variables', from their values where the 'cat' is now, to the values when and where the 'cat' will be: While, non of other values of 'individual variables' of the 'cat' such as 'fur' are changed. According to my definition, 'run' is an 'ideal intransitive verb'.

(End of Example of 'objects')

In an ideal case, for example, one can use the Cartesian coordinate representing the center of mass of the 'rat', as a 'space variable' of a 'rat'. Such a 'space variable' can be used when a man wants to describe the translational motion of the 'rat'.

As another example, when one regard a 'weathercock' an 'object', one can use the 'direction' of the head of the 'weathercock' as a 'space variable' of the 'weathercock'. The 'value' of 'direction' is either 'north', 'west' 'south' 'east'. Such a 'space variable' can be used when a man wants to describe the rotational motion of an 'weathercock'.

I have shown that in ideal cases, an 'ideal verb' defined by analogy with English grammar is used as an 'individual function' of an 'object'. Remember that an 'ideal verb' is the name of an 'algorithm-of-process'. Such an 'algorithm-of-process' can be regarded as an implementation (embodiment of the detail procedure) of the 'individual function' of an 'object'. The 'individual function' maps 'individual variables' and changes their value and/or keeps as they are.

3.2.1.3. 'Subject-Word (S)' of an 'Ideal verb'

Lexical Definition of 'Subject-Word (S)' of an 'Ideal Verb'

In the present invention, if, an 'object' has the main-information about the 'algorithm-of-process' denoted by an 'ideal verb', (especially in the cases when an 'object' has sufficiently-rich-information with which a programmer can code the main-routine of the quasi-C code describing the 'algorithm-of-process' meant by the 'ideal verb',)

then,

I call the name of the 'object' the 'subject-word (S)' of the 'ideal verb'.

3.2.1.4. 'Object-Oriented-Lexical-Definition of a Noun' by Using "Sentence Pattern of Definition of Object"

In a famous sentence,

"An elephant has a long nose", the 'elephant' is an 'object', 'nose' is 'individual variable' of the 'object', 'long' is the value of the 'individual variable', and 'has a long nose' is predicate. It should be noted that an adjective is used as the value of a quality.

I claim that, a sentence that has a predicate corresponds to, lines of a quasi-C code with which a C programmer defines and initializes what C programmers call a 'structure'.

For example, let me show here lines of a quasi-C code, which corresponds to the sentence 'An elephant has a long nose':

```
/* Define a 'structure' */
Struct elephant{
    char nose ;_
}
/* Initialize the 'structure' */
elephant.nose = long ;_
```

Lexical Definition of "sentences that store data that define objects"

A "sentence that stores data that defines an object" is a sentence in which 'individual functions' and 'individual variables' possessed by an 'object' and/or values of such 'individual variables' are explicitly shown.

Lexical Definition of 'Means for Storing Data that Define Objects'

"Sentence which stores data that define objects" and/or something that stores the information of it, is a 'means for storing data that define objects'.

Lexical Definition of "Sentence Pattern of Definition of Object"

One of the "sentence patterns of definition of object" has the following data structure:

__OBJECT__ *** have__VARIABLES * which__is , where, '*' is the name of an 'object', '*' is the name of an 'individual variable', and '**' is the 'value' of the 'individual variable'. The value of the 'individual variable' may be omitted in this data structure.

As an example, I show

__OBJECT__ elephant have__VARIABLES nose which__is long.

Another "sentence pattern of definition of object" has the following data structure:

__OBJECT__ *** __have__FUNCTION__, where, * is the name of an 'object', and '**' is the 'individual function'.

As an example, I show

__OBJECT__ cat __have__FUNCTION__ catch a mouse

It should be noted that "sentence pattern of definition of object" is based on simple English grammar.

Lexical Definition of 'Means for Storing Data that Strictly Define Objects'

A sentence in "sentence pattern of definition of object" and/or something that stores the information of it, is a 'means for storing data that strictly define objects'.

It is recommended that sentences in "sentence pattern of definition of object",

__OBJECT__ *** have__VARIABLES * which__is ** or

__OBJECT__ *** __have__FUNCTION__ ** should be used when data that define objects is described in a key of a data of an object-oriented knowledge base system disclosed in the present invention.

Lexical Definition of 'Object-Oriented-Lexical-Definition of a Noun'

A sentence in "sentence pattern of definition of object" is an 'object-oriented-lexical-definition of a noun'.

3.2.1.5. Mathematical Foundations for Definition of 'Thesaurus'

Lexical Definition of @[Algorithm of Giving Definition of Broader 'Object' and Narrower 'Object']

Here, I formulate mathematically and recursively the idea on the basis of which 'narrower descriptor' and 'broader descriptor' used in an 'ideal thesaurus' is defined. Let us call the set of the 'individual variables' of object X, VX. Let us call the set of the 'individual functions' of an object X, FX. Let us call the set of the 'individual variables' of object Y, VY. If and when an 'individual variable' of object Y is also an object, any 'individual variable' of it should be regarded to be included in VY. More generally speaking, any 'individual variable' of an 'individual variable' should be regarded as an 'individual variable'. Let us call the set of the 'individual functions' of another object Y, FY. And any function, which is used to implement them, should be regarded to be included in FY.

Under this definition, if $$FX \subset FY,$$

and $$VX \subset VY, \tag{Equation. 1}$$

are satisfied, then, I regard that "Object X is broader object of object Y, and object Y is narrower object of object X".

The procedure described above to define broader 'object' and narrower 'object' is an @[algorithm of giving definition of broader 'object' and narrower 'object']

Lexical Definition of @[Algorithm of Giving Definition of Broader 'Descriptor' and Narrower 'Descriptor']

If and when an object is judged to be a broader 'object' and other 'object' is judged to be a narrower 'object' by using @[algorithm of giving definition of broader 'object' and narrower 'object'], then, a 'descriptor' which is the name of the broader 'object' is judged to be a 'broader descriptor', and a 'descriptor' which is the name of the narrower 'object' is judged to be a narrower descriptor.

The procedure described above to define broader 'descriptor' and narrower 'descriptor' is an @[algorithm of giving definition of broader 'descriptor' and narrower 'descriptor']. In Formula. 10, quasi-C code which gives practical examples of embodiment of @[algorithm of giving definition of broader 'descriptor' and narrower 'descriptor'] are shown.

It should be noted that when the lexical definition of @[algorithm of giving definition of broader 'object' and narrower 'object'] was given, it was of basic importance to know what 'object' has what 'individual functions' and/or has what 'individual variables'. It is recommended that this basically important information is stored as a data described as a sentence described in "sentence pattern of definition of object". As described before in the present invention, I call such a sentence, a 'means for storing data that define objects'. This point is schematically described in FIG. 6.

Lexical Definition of 'Means for Giving Definition of Broader Descriptor and Narrower Descriptor'

@[Algorithm of giving definition of broader 'descriptor' and narrower 'descriptor'] and/or something that stores the information of it, is a 'means for giving definition of broader descriptor and narrower descriptor'.

Lexical Definition of Tool to Construct a Hierarchical System of Nouns in an 'Ideal Thesaurus'

@[Algorithm of giving definition of broader 'object' and narrower 'object'] is a tool to construct a hierarchical system of nouns in an 'ideal thesaurus'.

In the present invention, I claimed that, a 'descriptor' is the name of an 'object'. It should be noted, for example, that the ideal and abstract 'object' expressed by a word 'any boy' is the broadest 'object' of all the 'objects' that are expressed by using a noun 'boy'. For example, 'any boy' is a broader object of 'Tommy'. And 'any boy' is a broader object of 'Jimmy'. This is because 'any boy' is an object that has minimal 'individual variables' and minimal 'individual functions' that are shared by all the objects expressed by using a noun 'boy'.

It should be noted that in the same reason, 'any dog' is the broadest object of all the objects expressed by using a noun 'dog'. For example, 'any dog' is a broader object of 'Fido'. And 'any dog' is a broader object of 'Sent Bernard dog'.

In a word, I claim that "'any'+'a noun'" expresses the name of the broadest object of all the objects denoted by using the 'noun'.

In addition, it should be noted that a proposition,

A sparrow flies in the air"

can be analyzed by using a sentence described in "sentence pattern of implementation of names of algorithms-of-processes" as,

```
"a sparrow flies in the air"
{
    any bird = a sparrow ;__
    any bird flies in the air ;__
},
```

where '=' is an assignment operator. This means, according to my definition which will given later in the present invention, that "Any bird flies in the air" is the name of a "higher class 'algorithm-of-process'" of "A sparrow flies in the air". This means that if 'a sparrow' is assigned to 'any bird' in any proposition that is inferred from the proposition "Any bird flies in the air", then, the proposition thus obtained by the assignment, is always a proposition that can be inferred from the sentence "A sparrow flies in the sky". In a word, the way in which the outcome of a general and abstract inference is applied to a special case, can be explicitly descried if we use a sentence described in "sentence pattern of implementation of names of algorithms-of-processes". This logic is a kind of what I call @[algorithm of sentence based object-oriented categorical syllogism], the lexical definition of which will be given later in the present invention.

In other words, I claim that the definition of broader 'descriptor' and narrower 'descriptor' in an 'ideal thesaurus' is identical with definition of broader object and narrower object based on equation 1. When I use the terms 'broader term' and 'narrower term' in the present invention, the definition of 'broader' and 'narrower' is based of equation 1.

Lexical Definition of "Data of 'Thesaurus'"

Thus,

"data of 'ideal thesaurus'" described is data that explicitly describe the relation of broader term and narrower term between 'descriptors' in the sense of above definition.

3.2.1.6. "Sentence Pattern of 'Ideal Thesaurus'"

Lexical Definition of "Sentence Pattern of 'Ideal Thesaurus'"

The "sentence pattern of 'ideal thesaurus'" has a data structure as

__NT__ *** __is__a__kind__of__BT__ *.

where '***' is a narrower 'descriptor', and '*' is a broader 'descriptor'. A'thesaurus' can be described by sentences used as keys described in the "sentence pattern of 'ideal thesaurus'". By definition, a sentence in "sentence pattern of 'ideal thesaurus'" is a "sentence that store data of thesaurus".

Lexical Definition of 'Means for Storing Data of Ideal Thesaurus in a Formal Way'

Sentence in "sentence pattern of 'ideal thesaurus'" and/or something that stores the information of it, is a 'means for storing data of ideal thesaurus in a formal way'. It is recommended that a "sentence that stores data of 'ideal thesaurus'" should be described in "sentence pattern of 'ideal thesaurus'". This issue is schematically shown in FIG. 2.

As mentioned before, the lexical meaning of a 'descriptor' is usually explained in a sentence described in "sentence pattern of definition of object" and/or in a sentence described in "sentence pattern of'ideal thesaurus'". Let us show here an example using the case of __(abuse 【usage】)__:

__NT__ __(abuse 【usage】)__ __is__a__kind__of$_{13}$ BT__ —(use 【usage】)__, and

__OBJECT__ __(abuse 【usage】)__ have__VARIABLES purpose which__is judged and/or is felt to be vicious on a basis of moral ethics.

Let us give another example using the case of __(abuse 【word】)__:

__NT__ __(abuse 【word】)__ __is$_{13}$ a__kind__of__BT__ —(word 【talk】)__, and

__OBJECT__ __(abuse 【word】)__ have__VARIABLES ethical nature which__is judged and/or is felt to be vicious, and __OBJECT__ __(abuse 【word】)__ have__FUNCTION__ to upset people.

I do not mean that only these sentence patterns of mine should be used to explain a lexical meaning of 'descriptors' in the object-oriented knowledge base system disclosed in the present invention. For example, multi media including pictures, photographs, sounds, and animations of course may be used to explain a lexical meaning of 'descriptors' in the object-oriented knowledge base system disclosed in the present invention. What I claim is that formal explanation of lexical meaning of 'descriptors' using my sentence patterns is readily used for the purpose of formal inference using computers. The algorithms for such inference will be given later in the present invention.

Sentences described in "sentence pattern of 'ideal thesaurus'" are a kind of knowledge that is classified as 'facts'. Sentences using my sentence pattern are highly readable to human, and have high power of expression.

3.2.1.7. Mathematical Foundations for Definition of 'Classification Table'

A sentence in "sentence pattern of implementation of names of algorithms-of-processes" is used as a "sentence that stores data on which classification is carried out".

Lexical Definition of @[Algorithm of Giving Definition of Higher Class 'Algorithm-of-Process' and Lower Class 'Algorithm-of-Process']

Let me assume that px1, px2, . . . , and, pxN, are an sub-'algorithm-of-processes', and the implementation of an 'algorithm of a process', PX, is given by a sentence in "sentence pattern of implementation of names of algorithms-of-processes", as _ALGORITHM_PX {px1;_px2;_* * * ;_pxN;_}.

And let me assume in addition that the implementation of an algorithm of another process, PY, is given by a sentence in "sentence pattern of implementation of names of algorithms-of-processes", as _ALGORITHM_PY {py1;_py2;_* * * pyM;_}.

where, of course, 'if( ){ }' clauses, 'for( ){ }', and/or 'while( ){ }' clauses in terms of C language may be inserted between '{' and '}' as a 'pxn;_', and/or as a 'pyn;_'. Nesting is of course OK.

Under these assumptions, if

{px1;_px2;_* * * ;_pxN;_} is part of

{py1;_py2;_* * * ;_pyM;_}, then, I say that

"PX is higher class 'algorithm-of-process' of PY", and

"PY is lower class 'algorithm-of-process' of PX".

An algorithm with which to judge that an 'algorithm-of-process' is higher class 'algorithm-of-process' and that other 'algorithm-of-process' is lower class 'algorithm-of-process' is an @[algorithm of giving definition of higher class 'algorithm-of-process' and lower class 'algorithm-of-process'].

In Formula. 12, quasi-C code which gives practical examples of embodiment of @[algorithm of giving definition of higher class 'algorithm-of-process' and lower class 'algorithm-of-process'] are shown.

Lexical Definition of 'Means for Giving Definition of Higher Class Algorithm-of-Process and Lower Class Algorithm-of-Process'

@[Algorithm of giving definition of higher class 'algorithm-of-process' and lower class 'algorithm-of-process'] and/or something that stores the information of it, is a 'means for giving definition of higher class algorithm-of-process and lower class algorithm-of-process'.

It should be noted that when the lexical definition of @[algorithm of giving definition of higher class 'algorithm-of-process' and lower class 'algorithm-of-process'] was given, it was of basic importance to know what 'algorithm-of-process' has what sub-'algorithm-of-process'. This basically important information is stored as a sentence described in "sentence pattern of implementation of names of algorithms-of-processes". As I defined before in the present invention, I call such a sentence 'means for implementation of names of algorithms-of-processes'. This point is schematically described in FIG. 6.

Lexical Definition of Tool to Construct a Hierarchical System of Verbs in an 'Ideal Classification Table'

@[Algorithm of giving definition of higher class 'algorithm-of-process' and lower class 'algorithm-of-process'] is a tool to construct a hierarchical system of verbs in an 'ideal classification table'.

By definition, if an 'algorithm-of-process', PZ, is implemented by an "instance of a sentence in sentence pattern of implementation of names of algorithms-of-processes"", and an 'algorithm-of-process', PU, is implemented by a sentence in "sentence pattern of implementation of names of algorithms-of-processes" which is used as the basis on which the "instance of a sentence in "sentence pattern of implementation of names of algorithms-of-processes"" is composed, then, PU is a higher class 'algorithm-of-process' of PZ, because if a sentence which assigns a specific noun to a general noun using an 'assignment operator', '=', is added to the sentence described in "sentence pattern of implementation of names of algorithms-of-processes" implementing PU, then, "instance of a sentence in "sentence pattern of implementation of names of algorithms-of-processes"" implementing PZ is obtained.

For example, an 'algorithm-of-process' whose name is "any bird flies in the air", is implemented by a sentence described in "sentence pattern of implementation of names of algorithms-of-processes", as,

```
"any bird flies in the air"
{
    any bird flies in the air ;_
}.
```

This sentence is trivial, but I regard this sentence as a sentence described in "sentence pattern of implementation of names of algorithms-of-processes"".

On the other hand, 'algorithm-of-process', whose name is "a sparrow flies in the air" is implemented by a sentence described by an "instance of a sentence in "sentence pattern of implementation of names of algorithms-of-processes"".

```
"a sparrow flies in the air"
{
    any bird = a sparrow ;_
    any bird flies in the air ;_
}.
```

In this example, the 'algorithm-of-process' whose name is "any bird flies in the air", is a higher class 'algorithm-of-process' of the 'algorithm-of-process' whose name is "a sparrow flies in the air", because

```
the 'algorithm-of-process',
"{
    any bird flies in the air ;_
}",
is included in
the 'algorithm-of-process',
"{
    any bird = a sparrow ;_
    any bird flies in the air ;_
}".
```

In the present invention, I claimed that it is recommended that an 'ideal verb' should be used as a 'names-ofclassification-items' corresponds uniquely to a name of an 'algorithm-of-process'. In other words, a 'names-of-classification-items' is a name of an 'algorithm-of-process' which is listed in a 'classification table' of an object-oriented knowledge base system disclosed in the present invention.

Lexical Definition of higher class 'name-of-classification-item' and lower class 'name-of-classification-item'

When a pair of higher class 'algorithm-of-process' and lower class 'algorithm-of-process' are assigned by using @[algorithm of giving definition of higher class 'algorithm-of-process' and lower class 'algorithm-of-process'], then, the name-of-classification-item used as the name of the higher class 'algorithm-of-process' is a higher class 'name-of-classification-item', and the name of the lower class 'algorithm-of-process' is a lower class 'name-of-classification-item'.

In other words, the definition of higher class and lower class in an ideal 'classification table' is given on the basis of the mathematical definition of higher and lower class 'algorithm-of-process' given just above.

Many existing practical classification system can be explained using these definitions. An example is the logical classification system of biology. Almost all life has DNA. According to an up to date biology (◎ "out of control" p.415), DNA contains the rule of growth, and controls the process of growth of embryo. As a result, almost all living thing corresponds one to one to 'algorithm-of-process of growth stored in DNA, and can be logically classified within our scope of classification.

Thus, "sentences which store data on which classification is carried out" ideally means a sentence in "sentence pattern of implementation of names of algorithms-of-processes". And a sentence in "sentence pattern of classification" is based on the way of classification described above.

Lexical Definition of "Sentences that Store Data of Classification Table"

A "sentences that store data of classification table" is a sentence used to describe an 'ideal thesaurus'. Strictly speaking, either a sentence whose form is, "'*' is higher class of ''", where '*' and '**' are 'names-of-classification-items', and/or a sentence whose form is equivalent to "'*' is higher class of '***'", is a "sentences that store data of classification table".

Lexical Definition of Means for Storing Data of Classification Table

"Sentence which stores data of classification table" and/or something that stores the information of it, is a means for storing data of classification table. It is recommended that a "sentence pattern of classification" should be described in "sentence that stores data of classification table". This situation is schematically shown in FIG. 3.

Lexical Definition of "sentence pattern of classification"

It is recommended that "sentence which stores data of classification table?' should be described in what I call "sentence pattern of classification". The "sentence pattern of classification" has the following data structure:

__ALGORITHM__ ** __is__higher__class__of__ ALGORITHM__ *.

where '*' is the name of higher class 'algorithm-of-process', and '**' is the name of lower class 'algorithm-of-process'. The definition of the words, 'higher class' and 'lower class' used here has been given in the present invention. In the present invention, a verb is regarded as a name of an 'algorithm-of-process'. Names of various 'algorithms-of-processes' are classified in a 'classification table' disclosed in the present invention. A 'name-of-classification-item' in a 'classification table' disclosed in the present invention is usually a name of an 'algorithm-of-process'. Usually, a 'name-of-classification-item' is an 'ideal verb'. By definition, a sentence in "sentence pattern of classification" is a "sentence that record data of classification table".

Lexical Definition of 'Means for Storing Data of Classification Table in a Formal Way'

A sentence in "sentence pattern of classification" and/or something that stores the information of it, is a 'means for storing data of classification table in a formal way'.

Specifically when keys described in "sentence pattern of classification" are used to construct a 'classification table', '**' is the name of the higher class 'names-of-classification-items', and '***' is the name of lower class 'names-of-classification-items'.

The issue described here above is shown schematically in FIG. 3

As I mentioned before, in an object-oriented knowledge base system disclosed in the present invention, the lexical meaning of a 'name-of-classification-item' is usually explained in a sentence in "sentence pattern of implementation of names of algorithms-of-processes" and/or in a sentence in "sentence pattern of classification". Let me show here an example using the case in which the lexical definition of a 'name-of-classification-item', __{abuse 【use】}__, is given:

__ALGORITHM__ __{abuse 【use】}__ {wrong purpose is not achieved at first;__use authority;__wrong purpose is achieved at last;__}, and __ALGORITHM__ __{use}__ __is__higher__class__of__ ALGORITHM__ __{abuse 【use】}.

Let me show here another example using the case of __abuse 【say】}__:

__ALGORITHM__ __abuse 【say】}__ {wrong purpose is not achieved at first;__ say;__ wrong purpose is achieved at last;__}, and __ALGORITHM__ __{say}__ __is__higher__class__of__ ALGORITHM__ __{abuse 【say】}__.

I do not mean that only these sentence patterns of mine should be used to explain a lexical meaning of a 'name-of-classification-item' in the object-oriented knowledge base system disclosed in the present invention. For example, multi media including pictures, photographs, sounds, and animations of course may be used. What I claim is that formal explanation of lexical meaning of 'name-of-classification-item' using my sentence patterns is readily used for the purpose of formal inference using computers. The algorithms for such inference will be given later. Such sentences using my sentence patterns are a kind of knowledge that is classified into ‘facts’. Sentences using my sentence pattern are highly readable to human, and have high power of expression.

Remember that the lexical meanings of a natural word can be listed in a sentence in “sentence pattern of a list of the names of the lexical meanings of a natural word”. As mentioned before, in ideal cases in which the name of a lexical meaning is an ‘ideal verb’ used as a ‘name-of-classification-item’, the lexical meaning of the ‘ideal verb’ can be usually explained in a sentence in “sentence pattern of implementation of names of algorithms-of-processes” and/or in a sentence in “sentence pattern of classification”.

In another case, as mentioned before, in ideal cases in which the name of a lexical meaning is an ‘ideal noun’ used as a ‘descriptor’, the lexical meaning of a ‘ideal noun’ is usually explained in a sentence in “sentence pattern of definition of object” and/or in a sentence in “sentence pattern of ‘ideal thesaurus’”.

Thus, it should be noted that a rich power of expression approximation the richness of information of existing dictionaries written in a natural language is obtained if sentences in these sentence patterns of mine are used.

Here I make an important comment about “sentence pattern of implementation of names of algorithms-of-processes”: Remember the case of implementation of a function used in a source code written in C language. In this case, essentially, all the details of the algorithm of a C function must be explicitly described as the implementation. Of course, the set of subroutines called API (application programming interfaces provided by ©Microsoft) are black box to any Windows programmer outside ©Microsoft. However, complete data about complete implementation of any API for Windows programming should exist in somewhere in ©Microsoft. In this sense, the implementation of any function in any source code of Windows program written by anyone using API is complete. That is, in this sense, no black box remains in any source code of Windows program written by any programmer using API.

If a complete black box were to remain in a source code of a programming language, it can not be translated into machine language, and can not be executed by any computer.

In a sharp contrast to this situation of source code written in C, black boxes may remain in a sentence described in “sentence pattern of implementation of names of algorithms-of-processes”. This is because, as will be explained later, the inference mechanism of an object-oriented knowledge base system disclosed in the present invention can carry out ‘inference’ based on sentences including complete black boxes.

I claim that, essentially, most of the ‘natural-verbs’ used in natural languages are black boxes. In this sense, the power of expression of an object-oriented knowledge base system disclosed in the present invention approximates to the power of expression of natural languages. The details of the algorithms used in the inference mechanism of an object-oriented knowledge base system disclosed in the present invention will be disclosed later in the present invention.

In the present invention, I have claimed ‘that a verb is the name of an ‘algorithm-of-process’. It should be noted that such a concept has not conventionally been proposed.

3.3. An Object-Oriented Knowledge Base System

3.3.0. An Recommended Style of an Object-Oriented Knowledge Base System Disclosed in the Present Invention (Overview)

An object-oriented knowledge base system disclosed in the present invention is a kind of ‘theorem proving’ system. In other words, for example, the system can give an answer to a question asked by users of the system. Varieties of industrial applicability of an object-oriented knowledge base system disclosed in the present invention will be shown later in the present invention. FIG. 1 shows a recommended constitution of such an object-oriented knowledge base system disclosed in the present invention. Wherein, the body of the information of the object-oriented knowledge base system is stored on a ‘means for storing knowledge base system’. I have already given the lexical definition of ‘means for storing knowledge base system’, in the present invention. However, according to the lexical definition, for example, a ‘hard disk’ of a personal computer is a kind of ‘means for storing knowledge base system’. And a removable disk such as a floppy disk is also a kind of ‘means for storing knowledge base system’ (See FIG. 21).

Figure 19:
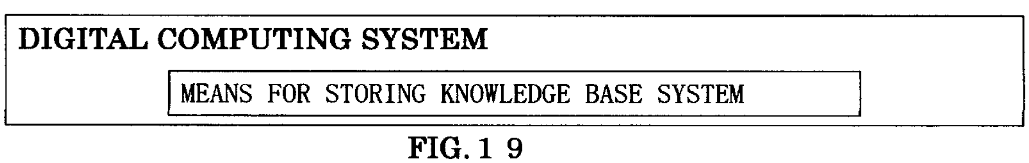
FIG. 19 shows a 'digital computing system' with a 'means for storing knowledge base system'.
Figure 20:
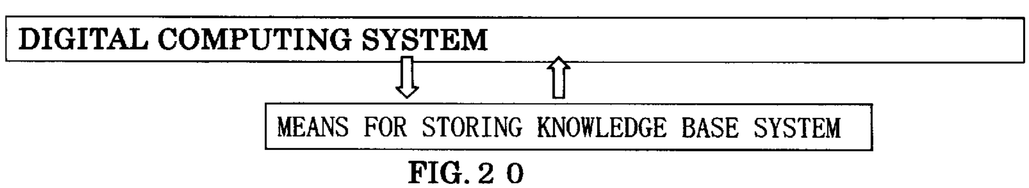
FIG. 20 shows a 'digital computing system' and a 'means for storing data'.
Figure 2:
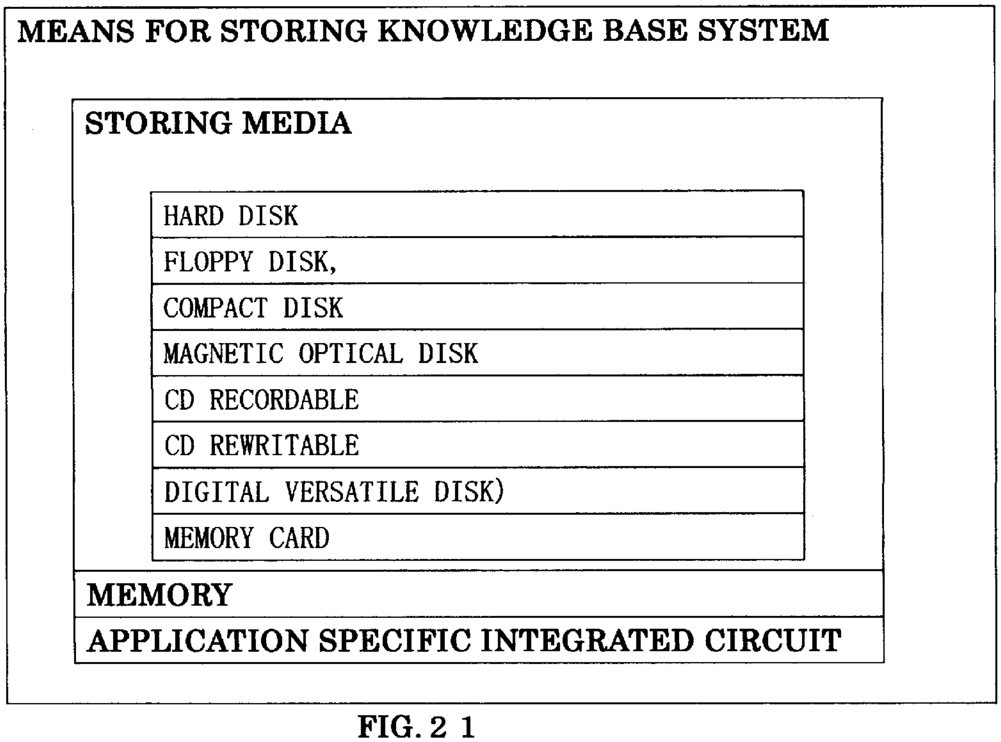
Figure 2:
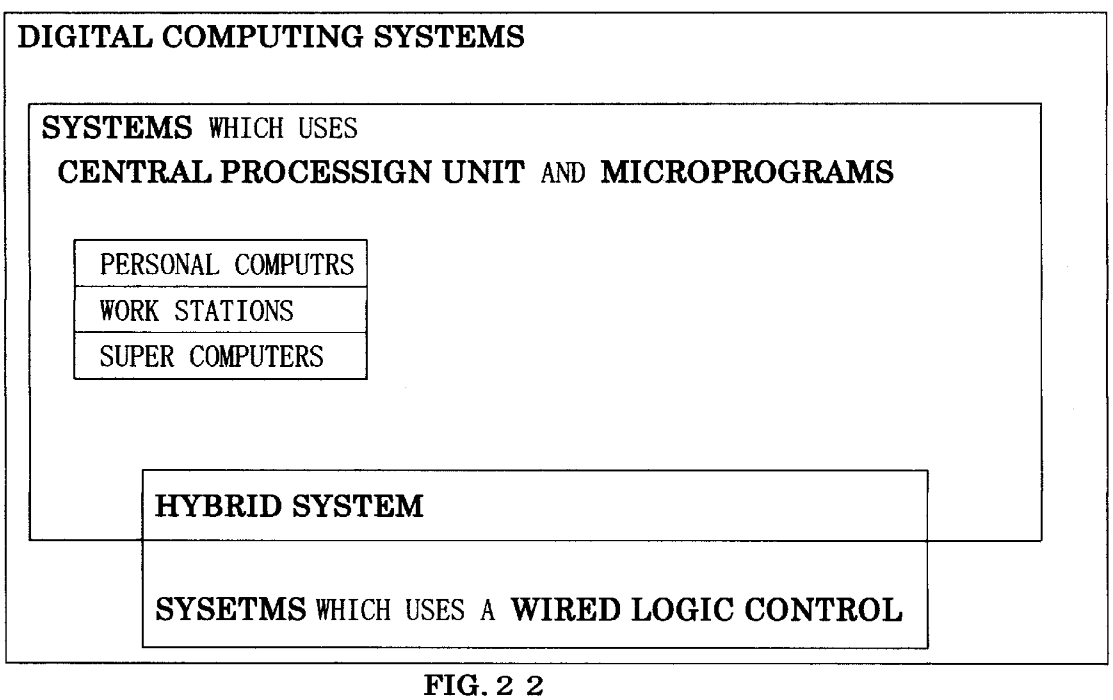

A ‘digital computing system’ (for example, a computer) is the platform on which the object-oriented knowledge base system performs an inference, for example to answer the question. Users of the object-oriented knowledge base system operates the ‘digital computing system’, via an ‘input device’ (for example, via a ‘key board’ of the computer) and/or via an ‘output device’ (for example, via a ‘display’ of the computer). This situation is schematically shown in FIG. 1 . Said ‘means for storing knowledge base system’ may be either a part of the ‘digital computing system’ and/or not a part of the ‘digital computing system’ (see FIG. 19 and FIG. 20). What is important is that in most cases, a ‘digital computing system’ dose a job according to the procedure that is recorded as a body of information of an object-oriented knowledge base system disclosed in the present invention on a ‘digital computing system’. Lexical definition of ‘input device’ and/or ‘output device’ will be given later in the present invention.

Not only users of the system, but also, plurality of other ‘digital computing systems’ connected to the original ‘digital computing system’ via ‘input device’ and/or via ‘output device’ (for example, via a ‘Network Interface Card’), may operate the ‘digital computing system’ (See FIG. 1), for example to make use of the object oriented knowledge base system working on the ‘digital computing system’ and/or to be made use of by the object oriented knowledge base system working on the ‘digital computing system’.

Such a case occurs, for example, in the following situation; As described later in the present invention, an object-oriented knowledge base system disclosed in the present invention solves a problem step by step to give the answer to the question on a computer. In many cases, if and when one problem is tried to be solved in a step of reasoning, then, the problem is broken down into more simple problems, and as the result, usually more than two sub problems that are to be tried to be solved in the next step are obtained, at the end of the present step. If and when more than tow other computers are connected to the computer, via the internet and/or via a local area network, then, the computer may dispatch a plurality of sub problems to the other computers. Afterwards, the other computers should return the answers, afterwards.

An object-oriented knowledge base system disclosed in the present invention which has a recommended style (See FIG. 1) comprises:

1) an 'object-oriented knowledge base', whose lexical definition will be given just below, in the present invention.
2) an 'object-oriented knowledge base management system', whose lexical definition will also be given just below in the present invention, and
3) a 'means for carrying out an inference', whose detailed explanation will be given later in the present invention.

A 'means for carrying out an inference' is a kind of "'mechanism for inference' of a 'knowledge base'", and an object-oriented knowledge base system disclosed in the present invention proves a theorem by using a 'means for carrying out an inference'. The style of the reasoning of the 'means for carrying out an inference' is an opportunistic reasoning. That is, inference of 'means for carrying out an inference' is carried out step by step, and an each step of opportunistic reasoning is either a forward reasoning and/or a backward reasoning. This is schematically shown in FIG. 9. When, thus, 'means for carrying out an inference' works to prove a theorem, the 'means for carrying out an inference' uses an 'object-oriented knowledge base' as a basis of knowledge on which a theorem is to be proved. One knowledge and/or more than two knowledge in an 'object-oriented knowledge base' are used in each step of the opportunistic reasoning. In an object-oriented knowledge base disclosed in the present invention, the theorem to be proved, which I call 'hypothetical proposition that is the target of the present step of opportunistic reasoning', is broken down into plurality of hypothetical propositions. The aim of the each step of the opportunistic reasoning is to prove a 'hypothetical proposition that is the target of the present step of opportunistic reasoning'. This is schematically shown in FIG. 10. The lexical definition of 'hypothetical proposition that is the target of the present step of opportunistic reasoning' will be given later in the present invention. A recommended constitution of each step of opportunistic reasoning is schematically shown in FIG. 11. The detail of step by step opportunistic reasoning will be described later in the present invention in "§3.3.11.2.3. Step by Step Opportunistic reasoning". The lexical definition of an 'object-oriented knowledge base' will be given just below in the present invention. The detail of 'means for carrying out an inference' will be explained later in the present invention mainly by using Formula. 2 (See "§3.3.11. Algorithm of Association and Reasoning (i.e. algorithm of 'Inference mechanism') of an Object-oriented knowledge base system disclosed in the Present invention").

An 'object-oriented knowledge base management system' is a tool which is used when a maker of an object-oriented knowledge base system disclosed in the present invention manages an 'object-oriented knowledge base'. To say more precisely, for example, if and when a maker of an object-oriented knowledge base system disclosed in the present invention, wants to expand the 'object-oriented knowledge base' and/or wants to make a renewal of the 'object-oriented knowledge base', then, it is recommended that the maker of the object-oriented knowledge base system disclosed in the present invention should use 'object-oriented knowledge base management system'. An 'object-oriented knowledge base management system' comprises an 'ideal dictionary', 'means for giving definition of broader descriptor and narrower descriptor', and 'means for giving definition of higher class algorithm-of-process and lower class algorithm-of-process' (See FIG. 1 and FIG. 6).

For example, if and when a maker of an object-oriented knowledge base system disclosed in the present invention expands and/or makes a renewal of an 'ideal thesaurus', which is a part of an 'object-oriented knowledge base' (see FIG. 1), according to 'means for giving definition of broader descriptor and narrower descriptor' wherein the maker uses an 'ideal dictionary' as the basis of data on which 'means for giving definition of broader descriptor and narrower descriptor' is carried out, then, the maker of the object-oriented knowledge base system disclosed in the present invention can expand and/or make a renewal of an 'ideal thesaurus' systematically in a consist way. The lexical definition of 'object-oriented knowledge base management system' will be given later in the present invention, and a recommended constitution of an 'object-oriented knowledge base management system' will be shown schematically by using FIG. 6.

And for another example, if and when a maker of an object-oriented knowledge base system disclosed in the present invention expands and/or makes a renewal of an 'ideal thesaurus', which is a part of an 'object-oriented knowledge base' (see FIG. 1), according to 'means for giving definition of higher class algorithm-of-process and lower class algorithm-of-process' wherein the maker uses an 'ideal dictionary' as the basis of data on which 'means for giving definition of broader descriptor and narrower descriptor' is carried out, then, the maker of the object-oriented knowledge base system can expand and/or make a renewal of an 'ideal classification table' systematically in a consist way.

When 'means for carrying out an inference' is carried out, 'rules', which is a part of an 'object-oriented knowledge base' (see FIG. 1), are used as the basis of knowledge on which an inference is carried out. The lexical definition of 'rules' will be given just later in the present invention. As for the contents of the 'rules', see FIG. 5 and the explanation thereof. An almost indispensable procedure which should be carried out almost whenever a 'means for carrying out an inference' is put into practice, is what I call 'means for carrying out sentence based object-oriented categorical syllogism' (see FIG. 1). This 'means for carrying out sentence based object-oriented categorical syllogism' is a means for carrying out a special kind of syllogism, which I originally introduced in the present invention. 'Means for carrying out sentence based object-oriented categorical syllogism' is a special method in which an 'ideal thesaurus' and an 'ideal classification table' is made full use of. And if and when 'means for carrying out sentence based object-oriented categorical syllogism' is used as a tool of 'means for carrying out an inference', then, the range and/or scope in which a 'rule' is applicable is expanded in an exhaustive and flexible manner. And as the result, it becomes possible that not only mathematical formula but also Sentences described in a natural language (for example, in English) is processed in an object-oriented knowledge base system disclosed in the present invention. Thus, what I call sentence based object-oriented categorical syllogism, which is used when the inference is carried out, makes it possible that the object-oriented knowledge base system can process not only mathematical equations but also linguistic sentences based on a simple English grammar.

The lexical definition of 'means for carrying out sentence based object-oriented categorical syllogism' will be given later in the present invention.

Lexical Definition of an 'Object-Oriented Knowledge Base'

An 'object-oriented knowledge base' is a set of a plurality of knowledge which are recorded in an object-oriented style and are used as the basis on which inference is carried out in an object-oriented knowledge base system. It is recommended that an object-oriented knowledge base disclosed in the present invention should comprise 1) 'rules', 2) "keys described using 'means for storing data providing the ability of association'", 3) facts.

This recommended constitution of an object-oriented knowledge base disclosed in the present invention is schematically shown in FIG. 1. The first component of an 'object-oriented knowledge base' is 'rules'.

Lexical Definition of a 'Rule'

'A rule' used in an 'object-oriented knowledge base', means a sentence stored in the 'object-oriented knowledge base' which is described in a form of a hypothetical proposition. And a rule is used as a knowledge used in a step of reasoning during an inference carried out by using an object-oriented knowledge base system.

Figure 5:
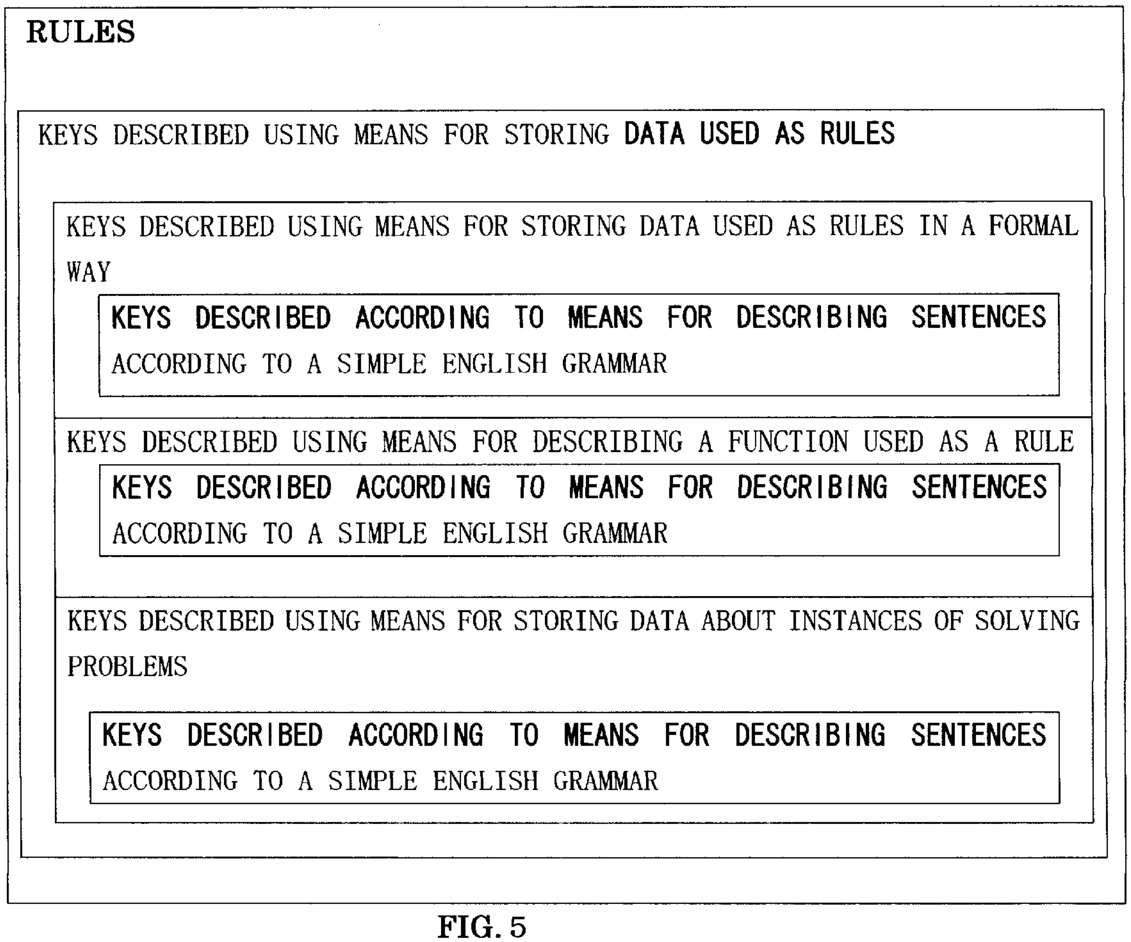
FIG. 5 shows a recommended constitution of rules.

According to the lexical definition of what I call 'means for storing data used as rules', which will be given later in the present invention, it is reasonable in most cases that 'a rule' used in an 'object-oriented knowledge base' should be described as a "key described using 'means for storing data used as rules'" (see FIG. 5).

If and when an object-oriented knowledge base system disclosed in the present invention is to be used to carry out an inference especially in a branch of mathematics and/or in a branch of physics, then, it is recommended that a 'rule' in the 'object-oriented knowledge base' should be described using what I call "sentence pattern of physical and/or mathematical rules". "Sentence pattern of physical and/or mathematical rules"] has a style based on English grammar, and a sentence written in "sentence pattern of physical and/or mathematical rules" is extremely readable for a man who can speak English. The lexical definition of "sentence pattern of physical and/or mathematical rules" will be given later in the present invention. As will be described later in the present invention, I call a sentence described in "sentence pattern of physical and/or mathematical rules", a 'means for storing data used as rules n a formal way'. (See the lexical definition of 'means for storing data used as rules in a formal way' given later in the present invention). According to this naming, the same sentence I have stated just before is paraphrased as follows; If and when an object-oriented knowledge base system disclosed in the present invention is to be used to carry out an inference especially in a branch of mathematics and/or in a branch of physics, then, it is recommended that a "key described using 'means for storing data used as rules in a formal way'" should be used as a "key described using 'means for storing data used as rules'" (See FIG. 5).

As will be shown later in the section of "§Industrial Applicability" of the present invention, an object-oriented knowledge base system disclosed in the present invention can to be used in various branches of software engineering. In many computer-programming languages, such as C, Lisp, and/or APL, a subroutine in a source code of a computer program is called a function. If and when an object-oriented knowledge base system disclosed in the present invention is to be used to carry out an inference especially to compose a code in such 'function programming languages', then, it is recommended that a 'rule' in the 'object-oriented knowledge base' should be described using what I call "sentence pattern of function". "Sentence pattern of function" has a English grammar based style, and a sentence written in "sentence pattern of function" is extremely readable for a man who can speak English. The lexical definition of "sentence pattern of function" will be given later in the present invention. As will be described later in the present invention, I call a sentence described in "sentence pattern of function", a 'means for describing a function' used as a rule'. (See the lexical definition of' means for describing a function used as a rule' given later in the present invention). According to this naming, the same sentence I have stated just before is paraphrased as follows; If and when an object-oriented knowledge base system disclosed in the present invention is to be used to carry out an inference especially in a branch of software engineering, then, it is recommended that a "key described using 'means for describing a function used as a rule'" should be used as a "key described using 'means for storing data used as rules'" (See FIG. 5).

If and when an object-oriented knowledge base system disclosed in the present invention has been used to give an answer to a question asked by users of the system, and a good result is obtained finally, then, it is recommended that the log of the steps of the reasoning that gave the answer successfully, should be recorded. It is recommended the cleverly arranged rules used in each step of the reasoning stored in the log should be reused afterwards when similar question is to be answered by using an object-oriented knowledge base system disclosed in the present invention. It is recommended that such a log should be recorded as a sentence described in "sentence pattern of instances of solving problems". A plurality of rules described either in "sentence pattern of physical and/or mathematical rules" and/or in "sentence pattern of function" may be used as a contents of a sentence described in "sentence pattern of instances of solving problems". The lexical definition of "sentence pattern of instances of solving problems" will be given later in the present invention. As will be described later in the present invention, I call a sentence described in "sentence pattern of instances of solving problems", a 'means for storing data about instances of solving problems'. According to this naming, the same sentence I have stated just before is paraphrased as follows; If and when an object-oriented knowledge base system disclosed in the present invention has been used to give an answer to a question asked by users of the system, and a good result is obtained finally, then, it is recommended that a "key described using 'means for storing data used as rules'" which stores the body of the information of the log of the inference, should be described as "a key described according to 'means for storing data about instances of solving problems' (See FIG. 5).

The second component of an 'object-oriented knowledge base' is "keys described using 'means for storing data providing the ability of association'" (See FIG. 1). A "key described using 'means for storing data providing the ability of association'" is a sentence which is used as the basis of knowledge on which 'means for carrying out an inference' helps the user to search 'key words' which are associated with natural words representing the user's idea. It is recommended that a user of an object-oriented knowledge base system disclosed in the present invention should use a 'key word' rather than a 'natural word' when the user operates the digital computing system. These 'key words' are usually used to make a query when the user wants to retrieve usable 'rules' for a step of reasoning during an inference. In an object-oriented knowledge base system disclosed in the present invention, it is recommended that a 'descriptor', and/or a 'name-of-classification-item' should be used as a 'key word'. The lexical definition of 'means for storing data providing the ability of association', 'descriptor', and/or 'name-of-classification-item' has been already given in the present invention.

The third component of an 'object-oriented knowledge base' is 'facts' (See FIG. 1).

Lexical Definition of Facts

A sentence that is described in a form of a categorical proposition is a fact if it is true. It is recommended that the body of information of an 'ideal thesaurus' and/or of an 'ideal classification table' should be used as 'facts', in an object-oriented knowledge base system disclosed in the present invention (see FIG. 1).

It is recommended that a plurality of facts should be stored in an 'ideal thesaurus', and/or in an 'ideal classification table' in an object-oriented knowledge base system disclosed in the present invention. In other words, an 'ideal thesaurus', and/or an 'ideal classification table' is a set of facts. Usually, a large number of nouns are registered in an 'ideal thesaurus'. And it is recommended that the information of the hierarchical relation among the nouns should be stored in the 'ideal thesaurus'. And usually, a large number of verbs are registered in a 'classification table'. And it is recommended that the information of the hierarchical relation among verbs should be stored in the 'classification table'.

Lexical Definition of an 'Object-Oriented Knowledge Base Management System'

An 'object-oriented knowledge base management system' is a system with which a maker of an object-oriented knowledge base system manages an 'object-oriented knowledge base'.

An 'object-oriented knowledge base management system' is a part of an 'object-oriented knowledge base system' whose constitution is a recommended constitution. (See FIG. 1).

It is recommended that an 'object-oriented knowledge base management system' disclosed in the present invention should comprise 1) 'ideal dictionary'
2) 'Means for giving definition of broader descriptor and narrower descriptor' and

3) 'Means for giving definition of higher class algorithm-of-process and lower class algorithm-of-process'.

(See FIG. 6)

The lexical definition of an 'ideal dictionary' has already given in the present invention. An 'ideal dictionary' is used, in an object-oriented knowledge base system disclosed in the present invention, as the basis on which an 'ideal thesaurus' is constructed. That is, A'means for giving definition of broader descriptor and narrower descriptor' is used as a tool to construct a hierarchical system of nouns in an 'ideal thesaurus' on the basis of the 'object-oriented-lexical-definition of nouns' in an ideal dictionary.

An 'ideal dictionary' is used also as the basis on which an 'classification table' is constructed. That is, a 'means for giving definition of higher class algorithm-of-process and lower class algorithm-of-process' is used as a tool to construct a hierarchical system of verbs in an 'ideal classification table' on the basis of 'dichotomy of 'quality'', in combination with c-language-like way of description of English sentences in the lexicon' described in an 'ideal dictionary'.

3.3.1. Making Full use of Hierarchy of 'Descriptors' and 'Names-of-Classification-Items' in an Object-Oriented Database As described above, both 'descriptors' and 'names-of-classification-items' have hierarchy in an object oriented knowledge base system in the present invention. First, I describe how to make the query for precise and specific retrieval in one case and how to make the query for exhaustive retrieval in another case when an object oriented knowledge base system disclosed in the present invention is used as a database. As a matter of fact, if and when a 'rule' is retrieved during an 'inference' carried out by an object-oriented knowledge base system disclosed in the present invention, then, the object-oriented knowledge base system of the present system often works just as a similar way with which a database works. The detail how an object-oriented knowledge base system disclosed in the present invention works will be disclosed later in the present invention. I claim that it is very effective to make use of hierarchy of 'descriptors' and 'names-of-classification-items' in a database.

As mentioned before in the present invention, the hierarchical structure of 'descriptors' in the present invention is determined on the basis of the idea of 'object'. In this sense, a database disclosed in the present invention is an object-oriented database.

Let me give some example in which an object-oriented knowledge base is used, before I give detailed explanation about object-oriented knowledge base system. For example, let us assume that a user of the system tries to retrieve the information concerning 'child raising of polar bears'. Let us assume that the user of the system first searches appropriate 'descriptors' and/or 'names-of-classification-items'. Let us assume that the user of the system first hits upon a 'descriptor' __(bear)__ during a retrieval using a natural word 'bear' in the query on the basis of @[algorithm of making a list of 'descriptors' ranked in order of hit frequency]. And then, the user of the system hits upon the 'names-of-classification-items' __{child raising}__ during a retrieval using a natural word 'raising' in the query on the basis of @[algorithm of making a list of 'names-of-classification-items' ranked in order of hit frequency].

As mentioned before, @[algorithm of making a list of 'descriptors' ranked in order of hit frequency] is an algorithm with which one can obtain a list of 'descriptors' associated with a natural word. And @[algorithm of making a list of 'names-of-classification-items' ranked in order of hit frequency] is an algorithm with which one can obtain a list of 'names-of-classification-items' associated with a natural word.

If and when, too many keys are obtained during a retrieval of the information concerning 'child raising of polar bears', using the intersection of __(bear)__ and __{child raising}__, then, it is recommended that the user of the system should consults the 'ideal thesaurus' to find 'descriptors' which are narrower than __(bear)__, and should consult the 'ideal classification table' to find 'name-of-classification-item' which are lower than __{child raising}__.

It should be noted that in a usual database system, as well as in an object-oriented knowledge base system disclosed in the present invention, if a user of the system makes a query using a broader 'descriptor', then, not only the keys including the broader 'descriptor' but also the keys including any of the narrower 'descriptors' of the broader 'descriptor', are retrieved. Therefore, if one wants a more precise retrieval, then, he should use a as narrow 'descriptor' as possible.

It should also be noted that in a usual database system, as well as an object-oriented knowledge base system disclosed in the present invention, if a user of the system makes a query on the basis of a higher class 'name-of-classification-item', then, not only the keys including the higher class 'name-of-classification-item' but also the keys including any of the lower class 'names-of-classification-items' of the higher class 'names-of-classification-items', are retrieved. Therefore, if one wants a more precise retrieval, then he should use as low class 'names-of-classification-items' as possible.

Let us assume that the user of the system uses the 'ideal thesaurus' and finds a 'descriptor' __(polar bear)__, which is a narrower descriptor of __(bear)__. This (polar bear)__ just fits to the retrieval of the theme. The user of the system will be able to make a retrieval more precisely by using a Boolean search in which the intersection of __(polar bear)__ and __{child raising}__ are used as a query, and the number of hit keys will be reduced reasonably.

Thus, in general, if and when too many keys are retrieved using broader 'descriptors' in the query, then, it is recommended that a user of the database system should retrieve more precisely by using narrower 'descriptors', instead of by using the broader 'descriptors'. In such a case, it is recommended that the user should look up keys described in "sentence pattern of 'ideal thesaurus'" to find such narrower 'descriptors' associated with the broader 'descriptors'. If and when a user of the system wants to, thus, find narrower 'descriptors', then it is recommended that he should make use of the procedure outlined in Formula. 13. In Formula. 13, a quasi-C code which outlines the procedure to search and list the 'descriptors' that are narrower (by one rank) than a 'descriptor' is shown.

And if and when too many keys are retrieved for a retrieval using higher class 'names-of-classification-items', then, it is recommended that a user of the database system should retrieve more precisely by using lower class 'names-of-classification-items' instead of by using higher class 'names-of-classification-items'. In such a case, it is recommended that the user looks up keys described in "sentence pattern of classification" to find such lower class 'names-of-classification-items' associated with the higher class 'names-of-classification-items'. When a user of the system wants to, thus, find lower class 'names-of-classification-items', then it is recommended that he should make use of the procedure outlined in Formula. 14. In Formula. 14, a quasi-C code which outlines the procedure to search and list the 'names-of-classification-items' that are lower class (by one rank) of a 'name-of-classification-item'.

In general, the full purpose of retrieval made by the user of the system is seldom achieved only by carrying out single step of retrieval, but is usually approached step by step toward the perfect solution. In other words, in a retrieval, the keys retrieved in the present step is used as seeds to search the key words to be used in the next step of retrieval, and a retrieval using the key words should be practiced in the next step.

In some cases of retrieval, too many keys are retrieved in the present step, and as a result, the processing capacity of the computer system falls into puncture during the next step and/or during thereafter steps. Combinatorial explosion described later is such a case.

In such cases, it is recommended that Method-1) described below and/or Method-2) described in the next section should be carried out.

3.3.1.1. @[Algorithm of Narrowing Down the Target 'Descriptors' and/or Target 'Names-of-Classification-Items']

I will give here a lexical definition of @[algorithm of narrowing down the target 'descriptors' and/or target 'names-of-classification-items'].

Lexical Definition of @[algorithm of narrowing down the target 'descriptors' and/or target 'names-of-classification-items']

Method-i) defined below is an @[algorithm of narrowing down the target 'descriptors' and/or target 'names-of-classification-items'];

Method-1) is a method to make 『retrieval to be made in the present step』 more precise than 『retrieval made in the preceding step』, by using not only the 'descriptors', the 'next-best-natural-nouns', the 'names-of-classification-items' and the 'next-best-natural-verbs' that were used to form a conjunctive expression of a Boolean search's query for 『retrieval made in the preceding step』, but also supplemental 'descriptors', supplemental 'next-best-natural-nouns', supplemental 'names-of-classification-items', and supplemental 'next-best-natural-verbs' that are contrived and/or revived by the user of the system in the present step, to form conjunctive expression of a Boolean search's query for the 『retrieval to be made in the present step』, and/or, by finding redundant 'descriptors', redundant 'next-best-natural-nouns', redundant 'names-of-classification-items', and redundant 'next-best-natural-verbs' that were used to form a disjunctive expression of a Boolean search's query for 『retrieval made in the preceding step』, and omitting the redundant 'descriptors', the redundant 'next-best-natural-nouns', the redundant 'names-of-classification-items', and the redundant 'next-best-natural-verbs' from disjunctive expressions of a Boolean search's query for the 『retrieval to be made in the present step』, and/or, by finding too broad 'descriptors' that were used to form a conjunctive and/or subjunctive expression of a Boolean search's query for T retrieval made in the preceding step], and replacing them with their narrower 'descriptors', which can be found by looking up keys described in "sentence pattern of 'ideal thesaurus'" according to a procedure such as the procedure outlined in Formula. 13, and using the narrower 'descriptors' to form a conjunctive and/or subjunctive expression of a Boolean search's query for 『retrieval to be made in the present step』, and or, by finding too high class 'names-of-classification-items' that were used to form a conjunctive and/or subjunctive expression of a Boolean search's query for 『retrieval made in the preceding step』, and replacing them with their lower class 'names-of-classification-items', which can be found by looking up keys described in "sentence pattern of classification" according to a procedure such as the procedure outlined in Formula. 14, and using the lower class 'names-of-classification-items' to form a conjunctive and/or subjunctive expression of a Boolean search's query for 『retrieval to be made in the present step』.

Lexical Definition of 'Means for Narrowing Down the Target 'descriptors'"

Lexical Definition of 'Means for Narrowing Down the Target 'Names-of-Classification-Items"

@[Algorithm of narrowing down the target 'descriptors' and/or target 'names-of-classification-items'] and/or something that stores the information of it, is a 'means for narrowing down the target 'descriptors" when 'descriptors' are targeted in the algorithm, and is a 'means for narrowing down the target 'names-of-classification-items" when 'names-of-classification-items' are targeted in the algorithm.

Lexical Definition of 'Algorithm of Narrowing Down the Target 'Descriptors"

Lexical Definition of 'algorithm of narrowing down the target 'names-of-classification-items"

'Algorithm of narrowing down the target 'descriptors" plus 'algorithm of narrowing down the target 'names-of-classification-items" equals to @[algorithm of narrowing down the target 'descriptors' and/or target 'names-of-classification-items']

3.3.1.2. @[Algorithm of Broadening Out the Target 'Descriptors' and/or Target 'Names-of-Classification-Items']

On the other hand, for example, let me assume a situation in which so small number of keys are retrieved in the present step of retrieval using the descriptor __(bear)__, that the retrieval in the next step can not be carried out any more.

In this situation, it is recommended that the user of an object-oriented knowledge base system of the present invention should use __(mammal)__, which is a broader 'descriptor' of __(bear)__, instead of __(bear)__to make a query. If the user of the system uses the descriptor __(mammal)__, then all the keys that include any of the narrower 'descriptors' of __(mammal)__, such as __(cat)__, __(dog)__, __(panda)__, are retrieved by a database system. Therefore, much more number of keys are retrieved when __(mammal)__ is used instead of __(bear)__. Thus, the number of retrieved keys can be increased.

In general, if and when too less keys are retrieved, then, it is recommended that a user of an object-oriented knowledge base system disclosed in the present invention should make more exhaustive retrieve by making use of what I call @[algorithm of broadening out the target 'descriptors' and/or target 'names-of-classification-items'].

Lexical Definition of @[algorithm of broadening out the target 'descriptors' and/or target 'names-of-classification-items']

A method to make 『retrieval to be made in the present step』 more exhaustive than 『retrieval made in the preceding step』 by using not only the 'descriptors', the 'next-best-natural-nouns', the 'names-of-classification-items' and the 'next-best-natural-verbs' that were used to form a disjunctive expression of a Boolean search's query for 『retrieval made in the preceding step』, but also supplemental 'descriptors', supplemental 'next-best-natural-nouns', supplemental 'names-of-classification-items', and supplemental 'next-best-natural-verbs' that are contrived and/or revived by the user of the system in the present step, to form disjunctive expression of a Boolean search's query for the 『retrieval to be made in the present step』, and/or, by finding less important 'descriptors', less important 'next-best-natural-nouns', less important 'names-of-classification-items', and less important 'next-best-natural-verbs' that were used to form a conjunctive expression of a Boolean search's query for 『retrieval made in the preceding step』, and omitting the less important 'descriptors', the less important 'next-best-natural-nouns', the less important 'names-of-classification-items', and the less important 'next-best-natural-verbs' from conjunctive expressions of a Boolean search's query for the 『retrieval to be made in the present step』, and/or, by finding too narrow 'descriptors' that were used to form a conjunctive and/or subjunctive expression of a Boolean search's query for 『retrieval made in the preceding step』, and replacing them with their broader 'descriptors', which can be found by looking up keys in "sentence pattern of 'ideal thesaurus'" according to a procedure, such as a procedure outlined in Formula. 10, and using the broader 'descriptors' to form a conjunctive and/or subjunctive expression of a Boolean search's query for 『retrieval to be made in the present step』, and or, by finding too low class 'names-of-classification-items' that were used to form a conjunctive and/or subjunctive expression of a Boolean search's query for 『retrieval made in the preceding step』, and replacing them with their higher class 'names-of-classification-items', which can be found by looking up keys described in "sentence pattern of classification" according to a procedure, such as the procedure outlined in Formula. 11, and using the higher class 'names-of-classification-items' to form a conjunctive and/or subjunctive expression of a Boolean search's. query for 『retrieval to be made in the present step』, is an @[algorithm of broadening out the target 'descriptors' and/or target 'names-of-classification-items'].

Lexical Definition of 'Means for Broadening Out the Target 'descriptors"

Lexical Definition of 'Means for Broadening Out the Target 'Names-of-Classification-Items"

@[Algorithm of broadening out the target 'descriptors' and/or target 'names-of-classification-items'] and/or something that stores the information of it, is a 'means for broadening out the target 'descriptors" when 'descriptors' are targeted in the algorithm, and is a 'means for broadening out the target 'names-of-classification-items" when 'names-of-classification-items' is targeted in the algorithm.

3.3.1.3. @[Algorithm of Fusing Propositions]

A step of reasoning carried out in an object-oriented knowledge base system disclosed in the present invention is either a step of forward reasoning and/or a step of backward reasoning. Whether a forward reasoning is carried out and/or a backward reasoning is carried out is determined is case by case. In a word, a step of reasoning carried out in an object-oriented knowledge base system disclosed in the present invention is a step of opportunistic reasoning. In a step of the opportunistic reasoning carried out by an object-oriented knowledge base system disclosed in the present invention, the rules to be used in the opportunistic reasoning are retrieved from the knowledge base. In a word, in the step, the object-oriented knowledge base system disclosed in the present invention works as a database system. In the following discussion of the present section, only the case in which all the keys retrieved and/or composed in the present step of opportunistic reasoning are hypothetical propositions (i.e. are propositions in the form of "If , then *.") is discussed. I call here, the '' the presupposition of the hypothetical proposition, and I call the '*' the consequence of the hypothetical proposition.

In some cases, so many rules which is a 'hypothetical proposition to be used in forward reasoning' and/or is a 'hypothetical propositions to be used in backward reasoning' are retrieved, that the processing capacity of the computer system falls into puncture during the next step and/or during thereafter steps; i.e. I describe such situations that "combinatorial explosion occurs".

In such a case, Method-1) can be used to cut down the number of the retrieved rules. However, as a side effect of Method-1), even a useful rule may be mistaken as a noise, and is abandoned. If a useful rule is thus abandoned, then, the opportunistic reasoning may fall into a deadlock in later steps. In such a case, Method-1) which caused such a deadlock must be withdrawn, and Method-2) should be used instead in the step of the opportunistic reasoning of the present step.

Method-2) is used in an object-oriented knowledge base system disclosed in the present invention when combinatorial explosion occurs. In Method-2), too many 'hypothetical propositions to be used in forward reasoning' and/or too many 'hypothetical propositions to be used in backward reasoning' are 'summarized', in an rough and approximate way, into little number of general hypothetical propositions (i.e. little number of general rules) with high degree of abstraction. A general rule, thus obtained, of course, have many exceptions. Therefore, it is recommended that verification should be done afterwards when an 'approximate' solution is obtained in some later step of opportunistic reasoning, if and when this general and approximate rule is used. But as the number of such general rule is very small, the computer system evades puncture at the cost of some degree of incorrectness. Method-2) is a systematic way to make 'random guesswork' by using such general rules. As such summarization is not exact, I use a word 'fuse' instead of 'summarize' in the following discussion when I state this issue.

I will outline the concept of 'fuse' as follows:

Let me think about a situation in which there is one 'hypothetical proposition that is the target of the present step of forward reasoning', and there are two hypothetical propositions to be used in the present step of forward reasoning. I call here, a proposition that is tried to be proven in the present step of forward reasoning, the 'hypothetical proposition that is the target of the present step of forward reasoning'. Under these assumptions, in a usual case, two hypothetical propositions that are to be used as the target of the next step of opportunistic reasoning (i.e. there will be tow hypothetical propositions that are tried to be proven in the next step of opportunistic reasoning) will be obtained.

Lexical Definition of Opportunistic Reasoning

Inference in either step of which, either forward reasoning and/or backward reasoning is chosen and carried out case by case, is an opportunistic reasoning. In the present invention, I regard inference in which only forward reasoning is carried out in each step also as an opportunistic reasoning. I regard inference in which only backward reasoning is carried out in each step also as an opportunistic reasoning.

However, there exists an exceptional case; If the two hypothetical proposition to be used in the present step of forward reasoning has the same consequence, there will be only one hypothetical propositions which are the target of the next step of opportunistic reasoning, because only one reasoning is necessary in this case. In a word, two hypothetical proposition to be used in the present step of forward reasoning works as if they were the same hypothetical proposition to be used in the present step of forward reasoning, if and when they have strictly the same consequence. I call this situation that "the two hypothetical proposition to be used in the present step of forward reasoning is strictly fused if and when they have strictly the same consequence". In this case, the number of the hypothetical propositions to be used in the present step of forward reasoning is effectively and exactly one.

The main issue which I will describe in detail below is how to handle the situation in which two or more 'hypothetical propositions to be used in the present step of forward reasoning have approximately the same consequence. In the following discussion, I will show @[algorithm of fusing propositions] by which to give a proposition which is approximately equivalent to all of the consequences which are similar one another. I call this proposition the 『fused consequence』.

And I call the hypothetical proposition
whose consequence is the 『fused consequence』 and whose presupposition equals to one of the presuppositions of the 'two or more hypothetical propositions to be used in the present step of forward reasoning'
the 『fused hypothetical propositions to be used in the present step of forward reasoning』.

If there is one hypothetical proposition which is the target of the present step of forward reasoning and if the 'two or more hypothetical proposition to be used in the present step of forward reasoning' are used in the present step of forward reasoning, then, two hypothetical propositions which are to be used as the target of the next step of opportunistic reasoning will be obtained. However, in @[algorithm of fusing propositions], a 『fused hypothetical propositions to be used in the present step of forward reasoning』 instead of 'two or more hypothetical proposition to be used in the present step of forward reasoning' is used in the present step of forward reasoning. Then, as a result, only one approximate hypothetical proposition that is the target of the next step of opportunistic reasoning will be obtained. In this case, the number of the hypothetical propositions to be used in the present step of forward reasoning is effectively and approximately one.

In a word, in a procedure according to @[algorithm of fusing propositions], 『fused hypothetical propositions to be used in the present step of forward reasoning』 is used.

Then, as the result, exactness of the forward reasoning is lost, but the number of 'hypothetical propositions that are the target of the next step of opportunistic reasoning' is thus drastically reduced and the combinatorial explosion is expected to be avoided.

In the similar way, let me think about a situation in which there is one hypothetical proposition that is the target of the present step of backward reasoning, and there are two hypothetical proposition to be used in the present step of backward reasoning. I call here, a proposition that is tried to be proven in the present step of backward reasoning, the 'hypothetical proposition that is the target of the present step of backward reasoning'. Under these assumptions, in a usual case, tow hypothetical propositions that are the target of the next step of opportunistic reasoning will be obtained.

However, there exists an exceptional case; If the two hypothetical proposition to be used in the present step of backward reasoning has the same presupposition, there will be only one hypothetical propositions which are the target of the next step of opportunistic reasoning, because only one reasoning is necessary in this case. In a word, two hypothetical proposition to be used in the present step of backward reasoning works as if they were the same hypothetical proposition to be used in the present step of backward reasoning, if and when they have strictly the same presupposition. I call this situation that "the two hypothetical proposition to be used in the present step of backward reasoning is strictly fused if and when they have strictly the same presupposition". In this case, the number of the hypothetical propositions to be used in the present step of forward reasoning is effectively and exactly one.

The main issue which I will describe in detail below is how to handle the situation in which two or more hypothetical propositions to be used in the present step of backward reasoning have approximately the same presupposition. In the following discussion, I will show @[algorithm of fusing propositions] by which to give a proposition which is approximately equivalent to all of the presuppositions which are similar one another. I call this proposition the 『fused presupposition』, and I call the hypothetical proposition whose presupposition is the 『fused presupposition』 and whose consequence equals to one of the consequences of the 'two or more hypothetical propositions to be used in the present step of backward reasoning' the 『fused hypothetical propositions to be used in the present step of backward reasoning』.

If there is one hypothetical proposition which is the target of the present step of backward reasoning and if the 'two or more hypothetical proposition to be used in the present step of backward reasoning' is used in the present step of backward reasoning, then, there will be more than two hypothetical propositions which are the target of the next step of opportunistic reasoning. However, in @[algorithm of fusing propositions], a 『fused hypothetical propositions to be used in the present step of backward reasoning』 instead of 'two or more hypothetical proposition to be used in the present step of backward reasoning' is used in the present step of backward reasoning, then, there will be only one approximate hypothetical propositions which are the target of the next step of opportunistic reasoning. In this case, the number of the hypothetical propositions to be used in the present step of backward reasoning is effectively and approximately one.

In a word, in a procedure according to @[algorithm of fusing propositions], 『fused hypothetical propositions to be used in the present step of backward reasoning』 is used, then, as a result, exactness of the backward reasoning is lost, but the number of 'hypothetical propositions which are the target of the next step of opportunistic reasoning' is thus drastically reduced and the combinatorial explosion may be avoided.

Thus, Method-2) is a special kind of method to help a reasoning. More strictly speaking, Method-2) is a systemized way of 'random guesswork' used in a reasoning of an object-oriented knowledge base system disclosed in the present invention. More specifically speaking, if and when Method-2) is used to get the answerer to a question just anyway, then, afterwards, the answer must be verified in a strict way. Method-2) is a method which is recommended to be carried out when Method- 1) can not be carried out and/or when too many keys are retrieved even after Method-1) has been carried out.

If a forward reasoning is carried out in the present step of opportunistic reasoning, then the 『propositions which should be fused』 are the consequences of the 'hypothetical proposition to be used in forward reasoning', which are retrieved in the present step of opportunistic reasoning. And if a backward reasoning is carried out in the present step of opportunistic reasoning, then the 『propositions which should be fused』 are the presuppositions of the 'hypothetical proposition to be used in backward reasoning', which are retrieved in the present step of opportunistic reasoning.

Lexical Definition of @[algorithm of fusing propositions]

Method-2) defined below is an

@[algorithm of fusing propositions].

I will describe details of Method-2) carried out under such ideal cases described below:

In ideal cases, a maker of the contents of an 'object-oriented knowledge base' disclosed in the present invention uses a 'classification table' and have already classified verbs in the keys retrieved in the present step of opportunistic reasoning. And in ideal case, a maker of the contents of the 'object-oriented knowledge base' disclosed in the present invention, have formalized the presuppositions and the consequences of the hypothetical propositions that are used as rules, by using the five basic sentence patterns in English grammar. That is, for example, not only when the sentence of presupposition and/or of consequence, is written in English sentences, but also when the sentence of presupposition and/or of consequence, is written in non-English sentences, the maker of the contents of an object-oriented database disclosed in the present invention is recommended to divide the sentence of presupposition and/or of consequence into part of 'subject-word (S)', part of 'verb (V)', part of 'complement-word (C)', part of 'object-word (O)', part of 'indirect-object-word (I.O)', and part of 'direct-object-word (D.O)', explicitly according to the English grammar. And then, to rearrange them according to the word order defined by English grammar.

In an ideal case, all the names of the 'algorithms-of-processes' used as 'ideal verbs' of the formalized keys retrieved in the present step of opportunistic reasoning are a 'name-of-classification-item'.

In such ideal cases described above, Method-2) is described as follows

1) First, I here show how to classify the 『propositions which should be fused』 in a step of opportunistic reasoning into several sets. As I discuss here the ideal case, a verb used in the 『propositions which should be fused』 is a 'name-of-classification-item'.

Let me suppose that there exist two such 『propositions which should be fused』. If the 'names-of-classification-items' used in the two 『propositions which should be fused』 share one common higher class 'name-of-classification-item', then, I regard the two 『propositions which should be fused』 as members of the same set characterized by the common higher class 'name-of-classification-item'. This set is a set of 『propositions which should be fused』 which is characterized by the common higher class 'names-of-classification-items'.

More than two 『propositions which should be fused』 may be included in such a set characterized by a common higher class 'name-of-classification-item', if more than two 『propositions which should be fused』 shares the common higher class 'name-of-classification-item'; In other words, the number of the members of such a set may be more than two. In general la set characterized by a common higher class. 'name-of-classification-item' has very large number of members, if the common higher class 'name-of-classification-item' is a very high class 'name-of-classification-item'. And in general, a set characterized by a common higher class 'name-of-classification-item' has rather small number of members if the common higher class 'name-of-classification-item' is a not very high class 'name-of-classification-item'.

If the procedure outlined by the quasi-C code given in Formula. 11 is used, then, the 'names-of-classification-items' that are higher class (by one rank) of a 'names-of-classification-items' are searched and listed. If the procedure outlined by the quasi-C code given in Formula. 11 is continued to be used for each of the 'names-of-classification-items' in the list, the complete list in which all the 'names-of-classification-items' which are higher class of a 'names-of-classification-items' are registered, can be obtained at last. If such a complete list is made for two 'names-of-classification-items', and all the members in the two complete list is compared and a common 'names-of-classification-item' is found, then, the two 'names-of-classification-items' is judged to share common higher class 'names-of-classification-item'. If no such common 'names-of-classification-item' is found, then the two 'names-of-classification-items' is judged to not share any common higher class 'names-of-classification-item'. In such comparison, strcmp( ), which is an ANSI C library function, can be used.

Thus, varieties of size of such a kind of set, of course, can be defined if and when 'names-of-classification-items' with varieties of degrees of abstraction are used to characterize such sets.

If the set comprising the 'hypothetical proposition to be used in forward reasoning' and/or the 'hypothetical propositions to be used in backward reasoning' that are retrieved in a step of opportunistic reasoning, are regarded as the universal set, then, sub-sets can be defined using above described way.

That is, when the universal set is characterized by a common higher class 'names-of-classification-item', let us assume that there is another common higher class 'names-of-classification-item' which is lower class of the 'names-of-classification-item' characterizing the universal set. If and when, a member of the universal set contains 『propositions which should be fused』 which is the member of the set characterized the another common higher class 'names-of-classification-item', which is lower class of the 'names-of-classification-item' characterizing the universal set, then, a set that has such members is a sub-set characterized by the common higher class 'names-of-classification-item'.

The higher the degree of abstraction of the 'names-of-classification-item' characterizing a sub-set is, the smaller the number of such sub-sets becomes. On the other hand, the lower the degree of abstraction of the higher class 'names-of-classification-items' is, the larger the number of such subsets becomes. I define an 'appropriate degree of abstraction' as the least degree of abstraction high enough to make the number of such sub-sets and to prevent the combinatorial explosion. In an ideal case, such an 'appropriate degree of abstraction' exists. Thus sub-sets of 『propositions which should be fused』 is defined.

In an ideal case, each of 'subject-word (S)', 'complement-word (C)', 'object-word (O)', 'indirect-object-word (I.O)', 'direct-object-word (D.O)' of each sub-set of 『proposition which should be fused』 consists only of single 'descriptor'.

2) Next, it is recommended that for each of 'descriptor' used for 'subject-word (S)', 'descriptor' used for 'complement-word (C)', 'descriptor' used for 'object-word (O)', 'descriptor' used for 'indirect-object-word (I.O)', and 'descriptor' used for 'direct-object-word (D.O)' of each sub-set of 『propositions which should be fused』, a broader 'descriptor' commonly associated with the 'subject-words (S)' in the sub-set, a broader 'descriptor' commonly associated with the 'complement-words (C)' in the sub-set, a broader 'descriptor' commonly associated with the 'object-words (O)' in the sub-set, a broader 'descriptor' commonly associated with the 'indirect-objects (I.O)' in the sub-set, and/or a broader 'descriptor' commonly associated with the 'direct-object-words (D.O)' in the sub-set should be searched.

In an ideal case, such broader 'descriptors' exist.

3) Next, for all the 『propositions which should be fused』 in each sub-set, replace the 'names-of-classification-items' with above mentioned common higher class 'names-of-classification-item', which has an 'appropriate degree of abstraction'.

Next, for all the 『propositions which should be fused』 in each sub-set, replace each of 'descriptor' originally used for 'subject-word (S)', 'descriptor' originally used for 'complement-word (C)', 'descriptor' originally used for 'object-word (O)', 'descriptor' originally used for 'indirect-object-word (I.O)', and 'descriptor' originally used for 'direct-object-word (D.O)' with each of above mentioned the broader 'descriptor' commonly used in the sub-set for 'subject-words (S)', the broader 'descriptor' commonly used in the sub-set for 'complement-words (C)', the broader 'descriptor' commonly used in the sub-set for 'object-words (O)', the broader 'descriptor' commonly used in the sub-set for 'indirect objects (I.O)', and/or the broader 'descriptor' commonly used in the sub-set for 'direct-object-words (D.O)'.

As a result of this replacement, all the 『propositions which should be fused』 in each sub-set are transformed into a common single proposition, which I call a 『fused propositions』 with 'appropriate degree of abstraction'.

In ideal cases, thus formalized 『fused proposition』 with 'appropriate degree of abstraction' is singly obtained to each of the sub-sets.

In a step of forward reasoning, this 『fused propositions』 is called a 『fused consequence』, and 『fused hypothetical propositions to be used in the present step of forward reasoning』 is defined as a hypothetical proposition whose consequence is the 『fused proposition』 and whose presupposition equals to one of the presuppositions of the 'two or more hypothetical propositions to be used in the present step of forward reasoning'.

In a step of backward reasoning, this 『fused propositions』 is called the 『fused presupposition』, and 『fused hypothetical propositions to be used in the present step of backward reasoning』 is defined as a hypothetical proposition whose presupposition is the 『fused presupposition』 and whose consequence equals to one of the consequences of the 'two or more hypothetical propositions to be used in the present step of backward reasoning'.

Thus formalized 『fused hypothetical proposition to be used in the present step of forward reasoning』 and/or 『fused hypothetical proposition to be used in the present step of backward reasoning』 is the general rule of thumb with high degree of abstraction and with many exceptions, as I have mentioned before.

Lexical Definition of 'Means for Fusing Propositions'

@[Algorithm of fusing propositions] and/or something that stores the information of it, is a 'means for fusing propositions'.

Thus formalized hypothetical propositions can be regarded approximately as a 'large-grained rule'.

Combinatorial explosion can be avoided if none of the plenty of numbers of keys retrieved in the present step of opportunistic reasoning are used but adequately small number of approximate 'large-grained rules' thus obtained are used instead.

Thus far, only ideal cases are described, but Method-2) is defined even in non-ideal case as described below.

If the 'names-of-classification-items' used in the two 『propositions which should be fused』 do not share any common higher class 'name-of-classification-item', then a "higher class 'names-of-classification-item' approximately shared by them" is recommended to be used.

Here, a "higher class 'name-of-classification-item' approximately shared by two hypothetical propositions" means either a 'name-of-classification-item' which is higher class of both the 'name-of-classification-item' which is closely associated with the 'natural-verb'used in one of the 『propositions which should be fused』 and the 'name-of-classification-item' which is closely associated with the 'natural-verb' used in the other of the 『propositions which should be fused』 and/or a 'name-of-classification-item' closely associated with both a higher class 'names-of-classification-item' of the 'name-of-classification-item' used as the verb used in one of the 『propositions which should be fused』 and a higher class 'names-of-classification-item' of the 'name-of-classification-item' used as the verb used in the 『propositions which should be fused』.

Here, "closely associated" means that one of them is ranked high when @[algorithm of making a list of 'names-of-classification-items' ranked in order of hit frequency] is carried out for the other.

Similarly, when no 'broader 'descriptors"is strictly shared by two corresponding 'descriptors' two 『propositions which should be fused』 in a sub-set' dose not exist, either a 'descriptor' which is broader than both the 'descriptor' which is closely associated with the 'natural-noun' used as a noun in one of the 『propositions which should be fused』 and the 'descriptor' which is closely associated with the 'natural-noun' used as a noun in the other 『propositions which should be fused』 or a 'descriptor' closely associated with both a broader 'descriptor' of the 'descriptor' used as the noun in one of the 『propositions which should be fused』 and a broader 'descriptor' of the 'descriptor' used as the noun in the other 『propositions which should be fused』.

Here, 'closely associated' means 'one is ranked high when @[algorithm of making a list of 'descriptors' ranked in order of hit frequency] is carried out for the other'.

When no appropriate 'descriptors' and/or 'names-of-classification-items' to be used are found, a user of the system must found at his discretion the 'next-best-natural-nouns' and the 'next-best-natural-verbs' to be used.

When formalization using five basic sentence pattern is impossible, it is recommended that a maker of the contents of a database disclosed in the present invention should use only the form of "If ~, then ~.". That is, 'subject-word (S)', 'verb (V)', 'complement-word (C)', 'object-word (O)', 'indirect-object (I.O)', and 'direct-object-word (D.O)' are not be distinguished each other. Instead, it is recommended that 'Broader 'descriptor' strictly and/or approximately shared by all the formalized keys of a classification item' and/or 'higher class 'names-of-classification-items' strictly and/or approximately shared by the members of a classification item' should be simply arranged on '~' of 'If ~', and/or on '~' of 'then ~', and the form "If ~, then ~." thus obtained is regarded as 『fused hypothetical propositions to be used in the present step of forward reasoning』 or 『fused hypothetical propositions to be used in the present step of backward reasoning』.

In the case in which even this measure is impossible, it is recommended that appropriate, 'next-best-natural-noun' and/or 'next-best-natural-verb' are simply arranged on '~' of 'If ~', and/or on '~' of'then ~', and the form "If ~, then ~." thus obtained should be regarded as a formalized key.

3.3.2. @[Algorithm of Sentence Based Object-Oriented Categorical Syllogism]

By the way, the following point should be noticed;

That is, as 'mammal' is a broader term of 'rat', if the categorical proposition, "any mammal drinks milk from its mother's body when it is young" is true, then the categorical proposition "any rat drinks milk from its mother's body when it is young" is also true.

This kind of rule is widely accepted and is called the "heritage of the attribute of objects".

I disclose in the present invention that a similar but different rule exists: As 'move' is a higher class 'names-of-classification-items' of 'walk', if the categorical proposition, "any turtle walks"

is true, then the categorical proposition,

"any turtle moves"

is also true.

In the present invention, I claim that these are a kind of categorical syllogism, and I call such syllogism leading from one categorical proposition to another categorical proposition, the @[algorithm of sentence based object-oriented categorical syllogism].

Lexical Definition of @[Algorithm of Sentence Based Object-Oriented Categorical Syllogism]

I claim that in an ideal case, exact formalization of the definition of @[algorithm of sentence based object-oriented categorical syllogism], which is an algorithm with which a special kind of categorical syllogism is carried out on the basis of linguistic sentence, is given in a clear and explicit way in a proposition is written in English. In this special kind of categorical syllogism, hierarchical structures of nouns registered in the 'ideal thesaurus' and/or hierarchical structure of verbs registered in the 'classification table' is made full use of. A sentence based object-oriented categorical syllogism, like a usual categorical syllogism, comprises, major premise, minor premise, and, conclusion. But the way in which this special categorical syllogism is embodied has several patterns, because, as is well known, English sentence is classified into five basic sentence patterns. I claim in the present invention that the @[algorithm of sentence based object-oriented categorical syllogism] is defined for each of the five basic sentence patterns as follows.

The @[algorithm of sentence based object-oriented categorical syllogism] for 'form I': 'subject-word (S)'+'verb (V)', is described as follows;

If a categorical proposition written in a sentence, S+V, is true, (Major premise)

and

S' is synonym and/or narrower 'descriptor' of S, (Minor premise)

then, the categorical proposition written in the sentence, S'+V, is also true. (Conclusion)

EXAMPLE

If

"Any bird flies"

is true, then,

"A sparrow flies"

is true.

The @[algorithm of sentence based object-oriented categorical syllogism] for 'form II': 'subject-word (S)'+'verb (V)'+'complement-word (C)', is described as follows;

If a categorical proposition written in a sentence, S+V+C, is true, (Major premise)

and

S' is synonym and/or narrower 'descriptor' of S, (Minor premise), and

C' is synonym and/or broader 'descriptor'of C, (Minor premise), then, the categorical proposition written in the sentence, S'+V+C', is also true. (Conclusion)

This case is schematically shown in Formula. 1A.

EXAMPLE

If

"A cat is a mammal"

is true, then, not only

"A Persian cat is a mammal"

is true, but also

"A cat is an animal"

is true.

The @[algorithm of sentence based object-oriented categorical syllogism] for 'form III': 'subject-word (S)'+'verb (V)'+'object-word (O)'.

is described as follows;

If a categorical proposition written in a sentence, S+V+O, is true, (Major premise)

and,

S' is synonym and/or narrower 'descriptor' of S, (Minor premise)

and,

O' is synonym and/or narrower 'descriptor' of O, (Minor premise)

then, the categorical proposition written in the sentence, S'+V+O', is also true. (Conclusion)

This case is schematically shown in Formula. 1B.

EXAMPLES

If,

"Any cat catches a mouse"

is true, then, not only

"A Persian cat catches a mouse"

is true, but also

"A cat catches a field mouse"

is also true.

The @[algorithm of sentence based object-oriented categorical syllogism] for 'form IV': 'subject-word (S)'+'verb (V)'+'indirect-object-word (I.O)'+'direct-object-word (D.O)', is described as follows;

If a categorical proposition written in a sentence, S+V+I.O+D.O, is true, (Major premise)

and,

S' is synonym and/or narrower 'descriptor' of S, (Minor premise)

and,

I.O' is synonym and/or narrower 'descriptor' of I.O, (Minor premise)

and,

D.O' is synonym and/or narrower 'descriptor' of D.O, (Minor premise)

then, the categorical proposition written in the sentence, S'+V'+I.O'+D.O' is also true. (Conclusion)

EXAMPLES

If a sentence

"Any drugstore sells a man drugs"

is true, then,

"A drug store in Tokyo sells a man drugs",

"Any drugstore sells an American drugs"

and

"Any drug store sells a man a medicine for cold"

are true.

The @[algorithm of sentence based object-oriented categorical syllogism] for 'form V': 'subject-word (S)'+'verb (V)'+'object-word (O)'+'complement-word (C)', is described as follows;

If a categorical proposition written in a sentence, S+V+O+C, is true, (Major premise)

and,

S' is synonym and/or narrower 'descriptor' of S, (Minor premise)

and,

O' is synonym and/or narrower 'descriptor' of O, (Minor premise)

and,

C' is synonym and/or broader 'descriptor' of C, (Minor premise)

then, the categorical proposition written in the sentence, S'+V+O'+C', is also true. (Conclusion)

EXAMPLES

If

"Any man calls Newton a physicist"

is true, then, not only

"A Japanese calls Newton a physicist", but also

"A man calls Newton a scientist"

is true.

And if

"Any man found any computer useful"

is true, then, not only

"An American found any computer useful"

but also

"Any man found a personal computer useful"

is true.

The @[algorithm of sentence based object-oriented categorical syllogism] for cases when the verb used in the major premise and the verb used in the conclusion is different, is described as follows;

If a categorical proposition PY that describes an 'name-of-classification-item' as a 'simple sentence including a word used as an 'ideal verb", is true, (Major premise)

and,

PX is a higher class 'name-of-classification-item' of PY, and PX is also a 'simple sentence including a word used as an 'ideal verb", (Minor premise)

then, a categorical proposition which describes an 'algorithm-of-process', PX, is true. (Conclusion)

About the definition of the term, higher class 'algorithm-of-process', see the description which has already given by me at the issue of 'lexical definition' of @[algorithm of giving definition of higher class 'algorithm-of-process' and lower class 'algorithm-of-process']. A quasi-C code which outlines the procedure with which to judge whether PX is higher class 'name-of-classification-item' of PY or not is shown in Formula. 12.

EXAMPLES

If

"A tortoise walks"

is true, then,

"A tortoise moves", is also true.

If

"Tom proposed to Mary"

is true, then, not only

"Tom made a decision"

but also

"Tom contacted Mary"

is true.

And if

"Rommel acted in Sahara"

is true then

```
"if( (Rommel) acted strategically in Sahara)
{
    (Rommel) intended the (aim) in Sahara ;__
    (someone else) tried to make the (strategy) in Sahara ;__
}"
```

is also true.

The procedure outlined by a quasi-C code in Formula. 15A+Formula. 15B+Formula. 15C+Formula. 15D, are a recommended embodiment of an @[algorithm of sentence based object-oriented categorical syllogism]. More precisely speaking, with the procedure outlined in Formula. 15A+ Formula. 15B+Formula. 15C+Formula. 15D, one can judge whether a proposition is a conclusion for a major premise or not, if he specify the thesaurus and the classification table which he uses.

Lexical Definition of 'Means for Carrying Out Sentence Based Object-Oriented Categorical Syllogism'

@[Algorithm of sentence based object-oriented categorical syllogism] and/or something that stores the information of it, is a 'means for carrying out sentence based object-oriented categorical syllogism'.

@[Algorithm of sentence based object-oriented categorical syllogism] is used as a mechanism of reasoning in an object-oriented knowledge base system disclosed in the preset invention.

For example, remember the sentence,

__ALGORITHM__ (someone) carries (something) {(someone) lifts (something);__(someone) takes (something);__}.

This sentence shows that either the sentences, (someone) lifts (something), and/or (someone) takes (something), is higher class 'algorithm-of-process' of (someone) carries (something).

Therefore, according to my The @[algorithm of sentence based object-oriented categorical syllogism], if the sentence, (someone) carries (something), is true, then, Either the sentences, (someone) lifts (something), and/or (someone) takes (something), is true.

Let me think about the "instance of a sentence "someone carries something", which is described in "sentence pattern of implementation of names of algorithms-of-processes"", __ALGORITHM__ (Tom) carries (a case of beers) {(Tom) lifts (a case of beers);__(Tom) takes (a case of beers) ;__}.

As this "instance" ca be rewritten as

__ALGORITHM__ Tom carries a case of beers {someone=Tom ;__something=a case of beer;__ someone lifts something;__someone takes something;__}.

by definition, the "instance" of "Someone carries something", i.e., "Tom carries a case of beers" is, the name of a lower class of 'algorithm-of-process' of the original 'algorithm-of-process' denoted by the sentence, "(someone) carries (something)".

Therefore, according to @[algorithm of sentence based object-oriented categorical syllogism], if the sentence, "Tom carries a case of beer", is true, the sentences, "Someone carries something", is true. And of course, the sentences, "(someone) lifts (something)", and, "(someone) takes (something)"are also true.

because these sentences are the name of higher class 'algorithm-of-process' of the 'algorithm-of-process' denoted by the sentence, "Tom carries a case of beer".

The outline of the algorithm with which whether PX is higher class 'name-of-classification-item' of PY or not is given as a quasi-C code in Formula. 12. To avoid misjudge about whether higher class or not, it is recommended that once a procedure is used to implement a 'name-of-classification-item', then, the procedure should never used again in other procedures to implement other 'names-of-classification-items'. Only the name of an 'algorithm-of-process', such as 'name-of-classification-item', not the body of 'algorithm-of-process', may be reused to implement others.

Above definitions can be object-oriented to a complex sentence. That is, the previously mentioned syllogism can be applied to each of the nested structure of the sentence recursively.

I regard this syllogism for a complex sentence also as a kind of the @[algorithm of sentence based object-oriented categorical syllogism]

It should be noted that The @[algorithm of sentence based object-oriented categorical syllogism] is well defined only when the determiners 'all', 'any', and/or 'every' modifies them. If these determiners are not used, exception to the exact applicability of @[algorithm of sentence based object-oriented categorical syllogism] arises. In such cases, @[algorithm of sentence based object-oriented categorical syllogism] should be regarded as an approximate algorithm. These exceptions must be handled and verified afterwards by manual. It is recommended to make an axiom system for frequently used set of knowledge.

When @[algorithm of sentence based object-oriented categorical syllogism] is used, it is recommended that a sentences like, B is synonym and/or broader 'descriptor' of A, should be used rather than a sentence like A is synonym and/or narrower 'descriptor' B, because, as mentioned before, in general, it is much easy task for a computer to search and list all the broader 'descriptors' of a 'descriptor' than to search and list all the narrower 'descriptors' of a 'descriptor'.

The procedure to search and list the 'descriptors' that are broader (by one rank) than a 'descriptor' is outlined as a quasi-C code in Formula. 10. The procedure to search and list all the 'descriptors' that are broader than a 'descriptor' can be obtained if the quasi-C code in Formula. 10 is used recursively and completely.

The procedure to search and list the 'names-of-classification-items' that are higher class (by one rank) of a 'names-of-classification-items' is outlined as a quasi-C code in Formula. 11. The procedure to search and list all the usable 'names-of-classification-items' that are higher class of a 'names-of-classification-items' can be obtained if the quasi-C code in Formula. 11 is used recursively.

That is, one may regard all the usable 'names-of-classification-items' included in the list of the 'names-of-classification-items' that are higher class (by one rank) of a seed 'name-of-classification-item', as another seed 'name-of-classification-item'. If this procedure is continued until no higher class 'name-of-classification-item' can be listed any more, then, as the result, all the usable 'name-of-classification-items' that are higher class of the usable 'name-of-classification-items' can be obtained.

Above discussion is about an ideal case. In the case when a 'natural-verb' is used in a basic sentence pattern, it is recommended that the @[algorithm of making a list of 'names-of-classification-items' ranked in order of hit frequency] should be used to get 'names-of-classification-items' most closely associated to the 'natural-verb'. If an appropriate 'name-of-classification-item' are found, a verb that is closely associated to a higher class 'names-of-classification-items' of the "appropriate 'name-of-classification-item'" is approximately regarded to be the higher class verb of the 'natural verb'. And a verb that is closely associated to a lower class 'names-of-classification-items' of the "appropriate 'name-of-classification-item'" is approximately regarded to be the lower class verb of the 'natural verb'.

When no appropriate 'names-of-classification-items' are obtained, the user of the system must find lower class and higher class verb, at his discretion.

In addition, in some realistic cases, 'natural-nouns' and/or 'natural noun' phrases are used as 'subject-word (S)', 'complement-word (C)', 'object-word (O)', 'indirect-object-word (I.O)', and/or 'direct-object-word (D.O)'. In such cases, it is recommended that @[algorithm of making a list of 'descriptors' ranked in order of hit frequency] should be used to get 'descriptors' most closely associated to the 'natural-nouns'. If an appropriate 'descriptor' are found, then, a term that is closely associated to a broader 'descriptor' of "the appropriate 'descriptor'" is approximately regarded to be the broader term, and a term that is closely associated to a narrower 'descriptor' of the "appropriate 'descriptor'" is approximately regarded to be the narrower term.

When no appropriate 'descriptors' are obtained, the user of the system must find lower and higher term at his discretion.

In English grammar, a sentence may be paraphrased in varieties of ways into different basic sentence patterns. As a result, the presupposition and the consequence of an object-oriented categorical syllogism may be in different basic sentence patterns, in such cases. In other words, two categorical propositions in different basic sentence patterns may be mutually in the relation of presupposition and consequence of an object-oriented categorical syllogism. Therefore, even when two categorical propositions are in different basic sentence patterns, they may be judged to be in the presupposition-consequence relationship to each other in such cases. Therefore, if 'descriptors' and/or 'names-of-classification-items' of two propositions are closely associated with each other, then, the two propositions may be in the relation of presupposition and consequence of an object-oriented categorical syllogism with considerable probability. Whether they are strictly in the presupposition-consequence relationship to each other or not should be judged by the user of an object-oriented knowledge base system disclosed in the present invention at his discretion. In the present invention, such a procedure of judgment is also regarded as an @[algorithm of sentence based object-oriented categorical syllogism].

If one wants to let an object-oriented knowledge base system disclosed in the present invention make a perfectly full automated inference, then, it is recommended that he should construct an axiom system to be used as the object-oriented knowledge base system. The Newtonian mechanics is one of the most famous axiom systems. I will show later in the present invention, how axioms of the Newtonian mechanics are expressed using the way of knowledge representation of an object-oriented knowledge base system disclosed in the present invention.

In some cases even when two categorical propositions are judged probably to be in the presupposition-consequence relationship to each other but strictly not, it is recommended that the step of the opportunistic reasoning should be continued anyway to achieve a rough and approximate answer, and the strict verification should be done after the rough answer is obtained. If the rough answer is verified to be strictly correct afterwards, then, the rough answer is judged to be the final answer. Else if the rough answer is judged not to be strictly correct, then, the rough answer should be revised.

So, I regard two categorical propositions judged probably to be in the presupposition-consequence relationship to each other but strictly not, as also to be connected by @[algorithm of sentence based object-oriented categorical syllogism] in the present invention.

Lexical Definition of "sentence pattern of one of five basic sentence patterns of English grammar"

As the data structure recommended to be used to describe sentences in "sentence pattern of one of five basic sentence patterns of English grammar", I disclose in the present invention SplusV _S=_* _V=_*.

SplusVplusC_ _S=_* _V=_* _C=_***.

SplusVplusO_ _S=_* _V=_* _O=_***.

SplusVplusIOplusDO _S=_* _V=_* _IO=_* _DO=_*.

SplusVplusOplusC _S=_* _V=_* _O=_* _C=_*, where,

S means 'subject-word (S)',

V means 'verb (V)',

C means 'complement-word (C)',

O means 'object-word (O)',

IO means 'indirect-object-word (I.O)',

DO means 'direct-object-word (D.O)'.

These five data structures may be nested by each other.

Lexical Definition of Means for Describing Sentences According to a Simple English Grammar A sentence in "sentence pattern of one of five basic sentence patterns of English grammar" and/or something that stores the information of it, is a means for describing sentences according to a simple English grammar.

"Sentence pattern of one of five basic sentence patterns of English grammar" is of course a sentences described according to a simplified English grammar.

3.3.3. Sentence Used as 'Rule' Describing the Relation Between Cause and Effect

By the way, a hypothetical proposition can be formalized by using the form of "If ~, then ~" and categorical propositions used as '~'s. As a categorical proposition can be formalized by using "sentence pattern of one of five basic sentence patterns of English grammar", a hypothetical proposition can be formalized by using the form of "If ~, then ~" and "sentence pattern of one of five basic sentence patterns of English grammar".

Lexical Definition of "sentences that store data used as rules"

A sentences describing a rule used in a knowledge base is a "sentence that stores data used as rule". It is recommended that "sentences that store data used as rules" should be described either as a sentences in "sentence pattern of physical and/or mathematical rules" and/or as a sentences in "sentence pattern of function".

Lexical Definition of 'Means for Storing Data Used as Rules'

"Sentence which stores data used as rules" and/or something that stores the information of it, is a 'means for storing data used as rules'.

A "sentence which store data used as rule" is a sentence used as 'rule'.

It is recommended that the 'means for storing data used as rules' should be described either as a sentences in "sentence pattern of physical and/or mathematical rules" and/or as a sentences in "sentence pattern of function".

I first discuss keys recording rules describing the relation between cause and effect. In the present invention, I claim that, in ideal cases, the rule that describes the relation between cause and effect can be described as a sentence in the form of physical law and/or in the form of mathematical formula. Here, mathematical formula includes axioms. These rules of physics and mathematics are often expressed by using mathematical equation.

As will be discussed later in the present invention, I claim that in almost all cases, physical laws and/or mathematical formula can be written in the form, "According to the law *, if *, then ***."

Lexical Definition of "sentence pattern of physical and/or mathematical rules"

Thus, I define here, "sentence pattern of physical and/or mathematical rules", which is suitable to describe keys recording rules describing the relation between cause and effect as "sentence pattern of physical and/or mathematical rules":

__RULE__*** __states__if(  )then{* };__ where '***' is the name of the rule, '' is the presupposition, and '*' is the conclusion.

Lexical Definition of 'Means for Storing Data Used as Rules in a Formal Way'

A sentence in "sentence pattern of physical and/or mathematical rules" and/or something that stores the information of it, is a 'means for storing data used as rules in a formal way'.

This "sentence pattern of physical and/or mathematical rules" can be used to represent the key of a data used in an object oriented knowledge base system of the present invention.

Lexical Definition of 'Presupposition' of a 'Hypothetical Proposition' Described in "Sentence Pattern of Physical and/or Mathematical Rules"

Here, I define the lexical meaning of the term 'presupposition' of a 'hypothetical proposition' described in "sentence pattern of physical and/or mathematical rules" here.

If and when the hypothetical proposition is described in "sentence pattern of physical and/or mathematical rules", __RULE__***** __states__if(*)then{*};__, then, the 'presupposition' of the 'hypothetical proposition' is the proposition in the field below '__states__if('. That is, the 'presupposition' is '***'.

Lexical Definition of 'Consequence' of a 'Hypothetical Proposition' Described in "Sentence Pattern of Physical and/or Mathematical Rules"

And, if and when the hypothetical proposition is described in "sentence pattern of physical and/or mathematical rules", __RULE__***** __states__if(**)then{*};__, then, the 'consequence' of the 'hypothetical proposition' means the proposition in the field below ')then{'. That is, the 'consequence' is '***'.

3.3.4. Newton's Mechanics Represented Using a Knowledge Representation System of an Object-Oriented Knowledge Base System Disclosed in the Present Invention Let me show here an example in which the axiom system of Newton's mechanics is smartly described if my data structures including "sentence pattern of physical and/or mathematical rules".

As a first step, let me give what Newton's equation of motion is, for a man who is not a physicist. Newton's equation of motion is a most famous physical law describing motion of macroscopic particles in the world. Newton's equation of motion for a macroscopic particle is given by $$F=ma,$$

where 'm' is the mass of a 'macroscopic particle', 'F' is the external force exerted on the 'macroscopic particle', and 'a' is the acceleration of the 'macroscopic particle' under the force 'F'.

I will give an explanation of this equation, 'F=ma' using an example below. For the sake of simplicity, let me restrict my example in the very simple case wherein the motion of a 'macroscopic particle' along a 'straight line'.

Let us give here an example of "motion of a 'macroscopic particle' along a 'straight line'". Let us imagine that a fat guy, for example, me, travels by a train from a station 'A' to a neighboring station 'B', which is, say, 10000 meters (i.e. 6.22 miles) away from the station 'A'. Suppose that the fat guy travels by an imaginary ideal train, which runs without any shake or vibration, even while accelerating and/or decelerating from time to time quite violently but strictly along a 'perfectly strait railroad track without any bump'.

As will be strictly explained later, this 'perfectly strait railroad track without any bump' is a good model of the 'straight line', which I mentioned before. For the sake of simplicity, let us suppose that the 'perfectly strait railroad track without any bump' is built on a perfectly horizontal and flat ground. Here of course, the curvature of the surface of the globe is neglected.

Suppose that the fat guy sit on an idealized chair that faces just the direction of the movement of the train. Suppose that the four legs of the ideal chair are fixed firmly to the floor of the ideal train. For the sake of simplicity, let us suppose that the fat guy's legs are hanging and his feet are floating in the air and never step on the floor of the ideal train. Suppose that the surface of the ideal chair is perfectly slippery. Suppose that the fat guy's body is fastened to the back of the ideal chair with a seatbelt made of steel springs. In a word, the body of the fat guy is supposed to be supported only by 1) steel springs used as cushion of the seat of the ideal chair,
2) steel springs used as the cushion of the back of the ideal chair, and,
3) the steel springs used as the seatbelt of the ideal chair.

Suppose that the fat guy sit on the ideal chair with perfectly good manner without budging any part of his body an inch by himself, while the ideal train is carrying him from the station 'A' to the station 'B' with considerably high speed. With a very good approximation, we can regard the body of the fat guy as an example of a 'macroscopic particle' whose motion can be described by the Newton's equation of motion, because his body is regarded only as a 'particle' when compared with the whole railway system much larger than the body of the fat guy.

In addition, we can regard the weight of the fat guy as a good example of the 'mass' of the 'macroscopic particle'. I denote the mass by 'm'. As his weight, say, 91 kilos, (i.e. if I weight 200.8 pounds), 'm' is described in an equation, m=91 kilo grams.

Thus formalized 'm' can be used as it is, in the Newton's equation of motion describing the motion of the fat guy. Let us continue the discussion using the example. In any situation, the weight of the fat guy is supported by the steel springs used as cushion of the seat of the ideal chair of my ideal train. As mentioned before, I sit on the ideal chair with perfectly good manner. Therefore, the gravity of the earth exerted on his body balances perfectly with the repelling force exerted on his body by the steel springs used as cushion of the seat of the ideal chair. Therefore, no perpendicular motion of my body is caused under this balance between these two opposing forces exerted on his body. Both of the directions of these two opposing forces, opposite each other, are, by nature, vertical. Therefore, these two opposing forces have no relation to any horizontal motion of his body.

By the way, as described before, the 'perfectly strait railroad track without any bump' is built on a perfectly horizontal ground. Therefore, either of these two opposing forces have no relations to the traveling motion of his body along the 'perfectly strait railroad track without any bump'. Hereafter, as for the forces exerted on his body, we concentrate, for the time being, only on the forces working along the direction of the 'perfectly strait railroad track without any bump'.

If and when, the 'ideal train' is quite violently accelerating, it is impossible for the fat guy to escape from the forward force that the 'ideal train' exerts on him via the steel springs used as the cushion of the back of the ideal chair (in the case of acceleration). And if and when, the 'ideal train' is quite violently decelerating, it is impossible for the fat guy to escape from the backward force that the 'ideal train' exerts on him via the steel spring used as the seatbelt of the ideal chair (in the case of deceleration).

The fat guy can never escape from either of the forward forces and/or the backward forth, because he sits on the seat with perfectly good manner without budging any part of my body an inch by myself, fastened by the seat belt. Let us call the sum of these forces, 'F'. That is, 'F' is the sum of the forward force and the backward force.

Hereafter, I regard a deceleration as a negative acceleration. Therefore, hereafter, I do not use the word 'deceleration', for the sake of simplicity.

It should be noted that a mixed team consisting of metallurgical engineers and mechanical engineers can precisely determine the value of 'F'. In other words, if the members precisely measure the degree of expansion and/or the degree of contraction of the steel springs used as the cushion of the back of the ideal chair, then, they can tell the precise value of the forward force. And if the members precisely measure the degree of expansion and/or the degree of contraction of the steel springs used as the seatbelt of the ideal chair, then, they can tell the precise value of the backward force. And then, if the value of the forward force and the value of the backward force are summarized, then, the value of 'F' is obtained.

In other words, metaphorically speaking, the value of the forward force and the value of the backward force can be precisely measured if the steel springs used as the cushion of the back of the ideal chair and the steel springs used as the seatbelt of the ideal chair are used as a spring scale to measure the value of the force. The value of F, thus obtained can be used as it is in the Newton's equation of motion describing the motion of the body of the fat guy.

It is of grave importance for us to be conscious of that the body of the fat guy is never one of the parts of the ideal train, if we want understand the situation in which the fat guy is, on the basis of the Newton's equation of motion. Remember the body of the fat guy is a 'macroscopic particle'. The ideal train exerts the force 'F' on this 'macroscopic particle'. What happens? A physicist knows the answer. The answer is given by reforming the Newton's equation of motion as, $$a=F/m.$$

This equation shows that the answer is that the 'macroscopic particle' is accelerated with an acceleration, 'a'. Remember both the value of 'F' and the value of 'm' has already experimentally measured. Therefore, This means that this equation (i.e. Newton's equation of motion, a=F/m) predicts the value of the acceleration of the motion of the body of the fat guy, on the basis of experimentally obtained values of F and m.

If and when the velocity of the body of the fat guy is a little less than the velocity of the ideal train, then, the steel springs used as cushion of the back of the ideal chair are inevitably pressed by the body of the fat guy. As a result, the steel springs, in turn, exert the repelling force pushing the body of the fat guy. Under this forward force, the body of the fat guy is accelerated according to the Newton's equation of motion. This makes the velocity of the body of the fat guy catches up with the velocity of the ideal train.

On the other hand, if and when the velocity of the body of the fat guy is a little greater than the velocity of the ideal train, then, the steel spring used as the seat belt is expanded inevitably by pressure given by the body of the fat guy. As a result, the steel spring, in turn, exerts the repelling force pulling the body of the fat guy. This time, under this backward force, the body of the fat guy is decelerated, according to the Newton's equation of motion. This makes slow down the velocity of the body of the fat guy back to the velocity of the ideal train.

Thus, the velocity of with which the body of the fat guy is approximately equal to the velocity of the ideal train. The train driver of the ideal train can tell the velocity with which the ideal train travels by using the speed meter of the ideal train. The train driver of the ideal train can tell the value of the acceleration of the train by calculating the rate of change of the velocity of the ideal train. Therefore, the train driver knows the value of the acceleration of the velocity with which the train travels. Therefore, the train driver knows the approximate value of the acceleration of the velocity with which body of the fat guy travels. What the Newton's equation of motion says is that the acceleration of the fat guy predicted by a physicist using the Newton's equation coincides with the acceleration of the fat guy approximately measured by the train driver using the speed meter of the ideal train.

It is clearly the special mechanism of the ideal chair designed on the basis of the nature of steel springs, which keeps the velocity of the motion of the body of the fat guy approximately equal to the velocity of the ideal train. If, for example, the seatbelt fastening the body of the fat guy did not exist, then, the body of the fat guy would be thrown forward when the ideal train decelerates, because in such a situation, the velocity of his body is kept grater than the velocity of the decelerating ideal train.

The task of the existing seatbelts of a real car is essentially the same of that of the seatbelt of the ideal chair of the ideal train. If a car driven by a man were to collide with a tough wall, then, the seat belt decelerates the velocity of the body of the driver in an ideal way so as to slow down his velocity back to the velocity of the car being suddenly and violently decelerated.

I will give more strict description of the model of the system consisting of the ideal train and the fat guy, below.

First, I will give the formal and strict way with which the value of 'a' in this example should be experimentally measured. The value of 'a' is experimentally measured in an absolutely independent way from those used in the experimental measurement of the value of 'm' and 'F'.

Speaking in a concrete way, the value of 'a' of the ideal train is measured using its speed meter; the speed meter includes, say, a dynamo directly synchronized to the rotation of a wheel of the ideal train, and a voltmeter measuring the voltage given by the dynamo. The train driver of the ideal train has only to watch the needle of the voltmeter to tell the velocity with which the ideal train is traveling.

To tell explicitly what the Newton's equation of motion tells, we must make more detailed discussion about the issues of Newton's equation of motion, especially about the issue of the strict definition of the 'acceleration', 'a'. Only after this discussion, it will become clear that if one wants to make a knowledge base system versatile, then, it is recommended that he should provide a way of knowledge representation with which the equations of motion including the Newton's equation of motion is precisely described.

Physicists usually regard the 'straight line' described in detail thus far, as an example of 'X' Cartesian axis. A Cartesian axis is a straight line having an 'origin' and having a 'unit' of length, with which the position of a point is measured.

The "origin of this 'X' Cartesian axis" may be put anywhere on the 'X' Cartesian axis, but once it is put, the origin must be fixed on the 'X' Cartesian axis absolutely, and the origin must not be shifted afterwards.

The 'X' Cartesian axis itself must stay stationary, and must not be accelerated or decelerated. The distance (and strictly speaking, the direction) measured from the 'origin' to the macroscopic particle is called the 'X' coordinate of the particle. The unit of length with which the distance is measured may by 'one foot' and/or 'one meter', etc. But most physicists prefer 'one meter', as the unit of length. Let us call the value of the 'X' coordinate at which the particle exists the 'x'. For example, if a macroscopic particle exists 3.0 meters away from the origin in the positive direction of the 'X' Cartesian axis, then, the value of x is given by "x=3.0 meters", if 'one meter' is used as the unit of length. A system fixed to such a 'X' Cartesian axis is called an 'inertial coordinate system'.

The 'perfectly strait railroad track without any bump' shown in the previous example is can be regarded as a good example of the "'X' Cartesian axis" with a very good approximation. Previously described 'straight line' just means the "'X' Cartesian axis".

Strictly speaking, the earth is rounding on its own axis and is making revolutions around the sun. But usually, the acceleration of the surface of the earth we feel is negligible when compared with the acceleration of running trains. Therefore, the 'perfectly strait railroad track without any bump' built on a perfectly horizontal and flat ground on the earth is regarded as an 'inertial coordinate system', which stays stationary, with an extremely good approximation when a fat guy on a running train is regarded as a macroscopic particle, and the Newton's equation of motion is applied to analyze the traveling motion of the macroscopic particle.

Let us continue the previous example. We may define the "exact middle of the platform of the station 'A'" as the 'origin' of the "'X' Cartesian axis". Once we thus define the 'origin', our mind about this definition should never be changed thereafter, if we want to think on the basis of the Newton's equation of motion.

The ideal train is carrying the body of the fat guy, of course, along the "'X' Cartesian axis". I call the distance (and strictly speaking the direction) measured from the 'origin' (e.g. the exact middle of the platform of the station 'A') to the 'macroscopic particle' (i.e. the center of mass of the body of the fat guy), the "'X' coordinate" of the macroscopic particle. In the present example, I regard the direction from the station 'A' to the station 'B' as the positive direction. And I regard the direction from the station 'B' to the station 'B' as the negative direction. And let me define here a variable 'x', which represents the value of the "'X' coordinate" at which the macroscopic particle exists.

Continuing above example, if the body of the fat guy is, say, 5072.35 meters away from the 'origin' (i.e. from the "exact middle of the platform of the station 'A'"), in the positive direction, then the value of 'x' is 5072.35 meters, x=5072.35 meters.

When the particle is traveling along the 'perfectly strait railroad track without any bump', then, the value of 'x' of course changes as a function of time. Let us call the value of 'x' at an absolute time 't', the 'x(t)'.

Continuing above example, as an example, the value of 't' may be, say, t=am 10:55 32.00 seconds Jul. 27, 1999 (Japan Standard Time).

Let us assume that this absolute time is within the time period between the absolute time at which the ideal train started from the 'A' and the absolute time at which the ideal train arrived at the station 'B'. Let us assume that the macroscopic particle (i.e. the body of the fat guy) is, say, at 5072.35 meters away from the 'origin of the 'X' Cartesian axis' (i.e. from the 'exact right middle of the platform of the station A') at the absolute time 't' given above, then, 'x(t)' is of course described as x(t)=5072.35 meters, where, t=am 10:55 32.00 seconds Jul. 27, 1999 (Japan Standard Time).

Let us think about the next situation at an absolute time after a very small increment of time [let us call this small increment of time, $\delta t$] measured from the absolute time, 't', t=am 10:55 32.00 seconds Jul. 27, 1999 (Japan Standard Time).

That is, let us think about the next situation at an absolute time 't+δt'. Let us call the value of 'x' at the absolute time 't+d t' the 'x(t+δt)'.

For example, if the value of δt is, say,

δt=1.00 second, then, t+δt is given by $$t+\delta t = \text{am 10:55 32.00 seconds July the 27, 1999 (Japan Standard Time)} + 1.00 \text{ second}$$
$$= \text{am 10:55 33.00 seconds July the 27, 1999 (Japan Standard Time).}$$

Continuing this example, if the macroscopic particle is, say, at 5089.01 meters away from the 'origin of the 'X' Cartesian axis'at the absolute time 't+δt', then, 'x(t+δt)' is of course given by $x(t+\delta t)$=5089.01 meters.

Let us continue above example. Let us call the value of the velocity 'v' of the macroscopic particle at the absolute time 't', 'v(t)'. Physicists knows that the value of 'v(t)' at, t=am10:55 32.00 seconds Jul. 27, 1999 (Japan Standard Time)), is approximately given by the equation, $$v(t) \sim \{x(t+\delta t)-x(t)\}/\delta t$$
$$= \{5089.01 \text{ meters} - 5072.35 \text{ meters}\}/(1.00 \text{ seconds})$$
$$= 16.66 \text{ meters per second}$$
$$= 59.98 \text{ Kilometers per hour}$$
$$= 37.25 \text{ miles per hour,}$$

where, t=am10:55 32.00 seconds Jul. 27, 1999 (Japan Standard Time).

and,

δt=1.00 second.

The value 16.66 meters per second (=37.25 miles per hour) thus obtained is an approximate value of 'v(t)' at the absolute time 't'. The majority of the physicists call an approximate equation like this equation which uses δt whose value is a finite value (i.e. a non-zero value), a 'finite differential equation' Physicists knows that the strict definition of v(t) at the absolute time 't' (=am10:55 32.00 seconds Jul. 27, 1999 (Japan Standard Time)), can be obtained in the limit when we make the value of δt used in the finite differential equation, approaches infinitively to zero seconds, $v(t)$≡Limit(δ$t$→0 second)[{$x(t+\delta t)-x(t)$}/δ$t$], where t=am10:55 32.00 seconds Jul. 27, 1999 (Japan Standard Time).

In the present invention, the symbol '≡' means that the definition of the left hand side of '≡'. That is, the definition of the left hand side of '≡' is given as the right hand side of '≡'.

This equation using the symbol '≡' is described in English by a usual mathematician, that "'v(t)' is defined to be the 'derivative' of 'x(t)' at 't'".

It should be noted that if a man measures experimentally the distances 'x(t+δt)' and 'x(t)' and the increment of time, 'δt', then, he knows the value of the velocity, 'v(t)'. For example, if the exact value of 'v(t)' thus obtained is, say, 16.70 meters per second, then, he should describe the situation by using the equation, v(t)=16.70 meters/second, where t=am10:55 32.00 seconds Jul. 27, 1999 (Japan Standard Time).

In the present case of the motion of the 'macroscopic particle' (i.e. the fat guy), it is clear that the 'macroscopic particle' travels with reasonably well-defined velocity during the journey. The majority of the physicists will describe this situation as "the velocity of the 'macroscopic particle' can be described as a well defined function of time 't' with reasonable accuracy, if 't' is within the time period between the absolute time at which the ideal train started from the station 'A' and the absolute time at which the ideal train arrived at the station 'B'".

The majority of mathematicians will describe what I have said, in an idealized way as follows; The value of the "limit of an algebraic expression", given by Limit(δ$t$→0 second)[{$x(t+\delta t)-x(t)$}/δ$t$], always has a well defined value, as a function of absolute time 't', if the 't' is within the period of time. Mathematicians call this "limit of an algebraic expression" the 'derivative of x'. Usually mathematicians use a symbol '[dx/dt](t)' to express the 'derivative of x': That is, '[dx/dt](t)' is defined by the equation,

[$dx/dt$]($t$)≡limit(δ$t$→0 second)[{$x(t+\delta t)-x(t)$}/δ$t$], where 't' is an absolute time in the time period between the absolute time at which the ideal train started from the station 'A' and the absolute time at which the ideal train arrived at the station 'B'.

In many cases, most physicists describe [dx/dt](t) simply as dx/dt.

In a word of mathematics, 'v(t)' is defined by the equation, $v(t)$≡[$dx/dt$]($t$), where 't' is an absolute time in the time period between the absolute time at which the ideal train started from the station 'A' and the absolute time at which the ideal train arrived at the station 'B'.

Usually, the majority of the physicists call a strict equation like this equation, which is defined by infinitely small value of 'δt', a 'differential equation'. According to this definition, the strict definition of 'velocity' of the 'macroscopic particle' is given using a differential equation, "v(t) ≡[dx/dt](t)".

Let us continue above example. This time, I will introduce another finite differential equation, in which v(t) is used as a function of time. This finite differential equation is used to obtain the approximate value of the acceleration of the macroscopic particle at an absolute time 't'. Before introducing this finite differential equation, however, I must introduce another finite increment of time which is much smaller than the "time consumed by the train to travel from station 'A' to station 'B'", but is substantially longer than the increment of time, 'δt'(=1.00 second), which was used previously in a finite differential equation in which x(t) was regarded as a function of time to give the approximate value of v(t). Let us call the increment of time used this time by, Дt, hereafter.

For example, I use the value '10.00 seconds' as the value of 'Дt', because not only '10.00 seconds' is without fail much less than the time for the ideal train to travel 10000 meters (the distance from station 'A' to station 'B'), but also '10.00 seconds' is much longer than '1.00 seconds' (=δt). Thus it is reasonable to use the value of 'Дt' given by Дt=10.00 seconds.

As mentioned before, the absolute time 't' at which the finite differential equation approximating the value of 'v(t)' was, t=am10:55 32.00 seconds Jul. 27, 1999 (Japan Standard Time).

Therefore in the absolute time 't+Дt' is given by t+Дt=am10:55 42.00 seconds Jul. 27, 1999 (Japan Standard Time).

Let us continue the example. If the macroscopic particle (i.e. the fat guy) is traveling with a speed, 16.70 meters per second, at the absolute time 't', then, v(t) is of course described as $v(t)$=16.70 meters per second, where, t=am10:55 32.00 seconds Jul. 27, 1999 (Japan Standard Time).

And then, if the macroscopic particle (i.e. the fat guy) is traveling with a speed, say, 16.75 meters per second, at absolute time 't+Дt', then, 'v(t+Дt)' is of course described as $v(t+Дt)$=16.75 meters per second, where, $t+Дt=am$10:55 42.00 seconds Jul. 27, 1999 (Japan Standard Time).

The approximate value of the acceleration of the macroscopic particle at an absolute time 't', i.e. 'a(t)' is given by a finite differential equation, $$\begin{aligned} a(t) &\sim \{v(t+Дt)+v(t)\}/Дt, \\ &= (16.75 \text{ meters per second} - 16.70 \text{ meters per second})/ \\ &\quad (10.00 \text{ seconds}) \\ &= 5.00\times10^{-3} \text{ meters per (second)}^2, \end{aligned}$$

where, t=am10:55 32.00 seconds Jul. 27, 1999 (Japan Standard Time).

In the present case of the motion of the macroscopic particle (i.e. the fat guy), the acceleration of the macroscopic particle can be defined at any absolute time during the journey, because the acceleration is defined on the bases of the velocity, while, 'macroscopic particle' travels with a reasonably well-defined velocity at any absolute time during the journey. In other words, the finite differential equation, $a(t)\sim\{v(t+Дt)-v(t)\}/Дt,$ is well defined at any absolute time 't' in the time period between the absolute time at which the ideal train started from the station 'A' and the absolute time at which the ideal train arrived at the station 'B'.

The strict definition of derivative of 'v(t)', '[dv/dt](t)', is given by using a differential equation as, $[dv/dt](t)\equiv\text{limit}(Дt\rightarrow0 \text{ second})[\{v(t+Дt)-v(t)\}/Дt].$ And the strict definition of 'a(t)' is given by using this derivative, in an equation $a(t)\equiv[dv/dt](t),$ where, 't' is an absolute time in the time period between the absolute time at which the ideal train started from the station 'A' and the absolute time at which the ideal train arrived at the station 'B'.

The last finite differential equation, which was used to approximate value of 'a(t)', can be reformed as another finite difference equation, $v(t+Дt)\sim a(t)\cdot Дt+v(t),$ where, 't' is an absolute time in the time period between the absolute time at which the ideal train started from the station 'A' and the absolute time at which the ideal train arrived at the station 'B'.

By inserting the Newton's equation of motion, $F(t)=m\cdot a(t),$ into the finite differential equation, we get another finite difference equation, $v(t+Дt)\sim(F(t)/m)\cdot Дt+v(t),$ where 't' is an absolute time in the time period between the absolute time at which the ideal train started from the station 'A' and the absolute time at which the ideal train arrived at the station 'B'.

This finite difference equation explicitly shows what the Newton's equation of motion can be used to predict the value of the future velocity of the motion of the macroscopic particle, 'v(t+Дt)', if the present value of the velocity of the motion of the macroscopic particle, 'v(t)', the present value of the force exerted on the macroscopic particle, F(t), and the mass of the macroscopic particle, 'm' is known at 't'. That is, concretely speaking, if the mass and the velocity of the macroscopic particle, and the force exerted on the macroscopic particle at an absolute time 't' are known, then the velocity of the macroscopic particle at an absolute time 't+Дt' is predicted, by using the Newton's equation of motion.

Remember that the value of 'F' can be precisely measured in an experimental way if 'steel springs used as cushion in the ideal chair of the ideal train' are uses as spring balances.

On the other hand the value of 'm' can be measured if the fat guy weights himself on a scale, preferably using a 'simple balance'; This time, spring balances are not recommended to be used. The 'simple balance', here, is a balance which has a left arm, a right arm, a pan hanging at the end of the left arm, and, another pan hanging at the end of the right arm. When the fat guy weights himself, he must sit down on the left pan, and appropriate pieces of ounce weights made of, say, lead, must be put on the right pan one after another, until the weight of the fat guy and the weight of the pieces of ounce weights balances. If, say, 3214 pieces of pound weight just balance the fat guy, Then the fat guy finds out that the mass of him is 3214 ounce (=200.8 pound=91 Kilo grams). If the mass of the fat guy were measured by spring balance, then, the value of measured weight may include a systematic error; because the centrifugal force exerted on the body of the fat guy caused by the rotation of the earth lessens his apparent weight except just at the North pole of the earth and/or just at the South pole of the earth. Remember, the centrifugal force exerted on the body of the fat guy caused by the rotation of the earth is never uniform on the surface of the earth; it is zero only just at the North pole of the earth and/or just at the South pole of the earth. And is maximal at anywhere just on the Equator line of the earth. The 'mass' of the fat guy is defined to be the weight of the fat guy measured by using a simple balance. The mass thus defined includes no such systematic error, because the centrifugal force caused by the rotation of the earth is exerted not only on the body of the fat guy sitting on one of the pans of the simple balance, but also on the pieces of the weight made of lead put on the other pan of the simple balance. As the result the effect of the centrifugal force is cancelled, and no systematic error is caused. In general, as a matter of fact, dominants of the physicists prefer to measure the mass usually using a simple balance.

I claim that, the finite differential equation of motion representing approximately the Newton's equation of motion, can be describe in a plain English sentence if we use the following two statements;

The first statement:

If

"the mass of a macroscopic particle is 'm', the external force exerted on it is 'F', the position of it is 'x', and the velocity of it is 'v'", at time=t, then, "the mass of the macroscopic particle is 'm', the position of it is 'x+vδt', and the velocity of it is 'v+(F/m)δt'", at time=t+δt.

And, the second statement:

If

"the mass of the macroscopic particle is 'm', the position of it is 'x+vδt', and the velocity of it is 'v+(F/m)δt'", at time=t+δt, then, "the mass of a macroscopic particle is 'm', the external force exerted on it is 'F', the position of it is 'x', and the velocity of it is 'v'", at time=t, where, 'δt' is a sufficiently small increment of time. The value of this 'δt' should be ideally infinitively small, if we want to describe the Newton's equation of motion exactly.

However, in many pragmatic computer simulations coded on the basis of the Newton's equation of motion, such as elementary computer simulations of motion of planets making revolutions around the sun, sufficiently small finite value of 'δt', instead of infinitely small value of 'δt', is used without any significant problem.

I claim that, each of these two statements representing the Newton's equation of motion is a kind 'law of causality'. The term 'law of causality' means the law describing the relationship between the cause and the result. The cause of this rule of causality described by using the first statement is,

"the mass of a macroscopic particle is 'm', the external force exerted on it is 'F', the position of it is 'x', and the velocity of it is 'v'", and the effect of the rule of causality described by the first statement is, "the mass of the macroscopic particle is 'm', the position of it is 'x+vδt', and the velocity of it is 'v+(F/m)δt'".

The cause described here determines uniquely the result described here, without fail. Newton's equation of motion is a physical law describing the relation between cause and effect that are observed experimentally, without any exception, in any motion of any macroscopic particle.

To explain more concretely, if the state of a macroscopic particle (i.e. the mass, the position, and the velocity of a macroscopic particle and the strength and the direction of the external force exerted on the macroscopic particle) at time=t is explicitly given, then the state of the macroscopic particle at time=t+δt is uniquely determined. The contrary of this proposition is also true.

I disclose here a fictional scheme with which the Newton's philosophy can be interpreted in an absolutely through manner. At first, let us assume that the world, including the earth, the sun, and the planets in the universe, can be ultimately decomposed into mutually interacting macroscopic particles. In a word, in this fictional scheme, a planet is regarded as to be composed of, say, grains of sand, which are regarded as a macroscopic particle. And in the present fictional scheme, the Newton's equation of motion is regarded as a rule of causality describing the time evolution of the system of the macroscopic particles; All the macroscopic particles moves according to the Newton's equation of motion. Therefore, the universe can be understood when a man can know not only the mass, and the initial velocity, of all the macroscopic particles composing the planets but also can know all the forces working between any two macroscopic particles.

In practice, however, only in special ideal cases in very narrow range of engineering and/or of science, Newton's equation of motion is of practical use.

According to my scheme of the 'Law-of-Causality and Model-of-the-World architecture', the philosophy of Newton can be summarized in a sentence that "Newton's Model-of-the-World works according to the Newton's Law-of-Causality".

Here, the Newton's Model-of-the-World means the macroscopic particle model of the universe, which I introduced just now. Here, the Newton's Law-of-Causality means the Newton's equation of motion.

I claim that, "the two statements in a plain English sentence describing the finite differential equation of motion representing approximately the Newton's equation of motion", can be directly described by using the "sentence pattern of physical and/or mathematical rules", which is a data structure for knowledge representation disclosed in the present invention, as,

__RULE__ Newton's equation of motion __states__if(the mass of a macroscopic particle is m, the external force is F, the position is x, and the velocity is v, at time=t;__)then{the mass of the macroscopic particle is m, the position is x+vδt, and the velocity is v+(F/m)δt, at time=t+δt;_};__

The contrary of this proposition of course can be described in a same way, as

__RULE__ Newton's equation of motion __states__if(the mass of a macroscopic particle is m, the position is x+vδt, and the velocity is v+(F/m)δt, at time=t+δt;__) then{the mass of the macroscopic particle is m, the external force is F, the position is x, and the velocity is v, at time=t;__};__

Thus, it is clear that Newton's equation of motion can be covered by the way of knowledge representation of an object-oriented knowledge base system disclosed in the present invention. I claim here that the model of the Newton's philosophy constructed according to the 'Law-of-Causality and Model-of-the-World architecture' can be implemented as a knowledge base system, if the Newton's equation of motion is described as a rule using my "sentence pattern of physical and/or mathematical rules", and the values of masses, velocities, and forces are described as a fact.

It should be noted that "sentence pattern of physical and/or mathematical rules" can be used to explicitly describes that the contrary of the rule is also true. This shows that the power of expression of the way of knowledge representation disclosed in the present invention is very rich. Note also that the way of knowledge representation disclosed in the present invention has high readability and being easily understood by human who understands elementary English grammar. Of course equivalents of the "sentence pattern of physical and/or mathematical rules" can easily be implemented in other languages including Japanese, etc. if necessary. However, English is a very popular language, and as will be shown later, English language is very suitable to be used in logical inferences introduced originally in the present invention. Therefore I selected English in the present invention, as the base of the "sentence pattern of physical and/or mathematical rules".

Of course, Japanese is also an excellent language both in its flexibility in the power of expression, and the rich and close association between its words. But the richness of Japanese in describing an idea in a very many numbers of ways makes Japanese not suitable to be used as the backbone of an object-oriented knowledge base system disclosed in the present invention. As a matter of fact, unlike Englishmen, it is not so common to Japanese to consciously describe one idea in varieties of ways in a their writing. This is because Japanese sentences and words have sufficient richness of association among them, and therefore, paraphrasing in written Japanese, which often only causes confusion, is not necessary in many cases. Another reason why I chose English rather than Japanese as a best mode to be used as the backbone of an object-oriented knowledge base system disclosed in the present invention is that English is a very popular language in the world.

It should be noted that, symbols for the 'propositional logic' can be used to formalize a sentence in "sentence pattern of physical and/or mathematical rules". For example, the Newton's equation of motion described in the form of "sentence pattern of physical and/or mathematical rules" can be given as, __RULE__ Newton's equation of motion __states__if( (The mass of a macroscopic particle is m;__)∧(The external force is F;__)∧(The position is x;__)∧(The velocity is v;__, at time=t;__)then{(The mass of the macroscopic particle is m;__)∧(The position is x+vδt;__)∧(The velocity is v+(F/m)δt;__), at time=t+δt;__};__

The contrary of the proposition of course can be described in a same way. Here, the symbol, '∧' means 'and'. It is recommended that systems of the rules concerning propositional logic, including the Boolean algebra should be made full use of, in knowledge representations disclosed in the present invention.

However, one thing should be noted. The rule of the 'propositional logic',

"If "p→q" is true, then, "⅂p∨q" is true", may be used without any hesitation, where the symbol '⅂' means 'not'. However, it is recommended that the rule "If "⅂p∨q" is true, then, "p→q" is true", should be used with grate care even though this rule is logically consistent with the other rules of the 'propositional logic'. I never say that this rule is no good. I only say that one had better to be careful about the interpretation of this rule.

For example, I do not think that one can tell that "a proposition 'q' can be proved mathematically", only by knowing whether "'p' is the true or false and 'q' is true or false". Remember the Kurt Gödel's 'incompleteness theorem', which says that "to be true is one thing, and being able to be mathematically proved is another thing". For details of this theorem, see for example ⊙"Gehderu no tetsugaku Fukanzensei-teiri to Kami no sonzai-ron" and references therein.

As a matter of fact, if the proposition 'q' is a 'Gödel's proposition' of an axiom system, and 'p' is another true proposition in the same axiom system, then, the it is always impossible to prove the proposition 'q' on the basis of 'p'. The 'Gödel's proposition' is a proposition which is always true but can not be mathematically proved using any true proposition included in the same axiom system which is normal. Gödel showed an explicit universal algorithm by which a 'Gödel's proposition' can be constructed in any mathematical system. Of course, in this case, "⅂p∨q" is always true, because a Gödel's proposition, 'q', is always true. This is always the case regardless the choice of the proposition 'p' from the normal axiom system. But 'Gödel's proposition', 'q' can never be proved on the basis of 'p'.

The symbol 'p→q' used in the 'propositional logic' is exactly a, mathematical formal representation, and it is too simplistic always to interpret the 'p→q' into an English sentence, "proposition q can be mathematically and/or logically proved using proposition p", and/or always to interpret 'p→q' into an English sentence "If and when proposition 'p' is satisfied, then proposition 'q' is always satisfied afterwards". It is not guaranteed that such interpretations always give us correct conclusions.

I never say that the rule,

""p→q"="⅂p∨q""

is no good. Rather I say that this rule is not only logically consistent but also useful. What I say here is that I deliberately avoided misuse of it in an object oriented knowledge base system disclosed in the present invention.

Let us return to the main issue. Of course, "data structure for the description of the five basic sentence patterns of English" can be used to formalize the Newton's equation of motion described using "sentence pattern of physical and/or mathematical rules" in which symbols of the propositional logic are used, as, __RULE__ Newton's equation of motion __states__if( (S=__ the mass of a macroscopic particle __V=__ is __C=__ m;__)∧(S=__ the external force __V=__ is __C=__ F;__)∧(S=__the position __V=__ is __C __ x;__) ∧(S=__ the velocity __V=__ is __C=__ v;__), at time= t;__)then{(S=__ the mass of the macroscopic particle __V=__ is __C=m;__)∧(S=__ the position __V=__ is __C=__ x+vδt;__)∧(S=__ the velocity __V=__ is __C=__ v=v+aδt=v+(F/m)δt;__), at time=t+δt;__};__

If I use here, sentences in "sentence pattern of definition of object", which is disclosed in the present invention, the following propositions are obtained __OBJECT__ a macroscopic particle have__VARIABLES mass which__is measured by a simple balance.

__OBJECT__ a macroscopic particle have__VARIABLES Cartesian coordinate which__is defined as the distance from the origin to the macroscopic particle.

__OBJECT__ a macroscopic particle have__VARIABLES velocity which__is defined as the 'derivative' of the Cartesian coordinate of the macroscopic particle.

__OBJECT__ a macroscopic particle have__VARIABLES acceleration which__is defined as the 'derivative' of the velocity of the macroscopic particle.

If I use here, "sentence pattern of function", which is disclosed in the present invention, the following proposition are obtained:

__FUNCTION__ 'differentiation' __translate__INPUT__ a function of time __into__OUTPUT__ 'derivative'.

If I use here, "sentence pattern of 'ideal thesaurus'", which is disclosed in the present invention, the following propositions are obtained __NT__ Cartesian coordinate, 'x', of a macroscopic particle __is__a__kind__of__BT__ a function of time.

__NT__ velocity, 'v', of a macroscopic particle __is__a__kind__of__BT__ a function of time.

A sentence that states that "'f(t)' is a mathematical symbol used to express generally a 'function of time'", can be translated into a sentence in "sentence pattern of definition of object", as, OBJECT__ 'a function of time' have__VARIABLES 'mathematical symbol' used to express it which__is f(t).

If I use here, the "sentence pattern of implementation of names of algorithms-of-processes", which is disclosed in the present invention, the following propositions are obtained;

__ALGORITHM__ "differentiate f(t)" {f(t)≡limit(δt→0 second)[{f(t+δt)·f(t)}/δt];__}

It is clear that, "sentence pattern of definition of object", "sentence pattern of 'ideal thesaurus'", "sentence pattern of implementation of names of algorithms-of-processes", "sentence pattern of physical and/or mathematical rules", and, "sentence pattern of function", are used to describe the idea of the Newton's Mechanics, without almost any awkwardness, fitting exactly along the points of the issue, in a very natural way. This shows the system of forms of knowledge representations disclosed in the present invention is very smartly designed.

If the knowledge is described in sentences in these forms, the algorithm of association and reasoning given in the present invention including @[algorithm of sentence based object-oriented categorical syllogism] @[algorithm of sentence based object-oriented hypothetical syllogism], defined later in the present invention can be applied almost automatically by digital computers. Of course, this form is somewhat too formal to be read inattentively. But it is extremely easy to 'translate' this form into more reader friendly one; for example, if only the symbols, '__S==__', '__V==__', and '__C==__', are removed from a sentence of this form, then the sentence becomes much readable for a man. This can be done easily if a computer program for this purpose is used. For example, a commercially available word processors such as the '©Word' presented by ©Microsoft can be used for this purpose, if its service of replacing particular pattern into vacancy is used.

As I mentioned before, English has five basic sentence patterns. It has become evident now that only one of the five basic sentence patterns of English, (i.e. sentence pattern S+V+C) is necessary to describe the Newton's equation of motion, if "sentence pattern of physical and/or mathematical rules" is used in a way that I have disclosed in the present invention thus far. Remember that the Newton's equation of motion is, as I mentioned before, extremely powerful rule to describe special cases in the material word. Of course, as will be shown later, the knowledge representations disclosed in the present invention are so smartly formalized as to be able to use the remaining four basic sentence patterns of English, as well as the sentence pattern S+V+C. In the English language, at least about 1500 verbs exist. However, the 'be' verb is the only verb explicitly used to describe the Newton's equation of motion in the form of "sentence pattern of physical and/or mathematical rules". Implicitly used verbs are 'multiply' (×), 'divide' (÷), 'plus' (+). This means only four of the English verbs are necessary to describe the Newton's equation of motion.

As has been shown before in the present invention, the knowledge representations disclosed in the present invention are so smartly formalized as to be able to give the lexical definition to large number of the English verbs, as well as the four English verbs describing the Newton's equation of motion. These things will show the extremely mighty richness of the power of expression of the way of the knowledge representations disclosed in the present invention.

3.3.5. Schrödinger Equation Represented Using a Knowledge Representation System of an Object-Oriented Knowledge Base Disclosed in the Present Invention It is important to be conscious of the incompleteness and the limit of the Newton's Equation of motion. A microscopic system, such as a system consists of an electron and an 'atomic nucleus' of a hydrogen atom, can not be covered by the Newton's equation of motion. Newton's equation of motion is the equation of motion of the Newton's Mechanics. An electron is a microscopic particle, and an 'atomic nucleus' is also a microscopic particle. But Newton's Mechanics covers only the system consisting only of macroscopic particles. The definition of the word 'microscopic' will be given later in the present invention. And in general, a molecular system, which is usually microscopic, can not be covered by the Newton's Equation of motion.

What is called 'Quantum dynamics', instead of the 'Newton's Mechanics', is necessary to describe correctly a microscopic system. About a hundred years ago, many physicists became conscious of that the basis of their own physics, i.e. the Newton's equation of motion, is never almighty. That is, they became conscious that many experimental data about microscopic systems can not be precisely described by the Newton's equation of motion. For example, the motion of a traveling electron can not be precisely described by the Newton's equation of motion, because experimental physicists found that an electron dose not travel straight exactly on a trajectory even when no external force is exerted on the electron. And instead of making a straight trajectory, such an free electron diffracts during its travel, even when no external force is exerted on the free electron.

Physicists in those days were guided by what is called 'correspondence principle', which tells that the equation of motion that will cover the microscopic systems, which is called later 'Schrödinger equation', which is an equation of motion of the 'Quantum dynamics', should also cover the macroscopic systems, and that when 'Schrödinger equation' covers a macroscopic system, what is predicted by 'Schrödinger equation' should be exactly consistent with what is predicted by the 'Newton's equation of motion'. In a word, they tried to find an equation of motion that covers not only the motions of microscopic particles but also covers the motions macroscopic particles.

The first man who fond the equation of motion was Werner Karl Heisenberg (1901-1976), who proposed what is called the 'Heisenberg equation of motion', which covers both microscopic systems and macroscopic systems in an exact way. 'Heisenberg equation of motion' is an equation of motion of the 'Quantum dynamics'. Soon after, Erwin Schrödinger (1887–1961) proposed what is called 'Schrödinger equation'. Afterwards, it was found that the 'Heisenberg equation of motion' and the 'Schrödinger equation' are exactly equivalent in the mathematical point of view. Nowadays, 'Schrödinger equation' is more widely used than the 'Heisenberg equation of motion'.

Newton's equation of motion is often used even today, because Newton's equation of motion is very simple from the point of view of mathematics, and in many cases, less heavy calculation is necessary to carry out a computer simulation based on the Newton's equation of motion. Schrödinger equation is used when description of microscopic systems is necessary. Either Schrödinger equation and/or Newton's equation of motion may be chosen to use case by case. It will be shown that the Schrödinger equation can be described using the way of the knowledge representation of an object-oriented knowledge base system disclosed in the present invention.

However, Schrödinger equation is not almighty. Both Newton's equation of motion and Schrödinger equation can cover only motion of something whose velocity is much slower than the velocity of light.

Afterwards, an equation of motion, which can cover traveling microscopic and/or macroscopic particles traveling with any velocity, was presented by P. A. M. Dirac (1902–1984). P. A. M. Dirac combined the Einstein's theory of 'special relativity' and the Schrödinger equation. This equation is called the 'Dirac equation', which is an equation of motion of 'relativistic quantum dynamics'. It will be shown that the 'Dirac equation' also be able to be described by using the way of the knowledge base system disclosed in the present invention.

I show an example in which the way of the knowledge representation of an object-oriented knowledge base system disclosed in the present invention is used, to describe an equation of motion that covers both macroscopic and microscopic material word. It is the Schrödinger equation, which is the one of the most frequently used equation of motion in the field of research and developments using quantum dynamics today.

Motion of electrons in microscopic systems such as atomic systems, can be precisely described using a Schrödinger equation. However, in general, lower cost of calculation is necessary to solve a Newton's equation of motion, in comparison with the cost of calculation to solve a Schrödinger equation. Therefore, Schrödinger equations are usually used only for systems that can not be covered by the Newton's equation of motion.

Before showing how to describe a Schrödinger equation in a form of "sentence pattern of physical and/or mathematical rules", I will give an outline of the theory of a quantum dynamics.

The aim for which I give following writing about the outline of the background theory of a Schrödinger equation is simply to give the feeling of 'having understood' for the reader of the present invention. I never insist that every proposition in the following writing about the outline of the background theory of a Schrödinger equation is the absolute-and-unique 'truth'. They are only one of possible ways for understanding the background of the theory of a Schrödinger equation. But I believe that they are the most suitable to be used to achieve the present aim.

Let us begin. The most fundamental and most puzzling principle of quantum theory is the 'uncertainty principle', which was proposed by a famous physicist, Dr. W. K. Heisenberg in 1926. The 'uncertainty principle' is extremely hard to understand by human beings, and has long been compelling with ease tremendous number of ambitious young college students in the science course out of the modern physics, before they realize even what is 'uncertain'. Usually the 'uncertainty principle' is described purely mathematically. The most elegant mathematical description of the 'uncertainty principle' I know is the textbook for college student, ⊙ "Shoto-Ryoshi-Rikigaku" (In Japanese). I recommend that one who has self-confidence in his talent in mathematics should read this textbook if one wants to understand the 'uncertainty principle' in a mathematical way. But I here describe the 'uncertainty principle' not only using mathematics but also using English in a rather naive way.

One of the attributes of an electron that can never easily accepted by any common sense of human being except for physicians is that "any electron never rests on an infinitively small 'point' in a space how strong the force which bound the electron to the 'point' may be. And instead, any electron always moves around very rapidly in an finite (i.e. non-zero) expanse of a volume in space". The majority of physicians believe in this proposition about the attributes of an electron.

For example many physicists believes in that an electron in an isolated hydrogen atom moves around within an expanse of a volume in space which can be roughly approximated by an expanse of a volume in space surrounded by a sphere whose radius is approximately $0.529\times10^{-10}$ meters. Physicists usually call this length of $0.529\times10^{-10}$ meters the 'Bohr radius', which is usually denoted by '$a_B$'.

$$a_B=0.529\times10^{-10}\text{ meters}$$

Here 'an isolated hydrogen atom' means a hydrogen atom in vacuum not in a form a component of a molecule but in a form of atom isolated from any other atoms. In many cases, by the way, many metallurgists often regards the 'Bohr radius' and/or other values very near to the 'Bohr radius' as the 'radius' of 'an isolated hydrogen atom', when they use their pragmatic 'hard sphere model' of an isolated hydrogen atom.

Physicists believe in that what is called an 'atomic nucleus' always exists in any atom. The 'atomic nucleus' of an isolated hydrogen atom exists, of course, at the center of the previously described sphere. In a usual environment on the earth in which human beings live, the 'radius' of the atomic nucleus of an isolated hydrogen atom is about $10^{-15}$ meters, which is about 1/10000000 of the 'Bohr radius'. In this sense, a 'nuclear size' is usually much smaller than an 'atomic size'.

When an electron in an isolated hydrogen atom is making revolutions in an orbit around the atomic nucleus of the isolated hydrogen atom stationary, then the 'electrostatic-attractive-force working between the electron and the atomic nucleus' and the 'centrifugal force exerted on the electron' balance each other. This balance of two types of forces prevents the electron in an isolated hydrogen atom from absolutely sucked and swallowed by the atomic nucleus of the isolated hydrogen atom. In other words, this balance is a reason why an isolated hydrogen atom dose not easily crushes and compressed into a small lump whose size is about as large as nuclear size. Of course I agree this proposition.

Common misconception is that only the previously mentioned balance between electrostatic-attractive-force and the centrifugal force is the mechanism that prevents an isolated hydrogen atom from easily crushing and being compressed into a small lump of nuclear size.

The fact is that even when the electron in an isolated hydrogen atom is not making revolutions around the atomic nucleus of the isolated hydrogen atom, the isolated hydrogen atom dose not crush-and-compressed into a small lump of nuclear size.

Many physicists may be paradoxically confused here about what is the meaning of the word 'making revolutions' used here. In order to prevent this, I give a mathematical definition here readable only for physicists. When I say that "An electron in an isolated hydrogen atom is not making revolutions around the atomic nucleus of the isolated hydrogen atom", I mean that "The angular momentum of the electron, $[h/(2\pi)]l(l+1)$, is zero", where h is the Planck's constant, and 'l' is the 'azimuthal quantum number'". In a word, when I say that "an electron in an isolated hydrogen atom is not making revolutions around the atomic nucleus of the isolated hydrogen atom", I mean that "the 'azimuthal quantum number' of the electron in a isolated hydrogen is zero, (i.e. l=0)". And when I say that "an electron in an isolated hydrogen atom is making revolutions around the atomic nucleus of the isolated hydrogen atom", I mean that "the 'azimuthal quantum number' of the electron in a isolated hydrogen is non zero, (i.e. $l \neq 0$)".

Remember here the previously mentioned attributes of an electron, that "any electron never rests on an infinitively small 'point' in a space how strong the force which bound the electron to the 'point' may be, and instead, any electron always moves around very rapidly in an expanse of a volume in space". Therefore, an electron in an isolated hydrogen atom keeps moving around very rapidly in the atom even when the electron is not making revolutions around the atomic nucleus of the isolated hydrogen atom, even while the electron is strongly attracted by the atomic nucleus via the electrostatic force.

The first question may arise here from ones who know the Coulomb law. That is, as the electrostatic-attractive-force is very mighty when the electron approaches very closely to the surface of the atomic nucleus of the isolated hydrogen atom because the nuclear size is very small. Why dose the electron not absorbed by the atomic nucleus of the isolated hydrogen atom by this mighty electrostatic-attractive-force?

The second question may arise here that how the electron keeps moves around very rapidly in the atom without making revolutions around the atomic nucleus of the isolated hydrogen atom?

The answer to the first question is as follows. The electrostatic-attractive-force is of course working between the electron and the atomic nucleus even when the electron in an isolated hydrogen atom is not making revolutions around the atomic nucleus of the isolated hydrogen atom. In addition, this electrostatic-attractive-force is judged to be 'very mighty' when one considers that the mass of an electron ($9.11\times10^{-31}$ kg) is extremely small and that the minimum distance between the electron and the atomic nucleus ($10^{-15}$ meters$\sim(1/100000)\times a_B$) is extremely short. Remember here, however, the attribute of an electron here that "any electron never rests on an infinitively small 'point' in a space however strong the force which bound the electron to the 'point' may be, and instead, any electron always moves around very rapidly in an expanse of a volume in space". Here, the atomic nucleus of the hydrogen atom is regarded as the 'point', and the electrostatic force between the electron and the atomic nucleus is regarded as the "force that bound the electron to the 'point'".

Of course, the stronger the force which bounds the electron to the 'point' is, the narrower the expanse of a volume in space around the point in which the electron moves around rapidly is. However, as detailed quantum mechanical calculations carried out on the basis of 'Schr ödinger equation' shows (see any textbook of quantum dynamics, for example, ⊙"Shoto-Ryoshi-Rikigaku" (In Japanese) or ⊙"Problems in Quantum Mechanics, third edition" (In English)), the electrostatic-attractive-force is not strong enough to confine the electron in the atomic nucleus. Instead, the electrostatic-attractive-force confines the electron in an expanse of a volume in space which is approximated by a volume in space surrounded by a sphere, whose radius is about $0.529\times10^{-8}$ meters ($=a_B$), and at the center of which the atomic nucleus of the isolated hydrogen atom exists.

Some physicists may be confused here again. I give here a detailed discussion on the basis of the mathematically described 'uncertainty principle'. Is it really true that the stronger the force which bound the electron to the 'point' becomes, the narrower the expanse of a volume in space around the point in which the electron moves around rapidly? Only for them, I use here mathematical equation. The 'uncertainty principle' in 3-dimensional space can be described by an equation, $$(3^{1/2}\cdot\Delta R)\cdot(3^{1/2}\cdot\Delta p)\sim h,$$

where ΔR is the uncertainty of the position of the electron, and Δp is the uncertainty of the momentum of the electron, $3^{1/2}$ is the square root of 3, and h is the Planck constant, $$h=6.63\times10^{-34}\ \text{Joule}\cdot\text{second},$$

here, 'Joule' is the unit of energy. 1 Calorie equals to 4.2 Joule. Momentum 'p' of an electron is a quantity that a physicist often uses, and is defined by an equation, $$p=m\times v\ Kg\cdot\text{meter/second},$$

where m is the mass of the electron, ($m=9.11\times10^{-31}$ Kg), and v is the velocity with which the electron travels.

A physicist knows that if and when an electron is moving stationary around a central point under any static attractive force between the electron and the central point, then that the kinetic energy of the moving electron balances with the potential energy of the electron, V(R), which is defined on the basis of the static attractive force, as a function of the distance 'R' between the electron and the central point.

$$[1/(2\ m)]p^2\sim V(R),$$

where, m is the mass of an electron, $$m=9.11\times10^{-31}\ Kg.$$

In the case of an electron in an isolated hydrogen atom, the static attractive force is the electrostatic force working between the electron and the atomic nucleus, and, V(R), is given by the equation, called the 'Coulomb's Law', $$V(R)=[1/(4\pi\epsilon_0)][e^2/R]\sim[1/(4\pi\epsilon_0)][e^2/\Delta R],$$

where, '$\epsilon_0$' and 'e' are constants which a physicist often uses and are given by $$\epsilon_0=8.85\times10^{-12}\ \text{Farad meter},$$

$$e=1.60\times10\text{-}19\ \text{Coulomb}.$$

Equation, $[1/(2\ m)]p^2\sim V(R)$, which is widely accepted by dominant of physicists, shows that the stronger the force which bound the electron to the 'point' is, the greater the absolute value of 'p' becomes. As the electron is confined in a finite expanse of a volume in space, the electron should be zigzagging. Therefore, the uncertainty of the value of 'p' should be approximately equal to the absolute value of 'p'. Therefore, in a rough approximation, following two equations are used, $$\Delta p \sim p,$$

Therefore, it is concluded that the stronger the force which bound the electron to the 'point' is, the greater the absolute value of 'Δp' becomes. If and when the value of 'Δp' becomes greater, the value of 'ΔR' becomes inevitably small; remember the equation "Δp·ΔR=h", where 'h' is a constant. Therefore, in a word, the greater the force which bound the electron to the 'point' is, the smaller the value of 'ΔR' becomes. If the value of 'ΔR' is smaller, then the width of the expanse of a volume in space around the point in which the electron moves around rapidly becomes narrower, because 'ΔR' is just equal to the width.

Furthermore, if previously described there equations $$(3^{1/2}\cdot\Delta R)\cdot(3^{1/2}\Delta p)\sim h,$$

$$[1/(2\ m)]p^2\sim[1/(4\pi\epsilon_0)][e^2/\Delta R],$$

$$\Delta p\sim p,$$

are used, one can obtain, $$\begin{aligned}\Delta R &\sim (2\pi\varepsilon_0 h^2)/(9me^2)\\ &= 1.16\times10^{-10}\ \mathrm{m}\\ &= 1.1\times(2\times0.529\times10^{-10}\ \mathrm{m})\\ &= 1.1\times(2\times a_B).\end{aligned}$$

This result shows that the value of 'ΔR' obtained using the equation representing the 'uncertainty principle' is judged, with reasonably good precision (the error is only about 10%), to be equal to the value of the 'Bohr radius'. Thus, the 'Bohr radius' can be regarded with good approximation as the value representing the typical width of the expanse of a volume in space in which the electron of an isolated hydrogen atom always moves around very rapidly. These discussions given above are the detailed discussion on the basis of the mathematically described 'uncertainty principle'.

To give the answer to the second question, it is important to clearly recognize that "that an electron is making revolutions around the atomic nucleus of the isolated hydrogen atom", which I called the 'revolution of an electron' as one thing, and, "that an electron in an isolated hydrogen atom keeps moving around very rapidly in the atom even when the electron is not making revolutions around the atomic nucleus of the isolated hydrogen atom", which many physicists often call a 'Zitterbewegung', as a quite another thing.

Revolution of an electron can be easily 'understood' not only by physicists but also by people other than physicists, because most of the people knows the thesis of Galileo, which tells that the earth make revolutions around the sun. They understand the concept of 'revolution of an electron around the atomic nucleus' by analogy with the thesis of Galileo of 'revolution of the earth around the sun'.

On the other hand, many physicists believes in that 'Zitterbewegung' can not be understood by any analogy with events observed by human eyes in the daily life of people.

When the electron is not making revolutions around the atomic nucleus of the isolated hydrogen atom, no centrifugal force is exerted on the electron. Therefore, if the Newton's equation of motion were exactly valid in this microscopic system (i.e. in this system of the isolated hydrogen atom), the electron is attracted directly making a linear trajectory into the atomic nucleus of the isolated hydrogen atom, and collides with the atomic nucleus of the isolated hydrogen atom. Dose an electron really travels in such a way? As far as I know, the answer is "nobody knows", because it has not been reported that anyone has ever succeeded in observing such a 'trajectory' of 'Zitterbewegung' of an electron, in an experiment repeatable by anyone at anywhere and anytime.

Instead, the majority of the physicists believe in that it is in principle impossible to observe experimentally the exact trajectory of such a motion ('Zitterbewegung') of an electron. In other words, it is impossible to trace both the exact place and the exact velocity of an electron at the same time. This principle is what is called the 'uncertainty principle' proposed by Heisenberg. That is, if the uncertainty in the momentum of an electron is 'Δp' and the uncertainty in the place of an electron is 'ΔR', then, the equation, $$(3^{1/2}\cdot\Delta R)\cdot(3^{1/2}\cdot\Delta p)\sim h,$$

is satisfied at any time at any place. Therefore, both the value of 'ΔR' and the value of 'Δp' can not approach infinitely to zero at the same time.

To avoid confusion, I clearly say here that many of the physicists believe in that if and when the electron is not making revolutions around the atomic nucleus of the isolated hydrogen atom that is not energetically excited, then the 'Zitterbewegung' is the only 'motion' the electron makes. And the electron dose not make any other motion. And, many physicists believe in that if and when an electron in an isolated hydrogen atom is making revolutions in an orbit around the atomic nucleus of the isolated hydrogen atom stationary, not only revolution but also 'Zitterbewegung' is the 'motion' of the electron, because the 'uncertainty principle' dose not break down even when an electron is making revolutions.

When the state of an electron in an isolated hydrogen atom is in the energetically most stable state (i.e. in the state with minimal kinetic energy), then, the electron is not making revolutions around the atomic nucleus. This is, an electron making revolutions has excess energy than an electron not making revolutions. To say more detail, an electron making revolutions has the kinetic energy of the traveling motion in an orbit as well as the kinetic energy of 'Zitterbewegung'. On the other hand, an electron that is not making revolutions has only the kinetic energy of 'Zitterbewegung'.

According to the Maxwell's theory of 'electromagnetism', any charged particle making revolutions emits radiation, which is called the 'synchrotron radiation'. The excess energy (i.e. the kinetic energy of the revolutionary motion in an orbit) is spontaneously emitted in the course of time, as the photo energy of the 'synchrotron radiation' until the electron making revolutions stops making revolutions. And finally and inevitably the hydrogen atom settles down into a state in which the electron dose not make revolutions any more. The frequency of the electromagnetic wave radiated from the isolated hydrogen atom as the 'synchrotron radiation' is about equal to the frequency of the revolutions made by the electron traveling around the atomic nucleus of the isolated hydrogen atom.

Many of the experimental molecular physicists can measure the frequency of the electromagnetic wave mentioned above using what is called the 'spectrometer' and what is called the 'photon counter'. Most of the molecular physicists know that the precision of the measurement of the frequency is tremendously high, when they measure 'synchrotron radiations' made by many hydrogen atoms that synchronizes with each other by stimulating each other via their radiations; This phenomena is known as 'Light Amplification by Stimulated Emission of Radiation', usually called the laser. In this sense, a man can measure the frequency of such revolutions made by the electron traveling around the atomic nucleus of an isolated hydrogen atom, with great precision.

Of course, no one has observed the precise trajectory of such a revolution of an electron, because it is almost certainly impossible to observe the 'Zitterbewegung' always accompanying the revolution of an electron. An electron in an isolated hydrogen atom usually dose not making revolutions around the atomic nucleus unless the isolated hydrogen atom is energetically excited by the world outside of the isolated hydrogen atom by means of irradiation, particle impact, etc. In a word, in most of the usual isolated hydrogen atoms, the electron is not making revolutions around the atomic nucleus of its hydrogen atom.

The majority of physicists believe in that "Only 'the probabilistic distribution of existence of an electron in the expanse of a volume in space in which an electron is moving around very rapidly (i.e. an electron is making the 'Zitterbewegung')' can be observed by human beings". And they believe in that "The precise trajectory of the 'Zitterbewegung' can not be observed by human beings". Do not be confused here. Strictly speaking, the word 'revolution of electron' used in the sentence, "the revolution of an electron in an isolated hydrogen atom around the atomic nucleus of the isolated hydrogen atom", means 'the revolution of 'the probabilistic distribution of existence of an electron and/or its phase in the expanse of a volume in space in which an electron is making the 'Zitterbewegung'''. The experimental measurement of the 'frequency of the revolution of an electron in an isolated hydrogen atom' is not equal to the measurement of the trajectory of the 'Zitterbewegung'.

Only a small number of the physicists believes in the usefulness of tagging along the detailed discussion of the exact trajectory of 'Zitterbewegung'. But they continue hot and open discussions about the issue of 'Zitterbewegung'. Shin'ichiro Tomonaga, who is a famous physicists and is a Nobel prize winner, had great interest in the 'theory of measurement' all along the works in his study, but to many physicist's sorry, he died of cancer before he had completed the plan of publishing a textbook to be named 'Ryoshi rikigaku III', in which detailed and careful discussion about the issue of 'theory of measurement' would be given. But a part of his work about this issue is described in his ⊙"Supin ha Meguru"("Spin the Spin").

If and when an isolated electron, for example, exists in vacuum under a spatially uniform external electric field, the electron is of course accelerated and begins to travel in the direction of the external electric field. More strictly speaking, 'the probabilistic distribution of existence and/or its phase of an isolated electron in the expanse of a volume in space in which an electron is making the 'Zitterbewegung'' is accelerated and begins to travel, if and when the isolated electron exists in vacuum under a spatially uniform external electric field. The electron of course keeps traveling even after the spatially uniform external electric field ceases to exist. In other words, the electron is making a translation motion as well as 'Zitterbewegung'.

The majority of the physicists believe in that if and when the 'probabilistic distribution of existence of an electron in the expanse of the volume in space' travels as a bunch with velocity v, then, the bunch acts like a 'packet' of 'wave'; that is, the probabilistic amplitude of existence of an electron raises and falls periodically within the traveling packet along a line which defines the center of the track of the traveling motion. The wave length of this wave is called the 'de Broglie wavelength', which I denote here by the symbol, 'λ'. The value of 'λ' can be roughly estimated by the equation which was given by de Broglie, $$\lambda \sim h/(mv),$$

where h is the Planck's constant, m is the mass of the electron, and v is the velocity of the translation motion of the traveling electron.

Many physicists usually call this wave the "matter wave" of the electron. A "matter wave" of the electron diffracts. Erwin Schrödinger (1887~1961), who is a well known physicist, found out that the spatial distribution and the time evolution as well as the phase of the 'matter wave' of an electron can be precisely described as a mathematical function of the absolute time 't' and of the Cartesian coordinates (x,y,z). Physicists usually call this mathematical function the 'wave function' of the electron. And they usually express this 'wave function' by the symbol 'ψ(x,y,z,t)'.

If I describe this discussion in a more mathematical style, then, I can say in the following manner;

The value of the square of the absolute value of 'ψ(x,y,z,t)', i.e.

$$|\psi(x,y,z,t)|\cdot|\psi(x,y,z,t)|,$$

equals strictly to the probabilistic density of existence of an electron around the point, having the Cartesian coordinate, '(x,y,z)', at the absolute time, 't'. In a simplified but somewhat confusing descriptions, the '(x,y,z)' is called the 'Cartesian coordinate of the electron'. Most of the physicists use this simplified description, but usually they do not believe in that "the 'Cartesian coordinate of the electron' of an electron, '(x,y,z)', can be experimentally determined as a function of time". This 'function of time', if it would exist, describes the trajectory of the 'Zitterbewegung' of an electron. In a word, dominant of the physicists dose not know that such a 'function of time' really exists or not, even while they use a simplified description 'Cartesian coordinate of the electron'. What I want to say here is that whether such a 'function of time' exists or not dose not have any relation to the claims disclosed in the present invention.

Erwin Schrödinger also showed the guide line along which the implementation of the wave function 'ψ(x,y,z,t)' can be obtained. That is, he showed that if a man solves the mathematical differential equation, which is usually called the 'Schrödinger equation' for the electron, strictly, he gets the implementation of the wave function of the electron, 'ψ(x,y,z,t)'. Details of the background theory of the Schrödinger equation is given in ⊙"Ryoshi-Rikigaku"("Quantum Mechanics"), and in ⊙"Supin ha Meguru"("Spin the Spin").

The dominant of the physicists knows that the Schrödinger equation for an electron in an isolated hydrogen atom is given by;

$$H\psi(x,y,z,t)=[ih/(2\pi)](\partial/\partial t)\psi(x,y,z,t),$$

where 'i' is what mathematicians calls an 'imaginary number', which is defined by $$i=(-1)^{1/2},$$

and, '(x,y,z)' is the Cartesian coordinate of the electron, and, 'H' is a mathematical operator usually called an 'Hamiltonian'. 'H' is defined by $$H=-[1/(2m)]\cdot[h^2/(2\pi)^2]\cdot\Delta+V(x,y,z,X,Y,Z),$$

where 'm' is 'the mass of an electron', '(X,Y,Z)' is the Cartesian coordinate of the atomic nucleus, 'h' is the Plank's constant, 'Δ' is a kind of mathematical operator, which mathematicians call a Laplacian, defined by, $$\Delta\equiv\{\partial^2/(\partial x)^2\}+\{\partial^2/(\partial y)^2\}+\{\partial^2/(\partial z)^2\},$$

where, and, '$\{\partial^2/(\partial x)^2\}$' means a mathematical operation in which derivative by 'x' is carried out twice, '$\{\partial^2/(\partial y)^2\}$' means a mathematical operation in which derivative by 'y' is carried out twice, and '$\{\partial^2/(\partial z)^2\}$' means a mathematical operation in which derivative by 'z' is carried out twice. And 'V(x,y,z,X,Y,Z)' is the electrostatic potential energy of the charged particles system consist of the electron and the atomic nucleus of the hydrogen atom. According to the Maxwell's theory of electromagnetism, this V(x,y,z,X,Y,Z) is given by $$V(x,y,z,X,Y,Z)=[e^2/(4\pi\epsilon_0)]\cdot(1/R^2),$$

where, R is the distance between the electron and the atomic nucleus, which is given by the equation, $$R=[(x-X)^2+(y-Y)^2+(z-Z)^2]^{1/2},$$

and 'e' is the a constant what physicists call the 'elementary electron charge', $$e=1.60\times10^{-19}\text{ Coulomb},$$

and '$\epsilon_0$' is another constant what physicists call the 'permittivity of vacuum'

$$\epsilon_0=8.85\times10^{-12}\text{ Farad}\cdot\text{meter}^{-1}.$$

Usually, '(X,Y,Z)' is set as $$(X,Y,Z)=(0,0,0),$$

for the sake of simplicity, without losing any generality of the present discussion.

A mathematicians can prove mathematically that a solution to this Schrödinger equation exists, and a physicists know how to get the mathematically strict solution of this Schrödinger equation to give the implementation of 'ψ(x,y, z,t)'.

Strictly speaking, Hamiltonian for an electron in an isolated hydrogen atom is not perfectly strict. And it must be slightly adjusted by introducing the mass of the atomic nucleus of the isolated hydrogen atom, which is usually denoted by M. This slight adjustment is extremely easy for a physicist, but I do not make this slight adjustment for the sake of simplicity. A physicist knows the concept of 'reduced mass' and do this slight adjustment within thirty seconds.

Let us discuss here a special situation in which $$V(x,y,z)=0,$$

is used as the 'V(x,y,z)' in the Schrödinger equation. This Schrödinger equation describes an electron traveling in vacuum free of any external force or any external field (i.e. a free electron). In this case, the Schrödinger equation is given by, $$H_F\psi_F(x,y,z,t)=[ih/(2\pi)](\partial/\partial t)\,\psi_F(x,y,z,t),$$

where '$H_F$' is given by $$H_F=-[1/(2m)]\cdot[h^2/(2\pi)^2\cdot\cdot\Delta.$$

A solution of this Schrödinger equation represents the 'matter wave' of the free electron:

$$\psi_F(x,y,z,t)=A\cdot exp[(i/\lambda)(x-vt)],$$

where, A is a constant, and 'A' is given by $$\lambda=h/(4\pi m),$$

where the last equation gives the exact 'de Broglie wavelength' of the 'matter wave', '$\psi_F$(x,y,z,t)' of the free electron.

According to the quantum dynamics, the 'v' means the velocity of the center of mass of the 'matter wave'. In most cases, the motion of the 'center of mass' of a 'matter wave' can be described using the Newton's equation of motion, unless the electron is traveling with extremely high speed. About the details of this issue, see for example, ⓞ "Shoto-Ryoshi-Rikigaku", and "Quantum Mechanics".

Thus far, only the one-electron systems are discussed, but it is usually very easy to get a Schrödinger equation describing a system that is composed of more than one electrons. In general, to solve the Schrödinger equation of a system that comprises many electrons whit high precision using, say, configuration integration method, is usually difficult. But to solve such a Schrödinger equation approximately with low precision using, say, the object-oriented Hückel method, for example not very difficult.

As an example of n-electron system, we can discuss here, the electron system in a molecular system composed more than two atoms. If the wave function of the electron system is obtained, not only the most of the chemical properties of the molecule can be predicted, but also the modes of the molecular vibrations of the molecules can be described.

Let us call the number of electrons in this molecular system 'n', and let us call the number of atoms constituting the molecular system, 'N'. Usually, the Schrödinger equation for the electrons in a molecular system can be obtained easily. It can be obtained only by slightly modifying the previously mentioned 'one-electron' Schrödinger equation of an electron in an isolated hydrogen atom. Here I only roughly discuss this issue; The Schrödinger equation of n-electron system in the molecule is given by, $$H_n\psi_n(x_1,y_1,z_1,x_2,y_2,z_2,\ldots x_n,y_n,z_n,t)=[ih/(2\pi)](\partial/\partial t)\,\psi_n(x_1,y_1,z_1,x_2,y_2,z_2,\ldots x_n,y_n,z_{n,t}),$$

where ($x_j,y_j,z_j$) is the Cartesian coordinate of the j'th electron in the n-electron system, and 't' is the absolute time. '$H_n$' not only includes the ($x_j,y_j,z_j$)'s, but also includes the Cartesian coordinates of the atomic nucleuses of the atoms which composes the molecule; i.e. '$H_n$' includes the Cartesian coordinates of the atomic nucleuses, the ($X_I,Y_I,Z_I$)'s, $$(X_I,Y_I,Z_I)\ (I=1,2,\ldots,N),$$

where, 'N' is the number of the atoms constituting the molecule.

Of course, the mass of an electron, the 'elementary electron charge', and the 'permittivity of vacuum' are also included in '$H_n$'.

It is not difficult for a physicists to write down such Schrödinger equations for many body systems; '$H_n$' is given by, $$H_n=-[1/(2m)]\cdot[h^2/(2\pi)^2]\cdot[\Delta_1+\Delta_2+\ldots+\Delta_n]+V_n(x_1,y_1,z_1,x_2,y_2,z_2,\ldots,x_n,y_n,z_n,X_1,Y_1,Z_1,X_2,Y_2,Z_2,\ldots,X_N,Y_N,Z_N),$$

where, $\Delta_j$ is the Laplacian defined for electron 'j', as $$\Delta_j\equiv\{\partial^2/(\partial x_j)^2\}+\{\partial^2/(\partial y_j)^2\}+\{\partial^2/(\partial z_j)^2\},$$

and, $V_n(x_1,y_1,z_1,x_2,y_2,z_2, \ldots ,x_n,y_n,z_n,X_1,Y_1,Z_1,X_2,Y_2,Z_2, \ldots ,X_N,Y_N,Z_N)$, is the electrostatic potential energy of the charged particles system includes the electrons and the atomic nucleuses of the molecule. This is given by $$V_n(x_1, y_1, z_1, x_2, y_2, z_2, \ldots, x_n, y_n, z_n, X_1, Y_1, X_2, Y_2, Z_2, \ldots, X_N, Y_N, Z_N) = [e^2/(4\pi\varepsilon_0)]\cdot(A_1/R_{1,1} + A_1/R_{2,1} + \ldots + A_1/R_{n,1} + A_2/R_{1,2} + A_2/R_{2,2} + \ldots + A_2/R_{n,2} + \ldots + A_N/R_{1,N} + A_N R_{2,N} + \ldots + A_N/R_{n,N}) + [e^2/(4\pi\varepsilon_0)]\cdot (1/r_{1,2} + 1/r_{1,3} + 1/r_{1,4} + 1/r_{1,5} + \ldots + 1/r_{1,n} + 1/r_{2,3} + 1/r_{2,4} + 1/r_{2,5} + \ldots + 1/r_{2,n} + 1/r_{3,4} + 1/r_{3,5} + \ldots + 1/r_{3,n} + 1/r_{4,5} + \ldots + 1/r_{4,n} + \ldots + 1/r_{n,n}),$$

where, '$A_I$' is the atomic number of the I'th atom in the molecule, and '$R_{i,I}$' is the distance between the I'th atom and the i'th electron in the molecule, which is defined as $$R_{i,I}=[(x_i-X_I)^2+(y_i-Y_I)^2+(z_i-Z_I)^2]^{1/2},$$

and '$r_{j,k}$' is the distance between the j'th electron and the k'th electron in the molecule, which is defined as $$\text{i } r_{j,k}=[(x_j-x_k)^2+(y_j-y_k)^2+(z_j-z_k)^2]^{1/2}.$$

The Schrödinger equation, $$H_n\psi_n(x_1,y_1,z_1,x_2,y_2,z_2, \ldots ,x_n,y_n,z_n,t)=[ih/(2\pi)](\partial/\partial t)\psi_n(x_1,y_1,z_1,x_2,y_2,z_2, \ldots ,x_n,y_n,z_n,t),$$

describes the molecular system.

Usually, a macroscopic particle is consists of microscopic particles, (i.e. consists of atoms and/or of molecules). Therefore, the motion of most of the macroscopic particles can be described using this Schrödinger equation and a Schrödinger equation for motion of atomic nucleuses. The description of motion of macroscopic particles on the basis of such Schrödinger equations is consistent with the description of motion of macroscopic particles on the basis of the Newton's equation of motion, because a Schrödinger equation is contrived so as to the 'correspondence principle' is satisfied.

The Schrödinger equation is a differential equation from the point of view of mathematics. If the way to approximate a differential equation by using a finite differential equation, which has been described in detail previously in the present invention, is used, then, a finite differential equation approximation the Schrödinger equation, $$H_n\psi(x_1,y_1,z_1,x_2,y_2,z_2, \ldots ,x_n,y_n,z_n,t)=[ih/(2\pi)][\psi_n(x_1,y_1,z_1, \ldots ,x_n,y_n,z_n, t+\delta t)-\psi_n(x_1,y_1,z_1, \ldots x_n,y_n,z_n,t)]/\delta t.$$

is obtained, where δt is a value of the increment of time which is finite but small enough to make this finite differential equation an good approximation of the Schrödinger equation. This finite differential equation is readily transformed into, $$\psi_n(x_1,y_1,z_1, \ldots ,x_n,y_n,z_n,t+\delta t)=\psi_n(z_1,y_1,z_1,t)+[2\pi/(ih)]H_n\psi_n(x_1,y_1,z_1,x_2,y_2,z_2, \ldots ,x_n,y_n,z_n,t)\delta t.$$

I claim that, a plain English sentence can be used to describe the finite differential equation of motion representing approximately the Schrödinger equation, if "sentence pattern of physical and/or mathematical rules", which is a data structure for knowledge representation disclosed in the present invention, is made use of. That is,

__RULE__ Schrödinger equation __states__if(the wave function of a system composed of n microscopic particles with their own masses is $\psi_n(x_1,y_1,z_1,x_2,y_2, z_2, \ldots x_n,y_n,z_n,t)$, and the potential of the system is $V_n$, at time =t;__)then{at time=t+δt, the wave function of a system composed of n microscopic particles with their own masses, $\psi_n(x_1,y_1,z_1, \ldots x_n,y_n,z_n,t+\delta t)$, is given by, $$\psi_n(x_1,y_1,z_1, \ldots ,x_n,y_n,z_n,t+\delta t)=\psi_n(z_1,y_1,z_1,t)+[2\pi/(ih)]H_n\psi_n(x_1,y_1,z_1,x_2,y_2,z_2, \ldots ,x_n,y_n,z_n,t)\delta t.$$

, where '$H_n$' is the Hamiltonian determined using the masses of the microscopic particles and $V_n$;__};__

Thus, the Schrödinger equation can be covered by an object-oriented knowledge base system disclosed in the present invention. I claim that, this statement represents a kind law of causality. The term 'causality' means the relationship between a cause and the result. The cause of this rule of causality is of course, "the wave function of a system composed of n microscopic particles with their own masses is $\psi_n(x_1,y_1,z_1,x_2,y_2,z_2, \ldots ,x_n,y_n,z_n,t)$, and the potential of the system is $V_n$,"and, the effect of this rule of causality is of course, "the wave function of a system composed of n microscopic particles with their own masses, $\psi_n(x_1,y_1,z_1, \ldots x_n,y_n,z_n,t+\delta t)$, is given by, $$\psi_n(x_1,y_1,z_1, \ldots ,x_n,y_n,z_n,t+\delta t)=\psi_n(z_1,y_1,z_1,t)+[2\pi/(ih)]H_n\psi_n(x_1,y_1,z_1,x_2,y_2,z_2, \ldots ,x_n,y_n,z_n,t)\delta t.$$

, where '$H_n$' is the energy user determined using the masses of the microscopic particles and '$V_n$'".

The contrary of this proposition is also true. The cause described here determines uniquely the result described here, without fail.

I disclose a scheme with which the Newton's philosophy can be interpretation in an absolutely through manner. At first, let us assume that the world, including the planets in the universe, the earth and the sun, and atomic and/or molecular systems, can be ultimately decomposed into mutually interacting microscopic particles, described by 'matter waves'. And let us regard the Schrödinger equation, as a rule of causality describing the time evolution of the system of the 'matter waves' of the microscopic particles; It should be noted, of course, that Schrödinger equation covers only little part of the real world, because the calculation to solve a Schrödinger equation of realistic sized systems is usually to heavy to processed by existing digital computes. As a matter of fact, only in special ideal cases in very narrow range of engineering and/or science, Schrödinger equation is useful. In many cases, molecular system with only several to several ten's of atoms can be treated as the target of computer simulation on the basis of a Schrödinger equation.

Schrödinger equation is an equation of motion for 'matter waves'. It is clear that this is another example of the 'Law-of-Causality and Model-of-the-World architecture'.

According to my schema of the 'Law-of-Causality and Model-of-the-World architecture' the philosophy of Schrödinger equation can be summarized in a sentence that "Quantum Model-of-the-World works according to the Schrödinger equation". The system of forms of knowledge representations of an object-oriented knowledge base system disclosed in the present invention is suitable to embody the 'Law-of-Causality and Model-of-the-World architecture'.

Newton's equation of motion and the Schrödinger equation can be thus interpreted in a unified way, when my 'Law-of-Causality and Model-of-the-World architecture' is adopted.

There exist plenty of ways to explain and interpret the concept of the 'uncertainty principle' proposed by Heisenberg even today. The discussion that has been given by me is only one of them. However, I believe that the discussion that has been given by me is a best way to explain quantum dynamics.

3.3.6. Relativistic Schrödinger Equation Represented Using a Knowledge Representation System of an Object-Oriented Knowledge Base Disclosed in the Present Invention The discussion about the Schrödinger equation given above is about the quantum theory for non relativistic electrons. That is, the discussion about the Schrödinger equation given above is about the quantum theory for electrons whose traveling velocity is much less that the velocity of light, 'c', $$c=3.00\times 10^{8}\ \text{meter/second.}$$

The equation of motion for a relativistic electron is given by what is called the Dirac equation, $$H_D\psi=[ih/(2\pi)](\partial/\partial t)\psi,$$

where, 'ψ' is what is called a spinor. In the case of one electron system, $H_D$ is given by, $$H_D=[h/(2\pi)]c\ \Sigma_{n=1-3}\gamma_4\gamma_n[\partial x_n-\{2\pi ie/(hc)A_n\}+V+mc^2\gamma_4,$$

where, 'γ' is a matrix whose elements are defined as,

| | |
|---|---|
| $\gamma_{njk}=0$, | for j = 1~2, k = 1~2, |
| $\gamma_{njk}=-is_{njk}$ | for j = 1~2, k = 3~4, |
| $\gamma_{njk}=is_{njk}$ | for j = 3~4, k = 1~2, |
| $\gamma_{njk}=0$, | for j = 3~4, k = 3~4, |

where, '$s_n$' are what is called the three Pauli matrices, and

| | |
|---|---|
| $\gamma_{4jk}=I_{jk}$, | for j = 1~2, k = 1~2, |
| $\gamma_{4jk}=0$ | for j = 1~2, k = 3~4, |
| $\gamma_{4jk}=0$ | for j = 3~4, k = 1~2, |
| $\gamma_{4jk}=-I_{jk}$, | for j = 3~4, k = 3~4, |

where 'I' is the 2×2 unity matrix, and, 'A' is the vector potential of radiation.

I claim that, a plain English sentence can be used to describe the finite differential equation of motion representing approximately the Dirac equation, if "sentence pattern of physical and/or mathematical rules", which is a data structure for an object-oriented knowledge system disclosed in the present invention, as,

__RULE__ Dirac equation __states__if(the spinor of a system composed of a microscopic particles with its own mass is 'ψ(t)', and the potential of the system is 'V', and the vector potential of the radiation is 'A', at time=t;__)then{at time=t+δt, the spinor of the system, 'ψ(t+δt)', is given by, $$\psi(t+\delta t)=\psi(t)+[2\pi/(ih)]H_D\delta t$$

, where HD is the relativistic energy user determined using the masses of the microscopic particles, V, and A;__};__

Of course, the step of logics are divided into infinitely fine steps when δt is made infinitively small, and in this point, equation of motion described by using a finite differential equation is different from daily used syllogism, which covers only finite steps. In general, an equation of motion in a form of differential equation, including Newton's equation of motion, the Schrödinger equation, and, Dirac equation, can describe infinite numbers of steps of chain of causality. However, in a usual computer simulations, the value of 'δt' is not made infinitively small, but is made sufficiently small. Therefore, an equation of motion is also described as a daily used syllogism. Of course, however, the characters, '∞' and/or '1/∞' may be used in a computer simulation.

3.3.7. Fundamental Mathematics Represented Using a Knowledge Representation System of an Object-Oriented Knowledge Base Disclosed in the Present Invention Thus far, the discussion for physics has been given. Here, I discuss the knowledge representation of mathematics. Many propositions in mathematics can be described using "sentence pattern of physical and/or mathematical rules". For example, there is a proposition used as lemma 1.1 which appear §1 in ⊙"Kaiseki-Nyumon I", as, "for any two real numbers, 'a', and 'b'(a<b), there exist a real number, 'c', which satisfies, a<c<b."

This proposition can be interpreted using a sentence described in "sentence pattern of physical and/or mathematical rules", as __RULE__ lemma 1.1 which appear §1 in ⊙"Kaiseki-Nyumon I" __states__if('a' and 'b' are real numbers and they satisfy a<b;__)then{a real number 'c' exists which satisfies a<c<b;__};__

In general,

Under the condition, that 'x' is a variable moving on elements of a set 'X', and that 'P(x)' represents an attribute of 'x', then, a proposition, (let us call here this proposition, Px), "For all x∈X, P(x) is satisfied"

is translated into a sentence in "sentence pattern of physical and/or mathematical rules", __RULE__ Px __states__if(x∈X;__)then{P(x) is true;__};__

Under the same condition, a proposition (let us call here this proposition, Py) "At least one x∈X exists which satisfies P(x)"

is translated into a sentence in "sentence pattern of physical and/or mathematical rules", __RULE__ Py __states__if(x∈X and P(x);__)then{At least one x exists;__};__

It should be noted that many lemmas in mathematics can be described by combining these two patterns of lemma.

3.3.8. @[Algorithm of Sentence Based Object-Oriented Hypothetical Syllogism]

Lexical Definition of @[algorithm of sentence based object-oriented hypothetical syllogism]

Here, I define recursively the

@[algorithm of sentence based object-oriented hypothetical syllogism], which is an algorithm with which hypothetical syllogism is carried out on the basis of sentence, as follows:

If

"RULE_ ** _states_if(proposition 1)then{proposition 2};_"

is true, (i.e. major premise)

and proposition 1 is derived from proposition 3 using @[algorithm of sentence based object-oriented categorical syllogism] and/or @[algorithm of sentence based object-oriented hypothetical syllogism], (i.e. the first minor premise)

and, proposition 4 is derived from proposition 2 using @[algorithm of sentence based object-oriented categorical syllogism] and/or @[algorithm of sentence based object-oriented hypothetical syllogism] (i.e. the second minor premise)

then,

"_RULE_ ***** _states_if(proposition 3)then{proposition 4};_"is also true (i.e. the conclusion).

A quasi-C code of Formula. 16 outlines the procedure to judge whether a proposition is a "conclusion of a 'hypothetical syllogism described by @[algorithm of sentence based object-oriented hypothetical syllogism]' for a major premise" or not.

Lexical Definition of 'Means for Carrying Out Sentence Based Object-Oriented Hypothetical Syllogism'

@[Algorithm of sentence based object-oriented hypothetical syllogism] and/or something that stores the information of it, is a 'means for carrying out sentence based object-oriented hypothetical syllogism'.

Figure 16:
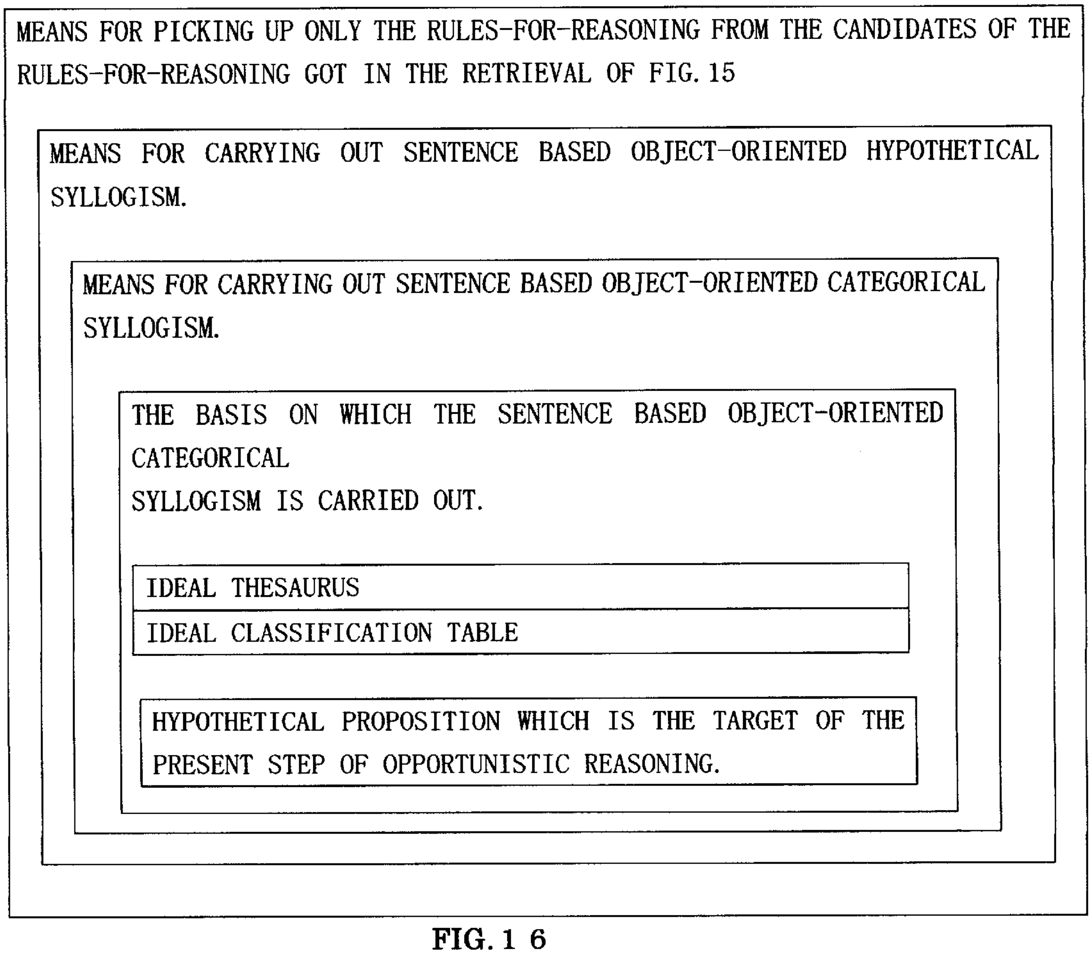
FIG. 16 shows a recommended constitution of the 'means for picking up only the rules-for-reasoning from the candidates of the rules-for-reasoning got in the retrieval of FIG. 15'.

As is clear from the lexical definition of @[algorithm of sentence based object-oriented hypothetical syllogism], 'means for carrying out sentence based object-oriented hypothetical syllogism' is defined on the basis of 'means for carrying out sentence based object-oriented categorical syllogism'. This is schematically shown in FIG. 16.

@[Algorithm of sentence based object-oriented hypothetical syllogism] is a mechanism of reasoning used in an object-oriented knowledge base system disclosed in the present invention.

On the basis of "sentence pattern of physical and/or mathematical rules" used as a rule of an object-oriented knowledge base system disclosed in the present invention can be multiplied, and, as the result, many sentences in "sentence pattern of physical and/or mathematical rules" can be obtained, if @[algorithm of sentence based object-oriented hypothetical syllogism] is repeatedly used. And the many sentences in "sentence pattern of physical and/or mathematical rules" thus obtained can be used as a 'rule' of an object-oriented knowledge base system disclosed in the present invention.

I adopt an opportunistic reasoning model as the problem solving model, when one chooses useful knowledge from the knowledge source. And it is recommended that, one should use @[algorithm of narrowing down the target 'descriptors' and/or target 'names-of-classification-items'] and/or should use @[algorithm of fusing propositions], if and when too many keys to be used as a rule are retrieved. And it is recommended that one should use @[algorithm of broadening out the target 'descriptors' and/or target 'names-of-classification-items'], if and when too less keys to be used as a rule are retrieved.

An example in which a problem is solved (example of theorem proving) on the basis of @[algorithm of sentence based object-oriented hypothetical syllogism], @[algorithm of sentence based object-oriented categorical syllogism] and the opportunistic reasoning model will be shown in the section of "§3.6. Example in which an Object-oriented knowledge base system Disclosed in the Present invention is applied to a Practical case in Solving a Problem in Metallurgical Physics".

3.3.9. "Sentence pattern of Function"

Next, keys recording data in the form of "If the 'input' of a function is ~, then the 'output' is ~" will be discussed as another example of the "sentences that store data used as rules". Functions used in C language and/or functions used in mathematics can be formalized by using the data structure, which I name "sentence pattern of function".

Lexical Definition of "sentence pattern of function"

I call this data structure, _FUNCTION_ *** _translate_INPUT_  _into_OUTPUT_*, the "sentence pattern of function", where '***' is the name of a function and/or the name of an 'algorithms-of-processes', '' is the inputs, and '*' is the outputs. The '**' and the '*' are a permutation of arguments of the function. A proposition may be used as an argument. And the '**' and the '*' describes situation before and after the matter described by the 'algorithms-of-processes' happens. I claim in the present invention that this data structure can be used to formulate even 'individual functions', which are in many cases a pure black box.

Lexical Definition of 'Means for Describing a Function Used as a Rule'

Sentence described in "sentence pattern of function" and/or something that stores the information of it, is a 'means for describing a function used as a rule'.

In the present invention, examples in which an object-oriented knowledge base system disclosed in the present invention is used will be shown later, wherein, the name of a subroutine, and/or the name of a computer program, and/or the name of an unit operation described in a manual, is used as the name of a function used in the 'means for describing a function used as a rule' (See "§3.4. CAD for Coding of Computer programs", and "§3.5. On-Line Manual and/or On-Line Help of Machines", and See FIG. 7).

Lexical Definition of 'Means for Describing the Function of a Verb'

Sentence in "sentence pattern of function" and/or something that stores the information of it, is a 'means for describing the function of a verb'.

Lexical Definition of 'Presupposition' of a 'Hypothetical Proposition' Described in "Sentence Pattern of Function"

In the present invention, I regard a sentence in "sentence pattern of function" a kind of a 'hypothetical proposition'. If and when the ‘hypothetical proposition’ is described in the “sentence pattern of function”, __FUNCTION__ *** __translate__INPUT__  __into__OUTPUT__ *;__, then, the ‘presupposition’ of the ‘hypothetical proposition’ means the proposition in the field below ‘__translate__INPUT__’, i.e. the ‘presupposition’ is the ‘****’.

Lexical Definition of ‘Consequence’ of a ‘Hypothetical Proposition’ Described in “Sentence Pattern of Function”

And if and when the ‘hypothetical proposition’ is described in “sentence pattern of function”, __FUNCTION__ *** __translate__INPUT__  __into__OUTPUT__ *;__, then, the ‘consequence’ of the ‘hypothetical proposition’ means the proposition in the field below ‘into__OUTPUT__’ i.e. the ‘consequence’ is the ‘***’.

This “sentence pattern of function” can be used to represent the key of a data used as a rule in an object-oriented knowledge base system disclosed in the present invention.

If one wants to use systematically a sentence in “sentence pattern of function” as a rule in an object-oriented knowledge base system disclosed in the present invention, it is recommended that the maker of the contents of the knowledge base should use as higher class ‘names-of-classification-items’ as possible as the verbs in ‘***’, ‘’, and/or ‘*’. And it is recommended that he should use as broader ‘descriptors’ as possible, as ‘subject-words (S)’, ‘object-words (O)’, and/or ‘indirect-object-word (I.O)’ in ‘***’, ‘’, and/or ‘*’. And it is recommended that he should use as narrower ‘descriptors’ as possible, as ‘complement-words (C)’ in ‘***’, ‘’ and/or ‘*’ of, __FUNCTION__ *** __translate__INPUT__  __into__ OUTPUT__ *;__, If the maker of the contents of the knowledge base uses the highest ‘names-of-classification-items’ and/or broadest ‘descriptors’ as possible, then, the power of expression of the rule described in a sentence in “sentence pattern of function” becomes general and universal.

And if and when a user of the knowledge base system wants to apply such a general and universal rule described by using a sentence in “sentence pattern of function” to a practical and specific case, it is recommended that the systematic hierarchical structures of ‘classification table’ and/or ‘ideal thesaurus’ should be made full use of by the user of the knowledge base system to retrieve a general and universal rule which is applicable to his own case. In other words, the user has only to consult the ‘classification tables’ and/or the ‘ideal thesauruses’ to see whether higher class and/or lower class ‘names-of-classification-items’, and broader and/or narrower ‘descriptors’ are used in a rule stored in an object-oriented knowledge base system disclosed in the present invention to retrieve useful rules. The detail of this issue will be given in the section of “§3.3.11. Algorithm of Association and Reasoning (i.e. algorithm of ‘Inference mechanism’) of an Object-oriented knowledge base system disclosed in the Present invention”.

3.3.10. “Sentence Pattern of Instances of Solving Problems”

Lexical Definition of “Sentences that Store Data About Instances of Solving Problems”

A sentence describing important parts of the log recorded during a problem is solved on a knowledge base system, is a “sentence which stores data about instances of solving problems”

Lexical Definition of “Sentence Pattern of Instances of Solving Problems”

The data structure of “sentence pattern of instances of solving problems” is defined using quasi-C code as follows:

__SENTENCE__PATTERN__OF__INSTANCE__of__SOLVING__

__PRESENT__IDENTIFICATION__NUMBER__ the identification number of the present key in the “sentence pattern of instances of solving problems”.

__PREVIOUS__IDENTIFICATION__NUMBER__ the identification number of the large-grained less strict instances of solving problems preceding the present one if any __SOLVED__PROPOSITION__ proved proposition __ORIGINAL__TITLE__ original title given by the man who solved this problem __ENGLISH__TITLE__ English title translated from the original one __ORIGINAL__ABSTRACT__ an outline of the present key described using sentences in “sentence pattern of instances of solving problems”

__ENGLISH__ABSTRACT__ an outline translated into English

__AUTHOR__ name of the man who solved the problem and his affiliation

__COPYRIGHT__ copyright and its owner if it exists

__PATENT__ patent, its type, and its owner

__NAME__OF__LITERATURE__ name of literature of the record of the present key

__ISBN__OF__LITERATURE__ ISBN of the literature

__VOLUME__OF__LITERATURE__ volume of the literature

__NUMBER__OF__LITERATURE__ No. of the literature

__YEAR__OF__PUBLICATION__OF__LITERATURE__ year of publication of the literature

__PAGR__OF__LITERATURE__ page of the literature at which the record is present

__NAME__OF__CONFERENCE__ name of the conference at which the record is presented __NUMBER__OF__CONFERENCE__ serial number of the conference __PLACE__OF__CONFERENCE__ place at which the conference was held __LANGUAGE__of__THIS__KEY__ language in which this key is written __PRINCIPAL__ITEMofCLASSIFICATION__ principal ‘names-of-classification-items’ of this key __PRINCIPAL__Noun__KW principal ‘descriptors’ of this key __ACCURACY__of__THIS__INSTANCE__of__SOLVING__ the degree of strictness of the present instance of solving

```
__main( )__
{
    the first step of opportunistic reasoning
    second step of opportunistic reasoning
    .
    .
    .
    i'th step of opportunistic reasoning
    .
    .
    .
    last step of opportunistic reasoning
}
```

where, the data structure of the i’th step of opportunistic reasoning is given by, __A__STEP__of__OPPORTUNISTIC__REASONING__

__DIRECTION__=__ forward or backward?

__PROVED__HYPOTHETICAL__PROPOSITION__=__ hypothetical proposition proved in the present step __USED__HYPOTHETICAL__PROPOSITION__=__ hypothetical proposition used in reasoning of the present step __USED__Noun__KW__=__ 'descriptors' used in the retrieval of hypothetical proposition used in reasoning of the present step __USED__ITEMofCLASSIFICATION__=__ 'names-of-classification-items' used in the retrieval of hypothetical proposition used in reasoning of the present step Lexical Definition of 'Means for Storing Data About Instances of Solving Problems'

Sentence in "sentence pattern of instances of solving problems" and/or something that stores the information of it, is a 'means for storing data about instances of solving problems'.

It is recommended that keys in "sentence pattern of instances of solving problems" should be registered in an object-oriented knowledge base system disclosed in the present invention only when the problem has been proved successfully regardless of the size of the 'grain' of the rules used in solving problems, therefore regardless of the strictness of the rules used in solving problems.

If the i'th step of opportunistic reasoning is less strict, it is recommended that all the steps should be proved again strictly by more strict opportunistic reasoning, and that only the result should be recorded as the key described in the "sentence pattern of instances of solving problems".

It is recommended that the field of __PREVIOUS__IDENTIFICATION__NUMBER__ of another key in the "sentence pattern of instances of solving problems" should be filled with the identification number that was filled with in the field of __PRESENT__IDENTIFICATION__NUMBER__ of the original key before the reconsideration.

BEST MODE FOR CARRYING OUT THE INVENTION

3.3.11. Algorithm of Association and Reasoning (i.e. Algorithm of 'Inference Mechanism') of an Object-Oriented Knowledge Base System Disclosed in the Present Invention

3.3.11.1. Overview of the Algorithm for 'Inference Mechanism'

Lexical Definition of an inference mechanism used in an object-oriented knowledge base system disclosed in the present invention The mechanism with which association and/or reasoning is carried out to prove a theorem, in an object-oriented knowledge base system disclosed in the present invention, is an inference mechanism used in the object-oriented knowledge base system disclosed in the present invention.

Lexical Definition of 'Means for Carrying out an Inference'

Sentence describing "an inference mechanism used in an object-oriented knowledge base system disclosed in the present invention" and/or something that stores the information of it is a 'means for carrying out an inference'.

As mentioned before, the style of the reasoning of the 'means for carrying out an inference' is an opportunistic reasoning. Each step of opportunistic reasoning is either forward reasoning and/or backward reasoning (See FIG. 9).

The main routine of the quasi-C code representing a recommended algorithm of association and reasoning (i.e. a recommended algorithm of inference mechanism) used in an object-oriented knowledge base system disclosed in the present invention, is described in Formula. 2, in which main part of an opportunistic reasoning is implemented (See FIG. 9 and the explanation which has been given thereof in the present invention). And the subroutine used in the case when a forward reasoning is to be carried out as a step of the opportunistic reasoning, is described in Formula. 3, using a quasi-C code. And the subroutine used in the case when a backward reasoning is to be carrying out as a step of the opportunistic reasoning, is described in Formula. 4, using a quasi-C code.

This 'means for carrying out an inference' is a kind of means for 'theorem proving'. In other words, for example, the 'means for carrying out an inference' is used as a tool to give an answer to a question asked by users of the system (See FIG. 1). And the body of the information of the 'means for carrying out an inference' is stored in a 'means for storing knowledge base system' (See FIG. 1), (for example, is stored in a 'hard disk' of a computer). And as the platform machine on which the 'means for carrying out an inference' works, what I call 'digital computing system', (See FIG. 1) to be defined just below, is used. This 'digital computing system' (for example, a computer) is operated by a man and/or by plurality of other 'digital computing systems'. During this operation, an 'input device' (for example, a 'key board') and/or an 'output device' (for example, a 'display') is used as an interface. For example, if and when a man uses an object-oriented knowledge base system disclosed in the present invention by operating the 'digital computing system', then he will input the question via the 'input device' to the 'digital computing system' first, and the 'digital computing system' finally gives the answer to the man via the 'output device'. Wherein, an 'object-oriented knowledge base', which is also stored on a 'means for storing knowledge base system', provides 'rules' and/or 'facts', etc., which are used as a knowledge on the basis of which the 'means for carrying out an inference' makes a reasoning, on the 'digital computing system'. In this case, the reasoning is carried out according to the instructions given via by the user and/or by the plurality of other 'digital computing systems'. This situation is schematically shown in FIG. 1.

Lexical Definition of 'Digital Computing System'

A 'digital computing system' is a system that is based on is a digital computing technology. Strictly speaking, a system based on a wired logic control as well as a system that uses a CPU (Central Processing Unit) and micro programs, is a 'digital computing system'. Hybrid of them is also a 'digital computing system'. For example, a computer, such as a personal computer, a work station, and a mainframe computer, is kid of a 'digital computing system'. And a home electric appliance with digital technologies is a kind of a 'digital computing system'. But in the present invention, I regard a 'digital computing system', such as a system based on a wired logic control and/or well as a home electric appliance with digital technologies, as a kind of computer.

This definition is schematically shown in FIG. 22.

As computers on which the knowledge base system disclosed in the present invention is to be embodied, I recommend ones which supports operation systems such as Windows 95, Windows NT, UNIX, and, Linux. The algorithm of the present knowledge base system is essentially very slim, and can be implemented on a usual commercially available personal computers including pc-at(dos/v) machines, if the size of the knowledge base is small.

As such 'digital computing system', PC's (Personal computers) with such specification, for example, can be used;

main processor: Pentium© processor 100 MHz, VRT.

memory: 40 MB.

ROM: 128 KB flush ROM, plug and play 1.0a,APM1.1.

display: external color CRT 800×600 dots full color.

video RAM: 2 MB key board: external 88 keys.

floppy disk drive:

hard disk drive:

CD-ROM drive:

serial interface: 1 channel (RS-232C, 9 pin D-sub), parallel interface: 1 channel (Centronics, 25 pin D-sub, ECP compatible)

CRT interface: 1 channel (15 pins D-sub)

PS/2 interface: 1 channel head phone output interface: 1 channel, stereo mini jack)

audio input interface: 1 channel, stereo mini jack)

microphone input interface: 1 channel, monoral mini jack)

working environment: 5–35° C., humidity 30–80%

OS: Microsoft©Windows©95

Utility software: Microsoft©Word 2000, Microsoft©Excel95

It is recommended that a user of the present system and/or a knowledge engineer for the present system should work at a desk on well fitted to their body. It is recommended that the center of the display exist about 35 cm above the top of the desk on which they works (i.e. 7.0 cm lower than the position of the eyes of them). And the distance display between the eyes of them and the display is recommended to be set about 40 cm or more. When they operate a computer, they should relax their necks and/or their shoulders in a minute every twenty minites by a streatching and moving joints of necks, shoulders, elbows, backs, nees, and/or fingers. It is recommended that space that is wide enough for such exercises to be carried out by them should be given around them. It is recommended that they should rest their VDT (video display terminal) work for about 10 to 15 minutes every one hour. A light source of the room should not be in direct range of their vison. In this 10 to 15 minutes, it is recommended that they should move the whole of their body, for example by repeating sitting down and standing up a few times, for them to get a good blood circulation. It is recommended that the air of the room should be well conditioned, and the air condition must not abruptly stopped and/or abruptly started when they are in the room. The air of the room should be well ventilated and circulated. It is recommended that the humidity of the room should be kept around 60%. It is recommended that video display terminal disorder should be prevented.

The key board and mouse of such PC's can be used as an 'input device'. The display of such PC's can be used as an 'output device'. DynaBook Satellite Pro 430 is with Pentium processor (120 MHz) as the CPU, with the memory up to 48 MB, with hard disk drive 1.35 GB. Of course, such PC's with equivalent spec and/or superior spec, provided by COMPAC, GATEWAW, IBM, HITACHI, etc. are OK. A workstations and/or host computers may be used to embody an object oriented knowledge base system of the present invention. server A home electric appliance with digital technologies is a kind of a 'digital computing system'. An object-oriented knowledge base system disclosed in the present invention may be used in home electric appliances with digital technologies.

As the computer program with which the program for an object-oriented knowledge base system disclosed in the present invention is coded, I recommend the C languages and/or the C++ language. Machine language is recommended to be used to store an object-oriented knowledge base system disclosed in the present invention. Of course, FORTRAN or machine language may be used. When these languages are to be used on Windows 95 and/or Windows NT, I recommend as a development system and tools, for example, the Microsoft Visual C++ Standard Edition (Version 4.0), which covers not only command line C and/or C++ programming, but also Windows programming using C, and/or C++. Of course it is possible to implement the algorithm of association and reasoning disclosed in the present invention either only by using command line C and/or C++ languages and/or by using Windows programming using C, and/or C++. It is recommended that one should read ◎"Programming Windows 95", when a beginner wants to code a Windows program. The algorithm and/or data used in an object-oriented knowledge base system of disclosed in the present invention, may be stored in a ASIC.

◎"Programming Windows 95 with MFC", and ◎"Advanced Windows (Third Edition)" are a textbook recommended to be read, if one wants to know how to use the Microsoft Visual C++ Standard Edition (Version 4.0).

3.3.11.2. Main Routine 3.3.11.2.1. Data Input

In the main routine, at first, the system lets the user of an object-oriented knowledge base system disclosed in the present invention input the proposition to be finally proven by using the knowledge base system (i.e. input the question). This corresponds to the sentence in Formula. 2, Let_the__User__of__the__system__Input__ the__Proposition__to__be__finally__proven__by__using__the__system and__Copy__and__Paste__it__on__

PropositionToBeFinallyProvenByUsingTheSystemMatrix__( )__;

Lexical Definition of an 'input device'

A device via which users of a 'digital computing system' and/or other 'digital computing systems' transmit signals and/or messages to the 'digital computing system' is an 'input device'. For example, a key board, microphone, a pointing device such as a mouse, and, a image scanner, etc. may be used as an 'input device' when a man uses the 'digital computing system'. Devices for input-output interfaces, such as RS-232C, SCSI, USB, Centronics interface, modem, LAN interface board (i.e. Network Interface Card), and/or other hardware compatible with protocols for the internet, may be used as a 'input device', when other 'digital computing systems' use the 'digital computing systems'. When the proposition to be finally proven by using an object-oriented knowledge base system disclosed in the present invention, a computer on which the object-oriented knowledge base system is installed, may be used either by a man, and/or by other 'digital computing system', such as other personal computers connected via the internet and/or via a LAN (Local Aria Network) to the computer whose object-oriented knowledge base system receives information. It is recommended that in this case, the whole of and/or a part of an object-oriented knowledge base system disclosed in the present invention should be installed also on the other digital computer.

Lexical Definition of an 'output device'

A device via which users of a 'digital computing system' and/or other 'digital computing systems' receive signals and/or messages from the 'digital computing system' is an 'output device'. For example, a display, and, a speaker, etc. may be used as an 'output device', when a man uses the 'digital computing system'. Devices for input-output interfaces, such as RS-232C, SCSI, USB, Centronics interface, modem, LAN interface board (i.e. Network Interface Card), and/or other hardware compatible with protocols for the internet, and, etc. may be used as an 'output device' when other 'digital computing systems' use the 'digital computing systems'. When the proposition is to be finally proven by using an object-oriented knowledge base system disclosed in the present invention, a computer on which the object-oriented knowledge base system is installed, may be used either by a man, and/or by other 'digital computing system', such as other personal computers connected via the internet and/or via a LAN (Local Aria Network) to the computer whose object-oriented knowledge base system receives information. It is recommended that in this case, the whole of and/or a part of an object-oriented knowledge base system disclosed in the present invention should be installed also on the other digital computer.

In the main routine, second, if the given the proposition to be finally proven by using the object-oriented knowledge base system, is described in natural language, then, it is recommended that the proposition should be translated into a proposition described in formal data structures using data structures defined in the present invention, i.e. into a proposition described in "sentence pattern of physical and/or mathematical rules" and/or into a proposition described in "sentence pattern of function", etc. In addition, it is recommended that such a propositions in "sentence pattern of physical and/or mathematical rules" and/or "sentence pattern of function", etc., should be described in "sentence pattern of one of five basic sentence patterns of English grammar", to make it easier for the present system to recognize the 'S', 'V', 'C', 'O', 'I.O', or 'D.O' in the propositions. A knowledge engineer can make such a translation.

Lexical Definition of a knowledge engineer

In the description of the present invention, A knowledge engineer is an engineer who has the full knowledge about an object-oriented knowledge base system disclosed in the present invention.

Any person whose intelligence is as high as and/or is competitive to those of successful applicants for written examination for senior official of national public service of Japan (Jyou-kyu kokka koumuin shikenn goukakusha) has enough competence to work as a knowledge engineer.

3.3.11.2.2. Formalization of the Inputted Data

If and when the given proposition is a hypothetical proposition, then there is no problem here at the spot. If and when the given proposition is a categorical propositions, then the given proposition must be treated as a hypothetical proposition whose 'presupposition' is empty. A knowledge engineer can do such translations.

This issue corresponds to the sentence in Formula. 2,

Translate_the_Proposition_in_
PropositionToBeFinallyProven-ByUsingTheSystemMatrix
into_a_formal_sentence_which_is_described_by_using_
"sentence pattern of physical and/or mathematical rules",_or_
"sentence pattern of function",_and_
"sentence pattern of one of five basic sentence patterns of English grammar"
and_Copy_and_Paste_the_formal_sentence_on_
FormalizedPropositionToBeFinallyProvenByUsingTheSystemMatrix_( );_.

3.3.11.2.3. Step by Step Opportunistic Reasoning 3.3.11.2.3.0. Overview

Lexical Definition of Each Step of Opportunistic Reasoning

Opportunistic reasoning is usually carried out step by step. If and when the opportunistic reasoning is to be carried out in a recommended way, then, each step of opportunistic reasoning (See FIG. 9, and FIG. 11) should be carried out in an execution of the loop body of the 'while( ){}' iteration statement in Formula. 2. Here 'the loop body of the 'while( ){}' iteration statement' means the sentences (i.e. the functions) described in parentheses, '{' and '}' of 'while( ){}'. As will be understood if one watches carefully Formula. 2, either forward reasoning and/or a backward reasoning is carried out in each execution of the loop body.

Roughly speaking, in each step of opportunistic reasoning,

First, "means for getting 'rules-for-reasoning'" (See FIG. 11) is carried out to obtain 'rules' from an object-oriented knowledge base (See FIG. 1), to be used as the basis on which reasoning should be carried out.

Second, if too many 'rules-for-reasoning' are obtained by means of "means for getting 'rules-for-reasoning'", then, "means for avoiding combinatorial explosion when too many number of 'rules-for-reasoning' are retrieved" (See FIG. 11) should be carried out to prevent the puncture of processing capacity of the 'digital computing system' (See FIG. 1).

Third, if too less 'rules-for-reasoning' are obtained by means of "means for getting 'rules-for-reasoning'", and as the result, opportunistic reasoning can not be progressed any more, then, "means for making more exhaustive retrieval when too less number of rules-for-reasoning are retrieves" (See FIG. 11) should be carried out to escape from the deadlock.

Forth, a reasoning is carried out, and if and when, the final answer is not obtained in the present step of opportunistic reasoning, then, "means for determining hypothetical propositions which are to be used as the target of the next step of opportunistic reasoning" (See FIG.

11) should be carried out, as the preparation for the next step of opportunistic reasoning.

I will give below more detailed explanation for

"means for getting 'rules-for-reasoning'",

"means for avoiding combinatorial explosion when too many number of 'rules-for-reasoning' are retrieved", "means for making more exhaustive retrieval when too less number of rules-for-reasoning are retrieves", and, "means for determining hypothetical propositions which are to be used as the target of the next step of opportunistic reasoning"

by using FIG. 11, as follows:

Before all, it should be noted that, as mentioned before, the aim of each step of opportunistic reasoning is to prove a 'hypothetical proposition which is the target of the present step of opportunistic reasoning' (See FIG. 10).

Lexical Definition of the 'Hypothetical Proposition Which is the Target of the Present Step of Opportunistic Reasoning' Which is Dealt with when the 'Present Step' Equals to the 'First Execution of the Loop Body in the 'While( ){}' Iteration Statement'

Generally speaking, a 'hypothetical proposition that is the target of the present step of opportunistic reasoning' is a hypothetical proposition that is tried to be logically proved in the present step of opportunistic reasoning. Here, I define a 'hypothetical proposition which is the target of the present step of opportunistic reasoning' which is determined, before the control of the computer rushes into the 'while( ){}' loop, and is used as the target in the first step in the 'while( ){}' loop. The proposition which is obtained by formalizing 'the formalized proposition to be finally proved using the present system', should be used as the 'hypothetical proposition which is the target of the opportunistic reasoning carried out in the first execution of the loop body in the 'while( ){}' iteration statement'. This sentence corresponds to the sentence in Formula. 2, are two recommended ways in which "means for getting 'rules-for-reasoning'" should be embodied.

One recommended way with which to carry out "means for getting 'rules-for-reasoning'", is an indirect way in which first, rules which can be possibly used as a 'rules-for-reasoning' in a step of opportunistic reasoning are retrieved from an 'object-oriented knowledge base'. And second, only just the 'rules-for-reasoning' used for the step of opportunistic reasoning are picked up from the rules which can be possibly used as a 'rules-for-reasoning'. Thus, 'rules-for-reasoning' is obtained in a indirect way. According to a lexical definition given later in the present invention, a rule which can be possibly used as a 'rules-for-reasoning' is called a "candidates of the 'rules-for-reasoning'", in the present invention.

A recommended indirect way to carry out "means for getting 'rules-for-reasoning'", comprises (See FIG. 11), 1) the first step, in which 'descriptors' to be used in the retrieval of the third step is tried to be obtained, by carrying out, "means for getting 'descriptors' that are used to make a query to get the "candidates of the 'rules-for-reasoning'"", (For detail of the first step, see "§3.3.11.2.3.1.1. Search of 'Descriptors' to be used for a "Retrieval of the 'Hypothetical propositions possibly used in Forward reasoning'"", and see "§3.3.11.2.3.2.1. Search of 'Descriptors' to be used for a "Retrieval of the 'Hypothetical propositions Possibly used in Backward reasoning'""), 2) the second step, in which 'names-of-classification-items' to be used in the retrieval of the third step is tried to be obtained, by carrying out, "means for getting 'names-of-classification-items' that are used to make a query to get the "candidates of the 'rules-for-reasoning'"", (For detail of the second step, see "§3.3.11.2.3.1.2. Search of 'Names-of-Classification-items' to be used for a "Retrieval of the 'Hypothetical propositions Possibly used in Forward reasoning'"", and see "§3.3.11.2.3.2.2. Search of 'Names-of-Classification-items' to be used for a "Retrieval of the 'Hypothetical propositions Possibly used in Backward reasoning'"")

$$'\mathrm{hypothetical\_proposition\_which\_is\_the\_target\_of\_the\_present\_step\_of\_opportunistic\_reasoning}' = \mathit{FormalizedPropositionToBeFinallyProvenByUsingTheSystemMatrix}\ \square;\ \_.$$

As will be described in the lexical definition of 'rules for reasoning' given later in the present invention, I call, a rule on the basis of which a reasoning is carried out in a step of opportunistic reasoning to prove a 'hypothetical proposition which is the target of the present step of opportunistic reasoning', a 'rule-for-reasoning'.

Lexical Definition of "Means for Getting 'Rules-for-Reasoning'"

"Means for getting 'rules-for-reasoning'" is a component of each step of opportunistic reasoning (See FIG. 11) which is carried out first in the step of opportunistic reasoning.

"Means for getting 'rules-for-reasoning'" is a tool used in 'means for carrying out an inference' (See FIG. 1) with which to retrieve 'rules-for-reasoning' from the 'rules' in an 'object-oriented knowledge base' (See FIG. 1).

Here now, let me add some explanation of "means for getting 'rules-for-reasoning'", in more detailed way: There 3) the third step, in which as the preparation for the fourth step, "retrieval of the "candidates of the 'rules-for-reasoning'"", is carried out by using the 'descriptors' obtained and the first step and the 'rules-for-reasoning' obtained in the second step (For detail of the third step, see "3.3.11.2.3.4.1.1. Retrieval of "candidates of the 'rules-for-reasoning'"", and see "3.3.11.2.3.4.2.1. Retrieval of "candidates of the 'rules-for-reasoning'""), and, 4) the fourth step, in which, "means for picking up only the 'rules-for-reasoning' from the "candidates of the 'rules-for-reasoning'"", is carried out on the basis of the output of the third step (For detail of the fourth step, see "§3.3.11.2.3.4.1.6. "Means for picking up only the 'rules-for-reasoning' from the "candidates of the 'rules-for-reasoning'"""", and see "§3.3.11.2.3.4.2.6. "Means for picking up only the 'rules-for-reasoning' from the "candidates of the 'rules-for-reasoning'"""").

The lexical definition of

"means for getting 'descriptors' that are used to make a query to get the "candidates of the 'rules-for-reasoning'"", the lexical definition of "means for getting 'names-of-classification-items' that are used to make a query to get the "candidates of the 'rules-for-reasoning'"", the lexical definition of "retrieval of the "candidates of the 'rules-for-reasoning'"", and the lexical definition of "means for picking up only the 'rules-for-reasoning' from the "candidates of the 'rules-for-reasoning'"", will be given later in the present invention.

The other recommended way with which to carry out "means for getting 'rules-for-reasoning'", is a direct way in which the 'rules-for-reasoning' used in a step of opportunistic reasoning is retrieved from an 'object-oriented knowledge base'. The procedure to carry out this direct way is what I call "means for retrieving directly the 'rules-for-reasoning'". The lexical definition of "means for retrieving directly the 'rules-for-reasoning'" will be given later in the present invention. For detail, see "§3.3.11.2.3.4.1.2. Means for Retrieving directly Hypothetical propositions to be used in forward reasoning", and see "§3.3.11.2.3.4.2.2. Means for retrieving directly Hypothetical propositions to be used in backward reasoning".

Lexical Definition of "Means for Avoiding Combinatorial Explosion When too Many Number of 'Rules-for-Reasoning' are Retrieved"

A measure to prevent the processing capacity of a 'digital computing system' (See FIG. 1) from falling into puncture when too many "candidates of the 'rules-for-reasoning'" are retrieved (i.e. when combinatorial explosion occurs) during "means for getting 'rules-for-reasoning'" is carried out (See FIG. 11), is a "means for avoiding combinatorial explosion when too many number of 'rules-for-reasoning' are retrieved".

"Means for avoiding combinatorial explosion when too many number of 'rules-for-reasoning' are retrieved" is a component of each step of opportunistic reasoning. And "means for avoiding combinatorial explosion when too many number of 'rules-for-reasoning' are retrieved" is carried out only when combinatorial explosion occurs during "means for getting 'rules-for-reasoning'" is carried out (See FIG. 11).

As recommended procedures with which "means for avoiding combinatorial explosion when too many number of 'rules-for-reasoning' are retrieved" is embodied in an object-oriented knowledge base system disclosed in the present invention, there exist three means (See FIG. 11):

1) 'Means for narrowing down the target 'descriptors" (For detail, see "§3.3.11.2.3.4.1.3. 'Means for narrowing down the target 'descriptors" and 'Means for narrowing down the target 'names-of-classification-items''", and see "§3.3.11.2.3.4.2.3. 'Means for narrowing down the target 'descriptors" and 'Means for narrowing down the target 'names-of-classification-items''"), 2) 'Means for narrowing down the target 'names-of-classification-items" (For detail, see "§3.3.11.2.3.4.1.3. 'Means for narrowing down the target 'descriptors" and 'Means for narrowing down the target 'names-of-classification-items''", and see "§3.3.11.2.3.4.2.3. 'Means for narrowing down the target 'descriptors" and 'Means for narrowing down the target 'names-of-classification-items''"), and, 3) 'Means for Fusing propositions' (For detail, see "§3.3.11.2.3.4.1.4. 'Means for Fusing propositions'", and see "§3.3.11.2.3.4.2.4. 'Means for Fusing propositions'").

The lexical definition of

'Means for narrowing down the target 'descriptors", the lexical definition of

'Means for narrowing down the target 'names-of-classification-items", and, the lexical definition of 'Means for Fusing propositions', have already been given in the present invention.

Lexical Definition of "Means for Making More Exhaustive Retrieval When too Less Number of Rules-for-Reasoning are Retrieves"

A measure to prevent the inference from falling into a deadlock after too less number of 'rules-for-reasoning' are retrieved in a step of opportunistic reasoning (See FIG. 11) is a "means for making more exhaustive retrieval when too less number of rules-for-reasoning are retrieves".

"Means for making more exhaustive retrieval when too less number of 'rules-for-reasoning' are retrieves" is a component of each step of opportunistic reasoning which is carried out only when the inference falls into a deadlock, and no step of opportunistic reasoning can not be taken any more (See FIG. 11).

As recommended procedures with which "means for making more exhaustive retrieval when too less number of rules-for-reasoning are retrieves" is embodied in an object-oriented knowledge base system disclosed in the present invention, there exist three means (See FIG. 11):

1) 'means for broadening out the target 'descriptors" (For detail, see "§3.3.11.2.3.4.1.5. 'Means for broadening out the target 'descriptors" and 'Means for broadening out the target 'names-of-classification-items''", and see "§3.3.11.2.3.4.2.5. 'Means for broadening out the target 'descriptors" and 'Means for broadening out the target 'names-of-classification-items''") and 2) 'means for broadening out the target 'names-of-classification-items" (For detail, see "§3.3.11.2.3.4.1.5. 'Means for broadening out the target 'descriptors" and 'Means for broadening out the target 'names-of-classification-items''", and see "§3.3.11.2.3.4.2.5. 'Means for broadening out the target 'descriptors" and 'Means for broadening out the target 'names-of-classification-items''").

The lexical definition of

'Means for narrowing down the target 'descriptors", and, the lexical definition of 'Means for narrowing down the target 'names-of-classification-items", have already been given in the present invention.

At the end of each step of opportunistic reasoning, reasoning is carried out in which 'rules-for-reasoning' is used to try to prove logically the 'hypothetical proposition that is the target of the present step of opportunistic reasoning'.

If and when this trial has completed and the 'hypothetical proposition that is the target of the present step of opportunistic reasoning' is proved perfectly in the present step of opportunistic reasoning, then, the whole inference is judged to be completed in success. Else if this trial has not completed perfectly, next step of opportunistic reasoning should be carried out to try to complete the inference. In any case, 'hypothetical propositions which are the target of the next step of opportunistic reasoning' should be determined here. If the 'hypothetical propositions which are the target of the next step of opportunistic reasoning' is a trivial proposition, then, the trial is judged to have been completed and the 'hypothetical proposition that is the target of the present step of opportunistic reasoning' is judged to be proved perfectly in the present step of opportunistic reasoning.

The procedure to carry out the process described above is the "means for determining hypothetical propositions which are to be used as the target of the next step of opportunistic reasoning" (See FIG. 11). The lexical definition of "means for determining hypothetical propositions which are to be used as the target of the next step of opportunistic reasoning" will be given later in the present invention. For detail of "means for determining hypothetical propositions which are to be used as the target of the next step of opportunistic reasoning", see "§3.3.11.2.3.4.1.7. @[algorithm for determining hypothetical proposition which is to be used as the target of the next step of opportunistic reasoning] (Part 1: in the case of forward reasoning)" and see "§3.3.11.2.3.4.2.7. @[algorithm for determining the hypothetical proposition which is to be used as the target of the next step of opportunistic reasoning] (Part 2: in the case of backward reasoning)".

Thus far, I have given a rough explanation of components of 'each step of opportunistic reasoning' by using FIG. 11. Now, I will give some additional explanation of some features which appear in FIG. 11, step by step.

3.3.11.2.3.1. Preparation for a "Retrieval of the 'Hypothetical Propositions Possibly Used in Forward Reasoning"

Lexical Definition of the 'hypothetical proposition which is the target of the present step of opportunistic reasoning' which is dealt with when the 'present step' equals to the "n'th execution of the loop body in the 'while( ){}' iteration statement'

Generally speaking, a 'hypothetical proposition which is the target of the present step of opportunistic reasoning' is a hypothetical proposition which is tried to be logically proved in the present step of opportunistic reasoning. Here, I define one that is dealt with in the n'th step. At the beginning of the n'th execution of the loop body in the 'while( ){}' iteration statement, we define, 'hypothetical_proposition_
which_is_the_target_of_the_present_step_of_
opportunistic_reasoning'
of the n'th execution of the loop body in the 'while( ){}' iteration statement, by an equation,
'hypothetical_proposition_
which_is_the_target_of_the_present_step_of_
opportunistic_reasoning' of the present step of opportunistic reasoning
=
one of the
'HypotheticalPropositionsWhichAreToBeUsedAs_
_TheTargetOfTheNextStepOfOpportunisticRasoning[]',
which was determined in the (n−1)'th execution of the loop body in the 'while( ){}' iteration statement in the function in Formula. 2;_, In the (n−1)'th execution of the loop body in the 'while( ){}' iteration statement in the function in Formula. 2, i.e. in the (n−1)'th step of opportunistic reasoning,
HypotheticalPropositionsWhichAreToBeUsedAs_
_TheTargetOfTheNextStepOfOpportunisticRasoning[]
are determined by using the function,
Carry_out_forward_reasoning_and_
Determine_the_hypothetical_propositions_which_
is_to_be_
the_target_of_the_next_step_of_opportunistic_
reasoning(
HypotheticalPropositionsWhichAreToBeUsedAs_
_TheTargetOfTheNextStepOfOpportunistic
Rasoning[];_,
the detail of which is given in Formula. 3
and/or
in the function in Formula. 2,
Carry_out_backward_reasoning_and_
Determine_the_hypothetical_propositions_which_
is_to_be_the_
target_of_the_next_step_of_opportunistic_
reasoning(
HypotheticalPropositionsWhichAreToBeUsedAs_
_TheTargetOfTheNextStepOfOpportunistic
Rasoning[];_.
the detail of which is given in Formula. 4.

If and when more than two 'Hypothetical propositions that are to be used as the target of the next step of opportunistic reasoning' exist, then,
one of them after another should be used as a
'hypothetical_proposition_
which_is_the_target_of_the_present_step_of_
opportunistic_reasoning'
until all of the 'Hypothetical propositions that are to be used as the target of the next step of opportunistic reasoning' are exhausted, when only one digital computer is used.

Part of and/or all of the 'Hypothetical propositions that are to be used as the target of the next step of opportunistic reasoning' may be transmitted as an information to other computers connected with the present computer via the internet and/or via a LAN, etc. And each of these computers may be used to prove a 'hypothetical propositions that are to be used as the target of the next step of opportunistic reasoning' which the computer received, by using an object-oriented knowledge base system disclosed in the present invention installed on the computer.

Of course,
'hypothetical propositions'
which_are_the_target_of_the_present_step_of_
opportunistic_reasoning'
may be processed by each of the parallel processors of a multi processor digital computers.

3.3.11.2.3.1.1. Search of 'Descriptors' to be Used for a "Retrieval of the 'Hypothetical Propositions Possibly Used in Forward Reasoning'"

3.3.11.2.3.1.1.1. Overview

In the present execution of the loop body in the 'while( ){}' iteration statement, first, it is recommended that one should try to search 'descriptors' which characterize well the 'presupposition' of the 'hypothetical_proposition_ which_is_the_target_of_the_present_step_of_opportunistic_reasoning'.

I call such 'descriptors' a usable 'descriptor'.

As will be shown later in the present invention, thus introduced usable 'descriptors' are a 'descriptor' which is to be used to retrieve the "candidates of the 'rules-for-reasoning'" used in a forward reasoning.

This means that forward reasoning is tried to be carried out first anyway, here. Backward reasoning is carried out only after it is found that a forward reasoning is difficult to be carried out. This instruction corresponds to a sentence in the quasi-C function in Formula. 2, Search_usable_'descriptors'_which_represent_suitably_the_'presupposition'_ of_the_

'hypothetical_proposition_ which_is_the_target_of_the_present_step_of_opportunistic_reasoning'

_by_using_

@[algorithm of making a list of 'descriptors' ranked in order of hit frequency]_( );_.

More detailed explanation of this sentence will be given just below.

It is not essential that forward reasoning is tried to be carried out first. Backward reasoning, instead of forward reasoning, may be of course tried first. But in the present explanation, the case in which forward reasoning is carried out is given.

First, a user of the system is recommended to search 'descriptors' that characterize well the 'presupposition' of the 'hypothetical_proposion_ which_is_the_target_of_the_present_step_of_opportunistic_reasoning', by using the object-oriented knowledge base system.

For a user of the system to make such a search, it is recommended that he should use @[algorithm of making a list of 'descriptors' ranked in order of hit frequency] on the basis of natural words used in the 'presupposition'. In other words, it is recommended that a user of the system to make such a search should make a list of the 'descriptors' that are associated with natural words which characterizes the 'presupposition' of the 'hypothetical_proposition_ which_is_the_target_of_the_present_step_of_opportunistic_reasoning', by using

"means for making a list of 'descriptors' ranked in order of hit frequency" (See FIG. 13).

And it is recommended that, as the basis of data on which

"means for making a list of 'descriptors' ranked in order of hit frequency"

is carried out, keys described using 'means for storing data providing the ability of association', and/or keys described using 'means for storing the list of lexical meanings of a natural word' should be mainly used. Of course, other keys in the object-oriented knowledge base also may be used (See FIG. 13).

See Formula. 7 for a schematic quasi-C code as an example of embodiment of @[algorithm of making a list of 'descriptors' ranked in order of hit frequency].

And if the user of the system finds some usable 'descriptors' out of the list, then, it is recommended that the user of the system should optimize such usable 'descriptors' by using the object-oriented knowledge base system of the present invention.

Here, 'usable' means to be usable to characterize well the contents of the 'presupposition' of the hypothetical_proposition_ which_is_the_target_of_the_present_step_of_opportunistic_reasoning'.

The way of the optimization depends whether the user of the system is willing to make a concentrated "Retrieval of the 'hypothetical propositions to be used in forward reasoning'" and/or willing to make an exhaustive "retrieval of the 'hypothetical propositions to be used in forward reasoning'".

This situation corresponds to a sentence in the quasi-C function in Formula. 2,

```
if(some usable 'descriptors' are retrieved)
{
    if(concentrated retrieval is to be carried out)
    {
        Optimize_usable_'descriptors'_for_concentrated_
        "retrieval of the 'hypothetical propositions possibly used in
        forward reasoning'"_by_using_'ideal_thesaurus'( ) ;_
        confirming_the_optimized_'descriptors'_
        by_using_keys_and_records_of_the_corresponding_data_
        if_necessary ( ) ; _
    }
    else if(exhaustive retrieval is to be carried out)
    {
        Optimize_usable_'descriptors'_for_exhaustive_
        "retrieval of the 'hypothetical propositions to be used in forward
        reasoning'"_
        by_using_'ideal_thesaurus'( ) ;_
        confirming_the_optimized_'descriptors'_
        by_using_keys_and_records_of_the_corresponding_data_
        if_necessary ( ) ; _
```

Here, I give a lexical definition of "means for getting 'descriptors' that are used to make a query to get the "candidates of the 'rules-for-reasoning'"".

It should be noted that how a

"means for getting 'descriptors' that are used to make a query to get the "candidates of the 'rules-for-reasoning'""

is used in each step of opportunistic reasoning has already explained in "§3.3.11.2.3.0. Overview".

Lexical Definition of "Means for Getting 'Descriptors' that are Used to Make a Query to get the "Candidates of the 'Rules-for-Reasoning'"" (Part 1. In the Case of Forward Reasoning The procedure described by the sentence just mentioned above, in the quasi-C function in Formula. 2,

```
Search__usable__'descriptors'__which__represent__suitably__the__
'presupposition'__of__the__
'hypothetical__proposition__
which__is__the__target__of__the__present__step__of__opportunistic__
reasoning'___by__using__
@[algorithm of making a list of 'descriptors' ranked in order of hit
frequency]__( ) ;__
if(some usable 'descriptors' are retrieved)
{
    if(concentrated retrieval is to be carried out)
    {
        Optimize__usable__'descriptors'__for__concentrated__
        "retrieval of the 'hypothetical propositions possibly used in
        forward reasoning'"__by__using__'ideal__thesaurus'( ) ;__
        confirming__the__optimized__'descriptors'__
        by__using__keys__and__records__of__the__corresponding__data__
        if__necessary ( ) ; __
    }
    else if(exhaustive retrieval is to be carried out)
    {
        Optimize__usable__'descriptors'__for__exhaustive__
        "retrieval of the 'hypothetical propositions to be used in forward
        reasoning'"__
        by__using__'ideal__thesaurus'( ) ;__
        confirming__the__optimized__'descriptors'__
        by__using__keys__and__records__of__the__corresponding__data__
        if__necessary ( ) ; __
```

is a recommended "means for getting 'descriptors' that are to be used to make a query to get the "candidates of the 'rules-for-reasoning'"", in the case of forward reasoning.

The lexical definition of 'descriptors' that are used to make a query to get the "candidates of the 'rules-for-reasoning'" (part 1. In the case of forward reasoning), will be given later in the present invention.

The recommended constitution how "means for getting 'descriptors' that are used to make a query to get the "candidates of the 'rules-for-reasoning'"" is embodied, is schematically shown in FIG. 13.

3.3.11.2.3.1.1.2. Search of 'Descriptors' to be Used for a Concentrated "Retrieval of the 'Hypothetical Propositions Possibly Used in Forward Reasoning'"

First, I give an explanation about the sentence in Formula. 2, which I have shown just above,

```
if(some usable 'descriptors' are retrieved)
{
    if(concentrated retrieval is to be carried out)
    {
        Optimize__usable__'descriptors'__for__concentrated__
        "retrieval of the 'hypothetical propositions possibly used in
        forward
        reasoning'"__by__using__'ideal__thesaurus'( ) ;__.
```

That is, if the user of the system is willing to make a concentrated "retrieval of the 'hypothetical propositions to be used in forward reasoning'", then, it is recommended that he should search as narrower 'descriptors' as possible that represents the most precisely and specifically the 'subject-word (S)', 'object-word (O)', 'indirect-object-word (I.O)', and/or, 'direct-object-word (D.O)' of the 'presupposition' of the 'hypothetical__proposition__
which__is__the__target__of__the__present__step__of__opportunistic__reasoning', and that he should search as narrower 'descriptors' as possible that represents the 'complement-word (C)' of the 'presupposition' of the 'hypothetical__proposition__
which__is__the__target__of__the__present__step__of__opportunistic__reasoning'.

In ideal cases when the maker of the contents has already assigned the most specific 'descriptors' to the 'presupposition', the user of the system, of course, need not have to come again after the maker of the system.

For such optimizations, it is recommended that the user of the system should use 'ideal thesaurus'; That is, if the user of the system is wiling to make a concentrated "retrieval of the 'hypothetical propositions to be used in forward reasoning'", then, it is recommended that he should search 'descriptors' as narrow and/or broader as possible which are not only usable but also narrower than the usable 'descriptors', in the 'ideal thesaurus'. In this case, it is recommended that he should use a computer flexibly to search and list 'descriptors' that are narrower and/or broader than the usable 'descriptors'. A quasi-C code which outlines the procedure to search and list the 'descriptors' that are narrower (by one rank) than a 'descriptor' is shown in Formula. 13. It is recommended that the user of the system should use flexibly the procedure which is outlined as a quasi-C code in Formula. 13.

As an example of such a flexible use, the procedure which is outlined as a quasi-C code in Formula. 13 may be used recursively and completely, by using the usable 'descriptors' as the original seeds. That is, one may regard all the usable 'descriptors' included in the list of the 'descriptors' that are narrower (by one rank) than a seed 'descriptor', as another seed 'descriptor'. If this procedure is continued until no usable narrower 'descriptor' can be listed any more, then, as the result, all the usable 'descriptors' that are narrower than the usable 'descriptors' can be obtained.

A quasi-C code which outlines the procedure to search and list the 'descriptors' that are broader (by one rank) than a 'descriptor' is shown in Formula. 10. It is recommended that the user of the system should use flexibly the procedure which is outlined as a quasi-C code in Formula. 10.

As an example of such a flexible use, the procedure which is outlined as a quasi-C code in Formula. 10 may be used recursively and completely, by using the usable 'descriptors' as the original seeds. That is, one may regard all the usable 'descriptors' included in the list of the 'descriptors' that are broader (by one rank) than a seed 'descriptor', as another seed 'descriptor'. If this procedure is continued until no usable broader 'descriptor' can not be listed any more, then, as the result, all the usable 'descriptors' that are broader than the usable 'descriptors' can be obtained.

If the user of the system is going to make a strict "retrieval of the 'hypothetical propositions to be used in forward reasoning'", it is recommended that he should confirm the usableness (i.e. to be usable to characterize well the contents of the 'presupposition' of the 'hypothetical__proposition__
which__is__the__target__of__the__present__step__of__opportunistic__reasoning'), of the 'descriptors' thus obtained by watching the keys and the records that are associated with the 'descriptors'. If the user of the system contrives his original 'hypothetical proposition' in this stage or other, then, of course, he may provide his original 'hypothetical proposition' as a knowledge to be used for the system's inference during his own operation. It is recommended that a knowledge engineer should judge such a 'hypothetical proposition' whether to be of universal use and/or to be only of special use.

This procedure corresponds to a sentence in the quasi-C function in Formula. 2, which I have mentioned just above,

```
     confirming_the_optimized_'descriptors'_
     by_using_keys_and_records_of_the_corresponding_data_
     if_necessary ( ) ; _
}.
```

3.3.11.2.3.1.1.3. Search of 'Descriptors' to be used for a Exhaustive "Retrieval of the 'Hypothetical Propositions Possibly Used in Forward Reasoning'"

Second, I give an explanation about the sentence in Formula. 2, which I have shown just above,

```
else if(exhaustive retrieval is to be carried out)
{
     Optimize_usable_'descriptors'_for_exhaustive_
     "retrieval of the 'hypothetical propositions to be used in forward
     reasoning'"_
     by_using_'ideal thesaurus'( ) ;_.
```

That is, if the user of the system is willing to make a exhaustive "retrieval of the 'hypothetical propositions to be used in forward reasoning'", then, it is recommended that he should search as broader 'descriptors' as possible that represent most universally the 'subject-word (S)', 'object-word (O)', 'indirect-object-word (I.O)', and/or 'direct-object-word (D.O)' of the 'presupposition' of the 'hypothetical_proposition_ which_is_the_target_of_the_present_step_of_opportunistic_reasoning', and that he should search as narrower 'descriptors' as possible that represent most universally the 'complement-word (C)' of the 'presupposition' of the 'hypothetical_proposition_ which_is_the_target_of_the_present_step_of_opportunistic_reasoning'.

For such optimizations, it is recommended that the user of the system should use 'ideal thesaurus'; That is, if the user of the system is wiling to make an exhaustive "retrieval of the 'hypothetical propositions to be used in forward reasoning'", then, it is recommended that he should search as broad and/or narrow as possible 'descriptors' of the usable 'descriptors', from the 'ideal thesaurus'. In this case, it is recommended that he should use a computer flexibly to search and list 'descriptors' that are narrower and/or broader than the usable 'descriptors'. The way in which a computer is used flexibly to search and list 'descriptors' that are narrower and/or broader than the usable 'descriptors' has already described in the section of"§3.3.11.2.3.1.1.2. Search of 'Descriptors' to be used for a Concentrated "Retrieval of the 'Hypothetical propositions possibly used in Forward Reasoning'"".

If the user of the system is going to make a strict "retrieval of the 'hypothetical propositions to be used in forward reasoning'", it is recommended that he should confirm the suitableness of the 'descriptors' thus obtained by watching the keys and the records that are associated with the 'descriptors'. If the user of the system contrives his original 'hypothetical proposition' in this stage, then of course, he may provide his original 'hypothetical proposition' as a knowledge to be used for the system's inference during his own operation. It is recommended in this case, too, that a knowledge engineer should judge such a 'hypothetical proposition' whether to be of universal use and/or to be only of special use.

This procedure corresponds to a sentence in the quasi-C function in Formula. 2, which I have mentioned just above,

```
          confirming_the_optimized_'descriptors'_
          by_using_keys_and_records_of_the_corresponding_data_
          if_necessary ( ) ; _
     }
}.
```

In some case in which no appropriate 'descriptors' are found, it is recommended that the user of the system should find and use 'next-best-natural-nouns' instead of 'descriptors' in the "retrieval of the 'hypothetical propositions to be used in forward reasoning'" of the present execution of the loop body in the 'while( ){}' iteration statement.

3.3.11.2.3.1.2. Search of 'Names-of-Classification-Items' to be Used for a "Retrieval of the 'Hypothetical Propositions Possibly Used in Forward Reasoning'"

3.3.11.2.3.1.2.1. Overview

In the present execution of the loop body in the 'while( ){}' iteration statement, second, it is recommended that one should try to search 'names-of-classification-items' which characterize well the 'presupposition' of the 'hypothetical_proposition_ which_is_the_target_of_the_present_step_of_opportunistic_reasoning'.

As will be shown later in the present invention, thus introduced usable 'names-of-classification-items' are a 'name-of-classification-item' which is to be used in the case of forward reasoning to retrieve the "candidates of the 'rules-for-reasoning'". As mentioned before, this means that forward reasoning is tried to be carried out first anyway. Backward reasoning is carried out only after it is found that a forward reasoning is difficult to be carried out.

This instruction corresponds to a sentence in the quasi-C function in Formula. 2, Search_usable_'names-of-classification-items'_ which_represent_suitably_the_

'presupposition'_ of_the_

'hypothetical_proposition_ which_is_the_target_of_the_present_step_of_opportunistic_reasoning'_ by_using_

@[algorithm of looking through 'names-of-classification-items' in the order of hit frequency]_( );_

More detailed explanation of this function will be given just below. First, a user of the system is recommended to search 'names-of-classification-items' that characterize well the 'presupposition' of the hypothetical_proposition_ which_is_the_target_of_the_present_step_of_opportunistic_reasoning'.

by using the object-oriented knowledge base system.

For the user of the system to make such a search, it is recommended that he should use @[algorithm of making a list of 'names-of-classification-items' ranked in order of hit frequency] on the basis of the natural words in the 'presupposition'. In other words, it is recommended that a user of the system to make such a search should make a list of the 'names-of-classification-items' that are associated with natural words which characterizes the 'presupposition' of the
'hypothetical__proposition__
which__is__the__target__of__the__present__step__of__opportunistic__reasoning',
by using
"means for making a list of 'names-of-classification-items' ranked in order of hit frequency"
(See FIG. 14).

And it is recommended that,
as the basis of data on which
"means for making a list of 'names-of-classification-items' ranked in order of hit frequency"
is carried out,
keys described using 'means for storing data providing the ability of association',
and/or
keys described using 'means for storing the list of lexical meanings of a natural word' should be mainly used. Of course, other keys in the object-oriented knowledge base also may be used (See FIG. 14).

See Formula. 8A and Formula. 8B for a schematic quasi-C code as an example of embodiment of @[algorithm of making a list of 'descriptors' ranked in order of hit frequency].

And if the user of the system finds some usable 'names-of-classification-items' out of the list, then, it is recommended that the user of the system should optimize such usable 'names-of-classification-items' by using the object-oriented knowledge base system of the present invention. The way of the optimization depends whether the user of the system is willing to make a concentrated "retrieval of the 'hypothetical propositions to be used in forward reasoning'" and/or wiling to make an exhaustive "retrieval of the 'hypothetical propositions to be used in forward reasoning'". This situation corresponds to a sentence in the quasi-C function in Formula. 2,

```
if(some usable 'names-of-classification-items' are retrieved)
{
    if(concentrated retrieval is to be carried out)
    {
        Optimize__usable__'names-of-classification-items'__
        for__concentrated__"retrieval of the 'hypothetical
        propositions to be used in forward reasoning'"__by__using__
        'classification__table'__( ) ;__
        confirming__the__optimized__'names-of-classification-items'__
        by__using__keys__and__records__of__the__corresponding__data__
        if__necessary ( ) ; __
    }
    else if(exhaustive retrieval is to be carried out)
    {
        Optimize__usable__'names-of-classification-items'__for__
        exhaustive__"retrieval of the 'hypothetical propositions to be
        used in forward reasoning'"__by__using__
        'classification__table'( ) ;__
        confirming__the__optimized__'names-of-classification-items'__
        by__using__keys__and__records__of__the__corresponding__data__
        if__necessary ( ) ; __
    }
}
```

Lexical Definition of "Means for Getting 'Names-of-Classification-Items' that are Used to Make a Query to get the "Candidates of the 'Rules-for-Reasoning'" (Part 1. In the Case of Forward Reasoning The procedure described by the sentence just mentioned above, in the quasi-C function in Formula. 2,

```
Search__usable__'names-of-classification-items'__
which__represent__suitably__the__
'presupposition'__
of__the__
'hypothetical__proposition__
which__is__the__target__of__the__present__step__of__opportunistic__
reasoning'__by__using__
@[algorithm of looking through 'names-of-classification-items' in the
order of hit frequency]__( ) ;__
if(some usable 'names-of-classification-items' are retrieved)
{
    if(concentrated retrieval is to be carried out)
    {
        Optimize__usable__'names-of-classification-items'__for__
        concentrated__"retrieval of the 'hypothetical propositions to be
        used in forward reasoning'"__by__using__
        'classification__table'__( ) ;__
        confirming__the__optimized__'names-of-classification-items'__
        by__using__keys__and__records__of__the__corresponding__data__
        if__necessary ( ) ; __
        }
        else if(exhaustive retrieval is to be carried out)
        {
            Optimize__usable__'names-of-classification-items'__
            for__exhaustive__"retrieval of the 'hypothetical propositions
            to be used in forward reasoning'"__by__using__
            1 classification__table'( ) ;__
            confirming__the__optimized__'names-of-classification-
            items'__by__using__keys__and__records__of__the__
            corresponding__data__if__necessary ( ) ;__
        }
    }
```

is a recommended "means for getting 'names-of-classification-items' that are used to make a query to get the "candidates of the 'rules-for-reasoning'"", in the case of forward reasoning.

The lexical definition of 'names-of-classification-items' that are used to make a query to get the "candidates of the 'rules-for-reasoning'" (part 1. In the case of forward reasoning), will be given later in the present invention.

The recommended constitution how "means for getting 'names-of-classification-items' that are used to make a query to get the "candidates of the 'rules-for-reasoning'"" is embodied, is schematically shown in FIG. 14.

3.3.11.2.3.1.2.2. Search of 'Names-of-Classification-Items' to be Used for a Concentrated "Retrieval of the 'Hypothetical Propositions Possibly Used in Forward Reasoning'"

First I give an explanation about the sentence in Formula. 2, which I have shown just above,

```
if(some usable 'names-of-classification-items' are retrieved)
{
    if(concentrated retrieval is to be carried out)
    {
        Optimize__usable__'names-of-classification-items'__
        for__concentrated__
        "retrieval of the 'hypothetical propositions to be used in forward
        reasoning'"__by__using__'classification__table'__( ) ;__
```

That is, if the user of the system is willing to make a concentrated "retrieval of the 'hypothetical propositions to be used in forward reasoning'", then, it is recommended that he should search lower class 'names-of-classification-items' that represents the most precisely and specifically the contents of the 'presupposition' of the 'hypothetical__proposition__ which__is__the__target __of__the__present__step__of__opportunistic__reasoning'.

In ideal cases when the maker of the contents has already assigned the most specific 'names-of-classification-items' to the 'presupposition', the user of the system, of course, need not have to come again after the maker of the system.

For such optimizations, it is recommended that the user of the system should use 'classification table'; That is, if the user of the system is wiling to make a concentrated "retrieval of the 'hypothetical propositions to be used in forward reasoning'", it is recommended that he should search the 'names-of-classification-items' as low class as possible which are not only usable but also lower class of the usable 'names-of-classification-items' from the 'classification table'. In this case, it is recommended that he should use a computer flexibly to search and list 'names-of-classification-items' that are lower class of the usable 'names-of-classification-items'. A quasi-C code which outlines the procedure to search and list the 'names-of-classification-items' that are lower class (by one rank) of a 'name-of-classification-item' is shown in Formula. 14. It is recommended that the user of the system should use flexibly the procedure which is outlined as a quasi-C code in Formula. 14.

As an example of such a flexible use, the procedure which is outlined as a quasi-C code in Formula. 14 may be used recursively and completely, by using the usable 'names-of-classification-items' as the original seeds. That is, one may regard all the usable 'names-of-classification-items' included in the list of the 'names-of-classification-items' that are lower class (by one rank) of a seed 'name-of-classification-item', as another seed 'name-of-classification-item'. If this procedure is continued until no usable lower class 'name-of-classification-items' can be listed any more, then, as the result, all the usable 'name-of-classification-items' that are lower class of the usable 'name-of-classification-items' can be obtained.

If the user of the system is going to make a strict "retrieval of the 'hypothetical propositions to be used in forward reasoning'", then, it is recommended that he should confirm the suitableness (i.e. to be suitable to represent the contents of the 'presupposition' of the 'hypothetical__proposition__which__is__the__target__of__the__present__step__of__opportunistic__reasoning')

of the 'name-of-classification-items' thus obtained by watching the keys and the records that are associated with the 'name-of-classification-items'. If the user of the system contrives his original 'hypothetical proposition' in this stage or other, then, of course, he may provide his original 'hypothetical proposition' as a knowledge to be used for the system's inference during his own operation. It is recommended in this case, too, that a knowledge engineer should judge such a 'hypothetical proposition' whether to be of universal use and/or to be only of special use.

This procedure corresponds to a sentence in the quasi-C function in Formula. 2, which I have mentioned just above,

```
    confirming__the__optimized__'names-of-classification-items'__
    by__using__keys__and__records__of__the__corresponding__data__
    if__necessary ( ) ; __
}.
```

3.3.11.2.3.1.2.3. Search of 'Names-of-Classification-Items' to be Used for a Exhaustive "Retrieval of the 'Hypothetical Propositions Possibly Used in Forward Reasoning'"

Second, I give an explanation about the sentence in Formula. 2, which I have shown just above,

```
else if(exhaustive retrieval is to be carried out)
{
    Optimize__usable__'names-of-classification-items'__for__exhaustive__
    "retrieval of the 'hypothetical propositions to be used in forward
    reasoning'"__by__using__'classification__table'( ) ;__
```

That is, if the user of the system is willing to make a exhaustive "retrieval of the 'hypothetical propositions to be used in forward reasoning'", then, it is recommended that he should search higher class of 'names-of-classification-items' that represent most universally the contents of the 'presupposition' of the 'hypothetical__proposition__which__is__the__target__of__the__present__step__of__opportunistic__reasoning'.

For such optimizations, it is recommended that the user of the system should use 'classification table'; That is, if the user of the system is wiling to make an exhaustive "retrieval of the 'hypothetical propositions to be used in forward reasoning'", then, it is recommended that he should search 'names-of-classification-items' as high class as possible which are not only usable but also higher class of the usable 'names-of-classification-items', from the 'classification table'. In this case, it is recommended that he should use a computer to search and list the 'names-of-classification-items' that are higher class of the usable 'name-of-classification-item'. A quasi-C code which outlines the procedure to search and list the 'names-of-classification-items' that are higher class (by one rank) of a 'name-of-classification-item' is shown in Formula. 11. It is recommended that the user of the system should use flexibly the procedure which is outlined as a quasi-C code in Formula. 11.

As an example of such a flexible use, the procedure which is outlined as a quasi-C code in Formula. 11 may be used recursively and completely, by using the usable 'names-of-classification-items' as the original seeds. That is, one may regard all the usable 'names-of-classification-items' included in the list of the 'names-of-classification-items' that are higher class (by one rank) of a seed 'name-of-classification-item', as another seed 'name-of-classification-item'. If this procedure is continued until no usable higher class 'names-of-classification-items' can not be listed any more, then, as the result, all the usable 'names-of-classification-items' that are higher class of the usable 'names-of-classification-items' can be obtained.

If the user of the system is going to make a strict "retrieval of the 'hypothetical propositions to be used in forward reasoning'", it is recommended that he should confirm the usableness (i.e. to be usable to characterize well the contents of the 'presupposition' of the 'hypothetical__proposition__which__is__the__target__of__the__present__step__of__opportunistic__reasoning'), of the 'names-of-classification-items' thus obtained by watching the keys and the records that are associated with the 'names-of-classification-items'. If the user of the system contrives his original 'hypothetical proposition' in this stage, then of course, he may provide his original 'hypothetical proposition' as a knowledge to be used for the system's inference during his own operation. It is recommended in this case, too, that a knowledge engineer should judge such a 'hypothetical proposition' whether to be of universal use and/or to be only of special use.

This procedure corresponds to a sentence in the quasi-C function in Formula. 2, which I have mentioned just above,

```
        confirming__the__optimized__'names-of-classification-items'__
        by__using__keys__and__records__of__the__corresponding__data__
        if__necessary ( ) ; __
    }
}
```

In some case in which no appropriate 'names-of-classification-items' are found, it is recommended that the user of the system should find and use 'next-best-natural-verbs' instead of 'names-of-classification-items' in the "retrieval of the 'hypothetical propositions to be used in forward reasoning'" of the present execution of the loop body in the 'while( ){}' iteration statement.

If 'descriptors' and/or 'algorithm-of-process' characterizing well the 'presupposition' of the
'hypothetical__proposition__
which__is__the__target__of__the__present__step__of__opportunistic__reasoning'
are found,
and/or
a user of the system contrives 'next-best-natural-nouns' and/or 'next-best-natural-verbs' characterizing well the 'presupposition' of the 'hypothetical__proposition__
which__is__the__target__of__the__present__step__of__opportunistic__reasoning',
then,
it is recommended that forward reasoning should be carried out in the present step of opportunistic reasoning (i.e. in the present execution of the loop body in the 'while( ){}' iteration statement).

If and when the 'presupposition' of the hypothetical proposition is an empty set, forward reasoning can not be carried out because 'descriptors' and/or 'algorithm-of-process' describing 'presupposition'.

The situation described here above is shown in Formula. 2 as,

```
if('descriptors' and/or 'names-of-classification-items' describing the
'presupposition' of the
'hypothetical__proposition__
which__is__the__target__of__the __present__step__of__opportunistic__
reasoning' are found
and/or
a user of the system contrives a good 'next-best-natural-nouns' and/or
a good 'next-best-natural-verbs')
{
  Carry__out__forward__reasoning__and__
  Determine__the__hypothetical__propositions__which__is__to__be__
  the__target__of__the__next__step__of__opportunistic__reasoning( ) ;__
}
```

The recommended way how a forward reasoning should be carried out in the present step of opportunistic reasoning is shown in Formula. 3. Detailed descriptions will be given later in the present invention.

3.3.11.2.3.2. Preparation for a "Retrieval of the 'Hypothetical Propositions Possibly Used in Backward Reasoning'"

In the case,
no 'descriptors' and/or 'names-of-classification-items' describing the 'presupposition' of the
'hypothetical__proposition__
which__is__the__target__of__the__present__step__of__opportunistic__reasoning'
is found,
and
a user of the system can not contrive a good 'next-best-natural-nouns' and/or
a good 'next-best-natural-verbs',
it is recommended that preparation should made for a "retrieval of the 'hypothetical propositions to be used in backward reasoning'"
This instruction corresponds to a sentence in the quasi-C function in Formula. 2,
else
{.

3.3.11.2.3.2.1. Search of 'Descriptors' to be Used for a "Retrieval of the 'Hypothetical Propositions Possibly Used in Backward Reasoning'"

3.3.11.2.3.2.1.1. Overview

As the preparation for a "retrieval of the 'hypothetical propositions to be used in backward reasoning'", first, it is recommended that 'descriptors' which characterize well the 'consequence' of the
'hypothetical__proposition__
which__is__the__target__of__the__present__step__of__opportunistic__reasoning'
should be searched. As will be shown later in the present invention, thus introduced usable 'descriptors' are a 'descriptor' which is to be used in the case of backward reasoning to retrieve the "candidates of the 'rules-for-reasoning'". This instruction corresponds to a sentence in the quasi-C function in Formula. 2,
Search_usable__'descriptors'__which__represent__suitably__the__'consequence'__
of__the__
'hypothetical__proposition__
which__is__the__target__of__the__present__step__of__opportunistic__reasoning'__
__by__using__
@[algorithm of making a list of 'descriptors' ranked in order of hit frequency]( );__.

More detailed explanation of this sentence will be given just below.

First, a user of the system is recommended to search 'descriptors' that characterize well the 'consequence' of the
'hypothetical__proposition__
which__is__the__target__of__the__present__step__of__opportunistic__reasoning'.
by using the object-orient knowledge base system.

For a user of the system to make such a search, it is recommended that he should use @[algorithm of making a list of 'descriptors' ranked in order of hit frequency] on the basis of natural words used in the 'consequence'. In other words, it is recommended that a user of the system to make such a search should
make a list of the 'descriptors' that are associated with
natural words which characterizes the 'consequence' of the
'hypothetical__proposition__
which__is__the__target__of__the__present__step__of__opportunistic__reasoning' by using

"means for making a list of 'descriptors' ranked in order of hit frequency"

(See FIG. 13).

And it is recommended that, as the basis of data on which

"means for making a list of 'descriptors' ranked in order of hit frequency"

is carried out, keys described using 'means for storing data providing the ability of association', and/or keys described using 'means for storing the list of lexical meanings of a natural word' should be mainly used. Of course, other keys in the object-oriented knowledge base also may be used (See FIG. 13).

See Formula. 7 for a schematic quasi-C code as an example of embodiment of @[algorithm of making a list of 'descriptors' ranked in order of hit frequency].

And if the user of the system finds some usable 'descriptors' out of the list, then, it is recommended that the user of the system should optimize such usable 'descriptors'.

Here, 'usable' means to be usable to characterize well the contents of the 'consequence' of the 'hypothetical_proposition_ which_is_the_target_of_the_present_step_of_opportunistic_reasoning'.

The way of the optimization depends whether the user of the system is willing to make a concentrated "retrieval of the 'hypothetical propositions to be used in backward reasoning'" and/or willing to make an exhaustive "retrieval of the 'hypothetical propositions to be used in backward reasoning'". This situation corresponds to a sentence in the quasi-C function in Formula. 2,

```
if(some usable 'descriptors' are retrieved)
{
  if(concentrated retrieval is to be carried out)
  {
    Optimize_usable_'descriptors'_for_concentrated_
    "retrieval of the 'hypothetical propositions possibly used in backward
    reasoning'"_by_using_'ideal_thesaurus'( ) ;_
    confirming_the_optimized_'descriptors'_
    by_using_keys_and_records_of_the_corresponding_data _
        if_necessary ( )   ; _
      }
      else if(exhaustive retrieval is to be carried out)
      {
        Optimize_usable_'descriptors'_for_exhaustive_
        "retrieval of the 'hypothetical propositions
        to be used in backward
        reasoning'"_
        by_using_'ideal_thesaurus'( ) ;_
    confirming_the_optimized_'descriptors'_
    by_using_keys_and_records_of_the_corresponding_data_if_
    necessary ( ) ; _
  }
}.
```

Here, I give a lexical definition of "means for getting 'descriptors' that are used to make a query to get the "candidates of the 'rules-for-reasoning'"".

It should be noted that how a

"means for getting 'descriptors' that are used to make a query to get the "candidates of the 'rules-for-reasoning'""

is used in each step of opportunistic reasoning has already explained in "§3.3.11.2.3.0. Overview".

Lexical Definition of "Means for Getting 'Descriptors' that are Used to Make a Query to get the "Candidates of the 'Rules-for-Reasoning'"" (Part 2. In the Case of Backward Reasoning The procedure described by the sentence just mentioned above, in the quasi-C function in Formula. 2,

```
Search_usable_'descriptors'_which_represent_suitably_the_
'consequence'_of_the_
    'hypothetical_proposition_
    which_is_the_target_of_the_present_step_of_opportunistic_
    reasoning'___by_using_
    @[algorithm of making a list of 'descriptors' ranked in order of hit
    frequency]_( ) ;_.
    if(some usable 'descriptors' are retrieved)
    {
        if(concentrated retrieval is to be carried out)
        {
            Optimize_usable_'descriptors'_for_concentrated_
            "retrieval of the 'hypothetical propositions possibly used in
            backward reasoning'"_by_using_'ideal_thesaurus'( ) ;_
            confirming_the_optimized_'descriptors'_
            by_using_keys_and_records_of_the_corresponding_
            data_if_necessary ( ) ; _
        }
        else if(exhaustive retrieval is to be carried out)
        {
            Optimize_usable_'descriptors'_for_exhaustive_
            "retrieval of the 'hypothetical propositions to be used in
            backward reasoning'"_by_using_'ideal_
            thesaurus'( ) ;_
        confirming_the_optimized_'descriptors'_
        by_using_keys_and_records_of_the_corresponding_data_
        if_necessary ( ) ; _
    }
}.
```

is a recommended "means for getting 'descriptors' that are used to make a query to get the "candidates of the 'rules-for-reasoning'"", in the case of backward reasoning.

The lexical definition of 'descriptors' that are used to make a query to get the "candidates of the 'rules-for-reasoning'" (part 2. In the case of backward reasoning), will be given later in the present invention.

The recommended constitution how "means for getting 'descriptors' that are used to make a query to get the "candidates of the 'rules-for-reasoning'"" is embodied, is schematically shown in FIG. 13.

3.3.11.2.3.2.1.2. Search of 'Descriptors' to be Used for a Concentrated "Retrieval of the 'Hypothetical Propositions Possibly Used in Backward Reasoning'"

First I give an explanation about the sentence in Formula. 2, which I have shown just above,

```
if(some usable 'descriptors' are retrieved)
{
  if(concentrated retrieval is to be carried out)
  {
    Optimize_usable_'descriptors'_for_concentrated_
    "retrieval of the 'hypothetical propositions possibly used in backward
    reasoning'"_by_using_'ideal_thesaurus'( ) ;_
```

That is, if the user of the system is willing to make a concentrated "retrieval of the 'hypothetical propositions to be used in backward reasoning'", then, it is recommended that he should search as narrower 'descriptors' as possible that represents the most precisely and specifically the 'subject-word (S)', 'object-word (O)', 'indirect-object-word (I.O)', and/or, 'direct-object-word (D.O)' of the 'consequence' of the 'hypothetical_proposition_
which_is_the_target_of_the_present_step_of_opportunistic_reasoning', and that he should search as narrower 'descriptors' as possible that represents the 'complement-word (C)' of the 'consequence' of the 'hypothetical_proposition_
which_is_the_target_of_the_present_step_of_opportunistic_reasoning'.

In ideal cases when the maker of the contents has already assigned the most specific 'descriptors' to the 'consequence', the user of the system, of course, need not have to come again after the maker of the system.

For such optimizations, it is recommended that the user of the system should use 'ideal thesaurus'; That is, if the user of the system is wiling to make a concentrated "retrieval of the 'hypothetical propositions to be used in backward reasoning'", then, it is recommended that he should search a 'descriptors' as narrow and/or broad as possible which are not only usable but also narrower than the usable 'descriptors', from the 'ideal thesaurus'. In this case, it is recommended that he should use a computer flexibly to search and list 'descriptors' that are narrower than the usable 'descriptors'. The way in which a computer is used flexibly to search and list 'descriptors' that are narrower and/or broader than the usable 'descriptors' has already described in the section of "§3.3.11.2.3.1.1.2. Search of 'Descriptors' to be used for a Concentrated "Retrieval of the 'Hypothetical propositions possibly used in Forward Reasoning'"".

If the user of the system is going to make a strict "retrieval of the 'hypothetical propositions to be used in backward reasoning'", it is recommended that he should confirm the usableness (i.e. to be usable to characterize well the contents of the 'conclusion' of the 'hypothetical_proposition_
which_is_the_target_of_the_present_step_of_opportunistic_reasoning'), of the 'descriptors' thus obtained by watching the keys and the records that are associated with the 'descriptors'.

If the user of the system contrives his original 'hypothetical proposition' in this stage or other, then, of course, he may provide his original 'hypothetical proposition' as a knowledge to be used for the system's inference during his own operation. It is recommended in this case, too, that a knowledge engineer should judge such a 'hypothetical proposition' whether to be of universal use and/or to be only of special use.

This procedure corresponds to a sentence in the quasi-C function in Formula. 2, which I have mentioned just above,

```
    confirming_the_optimized_'descriptors'_
    by_using_keys_and_records_of_the_corresponding_data_
    if_necessary ( ) ; _
  }.
```

3.3.11.2.3.2.1.3. Search of 'Descriptors' to be Used for a Exhaustive "Retrieval of the 'Hypothetical Propositions Possibly Used in Backward Reasoning'"

Second, I give an explanation about the sentence in Formula. 2, which I have shown just above,

```
else if(exhaustive retrieval is to be carried out)
{
  Optimize_usable_'descriptors'_for_exhaustive_
  "retrieval of the 'hypothetical propositions to be used in backward
  reasoning'"_
  by_using_'ideal_thesaurus'( ) ;_
```

That is, if the user of the system is willing to make a exhaustive "retrieval of the 'hypothetical propositions to be used in backward reasoning'", then, it is recommended that he should search as broader 'descriptors' as possible that represent most universally the 'subject-word (S)', 'object-word (O)', 'indirect-object-word (I.O)', and/or 'direct-object-word (D.O)' of the 'consequence' of the 'hypothetical_proposition_
which_is_the_target_of_the_present_step_of_opportunistic_reasoning', and that he should search as narrower 'descriptors' as possible that represent most universally the 'complement-word (C)' of the 'consequence' of the 'hypothetical_proposition_
which_is_the_target_of_the_present_step_of_opportunistic_reasoning'.

For such optimizations, it is recommended that the user of the system should use 'ideal thesaurus'; That is, if the user of the system is wiling to make an exhaustive "retrieval of the 'hypothetical propositions to be used in backward reasoning'", then, it is recommended that he should search as broad and/or narrow as possible 'descriptors' of the usable 'descriptors', from the 'ideal thesaurus'. In this case, it is recommended that he should use a computer flexibly to search and list 'descriptors' that are narrower and/or broader than the usable 'descriptors'. The way in which a computer is used flexibly to search and list 'descriptors' that are narrower and/or broader than the usable 'descriptors' has already described in the section of "§3.3.11.2.3.1.1.2. Search of 'Descriptors' to be used for a Concentrated "Retrieval of the 'Hypothetical propositions possibly used in Forward Reasoning'"".

If the user of the system is going to make a strict "retrieval of the 'hypothetical propositions to be used in backward reasoning'", it is recommended that he should confirm the usableness (i.e. to be usable to characterize well the contents of the 'conclusion' of the 'hypothetical_proposition_
which_is_the_target_of_the_present_step_of_opportunistic_reasoning'), of the 'descriptors' thus obtained by watching the keys and the records that are associated with the 'descriptors'. If the user of the system contrives his original 'hypothetical proposition' in this stage, then of course, he may provide his original 'hypothetical proposition' as a knowledge to be used for the system's inference during his own operation. It is recommended that a knowledge engineer should judge such a 'hypothetical proposition' whether to be of universal use and/or to be only of special use.

This procedure corresponds to a sentence in the quasi-C function in Formula. 2, which I have mentioned just above,

```
        confirming_the_optimized_'descriptors'_
        by_using_keys_and_records_of_the_corresponding_data_
        if_necessary ( ) ; _
    }
}.
```

3.3.11.2.3.2.2. Search of 'Names-of-Classification-Items' to be Used for a "Retrieval of the 'Hypothetical Propositions Possibly Used in Backward Reasoning'"

3.3.11.2.3.2.2.1. Overview

As the preparation for a "retrieval of the 'hypothetical propositions to be used in backward reasoning'", second, it is recommended that 'names-of-classification-items' which characterize well the 'consequence' of the 'hypothetical_proposition_ which_is_the_target_of_the_present_step_of_opportunistic_reasoning' should be searched. As will be shown later in the present invention, thus introduced 'names-of-classification-items' are a 'name-of-classification-item' which is to be used in the case of backward reasoning to retrieve the "candidates of the 'rules-for-reasoning'". This instruction corresponds to a sentence in the quasi-C function in Formula. 2, Search_usable_'names-of-classification-items'_ which_represent_suitably_the_

'consequence'_ of_the_

'hypothetical_proposition_ which_is_the_target_of_the_present_step_of_opportunistic_reasoning'_ by_using_@[algorithm of looking through 'names-of-classification-items' in the order of hit frequency]_( );_

More detailed explanation of this function will be given just below. First, a user of the system is recommended to search 'names-of-classification-items' that characterize well the 'consequence' of the 'hypothetical_proposition_ which_is_the_target_of_the_present_step_of_opportunistic_reasoning'.

by using the object-oriented knowledge base system.

For the user of the system to make such a search, it is recommended that he should use @[algorithm of making a list of 'names-of-classification-items' ranked in order of hit frequency] on the basis of the natural words in the 'consequence'. In other words, it is recommended that a user of the system to make such a search should make a list of the 'names-of-classification-items' that are associated with natural words which characterizes the 'consequence' of the 'hypothetical_proposition_ which_is_the_target_of_the_present_step_of_opportunistic_reasoning', by using

"means for making a list of 'names-of-classification-items' ranked in order of hit frequency"

(See FIG. 14).

And it is recommended that, as the basis of data on which

"means for making a list of 'names-of-classification-items' ranked in order of hit frequency"

is carried out, keys described using 'means for storing data providing the ability of association', and/or keys described using 'means for storing the list of lexical meanings of a natural word' should be mainly used. Of course, other keys in the object-oriented knowledge base also may be used (See FIG. 14).

See Formula. 8A and Formula. 8B for a schematic quasi-C code as an example of embodiment of @[algorithm of making a list of 'descriptors' ranked in order of hit frequency].

And if the user of the system finds some usable 'names-of-classification-items' out of the list, then, it is recommended that the user of the system should optimize such usable 'names-of-classification-items'.

The way of the optimization depends whether the user of the system is willing to make a concentrated "retrieval of the 'hypothetical propositions to be used in backward reasoning'" and/or willing to make an exhaustive "retrieval of the 'hypothetical propositions to be used in backward reasoning'".

This situation corresponds to a sentence in the quasi-C function in Formula. 2,

```
if(some usable 'names-of-classification-items' are retrieved)
{
  if(concentrated retrieval is to be carried out)
  {
    Optimize_usable_'names-of-classification-items'_for_
    concentrated_
    "retrieval of the 'hypothetical propositions to be used in backward
    reasoning'"_by_using_'classification_table'_( ) ;_
    confirming_the_optimized_'names-of-classification-items'_
    by_using_keys_and_records_of_the_corresponding_data_
    if_necessary ( ) ; _
  }
  else if(exhaustive retrieval is to be carried out)
  {
    Optimize_usable_'names-of-classification-items'_for_
    exhaustive_
    "retrieval of the 'hypothetical propositions to be used in backward
    reasoning'"_by_using_'classification_table'( ) ;_
    confirming_the_optimized_'names-of-classification-items'_
    by_using_keys_and_records_of_the_corresponding_data
    _if_necessary ( ) ; _
  }
}
```

Lexical Definition of "Means for Getting 'Names-of-Classification-Items' that are Used to Make a Query to Get the "Candidates of the 'Rules-for-Reasoning'"" (Part 2. In the Case of Backward Reasoning The procedure described by the sentence just mentioned above, in the quasi-C function in Formula. 2,

```
Search_usable_'names-of-classification-items'_
which_represent_suitably_the_
'consequence'_
```

-continued

```
of__the__
'hypothetical__proposition__
which__is__the__target__of__the__present__
step__of__opportunistic__reasoning'__
by__using__@[algorithm of looking through
'names-of-classification-items' in
the order of hit frequency]__( ) ;__
if(some usable 'names-of-classification-items' are retrieved)
{
  if(concentrated retrieval is to be carried out)
  {
    Optimize__usable__
    'names-of-classification-items'__for__concentrated__
    "retrieval of the 'hypothetical propositions to be used in backward
    reasoning'"__by__using__'classification__table'__( ) ;__
    confirming__the__optimized__'names-of-classification-items'__
    by__using__keys__and__records__of__the__corresponding__data__
    if__necessary ( ) ; __
  }
  else if(exhaustive retrieval is to be carried out)
  {
    Optimize__usable__'names-of-classification-items'__for__exhaustive__
    "retrieval of the 'hypothetical propositions to be used in backward
    reasoning'"__by__using__'classification__table'( ) ;__
    confirming__the__optimized__'names-of-classification-items'__
    by__using__keys__and__records__of__the__corresponding__data
    __if__necessary ( ) ; __
  }
}
```

is a "means for getting 'names-of-classification-items' that are used to make a query to get the "candidates of the 'rules-for-reasoning'"", in the case of backward reasoning.

The lexical definition of 'names-of-classification-items' that are used to make a query to get the "candidates of the 'rules-for-reasoning'" (part 2. In the case of backward reasoning), will be given later in the present invention.

The recommended constitution how "means for getting 'names-of-classification-items' that are used to make a query to get the "candidates of the 'rules-for-reasoning'"" is embodied, is schematically shown in FIG. 14.

3.3.11.2.3.2.2.2. Search of 'Names-of-Classification-Items' to be Used for a Concentrated "Retrieval of the 'Hypothetical Propositions Possibly Used in Backward Reasoning'"

First I give an explanation about the sentence in Formula. 2, which I have shown just above,

```
if(some usable 'names-of-classification-items' are retrieved)
{
  if(concentrated retrieval is to be carried out)
  {
    Optimize__usable__'names-of-classification-items'__for__
    concentrated__
    "retrieval of the 'hypothetical propositions to be used in backward
    reasoning'"__by__using__'classification__table'__( ) ;__
```

That is, if the user of the system is willing to make a concentrated "retrieval of the 'hypothetical propositions to be used in backward reasoning'", then, it is recommended that he should search as lower class 'names-of-classification-items' as possible, that represents the most precisely and specifically the contents of the 'consequence' of the 'hypothetical__proposition__ which__is__the__target__of__the__present__step__of__opportunistic__reasoning'.

In ideal cases when the maker of the contents has already assigned the most specific 'names-of-classification-items' to the 'consequence', the user of the system, of course, need not have to come again after the maker of the system.

For such optimizations, it is recommended that the user of the system should use 'classification table'; That is, if the user of the system is wiling to make a concentrated "retrieval of the 'hypothetical propositions to be used in backward reasoning'", then, it is recommended that he should search 'names-of-classification-items' which are not only usable but also lower class of the usable 'names-of-classification-items' from the 'classification table'. In this case, it is recommended that he should use a computer flexibly to search and list 'names-of-classification-items' that are lower class of the usable 'names-of-classification-items'. A quasi-C code which outlines the procedure to search and list the 'names-of-classification-items' that are lower class (by one rank) of a 'name-of-classification-item' is shown in Formula. 14. It is recommended that the user of the system should use flexibly the procedure which is outlined as a quasi-C code in Formula. 14.

As an example of such a flexible use, the procedure which is outlined as a quasi-C code in Formula. 14 may be used recursively and completely, by using the usable 'names-of-classification-items' as the original seeds. That is, one may regard all the usable 'names-of-classification-items' included in the list of the 'names-of-classification-items' that are lower class (by one rank) of a seed 'name-of-classification-item', as another seed 'name-of-classification-item'. If this procedure is continued until no usable lower class 'name-of-classification-item' can be listed any more, then, as the result, all the usable 'name-of-classification-items' that are lower class of the usable 'name-of-classification-items' can be obtained.

If the user of the system is going to make a strict "retrieval of the 'hypothetical propositions to be used in backward reasoning'", then, it is recommended that he should confirm the usableness (i.e. to be usable to characterize well the contents of the 'conclusion' of the 'hypothetical__proposition__ which__is__the__target__of__the__present__step__of__opportunistic__reasoning'), of the 'name-of-classification-items' thus obtained by watching the keys and the records that are associated with the 'name-of-classification-items'. If the user of the system contrives his original 'hypothetical proposition' in this stage or other, then, of course, he may provide his original 'hypothetical proposition' as a knowledge to be used for the system's inference during his own operation. It is recommended in this case, too, that a knowledge engineer should judge such a 'hypothetical proposition' whether to be of universal use and/or to be only of special use.

This procedure corresponds to a sentence in the quasi-C function in Formula. 2, which I have mentioned just above,

```
    confirming__the__optimized__'names-of-classification-items'__
    by__using__keys__and__records__of__the__corresponding__data__
    if__necessary ( ) ; __
}.
```

3.3.11.2.3.2.2.3. Search of 'Names-of-Classification-Items' to be Used for a Exhaustive "Retrieval of the 'Hypothetical Propositions Possibly Used in Backward Reasoning'"

Second, I give an explanation about the sentence in Formula. 2, which I have shown just above,

```
else if(exhaustive retrieval is to be carried out)
{
    Optimize__usable__'names-of-classification-items'__for__exhaustive__
    "retrieval of the 'hypothetical propositions to be used in backward
    reasoning'"__by__using__'classification__table'( ) ;__.
```

That is, if the user of the system is willing to make a exhaustive "retrieval of the 'hypothetical propositions to be used in backward reasoning'", then, it is recommended that he should search as higher class of 'names-of-classification-items' as possible that represent most universally the contents of the 'consequence' of the 'hypothetical__proposition__
which__is__the__target__of__the__present__step__of__opportunistic__reasoning'.

For such optimizations, it is recommended that the user of the system should use 'classification table'; That is, if the user of the system is wiling to make an exhaustive "retrieval of the 'hypothetical propositions to be used in backward reasoning'", then, it is recommended that he should search the highest class of 'names-of-classification-items' of the usable 'names-of-classification-items', from the 'classification table' In this case, it is recommended that he should use a computer to search and list the 'names-of-classification-items' that are higher class of the usable 'name-of-classification-item'. A quasi-C code which outlines the procedure to search and list the 'names-of-classification-items' that are higher class (by one rank) of a 'name-of-classification-item' is shown in Formula. 11. It is recommended that the user of the system should use flexibly the procedure which is outlined as a quasi-C code in Formula. 11.

As an example of such a flexible use, the procedure which is outlined as a quasi-C code in Formula. 11 may be used recursively and completely, by using the usable 'names-of-classification-items' as the original seeds. That is, one may regard all the usable 'names-of-classification-items' included in the list of the 'names-of-classification-items' that are higher class (by one rank) of a seed 'name-of-classification-item', as another seed 'name-of-classification-item'. If this procedure is continued until no usable higher class 'names-of-classification-items' can not be listed any more, then, as the result, all the usable 'names-of-classification-items' that are higher class of the usable 'names-of-classification-items' can be obtained.

If the user of the system is going to make a strict "retrieval of the 'hypothetical propositions to be used in backward reasoning'", it is recommended that he should confirm the usableness (i.e. to be usable to characterize well the contents of the 'conclusion' of the 'hypothetical__proposition__
which__is__the__target__of__the__present__step__of__opportunistic__reasoning'),
of the 'names-of-classification-items' thus obtained by watching the keys and the records that are associated with the 'names-of-classification-items'. If the user of the system contrives his original 'hypothetical proposition' in this stage, then of course, he may provide his original 'hypothetical proposition' as a knowledge to be used for the system's inference during his own operation. It is recommended in this case, too, that a knowledge engineer should judge such a 'hypothetical proposition' whether to be of universal use and/or to be only of special use.

This procedure corresponds to a sentence in the quasi-C function in Formula. 2, which I have mentioned just above,

```
        confirming__the__optimized__'names-of-classification-items'__
        by__using__keys__and__records__of__the__corresponding__data__
        if__necessary ( ) ; __
    }
}.
```

In some case in which no appropriate 'descriptors' are found, it is recommended that the user of the system should find and use 'next-best-natural-nouns' instead of 'descriptors' in the "retrieval of the 'hypothetical propositions to be used in backward reasoning'" of the present execution of the loop body in the 'while( ){}' iteration statement.

In some case in which no appropriate 'names-of-classification-items' are found, it is recommended that the user of the system should find and use 'next-best-natural-verbs' instead of 'names-of-classification-items' in the "retrieval of the 'hypothetical propositions to be used in backward reasoning'" of the present execution of the loop body in the 'while( ){}' iteration statement.

If 'descriptors' and/or 'algorithm-of-process' characterizing well the 'consequence' of the 'hypothetical__proposition__
which__is__the__target__of__the__present__step__of__opportunistic__reasoning'
are found,
and/or
a user of the system contrives 'next-best-natural-nouns' and/or 'next-best-natural-verbs' characterizing well the 'consequence' of the
'hypothetical__proposition__
which__is__the__target__of__the__present__step__of__opportunistic__reasoning',
then,
it is recommended that backward reasoning should be carried out in the present step of opportunistic reasoning (i.e. in the present execution of the loop body in the 'while( ){}' iteration statement). If and when the 'consequence' of the hypothetical proposition is an empty set, backward reasoning can not of course be carried out.

The situation described here above is shown in Formula. 2 as,

```
if('descriptors' and/or 'names-of-classification-items'describing
the 'consequence' of the
'hypothetical__proposition__
which__is__the__target__of__the__present__
step__of__opportunistic__reasoning'
are found
and/or
a user of the system contrives a good 'next-best-natural-nouns' and/or
a good 'next-best-natural-verbs')
{
    Carry__out__backward__reasoning__and__
    Determine__the__hypothetical__propositions__which__is__to__be__the__
    target__of__the__next__step__of__opportunistic__reasoning( ) ;__
}.
```

The recommended way how a backward reasoning should be carried out in the present step of opportunistic reasoning is shown in Formula. 4. Detailed descriptions will be given later in the present invention.

3.3.11.2.3.3. The Case When Both Preparation for a "Retrieval of the 'Hypothetical Propositions Possibly Used in Forward Reasoning'" and Preparation for a "Retrieval of the 'Hypothetical Propositions Possibly Used in Backward Reasoning'" Have Failed If and when usable 'descriptors', 'next-best-natural-nouns', 'names-of-classification-items', and/or, 'next-best-natural-verbs' can not be found for either 'presupposition' or 'consequence' of the 'hypothetical_proposition_
which_is_the_target_of_the_present_step_of_opportunistic_reasoning', can not be found, then, it is recommended that the "decision concerning whether forward reasoning and/or backward reasoning should be carried out" made in previous steps of opportunistic reasoning, should be changed.

Speaking more generally, in some realistic case, which is not shown completely in the quasi-C code of Formula. 2, final judgment about whether forward reasoning and/or backward reasoning should be carried out, can not always be correctly given in the present step of opportunistic reasoning. And the present decision should be revised flexibly even in many steps after, if and when one encounters heavy deadlock and/or uncontrollable combinatorial explosion. In other words, if and when one encounters heavy deadlock and/or uncontrollable combinatorial explosion, then it is recommended that one should change a decision "whether forward reasoning and/or backward reasoning should be carried out" made in one of the previous steps of opportunistic reasoning.

This corresponds to the sentence in Formula. 2,

```
    else
    {
        Change_the_
        "decision_concerning_whether_forward_reasoning_and/or_
        backward_reasoning_should_be_carriedout"_
        made_in_previous_steps_of_opportunistic_reasoning( ) ;_
    },
and/or
    if(@[algorithm of broadening out the target 'descriptors' and/or target
    'names-of-classification-items'] dose not work well)
    {
        Change_the_
        "decision_concerning_whether_forward_reasoning_and/or_
        backward_reasoning_should_be_carriedout"_
        made_in_previous_steps_of_opportunistic_reasoning( ) ;_
    }.
```

It is recommended that the hypothetical proposition that is to be used as the target of the next step of opportunistic reasoning should be determined at the end of the present step of opportunistic reasoning.

But this procedure is not carried out in the main routine, which is represented in Formula. 2, but is carried out at the end of the 'subroutine for forward reasoning', which is represented in Formula. 3 and/or is carried out at the end of the 'subroutine for backward reasoning', which is represented in Formula. 4. The detail will be described later in the present invention.

3.3.11.2.3.4. Sub Routines 3.3.11.2.3.4.1. Sub Routine for Forward Reasoning 3.3.11.2.3.4.1.0. Terminology The recommended way how a forward reasoning should be carried out in the present step of opportunistic reasoning is shown in Formula. 3.

Before describing details of the procedure for forward reasoning, here, I give a lexical definition of the term, 'hypothetical propositions to be used in forward reasoning'.

Lexical Definition of 'Hypothetical Proposition to be Used in Forward Reasoning'

In ideal cases, first of all, a 'hypothetical proposition to be used in forward reasoning' is usually a hypothetical proposition registered in an 'object-oriented knowledge base' disclosed in the present invention.

and, second, the 'presupposition' of the 'hypothetical proposition to be used in forward reasoning' is a proposition that can be derived from the 'presupposition' of the

'hypothetical_proposition_
which_is_the_target_of_the_present_step_of_opportunistic_reasoning', by using the @[algorithm of sentence based object-oriented categorical syllogism] and/or by @[algorithm of sentence based object-oriented hypothetical syllogism].

Lexical Definition of 'Rules-for-Reasoning' (Part 1. In the Case of Forward Reasoning)

A rule on the basis of which a reasoning is carried out in each step of opportunistic reasoning, is a 'rules-for-reasoning'. Especially when forward reasoning is being carried out, I call 'hypothetical proposition to be used in forward reasoning' a 'rule-for-reasoning'.

In the case of forward reasoning, first, it is recommended that 'descriptors' and/or 'names-of-classification-items' that have been optimized in the main routine should be used to retrieve the 'hypothetical propositions possibly used in forward reasoning' if at least one such optimized 'descriptor' and/or optimized 'names-of-classification-item' has been successfully obtained.

Speaking more strictly, it is recommended that the user of an object-oriented knowledge base system disclosed in the present invention should retrieve hypothetical propositions whose 'presupposition' contains all of and/or part of the optimized 'descriptors' and/or contains all of and/or part of the optimized 'names-of-classification-items', from the 'object-oriented knowledge base' disclosed in the present invention.

In a word, the 'presuppositions' of the hypothetical propositions are chosen as the target of a Boolean search using a query made of the optimized 'descriptors' and/or of the optimized 'names-of-classification-items'.

Of course, not all the hypothetical propositions thus retrieved are a 'hypothetical proposition to be used in forward reasoning'. In other words, all the hypothetical propositions thus retrieved are judged to be a 'hypothetical propositions possibly used in forward reasoning', but are not necessarily judged to be a 'hypothetical proposition to be used in forward reasoning'.

And else if no such optimized 'descriptors' and/or optimized 'names-of-classification-items' have been successfully obtained, then, it is recommended that 'next-best-natural-nouns' and/or 'next-best-natural-verbs' should be used to retrieve the 'hypothetical propositions possibly used in forward reasoning'. Speaking more strictly, it is recommended that the user of the system should retrieve hypothetical propositions whose 'presupposition' contains all of and/or part of the 'next-best-natural-nouns' and/or contains all of and/or part of the 'next-best-natural-verbs', from the 'object-oriented knowledge base' disclosed in the present invention. In a word, the 'presupposition' of the hypothetical propositions are chosen as the target of a Boolean search using 'next-best-natural-nouns' and/or 'next-best-natural-verbs'.

Lexical Definition of 'Hypothetical Propositions Possibly Used in Forward Reasoning'

In ideal cases, first of all, a 'hypothetical propositions possibly used in forward reasoning' is usually a hypothetical proposition registered in an 'object-oriented knowledge base' disclosed in the present invention.

And second, the 'presupposition' of the 'hypothetical propositions possibly used in forward reasoning' is a proposition that is retrieved during a Boolean search using a query made of, 'descriptors', 'names-of-classification-items', 'next-best-natural-nouns', and/or, 'next-best-natural-verbs' which characterize the presupposition of

'hypothetical_proposition_ which_is_the_target_of_the_present_step_of_opportunistic_reasoning'.

Lexical Definition of "Candidates of the 'Rules-for-Reasoning'" (Part 1. In the Case of Forward Reasoning)

A rule which can be possibly used as a 'rules-for-reasoning' is called a "candidates of the 'rules-for-reasoning'". Especially in the case when forward reasoning is being carried out, I call 'Hypothetical propositions possibly used in forward reasoning' a "candidates of the 'rules-for-reasoning'".

The lexical definition of 'rules-for-reasoning' in the case of forward reasoning has already given in the present invention.

The contents of the lexical definition of 'hypothetical propositions possibly used in forward reasoning' plus the lexical definition of "candidates of the 'rules-for-reasoning'" is schematically shown in FIG. 15.

Lexical Definition of Query to Get the "Candidates of the 'Rules-for-Reasoning'" (Part 1. In the Case of Forward Reasoning)

The query which appeared in the lexical definition of 'hypothetical propositions possibly used in forward reasoning' is a query to get the "candidates of the 'rules-for-reasoning'", in the case of forward reasoning.

The lexical definition of "candidates of the 'rules-for-reasoning'", in the case of forward reasoning has just given in the present invention.

Lexical Definition of 'Descriptors' That are Used to Make a Query to Get the "Candidates of the 'Rules-for-Reasoning'" (Part 1. In the Case of Forward Reasoning)

The 'descriptors' which appeared in the lexical definition of 'hypothetical propositions possibly used in forward reasoning' are 'descriptors' that are used to make a query to get the "candidates of the 'rules-for-reasoning'", in the case of forward reasoning.

The lexical definition of query to get the "candidates of the 'rules-for-reasoning'", in the case of forward reasoning has just been given in the present invention.

Lexical Definition of 'Names-of-Classification-Items' that are Used to Make a Query to Get the "Candidates of the 'Rules-for-Reasoning'" (Part 1. In the Case of Forward Reasoning)

The 'names-of-classification-items' which appeared in the lexical definition of 'hypothetical propositions possibly used in forward reasoning' are names-of-classification-items' that are used to make a query to get the "candidates of the 'rules-for-reasoning'", in the case of forward reasoning (See FIG. 12).

The lexical definition of query to get the "candidates of the 'rules-for-reasoning'", in the case of forward reasoning has just been given in the present invention.

3.3.11.2.3.4.1.1. Retrieval of "Candidates of the 'Rules-for-Reasoning'"

At the beginning of the procedure for forward reasoning, it is recommended that rules expressed as a key described in "sentence pattern of physical and/or mathematical rules" and/or in "sentence pattern of function" should be used as the target of the retrieval of the 'hypothetical propositions possibly used in forward reasoning'. This retrieval corresponds to the sentence in Formula. 3, Retrieve_'Hypothetical_propositions_possibly_used_in_forward_reasoning'_by_using_ optimized_'descriptors',_optimized_'names-of-classification-items',_'next-best-natural-nouns',_and/or,_'next-best-natural-verbs'( ) ;_.

It is recommended that keys described in the "sentence pattern of instances of solving problems" should also be used as the target of the retrieval of the 'hypothetical propositions possibly used in forward reasoning'.

In the case when a key described in the "sentence pattern of physical and/or mathematical rules", and/or in the "sentence pattern of function" is used as the target of the retrieval, then, the keys that are retrieved, of course, may be used as it is, as a 'hypothetical propositions possibly used in forward reasoning'. However, in the case when a key described in "sentence pattern of instances of solving problems" are used as the target of the retrieval of the 'hypothetical propositions possibly used in forward reasoning', the situation is not so simple;

First, it is recommended that a key described in "sentence pattern of instances of solving problems" should be retrieved, if the key in "sentence pattern of instances of solving problems" contains at least one hypothetical proposition which is judged to be a 'hypothetical propositions possibly used in forward reasoning'. It is recommended that in this retrieval, too, optimized 'descriptors', optimized 'names-of-classification-items', 'next-best-natural-nouns', and/or, 'next-best-natural-verbs' should be used.

If and when such a key described in "sentence pattern of instances of solving problems" is found, then, it is recommended that following procedure should be carried out by using the key:

That is, the "'hypothetical propositions possibly used in forward reasoning' in the key", of course, may be used as it is as a 'hypothetical propositions possibly used in forward reasoning'.

In addition to this, it is recommended that one should compose a "hand made hypothetical proposition" which is used as a 'hypothetical propositions possibly used in forward reasoning', by combining the "'hypothetical propositions possibly used in forward reasoning' in the key" and a "'logical chain composed of hypothetical propositions' in the key" which begins just below the "'hypothetical propositions possibly used in forward reasoning' in the key".

More explicitly speaking, if a "hypothetical proposition"

equals to a hypothetical proposition, whose 'presupposition' equals to the 'presupposition' of the "'hypothetical propositions possibly used in forward reasoning' in the key", and whose 'consequence' equals to the 'consequence' of one of the hypothetical propositions contained in the "'logical chain composed of hypothetical propositions' in the key", the hypothetical proposition on the top of which equals to the "'hypothetical propositions possibly used in forward reasoning' in the key", then, the "hypothetical proposition" is judged to be a "hand made hypothetical proposition" used as a 'hypothetical propositions possibly used in forward reasoning'.

If more than two such "'logical chains of hypothetical propositions' in the key" exist, then, of course, the "hand made hypothetical propositions" may be constructed for each of them.

The procedure described above corresponds to the sentence in Formula. 3,

Retrieve__keys__in__"sentence pattern of instances of solving problems"__by__using__ optimized_'descriptors',__optimized__'names-of-classification-items',__

'next-best-natural-nouns',_and/or,__'next-best-natural-verbs',__ and__make__'Hypothetical__propositions__possibly__used__in__forward__reasoning'( );__

Here, I give a lexical definition of "retrieval of the "candidates of the 'rules-for-reasoning'"".

It should be noted that how a

"retrieval of the "candidates of the 'rules-for-reasoning'""

is used in each step of opportunistic reasoning has already explained in "§ 3.3.11.2.3.0. Overview'".

Lexical Definition of "Retrieval of the "Candidates of the 'Rules-for-Reasoning'"" (Part 1. In the Case of Forward Reasoning)

The procedure expressed by sentences in Formula. 3, just described above,

Retrieve__'Hypothetical__propositions__possibly__used__in__forward__reasoning'__by__using__ optimized__'descriptors',__optimized__'names-of-classification-items',__'next-best-natural-nouns',__and/or,__'next-best-natural-verbs'( );__.

Retrieve__keys__in__"sentence pattern of instances of solving problems"__by__using__ optimized__'descriptors',__optimized__'names-of-classification-items',__'next-best-natural-nouns',__and/or,__'next-best-natural-verbs',__and__make__'Hypothetical__propositions__possibly__used__in__forward__reasoning'( );__ is a recommended procedure for "retrieval of the "candidates of the 'rules-for-reasoning'"" in the case of forward reasoning.

As described above, it is recommended that, as the basis of data from which

"candidates of the 'rules-for-reasoning'"

are retrieved, keys described using 'means for storing data used as rules', and/or keys described using 'means for storing data about instances of solving problems' should be mainly used. Of course, other keys in the object-oriented knowledge base also may be used (See FIG. 15).

3.3.11.2.3.4.1.2. Means for Retrieving Directly Hypothetical Propositions to be Used in Forward Reasoning As a first measures to deal with the case when too many 'hypothetical propositions possibly used in forward reasoning' are retrieved, i.e. when combinatorial explosion occurs, first, it is recommended that the 'hypothetical propositions to be used in forward reasoning', not the 'hypothetical propositions possibly used in forward reasoning', should be directly retrieved. The procedure described here corresponds to the sentence in Formula. 3,

```
if( too many 'hypothetical propositions possibly used in forward
reasoning'
are retrieved,
i.e. a combinatorial explosion occurs)
{
    Retrieve__directly__
    'Hypothetical__propositions__to__be__used__in__forward__
    reasoning'( );__.
```

The last function in this sentence is a function that expresses @[algorithm of retrieving directly 'Hypothetical propositions to be used in forward reasoning'].

Lexical Definition of @[Algorithm of Retrieving Directly 'Hypothetical Propositions to be Used in Forward Reasoning']

An algorithm with which all the 'hypothetical propositions' in the knowledge base whose 'presupposition' is judged to be derived from the 'presupposition' of the 'hypothetical proposition which is the target of the present step of opportunistic reasoning', by using @[algorithm of sentence based object-oriented categorical syllogism] and/or @[algorithm of sentence based object-oriented hypothetical syllogism], are retrieved, is @[algorithm of retrieving directly 'Hypothetical propositions to be used in forward reasoning'].

And in the case when a key described in "sentence pattern of instances of solving problems" which contains at least one hypothetical proposition which is judged to be a 'hypothetical propositions to be used in forward reasoning', is regarded as the target of the retrieval, it is recommended that one should compose a "hand made hypothetical proposition" which is used as a 'hypothetical propositions to be used in forward reasoning', by combining the "'hypothetical propositions to be used in forward reasoning' in the key" and a "'logical chain composed of hypothetical propositions' in the key" which begins just below the "'hypothetical propositions to be used in forward reasoning' in the key".

This way to obtain a "hand made hypothetical proposition" which is used as a 'hypothetical propositions to be used in forward reasoning', is @[algorithm of retrieving directly 'Hypothetical propositions to be used in forward reasoning'].

Lexical Definition of Means for Retrieving Directly Hypothetical Propositions to be Used in Forward Reasoning (Part 1. In the Case of Forward Reasoning)

@[Algorithm of retrieving directly 'Hypothetical propositions to be used in forward reasoning'] and/or something that stores the information of it, is a means for retrieving directly Hypothetical propositions to be used in forward reasoning.

Lexical Definition of Mechanism of Reasoning Used in an Object-Oriented Knowledge Base System Disclosed in the Present Invention @[Algorithm of retrieving directly 'Hypothetical propositions to be used in forward reasoning'] is a mechanism of reasoning used in an object-oriented knowledge base system disclosed in the present invention.

Lexical Definition of "Means for Retrieving Directly the 'Rules-for-Reasoning'" (Part 1. in the Case of Forward Reasoning Means for retrieving directly Hypothetical propositions to be used in forward reasoning is equal to a "means for retrieving directly the 'rules-for-reasoning'", in the case when forward reasoning is carried out.

It should be noted that how a

"means for retrieving directly the 'rules-for-reasoning'"

is carried out in each step of opportunistic reasoning has already explained in "§ 3.3.11.2.3.0. Overview".

Figure 18:
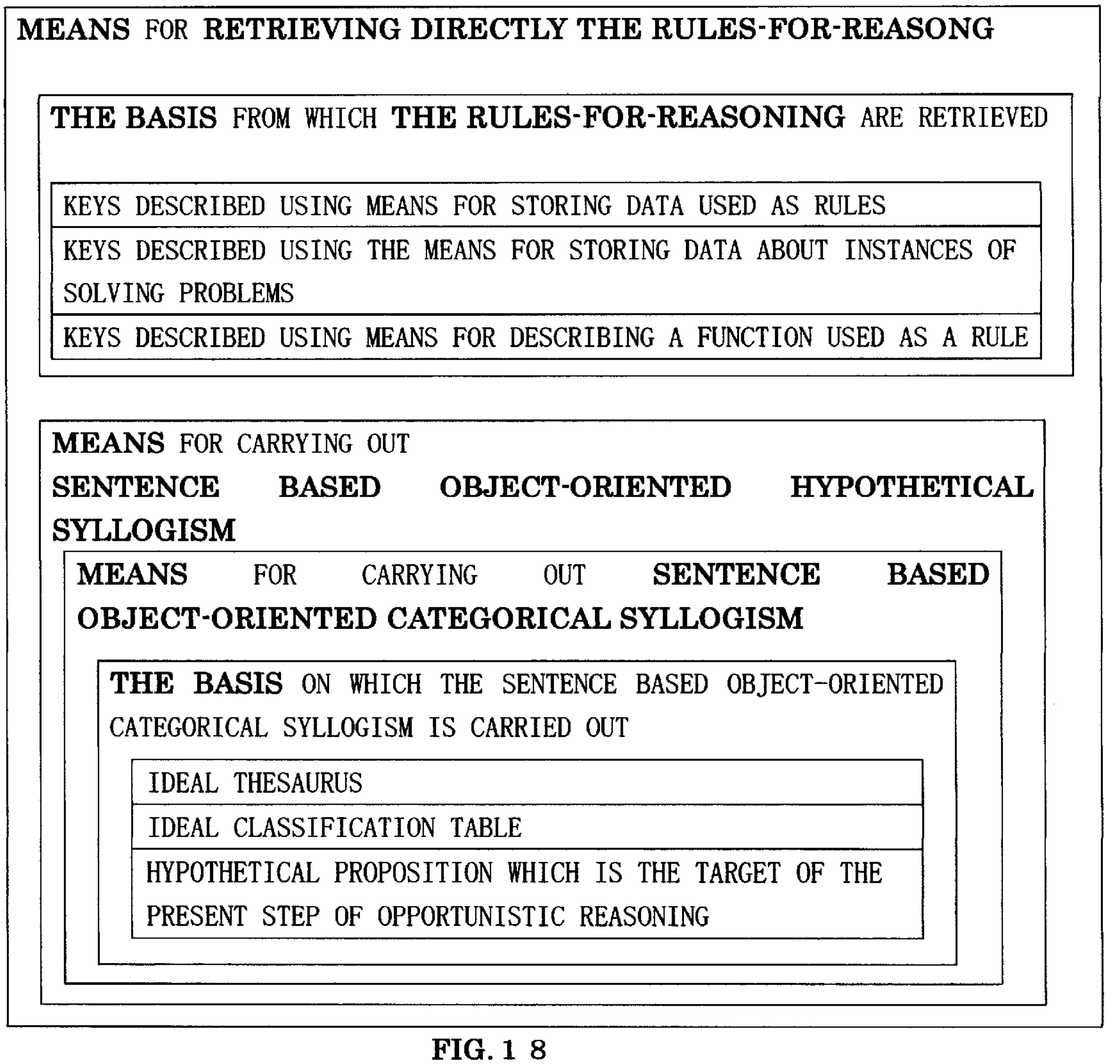
FIG. 18 shows a recommended constitution of the "means for retrieving directly the 'rules-for-reasoning".

As mentioned just before in the lexical definition of @[algorithm of retrieving directly 'Hypothetical propositions to be used in forward reasoning'], it is recommended that 'means for carrying out sentence based object-oriented categorical syllogism' and/or 'means for carrying out sentence based object-oriented hypothetical syllogism' should be used when "means for retrieving directly the 'rules-for-reasoning'" is embodied (See FIG. 18). And as the basis of data on which "means for retrieving directly the 'rules-for-reasoning'" is carried out, it is recommended that 'ideal thesaurus', 'ideal classification table', and, 'hypothetical proposition which is the target of the present step of opportunistic reasoning' should be used (See FIG. 18).

And it is recommended that keys described using 'means for storing data used as rules', and/or, keys described using 'means for storing data about instances of solving problems', should be used as the basis of data from which 'rules-for-reasoning' should be retrieved.

Still more explicit explanation for the judgment made in @[algorithm of retrieving directly 'Hypothetical propositions to be used in forward reasoning'] is as follows:

If and when the 'presupposition' of the

'hypothetical_proposition_ which_is_the_target_of_the_present_step_of_opportunistic_reasoning', is a categorical proposition, then, it is recommended that the user of the system should make use of the procedure outlined in Formula. 15A+Formula. 15B+Formula. 15C+Formula. 15D, which are quasi-C code which outlines the procedure to judge, when a major premise is given, whether a proposition is a "conclusion of a 'sentence based object-oriented categorical syllogism', which is described by @[algorithm of sentence based object-oriented categorical syllogism]" or not. It should be noted that Formula. 15A is the main part of the procedure. If and when the procedure outlined in Formula. 15A+Formula. 15B+Formula. 15C+Formula. 15D is made use of, then the 'presupposition' of the 'hypothetical_proposition_ which_is_the_target_of the present_step_of_opportunistic_reasoning', should be provided with as the 'Major Premise' for the procedure outlined in Formula. 15A, and the 'presupposition' of a 'hypothetical propositions' in the knowledge base should be regarded as the proposition judged by the procedure outlined in Formula. 1 15A, i.e. should be regarded as the 'Candidate For Conclusion' in Formula. 15A. For detail, see Formula. 15A, first, and then, see Formula. 15B+Formula. 15C+Formula. 15D, which are linked to Formula. 15A.

And if and when the 'presupposition' of the

'hypothetical_proposition_which_is_the_target_of_the_present_step_of_opportunistic_reasoning', is a hypothetical proposition, then, it is recommended that the user of the system should make use of the procedure outlined in Formula. 16, which is a quasi-C code which outlines the procedure to judge whether a proposition is a "conclusion of a 'hypothetical syllogism described by @[algorithm of sentence based object-oriented hypothetical syllogism] '" or not when a major premise is given. When this procedure outlined in Formula. 16 is made use of, then, the 'presupposition' of the 'hypothetical_proposition_ which_is_the_target_of_the_present_step_of_opportunistic_reasoning', should be provided with as the 'Major Premise' for the procedure outlined in Formula. 16, and the 'presupposition' of a 'hypothetical propositions' in the knowledge base should be regarded as the proposition judged by the procedure outlined in Formula. 1 6, i.e., should be regarded as the 'Candidate For Conclusion'.

For detail, see Formula. 16.

Here, the procedure with which to use, in the step of the forward reasoning, the keys described in "sentence pattern of physical and/or mathematical rules" and/or in "sentence pattern of function" as a rule, and the procedure with which, in the step of the forward reasoning, to obtain a rule by using a key described in "sentence pattern of instances of solving problems", both of which are used to implement the function in Formula. 3, Retrieve_directly 'Hypothetical_propositions_to_be_used_in_forward_reasoning'( );_, are the same as the procedure with which to use, in the step of the forward reasoning, the keys described in "sentence pattern of physical and/or mathematical rules" and/or in "sentence pattern of function" as a rule, and the procedure with which, in the step of the forward reasoning, to obtain a rule by using a key described in "sentence pattern of instances of solving problems", both of which I have already disclosed in the present invention to show the way to get 'hypothetical propositions possibly used in forward reasoning' by using optimized 'descriptors', optimized 'names-of-classification-items', 'next-best-natural-nouns', and/or, 'next-best-natural-verbs', which I have described by now in the present invention,

3.3.11.2.3.4.1.3. 'Means for Narrowing Down the Target 'Descriptors'' and 'Means for Narrowing Down the Target 'Names-of-Classification-Items''

If and when the first direct measures described just above failed, then another measures should be taken to deal with the case when too many 'hypothetical propositions possibly used in forward reasoning' are retrieved, i.e. when combinatorial explosion occurs.

That is, if and when the first direct measures failed, then it is recommended that a process according to @[algorithm of narrowing down the target 'descriptors' and/or target 'names-of-classification-items'] should be carried out. The lexical definition of @[algorithm of narrowing down the target 'descriptors' and/or target 'names-of-classification-items'], the lexical definition of 'means for narrowing down the target 'descriptors'', and the 'means for narrowing down the target 'names-of-classification-items'' have already given in the present invention.

The procedure described above corresponds to the sentence in Formula. 3, if(combinatorial explosion now and/or in the future still can not be avoided)

```
{
    Revise_
    optimized_'descriptors',_optimized_'names-of-classification-
    items',_'next-best-natural-nouns',_and/or,_next-best-natural-verbs'
    by_
    Carring_out_a_process_according_to_@[algorithm of narrowing
    down the target 'descriptors' and/or target 'names-of-classification-
    items']_if_necessary_
    And_Retrieve_again,_
    'Hypothetical_propositions_possibly_used_in_forward_
    reasoning'_by_using_the_revised_
    'descriptors',_names-of-classification-items',_
    'next-best-natural-nouns',_and/or,_'next-best-natural-verbs'( ) ;_
```

The retrieval which is described in this sentence in Formula. 3 as,

And_Retrieve_again,_

'Hypothetical_propositions_possibly_used_in_forward_reasoning'_ by_using_the_revised_

'descriptors',_'names-of-classification-items',_

'next-best-natural-nouns',_and/or,_'next-best-natural-verbs', is used as the

『retrieval to be made in the present step』, which appears in the lexical definition of @[algorithm of narrowing down the target 'descriptors' and/or target 'names-of-classification-items'].

And the retrieval which is described in the previous sentence in Formula. 3 as, Retrieve_keys_in_"sentence pattern of instances of solving problems"_ by_using optimized_'descriptors',_optimized_'names-of-classification-items',_

'next-best-natural-nouns', and/or,_'next-best-natural-verbs',_ and_make_'Hypothetical_propositions_possibly_used_in_forward_reasoning'( );_ is used as the

『retrieval made in the preceding step』 which appears in the lexical definition of @[algorithm of narrowing down the target 'descriptors' and/or target 'names-of-classification-items'].

That is, roughly speaking, in the process according to @[algorithm of narrowing down the target 'descriptors' and/or target 'names-of-classification-items'], first, it is recommended that reconsideration should be carried out about the optimization made previously in the main routine and/or made in the previous step of opportunistic reasoning; That is, it is recommended that revised optimization should be made all over again for 'descriptors' and for 'names-of-classification-items', and then, appropriately revised 'next-best-natural-nouns', and/or, 'next-best-natural-verbs' should be contrived all over again. Then, it is recommended that a new retrieval of 'hypothetical propositions possibly used in forward reasoning' by using these revised 'descriptors', revised 'names-of-classification-items', revised 'next-best-natural-nouns', and/or, revised 'next-best-natural-verbs' should be carried out. It is expected that less number of 'hypothetical propositions possibly used in forward reasoning' should be obtained in the new retrieval, and therefore, the combinatorial explosion should be avoided.

3.3.11.2.3.4.1.4. 'Means for Fusing Propositions'

If the opportunistic reasoning should reach a deadlock in a later step of opportunistic reasoning, after the process according to @[algorithm of narrowing down the target 'descriptors' and/or target 'names-of-classification-items'] has been carried out here in the present step of opportunistic reasoning, then, it is recommended that the process carried out according to the @[algorithm of narrowing down the target 'descriptors' and/or target 'names-of-classification-items']

should be withdrawn, and that process according to @[algorithm of fusing propositions] should be carried out. The lexical definition of @[algorithm of fusing propositions] and 'means for fusing propositions' have already given in the present invention.

Here, as the 『propositions which should be fused』 which appears in the lexical definition of @[algorithm of fusing propositions], the 'consequences' of the 'hypothetical propositions possibly used in forward reasoning' that were retrieved in the present step of forward reasoning before the process according to @[algorithm of narrowing down the target 'descriptors' and/or target 'names-of-classification-items'] was carried out should be used: In other words, 'consequences' of the 'hypothetical propositions possibly used in forward reasoning' that were retrieved in the following sentences in Formula. 3 in the present step of forward reasoning, Retrieve_'Hypothetical__propositions__possibly__used__in__forward__reasoning'__by__using__ optimized__'descriptors',__optimized__'names-of-classification-items',__'next-best-natural-nouns',__and/or,__'next-best-natural-verbs'( );__

Retrieve__keys__in__"sentence pattern of instances of solving problems"__by__using__ optimized_'descriptors',__optimized__'names-of-classification-items',__

'next-best-natural-nouns',_and/or,__'next-best-natural-verbs',__ and__make__'Hypothetical__propositions__possibly__used__in$_{forward}$__reasoning'( );__should be used as the 『propositions which should be fused』 which appears in the lexical definition of @[algorithm of fusing propositions].

And as the output of the procedure according to @[algorithm of fusing propositions], 『fused hypothetical propositions to be used in the present step of forward reasoning』 is obtained.

The procedure described above corresponds to the sentence in Formula. 3,

```
if(combinatorial explosion now andlor in the future still can not be avoided)
{
    Withdraw__the__process__carried__out__according__to__the__
    @[algorithm of narrowing down the target 'descriptors' and/or target
    'names-of-classification-items']
    and
    Carry__out__a__process__according__to__
    @[algorithm of fusing propositions]__to__the__'presuppositions'__
    of__the__'Hypothetical__propositions__possibly__used__in__forward__
    reasoning'__if__necessary( ) ;__
}
```

Exactness of reasoning is often seriously lost when a procedure according to @[algorithm of fusing propositions] is carried out. So it is recommended that it should be carried out only in above mentioned situation. Therefore, it is recommended that the @[algorithm of fusing propositions] should be carried out only when combinatorial explosion can not be avoided only by carrying out @[algorithm of narrowing down the target 'descriptors' and/or target 'names-of-classification-items'] and/or @[algorithm of narrowing down the target 'descriptors' and/or target 'names-of-classification-items'] should be withdrawn in a later step.

3.3.11.2.3.4.1.5. 'Means for Broadening Out the Target 'Descriptors'' and 'Means for Broadening Out the Target 'Names-of-Classification-Items''

On the contrary when too less number of 'hypothetical propositions to be used in reasoning of the present step' are obtained, it is recommended that @[algorithm of broadening out the target 'descriptors' and/or target 'names-of-classification-items'] should be carried out. I have already given the lexical definition of @[algorithm of broadening out the target 'descriptors' and/or target 'names-of-classification-items'], the lexical definition of 'means for broadening out the target 'descriptors'', and the lexical definition of 'means for broadening out the target 'names-of-classification-items'', in the present invention.

The retrieval which is described in the sentence in Formula. 3 as,

And__Retrieve__again,__

'Hypothetical_propositions__possibly__used__in__forward__reasoning'__ by__using__the__revised__

'descriptors',__'names-of-classification-items',__

'next-best-natural-nouns',__and/or,__'next-best-natural-verbs', is used as the

『retrieval to be made in the present step』 which appears in the lexical definition of @[algorithm of broadening out the target 'descriptors' and/or target 'names-of-classification-items'].

And the retrieval which is described in the sentence in Formula. 3 as,

Retrieve_'Hypothetical__propositions__possibly__used__in__forward__reasoning'__by__using__ optimized_'descriptors',__optimized__'names-of-classification-items',__

'next-best-natural-nouns',__and/or,__'nexxt-best-natural-verbs'( );__

Retrieve__keys__in__"sentence pattern of instances of solving problems"__by__using__ optimized_'descriptors',__optimized__'names-of-classification-items',__

'next-best-natural-nouns',_and/or,_'next-best-natural-verbs',_ and_make_'Hypothetical_propositions_possibly_used_in_forward_reasoning'( );_ is used as the

『retrieval made in the preceding step』 which appears in the lexical definition of @[algorithm of broadening out the target 'descriptors' and/or target 'names-of-classification-items'].

That is, roughly speaking, in the process according to @[algorithm of broadening out the target 'descriptors' and/or target 'names-of-classification-items'], first, it is recommended that reconsideration should be carried out as for the optimization made previously in the main routine and/or made in the previous step of opportunistic reasoning; That is, it is recommended that revised optimization should be made all over again for 'descriptors' and for 'names-of-classification-items', and then, appropriately revised 'next-best-natural-nouns', and/or, 'next-best-natural-verbs' should be contrived all over again. Then, it is recommended that a new retrieval of 'hypothetical propositions possibly used in forward reasoning' by using these revised 'descriptors', revised 'names-of-classification-items', revised 'next-best-natural-nouns', and/or, 'next-best-natural-verbs' should be carried out.

As the result, it is expected that more number of 'hypothetical propositions possibly used in forward reasoning' should be obtained in the revised retrieval, and therefore, the deadlock should be avoided.

This procedure given above corresponds to the sentence in Formula. 3,

```
if( too less 'hypothetical propositions possibly used in forward reasoning'
are retrieved)
{
    Carry_out_@[algorithm of broadening out the target 'descriptors'
    and/or target 'names-of-classification-items']
    And_Retrieve_again,_
    'Hypothetical_propositions_possibly_used_in_forward_
    reasoning'( ) ;_.
```

3.3.11.2.3.4.1.6. "Means for Picking Up Only the 'Rules-for-Reasoning' From the "Candidates of the 'Rules-for-Reasoning'""

Lexical Definition of @[Algorithm for Eliminating the Noise of the Retrieval of 'Hypothetical Propositions Possibly Used in Forward Reasoning']

In cases when a procedure according to @[algorithm of fusing propositions] has not been carried out, it is recommended that whether a 'hypothetical propositions possibly used in forward reasoning', which is retrieved in the present step of opportunistic reasoning is strictly a 'hypothetical propositions to be used in forward reasoning' or not, should be verified by the user of the system.

And only 'hypothetical propositions possibly used in forward reasoning' which is judged to be a 'hypothetical propositions to be used in forward reasoning' by the user of the system should be used in the forward reasoning in the present step of forward reasoning.

The algorithm for this verification is @[algorithm for eliminating the noise of the retrieval of 'hypothetical propositions possibly used in forward reasoning'].

It is recommended that @[algorithm of sentence based object-oriented categorical syllogism] and/or @[algorithm of sentence based object-oriented hypothetical syllogism] should be used to embody @[algorithm for eliminating the noise of the retrieval of 'hypothetical propositions possibly used in forward reasoning]. And as the basis of data on which @[algorithm of sentence based object-oriented categorical syllogism] is carried out, it is recommended that 'ideal thesaurus', 'ideal classification table', and, 'hypothetical proposition which is the target of the present step of opportunistic reasoning' should be used. The detail of a recommended embodiment of @[algorithm for eliminating the noise of the retrieval of 'hypothetical propositions possibly used in forward reasoning] is outline by using a quasi-C code shown in Formula. 17, for the ideal case in which the hypothetical proposition to be used in forward reasoning is described exactly according a mathematically perfect format.

Lexical Definition of Means for Eliminating the Noise of the Retrieval of Hypothetical Propositions Possibly Used in Forward Reasoning @[Algorithm for eliminating the noise of the retrieval of 'hypothetical propositions possibly used in forward reasoning'] and/or something that stores the information of it, is a means for eliminating the noise of the retrieval of hypothetical propositions possibly used in forward reasoning.

Lexical Definition of "Means for Picking Up Only the 'Rules-for-Reasoning' From the "Candidates of the 'Rules-for-Reasoning'"" (Part 1. In the case of Forward Reasoning)

Means for eliminating the noise of the retrieval of hypothetical propositions possibly used in forward reasoning equals to a "means for picking up only the 'rules-for-reasoning' from the "candidates of the 'rules-for-reasoning'"", in the case of forward reasoning.

It should be noted that how a

"means for picking up only the 'rules-for-reasoning' from the "candidates of the 'rules-for-reasoning'""

is carried out in each step of opportunistic reasoning has already explained in "§ 3.3.11.2.3.0. Overview".

As mentioned just before in the lexical definition of @[algorithm for eliminating the noise of the retrieval of 'hypothetical propositions possibly used in forward reasoning'], it is recommended that 'means for carrying out sentence based object-oriented categorical syllogism' and/or 'means for carrying out sentence based object-oriented hypothetical syllogism' should be used when "means for picking up only the 'rules-for-reasoning' from the "candidates of the 'rules-for-reasoning'"" is embodied (See FIG. 16). And as the basis of data on which "means for picking up only the 'rules-for-reasoning' from the "candidates of the 'rules-for-reasoning'"" is carried out, it is recommended that 'ideal thesaurus', 'ideal classification table', and, 'hypothetical proposition which is the target of the present step of opportunistic reasoning' should be used (See FIG. 16).

In cases when a procedure according to @[algorithm of fusing propositions] has been carried out, it is recommended that the 『fused hypothetical propositions to be used in the present step of forward reasoning』 should be used as it is as a 'hypothetical proposition to be used in forward reasoning' without any verification in the present step of forward reasoning. It is recommended that the verification should be done after the final approximate answer will have been obtained, in this case.

These procedure corresponds to the sentence in Formula. 3,

Unless_@[algorithm of fusing propositions]_has_not_been_carried_out_

Choose_$_{the}$_'hypothetical_propositions_to_be_used_in_forward_reasoning'_out_of_the_

'Hypothetical_propositions_possibly_used_in_forward_reasoning'_

And_else_if_@[algorithm of fusing propositions)_has_been_carried_out_,

Use_『fused hypothetical propositions to be used in the present step of forward reasoning』_as_it_is as_the_'hypothetical_propositions_to_be_used_in_forward_reasoning'_( );_

3.3.11.2.3.4.1.7. @[Algorithm for Determining Hypothetical Proposition Which is to be Used as the Target of the Next Step of Opportunistic Reasoning] (Part 1: in the Case of Forward Reasoning)

It is recommended that hypothetical proposition which is to be used as the target of the next step of opportunistic reasoning should be determined on the basis of the 'hypothetical propositions to be used in forward reasoning', which have been used in the 'hypothetical syllogism carried out in the present step of opportunistic reasoning' and on the basis of the 'hypothetical_proposition_ which_is_the_target_of_the_present_step_of_opportunistic_reasoning' by using @[algorithm of sentence based object-oriented categorical syllogism] and/or @[algorithm of sentence based object-oriented hypothetical syllogism].

This procedure corresponds to the sentence in Formula. 3,

Determine_$_{I\ the}$_hypothetical_propositions_ which_are_to_be_used_ as_the_target_of_the_next_step_of_opportunistic_reasoning_ on_the_basis_ of_the_'hypothetical_propositions_to_be_used_in_forward_reasoning'_ in_the_present_step_of_opportunistic_reasoning_ and_ of_a_hypothetical_proposition_ which_is_the_target_of_the_present_step_of_forward_reasoning by_using_

@[algorithm of sentence based object-oriented categorical syllogism]and

@[algorithm of sentence based object-oriented hypothetical syllogism]_forward( );_.

Detail procedures for the instructions described by this sentences is given in Formula. 5A. This function shown just above is a function representing @[algorithm for determining hypothetical propositions which are to be used as the target of the next step of opportunistic reasoning] in the case of forward reasoning.

Lexical Definition of @[Algorithm for Determining Hypothetical Proposition Which is to be Used as the Target of the Next Step of Opportunistic Reasoning] (Part 1: in the Case of Forward Reasoning)

As I have just mentioned, a recommended procedures for @[algorithm for determining hypothetical proposition which is to be used as the target of the next step of opportunistic reasoning] carried out in the case of forward reasoning is given in Formula. 5A.

That is, in the case of forward reasoning, a hypothetical proposition that is to be used as the target of the next step of opportunistic reasoning is, in an ideal case, a hypothetical proposition whose 'presupposition' is equal to the 'consequence' of a 'hypothetical proposition to be used in forward reasoning' that was used in the reasoning of the present step of opportunistic reasoning, and whose 'consequence' is equal to the 'consequence' of the 'hypothetical_proposition_ which$_{is}$_the_target_of_the_present_step_of_opportunistic_reasoning'.

@[Algorithm for determining hypothetical proposition which is to be used as the target of the next step of opportunistic reasoning] is a mechanism of reasoning used in an object-oriented knowledge base system disclosed in the present invention.

The problem is judged to be solved when at least one hypothetical proposition that is to be used as the target of the next step of opportunistic reasoning, is judged to be trivial.

This corresponds to a sentence in Formula. 2,

```
if( Problem is solved )
{
    break ;_
}.
```

3.3.11.2.3.4.2. Sub Routine for Backward Reasoning

3.3.11.2.3.4.2.0. Terminology

The recommended way how a backward reasoning should be carried out in the present step of opportunistic reasoning is shown in Formula. 4.

Before describing details of the procedure for backward reasoning, here, I give a lexical definition of the term, 'hypothetical propositions to be used in backward reasoning'.

Lexical Definition of 'Hypothetical Proposition to be Used in Backward Reasoning'

In an ideal cases, first of all, a 'hypothetical proposition to be used in backward reasoning' is usually a hypothetical proposition registered in an 'object-oriented knowledge base' disclosed in the present invention.

and, second, the 'consequence' of the 'hypothetical proposition to be used in backward reasoning' is a proposition from which the 'consequence' of the

'hypothetical_proposition_ which_is_the_target_of_the_present_step_of_opportunistic_reasoning' can be derived, by using the @[algorithm of sentence based object-oriented categorical syllogism] and/or by @[algorithm of sentence based object-oriented hypothetical syllogism].

Lexical Definition of 'Rules-for-Reasoning' (Part 2. In the Case of Backward Reasoning)

A rule on the basis of which a reasoning is carried out in each step of opportunistic reasoning, is a 'rules-for-reasoning'. Especially in the case when backward reasoning is being carried out, I call 'hypothetical proposition to be used in backward reasoning' a 'rule-for-reasoning' (See FIG. 12).

In the case of backward reasoning, it is recommended that 'descriptors' and/or 'names-of-classification-items' that have been optimized in the main routine should be used to retrieve 'hypothetical proposition possibly used in backward reasoning' if at least one such optimized 'descriptor' and/or optimized 'names-of-classification-item' has been successfully obtained.

Speaking more strictly, it is recommended that the user of an object-oriented knowledge base system disclosed in the present invention should retrieve hypothetical propositions whose 'consequence' contains all of and/or part of the optimized 'descriptors' and/or contains all of and/or part of the optimized 'names-of-classification-items', from the 'object-oriented knowledge base' disclosed in the present invention.

In a word, the 'consequence' of the hypothetical propositions are chosen as the target of a Boolean search using a query made of the optimized 'descriptors' and/or of the optimized 'names-of-classification-items'.

Of course, not all the hypothetical propositions thus retrieved are a 'hypothetical proposition to be used in backward reasoning'. In other words, all the hypothetical propositions thus retrieved are judged to be a 'hypothetical propositions possibly used in backward reasoning', but are not necessarily judged to be a 'hypothetical proposition to be used in backward reasoning'.

And else if no such optimized 'descriptors' and/or optimized 'names-of-classification-items' have been successfully obtained, then, it is recommended that 'next-best-natural-nouns' and/or 'next-best-natural-verbs' should be used to retrieve the 'hypothetical propositions possibly used in backward reasoning'. Speaking more strictly, it is recommended that the user of the system should retrieve hypothetical propositions whose 'consequence' contains all of and/or part of the 'next-best-natural-nouns' and/or contains all of and/or part of the 'next-best-natural-verbs', from the 'object-oriented knowledge base' disclosed in the present invention. In a word, the 'consequence' of the hypothetical propositions are chosen as the target of a Boolean search using the 'next-best-natural-nouns' and/or 'next-best-natural-verbs'.

Lexical Definition of 'Hypothetical Propositions Possibly Used in Backward Reasoning'

In ideal cases, first of all, a 'hypothetical propositions possibly used in backward reasoning' is usually a hypothetical proposition registered in an 'object-oriented knowledge base' disclosed in the present invention.

And second, the 'consequence' of the 'hypothetical propositions possibly used in backward reasoning' is a proposition that is hit upon during a Boolean search using a query made of, 'descriptors', 'names-of-classification-items', 'next-best-natural-nouns', and/or, 'next-best-natural-verbs' that characterize the consequence of 'hypothetical_proposition_ which_is_the_target_of_the_present_step_of_opportunistic_reasoning'.

Lexical Definition of "Candidates of the 'Rules-for-Reasoning'" (Part 2: In the Case of Backward Reasoning)

A rule which can be possibly used as a 'rules-for-reasoning' is called a "candidates of the 'rules-for-reasoning'". Especially when backward reasoning is being carried out, I call 'Hypothetical propositions possibly used in backward reasoning' a "candidates of the 'rules-for-reasoning'".

The lexical definition of 'rules-for-reasoning' in the case of backward reasoning has already given in the present invention.

The contents of the lexical definition of 'hypothetical propositions possibly used in forward reasoning' plus the lexical definition of "candidates of the 'rules-for-reasoning'" is schematically shown in FIG. 15.

Lexical Definition of Query to Get the "candidates of the 'Rules-for-Reasoning'" (Part 2: In the Case of Backward Reasoning)

The query which appeared in the lexical definition of 'hypothetical propositions possibly used in backward reasoning' is a query to get the "candidates of the 'rules-for-reasoning'", in the case of backward reasoning.

The lexical definition of "candidates of the 'rules-for-reasoning'", in the case of backward reasoning has just given in the present invention.

Lexical Definition of 'Descriptors' that are Used to Make a Query to Get the "Candidates of the 'Rules-for-Reasoning'" (Part 2: In the Case of Backward Reasoning)

The 'descriptors' which appeared in the lexical definition of 'hypothetical propositions possibly used in backward reasoning' are 'descriptors' that are used to make a query to get the "candidates of the 'rules-for-reasoning'", in the case of backward reasoning.

The lexical definition of query to get the "candidates of the 'rules-for-reasoning'", in the case of backward reasoning has just been given in the present invention.

Lexical Definition of 'Names-of-Classification-Items' that are Used to Make a Query to Get the "Candidates of the 'Rules-for-Reasoning'" (Part 2: In the Case of Backward Reasoning)

The 'names-of-classification-items' which appeared in the lexical definition of 'hypothetical propositions possibly used in backward reasoning' are 'names-of-classification-items' that are used to make a query to get the "candidates of the 'rules-for-reasoning'", in the case of backward reasoning.

The lexical definition of query to get the "candidates of the 'rules-for-reasoning'", in the case of backward reasoning has just been given in the present invention.

3.3.11.2.3.4.2.1. Retrieval of "Candidates of the 'Rules-for-Reasoning'":

At the beginning of the procedure for forward reasoning, it is recommended that rules expressed as a key described in "sentence pattern of physical and/or mathematical rules" and/or in "sentence pattern of function" should be used as the target of the retrieval of the 'hypothetical propositions possibly used in backward reasoning'. This retrieval corresponds to the sentence in Formula. 4, Retrieve_'Hypothetical__propositions__possibly__used__in__backward__reasoning'__by__using__ optimized_'descriptors',__optimized__'names-of-classification-items',__

'next-best-natural-nouns',__and/or,__'next-best-natural-verbs'( );__.

It is recommended that keys described in the "sentence pattern of instances of solving problems" should also be used as the target of the retrieval of the 'hypothetical propositions possibly used in backward reasoning'.

In the case when keys in the "sentence pattern of physical and/or mathematical rules", and/or "sentence pattern of function" are used as the target of the retrieval, the keys that are retrieved, of course, may be used as it is, as a 'hypothetical propositions possibly used in backward reasoning'. However, in the case when keys in "sentence pattern of instances of solving problems" are used as the target of the retrieval of the 'hypothetical propositions possibly used in backward reasoning', the situation is not so simple;

First, it is recommended that a key described in "sentence pattern of instances of solving problems" should be retrieved, if the key in "sentence pattern of instances of solving problems" contains at least one hypothetical proposition which is judged to be a 'hypothetical propositions possibly used in backward reasoning'. It is recommended that in this retrieval, too, optimized 'descriptors', optimized 'names-of-classification-items', 'next-best-natural-nouns', and/or, 'next-best-natural-verbs' should be used.

If and when such a key described in "sentence pattern of instances of solving problems" is found, then, it is recommended that following procedure should be carried out by using the key:

That is, the "'hypothetical propositions possibly used in backward reasoning' in the key", of course, may be used as it is as a 'hypothetical propositions possibly used in backward reasoning'.

In addition to this, it is recommended that one should compose a "hand made hypothetical proposition" which is used as a 'hypothetical propositions possibly used in backward reasoning', by combining the, "'hypothetical propositions possibly used in backward reasoning' in the key"

and a "'logical chain composed of hypothetical propositions' in the key" which exist just up stream of the '"hypothetical propositions possibly used in backward reasoning' in the key".

More explicitly speaking, if a "hypothetical proposition"

equals to a hypothetical proposition, whose 'consequence' equals to the 'consequence' of the "'hypothetical propositions possibly used in backward reasoning' in the key", and whose 'presupposition' equals to the 'presupposition' of one of the hypothetical proposition contained in the "'logical chain of hypothetical propositions' in the key", the last hypothetical proposition of which equals to the "'hypothetical propositions possibly used in backward reasoning' in the key", then, the "hypothetical proposition" is judged to be a "hand made hypothetical proposition" used as a 'hypothetical propositions possibly used in backward reasoning'.

If more than two such "'logical chains of hypothetical propositions' in the key" exist, then, of course, the "hand made hypothetical proposition" may be constructed for each of them.

The procedure described above corresponds to the sentence in Formula. 4,

Retrieve__keys__in__"sentence pattern of instances of solving problems"__by__using__ optimized_'descriptors',__optimized__'names-of-classification-items',__

'next-best-natural-nouns',_and/or,__'next-best-natural-verbs',__ and__make__'Hypothetical__propositions__possibly__used__in__backward__reasoning'( );__

Here, I give a lexical definition of "retrieval of the "candidates of the 'rules-for-reasoning'"".

It should be noted that how a

"retrieval of the "candidates of the 'rules-for-reasoning'""

is used in each step of opportunistic reasoning has already explained in "§ 3.3.11.2.3.0. Overview".

Lexical Definition of "Retrieval of the "Candidates of the 'Rules-for-Reasoning'"" (Part 2. In the Case of Backward Reasoning)

The procedure expressed by sentences in Formula. 4, just described above,

Retrieve_'Hypothetical__propositions__possibly__used__in__backward__reasoning'__by__using__ optimized_'descriptors',__optimized__'names-of-classification-items',__

'next-best-natural-nouns',__and/or,__'next-best-natural-verbs'( );__.

Retrieve__keys__in__"sentence pattern of instances of solving problems"__by__using__ optimized_'descriptors',__optimized__'names-of-classification-items',__

'next-best-natural-nouns',_and/or,__'next-best-natural-verbs',__ and__make__'Hypothetical__propositions__possibly__used__in__backward__reasoning'( );__ is a recommended procedure for "retrieval of the "candidates of the 'rules-for-reasoning'"" in the case of backward reasoning.

As described above, it is recommended that, as the basis of data from which

"candidates of the 'rules-for-reasoning'"

are retrieved, keys described using 'means for storing data used as rules', and/or keys described using 'means for storing data about instances of solving problems' should be mainly used. Of course, other keys in the object-oriented knowledge base also may be used (See FIG. 15).

3.3.11.2.3.4.2.2. Means for Retrieving Directly Hypothetical Propositions to be Used in Backward Reasoning As a first measures to deal with the case when too many 'hypothetical propositions possibly used in backward reasoning' are retrieved, i.e. when combinatorial explosion occurs, first, it is recommended that the 'hypothetical propositions to be used in backward reasoning', not the 'hypothetical propositions possibly used in backward reasoning', should be directly retrieved. The procedure described above corresponds to the sentence in Formula. 4,

```
if( too many 'hypothetical proposition possibly used in backward
reasoning' are retrieved,
i.e. a combinatorial explosion occurs )
{
  Retrieve__directly__
  'Hypothetical__propositions__to__be__used__in__backward__
  reasoning'( ) ;__
```

The last function in this sentence is a function that expresses @[algorithm of retrieving directly 'Hypothetical propositions to be used in backward reasoning'].

Lexical Definition of @[Algorithm of Retrieving Directly 'Hypothetical Propositions to be Used in Backward Reasoning']

An algorithm with which all the 'hypothetical propositions' in the knowledge base from whose 'consequence' the

'presupposition' of the

'hypothetical__proposition__ which__is__the__target__of__the__present__step__of__opportunistic__reasoning', is judged to be derived by using @[algorithm of sentence based object-oriented categorical syllogism] and/or @[algorithm of sentence based object-oriented hypothetical syllogism], are retrieved, is @[algorithm of retrieving directly 'Hypothetical propositions to be used in backward reasoning'].

And in the case when a key described in "sentence pattern of instances of solving problems" which contains at least one hypothetical proposition which is judged to be a 'hypothetical propositions to be used in backward reasoning', is regarded as the target of the retrieval, it is recommended that one should compose a "hand made hypothetical proposition" which is used as a 'hypothetical propositions to be used in backward reasoning', by combining the "'hypothetical propositions to be used in backward reasoning' in the key"

and a "'logical chain composed of hypothetical propositions' in the key" which exist just up stream of the "'hypothetical propositions to be used in backward reasoning' in the key".

This way to obtain a "hand made hypothetical proposition" which is used as a 'hypothetical propositions to be used in backward reasoning', is @[algorithm of retrieving directly 'Hypothetical propositions to be used in backward reasoning'].

Lexical Definition of Means for Retrieving Directly Hypothetical Propositions to be Used in Backward Reasoning (Part 2. Backward Reasoning)

@[Algorithm of retrieving directly 'Hypothetical propositions to be used in backward reasoning'] and/or something that stores the information of it, is a means for retrieving directly Hypothetical propositions to be used in backward reasoning.

@[Algorithm of retrieving directly 'Hypothetical propositions to be used in backward reasoning'] is a mechanism of reasoning used in an object-oriented knowledge base system disclosed in the present invention.

Lexical Definition of "Means for Retrieving Directly the 'Rules-for-Reasoning'" (Part 2. in the Case of Backward Reasoning Means for retrieving directly Hypothetical propositions to be used in backward reasoning is equal to a "means for retrieving directly the 'rules-for-reasoning'"

in the case when backward reasoning is carried out.

It should be noted that how a

"means for retrieving directly the 'rules-for-reasoning'"

is carried out in each step of opportunistic reasoning has already explained in "§ 3.3.11.2.3.0. Overview".

As mentioned just before in the lexical definition of @[algorithm of retrieving directly 'Hypothetical propositions to be used in forward reasoning'], it is recommended that 'means for carrying out sentence based object-oriented categorical syllogism' and/or 'means for carrying out sentence based object-oriented hypothetical syllogism' should be used when "means for retrieving directly the 'rules-for-reasoning'" is embodied (See FIG. 18). And as the basis of data on which "means for retrieving directly the 'rules-for-reasoning'" is carried out, it is recommended that 'ideal thesaurus', 'ideal classification table', and, 'hypothetical proposition which is the target of the present step of opportunistic reasoning' should be used (See FIG. 18).

And it is recommended that keys described using 'means for storing data used as rules', and/or keys described using 'means for storing data about instances of solving problems', should be used as the basis of data from which 'rules-for-reasoning' should be retrieved.

Still more explicit explanation for the judgment made in @[algorithm of retrieving directly 'Hypothetical propositions to be used in backward reasoning'] is as follows:

If and when the 'consequence' of the

'hypothetical_proposition_ which_is_the_target_of_the_present_step_of_opportunistic_reasoning', is a categorical proposition, then, it is recommended that the user of the system should make use of the procedure outlined in Formula. 15A+Formula. 15B+Formula. 15C+Formula. 15D, which is a quasi-C code which outlines the procedure to judge whether a proposition is a "conclusion of a 'object-oriented categorical syllogism described by @[algorithm of sentence based object-oriented categorical syllogism]' for a major premise" or not. It should be noted that Formula. 15A is the main part of the procedure. If and when this procedure outlined in Formula. 15A+Formula. 15B+Formula. 15C+Formula. 15D is made use of, then, the 'consequence' of a 'hypothetical propositions' in the knowledge base should be provided with as the 'Major Premise' for the procedure outlined in Formula. 15A, and, the 'consequence' of the 'hypothetical_proposition_ which_is_the_target_of_the_present_step_of_opportunistic_reasoning', should be regarded as the proposition judged by the procedure outlined in Formula. 15A, i.e. should be regarded as the 'Candidate For Conclusion' in Formula. 15A, For detail, see Formula. 15A, first, and then, see Formula. 15B+Formula. 15C+Formula. 15D, which are linked to Formula. 15A.

And if and when the 'consequence' of the

'hypothetical_proposition_ which_is_the_target_of_the_present_step_of_opportunistic_reasoning', is a hypothetical proposition, then, it is recommended that the user of the system should make use of the procedure outlined in Formula. 16, which is a quasi-C code which outlines the procedure to judge whether a proposition is a "conclusion of a 'hypothetical syllogism described by @[algorithm of sentence based object-oriented hypothetical syllogism]'" or not when a major premise is given.

When this procedure outlined in Formula. 16 is made use of, then, the 'consequence' of a 'hypothetical propositions' in the knowledge base should be provided with as the 'Major Premise' for the procedure outlined in Formula. 16.

and, the 'consequence' of the

'hypothetical_proposition_ which_is_the_target_of_the_present_step_of_opportunistic_reasoning', should be regarded as the proposition judged by the procedure outlined in Formula. 16, i.e., should be regarded as the 'Candidate For Conclusion', For detail, see Formula. 16.

Here, the procedure with which to use, in the step of the backward reasoning, the keys described in "sentence pattern of physical and/or mathematical rules" and/or in "sentence pattern of function" as a rule, and the procedure with which, in the step of the backward reasoning, to obtain a rule by using a key described in "sentence pattern of instances of solving problems", both of which are used to implement the function in Formula. 4, Retrieve_directly_'Hypothetical_propositions_to_be_used_in_backward_reasoning'( );_, are the same as the procedure with which to use, in the step of the backward reasoning, the keys described in "sentence pattern of physical and/or mathematical rules" and/or in "sentence pattern of function" as a rule, and the procedure with which, in the step of the backward reasoning, to obtain a rule by using a key described in "sentence pattern of instances of solving problems", both of which I have already disclosed in the present invention to show the way to get 'hypothetical propositions possibly used in forward reasoning' by using optimized 'descriptors', optimized 'names-of-classification-items', 'next-best-natural-nouns', and/or, 'next-best-natural-verbs', which I have described by now in the present invention,

3.3.11.2.3.4.2.3. 'Means for Narrowing Down the Target 'Descriptors'' and 'Means for Narrowing Down the Target 'Names-of-Classification-Items''

If and when the first direct measures described just above failed, then another measures should be taken to deal with the case when too many 'hypothetical propositions possibly used in backward reasoning' are retrieved, i.e. when combinatorial explosion occurs.

That is, if and when the first direct measures failed, it is recommended that a process according to @[algorithm of narrowing down the target 'descriptors' and/or target 'names-of-classification-items'] should be carried out. The lexical definition of @[algorithm of narrowing down the target 'descriptors' and/or target 'names-of-classification-items'], the lexical definition of 'means for narrowing down the target 'descriptors'', and the lexical definition of 'means for narrowing down the target 'names-of-classification-items'' have already given in the present invention.

The procedure described above corresponds to the sentence in Formula. 4, if(combinatorial explosion now and/or in the future still can not be avoided)

-continued

```
{
  Revise__
  optimized__'descriptors',__optimized__'names-of-classification-items',__
  'next-best-natural-nouns',__and/or,__'next-best-natural-verbs'
  by__
  Carring__out__a__process__according__to__@[algorithm
  of narrowing down the target
  'descriptors' and/or target 'names-of-classification-items']__
  if__necessary__And__Retrieve__again,__
  'Hypothetical__propositions__possibly__used__in__backward__
  reasoning'__by__using__the__revised__
  'descriptors',__'names-of-classification-items',__
  'next-best-natural-nouns',__and/or,__'next-best-natural-verbs'( ) ;__.
```

The retrieval which is described in this sentence in Formula. 4 as,

And__Retrieve__again,__

'Hypothetical_propositions__possibly__used__in__backward__reasoning'__ by__using__the__revised__

'descriptors',__'names-of-classification-items',__

'next-best-natural-nouns',__and/or,__'next-best-natural-verbs', is used as the

『retrieval to be made in the present steps』, which appears in the lexical definition of @[algorithm of narrowing down the target 'descriptors' and/or target 'names-of-classification-items'].

And the retrieval which is described in the previous sentence in Formula. 4 as,

Retrieve__keys__in__"sentence pattern of instances of solving problems"__by__using__ optimized_'descriptors',__optimized__'names-of-classification-items',__

'next-best-natural-nouns',_and/or,__'next-best-natural-verbs',__ and__make__'Hypothetical__propositions__possibly__used__in__backward__reasoning'( );__ is used as the

『retrieval made in the preceding step』, which appeared in the lexical definition of @[algorithm of narrowing down the target 'descriptors' and/or target 'names-of-classification-items'].

That is, roughly speaking, in the process according to @[algorithm of narrowing down the target 'descriptors' and/or target 'names-of-classification-items'], first, it is recommended that reconsideration should be carried out about the optimization made previously in the main routine and/or made in the previous step of opportunistic reasoning; That is, it is recommended that revised optimization should be made all over again for 'descriptors' and for 'names-of-classification-items', and then, appropriately revised 'next-best-natural-nouns', and/or, 'next-best-natural-verbs' should be contrived all over again. Then, it is recommended that a new retrieval of 'hypothetical propositions possibly used in backward reasoning' by using these revised 'descriptors', revised 'names-of-classification-items', revised 'next-best-natural-nouns', and/or, revised 'next-best-natural-verbs' should be carried out. It is expected that less number of 'hypothetical propositions possibly used in forward reasoning' should be obtained in the revised retrieval, and therefore, the combinatorial explosion should be avoided.

3.3.11.2.3.4.2.4. 'Means for Fusing Propositions'

If the opportunistic reasoning should reach a deadlock in a later step of opportunistic reasoning, after the process according to @[algorithm of narrowing down the target 'descriptors' and/or target 'names-of-classification-items'] has been carried out in the previous step of opportunistic reasoning, then, it is recommended that the process carried out according to the @[algorithm of narrowing down the target 'descriptors' and/or target 'names-of-classification-items']

should be withdrawn, and that process according to @[algorithm of fusing propositions] should be carried out.

The lexical definition of @[algorithm of fusing propositions] and 'means for fusing propositions' have already given in the present invention.

Here, as the 『propositions which should be fused』 in the lexical definition of @[algorithm of fusing propositions], the 'presupposition' of the 'hypothetical propositions possibly used in backward reasoning' that were retrieved in the present step of backward reasoning before the process according to @[algorithm of narrowing down the target 'descriptors' and/or target 'names-of-classification-items'] was carried out should be used: In other words, 'presuppositions' of the 'hypothetical propositions possibly used in backward reasoning' that were retrieved in the following sentences in Formula. 4, in the present step of backward reasoning, 'Retrieve_'Hypothetical__propositions__possibly__used__in__backward__reasoning'__by__using__ optimized_'descriptors',__optimized__'names-of-classification-items',__

'next-best-natural-nouns',__and/or,__'next-best-natural-verbs'( );__

Retrieve__keys__in__"sentence pattern of instances of solving problems"__by__using__ optimized_'descriptors',__optimized__'names-of-classification-items',__

'next-best-natural-nouns',_and/or,__'next-best-natural-verbs',__ and__make__'Hypothetical__propositions__possibly__used__in__backward__reasoning'( );__ should be used as the 『propositions which should be fused』 in the lexical definition of @[algorithm of fusing propositions].

And as the output of the procedure according to @[algorithm of fusing propositions], 『fused hypothetical propositions to be used in the present step of backward reasoning』 is obtained.

The procedure described above corresponds to the sentence in Formula. 4,

```
if(combinatorial explosion now and/or in the future still can not be
avoided)
{
  Withdraw__the__process__carried__out__according__to__the__
  @[algorithm of narrowing down the target 'descriptors' and/or target
  'names-of-classification-items']__
  and__
  Carry__out__a__process__according__to__
  @[algorithm of fusing propositions]__to__the__'presuppositions'__
  of__the__'Hypothetical__propositions__possibly__used__in__
```

-continued

```
  backward__reasoning'__
  if__necessary( ) ;__
}
```

Exactness of reasoning is often seriously lost when a procedure according to @[algorithm of fusing propositions] is carried out. So it is recommended that it should be carried out only in above mentioned situation. Therefore, it is recommended that the @[algorithm of fusing propositions] should be carried out only when combinatorial explosion can not be avoided only by carrying out @[algorithm of narrowing down the target 'descriptors' and/or target 'names-of-classification-items'] and/or @[algorithm of narrowing down the target 'descriptors' and/or target 'names-of-classification-items'] should be withdrawn in a later step.

3.3.11.2.3.4.2.5. 'Means for Broadening out the Target 'Descriptors'' and 'Means for Broadening Out the Target 'Names-of-Classification-Items''

On the contrary when too less number of 'hypothetical propositions to be used in reasoning of the present step' are obtained, it is recommended that @[algorithm of broadening out the target 'descriptors' and/or target 'names-of-classification-items'] should be carried out. I have already given the lexical definition of @[algorithm of broadening out the target 'descriptors' and/or target 'names-of-classification-items'], the lexical definition of 'means for broadening out the target 'descriptors'', and the lexical definition of 'means for broadening out the target 'names-of-classification-items'', in the present invention.

The retrieval which is described in the sentence in Formula. 4 as,

And__Retrieve__again,__

'Hypothetical_propositions__possibly__used__in__backward__reasoning'__ by__using__the__revised__

'descriptors',__'names-of-classification-items',__

'next-best-natural-nouns',__and/or,__'next-best-natural-verbs', is used as the

『retrieval to be made in the present step』 which appears in the lexical definition of @[algorithm of broadening out the target 'descriptors' and/or target 'names-of-classification-items'].

And the retrieval which is described in the sentence in Formula. 4 as,

Retrieve_'Hypothetical__propositions__possibly__used__in__backward__reasoning'__by__using__ optimized_'descriptors',__optimized__'names-of-classification-items',__

'next-best-natural-nouns',__and/or,__'next-best-natural-verbs'( );__

Retrieve__keys__in__"sentence pattern of instances of solving problems"__by__using__ optimized_'descriptors',__optimized__'names-of-classification-items',__

'next-best-natural-nouns',_and/or,__'next-best-natural-verbs',__ and__make__'Hypothetical__propositions__possibly__used__in__backward__reasoning'( );__ is used as the

『retrieval made in the preceding step』, which appears in the lexical definition of @[algorithm of broadening out the target 'descriptors' and/or target 'names-of-classification-items'].

That is, roughly speaking, in the process according to @[algorithm of broadening out the target 'descriptors' and/or target 'names-of-classification-items'], first, it is recommended that reconsideration should be carried out as for the optimization made previously in the main routine and/or made in the previous step of opportunistic reasoning; That is, it is recommended that revised optimization should be made all over again for 'descriptors' and for 'names-of-classification-items', and then, appropriately revised 'next-best-natural-nouns', and/or, 'next-best-natural-verbs' should be contrived all over again. Then, it is recommended that a new retrieval of 'hypothetical propositions possibly used in backward reasoning' by using these revised 'descriptors', revised 'names-of-classification-items', revised 'next-best-natural-nouns', and/or, 'next-best-natural-verbs' should be carried out.

As the result, it is expected that more number of 'hypothetical propositions possibly used in backward reasoning' should be obtained in the new retrieval, and therefore, the deadlock should be avoided.

This procedure given above corresponds to the sentence in Formula. 4,

```
if( too less 'hypothetical propositions possibly used in backward
    reasoning' are retrieved
{
    Carry__out__@[algorithm of broadening out the target 'descriptors'
    and/or target 'names-of-classification-items']__
    And__Retrieve__again,__
    'Hypothetical__propositions__possibly__used__in__backward__
    reasoning'( ) ;__.
```

3.3.11.2.3.4.2.6. "Means for Picking Up Only the 'Rules-for-Reasoning' From the "Candidates of the 'Rules-for-Reasoning''''

Lexical Definition of @[Algorithm for Eliminating the Noise of the Retrieval of 'Hypothetical Propositions Possibly Used in Backward Reasoning']

In cases when a procedure according to @[algorithm of fusing propositions] has not been carried out, it is recommended that whether a 'hypothetical propositions possibly used in backward reasoning', which is retrieved in the present step of opportunistic reasoning is strictly a 'hypothetical propositions to be used in backward reasoning' or not, should be verified by the user of the system.

And only 'hypothetical propositions possibly used in backward reasoning' that is judged to be a 'hypothetical propositions to be used in backward reasoning' should be used in the backward reasoning in the present step of opportunistic reasoning. The algorithm for this verification is @[algorithm for eliminating the noise of the retrieval of 'hypothetical propositions possibly used in backward reasoning']. It is recommended that @[algorithm of sentence based object-oriented categorical syllogism] and/or @[algorithm of sentence based object-oriented hypothetical syllogism] should be used to embody @[algorithm for eliminating the noise of the retrieval of 'hypothetical propositions possibly used in backward reasoning']. And as the basis of data on which @[algorithm for eliminating the noise of the retrieval of 'hypothetical propositions possibly used in backward reasoning'] is carried out, it is recommended that 'ideal thesaurus', 'ideal classification table', and, 'hypothetical proposition which is the target of the present step of opportunistic reasoning' should be used. The detail of a recommended embodiment of @[algorithm for eliminating the noise of the retrieval of 'hypothetical propositions possibly used in backward reasoning'] is outline by using a quasi-C code shown in Formula. 18, for the ideal case in which the hypothetical proposition to be used in backward reasoning is described exactly according a mathematically perfect format.

Lexical Definition of Means for Eliminating the Noise of the Retrieval of Hypothetical Propositions Possibly Used in Backward Reasoning @[Algorithm for eliminating the noise of the retrieval of 'hypothetical propositions possibly used in backward reasoning'] and/or something that stores the information of it, is a means for eliminating the noise of the retrieval of hypothetical propositions possibly used in backward reasoning.

Lexical Definition of "Means for Picking Up Only the 'Rules-for-Reasoning' From the "Candidates of the 'Rules-for-Reasoning'"" (Part 2. In the Case of Backward Reasoning)

Means for eliminating the noise of the retrieval of hypothetical propositions possibly used in backward reasoning equals to "means for picking up only the 'rules-for-reasoning' from the "candidates of the 'rules-for-reasoning'"", in the case of backward reasoning.

It should be noted that how a

"means for picking up only the 'rules-for-reasoning' from the "candidates of the 'rules-for-reasoning'""

is carried out in each step of opportunistic reasoning has already explained in "§ 3.3.11.2.3.0. Overview".

As mentioned just before in the lexical definition of @[algorithm for eliminating the noise of the retrieval of 'hypothetical propositions possibly used in backward reasoning'], it is recommended that 'means for carrying out sentence based object-oriented categorical syllogism' and/or 'means for carrying out sentence based object-oriented hypothetical syllogism' should be used when "means for picking up only the 'rules-for-reasoning' from the "candidates of the 'rules-for-reasoning'"" is embodied (See FIG. 16). And as the basis of data on which "means for picking up only the 'rules-for-reasoning' from the "candidates of the 'rules-for-reasoning'"" is carried out, it is recommended that 'ideal thesaurus', 'ideal classification table', and, 'hypothetical proposition which is the target of the present step of opportunistic reasoning' should be used (See FIG. 16).

In cases when a procedure according to @[algorithm of fusing propositions] has been carried out, it is recommended that the 『fused hypothetical propositions to be used in the present step of backward reasoning』 should be used as it is as a 'hypothetical propositions to be used in backward reasoning' without any verification in the present step of opportunistic reasoning. It is recommended that the verification should be done after the final approximate answer will have been obtained, in this case.

These procedure corresponds to the sentence in Formula. 4,

Unless_@[algorithm of fusing propositions]_has_not_been_carried_out_

Choose_the_'hypothetical_propositions_to_be_used_in_backward_reasoning'_out_of_the 'Hypothetical_propositions_possibly_used_in_backward_reasoning'_

And_else_if_@[algorithm of fusing propositions]_has_been_carried_out_,

Use_『fused hypothetical propositions to be used in the present step of backward reasoning』 _as_it_is as_the_'hypothetical_propositions_to_be_used_in_backward_reasoning'_( );_

3.3.11.2.3.4.2.7. @[Algorithm for Determining the Hypothetical Proposition Which is to be Used as the Target of the Next Step of Opportunistic Reasoning] (Part 2: in the Case of Backward Reasoning)

It is recommended that the hypothetical proposition which is to be used as the target of the next step of opportunistic reasoning should be determined on the basis of the 'hypothetical propositions to be used in backward reasoning', which have bee used in the 'hypothetical syllogism carried out in the present step of opportunistic reasoning' and on the basis of the 'hypothetical_proposition_ which_is_the_target_of_the_present_step_of_opportunistic_reasoning' by using @[algorithm of sentence based object-oriented categorical syllogism] and/or @[algorithm of sentence based object-oriented hypothetical syllogism].

This procedure corresponds to the sentence in Formula. 4,

Determine_the_hypothetical_propositions_ which_are_to_be_used_ as_the_target_of_the_next_step_of_opportunistic_reasoning_ on_the_basis_ of_the_'hypothetical_propositions_to_be_used_in_backward_reasoning'_ in_the_present_step_of_opportunistic_reasoning and_ of_a_hypothetical_proposition_ which_is_the_target_of_the_present_step_of_backward_reasoning of_opportunistic_reasoning_ by_using_

@[algorithm of sentence based object-oriented categorical syllogism]_and_

@[algorithm of sentence based object-oriented hypothetical syllogism]_backward( );_.

Detail procedures for the instructions described by this sentences is given in Formula. 5B. This function shown just above is a function representing @[algorithm for determining the hypothetical proposition which is to be used as the target of the next step of opportunistic reasoning] in the case of backward reasoning.

Lexical Definition of @[Algorithm for Determining the Hypothetical Proposition Which is to be Used as the Target of the Next Step of Opportunistic Reasoning] (Part 2: in the Case of Backward Reasoning)

As I have just mentioned, a recommended procedures for @[algorithm for determining hypothetical propositions which are to be used as the target of the next step of opportunistic reasoning] carried out in the case of backward reasoning is given in Formula. 5B.

That is, in the case of backward reasoning, a hypothetical proposition that is to be used as the target of the next step of opportunistic reasoning is, in an ideal case, a hypothetical proposition whose 'consequence' is equal to the 'presupposition' of a 'hypothetical proposition to be used in backward reasoning' that was used in the reasoning of the present step of opportunistic reasoning, and whose 'presupposition' is equal to the 'presupposition' of the 'hypothetical_proposition_ which_is_the_target_of_the_present_step_of_ opportunistic_reasoning'.

@[Algorithm for determining hypothetical proposition which is to be used as the target of the next step of opportunistic reasoning] is a mechanism of reasoning used in an object-oriented knowledge base system disclosed in the present invention.

Lexical Definition of "Means for Determining Hypothetical Propositions Which are to be Used as the Target of the Next Step of Opportunistic Reasoning"

@[Algorithm for determining hypothetical propositions which are to be used as the target of the next step of opportunistic reasoning], to which I have given the lexical meaning both in the case of forward reasoning and in the case of backward reasoning, is equal to a "means for determining hypothetical propositions which are to be used as the target of the next step of opportunistic reasoning".

It should be noted that how a

"means for determining hypothetical propositions which are to be used as the target of the next step of opportunistic reasoning"

is carried out in each step of opportunistic reasoning has already explained in "§ 3.3.11.2.3.0. Overview".

It is recommended that

'rules-for-reasoning' and

Figure 17:
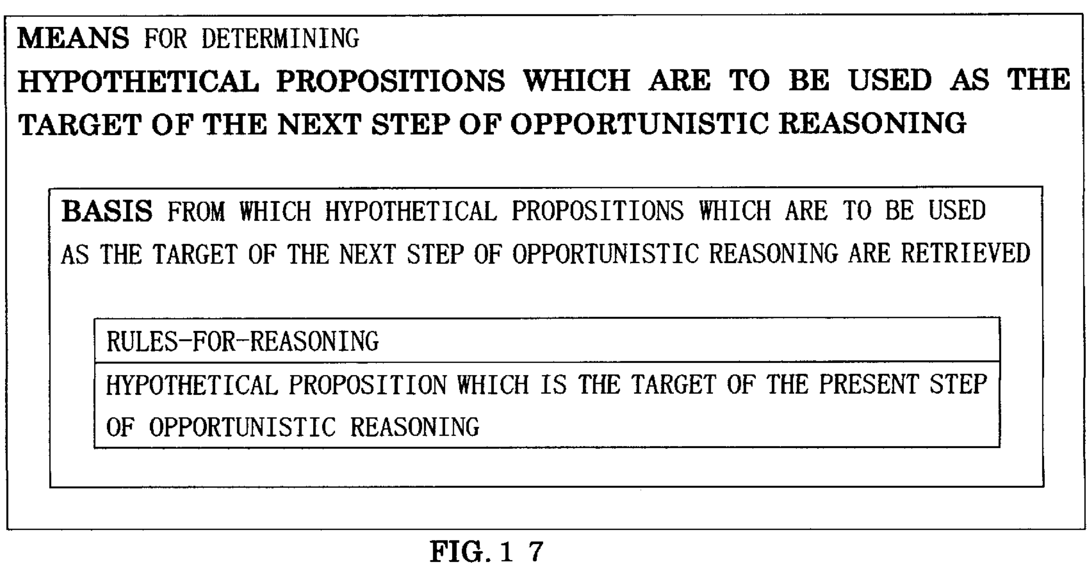
FIG. 17 shows a recommended constitution of 'means for determining the hypothetical propositions which are to be used as the target of the next step of opportunistic reasoning'.

'hypothetical_proposition_ which_is_the_target_of_the_present_step_of_ opportunistic_reasoning'should be used, as the basis from which hypothetical propositions that are to be used as the target of the next step of opportunistic reasoning are retrieved (See FIG. 17).

Lexical Definition of a hypothetical proposition which is to be used as the target of the next step of opportunistic reasoning A hypothetical proposition determined by @[algorithm for determining hypothetical propositions which are to be used as the target of the next step of opportunistic reasoning] is a hypothetical proposition which is to be used as the target of the next step of opportunistic reasoning.

As mentioned before, the problem is judged to be solved when at least one hypothetical proposition that is to be used as the target of the next step of opportunistic reasoning, is judged to be trivial.

In the case when the 'presupposition' is an empty set, the problem is judged to be solved when the 'presupposition' of the major premise of the hypothetical syllogism carried out in the next step is a well known theorem and/or axiom.

This corresponds to a sentence in Formula. 2,

```
if( Problem is solved )
{
  break ;_
}.
```

In the case when there is a step of forward and/or backward reasoning in which the exactness is lost by for example the execution of @[algorithm of fusing propositions], it is recommended that all the steps of the theorem proving should be reconstructed by a series of more exact steps of opportunistic reasoning all over again as a verification for the sake of exactness. This procedure corresponds to /* Verification of the Result of above Opportunistic Reasoning */

Re-prove_all_the_steps_of_the_proof_by_a_ series_of_steps_of_more_exact_opportunistic_ reasoning( );_in Formula. 2.

2.3.12. Recommended Way to Use and/or Make an Object-Oriented Knowledge Base System Disclosed in the Present Invention In the present invention, I regard a procedure with which the knowledge described in a document using natural language is translated into sentences described by using systematic data structures, such as, "sentence pattern of association", "sentence pattern of 'ideal thesaurus'", "sentence pattern of implementation of names of algorithms-of-processes", "sentence pattern of classification", "sentence pattern of physical and/or mathematical rules", "sentence pattern of function", and "sentence pattern of definition of object"

and as the basis of which background knowledge, understanding of consistency in grammatical restriction such as gender and number, linking of pieces of descriptions in the document are used, as, a procedure with which the essence of a sentence written in natural language (e.g. title and synopsis of a scientific paper) is logically understood.

Lexical Definition of 'Knowledge Molecule'

I regard thus formalized sentence describing the element of a knowledge as the fundamental unit of knowledge, and call it a 'knowledge molecule'. This 'knowledge molecule' can be readily used as a building block of body of association and/or inference.

A sentence having a data structure defined in the present invention is suitable to be used to describe fundamental unit of proposition (i.e. to describe a building block) in the 'propositional representation theory' in cognitive psychology (◎"Gurafikku Ninchi shinrigaku", p.174).

I claim that a 'knowledge molecule' is suitable to be used as a key of data stored in an object-oriented knowledge base system disclosed in the present invention.

The systematic data structure includes the negative form of above mentioned fundamental sentence patterns. In other words, a negative sentence containing 'do not' and/or 'is not', etc., described in above mentioned fundamental sentence patterns, may be used as a fact and/or as a rule. It is recommended that a predicate logic should be made full use of. For example, it is recommended that a rule to lead contraposition of a sentence from other sentence should made full use of, and should be described using a sentence in "sentence pattern of physical and/or mathematical rules" and/or in "sentence pattern of function", if a negative sentence is used as a rule and/or as a fact.

It is recommended that the synopsis, the section of introduction, the theory, and the experiment of a scientific paper and/or its equivalent, should be translated into 'knowledge molecules' by a knowledge engineer, when a scientific information is to be stored in an object-oriented knowledge base system disclosed in the present invention.

INDUSTRIAL APPLICABILITY

3.4. CAD for Coding of Computer Programs

This time, I regard subroutines and programs as a function that connects the input to the output. In other words, it is recommended that a sentence described in "sentence pattern of function" should be used as an interfaces of subroutines and/or as an interfaces of programs. Following discussions will show that this is equivalent to the stand point of view in which an object-oriented knowledge base system disclosed in the present invention is regarded as an CAD (Computer Aided Design) that aids the coding of computer program.

For example, let us assume that we want to code a computer program that gives the output, 'C', if and when one gives the computer program an input 'A':.

Let us assume that if we succeed in retrieving a subroutine '(1)', which gives output 'B' if and when one gives '(1)' an input 'A', and a subroutine '(2)', which gives output 'C' if and when one gives '(2)' an input is 'B', from an object-oriented knowledge base system disclosed in the present invention: That is, in this situation, two keys described in "sentence pattern of function", __FUNCTION__subroutine '(1)'_translate__INPUT__'A__into__OUTPUT__'B';__ __FUNCTION__subroutine '(2)'__translate__INPUT__'B'__into__OUTPUT__'C';__are retrieved from an object-oriented knowledge base system disclosed in the present invention.

As mentioned before, a sentence described in "sentence pattern of function" is called a 'means for describing a function used as a rule'. It should be noted that here, the name of a subroutine is used as the name of the function used in a 'means for describing a function used as a rule'(See FIG. 7).

If, the subroutine '(1)' and the subroutine '(2)' are arranged in this order in a computer program, then, this computer program is expected to work well as the computer program that we wanted to code.

I claim that this simple idea is of great help of coding a computer program. For example, if and when too many keys possibly to be used as a subroutine are retrieved during these retrieval, it is recommended that @[algorithm of narrowing down the target 'descriptors' and/or target 'names-of-classification-items'] and/or @[algorithm of fusing propositions] should be used to prevent combinatorial explosion. And as another example, if and when too less keys possibly used as a subroutine are retrieved, then, it is recommended that @[algorithm of broadening out the target 'descriptors' and/or target 'names-of-classification-items'] should be carried out.

There exists usually a nesting structure (◎"C gengo puroguramingu" p.51) in a usual code of computer programs.

If, in an object-oriented knowledge base system disclosed in the present invention, many subroutines are stored as a data that has a keys described in the "sentence pattern of function", then the object-oriented knowledge base system can be used as a CAD for coding a computer programs.

When a parallel processing computer program is coded, the coding technique of single task computer program is rehashed and used to solve the problem. The fundamental strategy is to regard the computer used as the platform of a multi task program as a finite state machine.

We discuss without losing the generality, about an coding of an application program '$P_A$', which includes three parallel processes, 'X1', 'X2', and 'X3'. If the number of state of process 'X1' equals to 'N1', the number of state of process 'X2' equals to 'N2', and the number of states of process 'X3' equals to 'N3', then application program '$P_A$' may have up to N1×N2×N3 states at maximum.

Each 'state' distinguished in usual flow charts is an example of a unit with which to count such number of states of a process, and/or of an application program.

Thus, during the job of application program '$P_A$', the computer can be regarded as a finite state machine which may have up to N1×N2×N3 states.

An algorithm of a finite states machine can be constructed by means of top-down task analysis method (◎"C gengo puroguramingu" p.61), and therefore, can be coded as if it were a single task program by using an object-oriented knowledge base system disclosed in the present invention.

In the present invention, I disclose a programming technique based on structured coding technique in which objects are defined and made full use of. That is, I claim that if "sentence pattern of function" and "sentence pattern of definition of object" are systematically used, then, object-oriented programming technique (◎"C++ nyumon kani puroguramingu gaido") and structured coding technique can be unified and used systematically in a style of coding of a computer programming.

If a source code is written in object-oriented style, then, a programmer can find out easily a function (i.e. a subroutine) he wants out of codes written by him and/or out of codes written by other programmers. If and when very big computer program is coded by many programmers, then, object-oriented style is a recommended style of coding. That is, I claim that object-oriented programming is essentially a method in which a source code is regarded as an object-oriented database, and as the result, the retrieval of a necessary function is made easier. A code of a computer program can be stored in an 'object-oriented knowledge base' disclosed in the present invention, if a function (i.e. a subroutine) is recorded as a data whose interface is recorded using a sentence in "sentence pattern of function" and is used as the key of the data.

It is recommended that even a multi process computer program should be coded on the basis of the structured coding method according to the top down task analysis method if an object oriented knowledge base system disclosed in the present invention is used as a CAD for coding of the program.

An object-oriented knowledge base system disclosed in the present invention has an advantage characteristic to an object-oriented database because it uses "sentence pattern of definition of object" and "sentence pattern of 'ideal thesaurus'". In addition, the present object-oriented knowledge base system has an advantage characteristic to a knowledge base because it uses @[algorithm of sentence based object-oriented categorical syllogism] and @[algorithm of sentence based object-oriented hypothetical syllogism].

A detailed example in which the present object-oriented knowledge base system will be shown later in the present invention.

3.4.1. Example in Which a Knowledge Base System is Applied to a Practical Case of Computer Programming Next, I will show a practical example in which an object oriented knowledge base system disclosed in the present invention is used as a CAD that assists coding of computer programs.

Let me show an example in which a school teacher has made up his mind to code a computer program to calculate the average grade in his class on the basis of the examination results of his students by using an object-oriented knowledge base system of the present invention.

According to the top-down task analysis method, it is recommended that the school teacher should clearly define the input and the output of the top task. Here, a top task means the main routine of the computer program to be coded. In the present case, the input is the number of his students (let it be 30 without losing the generality), and the grade of each student. The output is the average grade in his class.

As the term 'average' is a mathematically very well defined term, it is recommended that a backward reasoning should be carried out in the first step of opportunistic reasoning. Let us assume that the teacher consults an 'ideal thesaurus' and finds out that the term '__(average)__' is registered in the ideal thesaurus. And let us assume that the teacher consults keys described in "sentence pattern of 'ideal thesaurus'" in the thesaurus further, and finds out that the 'ideal thesaurus' stores '__(arithmetic average)__' as a narrower descriptor of '__(average)__'. Let us assume that the teacher consult an 'ideal dictionary' of the object-oriented knowledge base system, and found that the '__(arithmetic average)__' rather than '__(average)__' expresses more precisely his idea. Thus, in a word, I have assumed by now that the teacher has succeeded in searching a descriptor that expresses well the content of the teacher's idea.

Then, it is recommended that, among the keys described in "sentence pattern of function", FUNCTION__*__translate__INPUT__*__into__OUTPUT__***;__, stored in the 'object-oriented knowledge base', the teacher should retrieve the keys whose field below '__into__OUTPUT__'contains '__(arithmetic average)__' and/or its broader 'descriptors'. As I described before, a sentence described in "sentence pattern of function" is called a 'means for describing a function used as a rule' in the present invention. Here, it should be noted the field below '__FUNCTION__' (i.e. the name of the function used in 'means for describing a function used as a rule') should contain the name of a subroutine and/or contains the name of a computer program in this case (See FIG. 7).

Let us assume that, among the keys described in the "sentence pattern of function" which are thus retrieved, there exists in the present example a key whose field below__translate__INPUT__contains '__(array of constants)__'. This means that the school teacher succeeded in retrieving a subroutine which transforms an 'array of constants' into 'an arithmetic average'.

Let us assume that the teacher consults the 'ideal thesaurus' and, and he found that 'grade' is a kind of a 'constant'. Then, let us assume that the teacher begins to find a method with which to transform 'constants' into an 'array of constants'. Then, it is recommended that the teacher should try to retrieves a key described in "sentence pattern of function" whose field below '__translate__INPUT__' contains a, '__(constant)__' and/or its broader 'descriptors' and whose field below 'into__OUTPUT__' contains, '__(array of constants)__' and/or its broader 'descriptors'. In other words, the school teacher retrieves a subroutine in which an array is initialized by using constants. Let us assume in the present example that such subroutine is retrieved successfully.

Up to now, we have assumed that the school teacher has obtained 1) a subroutine which initializes array with grades of students, and,
2) a subroutine that gives arithmetic average for an array of constants.

If these subroutines are arranged in this order, then, a backbone of the computer program is obtained. And if and when the details are implemented, then, the coding of the computer program completes.

During such retrievals, it is recommended that @[algorithm of narrowing down the target 'descriptors' and/or target 'names-of-classification-items'] and/or @[algorithm of fusing propositions] should be carried out if and when too many subroutines are retrieved. And it is also recommended that @[algorithm of broadening out the target 'descriptors' and/or target 'names-of-classification-items'] should be carried out if necessary when too less subroutines are retrieved. And if the school teacher dose not think of a usable 'descriptor' by himself, then, it is recommended that he should use @[algorithm of making a list of 'descriptors' ranked in order of hit frequency] to search 'descriptors' associated with a natural word describing the idea of the teacher.

In the present case, it is recommended that the maker of the contents of the knowledge base should make a rich 'ideal thesaurus' in which 'descriptors' representing varieties of types of the variables used as operands of subroutines, such as 'constants', 'array of constants', 'variables', 'array of variables', 'characters', and/or 'array of characters', 'name of other function' etc.

3.5. On-Line Manual and/or On-Line Help of Machines

Handling of contemporary machineries such as word processors, personal computers, and home electric appliances with digital technologies has become more and more complicated. Here, a finite state machines and/or finite automaton is regarded as a 'machine'.

When software and/or firmware is executed on a computer, the computer is working as a finite state machine, because the capacity of storage media for digital computers is finite.

When groupware is used on a computer network system, the computer network system is working a finite state machine, because the capacity of storage media connected to the computer network is finite.

In many cases, an user of a machine must carry out laborious task to make the machine do the motion he wants: The user must consult the manual of the machine, must find the relevant unit operations described separately in different places of the manual, must integrate them in his head, to compose the total process for the operation, and must carry them out the total process on the machine. Only after the procedure described above, the machine works in a desirable way. That is, only after a correct operation is given, the machine makes a series of motion starting from its stopping state and ending with the state of the motion of the machine that the operator desired.

An object-oriented knowledge base system disclosed in the present invention provides a method that is used as aids to this laborious task. For example, an user of a machine 'X' wants the machine 'X' to change its state from its stopping state 'A' to a working state 'D'. The state 'D' is the state of the motion of the machine 'X' which the operator desires.

Let us assume that three keys in described in "sentence pattern of function"

__FUNCTION__ unit operation '(1)' described on 'page (1)' of the on-line manual __translate__INPUT__ stopping state 'A' __into__OUTPUT__ working state 'B', __FUNCTION__ unit operation '(2)' described on 'page (2)' of the on-line manual __translate__INPUT__ working state 'B' __into__OUT__ working state 'C', and __FUNCTION__ unit operation '(3)' described on 'page (3)' of the on-line manual __translate__INPUT__ working state 'C' into__OUT__ working state 'D', should be retrieved as a result of several steps of opportunistic reasoning on an object-oriented knowledge base system disclosed in the present invention, which 'prove' 'D' by using 'A'.

If, unit operation '(1)', unit operation '(2)', and unit operation '(3)' arranged in this order in a sentence, then, the sentence can be used as the procedure with which the operator lets the machine working in state 'D'.

In this case too, it is recommended that @[algorithm of narrowing down the target 'descriptors' and/or target 'names-of-classification-items'] and/or @[algorithm of fusing propositions] should be carried out if and when too many unit operations are retrieved, and that @[algorithm of broadening out the target 'descriptors' and/or target 'names-of-classification-items'] should be carried out if and when too less unit operations are retrieved. And it is recommended that @[algorithm of sentence based object-oriented categorical syllogism] and @[algorithm of sentence based object-oriented hypothetical syllogism] should be used in an opportunistic reasoning with which to get the procedure for the correct operation.

As I described before, a sentence described in "sentence pattern of function" is called a 'means for describing a function used as a rule' in the present invention. Here, it should be noted that the name of an unit operation described in a manual is described in the field after '__FUNCTION__'. That is, the name of an unit operation described in a manual is used as the name of the function used in a 'means for describing a function used as a rule' (See FIG. 7). It is recommended that an on-line manual embodied on the basis of an object-oriented knowledge base system disclosed in the present invention should satisfy following conditions:

1) In an on-line manual of a machine, each unit operation that is distinguishable from other unit operations, should have a name. It is recommended that the maker of the on-line manual should give the name in an explicit and systematic way. In a word, it is recommended that the names should be regarded as a 'names-of-classification-items' and should be registered in a 'classification table' for the on-line manual. An example of such a 'classification table' for a Japanese word processor has already been shown in Formula. 6.

Such a 'classification table' can be regarded as a mathematically sophisticated 'table of contents' of an on-line manual revised so as to be readily used in an object-oriented knowledge base system disclosed in the present invention.

2) In an on-line manual of a machine, it is recommended that each distinguishable working state should be explicitly and systematically named by the maker of the on-line manual. These named should be regarded as 'descriptors' and should be registered in an 'ideal thesaurus'.

This can be expressed more precisely as follows:

If an object-oriented knowledge base system disclosed in the present invention is to be used as an on-line manual, then 1) it is recommended that each name of unit operation should be regarded as a name of a function. In other words, it is recommended that the name of unit operation should be described as a sentence described in "sentence pattern of function", and should be used as a key of the object-oriented knowledge base system disclosed in the present invention, and the name of unit operation should be registered as a 'name-of-classification-item' in a 'classification table', in which higher class 'name-of-classification-items' and lower class 'name-of-classification-items' are defined, 2) it is also recommended that all the working states of that can be used as operands of the function mentioned just above, should be named systematically and explicitly, and registered in an 'ideal thesaurus', in which broader 'descriptors' and narrower 'descriptors' are given, and, 3) It is recommended that a set of data comprising sentences described in "sentence pattern of association" should be given to be used as the basis on which @[algorithm of making a list of 'descriptors' ranked in order of hit frequency] should be carried out to provide the user an appropriate 'descriptor' associated with an natural word given by the user, and/or to be used as the basis on which @[algorithm of making a list of 'names-of-classification-items' ranked in order of hit frequency] should be carried out to provide the user an appropriate 'name-of-classification-item' associated with a natural word given by the user.

I discuss here the manual of Japanese word processor as an example of a manual of a machine.

Let me discuss the 'ideal thesaurus' and the 'classification table' to be used in the on-line manual, first:

When "kanji-kana mixed sentence" is regarded as an 'object', then, it is recommended that either 'kanji' and/or 'kana' should be regarded as an 'individual variable' of this 'object'. And it is recommended that 'to convert half-sized alphanumeric characters to kanji' should be regarded as a 'name-of-classification-item', representing a function that maps 'kanji'. And it is also recommended that 'to convert half-sized alphanumeric characters to kana' should be regarded as a 'name-of-classification-item', representing a function that maps 'kana'. And it is recommended that both of these 'name-of-classification-items' should be registered in the 'classification table' of Formula. 6. It is recommended that 'kanji-kana mixed sentence' should be registered in an 'ideal thesaurus' as a 'descriptor'. And 'to input kanji characters' in a classification table is a higher class 'names-of-classification-items' of 'to convert half-sized alphanumeric characters to kanji'. It should be recommended that 'kanji-kana mixed sentence' should be regarded as a narrower 'descriptor' of 'sentence'.

Such an 'ideal thesaurus' can be regarded as a mathematically sophisticated 'index' of a manual revised so as to be readily used in an object-oriented knowledge base system disclosed in the present invention.

A user of a machine often expresses a moving state of the machine in various words (the problem of polysemous words). Therefore, it is recommended that an author of a manual should prepare enough number of keys in the "sentence pattern of association" so as to the @[algorithm of making a list of 'descriptors' ranked in order of hit frequency] be used readily so as to let the user know an appropriate 'descriptor' associated with the various words of a user.

It is extremely important that the maker of the manual should give an explicit name to the machine's stopping state, after which the initial moving state of the machine just after the power is turned on follows. The operation with which the machine is let to be in the desired moving state can be readily retrieved only when an explicit name of the stopping state is given by the maker of the manual.

In each item of a manual explaining unit operation, it is recommended that not only the maker of the manual should give an explicit name to the machine's moving state in which the machine is after the unit operation is carried out, but also the maker of the manual should give an explicit name to the machine's moving state in which the machine should be in, before the unit operation is carried out by the user.

It is recommended that both of these should be practiced without fail, if an on-line manual is to be embodied using an object-oriented knowledge base system disclosed in the present invention, and each explanation of unit operation is stored as a key described in the "sentence pattern of function". It is recommended that sufficient number of these keys described in "sentence pattern of function" should be registered, if one wants provide an on-line manual of a machine.

In many conventional manuals, only the moving state of the machine after the operation is described, and the moving state that the machine should be in before the operation is not described explicitly. This and the problem of polysemous words causes the necessity of hunch and experience in operating machines even when using manuals, and made it impossible to integrate a series of unit operations only by reasoning on the basis of the descriptions in manuals.

As for the problem of nesting, it is recommended that after the backbone of the total operation has constructed, nesting in operation should be added if nesting is necessary and/or beneficial in moving machines.

3.6. Example in Which an Object-Oriented Knowledge Base System Disclosed in the Present Invention is Applied to a Practical Case in Solving a Problem in Metallurgical Physics A metallurgical physicists call a thermal migration of aluminum atoms on a surface of a bulk aluminum metal a 'surface diffusion of aluminum on a surface of a bulk aluminum metal'. A surface diffusion is a kind of equation of motion, and it is well known that it can be used to describes the "mass transformation on the of a surface of a bulk aluminum caused by the surface diffusion". Metallurgical physicists knows that rough surface of a bulk aluminum metal can be made smooth, if the bulk metal is annealed at high temperatures. Metallurgical physicists knows this surface annealing is caused by the surface diffusion caused by the surface tension and that change of the surface roughness can be described as a function of time, by using an surface diffusion equation, if the temperature and the initial roughness of the surface is known.

But it was shown in 1997, by a metallurgical physicist S. Okude, and et. al. that a surface diffusion equation breaks is well defined only if the length that characterizes the area is much more than 60 Å (less than $60\times10^{-10}$ meter) by using a computer simulation. (◎"Two dimensional stochastic Monte Carlo simulation for smoothing of scratched surface of aluminum thin film at 773K")

Here, I show an example in which a problem in metallurgical physicists is solved (i.e. a lemma in metallurgical physicists is proved) on the basis of an opportunistic reasoning model by using @[algorithm of sentence based object-oriented categorical syllogism] and by @[algorithm of sentence based object-oriented hypothetical syllogism].

(Problem)

Under the premise that the migration of aluminum atoms (Al atoms) adsorbed on the surface of metal aluminum at 500° C. plays a dominant role in the surface diffusion of metal aluminum at 500° C., prove the lemma described as a hypothetical proposition, prove the lemma, 4) If the width of a groove with aspect ratio (depth/width) 1 on the surface of metal aluminum at 500° C. is 32 Å, then, surface diffusion equation breaks down near the groove.

To prove this lemma, use the following rules and or facts, described as a hypothetical proposition and/as a categorical proposition;

1) The mean free path of the migration of Al atoms adsorbed on the surface of metal aluminum at 500° C. is 60 Å, 2) According to Einstein's equation, if the typical size of a surface structure is less than the mean free path, surface diffusion constant can not be well defined near the surface structure, 3) If surface diffusion constant can not be well defined, then, surface diffusion equation breaks down, 7) A groove with aspect ratio (depth/width) 1 on the surface of metal aluminum at 500° C. is a kind of surface structure, 8) The width of a groove with aspect ratio (depth/width) 1 on the surface of metal aluminum at 500° C. is a kind of the typical size of a surface structure, and, 10) If it is 32 Å, then it is less than 60 Å.

(Answer to the Problem on the Basis of Natural Language)

First I show an example in which the problem is solved by carrying out backward reasoning as follows;

It should be noted that lemma '4)' is the proposition to be finally proved.

It is recommended that the hypothetical proposition '4)' should be used as the hypothetical proposition which is the target of the first step of opportunistic reasoning.

Here, it should be noted that, if a hypothetical proposition,

5) If the width of a groove with aspect ratio (depth/width) 1 on the surface of metal aluminum at 500° C. is 32 Å, then, surface diffusion constant can not be well defined near the groove, is proved to be true, then, the hypothetical proposition '4)' can be proved to be true, by inserting the hypothetical proposition '3)' into the hypothetical proposition '5)' on the basis of the usual syllogism (i.e. "if 'a→b' and 'b→c', then 'a→c'"), in a backward reasoning in the present step of opportunistic reasoning.

Proposition '4)' is 'the_Proposition_to_be_finally_proven_by_using_the_system' in Formula. 2, but in the present first step of opportunistic reasoning, Proposition 4) is regarded as the 'hypothetical proposition that is the target of the present step of opportunistic reasoning'.

And the hypothetical proposition '3)' is a "hypothetical proposition to be used in backward reasoning" in the first step of opportunistic reasoning (See Formula. 4). And the hypothetical proposition '5)' is the "hypothetical proposition which is to be used as the target of the next step of opportunistic reasoning" (See Formula. 4).

In the second step of opportunistic reasoning, in a similar way, backward reasoning is carried out. It should be noted here that, the hypothetical proposition '5)' should be used as the hypothetical proposition which is the target of the second step of opportunistic reasoning. Here, it should be noted that, if a hypothetical proposition, 6) If the width of a groove with aspect ratio (depth/width) 1 on the surface of metal aluminum at 500° C. is 32 Å, then the typical size of a surface structure is less than the mean free path (of the migration of Al atoms adsorbed on the surface of metal aluminum at 500° C.), is proved to be true, then, under previously described premise, proposition '5)' can be proved to be true by inserting the hypothetical proposition '6)' and the categorical proposition '7)' into the hypothetical proposition '2)' on the basis of the usual syllogism (i.e. "if 'a→b' and 'b→c', then 'a→c'") and on the basis of @[algorithm of sentence based object-oriented hypothetical syllogism].

The categorical proposition, '7)' is used as the minor premise of @[algorithm of sentence based object-oriented categorical syllogism], which leads, the, categorical proposition, "the width of a groove with aspect ratio (depth/width) 1 on the surface of metal aluminum at 500° C. is 32 Å" (i.e. consequence of '5)'), from the categorical proposition, "the typical size of a surface structure is less than the mean free path (of the migration of Al atoms adsorbed on the surface of metal aluminum at 500° C.). (i.e. conclusion of '6)').

The hypothetical proposition '2)' is the "hypothetical proposition to be used in backward reasoning" (see Formula. 4). And the hypothetical proposition '6)' is the "hypothetical proposition which is to be used as the target of the next step of opportunistic reasoning" (see Formula. 4).

Therefore, proposition '5)' can be proved to be true if proposition '6)' is proved to be true. In the next step, I must try to prove '6)'.

In the third step of opportunistic reasoning, in a similar way, backward reasoning is carried out. It should be noted here that, the hypothetical proposition '6)' should be used as the hypothetical proposition which is the target of the third step of opportunistic reasoning. Here, it should be noted that, if a hypothetical proposition, 9) If the typical size of a surface structure is 32 Å, then the typical size of a surface structure is less than the mean free path (of the migration of Al atoms adsorbed on the surface of metal aluminum at 500° C.), is proved to be true, then proposition '6)' can be proved to be true by inserting hypothetical proposition '8)' into '9)' on the basis of the usual syllogism (i.e. "if 'a→b' and 'b→c', then 'a→c'"), by using a backward reasoning.

The hypothetical proposition '8)' is a "hypothetical proposition to be used in backward reasoning" (see Formula. 4). And the hypothetical proposition '9)' is the "hypothetical proposition which is to be used as the target of the next step of opportunistic reasoning" in Formula. 4.

Therefore, proposition 6) can be proved to be true if proposition 9) is proved to be true. In the following discussion, I must try to prove 9).

In the fourth step of an opportunistic reasoning, in a similar way, backward reasoning is carried out. It should be noted here that, the hypothetical proposition '9)' should be used as the hypothetical proposition which is the target of the fourth step of opportunistic reasoning. Here, it should be noted that, if a proposition, 11) If the typical size of a surface structure is less than 60 Å, then the typical size of a surface structure is less than the mean free path (of the migration of Al atoms adsorbed on the surface of metal aluminum at 500° C.), is proved to be true, then, proposition '9)' can be proved to be true by inserting the hypothetical proposition '10)' into the hypothetical proposition '11)' on the basis of usual syllogism (i.e. "if 'a→b' and 'b→c', then'a→c'").

The hypothetical proposition '10)' is the "hypothetical proposition to be used in backward reasoning" (see Formula. 4). And the hypothetical proposition '11)' is the "hypothetical proposition which is to be used as the target of the next step of opportunistic reasoning" in Formula. 4.

Therefore, proposition '9)' can be proved to be true if proposition '11)' is proved to be true. In the following discussion, I must try to prove '11)'.

In the fifth step of an opportunistic reasoning, in a similar way, it should be noted that, the hypothetical proposition '11)' should be used as the hypothetical proposition which is the target of the third step of opportunistic reasoning. Here, it should be noted that, if a proposition '1)' is inserted into proposition '11)', then, a proposition '12)' as, 12) If the typical size of a surface structure is less than the mean free path (of the migration of Al atoms adsorbed on the surface of metal aluminum at 500° C.), then the typical size of a surface structure is less than the mean free path (of the migration of Al atoms adsorbed on the surface of metal aluminum at 500° C.), is obtained.

This hypothetical proposition, '12)' is trivial. Thus hire, I judge that the hypothetical proposition, '4)' has proven to be truth.

This corresponds to the sentence,

```
if( Problem is solved )
{
  break ;__
},
```

in Formula. 2.

From now on, the same problem will be solved on the basis of systematic data structures. It is recommended that, first, the maker of the contents of an object-oriented knowledge base system disclosed in the present invention should reformulate the problem itself on the basis of systematic data structures, using "sentences that store data used as rules", as follows:

Under the premise that the migration of Al atoms adsorbed on the surface of metal aluminum at 500° C. plays a dominant role in the surface diffusion of metal aluminum at 500° C., prove the hypothetical proposition

4):

__RULE__Answer to the problem

__states__if(

__S=__the width of a groove with aspect ratio (depth/width) 1 on the surface of metal aluminum at 500° C. __V=__is__C=__32 Å;__)then{

__S=__surface diffusion equation __V=__is not valid near the groove with aspect ratio (depth/width) 1 on the surface of metal aluminum at 500° C.

};__.

And it is recommended that rules and to prove this lemma should be formalized, too, as follows:

```
/* Fact described by using "sentence pattern of definition of object"
   */
1):
__OBJECT__
   Al atoms adsorbed on the surface of metal aluminum at 500° C.__ <<Noun__KW>> __=__
   __(Aluminum)__,__(Metal Surface)__,__(Adsorbed Atom)__.
have__VARIABLES
   the mean free path of the migration__ <<Noun__KW>> __=__ __(Migration)__,__(Mean Free
Path)__.
which__is
   60 Å,
/* Rules described by using "sentence pattern of physical and/or mathematical rules"
   */
2):
__RULE__
   Einstein's Equation__ <<Noun__KW>> __=__ __(Einstein's Equation)__.
__states__if(
   __S=__the typical size of a surface structure__ <<Noun__KW>> __=__ __(Surface
   Structure)__,__(Size)__. __V=__is __C=__less than the mean free path__ <<Noun__KW>> __=__
__(Mean
   Free Path)__;__.
)then{
   __S=__surface diffusion constant__<< Noun__KW >> __=__ __(Surface)__,__(Diffusion
Coefficient)__.
   __V=__can not be well defined near the surface structure__ <<Noun__KW>> __=__ __(Surface
   Structure)__.__『Verb__KW』 __=__ __{Break Down}__. ;__} ;__
3):
__RULE__
   Self Evident Rule
__states__if(
   __S=__surface diffusion coefficient__ <<Noun__KW>> __=__ __(Surface)__,__(Diffusion
   Coefficient)__. __V=__has no meaning __『Verb__KW』 __=__ __{Break Down}__;__
)then{
   __S=__surface diffusion equation__ <<Noun__KW>> __=__ __(Surface)__,__
   (Diffusion Equation)__.
   __V=__is not valid __『Verb__KW』 __=__ __{Break Down}__. ;__
} ;__
10):
   __RULE__arithmetic __states__if(__S=__length__V=__is__C=__32 Å ;__
)then{
   __S=__length __V=__is __C=__less than 60 Å ;__
} ;__
/* Facts described by using "sentence pattern of 'ideal thesaurus'"
   */
7):
__NT__
```

-continued

```
  A groove with aspect ratio (depth/width) 1 on the surface of metal aluminum at
500° C.
  __ <<Noun__KW>> __=__ __(Aluminum)__,__(Metal Surface)__,__(Surface Structure)__.
__is__a__kind__of__BT__
  surface structure__ <<Noun__KW>> __=__ __(Surface Structure)__.
8):
__NT__
  The width of a groove with aspect ratio (depth/width) 1 on the surface of metal
aluminum
  at 500° C.__ <<Noun__KW>> __=__ __(Aluminum)__,__(Metal Surface)__,__
  (Surface Structure)__.__is__a__kind__of__BT__
  the typical size of a surface structure__ << Noun__KW >> __=__ __(Surface
Structure)__,__(Size)__.
/* Several "sentences that store data providing the ability of association"
  * described in "sentence pattern of association".
  */
*):
__Association__
a groove on a surface
__->__
__ <<Noun__KW>> __=__ __(Surface Structure)__.
*):
__Association__
the width of a groove with aspect ratio (depth/width) 1 on the surface
__->__
__ <<Noun__KW>> __=__ __(Surface Structure)__,__(Size)__.
*):
__Association__
  differential equation is not valid
__->__
  __ <<Noun__KW>> __=__ __(Differential Equation)__.__ 『Verb__KW』 __=__ __
  {Break Down}__.
*):
__Association__
  surface
__->__
  __ <<Noun__KW>> __=__ __(Surface)__.
*):
__Association__
  differential equation
__->__
  __ <<Noun__KW>> __=__ __(Differential Equation)__.
    As the reasoning model, I adopt the opportunistic reasoning model.
```

Let me begin the description of the process that is carried out in the first step of opportunistic reasoning, just below.

In the field after ')then(', in the proposition '4)' which is to be finally proved, I can find the word phrase 'surface diffusion equation', which seemed to be mathematically well defined. This means that a backward reasoning, instead of a forward reasoning should be carried out in the first step of opportunistic reasoning in the present example.

Then, in this situation, it is recommended that the @[algorithm of making a list of 'descriptors' ranked in order of hit frequency] should be carried out to search 'descriptors' which characterize well the word phrase, 'surface diffusion equation'. And then, let us assume that two descriptors '__(Surface)__' and '__(Differenhal Equation)__' are listed with high rank.

This process corresponds to a sentence in Formula. 2,

Search_usable__'descriptors'__which__represent__
  suitably__the__'consequence'__
of__the__
'hypothetical__proposition__
which_is__the__target__of__the__present__step__of__
  opportunistic__reasoning'__ __by__using__
@[algorithm of making a list of 'descriptors' ranked in
  order of hit frequency]__( );__.

Let us assume that we want to make an concentrated retrieval. Then, it is recommended that sentences which contains a descriptor '__(Surface)__' and/or '__(Differential Equation)__' should be retrieved from the set of the keys described in "sentence pattern of 'ideal thesaurus'" stored in the 'object-oriented knowledge base' disclosed in the present invention. And let us assume that no narrower 'descriptor' of '__(Surface)__' and/or '__(Differential Equation)__' are found. The situation assumed here means that '__(Surface)__' and '__(Differential Equation)__' are the 'descriptors' that represent 'surface diffusion equation' most precisely and specifically, in the object-oriented knowledge base system used in this present example.

This process corresponds to a sentence in Formula. 2,

```
if(some usable 'descriptors' are retrieved)
{
  if(concentrated retrieval is to be carried out)
  {
    Optimize__usable__'descriptors'__for__concentrated__
    "retrieval of the 'hypothetical propositions possibly used in forward
    reasoning"'__by using__'ideal__thesaurus'( ) ;__
```

In the present practical example, it was assumed that we were lucky enough to obtain usable 'descriptors'.

Under the situation that we have assumed above, it is recommended that we should first carry out a backward reasoning. This judgment is carried out according to

```
if('descriptors' and/or 'names-of-classification-items' describing
the 'consequence' of the
'hypothetical__proposition__
which__is__the__target__of__the__present__step__of__
opportunistic__reasoning' is found
and/or
a user of the system contrives a good 'next-best-natural-nouns' and/or
a good 'next-best-natural-verbs')
{
  Carry__out__backward__reasoning__and__
  Determine__the__hypothetical__propositions__which__is__to__be__the__
  target__of__the__next__step__of__opportunistic__reasoning( ) ;__
},
```

in Formula. 2.

The most important verb phrase in the field below ')then{' in the proposition 4} is 'is not valid'. The meaning of this verb phrase is rather dispersed. So, it is recommended that the @[algorithm of making a list of 'names-of-classification-items' ranked in order of hit frequency] should be carried out for to search 'names-of-classification-items' which characterizes well the verb phrase 'is not valid'. Then, let us assume that we make a Boolean search using the intersection of 'is not valid' and '__(Differential Equation)__'. Then, it is expected that 'algorithm-of-process' '__{Break Down}__' will listed high when, @[algorithm of making a list of 'names-of-classification-items' ranked in order of hit frequency] is carried out. This corresponds to the sentence in Formula. 2, Search__usable__'names-of-classification-items'__
which__represent__suitably__the__
'presupposition'__
of__the__
'hypothetical__proposition__
which__is__the__target__of__the__present__step__of__opportunistic__reasoning'__by__using__
@[algorithm of looking through 'names-of-classification-items' in the order of hit frequency]__( );__.

In many cases, when a key that is just to the point was retrieved, it is a clever way to consult all the keys, which share the same record with the key that is just to the point if we want to make an exact reasoning.

Let us assume that we retrieve the keys described in "sentence pattern of classification" which contain the 'name-of-classification-item', '__{Break Down}__'. And let us assume that no lower class 'name-of-classification-item' of it is found. This situation assumed here means that '__{Break Down}__' is a 'name-of-classification-item' which expresses the most precisely and most specifically the concept of "surface diffusion equation' 'is not valid'". This process corresponds to the sentence in Formula. 2, Optimize__usable__'names-of-classification-items'__for__concentrated__"retrieval of the 'hypothetical propositions to be used in forward reasoning'"__by__using__'classification__table'__( );__

Then, it is recommended that whether the 'algorithm-of-process' '__{Break Down}__' is really appropriate to be used in this case or not should be confirmed. Then, one should retrieve the keys that contains, '__{Break Down}__', 'is not valid', and '(Differential Equation)__'.

Then, a key described in "sentence pattern of association",

*):

__Association__differential equation is not valid

__→__

__<<Noun__KW>>__=___(Differential Equation)__.__

『Verb__KW』 __=___{Break Down}__, should be retrieved. It is reasonable judging that this sentence shows that the '__{Break Down}__' is really suitable 'algorithm-of-process' to be used in this situation. But this process for conformation corresponds to the sentence in Formula. 2 confirming__the__optimized__'names-of-classification-items'__by__using__keys__and__records__of__the__corresponding__data__if__necessary ( ) ; __.

Above discussion shows that, when a concentrated retrieval is to be carried out, then, '__(Surface)__', and, '__(Differential Equation)__, are the 'descriptors' which characterizes most suitably the proposition that "'surface diffusion equation' 'is not valid'", and, '__{Break Down}__' is the 'name-of-classification-item' which characterizes most suitably the proposition "'surface diffusion equation' 'is not valid'".

Next, let us carry out a process corresponding the function in Formula. 4,

Retrieve_'Hypothetical__propositions__possibly__used__in__backward__reasoning'__by__using__
optimized_'descriptors',__optimized__'names-of-classification-items',__
'next-best-natural-nouns',__and/or,__'next-best-natural-verbs'( );__.

Here, a key possibly used as a rule with which a backward reasoning is carried out, should be retrieved. That is, we should retrieve here, a key described in "sentence pattern of physical and/or mathematical rules' in whose field of below ')then{', a 'descriptor' '__(Surface)__' and/or '__(Differential Equation)__' and/or their broader 'descriptor' is included and/or in whose field of below '}then{', an 'algorithm-of-process' '{__Break Down}__' and/or its higher class 'algorithm-of-process' is included.

If such a retrieval is carried out, then, proposition '3)' is retrieved. This proposition '3)' is what is called 'Hypothetical__propositions__possibly__used__in__backward__reasoning' in Formula. 4. If we watch the contents of '3)', then, we will find that '3)' can be used as it is as the rule to be used in the present step of backward reasoning. That is, we will find that '3)' is what is called "the hypothetical proposition to be used in backward reasoning" in Formula. 4.

Here, let us assume that just one appropriate proposition, i.e. '3)' was retrieved. In this situation we assumed here, the procedure in Formula. 4,

```
if( too many 'hypothetical proposition possibly used in backward
reasoning' are retrieved,
i.e. a combinatorial explosion occurs)
{
  Retrieve__directly__
  'Hypothetical__propositions__to__be__used__in__backward__
  reasoning'( );__
  if(combinatorial explosion now and/or in the future still can not be
  avoided)
  {
    Revise__
    optimized__'descriptors',__optimized__'names-of-classification-
    items',__'next-best-natural-nouns',__and/or,__'next-best-natural-verbs'
    by__
    Carring__out__a__process__according__to__@[algorithm
    of narrowing down the target 'descriptors' and/or target 'names-of-
    classification-items']__if__necessary__
    And__Retrieve__again,__
```

-continued

```
    'Hypothetical__propositions__possibly__used__in__backward__
    reasoning'__by__using__the__revised__
    'descriptors',__'names-of-classification-items',__
    'next-best-natural-nouns',__and/or,__'next-best-natural-verbs'( ) ;__
    if(combinatorial explosion now and/or in the future still can not be
    avoided)
    {
      Withdraw__the__process__carried__out__according__to__the__
      @[algorithm of narrowing down the target 'descriptors'
      and/or target 'names-of-classification-items']__
      and__
      Carry__out__a__process__according__to__
      @[algorithm of fusing propositions]__to__the__'presuppositions'__
      of__the__'Hypothetical__propositions__possibly__used__in__
      forward__reasoning'__if__necessary( ) ;__
    }
  }
  if(neither direct retrieval nor @[algorithm of narrowing down the target
  'descriptors' and/or target 'names-of-classification-items']
  nor @[algorithm of fusing propositions] works well)
  {
    Change__the__
    "decision__concerning__whether__forward__reasoning__and/or__
    backward__reasoning__should__be__carriedout"__
    made__in__previous__steps__of__opportunistic__reasoning( ) ;__
  }
}
if( too less 'hypothetical proposition possibly used in backward reasoning'
are retrieved )
{
  Carry__out__@[algorithm of broadening out the target 'descriptors'
  and/or target 'names-of-classification-items']
  And__Retrieve__again,__
  'Hypothetical__propositions__possibly__used__in__backward__
  reasoning'( ) ;__
  if(@[algorithm of broadening out the target 'descriptors' and/or target
  'names-of-classification-items'] dose not work well)
  {
    Change__the__
    "decision__concerning__whether__forward__reasoning__and/or__
    backward__reasoning__should__be__carriedout"__
    made__in__previous__steps__of__opportunistic__reasoning( ) ;__
  }
}
```

may be omitted for the time being in the present step of backward reasoning. Only when problematic situation would occur in later step of opportunistic reasoning, then, adjustment described above should be carried out.

Next we should carry out the process which corresponding to the sentence in Formula. 4, Determine__the__hypothetical__propositions__
which__are__to__be__used__
as_the__target__of__the__next__step__of__opportunistic__reasoning__
on__the__basis__
of_the__'hypothetical__propositions__to__be__used__in__backward__reasoning'__
in__the__present__step__of__opportunistic__reasoning
and__
of__a__hypothetical__proposition__
which__is__the__target__of__the__present__step__of__backward__reasoning
of__opportunistic__reasoning__
by__using__
@[algorithm of sentence based object-oriented categorical syllogism]__and__
@[algorithm of sentence based object-oriented hypothetical syllogism]__
backward( );__.

Here, it should be noted that,
if
the hypothetical proposition,
5):
__RULE__
a lemma
__states__if(
__S=__ the width of a groove with aspect ratio (depth/width) 1 on the surface of metal aluminum at 500° C. __V=__is __C=__32 Å;__
)then{
__S=__ surface diffusion coefficient_<<Noun__KW>>__=__ __(Surface)__,__(Diffusion Coefficient)__.
__V=__ is not valid near the groove with aspect ratio (depth/width) 1 on the surface of metal aluminum at 500° C. 『Verb__KW』__=__ __{Break Down}__.;__
};__
is proved to be true,
then,
hypothetical proposition '4)' can be proved to be true, by inserting the hypothetical proposition '3)' into '5)' on the basis of usual syllogism (i.e. "if 'a→b' and 'b→c', then 'a→c'") by using a backward reasoning, in a backward reasoning in the present step of opportunistic reasoning.

Proposition '4)' is 'the__Proposition__to__be__finally__proven__by__using__the__system' in Formula. 2, but in the present first step of opportunistic reasoning, Proposition '4)' is regarded as the 'hypothetical proposition that is the target of the present step of opportunistic reasoning'.

And the hypothetical proposition '3)' is a "hypothetical proposition to be used in backward reasoning" in the first step of opportunistic reasoning (See Formula. 4). And the hypothetical proposition '5)' is the "hypothetical proposition which is to be used as the target of the next step of opportunistic reasoning" (See Formula. 4).

Similar steps of opportunistic reasoning, in which backward reasoning is carried out in the case of the present example, will be shown just below.

In the second step of opportunistic reasoning, in a similar way, it should be noted that, the hypothetical proposition '5)' should be used as the hypothetical proposition which is the target of the second step of opportunistic reasoning.

In the second step, let us assume that proposition '2)' and proposition '7)', which are readily used to make a backward reasoning, are easily retrieved. Thus, let us assume that in the second step of opportunistic reasoning of the present example, a backward reasoning, not a forward reasoning, is carried out, because of the similar reason with which I judged to use a backward reasoning in the first step of opportunistic reasoning. Then, it should be noted that, if
a hypothetical proposition,
6):
__RULE__
a lemma
__states__if(
__S=__the width of a groove with aspect ratio (depth/width) 1 on the surface of metal aluminum at 500° C.__ <<Noun__KW>> __=__ __(Aluminum)__,__(Metal Surface)__,__(Surface Structure)__.__V=__is __C=__32 Å;__)then{
__S=__ the typical size of a surface structure__ <<Noun__KW>> =__ __(Surface Structure)__,__

(Size)__.__V=__is __C=__ less than the mean free path (of the migration of Al atoms adsorbed on the surface of metal aluminum at 500° C.)__ z,902 Noun__KW>> __=__ __(Aluminum)__,__(Metal Surface)__,__(Adsorbed Atom)__,__ (Migration)__,__(Mean Free Path)__.;__};__, is proved to be true, under the previously described premise, then, proposition '5)' is proved to be true by inserting '6)' and '7)', into proposition '2)' on the basis of @[algorithm of sentence based object-oriented hypothetical syllogism]. and usual syllogism (i.e. "if 'a→b' and 'b→c', then 'a→c'")

The categorical proposition, '7)' is used as the minor premise of @[algorithm of sentence based object-oriented categorical syllogism], which leads the categorical proposition, "__S=__ the width of a groove with aspect ratio (depth/width) 1 on the surface of metal aluminum at 500° C. __V=__is __C=__32 Å;__", (i.e. consequence of '5)'), from a categorical proposition, __S=__ the typical size of a surface structure__ <<Noun__KW>> __=__ __(Surface Structure)__,__ (Size)__.__V=__is __C=__ less than the mean free path (of the migration of Al atoms adsorbed on the surface of metal aluminum at 500° C.)__ <<Noun__KW>> __=__ __(Aluminum)__,__(Metal Surface)__,__ (Adsorbed Atom)__,__(Migration)__,__(Mean Free Path)__.;__};__. (i.e. conclusion of '6)').

The hypothetical propositions '2)' is the "hypothetical proposition to be used in backward reasoning" (see Formula. 4). And the hypothetical proposition '6)' is the "hypothetical proposition which is to be used as the target of the next step of opportunistic reasoning" (see Formula. 4).

Therefore, proposition '5)' can be proved to be true if proposition '6)' is proved to be true. In the next step, I must try to prove '6)'.

In the third step of opportunistic reasoning, in a similar way, it should be noted that, the hypothetical proposition '6)' should be used as the hypothetical proposition which is the target of the third step of opportunistic reasoning. Here, it should be noted that, if a hypothetical proposition,

9):

__RULE__ a lemma

__states__if( __S=__ the typical size of a surface structure__ <<Noun__KW>> __=__ __(Surface Structure)__,__(Size)__.__V=__is __C=__32 Å;__ )then{__S=__the typical size of a surface structure__ <<Noun__KW>> __=__ __(Surface Structure)__,__(Size)__.__V=__is __C=__ less than the mean free path (of the migration of Al atoms adsorbed on the surface of metal aluminum at 500° C.)__ <<Noun__KW>> __=__ __(Aluminum)__,__(Metal Surface)__,__(Adsorbed Atom)__,__(Migration)__,__(Mean Free Path)__.;__ };__ is proved to be true, then, proposition '6)' can be proved to be true by inserting '8)' into '9)' on the basis of usual syllogism (i.e. "if 'a→b' and 'b→c', then 'a→c'").

Therefore, proposition 6) can be proved to be true if proposition 9) is proved to be true. In the following discussion, I must try to prove 9).

In the fourth step of opportunistic reasoning, in a similar way, backward reasoning is carried out. It should be noted here that, the hypothetical proposition '9)' should be used as the hypothetical proposition which is the target of the fourth step of opportunistic reasoning. Here, it should be noted that, if a proposition,

11):

__RULE__ a lemma

__states__if(

__S=__the typical size of a surface structure__ <<Noun__KW>> __=__ __(Surface Structure)__,__ (Size)__.__V=__is __C=__ less than 60 Å;__)then{

__S=__ the typical size of a surface structure__ <<Noun__KW>> __=__ __(Surface Structure)__,__ (Size)__.__V=__is __C=. less than the mean free path (of the migration of Al atoms adsorbed on the surface of metal aluminum at 500° C.)__ <<Noun__KW>> __=__ __(Aluminum)__,__(Metal Surface)__,__(Adsorbed Atom)__,__ (Migration)__,__(Mean Free Path)__.;__ };__ is proved to be true, then, proposition '9)' can be proved to be true by inserting the hypothetical proposition '10)' into proposition '11)' on the basis of usual syllogism (i.e. "if 'a→b' and 'b→c', then 'a→c'").

The hypothetical proposition '10)' is the "hypothetical proposition to be used in backward reasoning" (see Formula. 4). And the hypothetical proposition '11)' is the "hypothetical proposition which is to be used as the target of the next step of opportunistic reasoning" in Formula. 4.

Therefore, proposition '9)' can be proved to be true if proposition '11)' is proved to be true. In the following discussion, I must try to prove '11)'.

In the fifth step of an opportunistic reasoning, in a similar way, it should be noted that, the hypothetical proposition '11)' should be used as the hypothetical proposition which is the target of the fifth step of opportunistic reasoning.

If proposition '1)' is inserted into proposition '11)', then, a proposition '12)', as,

12):

__RULE__ a trivial rule

__states__if(

__S=__the typical size of a surface structure__ <<Noun__KW>> __=__ __(Surface Structure)__, __(Size)__. __V=__is __C=__less than the mean free path (of the migration of Al atoms adsorbed on the surface of metal aluminum at 500° C.)__ <<Noun__KW>> __=__ __ (Aluminum)__,__(Metal Surface)__,__(Adsorbed Atom)__,__(Migration)__,__(Mean Free Path)__;__)then{

__S=__ the typical size of a surface structure__ <<Noun__KW>> __=__ __(Surface Structure)__,__(Size)__. __V=__ is __C=__ less than the mean free path (of the migration of Al atoms adsorbed on the surface of metal aluminum at 500° C.)__ <<Noun KW>> __=__ __(Aluminum)__,__ (Metal Surface)__,__(Adsorbed Atom)__,__ (Migration)__,__(Mean Free Path)__;__};__ is obtained.

This hypothetical proposition, '12)' is trivial. Thus hire, I judge that the hypothetical proposition, '4)' has proven to be truth.

This corresponds to the sentence,

```
if( Problem is solved )
{
    break;_
},
```

in Formula. 2.

As reasoning shown above has not lost strictness, the process of Formula. 2,

```
/* Verification of the Result of above Opportunistic Reasoning */
if( the strictness of the reasoning of a step becomes low after for example
    carrying_out_the_@[algorithm of fusing propositions] )
{
    Re-prove_all_the_steps_of_the_proof_by_a_series_of_steps_of_more_exact_
    opportunistic_reasoning( ) ;_
}
```

can be omitted.

Above example shows that if one wants to embody a practical reasoning by using an object-oriented knowledge base system disclosed in the present invention, then, one must a very large set of seemingly trivial propositions must be piled up in the object-oriented knowledge base system. These seemingly trivial propositions may be dealt with by human hand, but it is preferred that a user of the object-oriented knowledge base system should record all the propositions which they used during their a reasoning. It is recommended that a knowledge engineer should judge such propositions whether to be of universal use and/or to be only of special use. If and when such a proposition is judged to be of universal use by a knowledge engineer, then it is recommended that the proposition should be recorded as a rule and/or as a fact in the object-oriented knowledge base.

Especially when an object-oriented knowledge base system disclosed in the present invention is used to embody a large scale knowledge management system, it is essentially necessary to record not only clearly nontrivial propositions but also seemingly trivial propositions as data of the retrieval system. It is recommended that an axiom system should be constructed by a knowledge engineer for the object-oriented knowledge base system when the system of knowledge is very frequently used and/or the system is knowledge must have strict exactness.

Although the description above contains many specifications, these should not be construed as limiting the scope of the invention but merely providing illustrations of some of the presently proffered embodiments of this invention.

4. Some Comment

Mr. Nanao Nakamura's opinion (Private communication with me) is summarized that, 1) Invaluable information can be obtained by reading a book of thesaurus, which makes a man clever. (◎"Nanao Nakamura").
2) A category is strict and solid existence, and a concept is a vague idea. (◎"Nanao Nakamura").
3) The history of progress made by means of the human intelligence surely began with dichotomy: division of the heaven and the earth, which is described in many myths in Japan is an example. (◎"Nanao Nakamura"), which are not publicly known.

However, any of these three sentences is not publicly accepted and/or known. In addition, no perfect and concrete relation among thesauruses, categories, concepts and dichotomy has been revealed and/or described systematically by anyone thus far. In a word, these three sentences are exactly a poem, but are not sentences describing skill, technology, and/or science. And these three sentences have not been consciously or explicitly understood by anyone in a scientific way and/or in a technical manner, thus far.

The system disclosed in the present invention is a scientific system based on a close relation among thesauruses, categories, concepts and dichotomy, and the system disclosed in the present invention provides a scientific technology embodying an original object-oriented knowledge base system.

5. Conclusion, Ramification, and Scope

Thus, the reader will see that the knowledge base system disclosed in the present invention provides a way of inference using not only rules and/or facts that are described in a mathematical formula, in which exact and detailed mathematical definitions of words are given, but also rules and/or facts that are described in a sentence linguistically, in which only a lexical definition of words are given.

In an ideal dictionary, lexical meanings of words, which are given in an object-oriented style and are stored, and a relation between words is described in detail using a sentence based style, i.e. what a word seem like from other words is described in detail, but, unlike in the mathematical definition, the detailed procedure how the words interacts with other words is not necessarily strictly defined.

In a word, a word that has a lexical meaning but dose not have mathematical definition, i.e. a 'black box', may be used in a sentence used as a rule and/or as a fact in the present object-oriented knowledge base system.

In the present invention, I disclosed a way of inference, which I call @[algorithm of sentence based object-oriented categorical syllogism], with which facts and/or rules described using such 'black boxes' can be used as a rule and/or as a fact. In an object-oriented knowledge base system disclosed in the present invention, @[algorithm of sentence based object-oriented categorical syllogism] is made full use of, by making use of the hierarchy of nouns stored in an 'ideal thesaurus' and the hierarchy of verbs stored in a 'classification table'.

An 'ideal thesaurus' is designed on the basis of the object-oriented style. And, a 'classification table' is constructed using the idea of 'dichotomy' and using the method with which lexical definition of verbs are given by means of quasi-C codes.

As a result, in the knowledge base system disclosed in the present invention, exact and/or exhaustive inference can be carried out not only on mathematical equations, but also on sentences written in English, only if the lexical meanings of the words are given according to the way disclosed in the present invention and the sentence is written in a style disclosed in the present invention.

Therefore, not only axiom systems in Physics and/or in Mathematics, but also system of knowledge of intelligent experts, including metallurgists and/or computer programmers, can be embodied directly by using the present knowledge base system.

In a word, the present knowledge base system is suitable to be used to embody an expert system.

An object-oriented knowledge base system disclosed in the present invention can be regarded as an automatic theorem proving system in its broader meaning, and can be used as a CAD for coding of computer program, an intelligent on-line manual of a machine, and a retrieval system of knowledge management system and of a digital nervous system.

An object-oriented knowledge base system disclosed in the present system may exist in a bulk on a machine, but may exist as a distributed system of computers connected via the Internet and/or via a LAN for example.

The information of computer code of 'inference mechanism', and/or contents of the 'object-oriented knowledge base', and/or contents of an 'object-oriented knowledge base management system', etc. may be stored in a bulk for example in a 'means for storing knowledge base system' such as a storing media, in a memory, and/or in an application specific integrated circuit.

But the whole and/or a part of the information of computer code of 'inference mechanism', and/or of contents of the 'object-oriented knowledge base' and/or contents of an 'object-oriented knowledge base management system', etc. may by stored in separate 'means for storing knowledge base system', such as in more than two storing media, in more than two memories, and/or in more than two application specific circuits.

Accordingly, the scope of the invention should be determined not by the embodiments shown, but the appended claims and their legal equivalents.

REFERENCES

⊙ "Joho Sisutemu Handobukku" ("INFORMATION SYSTEMS HANDBOOK"), Joho Sisutemu Handobukku Henshu-Iinkai Bai-Fu-Kan 1989 Japan (In Japanese)

⊙ "The CLASSIC Knowledge Representation System or, "KL-ONE: The Next Generation" Ronald J. Brachman, Alexander Brogida, Deborah L. McGuiness, Peter F. Patel-Schneider, and Lori Alperin Resnick, PROCEEDING OF THE INTERNATIONAL CONFERENCE ON FIFTH GENERATION SYSTEMS, 1992 Tokyo.

⊙ "U.S. Pat. No. 5,974,405 Oct. 26, 1999 "Knowledge base management system with enhanced explanation of derived information and error objects".

⊙ "U.S. Pat. No. 5,659,724 Aug. 19, 1997 Interactive data analysis apparatus employing a knowledge base".

⊙ "MODELLING the WORLD with OBJECTS", Phili Sully Prentice Hall International Ltd (UK) 1993.

⊙ Mitsuru Ishizuka, "Chishiki no hyo-gen to kousoku suiron" (Knowledge representation and high performance inference), Maruzen-kabushikigaisha 1996 Tokyo.(In Japanese)

⊙ "Roget's International Thesaurus Fourth Edition", Revised by Robert L. Chapman, Thomas Y. Crowell Company 1977, New York.

⊙ "Roget's International Thesaurus Fifth Edition", Revised by Robert L. Chapman, Thomas Y. Crowell Company 1977, New York.

⊙ M. Kifer, and J. Wu, "A Logic for Object-Oriented Logic Programming (Maier's O-Logic: Revisited)", Proc. ACM PODS, Philadelphia, Mar., pp.379–393, 1989

⊙ A. J.Bonner, and M. Kifer, "Transaction Logic Programming (or, a Logic of Procedual and Declarative Knowledge)", Technical Report, CSRI-370, Univ. of Toronto, pp.116, April, 1992, (rev.July, 1993)

⊙ K.Yokota, H.Tsuda, and Y.Morita, "Specific Features of a Deductive Object-Oriented Database Language Quixote", I. S. Mumick(ed.), Proceedings of the Workshop on Combining Declarative and Object-Oriented Database, post-conference workshop of ACM SIGMOD'93, Washington D.C.,USA,May 29, 1993

⊙ "Gurafikku Ninchi shinrigaku" (Graphic Cognitive Psychology), Toshio Mori, Tsuyoshi Inoue and Takao Matsui, Saiensu Sha Tokyo 1997 (In Japanese)

⊙ "Out of Control", Kevin Kelly Brockman Inc. 1994

⊙ "C gengo puroguramingu" (C How to Program), H. M. Deitel P. J. Deitel, Abic Tokyo 1998

⊙ "C++ nyumon kani puroguramingu gaido" (A Simple guide for programming: Introduction to C++), (a manual of Microsoft Visual C++) (In Japanese)

⊙ "Kaitei Shinban Vitamin Bible" (EARL MINDEUS Vitamine Bible), Richard Curtis Associatesnlnc. New York 1991.

⊙ "Longman Dictionary of Contemporary English" (third edition), Longman Group Ltd 1995, Caifosa, Spain.

⊙ "Shoto-Ryoshi-Rikigaku" ("Elementary course of Quantum Dynamics"), Akira Harashima Sho-Ka-Bo 1972 Tokyo (In Japanese)

⊙ "Problems in Quantum Mechanics, third edition", edited by D. ter Haar, Pion Limited, 1975.

⊙ "Gehderu no tetsugaku Fukanzensei-teiri to Kami no sonzai-ron" (Gbdel's Philosophy, Incompleteness Theorem, and Ontological Argument), Shoichiro Takahashi, Kodansha Tokyo 1999. (With 52 References) (In Japanese).

⊙ "Ryoshi-Rikigaku" ("Quantum Mechanics"), S.Tomonaga, Misuzu-Shobo, 1952, Tokyo. (In Japanese)

⊙ "Supin ha Meguru" ("Spin the Spin"), S.Tomonaga, Chuoh-Kohron, 1982, Tokyo.

⊙ "Kaiseki-Nyumon I" (Introduction to Analysis), Mitsuo Sugiura, Tokyo-Daigaku Shuppannkai, 1980, Tokyo. (In Japanese)

⊙ "PRISONER'S DILEMMA", William Poundstone, Doubleday, a division of Bantam Doubleday Dell Publishing Group, Inc, 1992, U.S.A.

⊙ Norishige Chiba, Kazunobu Muraoka, Kazufumi Ozawa and Keimei Kaino, "C-Arugorizumu Zen-Ka" (All the subjects of C Algorithms), Kindai-Kagaku-sha, Tokyo, 1995. (in Japanese)

⊙ "Programming Windows 95", Charles Petzold, Microsoft Press, 1996, Washington.

⊙ "Programming Windows 95 with MFC", Jeff Procise, Microsoft Press, Washington.

⊙ "Advanced Windows (Third Edition)", Jeffrey Richter, Microsoft Press, 1997, Washington.

⊙ "Two dimensional stochastic Monte Carlo simulation for smoothing of scratched surface of aluminum thin film at 773K", Shin'ichiro Okude, Kunie Ochiai, Manabu Kuwabars, Masahiko Hasunuma, and, Takeshi Kawakubo, Japanese Journal of Applied physics Vol.36 (1997)pp.5481–5491.

09958322 .100401

PCT-2000-01

Mathematical Formulae:

／＊ FORMULA. 1 A(1/1) ＊／

/* Formula. 1 A shows schematically a recommended embodiment of @[algorithm of
* sentence based object-oriented categorical syllogism]
* (for 'FORM II': 'subject-word (S)' + 'verb (V)' + 'complement-word (C)').
*/

| THE @[ALGORITHM OF SENTENCE BASED OBJECT-ORIENTED CATEGORICAL SYLLOGISM] FOR 'FORM II': 'SUBJECT-WORD (S)' + 'VERB (V)' + 'COMPLEMENT-WORD (C)'. |
|---|
| IF<br>A CATEGORICAL PROPOSITION WRITTEN IN A SENTENCE, S + V + C, IS TRUE, (MAJOR PREMISE)<br>AND<br>S' IS SYNONYM AND/OR NARROWER 'DESCRIPTOR' OF S, (MINOR PREMISE)<br>AND<br>C' IS SYNONYM AND/OR BROADER 'DESCRIPTOR' OF C, (CONCLUSION) |
| THEN,<br>THE CATEGORICAL PROPOSITION WRITTEN IN THE SENTENCE, S' + V + C', IS ALSO TRUE. |

／＊ FORMULA. 1 B(1/1) ＊／

/* Formula. 1 B shows schematically a recommended embodiment of the @[algorithm

* of sentence based object-oriented categorical syllogism]
* (for 'form III': 'subject-word (S)' + 'verb (V)' + 'object-word (O)')
*/

THE @[ALGORITHM OF SENTENCE BASED OBJECT-ORIENTED CATEGORICAL SYLLOGISM] FOR 'FORM III': 'SUBJECT-WORD (S)' + 'VERB (V)' + 'OBJECT-WORD (O)'.

IF
A CATEGORICAL PROPOSITION WRITTEN IN A SENTENCE, S + V + O, IS TRUE, (MAJOR PREMISE)
AND,
S' IS SYNONYM AND/OR NARROWER 'DESCRIPTOR' OF S, (MINOR PREMISE)
AND,
O' IS SYNONYM AND/OR NARROWER 'DESCRIPTOR' OF O, (MINOR PREMISE)

THEN,
THE CATEGORICAL PROPOSITION WRITTEN IN THE SENTENCE, S' + V + O', IS ALSO TRUE. (CONCLUSION)

/* FORMULA. 2 (1/7) */

/* Formula. 2 shows the main routine of a quasi-Code schematically representing a
* recommended embodiment of 'algorithm of association and reasoning' (i.e. a

```
* recommended embodiment of the algorithm for 'inference mechanism') used in an
* object-oriented knowledge base system disclosed in the present invention.
*/

#include "FORMULA. 3"
#include "FORMULA. 4"

main()
{
  char PropositionToBeFinallyProvenByUsingTheSystemMatrix[] ;_
  char FormalizedPropositionToBeFinallyProvenByUsingTheSystemMatrix[] ;_
  char HypotheticalPropositionsWhichAreToBeUsedAs_
       _TheTargetOfTheNextStepOfOpportunisticRasoning[] ;_

  Let_the_User_of_the_system_Input_
  the_Proposition_to_be_finally_proven_by_using_the_system
  and_Copy_and_Paste_it_on_
  PropositionToBeFinallyProvenByUsingTheSystemMatrix_() ;
  Translate_the_Proposition_in_
  PropositionToBeFinallyProvenByUsingTheSystemMatrix
  into_a_formal_sentence_which_is_described_by_using_
  "sentence pattern of physical and/or mathematical rules",_or_
  "sentence pattern of function",_and_
  "sentence pattern of one of five basic sentence patterns of English grammar"
  and_Copy_and_Paste_the_formal_sentence_on_
  FormalizedPropositionToBeFinallyProvenByUsingTheSystemMatrix_() ;_

  'hypothetical_proposition_
   which_is_the_target_of_the_present_step_of_opportunistic_reasoning'
    = FormalizedPropositionToBeFinallyProvenByUsingTheSystemMatrix[] ;_
```

```
/* Opportunistic Reasoning */
while()
{
  /* Either a forward reasoning or a backward reasoning is carried out
   * in the present loop body.
   */

/* FORMULA. 2 (2/7) */

  'hypothetical_proposition_
   which_is_the_target_of_the_present_step_of_opportunistic_reasoning'
    = one of the HypotheticalPropositionsWhichAreToBeUsedAs_
      _TheTargetOfTheNextStepOfOpportunisticRasoning[] ;_
   /* Carry out this one after another */

  /* First, try to carry out a forward reasoning */
  Search_usable_'descriptors'_that_represent_suitably_the_'presupposition'_
  of_the_
 'hypothetical_proposition_
  which_is_the_target_of_the_present_step_of_opportunistic_reasoning'_
  by_using_
  @[algorithm of making a list of 'descriptors' ranked in order of hit
  frequency]_() ;_

  if(some usable 'descriptors' are retrieved)
  {
    if(concentrated retrieval is to be carried out)
    {
      Optimize_usable_'descriptors'_for_concentrated_
```

```
    "retrieval of the 'hypothetical propositions possibly used in forward
    reasoning'"_by_using_'ideal_thesaurus'() ;_

    confirming_the_optimized_'descriptors'_
    by_using_keys_and_records_of_the_corresponding_data_if_necessary ()   ; _
  }
  else if(exhaustive retrieval is to be carried out)
  {
    Optimize_usable_'descriptors'_for_exhaustive_
    "retrieval of the 'hypothetical propositions to be used in forward
    reasoning'"_
    by_using_'ideal_thesaurus'() ;_

    confirming_the_optimized_'descriptors'_
    by_using_keys_and_records_of_the_corresponding_data_if_necessary ()   ; _

/*  FORMULA. 2 (3/7)   */

  }
}

Search_usable_'names-of-classification-items'_
which_represent_suitably_the_
'presupposition'_
of_the_
'hypothetical_proposition_
which_is_the_target_of_the_present_step_of_opportunistic_reasoning'_
by_using_
@[algorithm of looking through 'names-of-classification-items' in the
order of hit frequency]_() ;_
```

```
if(some usable 'names-of-classification-items' are retrieved)
{
  if(concentrated retrieval is to be carried out)
  {
    Optimize_usable_'names-of-classification-items'_for_concentrated_
    "retrieval of the 'hypothetical propositions to be used in forward
    reasoning'"_by_using_'classification_table'_() ;_

    confirming_the_optimized_'names-of-classification-items'_
    by_using_keys_and_records_of_the_corresponding_data_if_necessary () ; _
  }
  else if(exhaustive retrieval is to be carried out)
  {
    Optimize_usable_'names-of-classification-items'_for_exhaustive_
    "retrieval of the 'hypothetical propositions to be used in forward
    reasoning'"_by_using_'classification_table'() ;_

    confirming_the_optimized_'names-of-classification-items'_
    by_using_keys_and_records_of_the_corresponding_data_if_necessary () ; _
  }
}

/* FORMULA. 2 (4/7) */

if( 'descriptors' and/or 'names-of-classification-items' describing the
'presupposition' of the
'hypothetical_proposition_
 which_is_the_target_of_the_present_step_of_opportunistic_reasoning'
are found
```

09958322 .100401

```
and/or
a user of the system contrives a good 'next-best-natural-nouns' and/or
a good 'next-best-natural-verbs' )
{
  Carry_out__forward_reasoning__and__
  Determine_the_hypothetical_propositions_which_is_to_be_
  the_target_of_the_next_step_of_opportunistic_reasoning(
  HypotheticalPropositionsWhichAreToBeUsedAs_
  _TheTargetOfTheNextStepOfOpportunisticRasoning[]) ;_
}
else
{
/* If the forward reasoning can not be carried out, then
 * carry out a backward reasoning.
 */
  Search_usable_'descriptors'_which_represent_suitably_the_'consequence'_
  of_the_
  'hypothetical_proposition_
  which_is_the_target_of_the_present_step_of_opportunistic_reasoning'_
  _by_using_
  @[algorithm of making a list of 'descriptors' ranked in order of hit
  frequency]_() ;_.

  if(some usable 'descriptors' are retrieved)
  {

/* FORMULA. 2 (5/7) */

    if(concentrated retrieval is to be carried out)
    {
```

09958322.100401

```
      Optimize_usable_'descriptors'_for_concentrated_
      "retrieval of the 'hypothetical propositions possibly used in backward
      reasoning'"_by_using_'ideal_thesaurus'() ;_
      confirming_the_optimized_'descriptors'_
      by_using_keys_and_records_of_the_corresponding_data_
      if_necessary  ()    ; _
    }

    else if(exhaustive retrieval is to be carried out)
    {
      Optimize_usable_'descriptors'_for_exhaustive_
      "retrieval of the 'hypothetical propositions to be used in backward
      reasoning'"_
      by_using_'ideal_thesaurus'() ;_

      confirming_the_optimized_'descriptors'_
      by_using_keys_and_records_of_the_corresponding_data_
      if_necessary  ()    ; _
    }
  }

  Search_usable_'names-of-classification-items'_
  which_represent_suitably_the_
  'consequence'_
  of_the_
  'hypothetical_proposition_
  which_is_the_target_of_the_present_step_of_opportunistic_reasoning'_
  by_using_@[algorithm of looking through 'names-of-classification-items' in
  the order of hit frequency]_() ;_
```

```
if(some usable 'names-of-classification-items' are retrieved)
{
  if(concentrated retrieval is to be carried out)
  {
    Optimize_usable_'names-of-classification-items'_for_concentrated_
    "retrieval of the 'hypothetical propositions to be used in backward
    reasoning'"_by_using_'classification_table'_() ;_
    confirming_the_optimized_'names-of-classification-items'_
    by_using_keys_and_records_of_the_corresponding_data_
    if_necessary  ()    ; _

/*  FORMULA. 2 (6/7)   */

  }
  else if(exhaustive retrieval is to be carried out)
  {
    Optimize_usable_'names-of-classification-items'_for_exhaustive_
    "retrieval of the 'hypothetical propositions to be used in backward
    reasoning'"_by_using_'classification_table'() ;_

    confirming_the_optimized_'names-of-classification-items'_
    by_using_keys_and_records_of_the_corresponding_data_
    if_necessary  ()    ; _
  }
}

if( 'descriptors' and/or 'names-of-classification-items' describing
the 'consequence' of the
'hypothetical_proposition_
which_is_the_target_of_the_present_step_of_opportunistic_reasoning'
```

```
        are found
        and/or
        a user of the system contrives a good 'next-best-natural-nouns' and/or
        a good 'next-best-natural-verbs' )
        {
          Carry_out_backward_reasoning__and__
          Determine_the_hypothetical_propositions_which_is_to_be_the_
          target_of_the_next_step_of_opportunistic_reasoning(
          HypotheticalPropositionsWhichAreToBeUsedAs_
          _TheTargetOfTheNextStepOfOpportunisticRasoning[]) ;_
        }
        else
        {
          Change_the_
          "decision_concerning_whether_forward_reasoning_and/or_
          backward_reasoning_should_be_carriedout"_
          made_in_previous_steps_of_opportunistic_reasoning() ;_

 /*  FORMULA. 2 (7/7)   */

        }
      }

      if( Problem is solved )
      {
        break ;_
      }
    }

/* Verification of the Result of above Opportunistic Reasoning */
```

09958322.100401

```
    if( the strictness of the reasoning of a step becomes low after for example
        carrying_out_the_@[algorithm of fusing propositions] )
    {

        Re-prove_all_the_steps_of_the_proof_by_a_series_of_steps_of_more_exact_
        opportunistic_reasoning() ;_

    }
}
```

```
/*   FORMULA. 3 (1/4)   */

/* Formula. 3  shows a quasi-C code which is used as a subroutine called from
 * the main routine shown in Formula. 2 , if and when a forward reasoning is to be
 * carried out in a step of opportunistic reasoning. This subroutine is a quasi-C code
 * schematically representing a recommended embodiment of the procedure for
 * carrying out a forward reasoning.
 */

#include "FORMULA. 5 A"

Carry_out__forward_reasoning__and__
Determine_the_hypothetical_propositions_which_is_to_be_
the_target_of_the_next_step_of_opportunistic_reasoning(
HypotheticalPropositionsWhichAreToBeUsedAs_
_TheTargetOfTheNextStepOfOpportunisticRasoning[])
```

09958322 .100401

PCT-2000-01

```
{

/* Get 'hypothetical propositions possibly used in  forward reasoning'
 * by using optimized 'descriptors', optimized 'names-of-classification-items',
 * 'next-best-natural-nouns', and/or, 'next-best-natural-verbs'
 */
Retrieve_'Hypothetical_propositions_possibly_used_in_forward_reasoning'_
by_using_
optimized_'descriptors',_optimized_'names-of-classification-items',_
'next-best-natural-nouns',_and/or,_'next-best-natural-verbs'() ;_

Retrieve_keys_in_"sentence pattern of instances of solving problems"_
by_using_
optimized_'descriptors',_optimized_'names-of-classification-items',_
'next-best-natural-nouns',_and/or,_'next-best-natural-verbs',_
and_make_'Hypothetical_propositions_possibly_used_in_forward_reasoning'() ;_

/* In the case a trouble occurs during the retrieval of the
 * 'hypothetical propositions possibly used in forward reasoning'
 */
if( too many 'hypothetical propositions possibly used in forward reasoning'
are retrieved,
i.e. a combinatorial explosion occurs )
{

  Retrieve_directly_
  'Hypothetical_propositions_to_be_used_in_forward_reasoning'() ;_

/* FORMULA. 3 (2/4) */
```

09958322 .100401

PCT-2000-01

```
if(combinatorial explosion now and/or in the future still can not be avoided)
{
  Revise_
  optimized_'descriptors',_optimized_'names-of-classification-items',_
  'next-best-natural-nouns',_and/or,_'next-best-natural-verbs'
  by_
  Carring_out_a_process_according_to_@[algorithm of narrowing down the target
  'descriptors' and/or target 'names-of-classification-items']_if_necessary_
  And_Retrieve_again,_
  'Hypothetical_propositions_possibly_used_in_forward_reasoning'_
  by_using_the_revised_
  'descriptors',_'names-of-classification-items',_
  'next-best-natural-nouns',_and/or,_'next-best-natural-verbs'() ;_

  if(combinatorial explosion now and/or in the future still can not be avoided)
  {
    Withdraw_the_process_carried_out_according_to_the_
    @[algorithm of narrowing down the target 'descriptors' and/or target
    'names-of-classification-items']_
    and_
    Carry_out_a_process_according_to_
    @[algorithm of fusing propositions]_to_the_'conclusions'_of_the_
    'Hypothetical_propositions_possibly_used_in_forward_reasoning'_
    if_necessary() ;_
  }
}

if(neither direct retrieval nor @[algorithm of narrowing down the target
'descriptors' and/or target 'names-of-classification-items' ]
nor @[algorithm of fusing propositions] works well)
```

```
    {
      Change_the_
      "decision_concerning_whether_forward_reasoning_and/or_
      backward_reasoning_should_be_carriedout"_
      made_in_previous_steps_of_opportunistic_reasoning() ;_

  /*  FORMULA. 3 (3/4)   */

    }
  }

  if( too less 'hypothetical propositions possibly used in forward reasoning'
   are retrieved )
  {
    Carry_out_@[algorithm of broadening out the target 'descriptors' and/or target
    'names-of-classification-items']_
    And_Retrieve_again,_
    'Hypothetical_propositions_possibly_used_in_forward_reasoning'() ;_

    if(@[algorithm of broadening out the target 'descriptors' and/or target
    'names-of-classification-items'] dose not work well)
    {
      Change_the_
      "decision_concerning_whether_forward_reasoning_and/or_
      backward_reasoning_should_be_carriedout"_
      made_in_previous_steps_of_opportunistic_reasoning() ;_
    }
  }

  Unless_@[algorithm of fusing propositions]_has_not_been_carried_out_
```

09958322 .100401

Choose_the_'hypothetical_propositions_to_be_used_in_forward_reasoning'_
out_of_the_
'Hypothetical_propositions_possibly_used_in_forward_reasoning'_
And_else_if_@[algorithm of fusing propositions]_has_been_carried_out_,
Use_ 〖fused hypothetical propositions to be used in the present step of forward reasoning〗 _as_it_is
as_the_'hypothetical_propositions_to_be_used_in_forward_reasoning'_() ;_

／＊ FORMULA. 3 (4/4) ＊／

Determine_the_hypothetical_propositions_
which_are_to_be_used_
as_the_target_of_the_next_step_of_opportunistic_reasoning_
on_the_basis_
of_the_'hypothetical_propositions_to_be_used_in_forward_reasoning'_
in_the_present_step_of_opportunistic_reasoning_
and_
of_a_hypothetical_proposition_
which_is_the_target_of_the_present_step_of_forward_reasoning
by_using_
@[algorithm of sentence based object-oriented categorical syllogism]_and_
@[algorithm of sentence based object-oriented hypothetical syllogism]_
forward(
HypotheticalPropositionsWhichAreToBeUsedAs_
_TheTargetOfTheNextStepOfOpportunisticRasoning[]) ;_
}

09958322.100401

PCT-2000-01

```
/*   FORMULA. 4 (1/4)   */

/* Formula. 4  shows a quasi-C code which is used as a subroutine called from
 * the main routine shown in Formula. 2 , if and when a backward reasoning is to be
 * carried out in a step of opportunistic reasoning. This subroutine is a quasi-C code
 * schematically representing a recommended embodiment of the procedure for
 * carrying out a backward reasoning.
 */

#include "FORMULA. 5 B"

Carry_out_backward_reasoning__and__
Determine_the_hypothetical_propositions_which_is_to_be_the_
target_of_the_next_step_of_opportunistic_reasoning(
HypotheticalPropositionsWhichAreToBeUsedAs_
_TheTargetOfTheNextStepOfOpportunisticRasoning[])
{

   /* Get 'hypothetical propositions possibly used in   backward reasoning'
    * by using optimized 'descriptors', optimized 'names-of-classification-items',
    * 'next-best-natural-nouns', and/or, 'next-best-natural-verbs'
    */
   Retrieve_'Hypothetical_propositions_possibly_used_in_backward_reasoning'_
   by_using_
   optimized_'descriptors',_optimized_'names-of-classification-items',_
   'next-best-natural-nouns',_and/or,_'next-best-natural-verbs'() ;_

   Retrieve_keys_in_"sentence pattern of instances of solving problems"_
```

09958322 .100401

```
by_using_
optimized_'descriptors',_optimized_'names-of-classification-items',_
'next-best-natural-nouns',_and/or,_'next-best-natural-verbs',_
and_make_'Hypothetical_propositions_possibly_used_in_backward_reasoning'() ;_

/* In the case a trouble occurs during the retrieval of the
 * 'hypothetical propositions possibly used in backward reasoning'
 */
if( too many 'hypothetical proposition possibly used in backward reasoning'
are retrieved,
i.e. a combinatorial explosion occurs )
{
  Retrieve_directly_
  'Hypothetical_propositions_to_be_used_in_backward_reasoning'() ;_

/* FORMULA. 4 (2/4) */

  if(combinatorial explosion now and/or in the future still can not be avoided)
  {
    Revise_
    optimized_'descriptors',_optimized_'names-of-classification-items',_
    'next-best-natural-nouns',_and/or,_'next-best-natural-verbs'
    by_
    Carring_out_a_process_according_to_@[algorithm of narrowing down the target
    'descriptors' and/or target 'names-of-classification-items']_if_necessary_
    And_Retrieve_again,_
    'Hypothetical_propositions_possibly_used_in_backward_reasoning'_
    by_using_the_revised_
    'descriptors',_'names-of-classification-items',_
    'next-best-natural-nouns',_and/or,_'next-best-natural-verbs'() ;_
```

09958322.100401

```
      if(combinatorial explosion now and/or in the future still can not be avoided)
      {
        Withdraw_the_process_carried_out_according_to_the_
        @[algorithm of narrowing down the target 'descriptors' and/or target
        'names-of-classification-items']_
        and_
        Carry_out_a_process_according_to_
        @[algorithm of fusing propositions]_to_the_'presuppositions'_
        of_the_'Hypothetical_propositions_possibly_used_in_backward_reasoning'_
        if_necessary() ;_
      }
    }
    if(neither direct retrieval nor @[algorithm of narrowing down the target
    'descriptors' and/or target 'names-of-classification-items']
    nor @[algorithm of fusing propositions] works well)
    {
      Change_the_
      "decision_concerning_whether_forward_reasoning_and/or_
      backward_reasoning_should_be_carriedout"_
      made_in_previous_steps_of_opportunistic_reasoning() ;_
    }

/*  FORMULA. 4 (3/4)  */

  }

  if( too less 'hypothetical proposition possibly used in backward reasoning'
  are retrieved )
  {
```

09958322 .100401

```
    Carry_out_@[algorithm of broadening out the target 'descriptors' and/or target
    'names-of-classification-items']
    And_Retrieve_again,_
    'Hypothetical_propositions_possibly_used_in_backward_reasoning'() ;_

    if(@[algorithm of broadening out the target 'descriptors' and/or target
    'names-of-classification-items'] dose not work well)
    {
      Change_the_
      "decision_concerning_whether_forward_reasoning_and/or_
      backward_reasoning_should_be_carriedout"_
      made_in_previous_steps_of_opportunistic_reasoning() ;_
    }
  }

  Unless_@[algorithm of fusing propositions]_has_not_been_carried_out_
  Choose_the_'hypothetical_propositions_to_be_used_in_backward_reasoning'_
  out_of_the_
  'Hypothetical_propositions_possibly_used_in_backward_reasoning'_
  And_else_if_@[algorithm of fusing propositions]_has_been_carried_out_,
  Use_ 『fused hypothetical propositions to be used in the present step of
  backward reasoning』 _as_it_is_
  as_the_'hypothetical_propositions_to_be_used_in_backward_reasoning'_() ;_


/*  FORMULA. 4 (4/4)  */

  Determine_the_hypothetical_propositions_
  which_are_to_be_used_
  as_the_target_of_the_next_step_of_opportunistic_reasoning_
```

```
on_the_basis_
of_the_'hypothetical_propositions_to_be_used_in_backward_reasoning'_
in_the_present_step_of_opportunistic_reasoning
and_
of_a_hypothetical_proposition_
which_is_the_target_of_the_present_step_of_backward_reasoning
of_opportunistic_reasoning_
by_using_
@[algorithm of sentence based object-oriented categorical syllogism]_and_
@[algorithm of sentence based object-oriented hypothetical syllogism]_
backward(
HypotheticalPropositionsWhichAreToBeUsedAs_
_TheTargetOfTheNextStepOfOpportunisticRasoning[]) ;_

}
```

```
/* FORMULA. 5 A (1/3) */

/* Formula. 5 A shows a quasi-C code which is used as a subroutine called from
 * the quasi-C code shown in Formula. 3 . Formula. 5 A shows a quasi-C code
 * schematically representing a recommended embodiment of the procedure
 * to "determine the hypothetical propositions which are to be used as the
 * target of the next step of opportunistic reasoning" when a forward reasoning
 * has been carried out in the present step of opportunistic reasoning.
 */
```

09958322.100401

PCT-2000-01

```
Determine_the_hypothetical_propositions_
which_are_to_be_used_
as_the_target_of_the_next_step_of_opportunistic_reasoning_
on_the_basis_
of_the_'hypothetical_propositions_to_be_used_in_forward_reasoning'_
in_the_present_step_of_opportunistic_reasoning_
and_
of_a_hypothetical_proposition_
which_is_the_target_of_the_present_step_of_forward_reasoning
by_using_
@[algorithm of sentence based object-oriented categorical syllogism]_and_
@[algorithm of sentence based object-oriented hypothetical syllogism]_
forward_()
{

 /* In an ideal case in which forward reasoning has been carried out in the present step
  * of opportunistic reasoning:
  */

  for(all the 'hypothetical_propositions_to_be_used_in_forward_reasoning')
  {
    Determine_
    the_Hypothetical_proposition_which_is_to_be_the_target_of_
    the_next_step_of_opportunistic_reasoning,_
    for_
    a_'hypothetical_proposition_to_be_used_in_forward_reasoning'_in_
    the_present_step_of_opportunistic_reasoning,_
    (a 'hypothetical_proposition_to_be_used_in_forward_reasoning') ;_
  }
}
```

09958322 .100401

PCT-2000-01

```
/*  FORMULA. 5 A (2/3)  */

Determine_
the_Hypothetical_proposition_which_is_to_be_the_target_of_
the_next_step_of_opportunistic_reasoning,_
for_
a_'hypothetical_proposition_to_be_used_in_forward_reasoning'_in_
the_present_step_of_opportunistic_reasoning,_
(a 'hypothetical_proposition_to_be_used_in_forward_reasoning')
{

 /* If */
 if(
     a hypothetical proposition that is the target of
     the present step of forward reasoning
         has
         'presupposition' A
         and
         'consequence' B,
     and
     a hypothetical proposition to be used in the forward reasoning of
     the present step of forward reasoning
         has
         'presupposition' C
         and
         'consequence' D,
     ,where 'presupposition' C must satisfy
         'presupposition' A  ->  'presupposition' C,
         on the basis of @[algorithm of sentence based object-oriented categorical
```

```
        syllogism],
        and/or
        on the basis of @[algorithm of sentence based object-oriented hypothetical
        syllogism]
  )

/* FORMULA. 5 A(3/3) */

  /* Then */
  {

      hypothetical proposition that is to be the target of
      the next step of opportunistic reasoning is
      a hypothetical proposition
          whose 'presupposition' is equal to 'consequence' D,
          and
          whose 'consequence' should be equal to 'consequence' B.
  }
}
```

/* FORMULA. 5 B(1/3) */

```
/* Formula. 5 B shows a quasi-C code which is used as a subroutine called from
 * the quasi-C code shown Formula. 4 . Formula. 5 B shows a quasi-C code
 * schematically representing a recommended embodiment of the procedure
 * to "determine the hypothetical propositions which are to be used as the
```

```
 * target of the next step of opportunistic reasoning" when a backward reasoning
 * has been carried out in the present step of opportunistic reasoning.
 */

Determine_the_hypothetical_propositions_
which_are_to_be_used_
as_the_target_of_the_next_step_of_opportunistic_reasoning_
on_the_basis_
of_the_'hypothetical_propositions_to_be_used_in_backward_reasoning'_
in_the_present_step_of_opportunistic_reasoning
and_
of_a_hypothetical_proposition_
which_is_the_target_of_the_present_step_of_backward_reasoning
of_opportunistic_reasoning_
by_using_
@[algorithm of sentence based object-oriented categorical syllogism]_and_
@[algorithm of sentence based object-oriented hypothetical syllogism]_
backward()
{

  /* In an ideal case in which backward reasoning has been carried out in the present
   * step of opportunistic reasoning:
   */

  for(all the 'hypothetical_propositions_to_be_used_in_backward_reasoning')
  {
    Determine_
    the_Hypothetical_proposition_which_is_to_be_the_target_of_
    the_next_step_of_opportunistic_reasoning,_
    for_
```

09958322 .100401

```
        a_'hypothetical_proposition_to_be_used_in_backward_reasoning'_in_
        the_present_step_of_opportunistic_reasoning,_
        (a 'hypothetical_proposition_to_be_used_in_backward_reasoning') ;_
    }
}
```

／＊　FORMULA. 5 B (2/3)　＊／

```
Determine_
the_Hypothetical_proposition_which_is_to_be_the_target_of_
the_next_step_of_opportunistic_reasoning,_
for_
a_'hypothetical_proposition_to_be_used_in_backward_reasoning'_in_
the_present_step_of_opportunistic_reasoning,_
(a 'hypothetical_proposition_to_be_used_in_backward_reasoning') ;_
{
  /* If */
  if(
      a hypothetical proposition that is the target of
      the present step of backward reasoning
          has
          'presupposition' E
          and
          'consequence' F,
      and
      a hypothetical proposition to be used in the backward reasoning of
      the present step of backward reasoning
          has
          'presupposition' G
          and
```

09958322 .100401

PCT-2000-01

```
            'consequence' H,
        ,where 'presupposition' H must satisfy
            'presupposition' H  -> 'presupposition' F,
            on the basis of @[algorithm of sentence based object-oriented categorical
            syllogism],
            and/or
            on the basis of @[algorithm of sentence based object-oriented hypothetical
            syllogism]
    )

    /* Then */
    {

  /*  FORMULA. 5 B(3/3)  */

        hypothetical proposition that is to be the target of
        the next step of opportunistic reasoning is
        a hypothetical proposition
            whose 'presupposition' should be equal to 'consequence' E,
            and
            whose 'consequence' should be equal to 'consequence' G.
    }
  }

  /*  FORMULA. 6 (1/1)  */
```

09958322 .100401

PCT-2000-01

/* Formula. 6 shows a 'classification table' comprising 'names-of-classification-items'
* to be used for a manual of a Japanese word processor.
*/

| |
|---|
| 'TO INPUT HALF-SIZED ALPHANUMERIC CHARACTERS' |
| 'TO CONVERT HALF-SIZED ALPHANUMERIC CHARACTERS TO HIRAGANA CHARACTERS IN ORDER TO INPUT HIRAGANA CHARACTERS' |
| 'TO CONVERT HALF-SIZED ALPHANUMERIC CHARACTERS TO KATAKANA CHARACTERS IN ORDER TO INPUT KATAKANA CHARACTERS' |
| 'TO CONVERT HALF-SIZED ALPHANUMERIC CHARACTERS TO KANJI CHARACTERS IN ORDER TO INPUT KANJI CHARACTERS' |
| /* MAKING A PAGE FORMATTING OF A DOCUMENT */ |
| 'TO MAKE A SPECIFYICATION OF THE NUMBER OF CHARACTERS IN A LINE' |
| 'TO MAKE A SPECIFYICATION OF THE NUMBER OF LINES IN A PAGE' |
| 'TO MAKE A SPECIFYICATION OF THE FONT OF CHARACTERS' |
| /* PRINTING A DOCUMENT */ |
| 'TO MAKE A SPECIFYICATION OF THE SIZE OF THE PAPER' |
| 'TO MAKE A SPECIFYICATION OF SIZE OF THE MARGIN OF THE PAPER' |
| 'TO MAKE A PRINTER PRINT A DOCUMENT ON A PAPER' |

PCT-2000-01

09958322 .100401

```
/* SAVING A DOCUMENT ON A STORING MEDIA */
    'TO SAVE A DOCUMENT IN A FLOPPY DISK'
    'TO SAVE A DOCUMENT IN A HARD DISK'
```

```
/*  FORMULA. 7 (1/9)  */

/* Formula. 7  shows a quasi-C code schematically representing a recommended
 * embodiment of
 * @[algorithm of making a list of 'descriptors' ranked in order of hit frequency].
 */

#include "FORMULA. 9 "

Algorithm_of_making_a_list_of_'descriptors'_ranked_in_order_of_'hit_frequency'()
{

  static char CollectedKeysMatrix[];
  static char HitKeysMatrix[];
  static char HitCopiesOfDescriptorsMatrix[];
  static char DescriptorVersusHitFrequencyMatrix[];

  Let_a_user_of_the_system_make_a_query() ;_

  Make_DescriptorVersusHitFrequencyMatrix_in_which_'descriptors'_
```

```
hit_upon_during_the_retrieval_are_ranked_in_order_of_their_hit_frequencies() ;_

/* Show the result to the user of the system */
Display_the_sorted_DescriptorVersusHitFrequencyMatrix() ;_

}

Make_DescriptorVersusHitFrequencyMatrix_in_which_'descriptors'_
hit_upon_during_the_retrieval_are_ranked_in_order_of_their_hit_frequencies() ;_
{

Collect_all_the_keys_
from_the_sets_of_data_of_knowledge_that_are_chosen_by_the_user_of_the_system_
and_store_all_the_collected_keys_in_CollectedKeysMatrix() ;_

Retrieve_all_the_keys_that_match_patterns_
from_CollectedKeysMatrix_and_
put_one_retrieved_key_in_one_line_of_HitKeysMatrix_
on_top_of_another_retreived_key_in_another_line_of_HitKeysMatrix() ;_

/* FORMULA. 7 (2/9) */

Pick_up_all_the_copies_of_the_'descriptors'_in_HitKeysMatrix_and_
put_one_copy_in_one_line_of_HitCopiesOfDescriptorsMatrix_
on_top_of_another_copy_in_another_line_of_HitCopiesOfDescriptorsMatrix() ;_

Sort_alphabetically_HitCopiesOfDescriptorsMatrix() ;_

Count_the_number_of_the_copies_of_each_'descriptor'_
in_the_sorted_HitCopiesOfDescriptorsMatrix_
```

PCT-2000-01 09958322.100401

```
    and_regard_the_number_as_the_'hit_frequency'_of_the_'descriptor'_and_then_
    put_one_pair_of_a_'descriptor'_and_its_'hit_frequency'_
    in_one_line_of_DescriptorVersusHitFrequencyMatrix_
    on_top_of_
    another_pair_in_another_line_of_DescriptorVersusHitFrequencyMatrix() ;_

    Sort_the_DescriptorVersusHitFrequencyMatrix_
    according_to_the_hit_frequencies() ;_

}

Pick_up_all_the_copies_of_the_'descriptors'_in_HitKeysMatrix_and_
put_one_copy_in_one_line_of_HitCopiesOfDescriptorsMatrix_
on_top_of_another_copy_in_another_line_of_HitCopiesOfDescriptorsMatrix()
{

    /* Note!
     * A 'descriptor' in keys having systematic data structure defined in the
     * present invention is described in parenthesis, using _( and )_.
     */

    char DescriptorMatrix[];

    while(characters which have not been read remain in HitKeysMatrix[])
    {

      Initialize_DescriptorMatrix_to_be_a_vacant_matrix() ;_

/*  FORMULA. 7 (3/9)  */
```

09958322.100401

```
        /* Find '_('. */
        Read_one_character_in_HitKeysMatrix_after_another_and_
        if_'_('_is_detected_
        then_return_1_and_return_the_control_of_this_function_
        else_if_the_last_character_of_HitKeysMatrix_is_detected_
        then_break_the_while_loop() ;_

        /* Record the string between '_(' and ')_' */
        Read_and_copy_the_characters_below_'_('_in_HitKeysMatrix_
        one_after_another_until_')_'_is_detected_
        and_paste_it_on_DescriptorMatrix_and_
        return_the_control_of_this_function() ;_

        Copy_DescriptorMatrix_and_
        paste_it_on_a_new_line_of_HitCopiesOfDescriptorsMatrix() ;_

      }
    }

/******************** Sorting ********************/

    #define N 'number of the lines in HitCopiesOfDescriptorsMatrix[]'
    /* Note!
     * In each line of HitCopiesOfDescriptorsMatrix[], one copy of a 'descriptor' is
     * recorded.
     */
    #define M 'size of a stack'
    int sp;

char w[N+1][]; /* Array for working */
```

09958322 .100401

```
int STACK[M+1][2]; /* STACK[sp][0]: Index of beginning line of the sp'th incompletely
part
                      * in HitCopiesOfDescriptorsMatrix[];
                      * STACK[sp][1]: Index of the end line of the sp'th incompletely
                      * sorted part in HitCopiesOfDescriptorsMatrix[].
                      */
```

**/* FORMULA. 7 (4/9) */**

```
Sort_alphabetically_HitCopiesOfDescriptorsMatrix()
{

  /* I use here quick sort. This embodiment is the best mode in a simple system
   * like this.
   * For more detail, see ◎"C-Arugorizumu Zen-Ka", for example.
   */

  int i,l;
  int b,e;

  /* The 'sp' is an index named 'stack pointer', which is used to identify
   * a incompletely sorted part
   */
  sp = 0; /* Initialize the value of 'sp' */

  STACK[sp][0]=1; STACK[sp][1]=N; /* At first, all the lines of
                                   * HitCopiesOfDescriptorsMatrix[],
                                   * i.e. from line number 1 to N,
                                   * are
                                   * regarded to be included in
```

```
                         * one incompletely sorted part.
                         */

  /* While incompletely sorted parts remain,
   * i.e. parts which can be parted into
   * subparts, i.e.,
   * a_younger_indexed_subpart,
   * a_middle_indexed_subpart,
   * and_a_older_indexrd_subpart
   * remain,
   * part the incompletely sorted parts into subparts
   * one after another.
   */

/*   FORMULA. 7 (5/9)   */

  while(sp>=0)
  {

    b = STACK[sp][0];    /* The line number of the first line of
                          * a incompletely sorted part.
                          */
    e = STACK[sp][1];    /* The line number of the last line of
                          * the incompletely sorted part.
                          */
    --sp;

    part_an_incompletely_sorted_part_of_HitCopiesOfDescriptorsMatrix_into_
    a_younger_indexed_subpart,_
    a_middle_indexed_subpart,_
```

09958322.100401

```
        and_a_older_indexrd_subpart(b,e) ;_
      }
    }

part_an_incompletely_sorted_part_of_HitCopiesOfDescriptorsMatrix_into_
a_younger_indexed_subpart,_
a_middle_indexed_subpart,_
and_a_older_indexrd_subpart(b,e)
{
  int i,j,k,m;
  char x[];

  /* Part an incompletely sorted part, (b,e). */
  i=b-1; j=e+1;
  m = (int)((b+e)/2) ;_

  Copy_line_m_of_HitCopiesOfDescriptorsMatrix_and_
  paste_it_on_x() ;_
  /* Note!
   * x[] is the string used as the standard.
   */

/*  FORMULA. 7 (6/9)  */

  for(k=b; k<=e; ++k)
  {
    if( String_compare('line k of HitCopiesOfDescriptorsMatrix[]', x[]) < 0 )
    {
      /* Make younger indexed subpart */
      ++i;
```

09958322.100401

```
    Copy_line_k_of_HitCopiesOfDescriptorsMatrix_
    and_paste_it_on_line_i_of_w(i,k,w[i][]) ;_
  }
  if( String_compare('line k of HitCopiesOfDescriptorsMatrix[]', x[]) > 0 )
  {
    /* Make older indexed subpart */
    --j;
    Copy_line_k_of_HitCopiesOfDescriptorsMatrix_
    and_paste_it_on_line_j_of_w(j,k,w[j][]) ;_
  }
}

for(k=b; k<=i; ++k)
{
  /* Copy younger indexed subpart on HitCopiesOfDescriptorsMatrix[] */

  Copy_line_k_of_w_and_paste_it_on_
  line_k_of_HitCopiesOfDescriptorsMatrix(k,w[k][]) ;_
}

for(k=j; k<=e; ++k)
{
  /* Copy older indexed subpart on HitCopiesOfDescriptorsMatrix[] */

  Copy_line_k_of_w_and_paste_it_on_
  line_k_of_HitCopiesOfDescriptorsMatrix(k,w[k][]) ;_
}
for(k=(i+1) ;_ k<j; ++k)
{
```

09958322 .100401

```
/* FORMULA. 7 (7/9) */

      /* Copy middle indexed subpart, (i.e. lines equal to x[])
       * on HitCopiesOfDescriptorsMatrix[]
       */

      Copy_string_x_and_paste_it_on_
      line_k_of_HitCopiesOfDescriptorsMatrix(k,x[]) ;_
    }

    /* If
     * the younger indexed subpart
     * and/or
     * the older indexed subpart
     * is incompletely sorted,
     * then,
     * regard it as an incompletely sorted part of HitCopiesOfDescriptorsMatrix[]
     * and register the line numbers of the first and the last line of it
     */

    if( b<I ){++sp; STACK[sp][0]=b; STACK[sp][1]=i;}
    if( j<e ){++sp; STACK[sp][0]=j; STACK[sp][1]=e;}
  }

/******************** End of Sorting ********************/

  Count_the_number_of_the_copies_of_each_'descriptor'_
  in_the_sorted_HitCopiesOfDescriptorsMatrix_
  and_regard_the_number_as_the_'hit_frequency'_of_the_'descriptor'_and_then_
  put_one_pair_of_a_'descriptor'_and_its_'hit_frequency'_
```

```
in_one_line_of_DescriptorVersusHitFrequencyMatrix_
on_top_of_another_pair_in_another_line_of_DescriptorVersusHitFrequencyMatrix()
{
  /* Before this present function is carried out,
   * HitCopiesOfDescriptorsMatrix[] must be sorted alphabetically.
   */

/*  FORMULA. 7 (8/9)  */

  /* Note!
   * In each line of HitCopiesOfDescriptorsMatrix[],
   * only one copy of a 'descriptor' is recorded.
   */

  char StringMatrix[];
  int HitFrequencyN;
  int n;
  char WorkingMatrix[];

  Initialize_DescriptorVersusHitFrequencyMatrix_to_be_a_vacant_matrix() ;_

  /* Initialize 'hit frequency' of the 'descriptor', i.e. HitFrequencyN */
  HitFrequencyN = 1;

  Initialize_StringMatrix_to_be_a_vacant_matrix() ;_

  Copy_the_first_line_of_HitCopiesOfDescriptorsMatrix_
  and_paste_it_on_StringMatrix() ;_

  n = 1;
```

PCT-2000-01 09958322.100401

```
while(lines which has not been read remain in HitCopiesOfDescriptorsMatrix[])
{
  Read_the_n'th_line_in_HitCopiesOfDescriptorsMatrix(n) ;_

  if( the n'th line equals to StringMatrix[] )
  {
    HitFrequencyN = HitFrequencyN + 1;
    if( the n'th line is the last line of HitCopiesOfDescriptorsMatrix[] )
    {
      Write_HitFrequencyN_at_the_top_of_the_
      new_line_of_DescriptorVersusHitFrequencyMatrix_
      and_then_paste_StringMatrix_after_the_HitFrequencyN_
      on_the_same_line() ;_

/*  FORMULA. 7 (9/9)   */

    }
    n = n+1;
  }

  else if( the n'th line is not equal to StringMatrix[] )
  {

    Write_HitFrequencyN_at_the_top_of_the_
    new_line_of_DescriptorVersusHitFrequencyMatrix_
    and_then_paste_StringMatrix_after_the_HitFrequencyN_
    on_the_same_line() ;_

    HitFrequencyN = 1;
```

09959322.100401

```
Reinitialize_StringMatrix_to_be_a_vacant_matrix() ;_

Copy_the_n'th_line_in_HitCopiesOfDescriptorsMatrix_
and_paste_it_on_StringMatrix(n) ;_

if( the n'th line is the last line of HitCopiesOfDescriptorsMatrix[] )
{
  Write_HitFrequencyN_at_the_top_of_the_
  new_line_of_DescriptorVersusHitFrequencyMatrix_
  and_then_paste_StringMatrix_after_the_HitFrequencyN_
  on_the_same_line() ;_
}
n = n+1;
    }
  }
}
```

```
/*  FORMULA. 8 A (1/10)  */

/* Formula. 8 A  shows the main part of a quasi-C code schematically representing a
 * recommended embodiment of @[algorithm of making a list of'
 * 'names-of-classification-items ranked in order of hit frequency].
 */

#include "FORMULA. 8 B"
```

09958322 .100401

```
#include "FORMULA. 9"

Algorithm_of_making_a_list_of_'names_of_classification_items'_
ranked_in_order_of_'hit_frequency'()
{

  static char CollectedKeysMatrix[];
  static char HitKeysMatrix[];
  static char HitCopiesOfNamesOfClassificationItemsMatrix[];
  static char NameOfClassificationItemVersusHitFrequencyMatrix[];

  Let_a_user_of_the_system_make_a_query() ;_

  Make_NameOfClassificationItemVersusHitFrequencyMatrix_
  in_which_'names_of_classification_items'_
  hit_upon_during_the_retrieval_are_ranked_in_order_of_their_hit_frequencies() ;_

  /* Show the result to the user of the system */
  Display_the_sorted_NameOfClassificationItemVersusHitFrequencyMatrix() ;_

}

Make_NameOfClassificationItemVersusHitFrequencyMatrix_
in_which_'names_of_classification_items'_
hit_upon_during_the_retrieval_are_ranked_in_order_of_their_hit_frequencies() ;_
{

  Collect_all_the_keys_
  from_the_sets_of_data_of_knowledge_that_are_chosen_by_the_user_of_the_system_
  and_store_all_the_collected_keys_in_CollectedKeysMatrix() ;_
```

PCT-2000-01

09958322 .100401

/* FORMULA. 8 A (2/10) */

Retrieve_all_the_keys_that_match_patterns_ from_CollectedKeysMatrix_and_ put_one_retrieved_key_in_one_line_of_HitKeysMatrix_ on_top_of_another_retreived_key_in_another_line_of_HitKeysMatrix() ;_

Pick_up_all_the_copies_of_the_'names_of_classification_items'_in_HitKeysMatrix_ and_ put_one_copy_in_one_line_of_HitCopiesOfNamesOfClassificationItemsMatrix_ on_top_of_ another_copy_ in_another_line_of_HitCopiesOfNamesOfClassificationItemsMatrix() ;_

Sort_alphabetically_HitCopiesOfNamesOfClassificationItemsMatrix() ;_

Count_the_number_of_the_copies_of_each_'name_of_classification_item'_ in_the_sorted_HitCopiesOfNamesOfClassificationItemsMatrix_ and_regard_the_number_ as_the_'hit_frequency'_of_the_'name_of_classification_item'_and_then_ put_one_pair_of_a_'name_of_classification_item'_and_its_'hit_frequency'_ in_one_line_of_NameOfClassificationItemVersusHitFrequencyMatrix_ on_top_of_ another_pair_ in_another_line_of_NameOfClassificationItemVersusHitFrequencyMatrix() ;_

Sort_the_NameOfClassificationItemVersusHitFrequencyMatrix_ according_to_the_hit_frequencies() ;_

09958322.100401

```
}

Retrieve_all_the_keys_that_match_patterns_
from_CollectedKeysMatrix_and_
put_one_retrieved_key_in_one_line_of_HitKeysMatrix_
on_top_of_another_retreived_key_in_another_line_of_HitKeysMatrix() ;_
{

/*   FORMULA. 8 A (3/10)   */

  /* Note!
   * In this example of embodiment, for the sake of simplicity, I restrict myself in
   * the cases in which only one pattern is inputted and/or two patterns are inputted
   * for the sake of simplicity. However, this is the best mode in a simple system
   * like the present one.
   */

  int index_of_a_line's_head;

  Initialize_HitKeysMatrix_to_be_a_vacant_matrix() ;_

  /* Initialize the value of index_of_a_line's_head to be 0; 0 is the index of the
   * first character in the first line of CollectedKeysMatrix[].
   */

  index_of_a_line's_head = 0;

  if( only one 'pattern' is inputted by the user of the system )
  {
```

PCT-2000-01 09958322 .100401

```
    /* Put hit keys on HitKeysMatrix[]. */
    Read_CollectedKeysMatrix_line_by_line_from_the_first_line_to_the_last_line_
    and_
    if_a_key_in_a_line_contains_a_pattern_
    then_put_the_hit_key_one_in_one_line_of_HitKeysMatrix_on_top_of_another_
    in_another_line_of_HitKeysMatrix('pattern', &index_of_a_line's_head) ;_

  }
  else if( 'two patterns' connected by 'and' is inputted by the user of the system )
  {

/* FORMULA. 8 A (4/10) */

    /* Put hit keys on HitKeysMatrix[]. */
    Read_CollectedKeysMatrix_line_by_line_from_the_first_line_to_the_last_line_
    and_
    if_a_key_in_a_line_contains_a_pattern_
    then_put_the_hit_key_one_in_one_line_of_HitKeysMatrix_on_top_of_another_
    in_another_line_of_HitKeysMatrix('first_pattern', &index_of_a_line's_head) ;_

    Initialize_CollectedKeysMatrix_to_be_a_vacant_matrix() ;_

    Copy_HitKeysMatrix_and_then_
    reinitialize_CollectedKeysMatrix_by_pasting_it_on_CollectedKeysMatrix() ;_

    Initialize_HitKeysMatrix_to_be_a_vacant_matrix() ;_

  /* Reinitialize the value of index_of_a_line's_head to be 0; 0 is the index of the
   * first character in the first line of CollectedKeysMatrix[].
   */
```

09958322 .100401

```
index_of_a_line's_head = 0;

  Read_CollectedKeysMatrix_line_by_line_from_the_first_line_to_the_last_line_
  and_
  if_a_key_in_a_line_contains_a_pattern_
  then_put_the_hit_key_one_in_one_line_of_HitKeysMatrix_on_top_of_another_
  in_another_line_of_HitKeysMatrix('second_pattern',&index_of_a_line's_head) ;_

}
else if( 'two patterns' connected by 'or' is inputted by the user of the system )
{

  /* Put hit keys on HitKeysMatrix[]. */
  Read_CollectedKeysMatrix_line_by_line_from_the_first_line_to_the_last_line_
  and_
  if_a_key_in_a_line_contains_a_pattern_
  then_put_the_hit_key_one_in_one_line_of_HitKeysMatrix_on_top_of_another_
  in_another_line_of_HitKeysMatrix('first_pattern',&index_of_a_line's_head) ;_

/*  FORMULA. 8 A (5/10)  */

  /* Add additional hit keys on HitKeysMatrix[]. */
  Read_CollectedKeysMatrix_line_by_line_from_the_first_line_to_the_last_line_
  and_
  if_a_key_in_a_line_contains_a_pattern_
  then_put_the_hit_key_one_in_one_line_of_HitKeysMatrix_on_top_of_another_
  in_another_line_of_HitKeysMatrix('second_pattern',&index_of_a_line's_head) ;_

}
```

09958322 .100401

```
}

#define L 112 /* Number of the characters in a character code table, e.g. ANSI(ASCII)
 */

Read_CollectedKeysMatrix_line_by_line_from_the_first_line_to_the_last_line_
and_
if_a_key_in_a_line_contains_a_pattern_
then_put_the_hit_key_one_in_one_line_of_HitKeysMatrix_on_top_of_another_
in_another_line_of_HitKeysMatrix('pattern', *index_of_a_line's_head)
{

  /* HitKeysMatrix[] must not be initialized in this subroutine
   */
  /* I use here Boyer-Moor method for string pattern matching in this embodiment.
   * For more detail, see ◎"C-Arugorizumu Zen-Ka", for example.
   */

  char T[A_Big_Number], P[A_Big_Number];
  int D[L];
  int I, p, flag, M;

  /* Copy 'pattern' and paste it on P[], and at the same time,
   * measure the length of the 'pattern'.
   */
  M =
  Copy_pattern_and_paste_it_on_P[]_and_return_the_length_of_pattern('pattern') ;_

  /* Prepare D[] */
  for(i=0; i<L; ++i) D[i]=M;      /* M is the length of 'pattern'. */
```

```
    for(i=0; i<M-1; ++i) D[P[i]]=M-i-1;

  /*  FORMULA. 8 A(6/10)  */

    /* Initialize the value of p */
    p = *index_of_a_line's_head;

    while(lines which have not been read remain in CollectedKeysMatrix[])
    {

      /* Check whether a line of CollectedKeysMatrix[] contains 'pattern' or not */
      flag  =  If_a_line_whose_first_character' s_index_equals_to_p__
               contains_pattern__
               then__return_1__and_else__return_0(p,M,T[],P[],D[]) ;_

      if( flag==1 )
      {

        Copy_the_present_line_of_CollectedKeysMatrix_and_
        past_it_on_a_new_line_of_HitKeysMatrix() ;_

        /* Note! each line of CollectedKeysMatrix[] contains only one key */

      }
      p = index_of_the_first_character_in_the_next_line_of_CollectedKeysMatrix[];
    }
    *index_of_a_line's_head = p;
  }

  Pick_up_all_the_copies_of_the_'names_of_classification_items'_in_HitKeysMatrix_
```

```
and_
put_one_copy_in_one_line_of_HitCopiesOfNamesOfClassificationItemsMatrix_
on_top_of_
another_copy_in_another_line_of_HitCopiesOfNamesOfClassificationItemsMatrix()
{

  /* Note!
   * A 'name_of_classification_item' in keys having any systematic data structure
   * defined in the present invention is described in parenthesis, using _{ and }.
   */

/*   FORMULA. 8 A (7/10)   */

  char NameOfClassificationItemMatrix[];

  while(characters which have not been read remain in HitKeysMatrix[])
  {

    Initialize_NameOfClassificationItemMatrix_to_be_a_vacant_matrix() ;_

    /* Find '_{'. */
    Read_one_character_in_HitKeysMatrix_after_another_and_
    if_'_{'_is_detected_
    then_return_1_and_return_the_control_of_this_function_
    else_if_the_last_character_of_HitKeysMatrix_is_detected_
    then_break_the_while_loop() ;_

    /* Record the string between '_{' and '}_' */
    Read_and_copy_the_characters_below_'_{'_in_HitKeysMatrix_
    one_after_another_until_'}_'_is_detected_
```

09958322.100401

```
        and_paste_it_on_NameOfClassificationItemMatrix_and_
        return_the_control_of_this_function() ;_

        Copy_NameOfClassificationItemMatrix_and_
        paste_it_on_a_new_line_of_HitCopiesOfNamesOfClassificationItemsMatrix[]() ;_

    }
  }

/*  FORMULA. 8 A(8/10)  */

Count_the_number_of_the_copies_of_each_'name_of_classification_item'_
in_the_sorted_HitCopiesOfNamesOfClassificationItemsMatrix_
and_regard_the_number_
as_the_'hit_frequency'_of_the_'name_of_classification_item'_and_then_
put_one_pair_of_a_'name_of_classification_item'_and_its_'hit_frequency'_
in_one_line_of_NameOfClassificationItemVersusHitFrequencyMatrix_
on_top_of_
another_pair_in_another_line_of_NameOfClassificationItemVersusHitFrequencyMatr
ix()
{

  /* Before this present function is carried out,
   * HitCopiesOfNamesOfClassificationItemsMatrix[] must be sorted alphabetically.
   */

  /* Note!
   * In each line of HitCopiesOfNamesOfClassificationItemsMatrix[],
   * only one copy of a  'name_of_classification_item'  is recorded.
   */
```

09958322 .100401

```
char StringMatrix[];
int HitFrequencyN;
int n;
char WorkingMatrix[];

Initialize_NameOfClassificationItemVersusHitFrequencyMatrix_
to_be_a_vacant_matrix() ;_

/* Initialize hit frequency of the 'name of classification item', i.e. HitFrequencyN.
 */
HitFrequencyN = 1;

Initialize_StringMatrix_to_be_a_vacant_matrix() ;_

Copy_the_first_line_of_HitCopiesOfNamesOfClassificationItemsMatrix_
and_paste_it_on_StringMatrix() ;_

/* FORMULA. 8 A (9/10) */

n = 1;

while(lines which has not been read remain in
      HitCopiesOfNamesOfClassificationItemsMatrix[])
{
  Read_the_n'th_line_in_HitCopiesOfNamesOfClassificationItemsMatrix(n) ;_

  if( the n'th line equals to StringMatrix[] )
  {
```

```
        HitFrequencyN = HitFrequencyN + 1;
        if( the n'th line is the last line of
             HitCopiesOfNamesOfClassificationItemsMatrix[] )
        {

          Write_HitFrequencyN_at_the_top_of_the_
          new_line_of_NameOfClassificationItemVersusHitFrequencyMatrix_
          and_then_paste_StringMatrix_after_the_HitFrequencyN_
          on_the_same_line() ;_
        }
        n = n+1;
      }
      else if( the n'th line is not equal to StringMatrix[] )
      {

        Write_HitFrequencyN_at_the_top_of_the_
        new_line_of_NameOfClassificationItemVersusHitFrequencyMatrix_
        and_then_paste_StringMatrix_after_the_HitFrequencyN_
        on_the_same_line() ;_

        HitFrequencyN = 1;

        Reinitialize_StringMatrix_to_be_a_vacant_matrix() ;_

/*    FORMULA. 8 A(10/10)    */

        Copy_the_n'th_line_in_HitCopiesOfNamesOfClassificationItemsMatrix_
        and_paste_it_on_StringMatrix(n) ;_

        if( the n'th line is the last line of
```

```
        HitCopiesOfNamesOfClassificationItemsMatrix[] )
      {
        Write_HitFrequencyN_at_the_top_of_the_
        new_line_of_NameOfClassificationItemVersusHitFrequencyMatrix_
        and_then_paste_StringMatrix_after_the_HitFrequencyN_
        on_the_same_line() ;_
      }

      n = n+1;
    }
  }
}
```

```
/* FORMULA. 8 B(1/5) */

/* Formula. 8 B shows the sub part (part describing the procedure for sorting) of
 * a quasi-C code schematically representing a recommended embodiment of
 * @[algorithm of making a list of 'names-of-classification-items' ranked in order of hit
 * frequency].
 */
#include "FORMULA. 9"

/******************* Sort *******************/

#define N 'number of the lines in HitCopiesOfNamesOfClassificationItemsMatrix[]'
/* Note!
```

09958322.100401

```
 * In each line of HitCopiesOfNamesOfClassificationItemsMatrix[],
 * one copy of a   'name_of_classification_item'   is recorded.
 */
#define M 'size of a stack'

int sp;   /* sp: stack pointer */
char w[N+1][]; /* Array for working */
int STACK[M+1][2]; /* STACK[sp][0]: Index of beginning line of the sp'th incompletely
                    * sorted part in
                    * HitCopiesOfNamesOfClassificationItemsMatrix[];
                    * STACK[sp][1]: Index of the end line of the sp'th incompletely
                    * sorted part in
                    * HitCopiesOfNamesOfClassificationItemsMatrix[].
                    */

Sort_alphabetically_HitCopiesOfNamesOfClassificationItemsMatrix()
{

  /* I use here quick sort. This embodiment is the best mode in a simple system
   * like this.
   * For more detail, see ◎"C-Arugorizumu Zen-Ka", for example.
   */

  int i,l;
  int b,e;

  /* The 'sp' is an index named 'stack pointer', which is used to identify
   * a incompletely sorted part
   */
  sp = 0; /* Initialize the value of 'sp' */
```

/* FORMULA. 8 B (2/5) */

```
/* At first, all the lines of HitCopiesOfNamesOfClassificationItemsMatrix[]
* i.e. from line number 1 to N,
* are regarded to be included in one incompletely sorted part.
*/
STACK[sp][0]=1; STACK[sp][1]=N;

/* While incompletely sorted parts remain,
 * i.e. parts which can be parted into
 * subparts, i.e.,
 * a_younger_indexed_subpart,
 * a_middle_indexed_subpart,
 * and_a_older_indexrd_subpart
 * remain,
 * part the incompletely sorted parts into subparts
 * one after another.
 */
while(sp>=0)
{

  b = STACK[sp][0];    /* The line number of the first line of
                         * a incompletely sorted part.
                         */
  e = STACK[sp][1];    /* The line number of the last line of
                         * the incompletely sorted part.
                         */
  --sp;
```

```
    part_
    an_incompletely_sorted_part_of_HitCopiesOfNamesOfClassificationItemsMatrix_
    into_
    a_younger_indexed_subpart,_
    a_middle_indexed_subpart,_
    and_a_older_indexrd_subpart(b,e) ;_
  }

/* FORMULA. 8 B (3/5) */

}

part_
an_incompletely_sorted_part_of_HitCopiesOfNamesOfClassificationItemsMatrix_
into_
a_younger_indexed_subpart,_
a_middle_indexed_subpart,_
and_a_older_indexrd_subpart(b,e)
{
  int i,j,k,m;
  char x[];

  /* Part an incompletely sorted part, (b,e). */
  i=b-1; j=e+1;
  m = (int)((b+e)/2) ;_

  Copy_line_m_of_HitCopiesOfNamesOfClassificationItemsMatrix_and_
  paste_it_on_x() ;_
  /* Note!
   * x[] is the standard string.
```

09958322 .100401

PCT-2000-01

```
 */

for(k=b; k<=e; ++k)
{
  if( String_compare('line k of
        HitCopiesOfNamesOfClassificationItemsMatrix[]',x[])<0 )
  {
    /* Make younger indexed subpart */
    ++i;
    Copy_line_k_of_HitCopiesOfNamesOfClassificationItemsMatrix_
    and_paste_it_on_line_i_of_w(i,k,w[i][]) ;_
  }
  if( String_compare('line k of
        HitCopiesOfNamesOfClassificationItemsMatrix[]',x[])>0 )

/*  FORMULA. 8 B(4/5)  */

  {
    /* Make older indexed subpart */
    --j;
    Copy_line_k_of_HitCopiesOfNamesOfClassificationItemsMatrix_
    and_paste_it_on_line_j_of_w(j,k,w[j][]) ;_
  }
}

for(k=b; k<=i; ++k)
{
  /* Copy younger indexed subpart on
   * HitCopiesOfNamesOfClassificationItemsMatrix[]
   */
```

```
    Copy_line_k_of_w_and_paste_it_on_
    line_k_of_HitCopiesOfNamesOfClassificationItemsMatrix(k,w[k][]) ;_
  }
  for(k=j; k<=e; ++k)
  {
    /* Copy older indexed subpart on
    * HitCopiesOfNamesOfClassificationItemsMatrix[]
    */

    Copy_line_k_of_w_and_paste_it_on_
    line_k_of_HitCopiesOfNamesOfClassificationItemsMatrix(k,w[k][]) ;_
  }
  for(k=(i+1) ;_ k<j; ++k)
  {
    /* Copy middle indexed subpart, (i.e. lines equal to x[])
     * on HitCopiesOfNamesOfClassificationItemsMatrix[]
     */

    Copy_string_x_and_paste_it_on_
    line_k_of_HitCopiesOfNamesOfClassificationItemsMatrix(k,x[]) ;_
  }

/* FORMULA. 8 B(5/5) */

  /* If
   * the younger indexed subpart
   * and/or
   * the older indexed subpart
   * is incompletely sorted,
```

```
 * then,
 * regard it as an incompletely sorted part of
 * HitCopiesOfNamesOfClassificationItemsMatrix[]
 * and register the line numbers of the first and the last line of it
 */

  if( b<I ){++sp; STACK[sp][0]=b; STACK[sp][1]=i;}
  if( j<e ){++sp; STACK[sp][0]=j; STACK[sp][1]=e;}
}
```

```
/*  FORMULA. 9 (1/7)  */

/* Formula. 9 shows quasi-C code of functions commonly used in Formula. 7 ,
 * Formula. 8 A, and, Formula. 8 B.
 */

Let_a_user_of_the_system_make_a_query()
{
  Let_a_user_of_the_system_choose_all_the_sets_of_data_of_knowledge_
  from_which_information_is_retrieved() ;_

  Let_the_user_of_the_system_input_natural_words_and/or_descriptors_
  and/or_names_of_classification_items_to_be_used_as_patterns_in_the_search() ;_

}
```

PCT-2000-01 09958322 .100401

```
Collect_all_the_keys_
from_the_sets_of_data_of_knowledge_that_are_chosen_by_the_user_of_the_system_
and_store_all_the_collected_keys_in_CollectedKeysMatrix()
{

  Initialize_CollectedKeysMatrix_to_be_a_vacant_matrix() ;_

  for(i=0;i<NumberOfChosenSetsOfDataOfKnowledge;i++)
  {
    Pick_up_the_first_key_out_of_the_i'th_chosen_set_of_data_of_knoledge_
    and_put_it_in_the_first_vacant_line_of_CollectedKeysMatrix(i) ;_

    while(keys which have not been picked up remain in i'th chosen set of data of
          knowledge)
    {
      Pick_up_the_next_key_out_of_the_i'th_chosen_set_of_data_of_knoledge_
      and_put_it_in_the_next_line_of_CollectedKeysMatrix(i) ;_
    }
  }
}

Retrieve_all_the_keys_that_match_patterns_
from_CollectedKeysMatrix_and_
put_one_retrieved_key_in_one_line_of_HitKeysMatrix_
on_top_of_another_retreived_key_in_another_line_of_HitKeysMatrix() ;_
{

/*  FORMULA. 9 (2/7)  */

  /* Note!
```

```
 * In this example of embodiment, for the sake of simplicity, I restrict myself in
 * the cases in which only one pattern is inputted and/or two patterns are inputted
 * for the sake of simplicity. However, this is the best mode in a simple system
 * like the present one.
 */

int index_of_a_line's_head;

Initialize_HitKeysMatrix_to_be_a_vacant_matrix() ;_

/* Initialize the value of index_of_a_line's_head to be 0; 0 is the index of the
 * first character in the first line of CollectedKeysMatrix[].
 */
index_of_a_line's_head = 0;

if( only one 'pattern' is inputted by the user of the system )
{

  /* Put hit keys on HitKeysMatrix[]. */
  Read_CollectedKeysMatrix_line_by_line_from_the_first_line_to_the_last_line_
  and_
  if_a_key_in_a_line_contains_a_pattern_
  then_put_the_hit_key_one_in_one_line_of_HitKeysMatrix_on_top_of_another_
  in_another_line_of_HitKeysMatrix('pattern', &index_of_a_line's_head) ;_

}
else if( 'two patterns' connected by 'and' is inputted by the user of the system )
{

  /* Put hit keys on HitKeysMatrix[]. */
```

```
Read_CollectedKeysMatrix_line_by_line_from_the_first_line_to_the_last_line_
and_
if_a_key_in_a_line_contains_a_pattern_
then_put_the_hit_key_one_in_one_line_of_HitKeysMatrix_on_top_of_another_
in_another_line_of_HitKeysMatrix('first_pattern', &index_of_a_line's_head) ;_

/* FORMULA. 9 (3/7) */

Initialize_CollectedKeysMatrix_to_be_a_vacant_matrix() ;_

Copy_HitKeysMatrix_and_then_
reinitialize_CollectedKeysMatrix_by_pasting_it_on_CollectedKeysMatrix() ;_

Initialize_HitKeysMatrix_to_be_a_vacant_matrix() ;_

/* Reinitialize the value of index_of_a_line's_head to be 0; 0 is the index of the
 * first character in the first line of CollectedKeysMatrix[].
 */
index_of_a_line's_head = 0;

Read_CollectedKeysMatrix_line_by_line_from_the_first_line_to_the_last_line_
and_
if_a_key_in_a_line_contains_a_pattern_
then_put_the_hit_key_one_in_one_line_of_HitKeysMatrix_on_top_of_another_
in_another_line_of_HitKeysMatrix('second_pattern',&index_of_a_line's_head) ;_

}
else if( 'two patterns' connected by 'or' is inputted by the user of the system )
{
```

```
    /* Put hit keys on HitKeysMatrix[]. */
    Read_CollectedKeysMatrix_line_by_line_from_the_first_line_to_the_last_line_
    and_
    if_a_key_in_a_line_contains_a_pattern_
    then_put_the_hit_key_one_in_one_line_of_HitKeysMatrix_on_top_of_another_
    in_another_line_of_HitKeysMatrix('first_pattern',&index_of_a_line's_head) ;_

    /* Add additional hit keys on HitKeysMatrix[]. */
    Read_CollectedKeysMatrix_line_by_line_from_the_first_line_to_the_last_line_
    and_
    if_a_key_in_a_line_contains_a_pattern_
    then_put_the_hit_key_one_in_one_line_of_HitKeysMatrix_on_top_of_another_
    in_another_line_of_HitKeysMatrix('second_pattern',&index_of_a_line's_head) ;_

  }
}

/*  FORMULA. 9 (4/7)  */

#define L 112 /* Number of the characters in a character code table, e.g. ANSI(ASCII)
*/

Read_CollectedKeysMatrix_line_by_line_from_the_first_line_to_the_last_line_
and_
if_a_key_in_a_line_contains_a_pattern_
then_put_the_hit_key_one_in_one_line_of_HitKeysMatrix_on_top_of_another_
in_another_line_of_HitKeysMatrix('pattern', *index_of_a_line's_head)
{

  /* HitKeysMatrix[] must not be initialized in this subroutine
```

```
 */
/* I use here Boyer-Moor method for string pattern matching in this embodiment.
 * For more detail, see ◎"C-Arugorizumu Zen-Ka", for example.
 */

char T[A_Big_Number], P[A_Big_Number];
int D[L];
int I, p, flag, M;

/* Copy 'pattern' and paste it on P[], and at the same time,
 * measure the length of the 'pattern'.
 */
M =
Copy_pattern_and_paste_it_on_P_and_return_the_length_of_pattern('pattern') ;_

/* Prepare D[] */
for(i=0; i<L; ++i) D[i]=M;      /* M is the length of 'pattern'. */
for(i=0; i<M-1; ++i) D[P[i]]=M-i-1;

/* Initialize the value of p */
p = *index_of_a_line's_head;

while(lines which have not been read remain in CollectedKeysMatrix[])
{

  /* Check whether a line of CollectedKeysMatrix[] contains 'pattern' or not */

/*  FORMULA. 9 (5/7)  */

  flag  =  If_a_line_whose_first_character' s_index_equals_to_p__
```

PCT-2000-01 09958322 .100401

```
            contains_pattern__
            then__return_1__and_else__return_0(p,M,T[],P[],D[]) ;_

      if( flag==1 )
      {

        Copy_the_present_line_of_CollectedKeysMatrix_and_
        past_it_on_a_new_line_of_HitKeysMatrix() ;_

        /* Note! each line of CollectedKeysMatrix[] contains only one key */

      }
      p = index_of_the_first_character_in_the_next_line_of_CollectedKeysMatrix[];
    }
}

If_a_line_whose_first_character' s_index_equals_to_p__
            contains_pattern__
            then__return_1__and_else__return_0(p,M,T[],P[],D[])
{
    int flag;

    while(p+M-1 <= index of the last character in the present line of
CollectedKeysMatrix[])
    {
      if( T[p+M-1]!=P[M-1] )
      {
        /* The last character of 'pattern' dose not match T[p+M-1].
         * If no character in 'pattern' matches T[p+M-1], then shift
         * the value of p by M (=length of 'pattern').
```

```
     * Else if a character in 'pattern' matches T[p+M-1], then shift
     * the value of p according to where in 'pattern' the character
     * exists.
     */

/*  FORMULA. 9 (6/7)   */

    p+=D[T[p+M-1]];
  }
  else
  {
    /* At least the last character of 'pattern' matches.
     * (The present algorithm can be object-oriented easily
     *   to the cases when the last n character of pattern matches.
     *   However, this is the best mode in the case of a simple system
     *   like the present one.)
     */
    flag=1;
    i=M-1;
    while(flag==1 && 0<i)
    {
      --i;
      if( T[p+i]!=P[i] ) flag=0; /* A character which dose not match is found */
    }
    ++p;
  }
 }
 return flag;
}
```

09958322 .100401

PCT-2000-01

```
int String_compare(char *s1, char *s2)
{

  while(*s1 == *s2)
  {
    s1++;
    s2++;
    if( *s1 is end of string ) return 0; /* two strings coincides */
  }


/* FORMULA. 9 (7/7) */

  if( *s1 is end of string )
  {
    return -1;
  }
  else if( *s2 is end of string )
  {
    return 1;
  }
  else
  {
    return (unsigned char)*s1 – (unsigned char)*s2;
  }
}
```

／＊ FORMULA. １０(1/4) ＊／

```
/* Formula. １０ shows a quasi-C code schematically representing a recommended embodiment
 * of the procedure to search and list the 'descriptors' that are broader (by one rank)
 * than a 'descriptor'.
 */

/* The maker of a database must have inputted
 * one sentence in "sentence pattern of 'ideal thesaurus'"
 * in every line of the Thesaurus[].
 */
char Thesaurus[A_Very_Big_Number];
char HitSentencesMatrix[A_Very_Big_Number];
char HitCopiesOfBroaderDescriptorsMatrix[A_Very_Big_Number];

Search_and_list_the_'descriptors'_that_are_one_rank_broader_than
a_'descriptor'()
{

  Input'descriptor'() ;_

  Read_Thesaurus_line_by_line_from_the_first_line_to_the_last_line_and_
  if_a_sentence_in_"sentence pattern of 'ideal thesaurus'"
  _in_a_line_contains_'descriptor'_as_narrower_descriptor_
  then_
  put_the_hit_sentence_one_in_one_line_of_HitSentencesMatrix_on_top_of_another_
  in_another_line_of_HitSentencesMatrix('descriptor') ;_
```

PCT-2000-01 09958322 .100401

```
  Pick_up_all_the_copies_of_the_broader_'descriptors'_in_HitSentencesMatrix_and_
  put_one_copy_in_one_line_of_HitCopiesOfBroaderDescriptorsMatrix_
  on_top_of_
  another_copy_in_another_line_of_HitCopiesOfBroaderDescriptorsMatrix() ;_

  Display_HitCopiesOfBroaderDescriptorsMatrix() ;_
}

Read_Thesaurus_line_by_line_from_the_first_line_to_the_last_line_and_
if_a_sentence_in_"sentence pattern of 'ideal thesaurus'"
_in_a_line_contains_'descriptor'_as_narrower_descriptor_
then_
put_the_hit_sentence_one_in_one_line_of_HitSentencesMatrix_on_top_of_another_
in_another_line_of_HitSentencesMatrix('descriptor')
{

／*  FORMULA. 1 0 (2/4)  *／

  /* I use here Boyer-Moor method for string pattern matching in this embodiment.
   * For more detail, see ◎"C-Arugorizumu Zen-Ka", for example.
   */

  char T[A_Big_Number], P[A_Big_Number];
  int D[L];
  int I, p, flag, M, i;

  /* Note!
   * Remember that "sentence pattern of 'ideal thesaurus'" is given by
   * _NT_ ***** _is_a_kind_of__BT_ ***.
```

```
     * Therefore,
     * A narrower 'descriptor' in a sentence in "sentence pattern of 'ideal thesaurus'"
     * is described between '_NT_ ' and ' _is_a_kind_of__BT_'.
     */

    /* Make 'pattern' in P[] */
    /* The pattern is '_NT_ ' plus 'descriptor' in P[], and at the same time,
     * measure the length of the 'pattern'.
     */

    Copy_'_NT_ '_and_paste_it_on_P() ;_

    M = Copy_'descriptor'_and_add_it_after_'_NT_ '_in_P_
    and_return_the_length_of_P('descriptor') ;_

    /* Prepare D[] */
    for(i=0; i<L; ++i) D[i]=M;      /* M is the length of 'pattern'. */
    for(i=0; i<M-1; ++i) D[P[i]]=M-i-1;

    /* Initialize the value of p */
    p = 0; /* Index of the first line's head of HitSentencesMatrix */

  /* FORMULA.10(3/4) */

    while(lines which have not been read remain in Thesaurus)
    {

      /* Check whether a line of Thesaurus[] contains 'pattern' or not */
      flag = If_a_line_whose_first_character' s_index_equals_to_p__
                contains_pattern__
```

```
            then__return_1__and_else__return_0(p,M,T[],P[],D[]) ;_

        if( flag==1 )
        {

          Copy_the_present_line_of_Thesaurus_and_
          past_it_on_a_new_line_of_HitSentencesMatrix() ;_

          /* Note! each line of Thesaurus[] contains only one sentence
           * in "sentence pattern of 'ideal thesaurus'"
           */

        }
        p = index_of_the_first_character_in_the_next_line_of_HitSentencesMatrix;
    }
  }

  Pick_up_all_the_copies_of_the_broader_'descriptors'_in_HitSentencesMatrix_and_
  put_one_copy_in_one_line_of_HitCopiesOfBroaderDescriptorsMatrix_
  on_top_of_
  another_copy_in_another_line_of_HitCopiesOfBroaderDescriptorsMatrix()
  {

  /*  FORMULA.10(4/4)  */

    /* Note!
     * Remember that "sentence pattern of 'ideal thesaurus'" is given by
     * _NT_ ***** _is_a_kind_of__BT_ ***.
     * Therefore,
     * A broader 'descriptor' in a sentence in "sentence pattern of 'ideal thesaurus'"
```

09958322.100401

```
 * is described after '_is_a_kind_of__BT_ '.
 */

char BroaderDescriptorsMatrix[];

while(characters which have not been read remain in HitSentencesMatrix)
{

  Initialize_BroaderDescriptorsMatrix_to_be_a_vacant_matrix() ;_

  /* Find '_is_a_kind_of__BT_ '. */
  Read_one_character_in_HitSentencesMatrix_after_another_and_
  if_'_is_a_kind_of__BT_'_is_detected_
  then_return_the_control_of_this_function_() ;_;

  /* Record the string after '_is_a_kind_of__BT_ ' */
  Read_and_copy_the_characters_below_
  '_is_a_kind_of__BT_ '_in_HitSentencesMatrix_
  one_after_another_until_'End of Line'_is_detected_
  and_paste_it_on_BroaderDescriptorsMatrix_and_
  return_the_control_of_this_function() ;_

  Copy_BroaderDescriptorsMatrix_and_
  paste_it_on_a_new_line_of_HitCopiesOfBroaderDescriptorsMatrix() ;_
}
}
```

PCT-2000-01 09958322.100401

```
／＊  FORMULA. 1 1 (1/4)  ＊／

/* Formula. 1 1  shows a quasi-C code schematically representing a recommended
 * embodiment of the procedure to search and list the 'names-of-classification-items'
 * that are higher class (by one rank) of a 'names-of-classification-items'.
 */

/* The maker of a database must have inputted
 * one sentence in "sentence pattern of classification"
 * in every line of the ClassificationTable[].
 */
char ClassificationTable[A_Very_Big_Number];
char HitSentencesMatrix[A_Very_Big_Number];
char
HitCopiesOfHigherClassNamesOfClassificationItemsMatrix[A_Very_Big_Number];

Search_and_list_the_'names-of-classification-items'_that_are_one_rank_higher_class_
of_a_'names-of-classification-items'()
{
  Input'name-of-classification-item'() ;_

  Read_ClassificationTable_line_by_line_from_the_first_line_to_the_last_line_and_
  if_a_sentence_in_"sentence pattern of classification"
  _in_a_line_contains_a_'name-of-classification-item'_as_lower_class_one_
  then_
  put_the_hit_sentence_one_in_one_line_of_HitSentencesMatrix_on_top_of_another_
  in_another_line_of_HitSentencesMatrix('name-of-classification-item') ;_

  Pick_up_all_the_copies_of_the_higher_class_'names-of-classification-items'_in_
```

09958322 .100401

```
    HitSentencesMatrix_and_
    put_one_copy_
    in_one_line_of_HitCopiesOfHigherClassNamesOfClassificationItemsMatrix_
    on_top_of_another_copy_
    in_another_line_of_HitCopiesOfHigherClassNamesOfClassificationItemsMatrix() ;_

    Display_HitCopiesOfHigherClassNamesOfClassificationItemsMatrix() ;_
  }

Read_ClassificationTable_line_by_line_from_the_first_line_to_the_last_line_and_
if_a_sentence_in_"sentence pattern of classification"
_in_a_line_contains_a_'name-of-classification-item'_as_lower_class_one_
then_
put_the_hit_sentence_one_in_one_line_of_HitSentencesMatrix_on_top_of_another_
in_another_line_of_HitSentencesMatrix('name-of-classification-item')
{

/*  FORMULA. 1 1 (2/4)  */

    /* I use here Boyer-Moor method for string pattern matching in this embodiment.
     * For more detail, see ◎"C-Arugorizumu Zen-Ka", for example.
     */

    char T[A_Big_Number], P[A_Big_Number];
    int D[L];
    int I, p, flag, M, i;

    /* Note!
     * Remember that "sentence pattern of classification" is given by
     * _ALGORITHM_ **** _is_higher_class_of_ALGORITHM_ ****.
```

```
 * Therefore,
 * A lower class 'names-of-classification-items' in a sentence in "sentence pattern
 * of classification" is described after '_is_higher_class_of_ALGORITHM_'.
 */

/* Make 'pattern' in P[] */
/* The pattern is '_is_higher_class_of_ALGORITHM_ ' plus
 * 'name-of-classification-item' in P[], and at the same time,
 * measure the length of the 'pattern'.
 */

Copy_'_is_higher_class_of_ALGORITHM_ '_and_paste_it_on_P() ;_

M =
 Copy_'name-of-classification-item'_and_add_it_after_
 '_is_higher_class_of_ALGORITHM_ '_in_P_
 and_return_the_length_of_P('name-of-classification-item') ;_

/* Prepare D[] */
for(i=0; i<L; ++i) D[i]=M;      /* M is the length of 'pattern'. */
for(i=0; i<M-1; ++i) D[P[i]]=M-i-1;

/* Initialize the value of p */
p = 0; /* Index of the first line's head of HitSentencesMatrix */

/*  FORMULA. 1 1 (3/4)  */

while(lines which have not been read remain in ClassificationTable)
{
```

```
/* Check whether a line of ClassificationTable[] contains 'pattern' or not */
flag  =  If_a_line_whose_first_character' s_index_equals_to_p__
         contains_pattern__
         then__return_1__and_else__return_0(p,M,T[],P[],D[]) ;_

if( flag==1 )
{

  Copy_the_present_line_of_ClassificationTable_and_
  past_it_on_a_new_line_of_HitSentencesMatrix() ;_

  /* Note! each line of ClassificationTable[] contains only one sentence
   * in "sentence pattern of classification"
   */

}
p = index_of_the_first_character_in_the_next_line_of_HitSentencesMatrix;
}
}

Pick_up_all_the_copies_of_the_higher_class_'names-of-classification-items'_in_
HitSentencesMatrix_and_
put_one_copy_
in_one_line_of_HitCopiesOfHigherClassNamesOfClassificationItemsMatrix_
on_top_of_another_copy_
in_another_line_of_HitCopiesOfHigherClassNamesOfClassificationItemsMatrix()
{

/*  FORMULA. 1 1 (4/4)  */
```

09958322 .100401

```
/* Note!
 * Remember that "sentence pattern of classification" is given by
 * _ALGORITHM_ **** _is_higher_class_of_ALGORITHM_ ****.
 * Therefore,
 * A higher class 'name-of-classification-item' in a sentence in "sentence pattern of
 * classification" is described between '_ALGORITHM_ '
 * and ' _is_higher_class_of_ALGORITHM_'.
 */

char HigherClassDescriptorsMatrix[];

while(characters which have not been read remain in HitSentencesMatrix)
{

  Initialize_HigherClassDescriptorsMatrix_to_be_a_vacant_matrix() ;_

  /* Find '_ALGORITHM_ '. */
  Read_one_character_in_HitSentencesMatrix_after_another_and_
  if_'_ALGORITHM_'_is_detected_
  then_return_the_control_of_this_function_() ;_;

  /* Record the string after '_ALGORITHM_ ' */
  Read_and_copy_
  the_characters_below_'_ALGORITHM_ '_in_HitSentencesMatrix_
  one_after_another_until_'_is_higher_class_of_ALGORITHM_'_is_detected_
  and_paste_it_on_HigherClassDescriptorsMatrix_and_
  return_the_control_of_this_function() ;_

  Copy_HigherClassDescriptorsMatrix_and_paste_it_
  on_
```

09958322 .100401

```
      a_new_line_of_HitCopiesOfHigherClassNamesOfClassificationItemsMatrix() ;_
    }
  }
```

```
/*   FORMULA. 1 2 (1/3)   */

/* Formula. 1 2  shows a quasi-C code schematically representing a recommended
 * embodiment of the procedure for judging whether PX is higher class
 * 'name-of-classification-item' of PY or not.
 */

Return_1__if_PX_is_strictly_higher_class_'name-of-classification-item'_
of_PY_
and_
Return_2_if_PX_is_probably_higher_class_'name-of-classification-item'_
of_PY
and_
Return_4_if_PX_is_probably_not_higher_class_'name-of-classification-item'
of_PY()
{
  /* Retrieve a sentence in
   * "sentence pattern of implementation of names of algorithms-of-processes"
   * which gives lexical meaning of PY.
   */
  char StringPY[];
  char StringNewLineOfPX[];
```

```
char StringNewLineOfPY[];

Initialize_StringPX,_StringPY,_StringNewLineOfPX,_
 and_StringNewLineOfPY_as_a_vcant_Matrix() ;_

Search_a_sentence_in_dictionary_which_contains_'_ALGORITHM_ PY _{'_and_
copy_the_part_in_the_sentence_after_'_ALGORITHM_ PY _{'_
and_paste_the_part_on_StringPY() ;_

if( StringPY[] contains PX )
{
  /* PX is strictly the higher class 'name-of-classification-item' of PY */
  return 1;
}
else
{
  Search_a_sentence_in_dictionary_which_contains_'_ALGORITHM_ PX _{'_and_
  copy_the_part_in_the_sentence_after_'_ALGORITHM_ PX _{'_
  and_paste_the_part_on_StringPX() ;_

/*   FORMULA. 1 2 (2/3)   */

  Copy_the_first_line_of_StringPX_and_paste_it_on_StringNewLineOfPX() ;_
  Copy_the_first_line_of_StringPY_and_paste_it_on_StringNewLineOfPY() ;_

  while()
  {
    if( StringNewLineOfPX[] == StringNewLineOfPY[] )
    {
      if( Next line of StringPX exists)
```

```
    {
      Copy_the_next_line_of_StringPX_
      and_paste_it_on_StringNewLineOfPX() ;_
    }
    else
    {
       /* PX is probably the higher class 'name-of-classification-item' of PY */
       return 2 ;_
    }

    if( Next line of StringPY exists)
    {
      Copy_the_next_line_of_StringPY_
      and_paste_it_on_StringNewLineOfPY() ;_
    }
    else
    {
       /* PX is probably not the higher class 'name-of-classification-item' of PY */
       return 4 ;_
    }
  }
  else if( StringNewLineOfPX[] != StringNewLineOfPY[] )
  {
    if( Next line of StringPY exists)
    {
      Copy_the_next_line_of_StringPY_
      and_paste_it_on_StringNewLineOfPY() ;_
    }
```

/* FORMULA. 1 2 (3/3) */

```
            else
            {
               /* PX is probably not the higher class 'name-of-classification-item' of PY */
               return 4 ;_
            }
         }
      }
   }
}
```

/* FORMULA. 1 3 (1/4) */

```
/* Formula. 1 3  shows a quasi-C code schematically representing a recommended
 * embodiment of the procedure to search and list the 'descriptors' that are
 * narrower (by one rank) than a 'descriptor'.
 */

/* The maker of a database must have inputted
 * one sentence in "sentence pattern of 'ideal thesaurus'"
 * in every line of the Thesaurus[].
 */
char Thesaurus[A_Very_Big_Number];
char HitSentencesMatrix[A_Very_Big_Number];
char HitCopiesOfNarrowerDescriptorsMatrix[A_Very_Big_Number];
```

09958322 .100401

```
Search_and_list_the_'descriptors'_that_are_one_rank_narrower_than
a_'descriptor'()
{
  Input'descriptor'() ;_

  Read_Thesaurus_line_by_line_from_the_first_line_to_the_last_line_and_
  if_a_sentence_in_"sentence pattern of 'ideal thesaurus'"
  _in_a_line_contains_'descriptor'_as_a_broader_descriptor_
  then_
  put_the_hit_sentence_one_in_one_line_of_HitSentencesMatrix_on_top_of_another_
  in_another_line_of_HitSentencesMatrix('descriptor') ;_

  Pick_up_all_the_copies_of_the_narrower_'descriptors'_in_HitSentencesMatrix_and_
  put_one_copy_in_one_line_of_HitCopiesOfNarrowerDescriptorsMatrix_
  on_top_of_
  another_copy_in_another_line_of_HitCopiesOfNarrowerDescriptorsMatrix() ;_

  Display_HitCopiesOfNarrowerDescriptorsMatrix() ;_

}

Read_Thesaurus_line_by_line_from_the_first_line_to_the_last_line_and_
if_a_sentence_in_"sentence pattern of 'ideal thesaurus'"
_in_a_line_contains_'descriptor'_as_a_broader_descriptor_
then_
put_the_hit_sentence_one_in_one_line_of_HitSentencesMatrix_on_top_of_another_
in_another_line_of_HitSentencesMatrix('descriptor')
{

/* FORMULA. 1 3 (2/4) */
```

```
/* I use here Boyer-Moor method for string pattern matching in this embodiment.
 * For more detail, see ◎"C-Arugorizumu Zen-Ka", for example.
 */

char T[A_Big_Number], P[A_Big_Number];
int D[L];
int I, p, flag, M, i;

/* Note!
 * Remember that "sentence pattern of 'ideal thesaurus'" is given by
 * _NT_ ***** _is_a_kind_of__BT_ ***.
 * Therefore,
 * A broader 'descriptor' in a sentence in "sentence pattern of 'ideal thesaurus'"
 * is described between after '_is_a_kind_of__BT_ '.
 */

/* Make 'pattern' in P[] */
/* The pattern is '_is_a_kind_of__BT_ ' plus 'descriptor' in P[], and at the same time,
 * measure the length of the 'pattern'.
 */

Copy_'_is_a_kind_of__BT_'_and_paste_it_on_P() ;_

M = Copy_'descriptor'_and_add_it_after_'_is_a_kind_of__BT_ '_in_P_
and_return_the_length_of_P('descriptor') ;_

/* Prepare D[] */
for(i=0; i<L; ++i) D[i]=M;      /* M is the length of 'pattern'. */
for(i=0; i<M-1; ++i) D[P[i]]=M-i-1;
```

09958322 .100401

```
/* Initialize the value of p */
p = 0; /* Index of the first line's head of HitSentencesMatrix */

／*   FORMULA. 1 3 (3/4)   *／

while(lines which have not been read remain in Thesaurus)
{

  /* Check whether a line of Thesaurus[] contains 'pattern' or not */
  flag  =  If_a_line_whose_first_character' s_index_equals_to_p__
           contains_pattern__
           then__return_1__and_else__return_0(p,M,T[],P[],D[]) ;_

  if( flag==1 )
  {

    Copy_the_present_line_of_Thesaurus_and_
    past_it_on_a_new_line_of_HitSentencesMatrix() ;_

    /* Note! each line of Thesaurus[] contains only one sentence
     * in "sentence pattern of 'ideal thesaurus'"
     */

  }
  p = index_of_the_first_character_in_the_next_line_of_HitSentencesMatrix;
 }
}

Pick_up_all_the_copies_of_the_narrower_'descriptors'_in_HitSentencesMatrix_and_
```

09958322 .100401

```
put_one_copy_in_one_line_of_HitCopiesOfNarrowerDescriptorsMatrix_
on_top_of_
another_copy_in_another_line_of_HitCopiesOfNarrowerDescriptorsMatrix()
{

/*  FORMULA. 1 3 (4/4)  */

  /* Note!
   * Remember that "sentence pattern of 'ideal thesaurus'" is given by
   * _NT_ ***** _is_a_kind_of__BT_ ***.
   * Therefore,
   * A narrower 'descriptor' in a sentence in "sentence pattern of 'ideal thesaurus'"
   * is described between '_NT_ ' and ' _is_a_kind_of__BT_'
   */

  char NarrowerDescriptorsMatrix[];

  while(characters which have not been read remain in HitSentencesMatrix)
  {

    Initialize_NarrowerDescriptorsMatrix_to_be_a_vacant_matrix() ;_

    /* Find '_NT_ '. */
    Read_one_character_in_HitSentencesMatrix_after_another_and_
    if_'_NT_'_is_detected_
    then_return_the_control_of_this_function_() ;_

    /* Record the string after '_NT_ ' */
    Read_and_copy_the_characters_below_'_NT_'_in_HitSentencesMatrix_
    one_after_another_until_'_is_a_kind_of__BT_'_is_detected_
```

```
        and_paste_it_on_NarrowerDescriptorsMatrix_and_
        return_the_control_of_this_function() ;_

        Copy_NarrowerDescriptorsMatrix_and_
        paste_it_on_a_new_line_of_HitCopiesOfNarrowerDescriptorsMatrix() ;_
      }
    }
```

```
/*  FORMULA. 1 4 (1/5)   */

/* Formula. 1 4  shows a quasi-C code schematically representing a recommended
 * embodiment of the procedure to search and list the 'names-of-classification-items'
 * that are lower class (by one rank) of a 'name-of-classification-item'.
 */

/* The maker of a database must have inputted
 * one sentence in "sentence pattern of classification"
 * in every line of the ClassificationTable[].
 */
char ClassificationTable[A_Very_Big_Number];
char HitSentencesMatrix[A_Very_Big_Number];
char
HitCopiesOfLowerClassNamesOfClassificationItemsMatrix[A_Very_Big_Number];

Search_and_list_the_'names-of-classification-items'_that_are_one_rank_lower_class_
of_a_'name-of-classification-item'()
```

```
{
  Input'name-of-classification-item'() ;_

  Read_ClassificationTable_line_by_line_from_the_first_line_to_the_last_line_and_
  if_a_sentence_in_"sentence pattern of classification"
  _in_a_line_contains_a_'name-of-classification-item'_as_higher_class_one_
  then_
  put_the_hit_sentence_one_in_one_line_of_HitSentencesMatrix_on_top_of_another_
  in_another_line_of_HitSentencesMatrix('name-of-classification-item') ;_

  Pick_up_all_the_copies_of_the_lower_class_'names-of-classification-items'_in_
  HitSentencesMatrix_and_
  put_one_copy_
  in_one_line_of_HitCopiesOfLowerClassNamesOfClassificationItemsMatrix_
  on_top_of_another_copy_
  in_another_line_of_HitCopiesOfLowerClassNamesOfClassificationItemsMatrix() ;_

  Display_HitCopiesOfLowerClassNamesOfClassificationItemsMatrix() ;_

}

/*  FORMULA. 1 4 (2/5)  */

Read_ClassificationTable_line_by_line_from_the_first_line_to_the_last_line_and_
if_a_sentence_in_"sentence pattern of classification"
_in_a_line_contains_a_'name-of-classification-item'_as_higher_class_one_
then_
put_the_hit_sentence_one_in_one_line_of_HitSentencesMatrix_on_top_of_another_
in_another_line_of_HitSentencesMatrix('name-of-classification-item')
{
```

```
/* I use here Boyer-Moor method for string pattern matching in this embodiment.
 * For more detail, see ◎"C-Arugorizumu Zen-Ka", for example.
 */

char T[A_Big_Number], P[A_Big_Number];
int D[L];
int I, p, flag, M, i;

/* Note!
 * Remember that "sentence pattern of classification" is given by
 * _ALGORITHM_ **** _is_higher_class_of_ALGORITHM_ ****.
 * Therefore,
 * A higher class 'names-of-classification-items' in a sentence in
 * "sentence pattern of classification" is described
 * between '_ALGORITHM_ ' and '_is_higher_class_of_ALGORITHM_'.
 */

/* Make 'pattern' in P[] */
/* The pattern is '_ALGORITHM_ ' plus 'name-of-classification-item'
 * in P[], and at the same time, measure the length of the 'pattern'.
 */

Copy_'_ALGORITHM_'_and_paste_it_on_P() ;_

M =
 Copy_'name-of-classification-item'_and_add_it_after_
 '_ALGORITHM_ '_in_P_
 and_return_the_length_of_P('name-of-classification-item') ;_
```

09953322 .100401

PCT-2000-01

／＊ FORMULA. 1 4 (3/5) ＊／

```
/* Prepare D[] */
for(i=0; i<L; ++i) D[i]=M;      /* M is the length of 'pattern'. */
for(i=0; i<M-1; ++i) D[P[i]]=M-i-1;

/* Initialize the value of p */
p = 0; /* Index of the first line's head of HitSentencesMatrix */

while(lines which have not been read remain in ClassificationTable)
{

  /* Check whether a line of ClassificationTable[] contains 'pattern' or not */
  flag  =  If_a_line_whose_first_character' s_index_equals_to_p__
              contains_pattern__
              then__return_1__and_else__return_0(p,M,T[],P[],D[]) ;_

  if( flag==1 )
  {

    Copy_the_present_line_of_ClassificationTable_and_
    past_it_on_a_new_line_of_HitSentencesMatrix() ;_

    /* Note! each line of ClassificationTable[] contains only one sentence
     * in "sentence pattern of classification"
     */

  }
  p = index_of_the_first_character_in_the_next_line_of_HitSentencesMatrix;
}
```

09958322 .100401

```
}

/* FORMULA. 1 4 (4/5) */

Pick_up_all_the_copies_of_the_lower_class_'names-of-classification-items'_in_
HitSentencesMatrix_and_
put_one_copy_
in_one_line_of_HitCopiesOfLowerClassNamesOfClassificationItemsMatrix_
on_top_of_another_copy_
in_another_line_of_HitCopiesOfLowerClassNamesOfClassificationItemsMatrix()
{

  /* Note!
   * Remember that "sentence pattern of classification" is given by
   * _ALGORITHM_ **** _is_higher_class_of_ALGORITHM_ ****.
   * Therefore,
   * A lower class 'name-of-classification-item' in a sentence in "sentence pattern of
   * classification" is after '_is_higher_class_of_ALGORITHM_ '.
   */

  char LowerClassDescriptorsMatrix[];

  while(characters which have not been read remain in HitSentencesMatrix)
  {

    Initialize_LowerClassDescriptorsMatrix_to_be_a_vacant_matrix() ;_

    /* Find '_is_higher_class_of_ALGORITHM_ '. */
    Read_one_character_in_HitSentencesMatrix_after_another_and_
    if_'_is_higher_class_of_ALGORITHM_'_is_detected_
```

```
        then_return_the_control_of_this_function_() ;_

        /* Record the string below '_is_higher_class_of_ALGORITHM_ ' */
        Read_and_copy_the_characters_
        below_'_is_higher_class_of_ALGORITHM_'_in_HitSentencesMatrix_
        one_after_another_until_'End of Line'_is_detected_
        and_paste_it_on_LowerClassDescriptorsMatrix_and_
        return_the_control_of_this_function() ;_

/*  FORMULA. 1 4 (5/5)  */

        Copy_LowerClassDescriptorsMatrix_and_paste_it_
        on_a_new_line_of_HitCopiesOfLowerClassNamesOfClassificationItemsMatrix() ;_
    }
}


/*  FORMULA. 1 5 A (1/10)  */

/* Formula. 1 5 A  shows the main part of a quasi-C code schematically representing a
 * recommended embodiment of the procedure for judging whether a proposition is a
 * "conclusion of a 'object-oriented categorical syllogism described by @[algorithm of
 * sentence based object-oriented categorical syllogism]'" or not when a major premise
 * is given.
 */

#include "FORMULA. 1 2"
```

09958322 .100401

PCT-2000-01

```
#include "FORMULA. 1 0"
#include "FORMULA. 1 5 B"

/* Main routine (from here) */
  char MajorPremiseMatrix[] ;_
  char CandidateForConclusionMatrix[] ;_

  /* Input 'Major Premise' */
  Let_the_User_of_the_System_Input_the_Proposition_used_as_the_major_premise_
  and_Copy_and_Paste_it_in_MajorPremiseMatrix() ;_

  /* Input 'Candidate For Conclusion' */
  Let_the_User_of_the_System_Input_the_Proposition_
  which_he_Regards_as_Possibly_
  the_Conclusion_
  of_an_Object-oriented_categorical_syllogism_for_the_Major_premise
  and_Copy_and_Paste_the_Proposition_in_CandidateForConclusionMatrix() ;_

Judge_whether_a_proposition_is_a_
"conclusion_of_an_'object-oriented_categorical_syllogism_described_by_
@[algorithm of sentence based object-oriented categorical syllogism]'_
for_a_major_premise"_
or_not(MajorPremiseMatrix[], CandidateForConclusionMatrix[])
{
  int i_flag_Conclusion_of_an_'object-oriented_categorical_syllogism'_or_Not ;_

  /* If the 'Major Premise' is written in natural language, then.
   * it is recommended that the 'Major Premise' should be translated into a sentence
   * in "sentence pattern of one of five basic sentence patterns of
   * English grammar",
```

09958322.100401

PCT-2000-01

```
 * because if translated then it is easy to recognize 'S', 'V', 'C', 'O', 'D.O',
 * and 'I.O' in the sentence. Such a recognition is carried out frequently in
 * subroutines of the present quasi-C code. It is economical to make such a
 * recognition here, at first place. A knowledge engineer can do such a translation.
 */

/* FORMULA. 1 5 A(2/10) */

if('Major Premise' in MajorPremiseMatrix[] is written in a natural language)
{
  Translate_the_'Major Premise'_in_MajorPremiseMatrix_into_a_sentence_
  in_"sentence pattern of one of five basic sentence patterns of
  English grammar"() ;_
}
/* Specify the Information source of 'Minor Premise' */
Let_the_User_of_the_System_Specify_the_Thesaurus_and_Classification_table_
that_are_used_by_the_System_
as_the_Information_source_to_form_Minor_premises() ;_

/* If 'Candidate For Conclusion' is written in natural language, then,
 * it is recommended that 'Candidate For Conclusion' should be translated into a
 * sentence in "sentence pattern of one of five basic sentence patterns of
 * English grammar",
 * because if translated then it is easy to recognize 'S', 'V', 'C', 'O', 'D.O',
 * and 'I.O' in the sentence. Such a recognition is carried out frequently in
 * subroutines of the present quasi-C code. It is economical to make such
 * a translation here, at first place.
 */
if('Candidate For Conclusion' in CandidateForConclusionMatrix[] is written in
a natural language)
```

09958322 .100401

```
{
  Translate_the_'Candidate For Conclusion'_in_CandidateForConclusionMatrix_
  into_a_sentence_in_
  "sentence pattern of one of five basic sentence patterns of
   English grammar"() ;_
}

if(MajorPremiseMatrix[] == CandidateForConclusionMatrix)
{
  Print("Caution ! The candidate for conclusion equals to the major premise") ;_
}

/* FORMULA. 1 5 A (3/10) */

i_flag_Conclusion_of_an_'object-oriented_categorical_syllogism'_or_Not =
    If__Candidate_for_Conclusion_is_
    judged_to_be_and/or_approximately_to_be_
    and/or_
    judged_not_to_be_and/or_approximately_not_to_be_
    a_Conclusion_of_an_Object-oriented_categorical_Syllogism_
    for_the_Major_Premise_
    on_the_basis_of_@[algorithm of sentence based object-oriented categorical
    syllogism]_
    Then__
    Return_1_and/or_Return_2_
    and/or_
    Return_3_and/or_Return_4_
    according_to_the_Cases_(MajorPremiseMatrix[],
                            CandidateForConclusionMatrix[]) ;_
```

09958322 .100401

PCT-2000-01

```
if(i_flag_Conclusion_of_an_'object-oriented_categorical_syllogism'_or_Not == 1)
{
  Print(
  "the 'Candidate For Conclusion' is strictly
    a 'Conclusion of a object-oriented categorical syllogism' for the
    'Major Premise'") ;_
}
else if(i_flag_Conclusion_of_an_'object-oriented_categorical_syllogism'_or_Not == 2)
{
  Print(
  "the 'Candidate For Conclusion' is approximately
    a 'Conclusion of a object-oriented categorical syllogism' for the 'MajorPremise'") ;_
}
else if(i_flag_Conclusion_of_an_'object-oriented_categorical_syllogism'_or_Not == 3)
{
  Print(
 "the 'Candidate For Conclusion' is strictly not
  a 'Conclusion of the object-oriented categorical syllogism' for the
  'MajorPremise'") ;_
}

/* FORMULA. 1 5 A(4/10) */

else if(i_flag_Conclusion_of_an_'object-oriented_categorical_syllogism'_or_Not == 4)
{
  Print(
 "the 'Candidate For Conclusion' is approximately not
  a 'Conclusion of the object-oriented categorical syllogism' for the
  'MajorPremise'") ;_
}
```

09958322.100401

```
  return i_flag_Conclusion_of_an_'object-oriented_categorical_syllogism'_or_Not ;_
}

If__Candidate_for_Conclusion_is_
judged_to_be_and/or_approximately_to_be_
and/or_
judged_not_to_be_and/or_approximately_not_to_be_
a_Conclusion_of_an_Object-oriented_categorical_syllogism_
for_the_Major_Premise_
on_the_basis_of_@[algorithm of sentence based object-oriented categorical
syllogism]_
Then__
Return_1_and/or_Return_2_
and/or_
Return_3_and/or_Return_4_
according_to_the_Cases_(MajorPremiseMatrix[], CandidateForConclusionMatrix[])
{

  /* A flag describing the information concerning High or Low */
  int HL_flag ;_

  int Return_flag ;_

  /* The case when the major premise and the conclusion
   * have different sentence pattern.
   */

/* FORMULA. 1 5 A(5/10) */
```

09958322.100401

```
if("the verb in MajorPremiseMatrix[]" is not equal to
"the verb in CandidateForConclusionMatrix[]")
{
  PY = MajorPremiseMatrix[] ;_
  PX = CandidateForConclusionMatrix[] ;_

  HL_flag =
    Return_1__if_PX_is_strictly_higher_class_'name-of-classification-item'_
    of_PY_
    and_
    Return_2_if_PX_is_probably_higher_class_'name-of-classification-item'_
    of_PY
    and_
    Return_4_if_PX_is_probably_not_higher_class_'name-of-classification-item'
    of_PY() ;_

  if(HL_flag == 1)
  {
    /* The candidate is strictly the conclusion */
    return 1;
  }
  else if(HL_flag == 2)
  {
    /* The candidate is approximate the conclusion */
    return 2;
  }
  else if(HL_flag == 4)
  {
    /* The candidate is approximate not the conclusion. */
    return 4 ;_
```

09958322.100401

```
    }
  }

 /*  FORMULA. 1 5 A(6/10)  */

  /* The case when the major premise and the conclusion
   * have the same sentence pattern.
   */
  else if("the verb in MajorPremiseMatrix[]" is equal to
  "the verb in CandidateForConclusionMatrix[])
  {

    /* 'form I': 'subject-word (S)' + 'verb (V)' */
    if( "MajorPremiseMatrix[] == "S + V"" &&
    "CandidateForConclusionMatrix[] == "S' + V"")
    {
      Return_flag =
        If__Candidate_for_Conclusion_in_'form_I'_is_
        judged_to_be_and/or_approximately_to_be_
        and/or_
        judged_not_to_be_and/or_approximately_not_to_be_
        a_Conclusion_of_an_Object-oriented_categorical_syllogism_
        for_the_Major_Premise_in_'form_I'_
        on_the_basis_of_@[algorithm of sentence based object-oriented categorical
        syllogism]_
        Then__
        Return_1_and/or_Return_2_
        and/or_
        Return_3_and/or_Return_4_
        according_to_the_Cases_
```

```
        (MajorPremiseMatrix[], CandidateForConclusionMatrix[]) ;_

      return Return_flag;_
    }

    /* 'form II': 'subject-word (S)' + 'verb (V)' + 'complement-word (C)' */
    if( "MajorPremiseMatrix[] == "S + V + C"" &&
    "CandidateForConclusionMatrix[] == "S' + V + C"")
    {

  /*  FORMULA. 1 5 A(7/10)   */

      Return_flag =
        If__Candidate_for_Conclusion_in_'form_II'_is_
        judged_to_be_and/or_approximately_to_be_
        and/or_
        judged_not_to_be_and/or_approximately_not_to_be_
        a_Conclusion_of_an_Object-oriented_categorical_syllogism_
        for_the_Major_Premise_in_'form_II'_
        on_the_basis_of_@[algorithm of sentence based object-oriented categorical
        syllogism]_
        Then__
        Return_1_and/or_Return_2_
        and/or_
        Return_3_and/or_Return_4_
        according_to_the_Cases_
        (MajorPremiseMatrix[], CandidateForConclusionMatrix[]) ;_

      return Return_flag;_
    }
```

09958322 .100401

PCT-2000-01

```
/* 'form III': 'subject-word (S)' + 'verb (V)' + 'object-word (O)' */
if( "MajorPremiseMatrix[] == "S + V + O"" &&
"CandidateForConclusionMatrix[] == "S' + V + O"")
{

/*  FORMULA. 1 5 A(8/10)   */

  Return_flag =
    If__Candidate_for_Conclusion_in_'form_III'_is_
    judged_to_be_and/or_approximately_to_be_
    and/or_
    judged_not_to_be_and/or_approximately_not_to_be_
    a_Conclusion_of_an_Object-oriented_categorical_syllogism_
    for_the_Major_premise_in_'form_III'_
    on_the_basis_of_@[algorithm of sentence based object-oriented categorical
    syllogism]_
    Then__
    Return_1_and/or_Return_2_
    and/or_
    Return_3_and/or_Return_4_
    according_to_the_Cases_
    (MajorPremiseMatrix[], CandidateForConclusionMatrix[]) ;_

  return Return_flag;_
}

/* 'form IV': 'subject-word (S)' + 'verb (V)' + 'indirect-object-word (I.O)' +
 *                'direct-object-word (D.O)'
```

09958322 .100401

PCT-2000-01

```
 */
if( "MajorPremiseMatrix[] == "S + V + I.O + D.O" &&
"CandidateForConclusionMatrix[] == "S' + V +I.O' +D.O'"")
{

/* FORMULA. 1 5 A (9/10) */

   Return_flag =
     If__Candidate_for_Conclusion_in_'form_IV'_is_
     judged_to_be_and/or_approximately_to_be_
     and/or_
     judged_not_to_be_and/or_approximately_not_to_be_
     a_Conclusion_of_an_Object-oriented_categorical_syllogism_
     for_the_Major_Premise_in_'form_IV'_
     on_the_basis_of_@[algorithm of sentence based object-oriented categorical
     syllogism]_
     Then__
     Return_1_and/or_Return_2_
     and/or_
     Return_3_and/or_Return_4_
     according_to_the_Cases_
     (MajorPremiseMatrix[], CandidateForConclusionMatrix[]) ;_

   return Return_flag;_
}


/* 'form V': 'subject-word (S)' + 'verb (V)' +
 *          'object-word (O)' + 'complement-word (C)'
 */
```

```
if( "MajorPremiseMatrix[] == "S + V + O + C" &&
"CandidateForConclusionMatrix[] == "S' + V +O' +C''")
{

/*  FORMULA. 1 5 A(10/10)   */

  Return_flag =
    If__Candidate_for_Conclusion_in_'form_V'_is_
    judged_to_be_and/or_approximately_to_be_
    and/or_
    judged_not_to_be_and/or_approximately_not_to_be_
    a_Conclusion_of_an_Object-oriented_categorical_syllogism_
    for_the_Major_Premise_in_'form_V'_
    on_the_basis_of_@[algorithm of sentence based object-oriented categorical
    syllogism]_
    Then__
    Return_1_and/or_Return_2_
    and/or_
    Return_3_and/or_Return_4_
    according_to_the_Cases_
    (MajorPremiseMatrix[], CandidateForConclusionMatrix[]) ;_

  return Return_flag;_
 }
}
}
```

```
/* FORMULA. 1 5 B(1/8) */

/* Formula. 1 5 B shows the sub part (the procedure for judging whether a candidate
 * of conclusion is really the conclusion of a categorical syllogism or not) of a quasi-C
 * code schematically representing a recommended embodiment of the procedure for
 * judging whether a proposition is a "conclusion of a 'object-oriented categorical
 * syllogism described
 * by @[algorithm of sentence based object-oriented categorical syllogism]'" or not
 * when a major premise is given.
 */

#include "FORMULA. 1 5 C"

If__Candidate_for_Conclusion_in_'form_I'_is_
judged_to_be_and/or_approximately_to_be_
and/or_
judged_not_to_be_and/or_approximately_not_to_be_
a_Conclusion_of_an_Object-oriented_categorical_syllogism_
for_the_Major_Premise_in_'form_I'_
on_the_basis_of_@[algorithm of sentence based object-oriented categorical
syllogism]_
Then__
Return_1_and/or_Return_2_
and/or_
Return_3_and/or_Return_4_
according_to_the_Cases_
(MajorPremiseMatrix[], CandidateForConclusionMatrix[])
{
```

09958322 .100401

PCT-2000-01

```
/* A flag describing the information concerning Broad or Narrow */
int BN_flag_for_S_and_S' ;_

'noun_B' = S ;_
'noun_N' = S' ;_

/* FORMULA. 1 5 B(2/8) */

BN_flag_for_S_and_S' =
  Return_0__if_'noun_B'_strictly_equals_to_'noun_N'__
  and_
  Return_1__If_'noun_B'_is_strictly_a_broader_descriptor_of_'noun_N'_
  and_
  Return_2__If_'noun_B'_is_perhaps_a_broader_descriptor_of_'noun_N'_
  and_
  Return_3__If_'noun_B'_has_strictly_no_relation_to_and/or_
  is_strictly_a_narrower_descriptor_of_'noun_N'_
  and_
  Return_4__If_'noun_B'_perhaps_has_no_relation_to_and/or_
  is_perhaps_a_narrower_descriptor_of_'noun_N'_
  ('noun_B', 'noun_N') ;_

  if("BN_flag_for_S_and_S' == 1" and/or "BN_flag_for_S_and_S' == 0")
  {
    /* The candidate is strictly the conclusion */
    return 1 ;_
  }
  else if (BN_flag_for_S_and_S' == 3)
  {
    /* The candidate is strictly not the conclusion */
```

09958322 .100401

```
      return 3 ;_
    }
    else if(BN_flag_for_S_and_S' == 2)
    {
      /* The candidate is perhaps the conclusion */
      return 2 ;_
    }
    else if(BN_flag_for_S_and_S' == 4)
    {
      /* The candidate is perhaps not the conclusion */
      return 4 ;_
    }
  }

／＊　FORMULA. 1 5 B (3/8)　＊／

}
```

If__Candidate_for_Conclusion_in_'form_II'_is_
judged_to_be_and/or_approximately_to_be_
and/or_
judged_not_to_be_and/or_approximately_not_to_be_
a_Conclusion_of_an_Object-oriented_categorical_syllogism_
for_the_Major_Premise_in_'form_II'_
on_the_basis_of_@[algorithm of sentence based object-oriented categorical syllogism]_
Then__
Return_1_and/or_Return_2_
and/or_
Return_3_and/or_Return_4_

09958322 .100401

```
according_to_the_Cases_
(MajorPremiseMatrix[], CandidateForConclusionMatrix[])
{

  /* A flag describing the information concerning Broad or Narrow */
  int BN_flag_for_S_and_S' ;_
  int BN_flag_for_C_and_C' ;_

  'noun_B' = S ;_
  'noun_N' = S' ;_

/* FORMULA. 1 5 B (4/8) */

  BN_flag_for_S_and_S' =
    Return_0__if_'noun_B'_strictly_equals_to_'noun_N'__
    and_
    Return_1__If_'noun_B'_is_strictly_a_broader_descriptor_of_'noun_N'_
    and_
    Return_2__If_'noun_B'_is_perhaps_a_broader_descriptor_of_'noun_N'_
    and_
    Return_3__If_'noun_B'_has_strictly_no_relation_to_and/or_
    is_strictly_a_narrower_descriptor_of_'noun_N'_
    and_
    Return_4__If_'noun_B'_perhaps_has_no_relation_to_and/or_
    is_perhaps_a_narrower_descriptor_of_'noun_N'_
    ('noun_B', 'noun_N') ;_

  'noun_B' = C' ;_
  'noun_N' = C ;_
```

```
BN_flag_for_C_and_C' =
  Return_0__if_'noun_B'_strictly_equals_to_'noun_N'__
  and_
  Return_1__If_'noun_B'_is_strictly_a_broader_descriptor_of_'noun_N'_
  and_
  Return_2__If_'noun_B'_is_perhaps_a_broader_descriptor_of_'noun_N'_
  and_
  Return_3__If_'noun_B'_has_strictly_no_relation_to_and/or_
  is_strictly_a_narrower_descriptor_of_'noun_N'_
  and_
  Return_4__If_'noun_B'_perhaps_has_no_relation_to_and/or_
  is_perhaps_a_narrower_descriptor_of_'noun_N'_
  ('noun_B', 'noun_N') ;_

／＊ FORMULA. １ ５ Ｂ(5/8) ＊／

  if( ("BN_flag_for_S_and_S' == 1" and/or "BN_flag_for_S_and_S' == 0")
       &&
     ("BN_flag_for_C_and_C' == 1" and/or "BN_flag_for_C_and_C' == 0") )
  {
    /* The candidate is strictly the conclusion */
    return 1 ;_
  }
  else if ("BN_flag_for_S_and_S' == 3" and/or "BN_flag_for_C_and_C' == 3")
  {
    /* The candidate is strictly not the conclusion */
    return 3 ;_
  }
  else if( ("BN_flag_for_S_and_S' == 1" && "BN_flag_for_S_and_S' == 2")
            and/or
```

09958322 .100401

```
                (“BN_flag_for_C_and_C' == 1” && “BN_flag_for_C_and_C' == 2”) )
        {
          /* The candidate is perhaps the conclusion */
          return 2 ;_
        }
        else if( (BN_flag_for_S_and_S' == 4)
                   and/or
                (BN_flag_for_C_and_C' == 4) )
        {
          /* The candidate is perhaps not the conclusion */
          return 4 ;_
        }
      }
    }

    /* FORMULA. 1 5 B (6/8) */

    If__Candidate_for_Conclusion_in_‘form_III’_is_
    judged_to_be_and/or_approximately_to_be_
    and/or_
    judged_not_to_be_and/or_approximately_not_to_be_
    a_Conclusion_of_an_Object-oriented_categorical_syllogism_
    for_the_Major_premise_in_‘form_III’_
    on_the_basis_of_@[algorithm of sentence based object-oriented categorical
    syllogism]_
    Then__
    Return_1_and/or_Return_2_
    and/or_
    Return_3_and/or_Return_4_
    according_to_the_Cases_
```

09958322.100401

PCT-2000-01

```
(MajorPremiseMatrix[], CandidateForConclusionMatrix[])
{

  /* A flag describing the information concerning Broad or Narrow */
  int BN_flag_for_S_and_S' ;_
  int BN_flag_for_O_and_O' ;_

  'noun_B' = S ;_
  'noun_N' = S' ;_

/*  FORMULA. 1 5 B (7/8)  */

  BN_flag_for_S_and_S' =
    Return_0__if_'noun_B'_strictly_equals_to_'noun_N'__
    and_
    Return_1__If_'noun_B'_is_strictly_a_broader_descriptor_of_'noun_N'_
    and_
    Return_2__If_'noun_B'_is_perhaps_a_broader_descriptor_of_'noun_N'_
    and_
    Return_3__If_'noun_B'_has_strictly_no_relation_to_and/or_
    is_strictly_a_narrower_descriptor_of_'noun_N'_
    and_
    Return_4__If_'noun_B'_perhaps_has_no_relation_to_and/or_
    is_perhaps_a_narrower_descriptor_of_'noun_N'_
    ('noun_B', 'noun_N') ;_

  'noun_B' = O ;_
  'noun_N' = O' ;_

  BN_flag_for_O_and_O' =
```

09958322 .100401

PCT-2000-01

```
Return_0__if_'noun_B'_strictly_equals_to_'noun_N'__
and_
Return_1__If_'noun_B'_is_strictly_a_broader_descriptor_of_'noun_N'_
and_
Return_2__If_'noun_B'_is_perhaps_a_broader_descriptor_of_'noun_N'_
and_
Return_3__If_'noun_B'_has_strictly_no_relation_to_and/or_
is_strictly_a_narrower_descriptor_of_'noun_N'_
and_
Return_4__If_'noun_B'_perhaps_has_no_relation_to_and/or_
is_perhaps_a_narrower_descriptor_of_'noun_N'_
('noun_B', 'noun_N') ;_

if( ("BN_flag_for_S_and_S' == 1" and/or "BN_flag_for_S_and_S' == 0")
    &&
   ("BN_flag_for_O_and_O' == 1" and/or "BN_flag_for_O_and_O' == 0") )
{

/* FORMULA. 1 5 B (8/8) */

  /* The candidate is strictly the conclusion */
  return 1 ;_
}
else if ("BN_flag_for_S_and_S' == 3" and/or "BN_flag_for_O_and_O' == 3")
{
  /* The candidate is strictly not the conclusion */
  return 3 ;_
}
else if( ("BN_flag_for_S_and_S' == 1" or "BN_flag_for_S_and_S' == 2")
        &&
```

09958322.100401

PCT-2000-01

```
            ("BN_flag_for_O_and_O' == 1" or "BN_flag_for_O_and_O' == 2") )
    {
      /* The candidate is perhaps the conclusion */
      return 2 ;_
    }
    else if( (BN_flag_for_S_and_S' == 4)
                and/or
            (BN_flag_for_O_and_O' == 4) )
    {
      /* The candidate is perhaps not the conclusion */
      return 4 ;_
    }
  }
}
```

```
/*   FORMULA. 1 5 C(1/8)   */

/* Formula. 1 5 C  shows the sub part (quasi-C codes of functions used in Formula. 1 5
 * B) of a quasi-C code schematically representing a recommended embodiment of the
 * procedure for judging whether a proposition is a "conclusion of a 'object-oriented
 * categorical syllogism described by @[algorithm of sentence based object-oriented
 * categorical syllogism]'" or not when a major premise is given.
 */

#include "FORMULA. 1 5 D"
```

09958322 .100401

```
If__Candidate_for_Conclusion_in_'form_IV'_is_
judged_to_be_and/or_approximately_to_be_
and/or_
judged_not_to_be_and/or_approximately_not_to_be_
a_Conclusion_of_an_Object-oriented_categorical_syllogism_
for_the_Major_premise_in_'form_IV'_
on_the_basis_of_@[algorithm of sentence based object-oriented categorical
syllogism]_
Then__
Return_1_and/or_Return_2_
and/or_
Return_3_and/or_Return_4_
according_to_the_Cases_
(MajorPremiseMatrix[], CandidateForConclusionMatrix[])
{

 /* A flag describing the information concerning Broad or Narrow */
 int BN_flag_for_S_and_S' ;_
 int BN_flag_for_I.O_and_I.O' ;_
 int BN_flag_for_D.O_and_D.O' ;_

 'noun_B' = S ;_
 'noun_N' = S' ;_

/*  FORMULA. 1 5 C(2/8)   */

 BN_flag_for_S_and_S' =
   Return_0__if_'noun_B'_strictly_equals_to_'noun_N'__
   and_
   Return_1__If_'noun_B'_is_strictly_a_broader_descriptor_of_'noun_N'_
```

and_

Return_2__If_'noun_B'_is_perhaps_a_broader_descriptor_of_'noun_N'_ and_

Return_3__If_'noun_B'_has_strictly_no_relation_to_and/or_ is_strictly_a_narrower_descriptor_of_'noun_N'_ and_

Return_4__If_'noun_B'_perhaps_has_no_relation_to_and/or_ is_perhaps_a_narrower_descriptor_of_'noun_N'_

('noun_B', 'noun_N') ;_

'noun_B' = I.O ;_

'noun_N' = I.O' ;_

BN_flag_for_I.O_and_I.O' =

Return_0__if_'noun_B'_strictly_equals_to_'noun_N'__ and_

Return_1__If_'noun_B'_is_strictly_a_broader_descriptor_of_'noun_N'_ and_

Return_2__If_'noun_B'_is_perhaps_a_broader_descriptor_of_'noun_N'_ and_

Return_3__If_'noun_B'_has_strictly_no_relation_to_and/or_ is_strictly_a_narrower_descriptor_of_'noun_N'_ and_

Return_4__If_'noun_B'_perhaps_has_no_relation_to_and/or_ is_perhaps_a_narrower_descriptor_of_'noun_N'_

('noun_B', 'noun_N') ;_

'noun_B' = D.O ;_

'noun_N' = D.O' ;_

```
/* FORMULA. 1 5 C(3/8) */

BN_flag_for_D.O_and_D.O' =
  Return_0__if_'noun_B'_strictly_equals_to_'noun_N'__
  and_
  Return_1__If_'noun_B'_is_strictly_a_broader_descriptor_of_'noun_N'_
  and_
  Return_2__If_'noun_B'_is_perhaps_a_broader_descriptor_of_'noun_N'_
  and_
  Return_3__If_'noun_B'_has_strictly_no_relation_to_and/or_
  is_strictly_a_narrower_descriptor_of_'noun_N'_
  and_
  Return_4__If_'noun_B'_perhaps_has_no_relation_to_and/or_
  is_perhaps_a_narrower_descriptor_of_'noun_N'_
  ('noun_B', 'noun_N') ;_

  if( ("BN_flag_for_S_and_S' == 1" and/or "BN_flag_for_S_and_S' == 0")
      &&
     ("BN_flag_for_I.O_and_I.O' == 1" and/or "BN_flag_for_I.O_and_I.O' == 0")
      &&
     ("BN_flag_for_D.O_and_D.O' == 1" and/or
      "BN_flag_for_D.O_and_D.O' == 0") )
  {
    /* The candidate is strictly the conclusion */
    return 1 ;_
  }
  else if ("BN_flag_for_S_and_S' == 3" and/or
           "BN_flag_for_I.O_and_I.O' == 3" and/or
           "BN_flag_for_D.O_and_D.O' == 3" )
```

09958322.100401

PCT-2000-01

```
      {
        /* The candidate is strictly not the conclusion */
        return 3 ;_
      }

  /*  FORMULA. 1 5 C(4/8)  */

      else if( ("BN_flag_for_S_and_S' == 1" or "BN_flag_for_S_and_S'" == 2")
                 &&
               ("BN_flag_for_I.O_and_I.O' == 1" or "BN_flag_for_I.O_and_I.O'" == 2")
                 &&
               ("BN_flag_for_D.O_and_D.O' == 1" or
               "BN_flag_for_D.O_and_D.O'" == 2") )
      {
        /* The candidate is perhaps the conclusion */
        return 2 ;_
      }
      else if( (BN_flag_for_S_and_S' == 4)
                 and/or
               (BN_flag_for_I.O_and_I.O' == 4)
                 and/or
               (BN_flag_for_D.O_and_D.O' == 4) )
      {
        /* The candidate is perhaps not the conclusion */
        return 4 ;_
      }
    }
  }

  /*  FORMULA. 1 5 C(5/8)  */
```

09958322 .100401

```
If__Candidate_for_Conclusion_in_'form_V'_is_
judged_to_be_and/or_approximately_to_be_
and/or_
judged_not_to_be_and/or_approximately_not_to_be_
a_Conclusion_of_an_Object-oriented_categorical_syllogism_
for_the_Major_premise_in_'form_V'_
on_the_basis_of_@[algorithm of sentence based object-oriented categorical
syllogism]_
Then__
Return_1_and/or_Return_2_
and/or_
Return_3_and/or_Return_4_
according_to_the_Cases_
(MajorPremiseMatrix[], CandidateForConclusionMatrix[])
{

  /* A flag describing the information concerning Broad or Narrow */
  int BN_flag_for_S_and_S' ;_
  int BN_flag_for_O_and_O' ;_
  int BN_flag_for_C_and_C' ;_

  'noun_B' = S ;_
  'noun_N' = S' ;_

/*  FORMULA. 1 5 C(6/8)  */

  BN_flag_for_S_and_S' =
    Return_0__if_'noun_B'_strictly_equals_to_'noun_N'__
    and_
```

Return_1__If_'noun_B'_is_strictly_a_broader_descriptor_of_'noun_N'_ and_

Return_2__If_'noun_B'_is_perhaps_a_broader_descriptor_of_'noun_N'_ and_

Return_3__If_'noun_B'_has_strictly_no_relation_to_and/or_ is_strictly_a_narrower_descriptor_of_'noun_N'_ and_

Return_4__If_'noun_B'_perhaps_has_no_relation_to_and/or_ is_perhaps_a_narrower_descriptor_of_'noun_N'_

('noun_B', 'noun_N') ;_

'noun_B' = O ;_

'noun_N' = O' ;_

BN_flag_for_O_and_O' =

Return_0__if_'noun_B'_strictly_equals_to_'noun_N'__ and_

Return_1__If_'noun_B'_is_strictly_a_broader_descriptor_of_'noun_N'_ and_

Return_2__If_'noun_B'_is_perhaps_a_broader_descriptor_of_'noun_N'_ and_

Return_3__If_'noun_B'_has_strictly_no_relation_to_and/or_ is_strictly_a_narrower_descriptor_of_'noun_N'_ and_

Return_4__If_'noun_B'_perhaps_has_no_relation_to_and/or_ is_perhaps_a_narrower_descriptor_of_'noun_N'_

('noun_B', 'noun_N') ;_

'noun_B' = C' ;_

```
'noun_N' = C ;_

/* FORMULA. 1 5 C(7/8) */

BN_flag_for_C_and_C' =
   Return_0__if_'noun_B'_strictly_equals_to_'noun_N'__
   and_
   Return_1__If_'noun_B'_is_strictly_a_broader_descriptor_of_'noun_N'_
   and_
   Return_2__If_'noun_B'_is_perhaps_a_broader_descriptor_of_'noun_N'_
   and_
   Return_3__If_'noun_B'_has_strictly_no_relation_to_and/or_
   is_strictly_a_narrower_descriptor_of_'noun_N'_
   and_
   Return_4__If_'noun_B'_perhaps_has_no_relation_to_and/or_
   is_perhaps_a_narrower_descriptor_of_'noun_N'_
   ('noun_B', 'noun_N') ;_

   if( ("BN_flag_for_S_and_S' == 1" and/or "BN_flag_for_S_and_S' == 0")
        &&
       ("BN_flag_for_O_and_O' == 1" and/or "BN_flag_for_O_and_O' == 0")
        &&
       ("BN_flag_for_C_and_C' == 1" and/or "BN_flag_for_C_and_C' == 0") )
   {
     /* The candidate is strictly the conclusion */
     return 1 ;_
   }
   else if ("BN_flag_for_S_and_S' == 3" and/or
            "BN_flag_for_O_and_O' == 3" and/or
            "BN_flag_for_C_and_C' == 3" )
```

```
{
  /* The candidate is strictly not the conclusion */
  return 3 ;_
}

/* FORMULA. 1 5 C(8/8) */

else if( ("BN_flag_for_S_and_S' == 1" or "BN_flag_for_S_and_S'" == 2")
            &&
           ("BN_flag_for_O_and_O' == 1" or "BN_flag_for_O_and_O'" == 2")
            &&
           ("BN_flag_for_C_and_C' == 1" or "BN_flag_for_C_and_C'" == 2") )
{
  /* The candidate is perhaps the conclusion */
  return 2 ;_
}
else if( (BN_flag_for_S_and_S' == 4)
            and/or
           (BN_flag_for_O_and_O' == 4)
            and/or
           (BN_flag_for_C_and_C' == 4) )
{
  /* The candidate is perhaps not the conclusion */
  return 4 ;_
}
  }
}
```

```
/* FORMULA.15D(1/4) */

/* Formula.15D shows the sub part (quasi-C codes of functions used in Formula.15
 *C) of a quasi-C code schematically representing a recommended embodiment of the
 * procedure for judging whether a proposition is a "conclusion of a 'object-oriented
 * categorical syllogism described by @[algorithm of sentence based object-oriented
 * categorical syllogism]'" or not when a major premise is given.
 */

Return_0__if_'noun_B'_strictly_equals_to_'noun_N'__
and_
Return_1__If_'noun_B'_is_strictly_a_broader_descriptor_of_'noun_N'_
and_
Return_2__If_'noun_B'_is_perhaps_a_broader_descriptor_of_'noun_N'_
and_
Return_3__If_'noun_B'_has_strictly_no_relation_to_and/or_
is_strictly_a_narrower_descriptor_of_'noun_N'_
and_
Return_4__If_'noun_B'_perhaps_has_no_relation_to_and/or_
is_perhaps_a_narrower_descriptor_of_'noun_N'_
('noun_B', 'noun_N')
{

  /* A flag describing the information concerning Broad and/or Narrow */
  int BN_flag ;_

  if(Both 'noun_B' and 'noun_N' are 'descriptors')
  {
```

```
'descriptor_B' = 'noun_B' ;_
'descriptor_N' = 'noun_N' ;_

  BN_flag =
     Return_1___If_'discriptor_B'_is_a_broader_descriptor_of_'descriptor_N'_
     and_
     Return_0_Else_if_'discriptor_B'_equals_to_'descriptor_N'__
     and_
     Else_Return_3
     ('descriptor_B', 'descriptor_N') ;_

}
else if('noun_B' and/or 'noun_N' is not a 'descriptor')
{

/*  FORMULA. 1 5 D(2/4)  */

  Ask_the_user_of_the_system_whether_
  "'noun_N' is synonym and/or narrower term of 'noun_B'"_
  or_not() ;_

  if(the answer of the user is yes)
  {
    /* The candidate is perhaps the conclusion */
    BN_flag = 2 ;_
  }
  else
  {
    /* The candidate is perhaps not the conclusion */
```

09958322 .100401

```
        BN_flag = 4 ;_
      }
    }
    return BN_flag ;_
}



Return_1___If_'discriptor_B'_is_a_broader_descriptor_of_'descriptor_N'_
and_
Return_0_Else_if_'discriptor_B'_equals_to_'descriptor_N'__
and_
Else_Return_3
('descriptor_B', 'descriptor_N')
{

  Read_Thesaurus_line_by_line_from_the_first_line_to_the_last_line_and_
  if_a_sentence_in_"sentence pattern of 'ideal thesaurus'"
  _in_a_line_contains_'descriptor'_as_narrower_descriptor_
  then_
  put_the_hit_sentence_one_in_one_line_of_HitSentencesMatrix_on_top_of_another_
  in_another_line_of_HitSentencesMatrix('descriptor_N') ;_

/*  FORMULA. 1 5 D(3/4)   */

  Pick_up_all_the_copies_of_the_broader_'descriptors'_in_HitSentencesMatrix_and_
  put_one_copy_in_one_line_of_HitCopiesOfBroaderDescriptorsMatrix_
  on_top_of_
  another_copy_in_another_line_of_HitCopiesOfBroaderDescriptorsMatrix() ;_

  while(a "broader_'descriptor'" remains unread
```

PCT-2000-01 09958322.100401

```
in HitCopiesOfBroaderDescriptorsMatrix[])
{
  Read_a_"broader_'descriptor'"_
  from_a_new_line_of_HitCopiesOfBroaderDescriptorsMatrix() ;_

  if('discriptor_B' == "broader_'descriptor'")
  {
    return 1 ;_
  }
  else if("broader_'descriptor'" is not one of
  the broadest 'descriptors' in the 'ideal thesaurus')
  {
    /* Call recursively the present function */

    Return_1___If_'discriptor_B'_is_a_broader_descriptor_of_'descriptor_N'
    ('descriptor_B', 'descriptor_N') ;_

  }
}

/* The sentence, "return 1 ;_", has not been called */
if('descriptor_B' == 'descriptor_N')
{
  return 0 ;_
}
else
{

/* FORMULA. 1 5 D(4/4) */
```

```
        /* 'discriptor_B' is a narrower descriptor of 'descriptor_N'
         * and/or
         * 'discriptor_B' has no relation with 'descriptor_N'
         */
        return 3 ;_
      }
    }
```

/* FORMULA. 1 6 (1/9) */

```
/* Formula. 1 6  shows a quasi-C code schematically representing a recommended
 * embodiment of the procedure for judging whether a proposition is a "conclusion of a
 * 'hypothetical syllogism described by @[algorithm of sentence based object-oriented
 * hypothetical syllogism]" or not when a major premise is given.
 */

#include "FORMULA. 1 5 A"

/* Main routine from here */
  char MajorPremiseMatrix[] ;_
  char CandidateForConclusionMatrix[] ;_

  /* Input 'Major Premise' */
  Let_the_User_of_the_System_Input_the_Proposition_used_as_the_major_premise_
  and_Copy_and_Paste_it_in_MajorPremiseMatrix() ;_
```

09958322 .100401

```
/* Input 'Candidate For Conclusion' */
Let_the_User_of_the_System_Input_the_Proposition_
which_he_Regards_as_Possibly_
the_Conclusion_of_a_Hypothetical_syllogism_for_the_the_Major_premise
and_Copy_and_Paste_the_Proposition_in_CandidateForConclusionMatrix() ;_

Judge_whether_a_proposition_is_a_
"conclusion_of_a_'hypothetical_syllogism_described_by_
@[algorithm of sentence based object-oriented hypothetical
syllogism]'_for_a_major_premise"_
or_not(MajorPremiseMatrix[],CandidateForConclusionMatrix[])
{
  int i_flag_Conclusion_of_a_'Hypothetical_Syllogism'_or_Not ;_

  /* Specify the Information source of 'Minor Premise' */
  Let_the_User_of_the_System_Specify_the_Thesaurus_and_Classification_table_
  that_are_used_by_the_System_
  as_the_Information_source_to_form_Minor_premises() ;_

  if(MajorPremiseMatrix[] == CandidateForConclusionMatrix)
  {
    Print("Caution ! The candidate for conclusion equals to the major premise") ;_
  }

/*  FORMULA. 1 6 (2/9)  */

  i_flag_Conclusion_of_a_'Hypothetical_Syllogism'_or_Not =
      If__Candidate_for_Conclusion_is_
      judged_to_be_and/or_approximately_to_be_
      and/or_
```

```
judged_not_to_be_and/or_approximately_not_to_be_
a_Conclusion_of_a_Hypothetical_Syllogism_
for_the_Major_Premise_
on_the_basis_of_@[algorithm of sentence based object-oriented
hypothetical syllogism]_
Then__
Return_1_and/or_Return_2_
and/or_
Return_3_and/or_Return_4_
according_to_the_Cases_(MajorPremiseMatrix[],
                    CandidateForConclusionMatrix[]) ;_

if(i_flag_Conclusion_of_a_'Hypothetical_Syllogism'_or_Not == 1)
{
  Print(
  "the 'Candidate For Conclusion' is strictly
   a 'Conclusion of an object-oriented hypothetical syllogism' for
   the 'MajorPremise'") ;_
}
else if(i_flag_Conclusion_of_a_'Hypothetical_Syllogism'_or_Not == 2)
{
  Print(
  "the 'Candidate For Conclusion' is approximately
   a 'Conclusion of an object-oriented hypothetical syllogism' for
   the 'MajorPremise'") ;_
}
else if(i_flag_Conclusion_of_a_'Hypothetical_Syllogism'_or_Not == 3)
{
  Print(
 "the 'Candidate For Conclusion' is strictly not
```

```
        a 'Conclusion of the object-oriented hypothetical syllogism' for
        the 'MajorPremise'") ;_
      }
      else if(i_flag_Conclusion_of_a_'Hypothetical_Syllogism'_or_Not == 4)
      {

  /*   FORMULA. 1 6 (3/9)   */

        Print(
       "the 'Candidate For Conclusion' is approximately not
        a 'Conclusion of the object-oriented hypothetical syllogism' for
        the 'MajorPremise'") ;_
      }

    return i_flag_Conclusion_of_a_'Hypothetical_Syllogism'_or_Not ;_
  }

  If__Candidate_for_Conclusion_is_
  judged_to_be_and/or_approximately_to_be_
  and/or_
  judged_not_to_be_and/or_approximately_not_to_be_
  a_Conclusion_of_a_Hypothetical_Syllogism_
  for_the_Major_Premise_
  on_the_basis_of_@[algorithm of sentence based object-oriented
  hypothetical syllogism]_
  Then__
  Return_1_and/or_Return_2_
  and/or_
  Return_3_and/or_Return_4_
  according_to_the_Cases_(MajorPremiseMatrix[], CandidateForConclusionMatrix[])
```

09958322.100401

```
{
  int i_flag_Conclusion_of_a_'Hypothetical_Syllogism'_or_Not ;_
  int j_flag_Conclusion_of_an_'object-oriented_categorical_syllogism'_or_Not ;_
  int k_flag_Proposition_1_is_derived_from_Proposition_3_or_Not ;_
  int l_flag_Proposition_4_is_derived_from_Proposition_2_or_Not ;_
  char The_name_of_the_Rule_used_as_the_'Major Premise'[] ;_
  char Proposition_1[] ;_
  char Proposition_2[] ;_
  char The_name_of_the_Rule_used_as_the_'Candidate For Conclusion'[] ;_
  char Proposition_3[] ;_
  char Proposition_4[] ;_

/*  FORMULA. 1 6 (4/9)  */

/* It is recommended that the 'Major Premise' in MajorPremiseMatrix should be
 * translated into a formal sentence
 * by using "sentence pattern of physical and/or mathematical rules" and
 * by using "sentence pattern of one of five basic sentence patterns of
 * English grammar",
 * because if translated, then, it becomes easy to recognize 'S', 'V', 'C', 'O', 'D.O',
 * and 'I.O' in the clauses. Such a recognition is carried out frequently in
 * subroutines of the present quasi-C code. Therefore, it is economical to
 * make such a translation here, at the first place. A knowledge engineer can do
 * such a translation.
 */
  if('Major Premise' in MajorPremiseMatrix[] is written in a natural language)
  {
    Translate_the_'Major Premise'_in_MajorPremiseMatrix_into_a_sentence_
    in_"sentence pattern of physical and/or mathematical rules",_i.e._
    "_RULE_ ** _states_if( *** )then{ **** } ;_",_
```

```
  and_translate_both_the_clause *** and_the_clause **** into_a_clause_in_
  "sentence pattern of one of five basic sentence patterns of
  English grammar"() ;_
}

The_name_of_the_Rule_used_as_the_'Major Premise'[] = '**' ;_
Proposition_1[] = '***' ;_
Proposition_2[] = '****' ;_

/*  FORMULA. 1 6 (5/9)  */

/* It is recommended that the 'Candidate For Conclusion' in
 * CandidateForConclusionMatrix should be translated into a formal sentence
 * by using "sentence pattern of physical and/or mathematical rules" and
 * by using "sentence pattern of one of five basic sentence patterns of
 * English grammar",
 * because if translated, then, it becomes easy to recognize 'S', 'V', 'C', 'O', 'D.O',
 * and 'I.O' in the clauses. Such a recognition is carried out frequently in
 * subroutines of the present quasi-C code. Therefore, it is economical to make
 * such a recognition here, at first place. A knowledge engineer can do such a
 * translation.
 */
if('Candidate For Conclusion'_in_CandidateForConclusionMatrix
is written in a natural language)
{
  Translate_the_'Candidate For Conclusion'_in_CandidateForConclusionMatrix_
  into_a_sentence_
  in_"sentence pattern of physical and/or mathematical rules",_i.e._
  "_RULE_ ***** _states_if( ****** )then{ ******* } ;_",_
  and_translate_both_the_clause ****** and_the_clause ******* into_a_clause_in_
```

09958322 .100401

```
  "sentence pattern of one of five basic sentence patterns of
  English grammar"() ;_
}

The_name_of_the_Rule_used_as_the_'Candidate For Conclusion'[] = ***** ;_
Proposition_3[] = ****** ;_
Proposition_4[] = ******* ;_

if(Proposition_1[] and Proposition_3[] are categorical propositions)
{

/*  FORMULA. 1 6 (6/9)  */

  j_flag_Conclusion_of_an_'object-oriented_categorical_syllogism'_or_Not =
      If__Candidate_for_Conclusion_is_
      judged_to_be_and/or_approximately_to_be_
      and/or_
      judged_not_to_be_and/or_approximately_not_to_be_
      a_Conclusion_of_an_Object-oriented_categorical_syllogism_
      for_the_Major_Premise_
      on_the_basis_of_@[algorithm of sentence based object-oriented
      categorical syllogism]_
      Then__
      Return_1_and/or_Return_2_
      and/or_
      Return_3_and/or_Return_4_
      according_to_the_Cases_(Proposition_3[], Proposition_1[]) ;_

  k_flag_Proposition_1_is_derived_from_Proposition_3_or_Not =
      j_flag_Conclusion_of_an_'object-oriented_categorical_syllogism'_or_Not ;_
```

PCT-2000-01 09958322.100401

```
}
else if(Proposition_1[] and Proposition_3[] are hypothetical propositions)
{
  i_flag_Conclusion_of_a_'Hypothetical_Syllogism'_or_Not =
      If__Candidate_for_Conclusion_is_
      judged_to_be_and/or_approximately_to_be_
      and/or_
      judged_not_to_be_and/or_approximately_not_to_be_
      a_Conclusion_of_a_Hypothetical_Syllogism_
      for_the_Major_Premise_
      on_the_basis_of_@[algorithm of sentence based object-oriented
      hypothetical syllogism]_
      Then__
      Return_1_and/or_Return_2_
      and/or_
      Return_3_and/or_Return_4_
      according_to_the_Cases_(Proposition_3[], Proposition_1[]) ;_

/* FORMULA. 1 6 (7/9) */

  k_flag_Proposition_1_is_derived_from_Proposition_3_or_Not =
      i_flag_Conclusion_of_a_'Hypothetical_Syllogism'_or_Not ;_
}
else
{
  return 3 ;_
}

if(Proposition_4[] and Proposition_2[] are categorical propositions)
{
```

09958322.100401

```
j_flag_Conclusion_of_an_'object-oriented_categorical_syllogism'_or_Not =
     If__Candidate_for_Conclusion_is_
     judged_to_be_and/or_approximately_to_be_
     and/or_
     judged_not_to_be_and/or_approximately_not_to_be_
     a_Conclusion_of_an_Object-oriented_categorical_syllogism_
     for_the_Major_Premise_
     on_the_basis_of_@[algorithm of sentence based object-oriented
     categorical syllogism]_
     Then__
     Return_1_and/or_Return_2_
     and/or_
     Return_3_and/or_Return_4_
     according_to_the_Cases_(Proposition_2[], Proposition_4[]) ;_

l_flag_Proposition_4_is_derived_from_Proposition_2_or_Not =
     j_flag_Conclusion_of_an_'object-oriented_categorical_syllogism'_or_Not ;_
}
else if(Proposition_4[] and Proposition_2[] are hypothetical propositions)
{

/* FORMULA. 1 6 (8/9) */

i_flag_Conclusion_of_a_'Hypothetical_Syllogism'_or_Not =
     If__Candidate_for_Conclusion_is_
     judged_to_be_and/or_approximately_to_be_
     and/or_
     judged_not_to_be_and/or_approximately_not_to_be_
     a_Conclusion_of_a_Hypothetical_Syllogism_
     for_the_Major_Premise_
```

```
            on_the_basis_of_@[algorithm of sentence based object-oriented
            hypothetical syllogism]_
            Then__
            Return_1_and/or_Return_2_
            and/or_
            Return_3_and/or_Return_4_
            according_to_the_Cases_(Proposition_2[], Proposition_4[]) ;_

        l_flag_Proposition_4_is_derived_from_Proposition_2_or_Not =
            i_flag_Conclusion_of_a_'Hypothetical_Syllogism'_or_Not ;_
    }
    else
    {
      return 3 ;_
    }

    if( (k_flag_Proposition_1_is_derived_from_Proposition_3_or_Not == 1)
        and
        (l_flag_Proposition_4_is_derived_from_Proposition_2_or_Not == 1) )
    {
      return 1 ;_
    }
    else if( (k_flag_Proposition_1_is_derived_from_Proposition_3_or_Not == 1 or 2)
              and
              (l_flag_Proposition_4_is_derived_from_Proposition_2_or_Not == 1 or 2) )
    {
      return 2 ;_
    }

/* FORMULA. 1 6 (9/9) */
```

PCT-2000-01 09958322.100401

```
else if( (k_flag_Proposition_1_is_derived_from_Proposition_3_or_Not == 3)
            or
            (l_flag_Proposition_4_is_derived_from_Proposition_2_or_Not == 3) )
{
   return 3 ;_
}
else if( (k_flag_Proposition_1_is_derived_from_Proposition_3_or_Not == 4)
            or
            (l_flag_Proposition_4_is_derived_from_Proposition_2_or_Not == 4) )
{
   return 4 ;_
}
}
```

```
/*   FORMULA. 1 7 (1/2)   */

/* Formula. 1 7  shows a quasi-C code which outlines the procedure for judging
 * whether a 'hypothetical propositions possibly used in forward reasoning' is a
 * 'hypothetical propositions to be used in forward reasoning' or not.
 */

#include "FORMULA. 1 5 A"
#include "FORMULA. 1 6"

Judge_whether_a_'hypothetical propositions possibly used in forward reasoning'_
```

09958322.100401

```
is_a_'hypothetical propositions to be used in forward reasoning'_or_not()
{
  char PresuppositionMatrix[] ;_
  char CandidateOfConsequenceMatrix[] ;_
  int i_flag ;_

  Input_the_'presupposition'_of_the_
  'hypothetical_proposition_
  which_is_the_target_of_the_present_step_of_opportunistic_reasoning',_
  and_copy_and_paste_it_on_PresuppositionMatrix_() ;_

  Input_the_'presupposition' of the 'hypothetical propositions to be used
  in forward reasoning',_
  and_copy_and_paste_it_on_CandidateOfConsequenceMatrix_() ;_

  if(proposition in CandidateOfConsequenceMatrix[] is a categorical proposition)
  {
    MajorPremiseMatrix[] = PresuppositionMatrix[] ;_
    CandidateForConclusionMatrix[] = CandidateOfConsequenceMatrix[] ;_

    i_flag = Judge_whether_a_proposition_is_a_
             "conclusion_of_an_'object-oriented_categorical_syllogism_described_by_
             @[algorithm of sentence based object-oriented
             categorical syllogism]'_for_a_major_premise"_
             or_not(MajorPremiseMatrix[], CandidateForConclusionMatrix[]) ;_
  }
  else if(proposition in CandidateOfConsequenceMatrix[] is a hypothetical
  proposition)
  {
    MajorPremiseMatrix[] = PresuppositionMatrix[] ;_
```

09958322.100401

```
    CandidateForConclusionMatrix[] = CandidateOfConsequenceMatrix[] ;_

  /*  FORMULA. 1 7 (2/2)  */

    i_flag = Judge_whether_a_proposition_is_a_
            "conclusion_of_a_'hypothetical_syllogism_described_by_
            @[algorithm of sentence based object-oriented
            hypothetical syllogism]'_for_a_major_premise"_
            or_not(MajorPremiseMatrix[],CandidateForConclusionMatrix[]) ;_
  }

  if(i_flag == 1)
  {
    Print(
    "the 'hypothetical propositions possibly used in forward reasoning' is strictly
     a 'hypothetical propositions to be used in forward reasoning'") ;_
  }
  else if(i_flag == 2)
  {
    Print(
    "the 'hypothetical propositions possibly used in forward reasoning' is
     approximately
     a 'hypothetical propositions to be used in forward reasoning'") ;_
  }
  else if(i_flag == 3)
  {
    Print(
   "the 'hypothetical propositions possibly used in forward reasoning' is strictly not
    a 'hypothetical propositions to be used in forward reasoning'") ;_
  }
```

PCT-2000-01 09958322 .100401

```
else if(i_flag == 4)
{
  Print(
 "the 'hypothetical propositions possibly used in forward reasoning' is
  approximately
  not
  a 'hypothetical propositions to be used in forward reasoning'") ;_
}
return i_flag ;_
}
```

```
/* FORMULA. 1 8 (1/2) */

/* Formula. 1 8 shows a quasi-C code schematically representing a recommended
 * embodiment of the procedure for judging whether a 'hypothetical propositions
 * possibly used in backward reasoning' is a 'hypothetical propositions to be used in
 * backward reasoning' or not.
 */

#include "FORMULA. 1 5 A"
#include "FORMULA. 1 6"

Judge_whether_a_'hypothetical propositions possibly used in backward reasoning'_
is_a_'hypothetical propositions to be used in backward reasoning'_or_not()
{
  char PresuppositionMatrix[] ;_
```

PCT-2000-01 09958322.100401

```
char CandidateOfConsequenceMatrix[] ;_
int i_flag ;_

Input_the_'consequence'_of_the_
'hypothetical_proposition_
which_is_the_target_of_the_present_step_of_opportunistic_reasoning',_
and_copy_and_paste_it_on_CandidateOfConsequenceMatrix_() ;_

Input_the_'consequence' of the 'hypothetical propositions to be used
in backward reasoning',_
and_copy_and_paste_it_on_PresuppositionMatrix_() ;_

if(proposition in CandidateOfConsequenceMatrix[] is a categorical proposition)
{
  MajorPremiseMatrix[] = PresuppositionMatrix[] ;_
  CandidateForConclusionMatrix[] = CandidateOfConsequenceMatrix[] ;_

  i_flag = Judge_whether_a_proposition_is_a_
          "conclusion_of_an_'object-oriented_categorical_syllogism_described_by_
          @[algorithm of sentence based object-oriented
          categorical syllogism]'_for_a_major_premise"_
          or_not(MajorPremiseMatrix[], CandidateForConclusionMatrix[]) ;_
}
else if(proposition in CandidateOfConsequenceMatrix[] is a hypothetical
proposition)
{
  MajorPremiseMatrix[] = PresuppositionMatrix[] ;_
  CandidateForConclusionMatrix[] = CandidateOfConsequenceMatrix[] ;_

/* FORMULA. 1 8 (2/2) */
```

```
  i_flag = Judge_whether_a_proposition_is_a_
            "conclusion_of_a_'hypothetical_syllogism_described_by_
            @[algorithm of sentence based object-oriented
            hypothetical syllogism]'_for_a_major_premise"_
            or_not(MajorPremiseMatrix[],CandidateForConclusionMatrix[]) ;_
}

if(i_flag == 1)
{
  Print(
  "the 'hypothetical propositions possibly used in backward reasoning' is strictly
   a 'hypothetical propositions to be used in backward reasoning'") ;_
}
else if(i_flag == 2)
{
  Print(
  "the 'hypothetical propositions possibly used in backward reasoning' is
   approximately
   a 'hypothetical propositions to be used in backward reasoning'") ;_
}
else if(i_flag == 3)
{
  Print(
 "the 'hypothetical propositions possibly used in backward reasoning' is strictly not
  a 'hypothetical propositions to be used in backward reasoning'") ;_
}
else if(i_flag == 4)
{
  Print(
```

```
        "the 'hypothetical propositions possibly used in backward reasoning' is
         approximately
         not
         a 'hypothetical propositions to be used in backward reasoning'") ;_
    }
    return i_flag ;_
}
```

What is claimed is:

1. Means for storing knowledge base system in which a set selected from the group consisting of the universal set and the subsets, of a plurality of data which constitute an object-oriented knowledge base system is stored, in said object-oriented knowledge base system comprising:

(a) an object-oriented knowledge base whose body of information includes data selected from the group consisting of (a-1) an ideal thesaurus in which hierarchy of nouns is stored, comprising (a-1-1) a plurality of keys described using means for storing data of ideal thesaurus, in which a noun with broader meaning is described as a broader descriptor, and a noun with narrower meaning is described as a narrower descriptor, (a-2) an ideal classification table in which hierarchy of verbs is recorded, comprising (a-2-1) a plurality of keys described using means for storing data of classification table, in which a verb with broader meaning is described as a higher class name-of-classification-item and a verb with narrower meaning is described as a lower class name-of-classification-item, and, (a-3) a plurality of rules described by using (a-3-1) a plurality of keys described using means for storing data used as rules, (b) an object-oriented knowledge base management system whose body of information includes data selected from the group consisting of (b-1) an ideal dictionary wherein lexical definition of verbs and nouns are given by using keys selected from the group consisting of (b-1-1) a plurality of keys described using means for storing data that define objects, for giving the lexical definition of an ideal noun, (b-1-2) a plurality of keys described using means for implementation of algorithms-of-processes, for giving the lexical definition of an ideal verb, and, (b-1-3) a plurality of keys described using means for describing the function of a verb, for giving the lexical definition of an ideal verb, (b-2) means for giving definition of broader descriptor and narrower descriptor, coupled to said object-oriented knowledge base, for constructing the hierarchy of nouns in said ideal thesaurus wherein as the basis on which said definition of broader descriptor and narrower descriptor is given, (b-2-1) the plurality of keys described using means for storing data that define objects, are used, and, (b-3) means for giving definition of higher class algorithm-of-process and lower class algorithm-of-process, coupled to said object-oriented knowledge base, for constructing the hierarchy of verbs in said ideal classification table wherein as the basis on which said definition of higher class algorithm-of-process and lower class algorithm-of-process is given, (b-3-1) the plurality of keys described using means for implementation of algorithms-of-processes, are used, and, (c) means for carrying out a inference, coupled to said object-oriented knowledge base wherein (c-1) means for carrying out sentence based object-oriented categorical syllogism is used wherein as the basis on which said sentence based object-oriented categorical syllogism is carried out, (c-1-1) said ideal thesaurus, and (c-1-2) said ideal classification table, are used, whereby, said object-oriented knowledge base system processes not only rules and questions written as mathematically well defined equations but also rules and questions written as English sentences written in sentence pattern of one of five basic sentence patterns of English grammar.

2. The means for storing knowledge base system of claim 1 wherein said ideal dictionary further uses (a) a plurality of keys described using means for storing the list of lexical meanings of a natural word.

3. The means for storing knowledge base system of claim 1 wherein said keys described using means for storing data used as rules comprises plurality of keys described according to (a) means for describing sentences according to a simple English grammar.

4. The means for storing knowledge base system of claim 1 wherein said means for giving definition of higher class algorithm-of-process and lower class algorithm-of-process includes (a) means for making more specific meaning of a verb from that of a verb whose meaning is more general.

5. The means for storing knowledge base system of claim 1 wherein further (a) means for fusing propositions, which prevents a combinatorial explosion, is used during carrying out said means for carrying out a inference.

6. The means for storing knowledge base system of claim 1 wherein (a) means for storing data that strictly define objects, is used as said means for storing data that define objects.

7. The means for storing knowledge base system of claim 1 wherein (a) means for storing data of ideal thesaurus in a formal way is used as said means for storing data of ideal thesaurus.

8. The means for storing knowledge base system of claim 1 wherein (a) means for storing data of classification table in a formal way is used as said means for storing data of classification table.

9. The means for storing knowledge base system of claim 1 wherein (a) means for storing data used as rules in a formal way is used as said means for storing data used as rules.

10. The means for storing knowledge base system of claim 1 wherein (a) means for storing data about instances of solving problems, is used as said means for storing data used as rules.

11. The means for storing knowledge base system of claim 1 wherein (a) means for describing a function used as a rule is used as said means for storing data used as rules.

12. The means for storing knowledge base system of claim 11 wherein as the name of the function of claim 11, a name selected from the group consisting of (a) the name of a subroutine, (b) the name of a computer program, and, (c) the name of an unit operation described in a manual is used.

13. The means for storing knowledge base system of claim 1 wherein the body of information of said object-oriented knowledge base further includes (a) data comprising (a-1) a plurality of keys described using means for storing data providing the ability of association.

14. The means for storing knowledge base system of claim 13 wherein (a) means for storing data providing the ability of association in a strict way is used as said means for storing data providing the ability of association.

15. The means for storing knowledge base system of claim 1 in which a set selected from the group consisting of the universal set and the subsets, of a plurality of data which constitute the object-oriented knowledge base system is stored, in said object-oriented knowledge base system comprising:

(a) the object-oriented knowledge base whose body of information includes data selected from the group consisting of (a-1) the ideal thesaurus in which hierarchy of nouns is stored, comprising (a-1-1) the plurality of keys described using means for storing data of ideal thesaurus, in which a noun with broader meaning is described as a broader descriptor, and a noun with narrower meaning is described as a narrower descriptor, (a-2) the ideal classification table in which hierarchy of verbs is recorded, comprising (a-2-1) the plurality of keys described using means for storing data of classification table, in which a verb with broader meaning is described as a higher class name-of-classification-item and a verb with narrower meaning is described as a lower class name-of-classification-item, (a-3) a plurality of rules described by using (a-3-1) the plurality of keys described using the means for storing data providing the ability of association, and, (a-4) the plurality of rules described by using keys selected from the group consisting of (a-4-1) the plurality of keys described using means for storing data used as rules wherein the (a-4-1-1) means for describing sentences according to a simple English grammar, is used, and, (a-4-2) the plurality of keys described using the means for storing data about instances of solving problems, (b) an object-oriented knowledge base management system whose body of information includes data selected from the group consisting of (b-1) the ideal dictionary wherein lexical definition of verbs and nouns are given by using keys selected from the group consisting of (b-1-1) the plurality of keys described using means for storing the list of lexical meanings of a natural word, (b-1-2) the plurality of keys described using means for storing data that define objects, for giving the lexical definition of an ideal noun, (b-1-3) the plurality of keys described using means for implementation of algorithms-of-processes, for giving the lexical definition of an ideal verb, and, (b-1-4) the plurality of keys described using means for describing the function of a verb is used, for giving the lexical definition of an ideal verb, (b-2) the means for giving definition of broader descriptor and narrower descriptor, coupled to said object-oriented knowledge base, for constructing the hierarchy of nouns in said ideal thesaurus wherein as the basis on which said definition of broader descriptor and narrower descriptor is given, (b-2-1) the plurality of keys described using means for storing data that define objects, are used, and, (b-3) the means for giving definition of higher class algorithm-of-process and lower class algorithm-of-process, coupled to said object-oriented knowledge base, for constructing the hierarchy of verbs in said ideal classification table wherein as the basis on which said definition of higher class algorithm-of-process and lower class algorithm-of-process is given, (b-3-1) the plurality of keys described using means for implementation of algorithms-of-processes, are used, and, (c) the means for carrying out a inference, coupled to said object-oriented knowledge base wherein as the style of the reasoning, (c-1) an opportunistic reasoning is adopted wherein reasoning selected from the group consisting of (c-1-1) forward reasoning and (c-1-2) backward reasoning is carried out in each step of said opportunistic reasoning, and, the aim of each step of said opportunistic reasoning is to try to logically prove (c-1-3) a hypothetical proposition that is the target of the present step of opportunistic reasoning, said hypothetical proposition which is the target of the present step of opportunistic reasoning having a presupposition and a consequence, and, (c-2) each step of said opportunistic reasoning comprises set of means selected from the group consisting of, (c-2-1) means for getting rules-for-reasoning, (c-2-1-0) said rules-for-reasoning equals to (c-2-1-0-1) hypothetical propositions to be used in forward reasoning in the case of forward reasoning, said hypothetical propositions to be used in forward reasoning having a presupposition and a consequence, and equal to (c-2-1-0-2) hypothetical propositions to be used in backward reasoning in the case of backward reasoning, said hypothetical propositions to be used in backward reasoning having a presupposition and a consequence wherein algorithms selected from the group consisting of, (c-2-1-1) means for getting descriptors that are used to make a query to get the candidates of the rules-for-reasoning comprising (c-2-1-1-1) means for making a list of descriptors ranked in order of hit frequency wherein (c-2-1-1-1-1) the descriptors in said list are ones associated with (c-2-1-1-1-1-1) a natural word which characterizes the presupposition of said hypothetical proposition that is the target of the present step of opportunistic reasoning in the case of forward reasoning, and (c-2-1-1-1-1-2) a natural word which characterizes the consequence of said hypothetical proposition that is the target of the present step of opportunistic reasoning in the case of backward reasoning, and, (c-2-1-1-1-2) as the basis from which the descriptors which are to be used to make (c-2-1-1-1-2-1) a query to get the candidates of the rules-for-reasoning, are fetched, the data selected from the group consisting of (c-2-1-1-1-2-2) the plurality of keys described using means for storing data providing the ability of association, (c-2-1-1-1-2-3) the plurality of keys described using means for storing the list of lexical meanings of a natural word, and, (c-2-1-1-1-2-4) other plurality of keys in said object-oriented knowledge base, are used, (c-2-1-2) means for getting the names-of-classification-items that are used to make said query to get the candidates of the rules-for-reasoning comprising (c-2-1-2-1) means for making a list of names-of-classification-items ranked in order of hit frequency, wherein (c-2-1-2-1-1) the names-of-classification-items in said list are ones associated with (c-2-1-2-1-1-1) a natural word which characterizes the presupposition of said hypothetical proposition that is the target of the present step of opportunistic reasoning in the case of forward reasoning, and, (c-2-1-2-1-1-2) a natural word that characterizes the consequence of said hypothetical proposition which is the target of the present step of reasoning in the case of backward reasoning, and, (c-2-1-2-1-2) as the basis from which the names-of-classification-items that are to be used to make (c-2-1-2-1-2-1) said query to get the candidates of the rules-for-reasoning, are fetched, the data selected from the group consisting of (c-2-1-2-1-2-2) the plurality of keys described using means for storing data providing the ability of association, (c-2-1-2-1-2-3) the plurality of keys described using means for storing the list of lexical meanings of a natural word, and, (c-2-1-2-1-2-4) other plurality of keys in said object-oriented knowledge base, are used, (c-2-1-3) a retrieval of the candidates of the rules-for-reasoning using said query selected from the group consisting of the query of (c-2-1-1) and the query of (c-2-1-2) wherein said candidates of the rules-for-reasoning is a hypothetical proposition whose presupposition is hit upon during a Boolean search using the descriptors of (c-2-1-1) and the names-of-classification-items of (c-2-1-2) in the in the case of forward reasoning and whose consequence is hit upon during a Boolean search using the descriptors of (c-2-1-1) and the names-of-classification-items of (c-2-1-2) in the case of backward reasoning, and said candidates of the rules-for-reasoning are retrieved from the basis comprising the data selected from the group consisting of (c-2-1-3-1) the plurality of keys described using means for storing data used as rules, (c-2-1-3-2) the plurality of keys described using the means for storing data about instances of solving problems, and, (c-2-1-3-3) the plurality of keys described using means for describing a function used as a rule, are used, (c-2-1-4) means for picking up only the rules-for-reasoning from the candidates of the rules-for-reasoning got in the retrieval of (c-2-1-3) wherein out of the candidates of the rules-for-reasoning, only (c-2-1-4-1) the rules whose presupposition is derived from the presupposition of the hypothetical proposition that is the target of the present step of opportunistic reasoning, by using the (c-2-1-4-1-1) means for carrying out sentence based object-oriented hypothetical syllogism are picked out as the rules-for-reasoning, in the case of forward reasoning, and, only (c-2-1-4-2) the rules from whose consequence, the consequence of the hypothetical proposition that is the target of the present step of opportunistic reasoning is derived by using the (c-2-1-4-2-1) means for carrying out sentence based object-oriented hypothetical syllogism, are picked out as the rules-for-reasoning, in the case of backward reasoning, and, said means for picking up only the rules-for-reasoning from the candidates of the rules-for-reasoning got in the retrieval of (c-2-1-3) is defined by using the (c-2-1-4-3) means for carrying out sentence based object-oriented hypothetical syllogism the procedure of which is defined on the basis of the (c-2-1-4-3-1) means for carrying out sentence based object-oriented categorical syllogism wherein as the basis on which the sentence based object-oriented categorical syllogism is carried out, (c-2-1-4-3-1-1) said ideal thesaurus, (c-2-1-4-3-1-2) said ideal classification table, and, (c-2-1-4-3-1-3) said hypothetical proposition which is the target of the present step of opportunistic reasoning, are used, and, (c-2-1-5) means for retrieving directly the rules-for-reasoning wherein as the basis from which the rules-for-reasoning are retrieved, data selected from the group consisting of (c-2-1-5-1) the plurality of keys described using means for storing data used as rules, (c-2-1-5-2) the plurality of keys described using the means for storing data about instances of solving problems, and, (c-2-1-5-3) the plurality of keys described using means for describing a function used as a rule are used, to retrieve rules-for-reasoning, whose presupposition is derived by using the (c-2-1-5-4) means for carrying out sentence based object-oriented hypothetical syllogism from the presupposition of the (c-2-1-5-5) hypothetical proposition which is the target of the present step of opportunistic reasoning, in the case of forward reasoning, and, to retrieve rules-for-reasoning, from whose consequence, the consequence of the (c-2-1-5-6) hypothetical proposition which is the target of the present step of opportunistic reasoning is derived by using the (c-2-1-5-7) means for carrying out sentence based object-oriented hypothetical syllogism, in the case of backward reasoning, wherein the procedure for the means for carrying out sentence based object-oriented hypothetical syllogism is defined on the basis of the (c-2-1-5-8) means for carrying out sentence based object-oriented categorical syllogism, wherein as the basis on which the sentence based object-oriented categorical syllogism is carried out, (c-2-1-5-8-1) said ideal thesaurus, (c-2-1-5-8-2) said ideal classification table, and, (c-2-1-5-8-3) said hypothetical proposition which is the target of the present step of opportunistic reasoning, are used, (c-2-2) means for avoiding combinatorial explosion when too many number of said rules-for-reasoning are retrieved wherein means selected from the group consisting of, (c-2-2-1) means for narrowing down the target descriptors, (c-2-2-2) means for narrowing down the target names-of-classification-items and (c-2-2-3) means for fusing propositions, are used, and then, the rules-for-reasoning are retrieved again, (c-2-3) means for making more exhaustive retrieval when too less number of said rules-for-reasoning are retrieved wherein means selected from the group consisting of, (c-2-3-1) means for broadening out the target descriptors and (c-2-3-2) means for broadening out the target names-of-classification-items, are used, and then, the rules-for-reasoning are retrieved again, and, (c-2-4) means for determining the hypothetical propositions that are to be used as the target of the next step of opportunistic reasoning, as the basis from which said hypothetical propositions which are to be used as the target of the next step of opportunistic reasoning are retrieved, data selected from the group consisting of (c-2-4-1) said rules-for-reasoning, and, (c-2-4-2) said hypothetical proposition which is the target of the present step of opportunistic reasoning, are used, whereby, said object-oriented knowledge base system processes not only rules and questions written as mathematically well defined equations but also rules and questions written as English sentences written in sentence pattern of one of five basic sentence patterns of English grammar, and gives answers not only written as mathematically well defined equations but also written as English sentences written in sentence pattern of one of five basic sentence patterns of English grammar.

16. An object-oriented knowledge base system implemented in a digital computer comprising (a) a digital computing system;

(b) A means for storing data used for said digital computer system in which a set selected from the group consisting of the universal set and the subsets, of a plurality of data which constitute an object-oriented knowledge base system is stored, and, (c) an input device, used for said digital computer system, in said object-oriented knowledge base system comprising:

(d) an object-oriented knowledge base whose body of information includes data selected from the group consisting of (d-1) an ideal thesaurus in which hierarchy of nouns is stored, comprising (d-1-1) a plurality of keys described using means for storing data of ideal thesaurus, in which a noun with broader meaning is described as a broader descriptor, and a noun with narrower meaning is described as a narrower descriptor, (d-2) an ideal classification table in which hierarchy of verbs is recorded, comprising (d-2-1) a plurality of keys described using means for storing data of classification table, in which a verb with broader meaning is described as a higher class name-of-classification-item and a verb with narrower meaning is described as a lower class name-of-classification-item, and, (d-3) a popularity of rules described by using keys comprising (d-3-1) a plurality of keys described using means for storing data used as rules, (e) an object-oriented knowledge base management system whose body of information includes data selected from the group consisting of (e-1) an ideal dictionary wherein lexical definition of verbs and nouns are given by using keys selected from the group consisting of (e-1-1) a plurality of keys described using means for storing data that define objects, for giving the lexical definition of an ideal noun, (e-1-2) a plurality of keys described using means for implementation of algorithms-of-processes, for giving the lexical definition of an ideal verb, and, (e-1-3) a plurality of keys described using means for describing the function of a verb, for giving the lexical definition of an ideal verb, (e-2) means for giving definition of broader descriptor and narrower descriptor, coupled to said object-oriented knowledge base, for constructing the hierarchy of nouns in said ideal thesaurus wherein as the basis on which said definition of broader descriptor and narrower descriptor is given, (e-2-1) the plurality of keys described using means for storing data that define objects, are used, and, (e-3) means for giving definition of higher class algorithm-of-process and lower class algorithm-of-process, coupled to said object-oriented knowledge base, for constructing the hierarchy of verbs in said ideal classification table wherein as the basis on which said definition of higher class algorithm-of-process and lower class algorithm-of-process is given, (e-3-1) the plurality of keys described using means for implementation of algorithms-of-processes, are used, and, (f) means for carrying out a inference, coupled to said object-oriented knowledge base wherein (f-1) means for carrying out sentence based object-oriented categorical syllogism is used wherein as the basis on which the sentence based object-oriented categorical syllogism is carried out, (f-1-1) said ideal thesaurus, and (f-1-2) said ideal classification table, are used, whereby, said object-oriented knowledge base system processes not only rules and questions written as mathematically well defined equations but also rules and questions written as English sentences written in sentence pattern of one of five basic sentence patterns of English grammar.

17. The object-oriented knowledge base system implemented in a digital computer of claim 16 wherein said ideal dictionary further uses (a) a plurality of keys described using means for storing the list of lexical meanings of a natural word.

18. The object-oriented knowledge base system implemented in a digital computer of claim 16 wherein said keys described using means for storing data used as rules comprises a plurality of keys described according to (a) means for describing sentences according to a simple English grammar.

19. The object-oriented knowledge base system implemented in a digital computer of claim 16 wherein said means for giving definition of higher class algorithm-of-process and lower class algorithm-of-process includes (a) means for making more specific meaning of a verb from that of a verb whose meaning is more general.

20. The object-oriented knowledge base system implemented in a digital computer of claim 16 wherein further (a) means for fusing propositions, which prevents a combinatorial explosion, is used during carrying out said means for carrying out a inference.

21. The object-oriented knowledge base system implemented in a digital computer of claim 16 wherein
(a) means for storing data that strictly define objects, is used as said means for storing data that define objects.

22. The object-oriented knowledge base system implemented in a digital computer of claim 16 wherein
(a) means for storing data of ideal thesaurus in a formal way is used as said means for storing data of ideal thesaurus.

23. The object-oriented knowledge base system implemented in a digital computer of claim 16 wherein
(a) means for storing data of classification table in a formal way is used as said means for storing data of classification table.

24. The object-oriented knowledge base system implemented in a digital computer of claim 16 wherein
(a) means for storing data used as rules in a formal way is used as said means for storing data used as rules.

25. The object-oriented knowledge base system implemented in a digital computer of claim 16 wherein
(a) means for storing data about instances of solving problems is used as said means for storing data used as rules.

26. The object-oriented knowledge base system implemented in a digital computer of claim 16 wherein
(a) means for describing a function used as a rule is used as said means for storing data used as rules.

27. The object-oriented knowledge base system implemented in a digital computer of claim 26 wherein as the name of the function of claim 26, a name selected from the group consisting of
(a) the name of a subroutine,
(b) the name of a computer program, and,
(c) the name of an unit operation described in a manual is used.

28. The object-oriented knowledge base system implemented in a digital computer of claim 16 wherein the body of information of said object-oriented knowledge base further includes
(a) data comprising
(a-1) a plurality of keys described using means for storing data providing the ability of association.

29. The object-oriented knowledge base system implemented in a digital computer of claim 28 wherein
(a) means for storing data providing the ability of association in a strict way is used as said means for storing data providing the ability of association.

30. The object-oriented knowledge base system implemented in a digital computer of claim 16, in said object-oriented knowledge base system comprising:
(a) the object-oriented knowledge whose body of information includes data selected from the group consisting of
(a-1) the ideal thesaurus in which hierarchy of nouns is stored, comprising
(a-1-1) the plurality of keys described using means for storing data of ideal thesaurus, in which a noun with broader meaning is described as a broader descriptor, and a noun with narrower meaning is described as a narrower descriptor,
(a-2) the ideal classification table in which hierarchy of verbs is recorded, comprising
(a-2-1) the plurality of keys described using means for storing data of classification table, in which a verb with broader meaning is described as a higher class name-of-classification-item and a verb with narrower meaning is described as a lower class name-of-classification-item,
(a-3) data comprising
(a-3-1) the plurality of keys described using the means for storing data providing the ability of association, and,
(a-4) the rules described by using keys selected from the group consisting of
(a-4-1) the plurality of keys described using means for storing data used as rules, wherein the
(a-4-1-1) means for describing sentences according to a simple English grammar, is used, and,
(a-4-2) the plurality of keys described using the means for storing data about instances of solving problems,
(b) the object-oriented knowledge management system whose body of information includes data selected from the group consisting of
(b-1) the ideal dictionary wherein lexical definition of verbs and nouns are given by using keys selected from the group consisting of
(b-1-1) the plurality of keys described using means for storing the list of lexical meanings of a natural word,
(b-1-2) the plurality of keys described using means for storing data that define objects, for giving the lexical definition of an ideal noun,
(b-1-3) the plurality of keys described using means for implementation of algorithms-of-processes, for giving the lexical definition of an ideal verb, and,
(b-1-4) the plurality of keys described using means for describing the function of a verb is used, for giving the lexical definition of an ideal verb,
(b-2) the means for giving definition of broader descriptor and narrower descriptor, coupled to said object-oriented knowledge base, for constructing the hierarchy of nouns in said ideal thesaurus wherein as the basis on which said definition of broader descriptor and narrower descriptor is given,
(b-2-1) the plurality of keys described using means for storing data that define objects, are used, and,
(b-3) the means for giving definition of higher class algorithm-of-process and lower class algorithm-of-process, coupled to said object-oriented knowledge base, for constructing the hierarchy of verbs in said ideal classification table wherein as the basis on which said definition of higher class algorithm-of-process and lower class algorithm-of-process is given,
(b-3-1) the plurality of keys described using means for implementation of algorithms-of-processes, are used, and,
(c) the means for carrying out a inference, coupled to said object-oriented knowledge base wherein as the style of the reasoning,
(c-1) an opportunistic reasoning is adopted, wherein reasoning selected from the group consisting of
(c-1-1) forward reasoning and
(c-1-2) backward reasoning is carried out in each step of said opportunistic reasoning and, the aim of each step of said opportunistic reasoning is to try to logically prove
(c-1-3) a hypothetical proposition that is the target of the present step of opportunistic reasoning, said hypothetical proposition which is the target of the present step of opportunistic reasoning having a presupposition and a consequence, and,
(c-2) each step of said opportunistic reasoning comprises set of means selected from the group consisting of,
(c-2-1) means for getting rules-for-reasoning,
(c-2-1-0) said rules-for-reasoning equals to
(c-2-1-0-1) hypothetical propositions to be used in forward reasoning in the case of forward reasoning, said hypothetical propositions to be used in forward reasoning having a presupposition and a consequence, and equal to (c-2-1-0-2) hypothetical propositions to be used in backward reasoning in the case of backward reasoning, said hypothetical propositions to be used in backward reasoning having a presupposition and a consequence wherein algorithms selected from the group consisting of, (c-2-1-1) means for getting descriptors that are used to make a query to get the candidates of the rules-for-reasoning comprising (c-2-1-1-1) means for making a list of descriptors ranked in order of hit frequency wherein (c-2-1-1-1-1) the descriptors in said list are ones associated with (c-2-1-1-1-1-1) a natural word which characterizes the presupposition of said hypothetical proposition that is the target of the present step of opportunistic reasoning in the case of forward reasoning, and (c-2-1-1-1-1-2) a natural word which characterizes the consequence of said hypothetical proposition that is the target of the present step of opportunistic reasoning in the case of backward reasoning, and, (c-2-1-1-1-2) as the basis from which the descriptors which are to be used to make (c-2-1-1-1-2-1) a query to get the candidates of the rules-for-reasoning, are fetched, the data selected from the group consisting of (c-2-1-1-1-2-2) the plurality of keys described using means for storing data providing the ability of association, (c-2-1-1-1-2-3) the plurality of keys described using means for storing the list of lexical meanings of a natural word, and, (c-2-1-1-1-2-4) other plurality of keys in said object-oriented knowledge base, are used, (c-2-1-2) means for getting the names-of-classification-items that are used to make said query to get the candidates of the rules-for-reasoning comprising (c-2-1-2-1) means for making a list of names-of-classification-items ranked in order of hit frequency wherein (c-2-1-2-1-1) the names-of-classification-items in said list are ones associated with (c-2-1-2-1-1-1) a natural word which characterizes the presupposition of said hypothetical proposition that is the target of the present step of opportunistic reasoning in the case of forward reasoning, and, (c-2-1-2-1-1-2) a natural word that characterizes the consequence of said hypothetical proposition which is the target of the present step of reasoning in the case of backward reasoning, and, (c-2-1-2-1-2) as the basis from which the names-of-classification-items that are to be used to make (c-2-1-2-1-2-1) said query to get the candidates of the rules-for-reasoning, are fetched, the data selected from the group consisting of (c-2-1-2-1-2-2) the plurality of keys described using means for storing data providing the ability of association, (c-2-1-2-1-2-3) the plurality of keys described using means for storing the list of lexical meanings of a natural word, and, (c-2-1-2-1-2-4) other plurality of keys in said object-oriented knowledge base, are used, (c-2-1-3) a retrieval of the candidates of the rules-for-reasoning using said query selected from the group consisting of the query of (c-2-1-1) and the query of (c-2-1-2) wherein said candidates of the rules-for-reasoning is a hypothetical proposition, whose presupposition is hit upon during a Boolean search using the descriptors of (c-2-1-1) and the names-of-classification-items of (c-2-1-2) in the in the case of forward reasoning and whose consequence is hit upon during a Boolean search using the descriptors of (c-2-1-1) and the names-of-classification-items of (c-2-1-2) in the case of backward reasoning, and said candidates of the rules-for-reasoning are retrieved from the basis comprising the data selected from the group consisting of (c-2-1-3-1) the plurality of keys described using means for storing data used as rules, (c-2-1-3-2) the plurality of keys described using the means for storing data about instances of solving problems, and, (c-2-1-3-3) the plurality of keys described using means for describing a function used as a rule, are used, (c-2-1-4) means for picking up only the rules-for-reasoning from the candidates of the rules-for-reasoning got in the retrieval of (c-2-1-3) wherein out of the candidates of the rules-for-reasoning, only (c-2-1-4-1) the rules whose presupposition is derived from the presupposition of the hypothetical proposition that is the target of the present step of opportunistic reasoning, by using (c-2-1-4-1-1) means for carrying out sentence based object-oriented hypothetical syllogism are picked out as the rules-for-reasoning, in the case of forward reasoning, and, only (c-2-1-4-2) the rules from whose consequence, the consequence of the hypothetical proposition that is the target of the present step of opportunistic reasoning is derived by using the (c-2-1-4-2-1) means for carrying out sentence based object-oriented hypothetical syllogism, are picked out as the rules-for-reasoning, in the case of backward reasoning, and, said means for picking up only the rules-for-reasoning from the candidates of the rules-for-reasoning got in the retrieval of (c-2-1-3) is defined by using the (c-2-1-4-3) means for carrying out sentence based object-oriented hypothetical syllogism the procedure of which is defined on the basis of the (c-2-1-4-3-1) means for carrying out sentence based object-oriented categorical syllogism wherein as the basis on which the sentence based object-oriented categorical syllogism is carried out, (c-2-1-4-3-1-1) said ideal thesaurus, (c-2-1-4-3-1-2) said ideal classification table, and, (c-2-1-4-3-1-3) said hypothetical proposition which is the target of the present step of opportunistic reasoning, are used, and, (c-2-1-5) means for retrieving directly the rules-for-reasoning wherein as the basis from which the rules-for-reasoning are retrieved, data selected from the group consisting of (c-2-1-5-1) the plurality of keys described using means for storing data used as rules, (c-2-1-5-2) the plurality of keys described using the means for storing data about instances of solving problems, and, (c-2-1-5-3) the plurality of keys described using means for describing a function used as a rule, are used, to retrieve rules-for-reasoning, whose presupposition is derived by using the (c-2-1-5-4) means for carrying out sentence based object-oriented hypothetical syllogism from the presupposition of the (c-2-1-5-5) hypothetical proposition which is the target of the present step of opportunistic reasoning, in the case of forward reasoning, and, to retrieve rules-for-reasoning, from whose consequence, the consequence of the (c-2-1-5-6) hypothetical proposition which is the target of the present step of opportunistic reasoning is derived by using the (c-2-1-5-7) means for carrying out sentence based object-oriented hypothetical syllogism, in the case of backward reasoning wherein the procedure for means for carrying out sentence based object-oriented hypothetical syllogism is defined on the basis of (c-2-1-5-8) means for carrying out sentence based object-oriented categorical syllogism wherein as the basis on which the sentence based object-oriented categorical syllogism is carried out, (c-2-1-5-8-1) said ideal thesaurus, (c-2-1-5-8-2) said ideal classification table, and, (c-2-1-5-8-3) said hypothetical proposition which is the target of the present step of opportunistic reasoning, are used, (c-2-2) means for avoiding combinatorial explosion when too many number of said rules-for-reasoning are retrieved wherein means selected from the group consisting of, (c-2-2-1) means for narrowing down the target descriptors, (c-2-2-2) means for narrowing down the target names-of-classification-items and (c-2-2-3) means for fusing propositions, are used, and then, the rules-for-reasoning are retrieved again, (c-2-3) means for making more exhaustive retrieval when too less number of said rules-for-reasoning are retrieved wherein means selected from the group consisting of, (c-2-3-1) means for broadening out the target descriptors and (c-2-3-2) means for broadening out the target names-of-classification-items, are used, and then, the rules-for-reasoning are retrieved again, and, (c-2-4) means for determining the hypothetical propositions that are to be used as the target of the next step of opportunistic reasoning, as the basis from which said hypothetical propositions which are to be used as the target of the next step of opportunistic reasoning are retrieved, data selected from the group consisting of (c-2-4-1) said rules-for-reasoning, and, (c-2-4-2) said hypothetical proposition which is the target of the present step of opportunistic reasoning, are used, whereby, said object-oriented knowledge base system processes not only rules and questions written as mathematically well defined equations but also rules and questions written as English sentences written in sentence pattern of one of five basic sentence patterns of English grammar, and gives answers not only written as mathematically well defined equations but also written as English sentences written in sentence pattern of one of five basic sentence patterns of English grammar.

31. A method of constructing an object-oriented knowledge base system comprising (a) providing an object-oriented knowledge base whose body of information is given by using the method selected from the group consisting of (a-1) giving an ideal thesaurus in which hierarchy of nouns is stored, by using the method comprising (a-1-1) describing a plurality of keys using means for storing data of ideal thesaurus, in which a noun with broader meaning is described as a broader descriptor, and a noun with narrower meaning is described as a narrower descriptor, (a-2) giving an ideal classification table in which hierarchy of verbs is recorded, by using the method comprising (a-2-1) describing a plurality of keys using means for storing data of classification table, in which a verb with broader meaning is described as a higher class name-of-classification-item and a verb with narrower meaning is described as a lower class name-of-classification-item, and, (a-3) giving rules by (a-3-1) describing a plurality of keys using means for storing data used as rules, (b) providing an object-oriented knowledge base management system whose body of information is given by using the method selected from the group consisting of (b-1) giving an ideal dictionary wherein as the method to give lexical definition of verbs and nouns the method selected from the group consisting of (b-1-1) describing a plurality of keys using means for storing data that define objects, for giving the lexical definition of an ideal noun, (b-1-2) describing a plurality of keys using means for implementation of algorithms-of-processes, for giving the lexical definition of an ideal verb, and, (b-1-3) describing a plurality of keys using means for describing the function of a verb, for giving the lexical definition of an ideal verb, are used, (b-2) using means for giving definition of broader descriptor and narrower descriptor for constructing the hierarchy of nouns in said ideal thesaurus, by, (b-2-1) using the plurality of keys described using means for storing data that define objects, as the basis on which said definition of broader descriptor and narrower descriptor is given, (b-3) using means for giving definition of higher class algorithm-of-process and lower class algorithm-of-process, for constructing the hierarchy of verbs in said ideal classification table, by, (b-3-1) using the plurality of keys described using means for implementation of algorithms-of-processes, as the basis on which said definition of higher class algorithm-of-process and lower class algorithm-of-process is given, and, (c) using a means for carrying out a inference, by (c-1) using means for carrying out sentence based object-oriented categorical syllogism wherein (c-1-1) using said ideal thesaurus, and (c-1-2) using said ideal classification table, as the basis on which the sentence based object-oriented categorical syllogism is carried out, whereby, said object-oriented knowledge base system processes not only rules and questions written as mathematically well defined equations but also rules and questions written as English sentences written in sentence pattern of one of five basic sentence patterns of English grammar.

32. The method of constructing an object-oriented knowledge base system of claim 31 wherein giving said ideal dictionary further using a method of (a) describing a plurality of keys using means for storing the list of lexical meanings of a natural word.

33. The method of constructing an object-oriented knowledge base system of claim 31 wherein said keys described using means for storing data used as rules comprises a plurality of keys described according to (a) means for describing sentences according to a simple English grammar.

34. The method of constructing an object-oriented knowledge base system of claim 31 wherein using means for giving definition of higher class algorithm-of-process and lower class algorithm-of-process by (a) using means for making more specific meaning of a verb from that of a verb whose meaning is more general.

35. The method of constructing an object-oriented knowledge base system of claim 31 wherein (a) using means for fusing propositions, which prevents a combinatorial explosion, when carrying out a inference.

36. The method of constructing an object:oriented knowledge base system of claim 31 wherein (a) means for storing data that strictly define objects, is used as said means for storing data that define objects.

37. The method of constructing an object-oriented knowledge base system of claim 31 wherein (a) means for storing data of ideal thesaurus in a formal way is used as said means for storing data of ideal thesaurus.

38. The method of constructing an object-oriented knowledge base system of claim 31 wherein (a) means for storing data of ideal classification table in a formal way is used as said means for storing data of classification table.

39. The method of constructing an object-oriented knowledge base system of claim 31 wherein (a) means for storing data used as rules in a formal way is used as said means for storing data used as rules.

40. The method of constructing an object-oriented knowledge base system of claim 31 wherein (a) means for storing data about instances of solving problems, is used as said means for storing data used as rules.

41. The method of constructing an object-oriented knowledge base system of claim 31 wherein (a) means for describing a function used as a rule is used as said means for storing data used as rules.

42. The method of constructing an object-oriented knowledge base system of claim 41 wherein as the name of the function of claim 41, a name selected from the group consisting of (a) the name of a subroutine, (b) the name of a computer program, and, (c) the name of an unit operation described in a manual is used.

43. The method of constructing an object-oriented knowledge base system of claim 31 wherein the body of information of said object-oriented knowledge base further includes (a) data comprising (a-1) a plurality of keys described using means for storing data providing the ability of association.

44. The method of constructing an object-oriented knowledge base system of claim 43 wherein (a) means for storing data providing the ability of association in a strict way is used as said means for storing data providing the ability of association.

45. A method of constructing an object-oriented knowledge base system of claim 31, comprising (a) providing the object-oriented knowledge base wherein the body of information is given by using the method selected from the group consisting of (a-1) giving the ideal thesaurus in which hierarchy of nouns is stored, by using the method comprising (a-1-1) describing the plurality of keys using means for storing data of ideal thesaurus, in which a noun with broader meaning is described as a broader descriptor, and a noun with narrower meaning is described as a narrower descriptor, (a-2) giving the ideal classification table in which hierarchy of verbs is recorded, by using the method comprising (a-2-1) describing the plurality of keys using means for storing data of classification table, in which a verb with broader meaning is described as a higher class name-of-classification-item and a verb with narrower meaning is described as a lower class name-of-classification-item, (a-3) giving the data by using the method comprising (a-3-1) describing the plurality of keys using the means for storing data providing the ability of association, and, (a-4) giving the rules by using the method selected from the group consisting of (a-4-1) describing the plurality of keys using means for storing data used as rules wherein (a-4-1-1) using the means for describing sentences according to a simple English grammar, as the way to describe a sentence in the rule, and, (a-4-2) describing the plurality of keys described using the means for storing data about instances of solving problems, (b) providing the object-oriented knowledge base wherein the body of information is given by using the method selected from the group consisting of (b-1) giving the ideal dictionary wherein as the method to give lexical definition of verbs and nouns the method selected from the group consisting of (b-1-1) describing the plurality of keys using means for storing the list of lexical meanings of a natural word, (b-1-2) describing the plurality of keys using means for storing data that define objects, for giving the lexical definition of an ideal noun, (b-1-3) describing the plurality of keys using means for implementation of algorithms-of-processes, for giving the lexical definition of an ideal verb, and, (b-1-4) describing the plurality of keys using means for describing the function of a verb is used, for giving the lexical definition of an ideal verb, are used, (b-2) using means for giving definition of broader descriptor and narrower descriptor for constructing the hierarchy of nouns in said ideal thesaurus, by (b-2-1) using the plurality of keys described using means for storing data that define objects, as the basis on which said definition of broader descriptor and narrower descriptor is given, and, (b-3) using means for giving definition of higher class algorithm-of-process and lower class algorithm-of-process, coupled to said object-oriented knowledge base, for constructing the hierarchy of verbs in said ideal classification table, by, (b-3-1) using the plurality of keys described using means for implementation of algorithms-of-processes, as the basis on which said definition of higher class algorithm-of-process and lower class algorithm-of-process is given, and, (c) using the means for carrying out a inference that is coupled to said object-oriented knowledge base wherein (c-1) using an opportunistic reasoning as the style of reasoning wherein carrying out a reasoning selected from the group consisting of (c-1-1) forward reasoning and (c-1-2) backward reasoning in each step of said opportunistic reasoning and, as the aim of each step of said opportunistic reasoning, (c-1-3) trying to logically prove a hypothetical proposition which is the target of the present step of opportunistic reasoning, said hypothetical proposition which is the target of the present step of opportunistic reasoning having a presupposition and a consequence, and, (c-2) carrying out each step of said opportunistic reasoning comprises set of methods selected from the group consisting of, (c-2-1) using means for getting rules-for-reasoning, providing said rules-for reasoning by (c-2-1-1) providing hypothetical propositions to be used in forward reasoning in the case of forward reasoning, said hypothetical propositions to be used in forward reasoning having a presupposition and a consequence, and by (c-2-1-2) providing hypothetical propositions to be used in backward reasoning in the case of backward reasoning, said hypothetical propositions to be used in backward reasoning having a presupposition and a consequence wherein methods selected from the group consisting of, (c-2-1-1) using means for getting descriptors that are used to make a query to get the candidates of the rules-for-reasoning wherein (c-2-1-1-1) using means for making a list of descriptors ranked in order of hit frequency wherein (c-2-1-1-1-1) judging a descriptor to be the descriptors in said list if it is associated with a natural word which characterizes the presupposition of said hypothetical proposition that is the target of the present step of opportunistic reasoning in the case of forward reasoning, and a natural word which characterizes the consequence of said hypothetical proposition that is the target of the present step of opportunistic reasoning in the case of backward reasoning, and, (c-2-1-1-1-2) as the way of using basis from which the descriptors that are to be used for (c-2-1-1-1-2-1) making a query to get the candidates of the rules-for-reasoning, are fetched, methods selected from the group consisting of (c-2-1-1-1-2-2) using the plurality of keys described using the means for storing data providing the ability of association, (c-2-1-1-1-2-3) using the plurality of keys described using the means for storing the list of lexical meanings of a natural word, and, (c-2-1-1-1-2-4) using other plurality of keys in said object-oriented knowledge base, are used, (c-2-1-2) using means for getting the names-of-classification-items that are used to make said query to get the candidates of the rules-for-reasoning wherein (c-2-1-2-1) using means for making a list of names-of-classification-items ranked in order of hit frequency wherein (c-2-1-2-1-1) judging a names-of-classification-item to be the names-of-classification-item in said list if it is associated with a natural word which characterizes the presupposition of said hypothetical proposition that is the target of the present step of opportunistic reasoning in the case of forward reasoning, and a natural word that characterizes the consequence of said hypothetical proposition which is the target of the present step of reasoning in the case of backward reasoning, and (c-2-1-2-1-2) as the way of using basis from which the names-of-classification-items that are to be used for (c-2-1-2-1-2-1) making said query to get the candidate of the rules-for-reasoning, are fetched, methods selected from the group consisting of (c-2-1-2-1-2-2) using the plurality of keys described using the means for storing data providing the ability of association, (c-2-1-2-1-2-3) using the plurality of keys described using the means for storing the list of lexical meanings of a natural word, and, (c-2-1-2-1-2-4) using other plurality of keys in said object-oriented knowledge base, are used, (c-2-1-3) making a retrieval of the candidates of the-rules-for-reasoning using said query selected from the group consisting of the query of (c-2-1-1) and the query of (c-2-1-2) wherein judging a hypothetical proposition to be said candidates of the rules-for-reasoning if whose presupposition is hit upon during a Boolean search using the descriptors of (c-2-1-1) and the names-of-classification-items of (c-2-1-2) in the in the case of forward reasoning and whose consequence is hit upon during a Boolean search using the descriptors of (c-2-1-1) and the names-of-classification-items of (c-2-1-2) in the case of backward reasoning, and as the way of using basis from which said candidates of the rules-for-reasoning are retrieved, methods selected from the group consisting of (c-2-1-3-1) using the plurality of keys described using means for storing data used as rules, (c-2-1-3-2) using the plurality of keys described using the means for storing data about instances of solving problems, and, (c-2-1-3-3) using the plurality of keys described using means for describing the function of a verb, are used, (c-2-1-4) using means for picking up only the rules-for-reasoning from the candidates of the rules-for-reasoning got in the retrieval of (c-2-1-3) wherein out of the candidates of the rules-for-reasoning, only (c-2-1-4-1) picking out the rules whose presupposition is derived from the presupposition of the hypothetical proposition which is the target of the present step of opportunistic reasoning, as the rules-for-reasoning, by (c-2-1-4-1-1) using the means for carrying out sentence based object-oriented hypothetical syllogism, in the case of forward reasoning, and, only (c-2-1-4-2) picking out the rules from whose consequence, the consequence of the hypothetical proposition that is the target of the present step of opportunistic reasoning is derived as the rules-for-reasoning by (c-2-1-4-2-1) using the means for carrying out sentence based object-oriented hypothetical syllogism, in the case of backward reasoning, and, defining said means for picking up only the rules-for-reasoning from the candidates of the rules-for-reasoning got in the retrieval of (c-2-1-3) is by (c-2-1-4-3) using the means for carrying out sentence based object-oriented hypothetical syllogism, the procedure of which is defined by (c-2-1-4-3-1) using the means for carrying out sentence based object-oriented categorical syllogism wherein as the way of using basis on which the sentence based object-oriented categorical syllogism is carried out, methods selected from the group consisting of (c-2-1-4-3-1-1) using said ideal thesaurus, (c-2-1-4-3-1-2) using said ideal classification table, and, (c-2-1-4-3-1-3) using said hypothetical proposition which is the target of the present step of opportunistic reasoning, are used, and, (c-2-1-5) using means for retrieving directly the rules-for-reasoning wherein as the way of using basis from which the rules-for-reasoning are retrieved, methods selected from the group consisting of (c-2-1-5-1) using the plurality of keys described using means for storing data used as rules, (c-2-1-5-2) using the plurality of keys described using the means for storing data about instances of solving problems, and, (c-2-1-5-3) using the plurality of keys described using means for describing the function of a verb, are used, to retrieve rules-for-reasoning, whose presupposition is derived by (c-2-1-5-4) using the means for carrying out sentence based object-oriented hypothetical syllogism from the presupposition of the hypothetical proposition which is the target of the present step of opportunistic reasoning, in the case of forward reasoning, and, to retrieve rules-for-reasoning from whose consequence, the consequence of the hypothetical proposition which is the target of the present step of opportunistic reasoning is derived by (c-2-1-5-5) using the means for carrying out sentence based object-oriented hypothetical syllogism, in the case of backward reasoning wherein defying the procedure for means for carrying out sentence based object-oriented hypothetical syllogism by (c-2-1-5-6) using means for carrying out sentence based object-oriented categorical syllogism wherein as the way of using basis on which the sentence based object-oriented categorical syllogism is carried out, methods selected from the group consisting of (c-2-1-5-6-1) using said ideal thesaurus, (c-2-1-5-6-2) using said ideal classification table, and, (c-2-1-5-6-3) using said hypothetical proposition which is the target of the present step of opportunistic reasoning, are used, (c-2-2) using means for avoiding combinatorial explosion when too many number of said rules-for-reasoning are retrieved wherein methods selected from the group consisting of, (c-2-2-1) using means for narrowing down the target descriptors, (c-2-2-2) using means for narrowing down the target names-of-classification-items and (c-2-2-3) using means for fusing propositions, are used, and then, retrieving the rules-for-reasoning again, (c-2-3) using means for making more exhaustive retrieval when too less number of said rules-for-reasoning are retrieved wherein methods selected from the group consisting of, (c-2-3-1) using means for broadening out the target descriptors and (c-2-3-2) using means for broadening out the target names-of-classification-items, are used, and then, retrieving the rules-for-reasoning again, and, (c-2-4) using means for determining the hypothetical propositions that are to be used as the target of the next step of opportunistic reasoning, as the way of using basis from which said hypothetical propositions which are to be used as the target of the next step of opportunistic reasoning are retrieved, methods selected from the group consisting of (c-2-4-1) using said rules-for-reasoning, and, (c-2-4-2) using said hypothetical proposition which is the target of the present step of opportunistic reasoning, are used, whereby, said object-oriented knowledge base system processes not only rules and questions written as mathematically well defined equations but also rules and questions written as English sentences written in sentence pattern of one of five basic sentence patterns of English grammar, and gives answers not only written as mathematically well defined equations but also written as English sentences written in sentence pattern of one of five basic sentence patterns of English grammar.

46. An object-oriented knowledge base system in the inference mechanism of which means for carrying out sentence based object-oriented categorical syllogism is used.

47. Means for storing knowledge base system in which a set selected from the group consisting of the universal set and the subsets, of a plurality of data which constitute the object-oriented knowledge base system of claim 46 is stored.

* * * * *